US011518031B2

(12) United States Patent
Bryner et al.

(10) Patent No.: US 11,518,031 B2
(45) Date of Patent: Dec. 6, 2022

(54) SYSTEM AND METHOD FOR TRAVERSING AN OBSTACLE WITH AN INSPECTION ROBOT

(71) Applicant: Gecko Robotics, Inc., Pittsburgh, PA (US)

(72) Inventors: Edward A. Bryner, Pittsburgh, PA (US); Kevin Y. Low, Pittsburgh, PA (US); Joshua D. Moore, Pittsburgh, PA (US); Dillon R. Jourde, Pittsburgh, PA (US); Mark J. Loosararian, Pittsburgh, PA (US); Edwin H. Cho, Pittsburgh, PA (US); Katherine Virginia Denner, Pittsburgh, PA (US); Yizhu Gu, Pittsburgh, PA (US); Ian Miller, Aspinwall, PA (US); Alvin Chou, Alpharetta, GA (US); Mark Cho, Pittsburgh, PA (US); Francesco H. Trogu, Pittsburgh, PA (US); Domenic P. Rodriguez, Pittsburgh, PA (US)

(73) Assignee: Gecko Robotics, Inc., Pittsburgh, PA (US)

( * ) Notice: Subject to any disclaimer, the term of this patent is extended or adjusted under 35 U.S.C. 154(b) by 2 days.

(21) Appl. No.: 16/869,700

(22) Filed: May 8, 2020

(65) Prior Publication Data

US 2020/0306969 A1 Oct. 1, 2020

Related U.S. Application Data

(63) Continuation of application No. 16/863,594, filed on Apr. 30, 2020, which is a continuation of application (Continued)

(51) Int. Cl.

*B25J 9/16* (2006.01)
*B25J 9/00* (2006.01)

(Continued)

(52) U.S. Cl.

CPC ............ *B25J 9/1669* (2013.01); *B25J 5/007* (2013.01); *B25J 9/0009* (2013.01); *B25J 9/0015* (2013.01);

(Continued)

(58) Field of Classification Search

CPC ....... G01N 29/265; G01N 29/225–226; G01N 29/28; G01N 2291/106; G01N 2291/2694;

(Continued)

(56) References Cited

U.S. PATENT DOCUMENTS 2,135,307 A 11/1938 Keator
2,694,164 A 11/1954 Geppelt (Continued)

FOREIGN PATENT DOCUMENTS

BR PI0805432 A2 9/2010
CN 102356311 A 2/2012

(Continued)

OTHER PUBLICATIONS

U.S. Appl. No. 17/097,422, filed Nov. 13, 2020, Pending.

(Continued)

*Primary Examiner* — David L Singer

(74) *Attorney, Agent, or Firm* — GTC Law Group PC & Affiliates

(57) ABSTRACT

System and methods for traversing an obstacle with an inspection robot are disclosed. An example system may include an inspection robot including an obstacle sensor to interrogate an inspection surface. The example may further include an obstacle sensory data circuit to interpret obstacle sensory data provided by the obstacle sensor, an obstacle processing circuit to determine refined obstacle data, and an obstacle notification circuit to generate and provide obstacle notification data to a user interface device. The example (Continued)

system may further include a user interface circuit to interpret a user request value from the user interface device, and to determine an obstacle response command value in response to the user request value; and an obstacle configuration circuit to provide the obstacle response command value to the inspection robot during the interrogating of the inspection surface.

31 Claims, 203 Drawing Sheets

Related U.S. Application Data

No. PCT/US2020/021779, filed on Mar. 9, 2020, which is a continuation-in-part of application No. 15/853,391, filed on Dec. 22, 2017, now Pat. No. 10,698,412.

(60) Provisional application No. 62/815,724, filed on Mar. 8, 2019, provisional application No. 62/596,737, filed on Dec. 8, 2017, provisional application No. 62/438,788, filed on Dec. 23, 2016.

(51) Int. Cl.

| | |
|---|---|
| ***G05D 1/00*** | (2006.01) |
| ***G01B 11/24*** | (2006.01) |
| ***G01B 17/06*** | (2006.01) |
| ***G01B 17/08*** | (2006.01) |
| ***B25J 19/00*** | (2006.01) |
| ***B25J 19/02*** | (2006.01) |
| ***B25J 5/00*** | (2006.01) |
| ***G05D 1/02*** | (2020.01) |
| ***B25J 9/10*** | (2006.01) |
| ***G01B 11/06*** | (2006.01) |
| ***G01B 11/30*** | (2006.01) |
| ***G01B 17/02*** | (2006.01) |
| ***G01J 3/50*** | (2006.01) |
| ***G01K 13/00*** | (2021.01) |
| ***B25J 13/08*** | (2006.01) |

(52) U.S. Cl.

CPC ............... *B25J 9/102* (2013.01); *B25J 9/162* (2013.01); *B25J 9/1602* (2013.01); *B25J 9/1617* (2013.01); *B25J 9/1633* (2013.01); *B25J 9/1664* (2013.01); *B25J 9/1666* (2013.01); *B25J 9/1679* (2013.01); *B25J 9/1697* (2013.01); *B25J 13/088* (2013.01); *B25J 19/0029* (2013.01); *B25J 19/02* (2013.01); *G01B 11/0616* (2013.01); *G01B 11/24* (2013.01); *G01B 11/303* (2013.01); *G01B 17/025* (2013.01); *G01B 17/06* (2013.01); *G01B 17/08* (2013.01); *G01J 3/50* (2013.01); *G01K 13/00* (2013.01); *G05D 1/0016* (2013.01); *G05D 1/0094* (2013.01); *G05D 1/0272* (2013.01); *G05D 1/0274* (2013.01); *G05D 2201/0207* (2013.01)

(58) Field of Classification Search

CPC ... G01N 2291/2634; G01N 2291/2636; G01N 2291/02854; G01N 2291/0258; G01N 2291/044; G01N 2291/0231; G01N 2291/0289; G01N 21/88; G01N 2291/011; G01N 2291/0237; G01N 2291/051; G01N 27/82; G01N 29/00; G01N 29/04; G01N 29/043; G01N 29/07; G01N 29/221; G01N 29/223; G01N 29/2468; G01N 29/326; G01N 29/46; B25J 5/007; B25J 9/08; B25J 19/02; B25J 19/026–027; B25J 9/1697; B25J 13/088; B25J 15/0019; B25J 19/0029; B25J 9/0009; B25J 9/0015; B25J 9/102; B25J 9/1602; B25J 9/1617; B25J 9/162; B25J 9/1633; B25J 9/1664; B25J 9/1666; B25J 9/1669; B25J 9/1679; G05B 2219/45066; G05B 15/02; G05B 19/00; B60B 19/006; G01B 17/02–025; G01B 11/0616; G01B 11/24; G01B 11/303; G01B 17/06; G01B 17/08; G01B 7/105; Y10S 901/01; Y10S 901/04; G01M 3/246; G01M 3/2823; G01M 3/04; G21C 17/002; G21C 17/003–013; G21C 17/017; G05D 1/0274; G05D 1/0088; G05D 1/0227; G05D 1/0246; G05D 1/027; G05D 1/0272; G05D 1/0268; G05D 1/0016; G05D 1/0038; G05D 1/0094; G05D 1/0278; G05D 2201/0207; G05D 3/125; F16L 2101/30; F16L 2101/12; F16L 2101/16; F16L 55/32; F16L 55/48; B08B 9/049; B60G 17/015; B60G 17/02; B60G 21/002; B60L 2260/32; B60L 3/10; B62D 57/00; B62D 57/02; B62D 57/024; F22B 37/003; G01C 21/20; G01D 11/30; G01J 3/50; G01K 13/00; Y02T 90/16

USPC ....... 73/622–623, 641, 633–634, 644, 865.8; 376/249

See application file for complete search history.

(56) References Cited

U.S. PATENT DOCUMENTS

| | | | | |
|---|---|---|---|---|
| 2,861,700 | A | | 11/1958 | James |
| 3,028,753 | A | | 4/1962 | Joy |
| 3,055,210 | A | | 9/1962 | Joy |
| 3,279,242 | A | | 10/1966 | Megoloff |
| 3,326,037 | A | | 6/1967 | John |
| 3,420,097 | A | | 1/1969 | Batterman et al. |
| 3,427,866 | A | | 2/1969 | Weighart |
| 3,437,786 | A | | 4/1969 | Colinet et al. |
| 3,483,734 | A | | 12/1969 | Wood |
| 3,486,368 | A | | 12/1969 | Brech |
| 3,690,393 | A | | 9/1972 | Guy |
| 3,741,003 | A | * | 6/1973 | Gunkel .................. G01N 29/07 73/637 |
| 3,789,700 | A | | 2/1974 | Cotreau et al. |
| 3,837,202 | A | | 9/1974 | Hetherington et al. |
| 3,952,581 | A | | 4/1976 | Gottelt |
| 4,027,528 | A | | 6/1977 | Tyree |
| 4,033,178 | A | | 7/1977 | Holt et al. |
| 4,043,185 | A | | 8/1977 | Siebert |
| 4,055,990 | A | | 11/1977 | Topping |
| 4,105,972 | A | | 8/1978 | Smith |
| 4,304,134 | A | | 12/1981 | Rouse et al. |
| 4,368,644 | A | | 1/1983 | Wentzell et al. |
| 4,391,134 | A | | 7/1983 | Theurer et al. |
| 4,437,332 | A | | 3/1984 | Pittaro |
| 4,495,587 | A | | 1/1985 | Plante et al. |
| 4,526,037 | A | | 7/1985 | Wentzell et al. |
| 4,537,136 | A | | 8/1985 | Douglas |
| 4,567,514 | A | | 1/1986 | Morgan et al. |
| 4,596,144 | A | | 6/1986 | Panton et al. |
| 4,654,702 | A | | 3/1987 | Tolino et al. |
| 4,706,120 | A | | 11/1987 | Slaughter et al. |
| 4,757,258 | A | | 7/1988 | Kelly et al. |
| 4,840,090 | A | | 6/1989 | Iwata |
| 4,862,748 | A | | 9/1989 | Woodmansee |
| 4,879,973 | A | | 11/1989 | Maeyama et al. |
| 4,881,405 | A | | 11/1989 | Paquet |
| 4,893,286 | A | | 1/1990 | Cobb |
| 4,964,059 | A | | 10/1990 | Sugaya et al. |

(56) References Cited

U.S. PATENT DOCUMENTS

| | | | |
|---|---|---|---|
| 5,006,799 | A | 4/1991 | Pfanstiehl |
| 5,007,291 | A | 4/1991 | Walters et al. |
| 5,038,615 | A | 8/1991 | Trulson et al. |
| 5,062,298 | A | 11/1991 | Falcoff et al. |
| 5,097,710 | A | 3/1992 | Palynchuk |
| 5,269,202 | A | 12/1993 | Kiyosawa et al. |
| 5,271,274 | A | 12/1993 | Khuri-Yakub et al. |
| 5,285,689 | A | 2/1994 | Hapstack et al. |
| 5,426,980 | A | 6/1995 | Smith |
| 5,429,009 | A | 7/1995 | Wolfe et al. |
| 5,440,929 | A | 8/1995 | Huang et al. |
| 5,549,004 | A | 8/1996 | Nugent |
| 5,559,696 | A | 9/1996 | Borenstein |
| 5,619,423 | A | 4/1997 | Scrantz |
| 5,635,644 | A | 6/1997 | Ishikawa et al. |
| 5,663,502 | A | 9/1997 | Nagashima et al. |
| 5,764,014 | A | 6/1998 | Jakeway et al. |
| 5,782,253 | A | 7/1998 | Cates et al. |
| 5,809,099 | A | 9/1998 | Kim et al. |
| 5,853,655 | A | 12/1998 | Baker |
| 5,929,338 | A | 7/1999 | Frankel et al. |
| 5,948,985 | A | 9/1999 | Brautigan et al. |
| 6,000,484 | A | 12/1999 | Zoretich et al. |
| 6,064,428 | A | 5/2000 | Trosino et al. |
| 6,076,407 | A | 6/2000 | Levesque et al. |
| 6,104,970 | A | 8/2000 | Schmidt et al. |
| 6,125,955 | A | 10/2000 | Zoretich et al. |
| 6,150,809 | A | 11/2000 | Tiernan et al. |
| 6,220,099 | B1 | 4/2001 | Marti et al. |
| 6,234,025 | B1 | 5/2001 | Gieske et al. |
| 6,243,657 | B1 | 6/2001 | Tuck et al. |
| 6,273,521 | B1 | 8/2001 | Halvorson et al. |
| 6,298,727 | B1 | 10/2001 | Fleming et al. |
| 6,317,387 | B1 | 11/2001 | D'Amaddio et al. |
| 6,454,036 | B1 | 9/2002 | Airey et al. |
| 6,931,931 | B2 | 8/2005 | Graff et al. |
| 6,981,417 | B1 | 1/2006 | Oravecz |
| 7,743,660 | B2 | 6/2010 | Marsh et al. |
| 7,859,655 | B2 | 12/2010 | Troy et al. |
| 9,121,817 | B1 | 9/2015 | Roach et al. |
| 9,221,506 | B1 | 12/2015 | Georgeson et al. |
| 9,335,305 | B2 | 5/2016 | Smith et al. |
| 9,586,636 | B1 | 3/2017 | Burmeister et al. |
| 9,784,599 | B1 | 10/2017 | Close et al. |
| 9,796,089 | B2 | 10/2017 | Lawrence et al. |
| 9,863,891 | B1 | 1/2018 | Lara Magallanes et al. |
| 9,863,919 | B2 | 1/2018 | Carrasco Zanini et al. |
| 9,963,836 | B1 | 5/2018 | Brenner et al. |
| 10,481,608 | B2 | 11/2019 | Loosararian et al. |
| 10,534,365 | B2 | 1/2020 | Loosararian et al. |
| 10,689,113 | B2 | 6/2020 | Prager et al. |
| 10,698,412 | B2 | 6/2020 | Loosararian et al. |
| 10,739,779 | B2 | 8/2020 | Loosararian et al. |
| 10,795,373 | B2 | 10/2020 | Loosararian et al. |
| 10,884,423 | B2 | 1/2021 | Loosararian et al. |
| 10,895,878 | B2 | 1/2021 | Loosararian et al. |
| 10,942,522 | B2 | 3/2021 | Loosararian et al. |
| 11,135,721 | B2 | 10/2021 | Bryner et al. |
| 11,144,063 | B2 | 10/2021 | Loosararian et al. |
| 11,148,292 | B2 | 10/2021 | Bryner et al. |
| 11,157,012 | B2 | 10/2021 | Loosararian et al. |
| 11,157,013 | B2 | 10/2021 | Loosararian et al. |
| 11,307,063 | B2 | 4/2022 | Low et al. |
| 2002/0134159 | A1 | 9/2002 | He |
| 2002/0143421 | A1 | 10/2002 | Wetzer |
| 2002/0168532 | A1 | 11/2002 | Sinsel et al. |
| 2003/0060930 | A1 | 3/2003 | Fujita et al. |
| 2003/0089267 | A1 | 5/2003 | Ghorbel et al. |
| 2003/0172735 | A1 | 9/2003 | Lam et al. |
| 2003/0188589 | A1 | 10/2003 | Harthorn et al. |
| 2004/0050165 | A1 | 3/2004 | He |
| 2004/0173116 | A1 | 9/2004 | Ghorbel et al. |
| 2004/0177681 | A1 | 9/2004 | Harthorn et al. |
| 2004/0207394 | A1 | 10/2004 | Harthorn et al. |
| 2005/0056105 | A1 | 3/2005 | Delacroix et al. |
| 2005/0150300 | A1 | 7/2005 | Nenno et al. |
| 2005/0174086 | A1 | 8/2005 | Iwashita et al. |
| 2005/0183506 | A1 | 8/2005 | Kawabata |
| 2005/0252296 | A1 | 11/2005 | Hock et al. |
| 2006/0027952 | A1 | 2/2006 | Meissner et al. |
| 2006/0037430 | A1 | 2/2006 | Kiyosawa et al. |
| 2006/0055399 | A1 | 3/2006 | Georgeson et al. |
| 2006/0162610 | A1 | 7/2006 | Reboredo et al. |
| 2006/0243051 | A1 | 11/2006 | Bui et al. |
| 2007/0006657 | A1 | 1/2007 | Kennedy et al. |
| 2007/0006658 | A1 | 1/2007 | Kennedy et al. |
| 2007/0044562 | A1 | 3/2007 | Sarr |
| 2007/0044564 | A1 | 3/2007 | Bui et al. |
| 2007/0146480 | A1 | 6/2007 | Judge et al. |
| 2007/0195712 | A1 | 8/2007 | Thayer et al. |
| 2007/0217672 | A1 | 9/2007 | Shannon et al. |
| 2007/0227250 | A1 | 10/2007 | Kennedy et al. |
| 2007/0278851 | A1 | 12/2007 | Nakamura et al. |
| 2008/0039974 | A1 | 2/2008 | Sandin et al. |
| 2008/0059114 | A1 | 3/2008 | Coperet |
| 2008/0079723 | A1 | 4/2008 | Hanson et al. |
| 2008/0087112 | A1 | 4/2008 | Bagley et al. |
| 2008/0087113 | A1 | 4/2008 | Bagley et al. |
| 2008/0148876 | A1 | 6/2008 | Hock et al. |
| 2008/0202245 | A1 | 8/2008 | Young |
| 2008/0230289 | A1 | 9/2008 | Schoon et al. |
| 2008/0302200 | A1 | 12/2008 | Tobey |
| 2009/0078484 | A1 | 3/2009 | Kocijan |
| 2009/0114025 | A1 | 5/2009 | Sato et al. |
| 2009/0287450 | A1 | 11/2009 | Dubois et al. |
| 2009/0301203 | A1 | 12/2009 | Brussieux |
| 2010/0011522 | A1 | 1/2010 | Kim et al. |
| 2010/0060273 | A1 | 3/2010 | Couchman |
| 2010/0126403 | A1 | 5/2010 | Rooney et al. |
| 2010/0212983 | A1 | 8/2010 | Lama |
| 2010/0224001 | A1 | 9/2010 | Brignac |
| 2010/0263948 | A1 | 10/2010 | Couture et al. |
| 2011/0030478 | A1 | 2/2011 | Park et al. |
| 2011/0130238 | A1 | 6/2011 | Schoon |
| 2011/0167914 | A1 | 7/2011 | Sutherland |
| 2011/0169938 | A1 | 7/2011 | Webster et al. |
| 2011/0178727 | A1 | 7/2011 | Hafenrichter et al. |
| 2011/0253470 | A1 | 10/2011 | Fischer |
| 2012/0186874 | A1 | 7/2012 | Malone et al. |
| 2012/0215348 | A1 | 8/2012 | Skrinde |
| 2012/0215355 | A1 | 8/2012 | Bewley et al. |
| 2012/0218868 | A1 | 8/2012 | Kahn et al. |
| 2012/0238389 | A1 | 9/2012 | Schoon |
| 2012/0257042 | A1 | 10/2012 | McKaigue et al. |
| 2012/0273284 | A1 | 11/2012 | Nesnas et al. |
| 2013/0024067 | A1 | 1/2013 | Troy et al. |
| 2013/0070068 | A1 | 3/2013 | Garvey et al. |
| 2013/0140801 | A1 | 6/2013 | Schlee et al. |
| 2013/0142297 | A1 | 6/2013 | Dean et al. |
| 2013/0166193 | A1 | 6/2013 | Goldman et al. |
| 2013/0317676 | A1 | 11/2013 | Cooper et al. |
| 2014/0076642 | A1 | 3/2014 | Gettings et al. |
| 2014/0115860 | A1 | 5/2014 | Sarh et al. |
| 2014/0230711 | A1 | 8/2014 | Lovelace et al. |
| 2014/0268176 | A1 | 9/2014 | Hundstad et al. |
| 2014/0278221 | A1 | 9/2014 | Froy et al. |
| 2014/0305216 | A1 | 10/2014 | Hafenrichter et al. |
| 2014/0350722 | A1 | 11/2014 | Skrinde |
| 2015/0046018 | A1 | 2/2015 | Hayashi et al. |
| 2015/0151572 | A1 | 6/2015 | Parrott et al. |
| 2015/0151797 | A1 | 6/2015 | Outa et al. |
| 2015/0153170 | A1 | 6/2015 | Sonzalf7 et al. |
| 2015/0153312 | A1 | 6/2015 | Gonzalez et al. |
| 2015/0177194 | A1* | 6/2015 | Xu ........................ B25J 9/1669 73/641 |
| 2015/0226369 | A1 | 8/2015 | Troy et al. |
| 2015/0316195 | A1 | 11/2015 | Penza et al. |
| 2015/0329221 | A1 | 11/2015 | Georgeson et al. |
| 2015/0369916 | A1 | 12/2015 | Nikolov et al. |
| 2016/0023696 | A1 | 1/2016 | Hakes et al. |
| 2016/0033453 | A1 | 2/2016 | Cegla et al. |
| 2016/0059939 | A1 | 3/2016 | Lamonby et al. |
| 2016/0121486 | A1 | 5/2016 | Lipinski et al. |
| 2016/0123933 | A1 | 5/2016 | Fetzer et al. |

(56) References Cited

U.S. PATENT DOCUMENTS

| | | | |
|---|---|---|---|
| 2016/0176452 | A1 | 6/2016 | Gettings et al. |
| 2016/0231279 | A1 | 8/2016 | Hoyt |
| 2016/0238565 | A1 | 8/2016 | Gonzalez et al. |
| 2016/0273992 | A1 | 9/2016 | Frueh |
| 2016/0281910 | A1 | 9/2016 | Troy et al. |
| 2016/0282877 | A1 | 9/2016 | Gonzalez et al. |
| 2016/0318182 | A1 | 11/2016 | Nakaya et al. |
| 2016/0334301 | A1 | 11/2016 | Hafenrichter et al. |
| 2016/0349213 | A1 | 12/2016 | Kollgaard et al. |
| 2017/0108156 | A1 | 4/2017 | Penza et al. |
| 2017/0191966 | A1 | 7/2017 | Niri et al. |
| 2017/0221454 | A1 | 8/2017 | Kim et al. |
| 2017/0305261 | A1 | 10/2017 | Meager |
| 2017/0321790 | A1 | 11/2017 | Klassen et al. |
| 2017/0347624 | A1 | 12/2017 | Jorgensen et al. |
| 2018/0024561 | A1 | 1/2018 | Soh et al. |
| 2018/0073975 | A1 | 3/2018 | Abdellatif et al. |
| 2018/0117718 | A1 | 5/2018 | Rajagopalan et al. |
| 2018/0154954 | A1 | 6/2018 | Bagheri et al. |
| 2018/0181136 | A1 | 6/2018 | Loosararian et al. |
| 2018/0245923 | A1 | 8/2018 | Han |
| 2018/0267554 | A1 | 9/2018 | Loosararian et al. |
| 2018/0275670 | A1 | 9/2018 | Loosararian et al. |
| 2018/0275671 | A1 | 9/2018 | Loosararian et al. |
| 2018/0275672 | A1 | 9/2018 | Loosararian et al. |
| 2018/0275673 | A1 | 9/2018 | Loosararian et al. |
| 2018/0275674 | A1 | 9/2018 | Loosararian et al. |
| 2018/0275675 | A1 | 9/2018 | Loosararian et al. |
| 2018/0284794 | A1 | 10/2018 | Loosararian et al. |
| 2018/0284795 | A1 | 10/2018 | Loosararian et al. |
| 2018/0284796 | A1 | 10/2018 | Loosararian et al. |
| 2018/0284797 | A1 | 10/2018 | Loosararian et al. |
| 2018/0292838 | A1 | 10/2018 | Loosararian et al. |
| 2019/0015971 | A1 | 1/2019 | Carrasco Zanini et al. |
| 2019/0017656 | A1 | 1/2019 | Carrasco Zanini et al. |
| 2019/0046373 | A1 | 2/2019 | Coulter et al. |
| 2019/0086020 | A1 | 3/2019 | Wehlin et al. |
| 2019/0118881 | A1 | 4/2019 | McGinn |
| 2019/0152544 | A1 | 5/2019 | Outa |
| 2019/0242728 | A1 | 8/2019 | Low et al. |
| 2019/0360976 | A1 | 11/2019 | Frueh et al. |
| 2019/0368594 | A1 | 12/2019 | Sakata |
| 2020/0011840 | A1 | 1/2020 | Hafenrichter et al. |
| 2020/0133285 | A1 | 4/2020 | Xiong et al. |
| 2020/0159237 | A1 | 5/2020 | Loosararian et al. |
| 2020/0254615 | A1 | 8/2020 | Bryner et al. |
| 2020/0262052 | A1 | 8/2020 | Bryner et al. |
| 2020/0262066 | A1 | 8/2020 | Bryner et al. |
| 2020/0262067 | A1 | 8/2020 | Bryner et al. |
| 2020/0262072 | A1 | 8/2020 | Bryner et al. |
| 2020/0262077 | A1 | 8/2020 | Bryner et al. |
| 2020/0262261 | A1 | 8/2020 | Loosararian et al. |
| 2020/0264614 | A1 | 8/2020 | Bryner et al. |
| 2020/0264615 | A1 | 8/2020 | Bryner et al. |
| 2020/0310456 | A1 | 10/2020 | Loosararian et al. |
| 2021/0060782 | A1 | 3/2021 | Bryner et al. |
| 2021/0060783 | A1 | 3/2021 | Bryner et al. |
| 2022/0011777 | A1 | 1/2022 | Loosararian et al. |

FOREIGN PATENT DOCUMENTS

| | | | |
|---|---|---|---|
| CN | 105150834 | A | 12/2015 |
| CN | 205503912 | U | 8/2016 |
| CN | 110300889 | A | 10/2019 |
| CN | 113319839 | A | 8/2021 |
| DE | 009206011 | U1 | 7/1992 |
| DE | 10300383 | A1 | 7/2004 |
| DE | 102016117237 | A1 | 3/2018 |
| EP | 3559654 | A1 | 10/2019 |
| FR | 2861457 | A1 | 4/2005 |
| FR | 2970199 | A1 | 7/2012 |
| GB | 548910 | A | 10/1942 |
| JP | 6018640 | A | 1/1985 |
| JP | 61090052 | | 5/1986 |
| JP | 61144503 | A | 7/1986 |
| JP | 11211707 | | 8/1999 |
| KR | 200438708 | Y1 | 2/2008 |
| KR | 20100078898 | A | 7/2010 |
| KR | 20140040692 | A | 4/2014 |
| WO | 03087733 | A2 | 10/2003 |
| WO | 2006114485 | A1 | 11/2006 |
| WO | 2007082594 | A2 | 7/2007 |
| WO | 2015059916 | A1 | 4/2015 |
| WO | 2016051147 | A1 | 4/2016 |
| WO | 2018119450 | A1 | 6/2018 |
| WO | 2019204504 | A1 | 10/2019 |
| WO | 2020185719 | A2 | 9/2020 |
| WO | 2020185719 | A3 | 10/2020 |

OTHER PUBLICATIONS

U.S. Appl. No. 17/097,448, filed Nov. 13, 2020, Pending.

PCT/US20/21779, "International Application Serial No. PCT/US20/21779, International Search Report and Written Opinion dated Sep. 2, 2020", Gecko Robotics, Inc., 14 pages.

PCT/US2019/027958, "International Application Serial No. PCT/US2019/027958, International Preliminary Report on Patentability dated Oct. 29, 2020", Gecko Robotics, Inc., 8 pages.

Guglielmelli, E. , et al., "Avoiding obstacles by using a proximity US/IR sensitive skin", IEEE, 1993, pp. 2207-2214.

Lins, Romulo Goncalves, et al., "Autonomous Robot System for Inspection of Defects in Civil Infrastructures", IEEE, 2016, pp. 1414-1422.

Martinez, Angelo , et al., "Fuzzy logic based collision avoidance for a mobile robot", IEEE, 1993, pp. 66-69.

Yasuda, Gen'ichi, "Behavior-based autonomous cooperative control of intelligent mobile robot systems with embedded Petri nets", IEEE, 2014, pp. 1085-1090.

"All Metals Fabrication", Painting Metal, Aug. 27, 2015.

"Coordinate Systems in Two and Three Dimensions", Oregon State University, Department of Mathematics, 2015, 3 pages.

"Horizontal definition", Merrian-Webster Dictionary, 2014, 1 page.

"International Federation of Robotics,", World Robotics, Chapter 1 section 2, 2016, 10 pages.

"Merriam-Webster", Definition of Pivot, 2015, 5 pages.

"Vertical Definition", Merriam Webster, 2014, 1 page.

"Yaskawa Motoman Robotics,", Robotics Glossary, 2019, 20 pages.

17884897.4, "European Application Serial No. 17884897.4, Extended European Search Report dated Jun. 25, 2020", Gecko Robotics, Inc., 5 pages.

Bell, "Measurement Good Practice Guide A Beginner's Guide to Uncertainty of Measurement", National Physical Laboratory, Issue 2, 2001, 41 pages.

Berendsen, "Ship Painting: Current Practice and Systems in Europe", Technology Publishing Company, Sep. 1998, 10.

Carlsten, "Understanding Corrosion and How to Protect Against It", manufacturing.net, Mar. 11, 2002, 8.

Curran, "Make the right choice for metal coating for the right application", Design World, Jun. 2, 2016, 18.

Fowler, et al., "Theory and Application of Precious Ultrasonic Thickness Gaging", 2015, 12 pages.

General Electric, "BWCI Automated Boiler Wall Cleaning & Inspection", inspection-robotics.com, 2016, 4.

Ginzel, et al., "Acoustic Properties of the Elastomeric Materials Aqualene and ACE", The e-Journal of Nondestructive Testing—ISSN 1435-4934, Dec. 2015, 13.

Harrison, "Uncertainty in Physical Measurements", Module 4—Repeated Measurements, Dept. of Physics, Univ. of Toronto, 2015, 18 pages.

Lebowitz, et al., "Ultrasonic Measurement of Pipe Thickness", Review of Progress in Quantitative Nondestructive Evalualtion, vol. 12, 1987, 8 pages.

Lion Precision, "Understanding Sensor Resolution Specifications and Performance", TechNote, LT05-0010, 2014, pp. 1-6.

Miskon, et al., "Close Range Inspection Using Novelty Detection Results", Intelligent Robotic Research Center (IRRC), Monash University, Australia, 2009, pp. 947-956.

(56) References Cited

OTHER PUBLICATIONS

NDT Resource Center, "NDT Glossary D", Webpage, 2016, 4 pages.
NDT Resource Center, "NDT Glossary R", Webpage, 2016, 5 pages.
NDT Resource Center, "Transducer Types", Webpage, 2005, 1.
Olympus, "BondMaster Probes and Accessories Catalog", Catalog, 2008, 24.
Olympus, "Flaw Detectors Delay Line", Olympus, Flaw Detectors Delay Line, 2014, Jan. 9, 2014, 1.
Olympus, "Ultrasonic Transducers Technical Notes", Notes, 2006.
Openstax College, "College Physics Textbook Equity Edition", vol. 1 of 3: Chapters 1 -12, Chapter 9 p. 294, 464 pages.
PCT/US17/68326, "International Application Serial No. PCT/US17/68326, International Preliminary Report on Patentability dated Jul. 4, 2019", Gecko Robotics, Inc., 11 pages.
Zaho, et al., "Estimation of ultrasound attenuation and dispersion using short time Fourier transform,", Ultrasonics 43 (2005) 375-381, 2005, pp. 375-381.
PCT/US20/21779, "International Application Serial No. PCT/US20/21779, Invitation to Pay Additional Fees and, Where Applicable, Protest Fee mailed Jul. 9, 2020", Gecko Robotics, Inc., 2 pages.
PCT/US2017/068326, "International Application Serial No. PCT/US2017/068326, International Search Report and Written Opinion dated May 4, 2018", Gecko Robotics, Inc., 14 pages.
PCT/US2017068326, "International Application Serial No. PCT/US2017068326, Invitation to Pay Additional Fees and, Where Applicable, Protest Fee mailed Feb. 27, 2018", Gecko Robotics, Inc., 2 Pages.
PCT/US2019/027958, "International Application Serial No. PCT/US2019/027958, International Search Report and Written Opinion dated Jul. 16, 2019", Gecko Robotics, Inc., 9 pages.
Reinhold, "Machine Translation DE 10300383", 2019, 4 pages.
Sabatini, et al., "Correlation Techniques for Digital Time-of-Flight Measurement by Airborne Ultrasonic Rangefinders", Published in: Proceedings of IEEE/RSJ International Conference on Intelligent Robots and Systems (IROS'94), 1994, pp. 2168-2175.
Salik, et al., "Pipe Inspections: Robotic Laser Profiling Demystified", National Precast Concrete Association, Apr. 1, 2013, 12 pages.
Schroeder, et al., "Ultrasonic Culvert Thickness Determination", US Army Armament Research Development and Engineering, Technical Report ARCCB-TR-95027, 1995, 36 pages.
Smith, et al., "Machine Translation KR20140040692A", 18 pages.
Svilainis, "Review of high resolution time of flight estimation techniques for ultrasonic signals,", Sep. 2013Conference: NDT 2013At: Telford Project: In-SMART, 2013, 13 pages.
Wisegeek, "What is an Articulated Robot?", Webpage, 2015, 4 pages.
21201397.3 , "European Application Serial No. 21201397.3, Extended European Search Report dated May 11, 2022", Gecko Robotics, Inc., 12 pages.
AMS Controls , "Encoder Tracking and Mounting", 2015, 18 pages.
Cai, Mingxue , et al., "A Novel Pipeline Inspection Robot with Two Angle-changeable Crawler Drive Modules", Proceedings of 2018 IEEE 8th Annual International Conference on CYBER Technology in Automation, Control, and Intelligent Systems, Jul. 2018, 6 pages.
Connor, David , et al., "Improved dead reckoning using caster wheel sensing on a differentially steered 3-wheeled autonomous vehicle", Proceedings vol. 4195, Mobile Robots XV and Telemanipulator and Telepresence Technologies VII, 2001, 13 pages.
Felsch, Torsten , et al., "Robotized Inspection of Vertical Structures of a Solar Power Plant Using NDT Techniques", doi:10.3390/robotics4020103, 2015, pp. 103-119.
Few, Stephen , "Practical Rules for Using Color in Charts", Perceptual Edge, Visual Business Intelligence Newsletter, Feb. 2008, 13 pages.
Hutter, Marco , et al., "Force Control for Active Chassis Balancing", IEEE/ASME Transactions on Mechatronics, vol. 22, No. 2, Apr. 2017, 10 pages.
Lee, Giuk, et al., "Combot: Compliant Climbing Robotic Platform with Transitioning Capability and Payload Capacity", IEEE International Conference on Robotics and Automation RiverCentre, Saint Paul, Minnesota,, 2012, 6 pages.
Myers, Brad A., "The importance of percent-done progress indicators for computer-human interfaces", Proceedings of the SIGCHI conference on Human factors in computing systems., 1985, 11-17.
National Geographic , "Encyclopedic Entry Location", 2016, 3 pages.
Nidec , "Flexwave Catalog", 2018, 52 pages.
Parallax Tutorial , "Going the Distance—Using the Drive Distance Block Encoders and Motor Gearing", 2017, 5 pages.
PCT/US20/21779 , "International Application Serial No. PCT/US20/21779, International Preliminary Report on Patentability dated Sep. 23, 2021", Gecko Robotics, Inc., 13 pages.
Sirken, Aaron , et al., "Bridge Risk Investigation Diagnostic Grouped Exploratory (BRIDGE)", IEEE/RSJ International Conference on Intelligent Robots and Systems (IROS), 2017, 7 pages.
Stepson, W.A.V , et al., "Design and Development of a Mobile Crawling Robot with Novel Halbach Array Based Magnetic Wheels", IEEE/ RSJ International Conference on Intelligent Robots and Systems (IROS), Sep. 2017, 6 pages.
Tufte, Edward R., "The Visual Display of Quantitative Information", Published by Graphics Press LLC, Second edition, fifth printing, Aug. 2007, 191 pages.
Ueura, Keiji, et al., "Development of the Harmonic Drive Gear for Space Applications", 1999, 6 pages.
Zhang, Lei , et al., "Analysis of Traveling-capability and Obstacle-climbing Capability for Radially Adjustable Tracked Pipeline Robot", Proceedings of the 2016 IEEE International Conference on Robotics and Biomimetics Gingdao, China, Dec. 2016, 6 pages.
Zhang, Lei, et al., "Stable Motion Analysis and Verification of a Radial Adjustable Pipeline Robot", Proceedings of the 2016 IEEE International Conference on Robotics and Biomimetics Qingdao, China, Dec. 2016, 6 pages.
U.S. Appl. No. 17/694,897, filed Mar 15, 2022, Pending.
U.S. Appl. No. 17/726,336, filed Apr 21, 2022, Pending.
U.S. Appl. No. 17/752,955, filed May 25, 2022, Pending.
U.S. Appl. No. 17/824,656, filed May 25, 2022, Pending.
U.S. Appl. No. 17/824,253, filed May 25, 2022, Pending.
U.S. Appl. No. 17/824,261, filed May 25, 2022, Pending.
U.S. Appl. No. 17/824,548, filed May 25, 2022, Pending.
U.S. Appl. No. 17/824,534, filed May 25, 2022, Pending.
PCT/US2022/025816, Apr 21, 2022, Pending.
U.S. Appl. No. 17/716,249, filed Apr 8, 2022, Pending.
U.S. Appl. No. 17/741,508, filed May 11, 2022, Pending.
U.S. Appl. No. 17/727,217, filed Apr 22, 2022, Pending.
U.S. Appl. No. 17/727,294, filed Apr 22, 2022, Pending.
U.S. Appl. No. 17/729,037, filed Apr 26, 2022, Pending.
U.S. Appl. No. 17/729,051, filed Apr 26, 2022, Pending.
U.S. Appl. No. 17/729,070, filed Apr 26, 2022, Pending.
U.S. Appl. No. 17/731,797, filed Apr 28, 2022, Pending.
U.S. Appl. No. 17/740,475, filed May 10, 2022, Pending.
U.S. Appl. No. 17/752,059, filed May 24, 2022, Pending.
U.S. Appl. No. 17/741,519, filed May 11, 2022, Pending.
U.S. Appl. No. 17/740,561, filed May 10, 2022, Pending.
U.S. Appl. No. 17/752,453, filed May 24, 2022, Pending.
U.S. Appl. No. 17/740,572, filed May 10, 2022, Pending.
U.S. Appl. No. 17/740,579, filed May 10, 2022, Pending.
U.S. Appl. No. 17/752,177, filed May 24, 2022, Pending.
PCT/US2022/023993, Apr 8, 2022, Pending.

* cited by examiner

Figure 99:
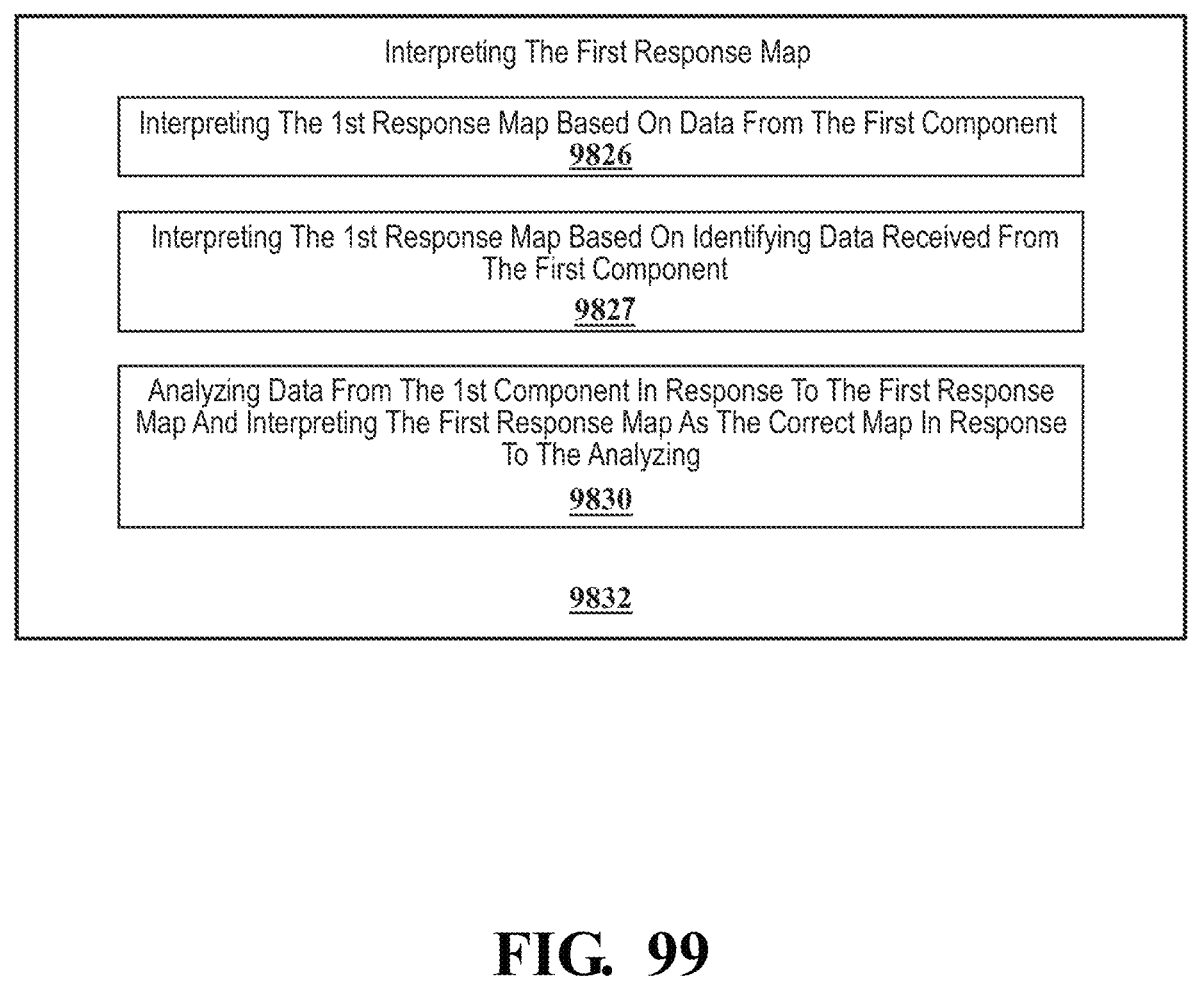

Interpreting The First Response Map

Interpreting The 1st Response Map Based On Data From The First Component
9826

Interpreting The 1st Response Map Based On Identifying Data Received From The First Component
9827

Analyzing Data From The 1st Component In Response To The First Response Map And Interpreting The First Response Map As The Correct Map In Response To The Analyzing
9830

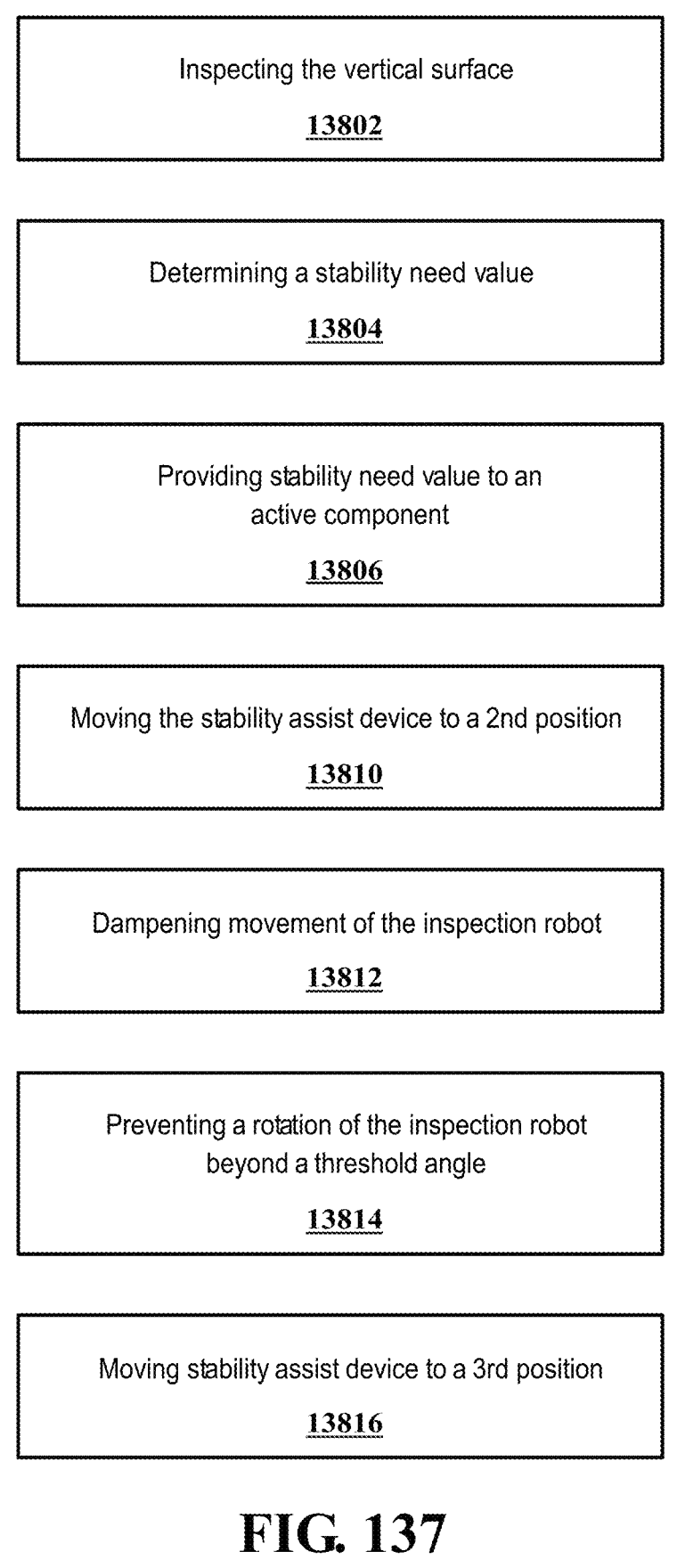

Inspecting the vertical surface
13802

Determining a stability need value
13804

Providing stability need value to an active component
13806

Moving the stability assist device to a 2nd position
13810

Dampening movement of the inspection robot
13812

Preventing a rotation of the inspection robot beyond a threshold angle
13814

Moving stability assist device to a 3rd position
13816

FIG. 137

SYSTEM AND METHOD FOR TRAVERSING AN OBSTACLE WITH AN INSPECTION ROBOT

CROSS-REFERENCE TO RELATED APPLICATIONS

This application is a continuation of U.S. patent application Ser. No. 16/863,594, filed Apr. 30, 2020, entitled "SYSTEM, METHOD AND APPARATUS FOR RAPID DEVELOPMENT OF AN INSPECTION SCHEME FOR AN INSPECTION ROBOT."

U.S. patent application Ser. No. 16/863,594 is a continuation of PCT Patent Application Serial No. PCT/US20/21779, filed Mar. 9, 2020, entitled "INSPECTION ROBOT."

PCT Patent Application Serial No. PCT/US20/21779, is a continuation-in-part of U.S. patent application Ser. No. 15/853,391, filed Dec. 22, 2017, entitled "INSPECTION ROBOT WITH COUPLANT CHAMBER DISPOSED WITHIN SLED FOR ACOUSTIC COUPLING."

U.S. patent application Ser. No. 15/853,391 claims the benefit of priority to the following U.S. Provisional Patent Applications: Ser. No. 62/438,788, filed Dec. 23, 2016, entitled "STRUCTURE TRAVERSING ROBOT WITH INSPECTION FUNCTIONALITY"; and Ser. No. 62/596,737, filed Dec. 8, 2017, entitled "METHOD AND APPARATUS TO INSPECT A SURFACE UTILIZING REAL-TIME POSITION INFORMATION".

PCT Patent Application Serial No. PCT/US20/21779, claims the benefit of priority to the following U.S. Provisional Patent Application Ser. No. 62/815,724, filed Mar. 8, 2019, entitled "INSPECTION ROBOT."

Each of the foregoing applications is incorporated herein by reference in its entirety.

BACKGROUND

The present disclosure relates to robotic inspection and treatment of industrial surfaces.

SUMMARY

Previously known inspection and treatment systems for industrial surfaces suffer from a number of drawbacks. Industrial surfaces are often required to be inspected to determine whether a pipe wall, tank surface, or other industrial surface feature has suffered from corrosion, degradation, loss of a coating, damage, wall thinning or wear, or other undesirable aspects. Industrial surfaces are often present within a hazardous location—for example in an environment with heavy operating equipment, operating at high temperatures, in a confined environment, at a high elevation, in the presence of high voltage electricity, in the presence of toxic or noxious gases, in the presence of corrosive liquids, and/or in the presence of operating equipment that is dangerous to personnel. Accordingly, presently known systems require that a system be shutdown, that a system be operated at a reduced capacity, that stringent safety procedures be followed (e.g., lockout/tagout, confined space entry procedures, harnessing, etc.), and/or that personnel are exposed to hazards even if proper procedures are followed. Additionally, the inconvenience, hazards, and/or confined spaces of personnel entry into inspection areas can result in inspections that are incomplete, of low resolution, that lack systematic coverage of the inspected area, and/or that are prone to human error and judgement in determining whether an area has been properly inspected.

Embodiments of the present disclosure provide for systems and methods of inspecting an inspecting an inspection surface with an improved inspection robot. Example embodiments include modular drive assemblies that are selectively coupled to a chassis of the inspection robot, wherein each drive assembly may have distinct wheels suited to different types of inspection surfaces. Other embodiments include payloads selectively couplable to the inspection robot chassis via universal connectors that provide for the exchange of couplant, electrical power and/or data communications. The payload may each have different sensor configurations suited for interrogating different types of inspection surfaces.

Embodiments of the present disclosure may provide for improved customer responsiveness by generating interactive inspection maps that depict past, present and/or predicted inspection data of an inspection surface. In embodiments, the inspection maps may be transmitted and displayed on user electronic devices and may provide for control of the inspection robot during an inspection run.

Embodiments of the present disclosure may provide for an inspection robot with improved environmental capabilities. For example, some embodiments have features for operating in hostile environments, e.g., high temperature environments. Such embodiments may include low operational impact capable cooling systems.

Embodiments of the present disclosure may provide for an inspection robot having an improved, e.g., reduced, footprint which may further provide for increased climbing of inclined and/or vertical inspection surfaces. The reduced footprint of certain embodiments may also provide for inspection robots having improve the horizontal range due to reduced weight.

BRIEF DESCRIPTION OF THE FIGURES

FIGS. 97-99 depict a method of operating an inspection robot.

FIG. 113 is a schematic diagram of an output couplant interface for a system for managing couplant for an inspection robot.

FIG. 114 is a schematic diagram of an acoustic sensor for a system for managing couplant for an inspection robot.

FIG. 115 is a flow chart depicting a method for managing couplant for an inspection robot.

FIG. 116 depicts a method for coupling drive assemblies to an inspection robot.

FIG. 117 depicts a method for coupling drive assemblies to an inspection robot.

FIG. 118 depicts a method of releasably coupling an electrical interface and a mechanical interface of a modular drive assembly.

FIG. 119 is an example embodiment of a drive module connection for an inspection robot.

FIG. 120 is an exploded view of an example drive module.

FIG. 121 is a schematic cutaway view of an example drive module connection cross-sectional profile.

FIG. 122 depicts an example inspection robot.

Figure 123:
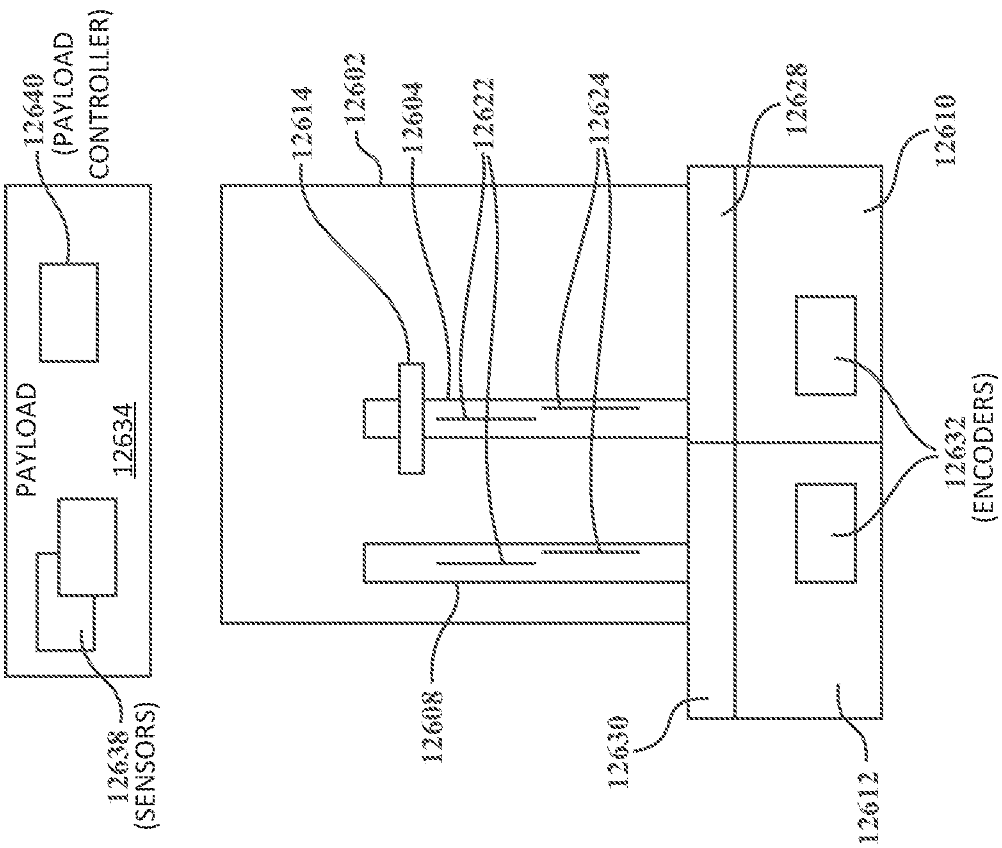

FIG. 123 an example system with a drive piston couplable to a drive module.

Figure 124:
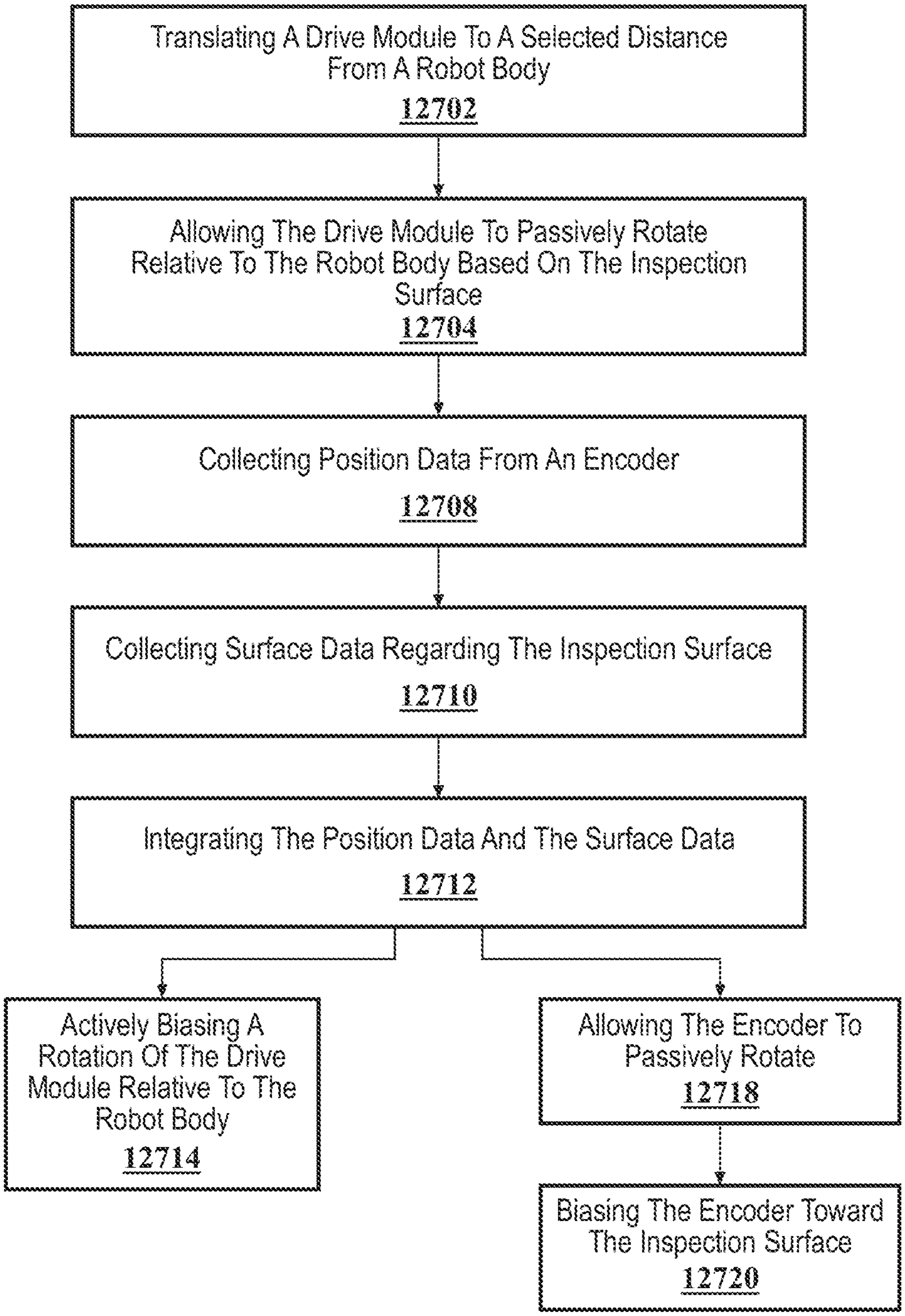

FIG. 124 depicts an example procedure for operating a robot having a multi-function piston coupling a drive module to a center chassis.

Figure 125:
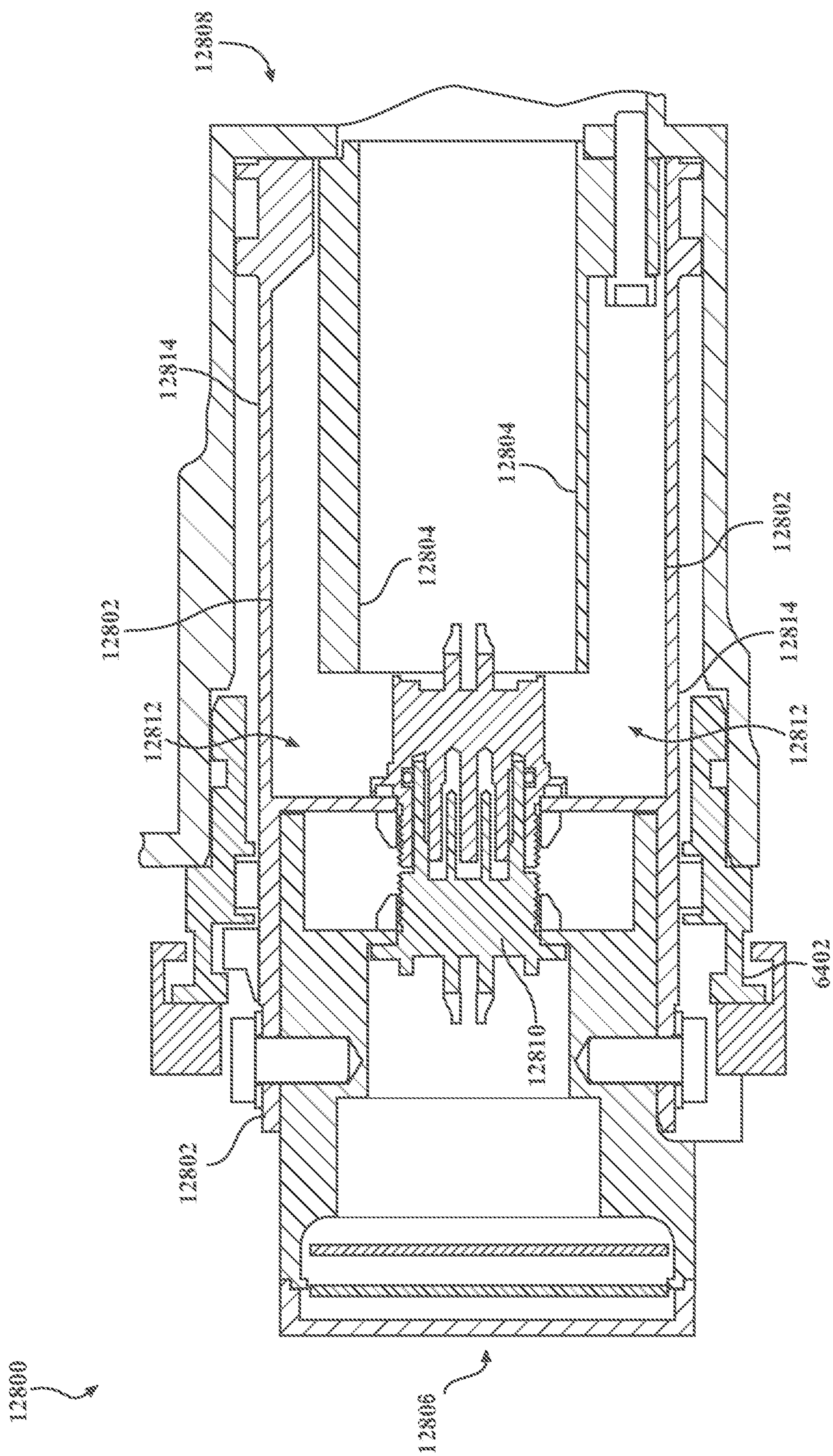

FIG. 125 depicts an example connector between a center chassis and a drive module.

Figure 126:
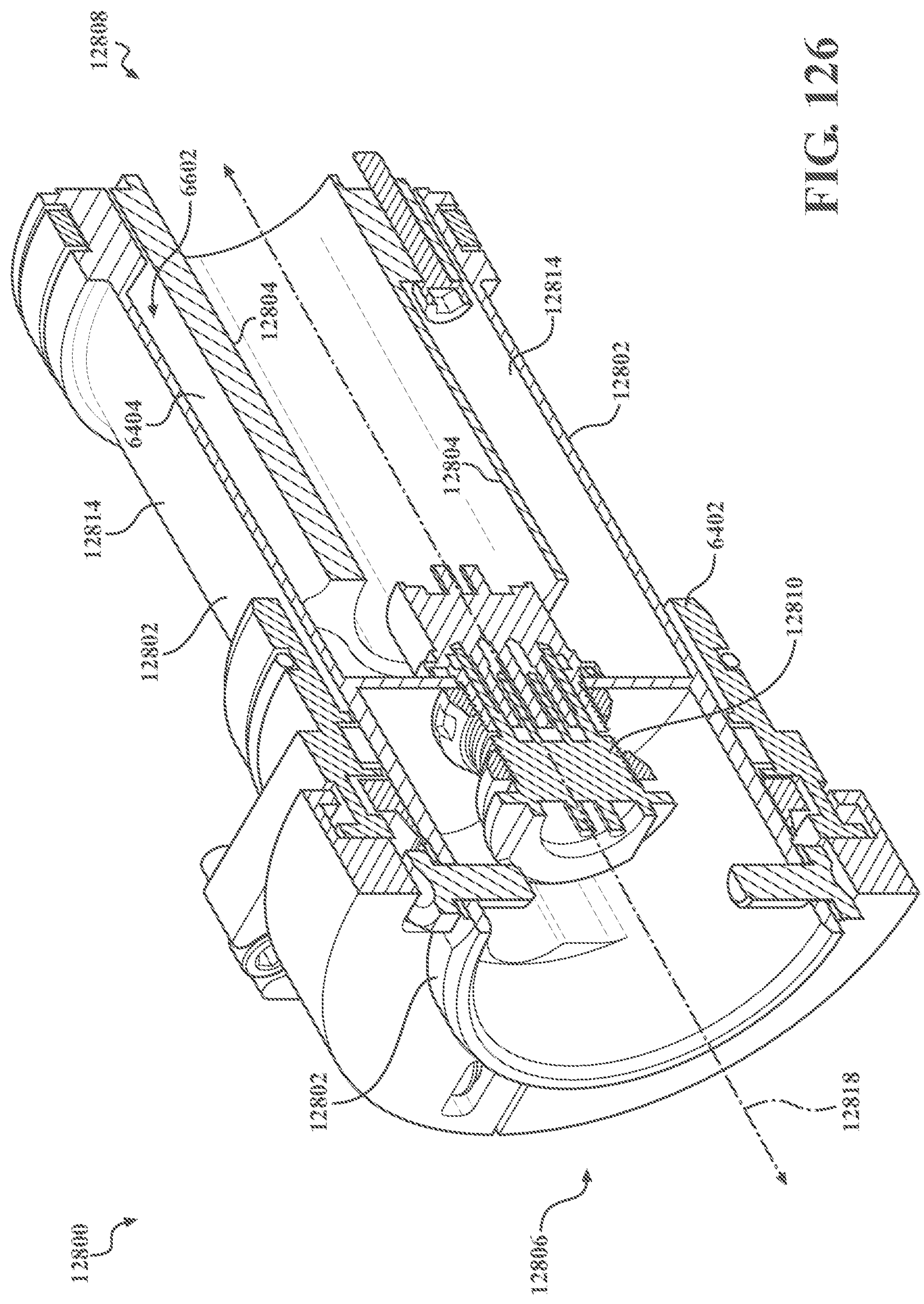

FIG. 126 depicts an example connector between a center chassis and a drive module.

Figure 127:
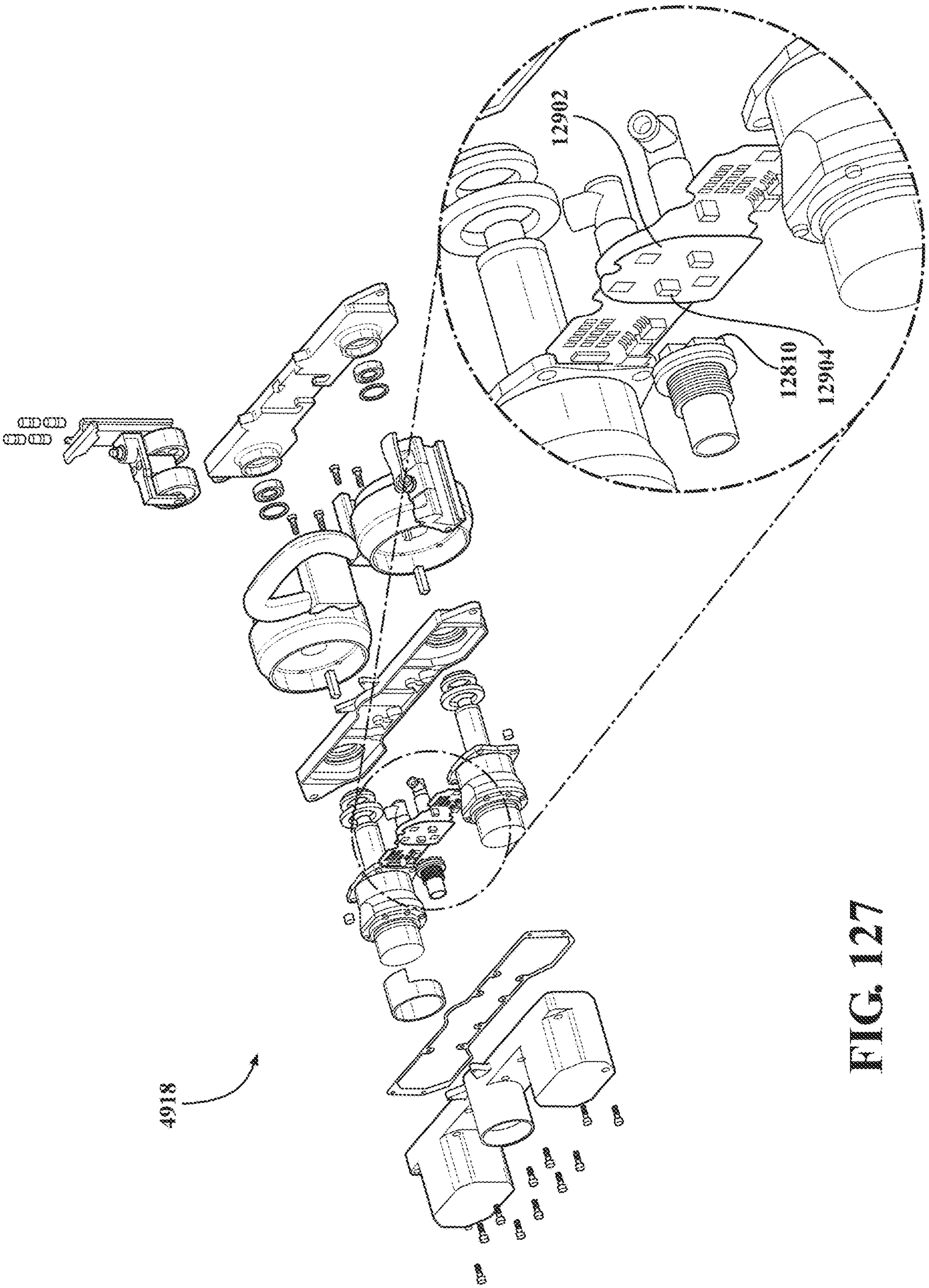

FIG. 127 depicts an example of additional electrical connections between a center chassis and a drive module.

Figure 128:
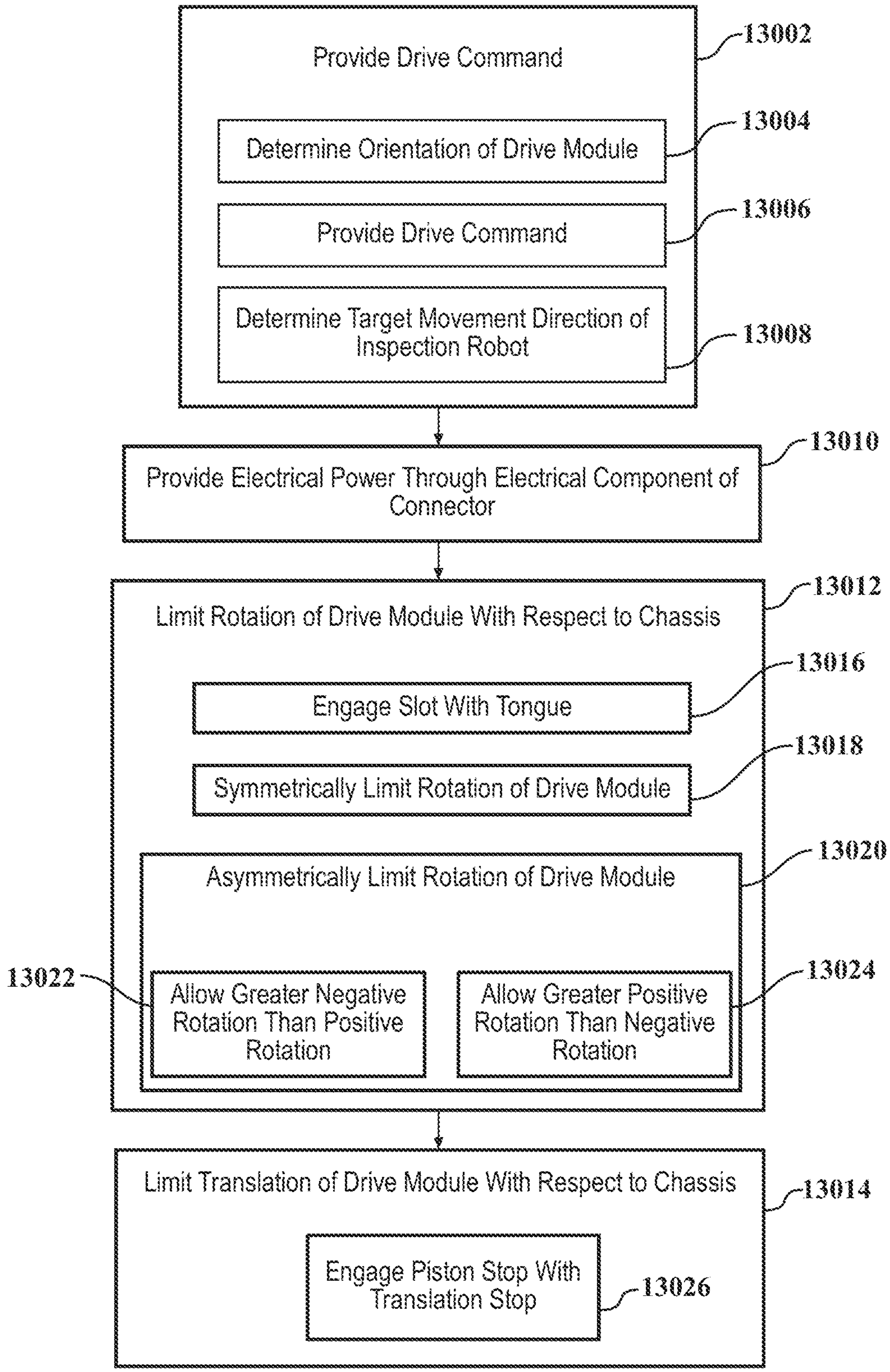

FIG. 128 depicts an example procedure for operating an inspection robot having a drive module.

Figure 129:
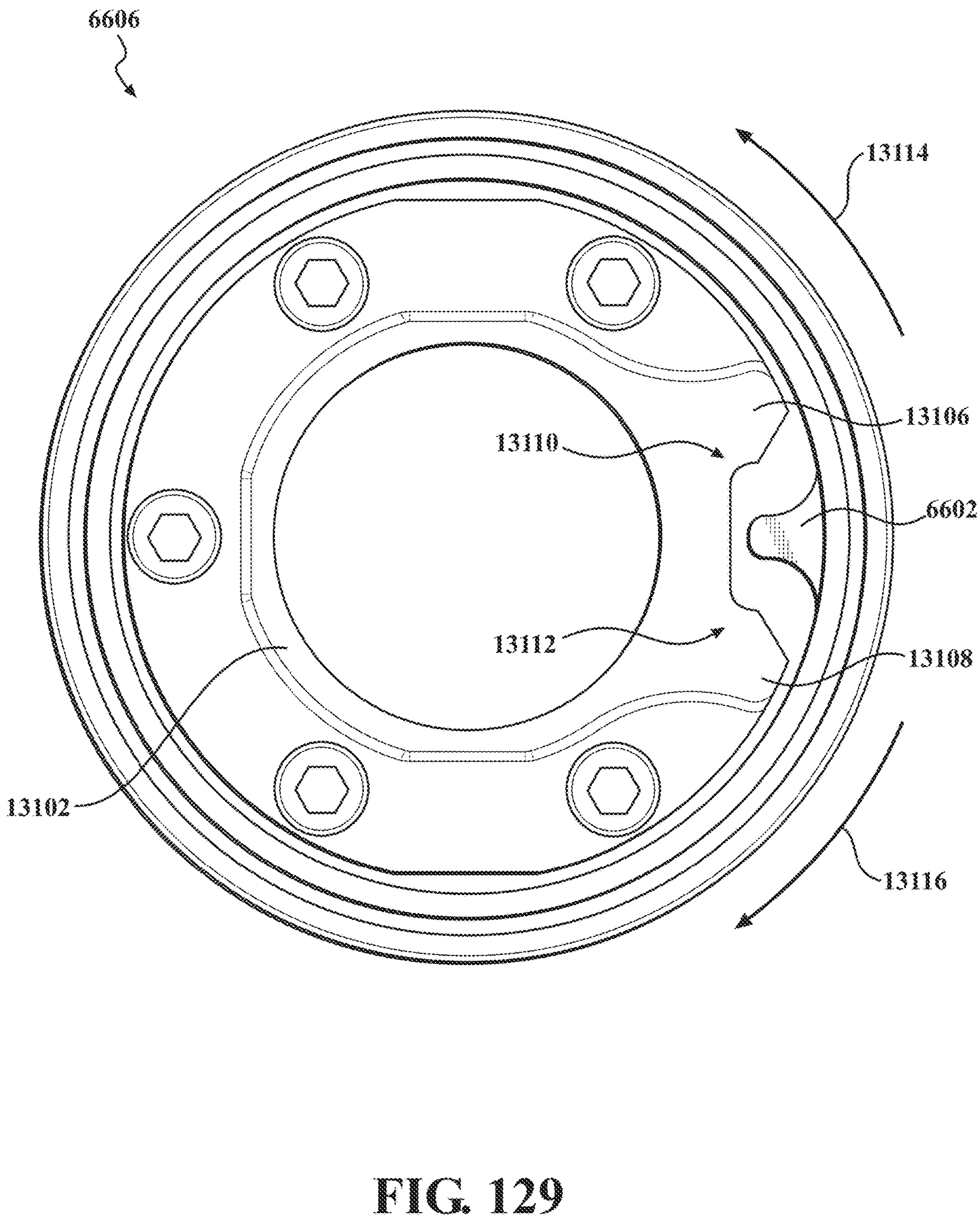

FIG. 129 depicts an example rotation limiter for a drive assembly of an inspection robot.

Figure 130:
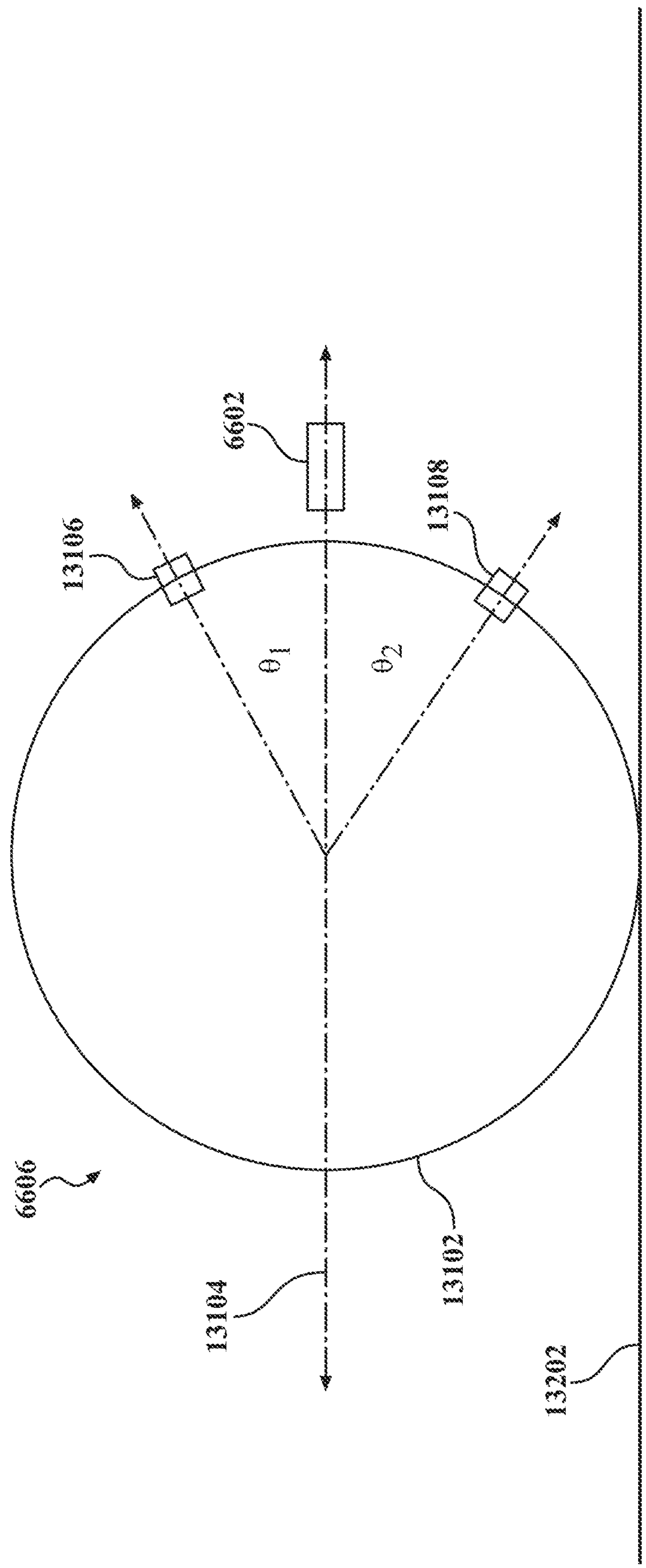

FIG. 130 schematically depicts an example rotation limiter for a drive assembly of an inspection robot.

Figure 131:
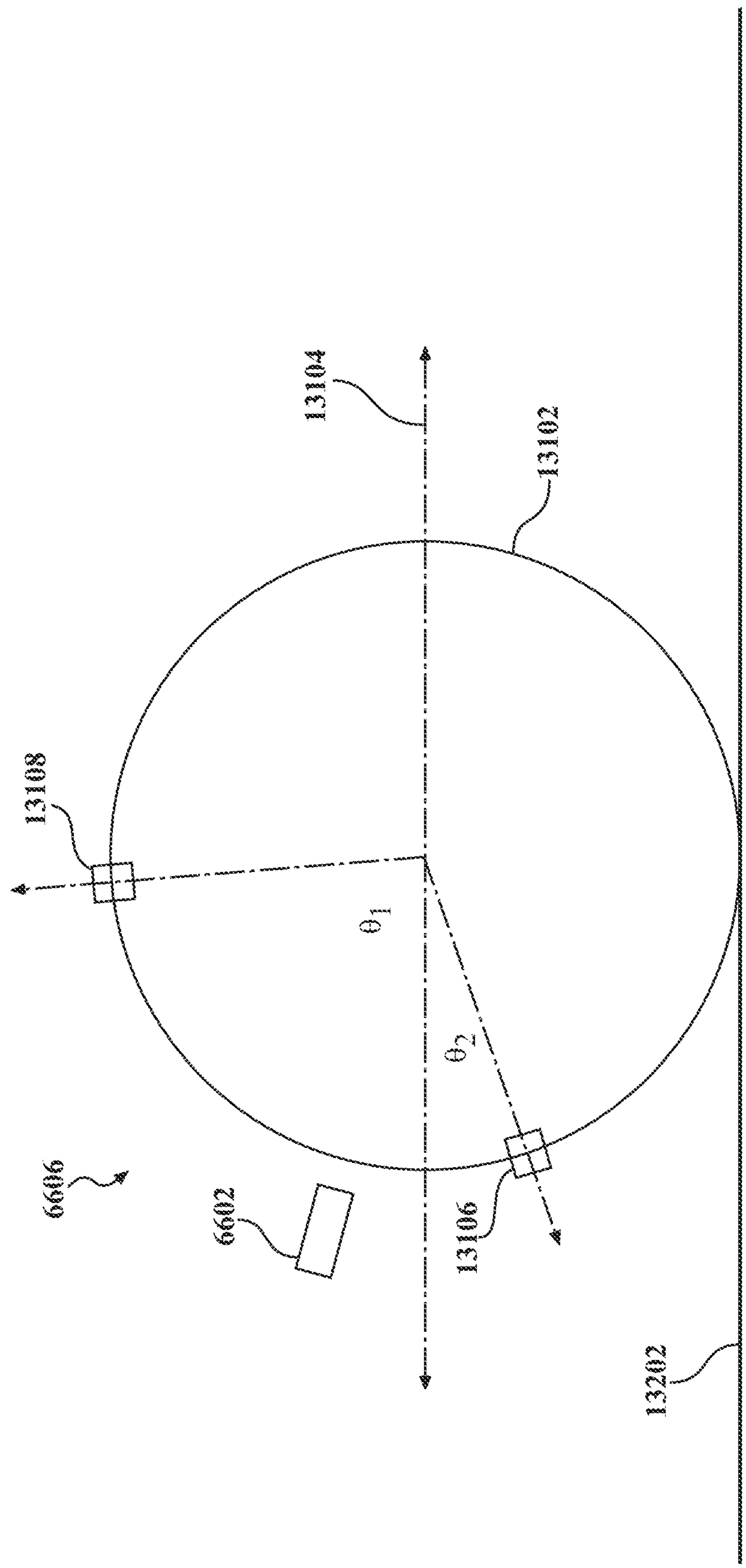

FIG. 131 schematically depicts an example rotation limiter for a drive assembly of an inspection robot.

Figure 132:
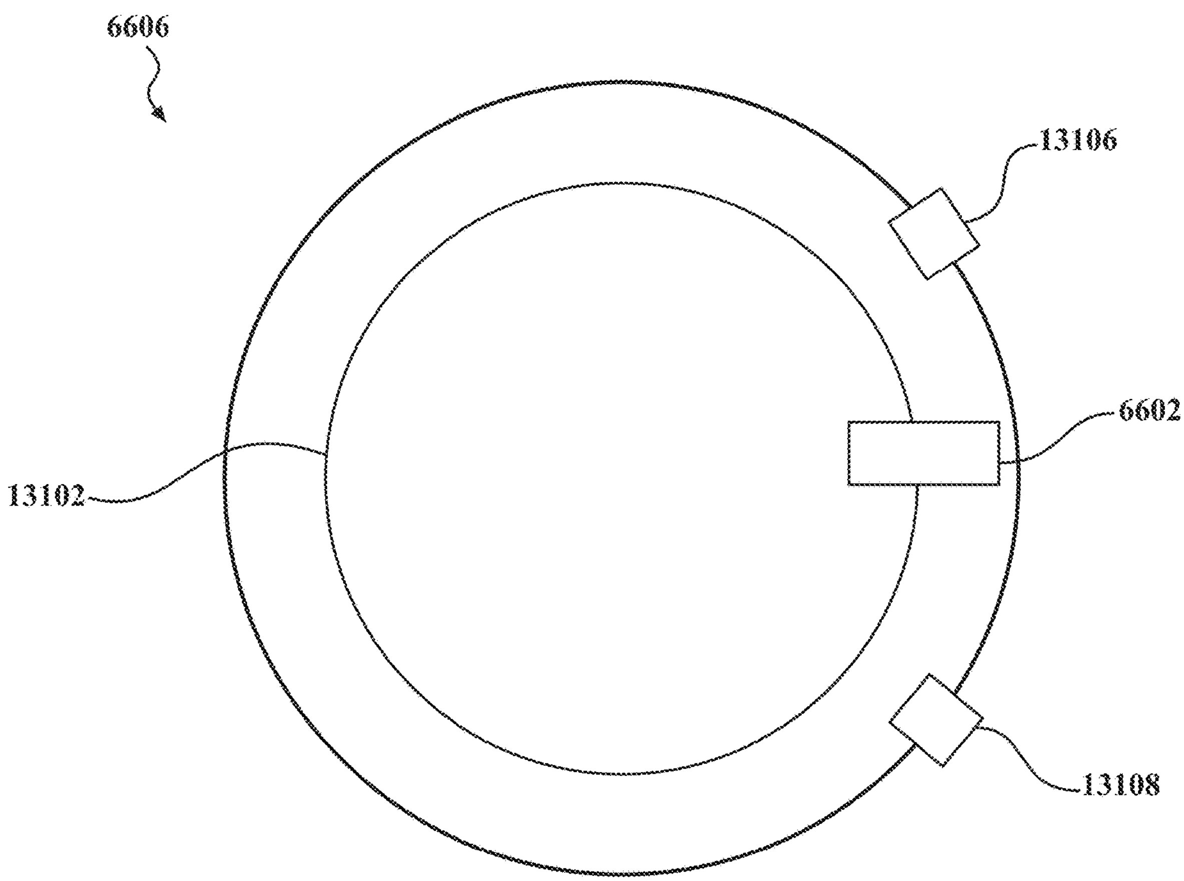

FIG. 132 schematically depicts an example rotation limiter for a drive assembly of an inspection robot.

Figure 133:
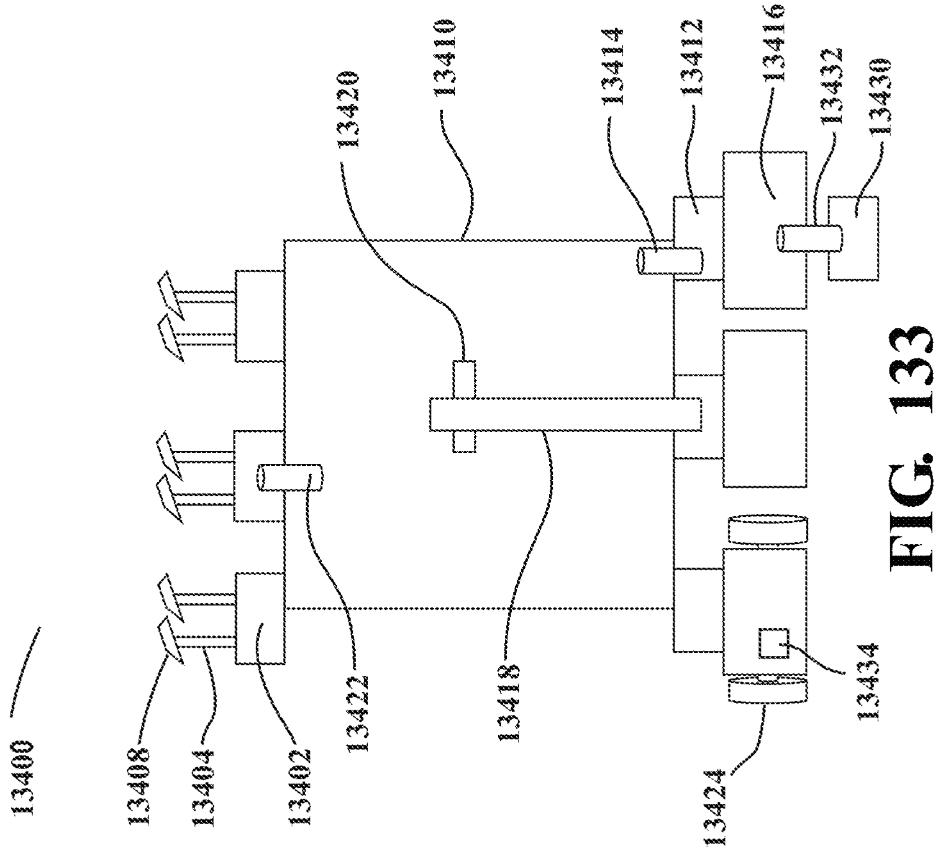

FIG. 133 depicts an inspection robot.

Figure 134:
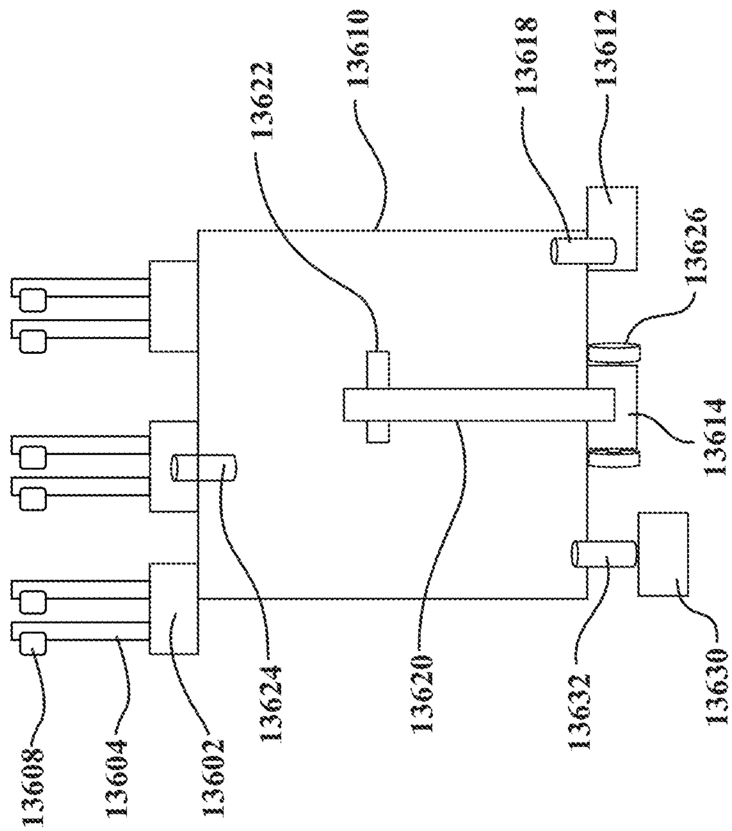

FIG. 134 depicts providing drive power to a first drive module.

Figure 135:
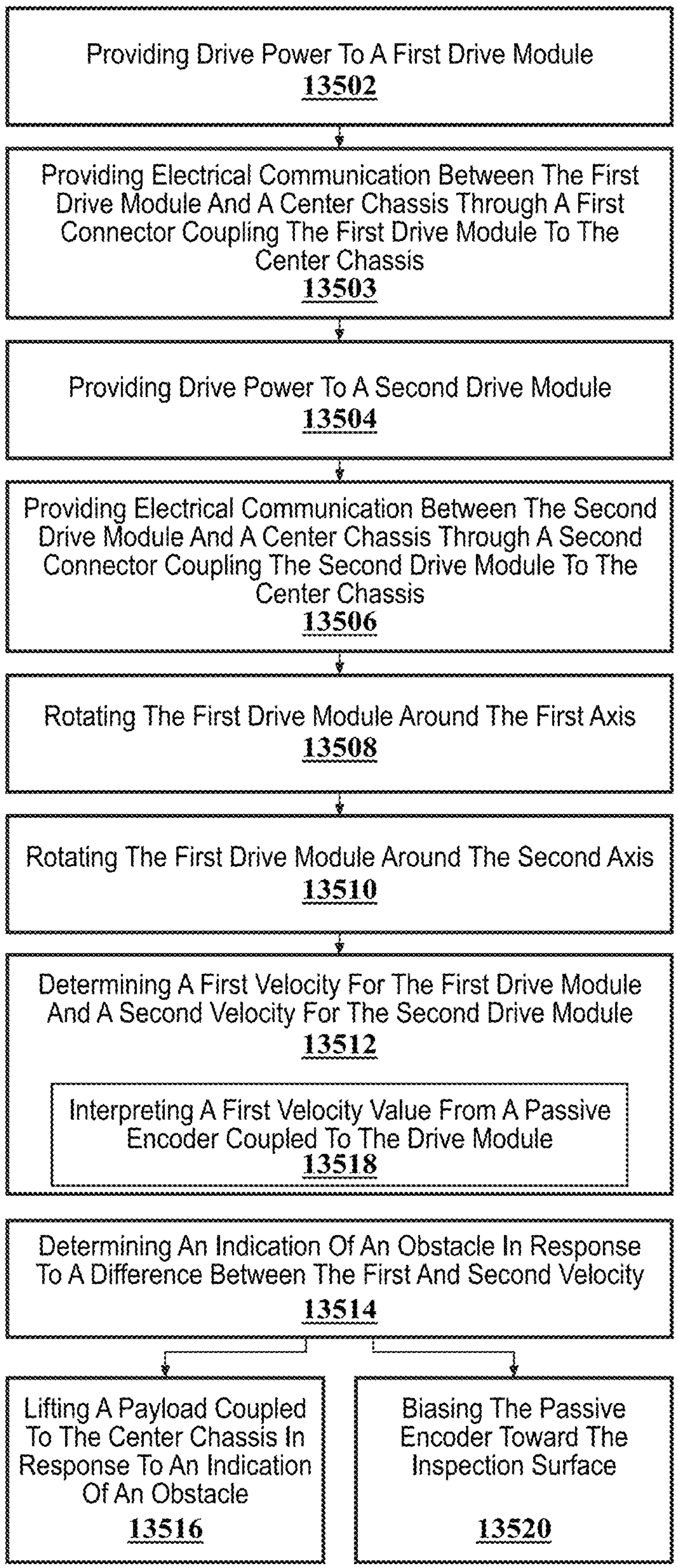

FIG. 135 depicts a system for inspection an uneven inspection surface.

Figure 136:
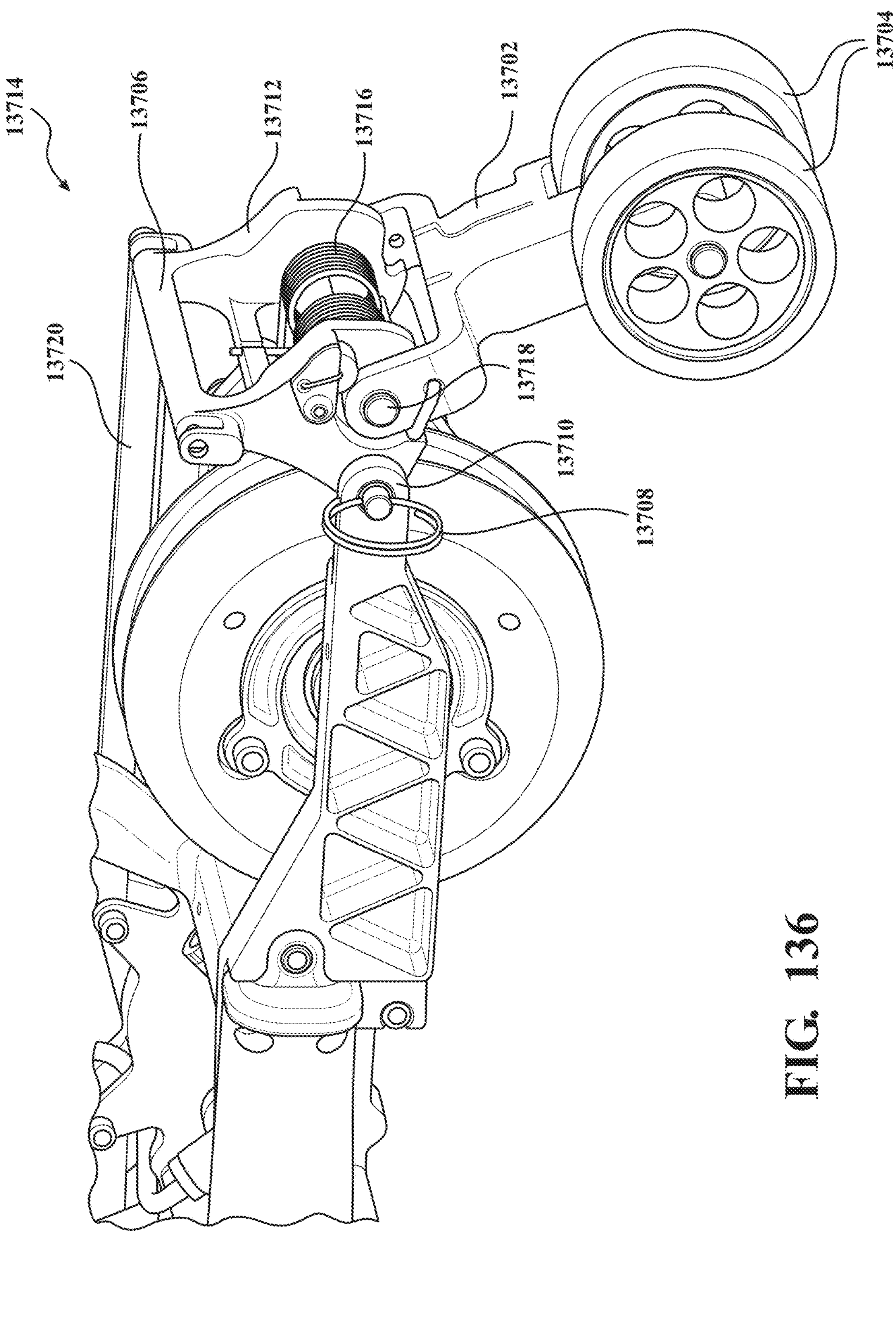

FIG. 136 depicts an example stability module assembly.

FIG. 137 depicts an example procedure to inspect a vertical surface.

Figure 138:
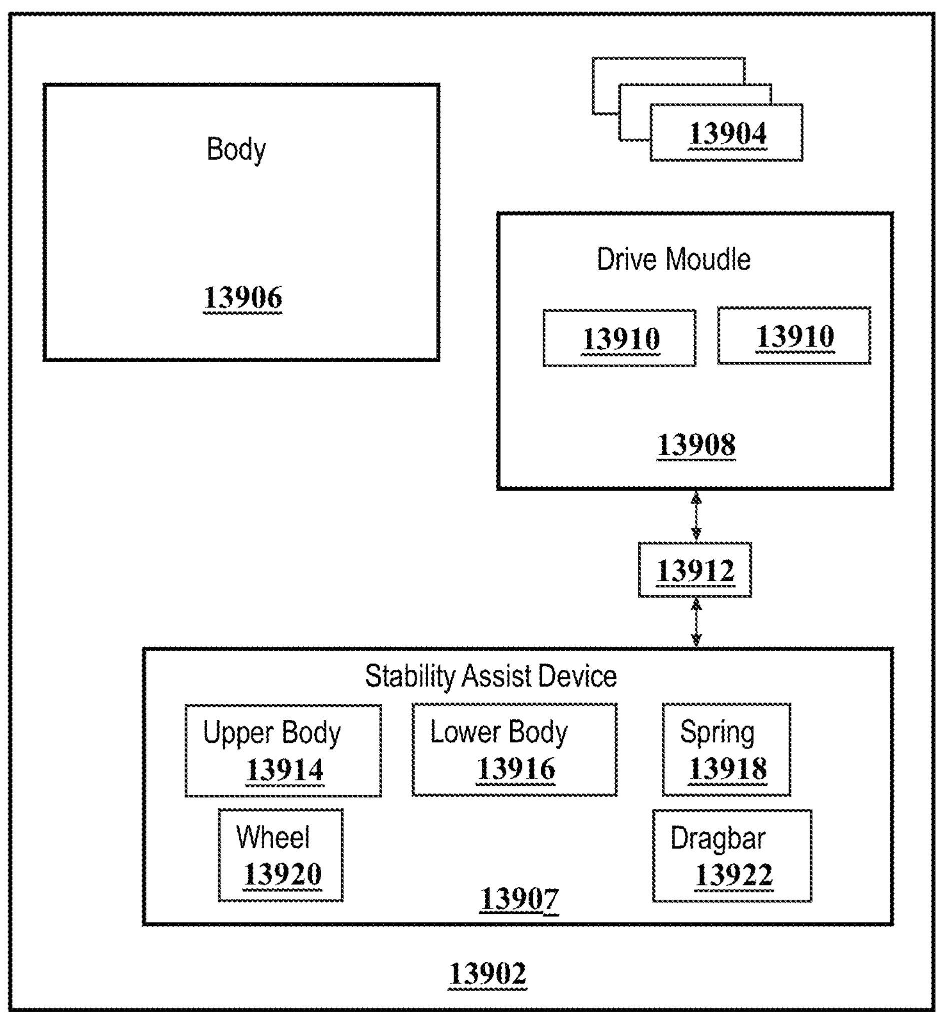

FIG. 138 depicts an example inspection robot.

Figure 139:
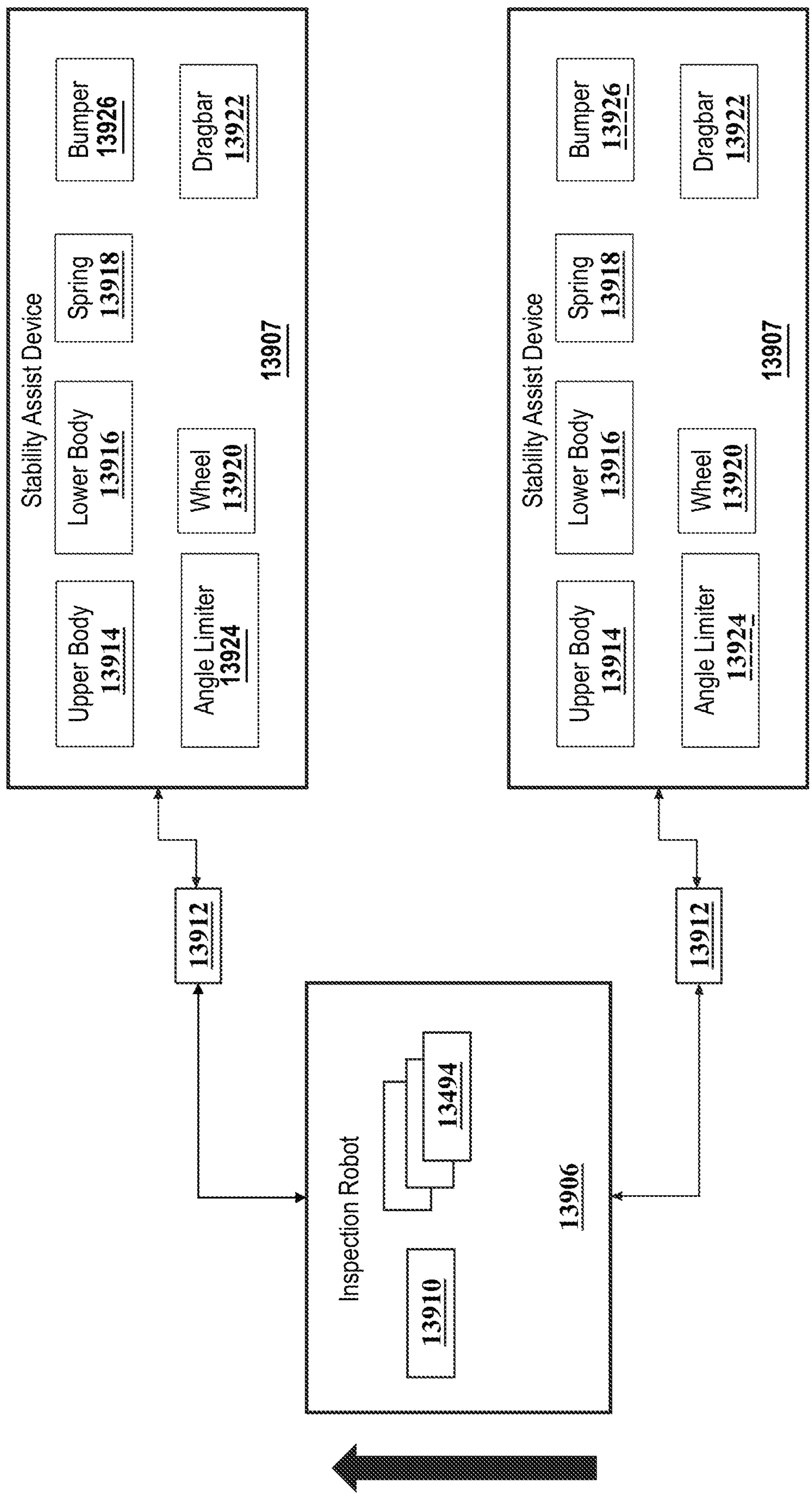

FIG. 139 depicts an example inspection robot body.

FIGS. 140-145 depict various stages during manufacture of a wheel assembly.

Figure 146:
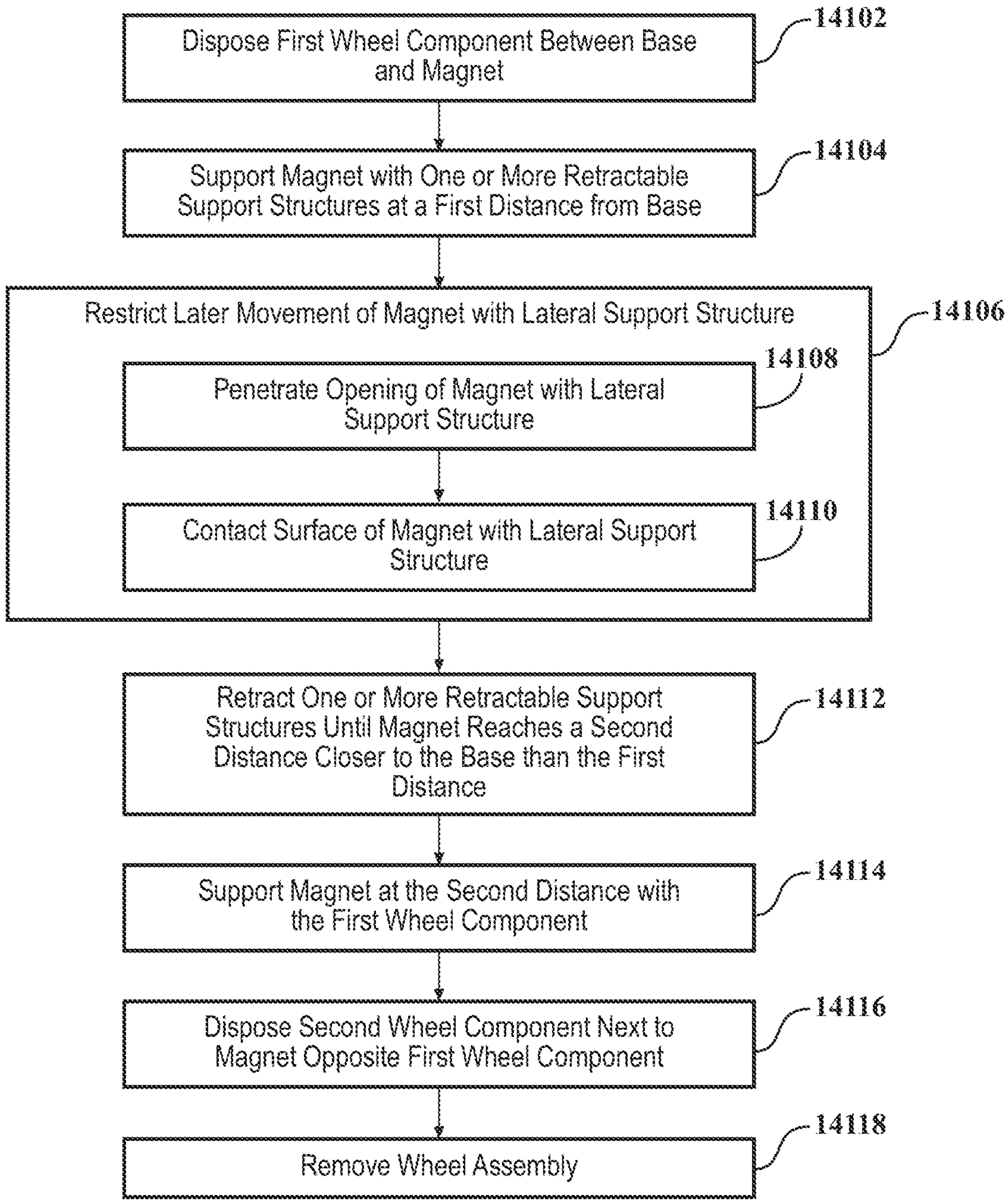

FIG. 146 depicts a method of manufacturing a wheel assembly.

Figure 147:
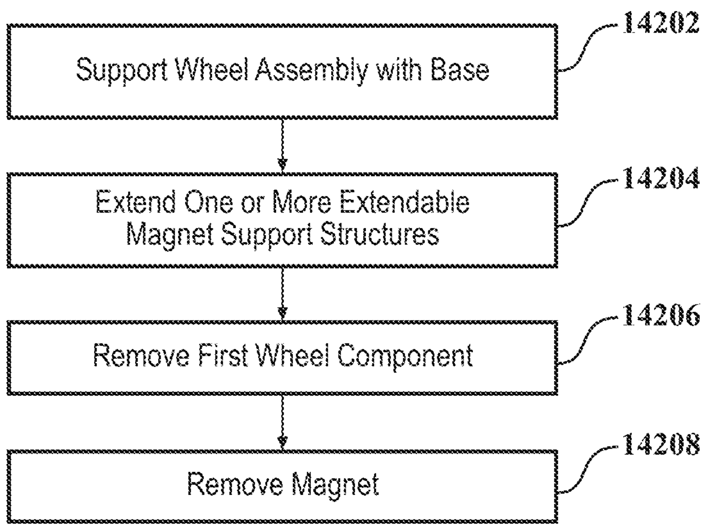

FIG. 147 depicts a method of disassembling a wheel assembly for an inspection robot.

Figure 148:
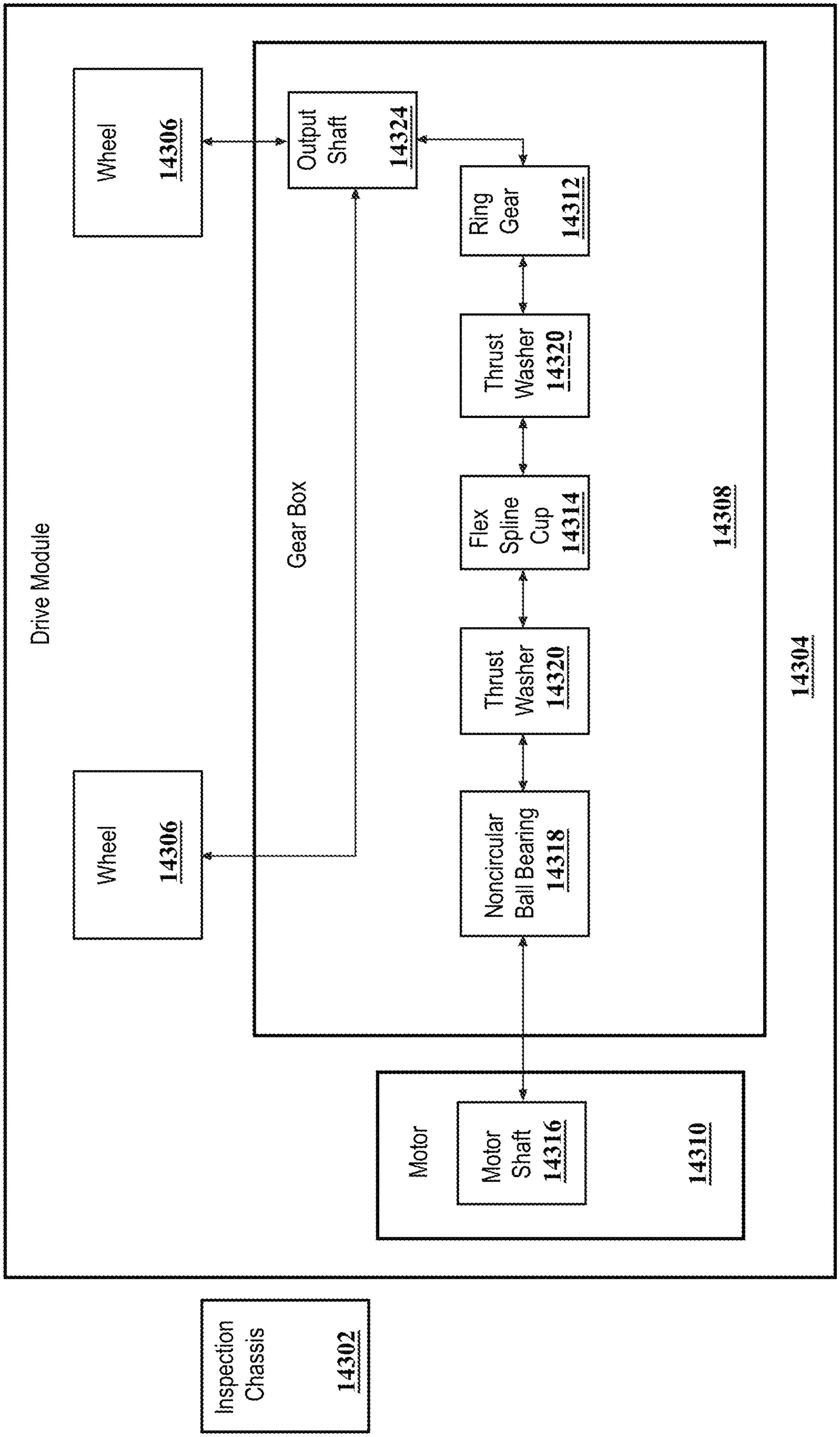

FIG. 148 depicts a method of inspecting an inspection surface with an inspection robot.

Figure 149:
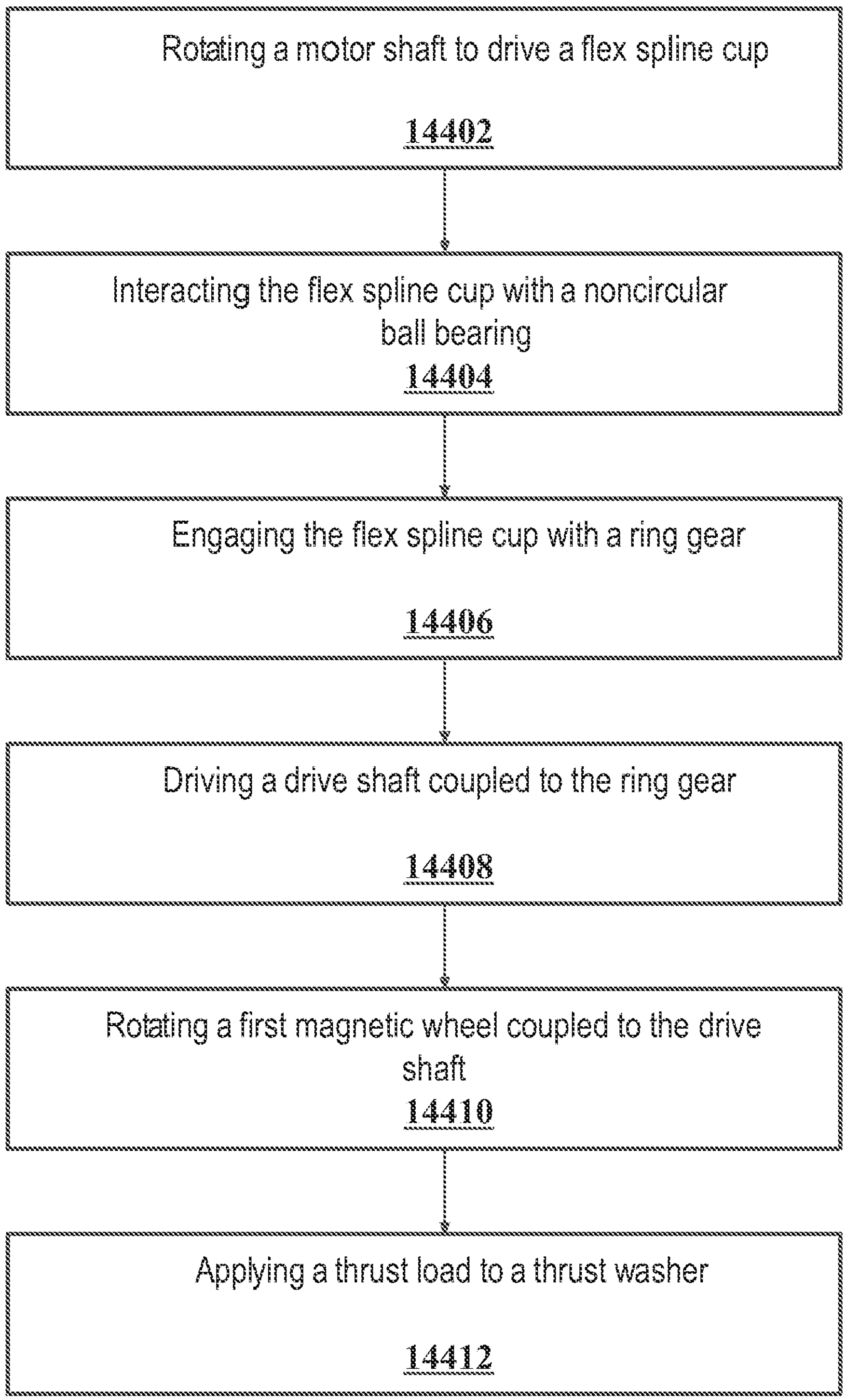

FIG. 149 is a schematic flow description of a procedure to operate a drive module.

Figure 150:
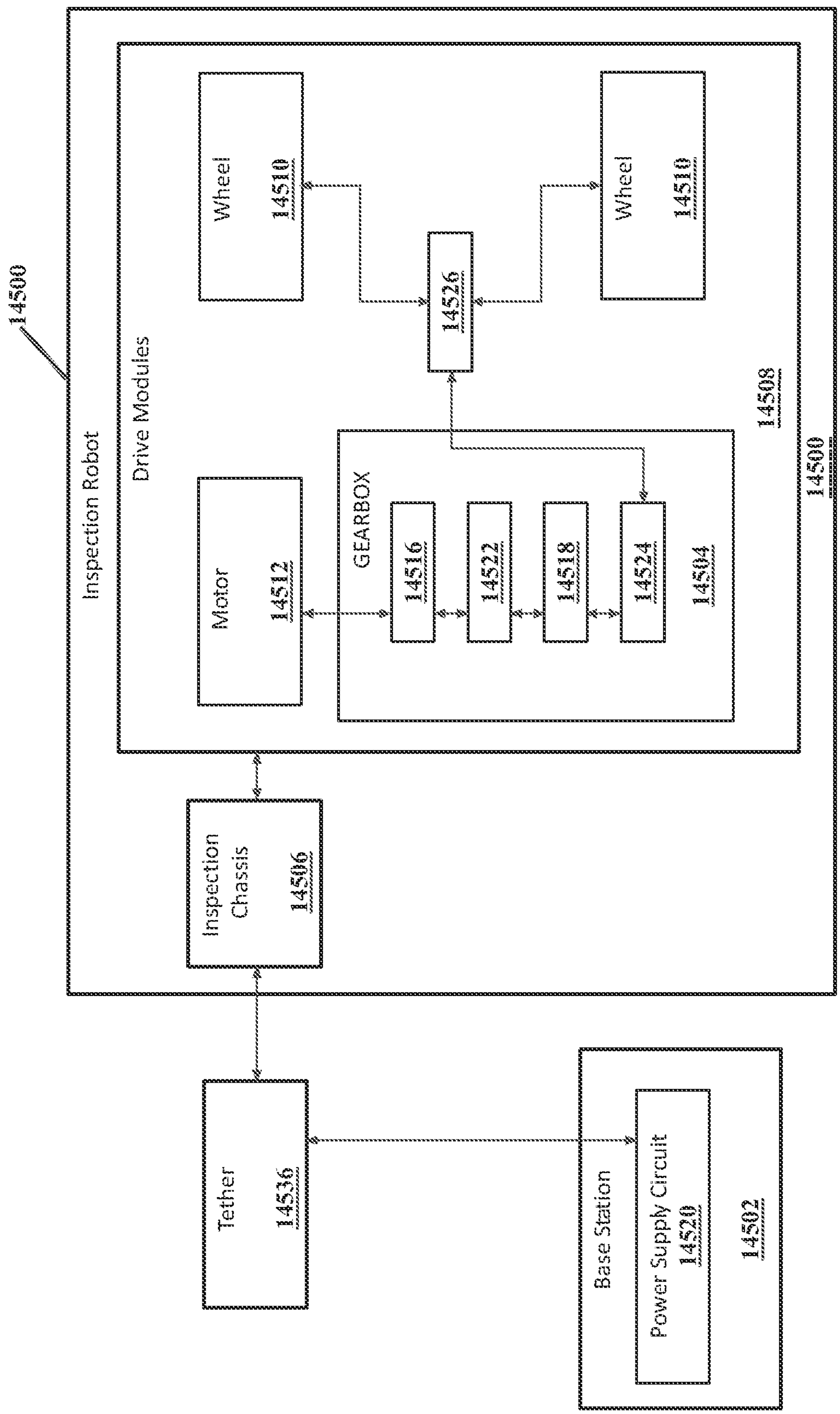

FIG. 150 is a schematic diagram of a gear box.

Figure 151:
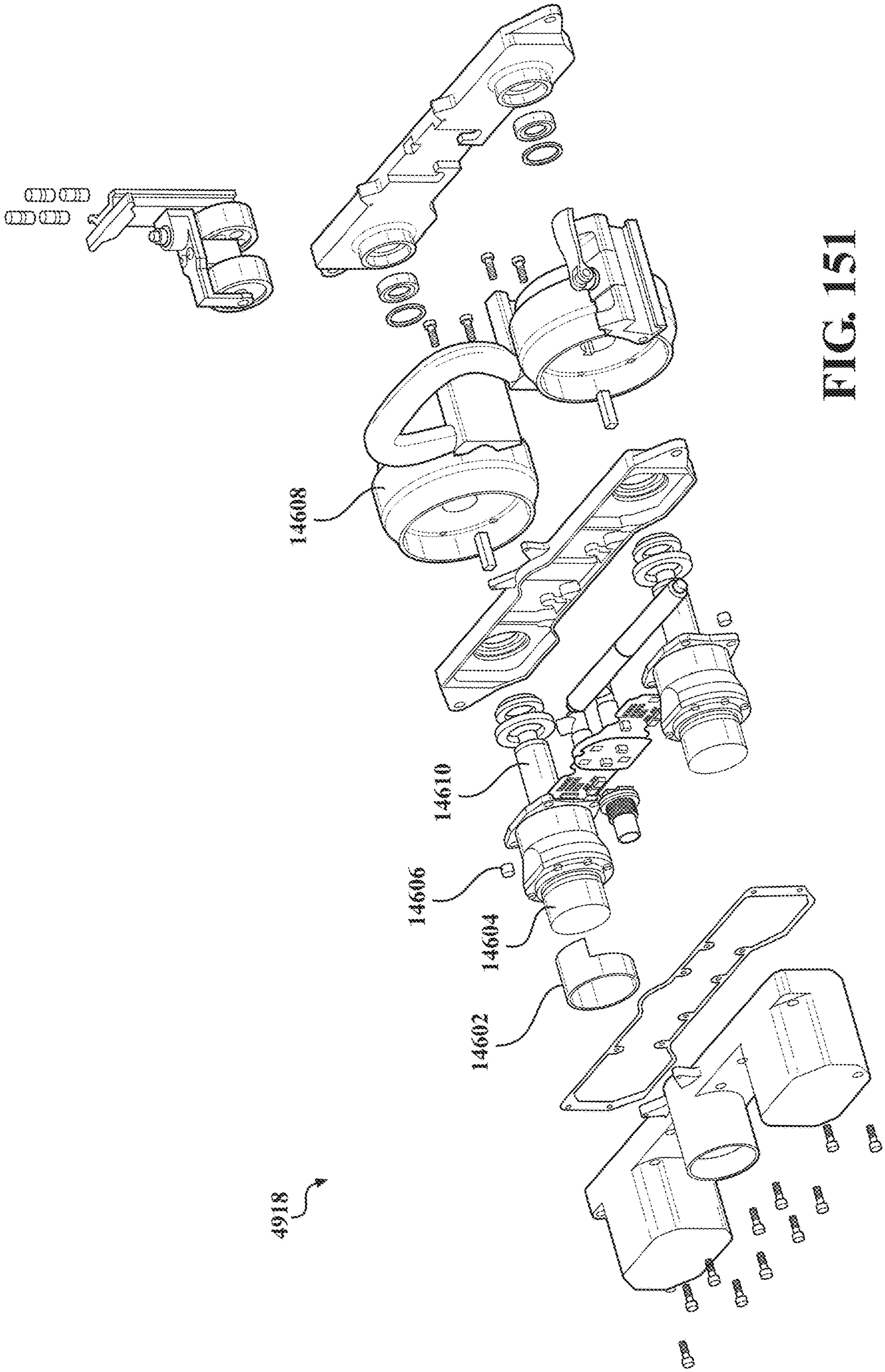

FIG. 151 is a schematic diagram depicting an exploded view of a modular drive module for an inspection robot.

Figure 152:
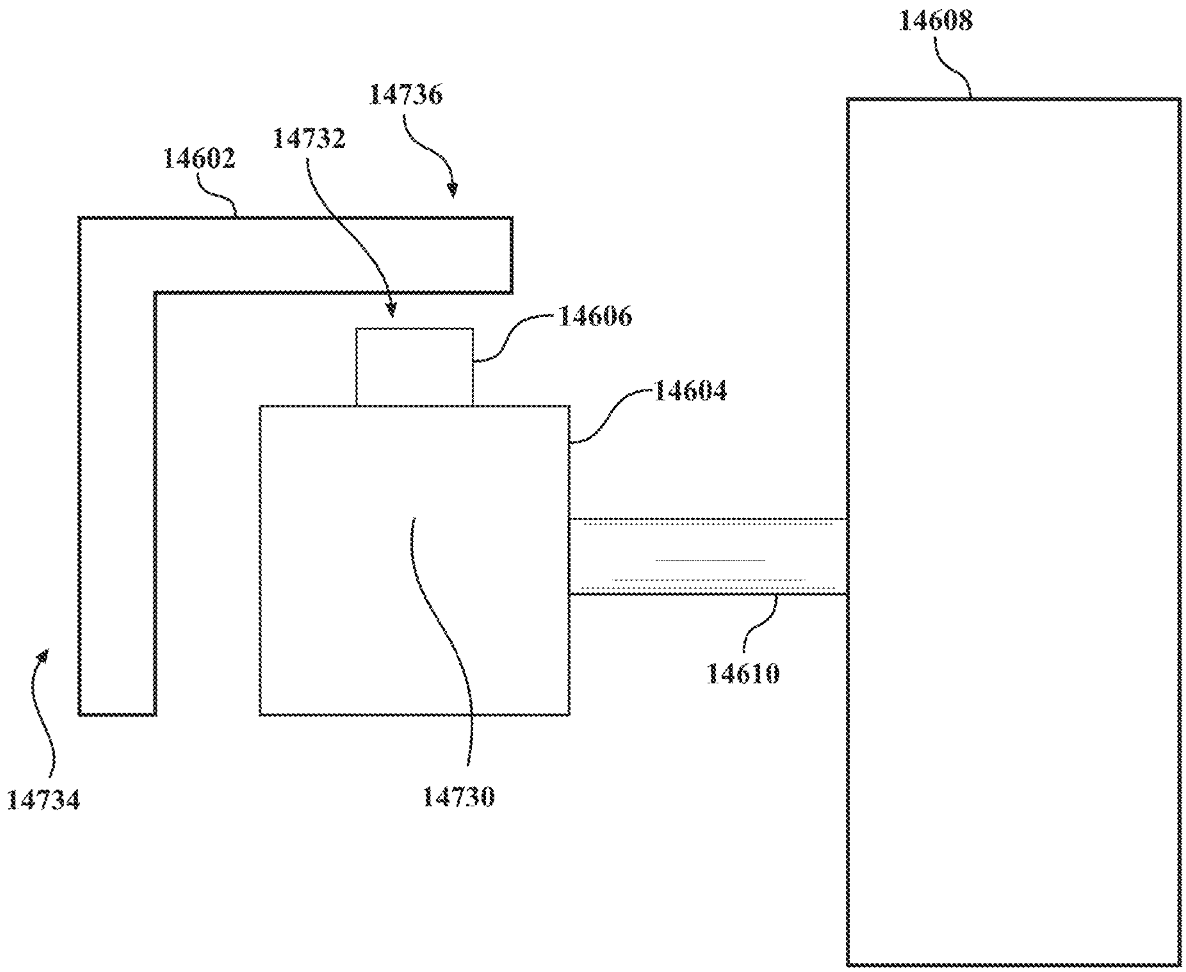

FIG. 152 is a schematic diagram of a side profile view of a motor of the modular drive assembly of FIG. 151.

Figure 153:
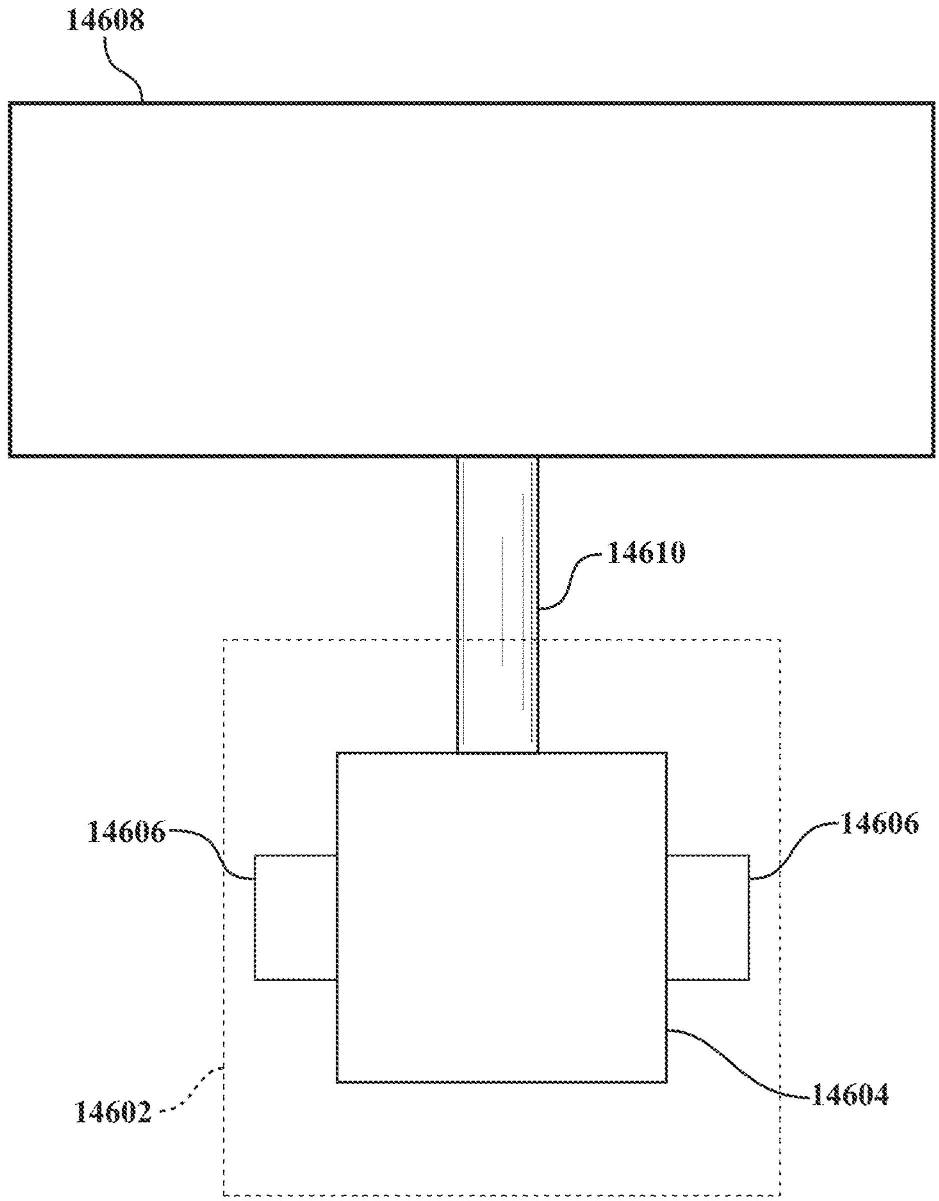
Figure 154:
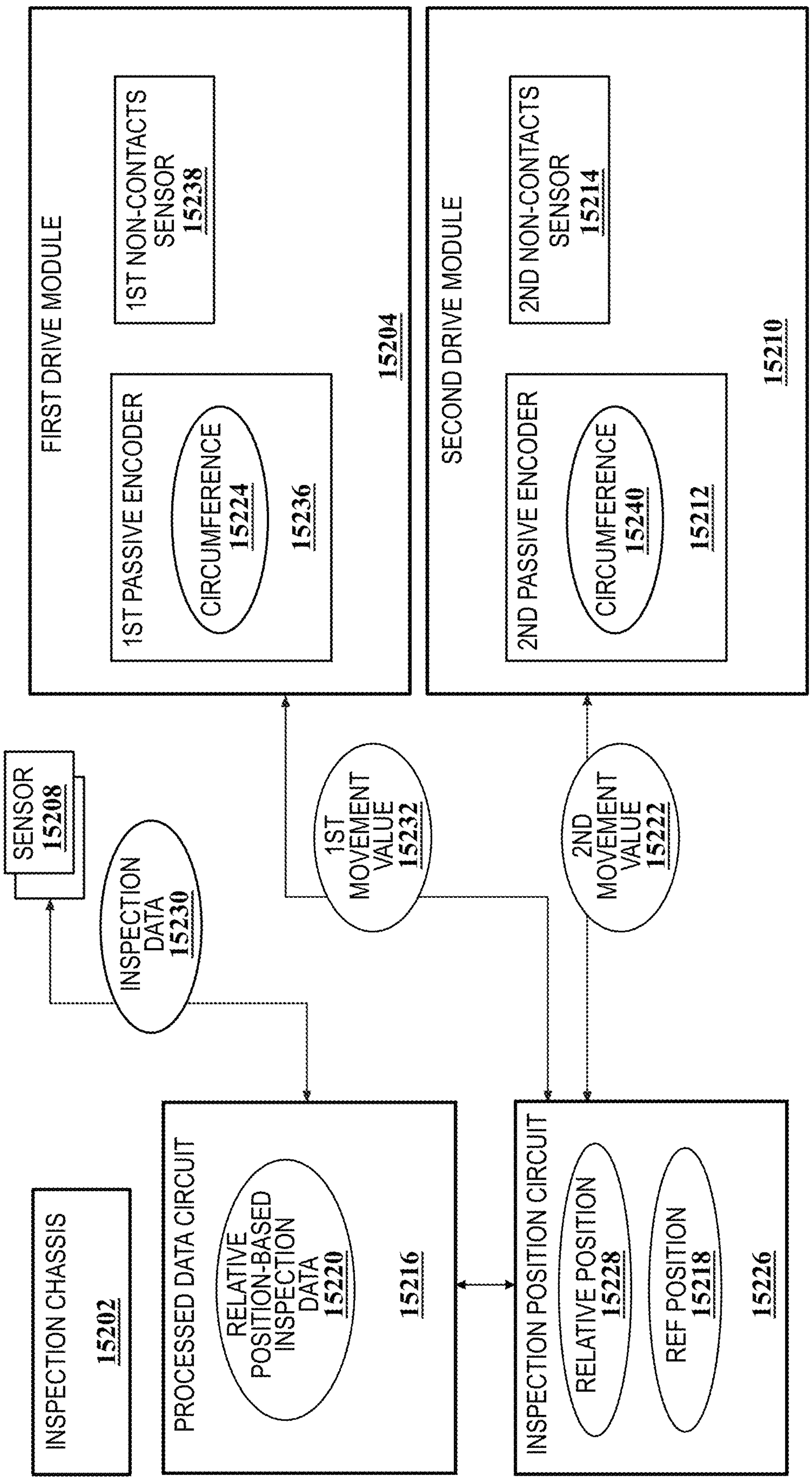

FIGS. 153 and 154 respectively depict a schematic diagram of a top-down profile view of a motor of a modular drive assembly and a block diagram of the modular drive assembly, wherein shielding has been displayed in FIG. 153 in dashed lines to provide for viewing of encoder positions with respect to the motor.

Figure 155:
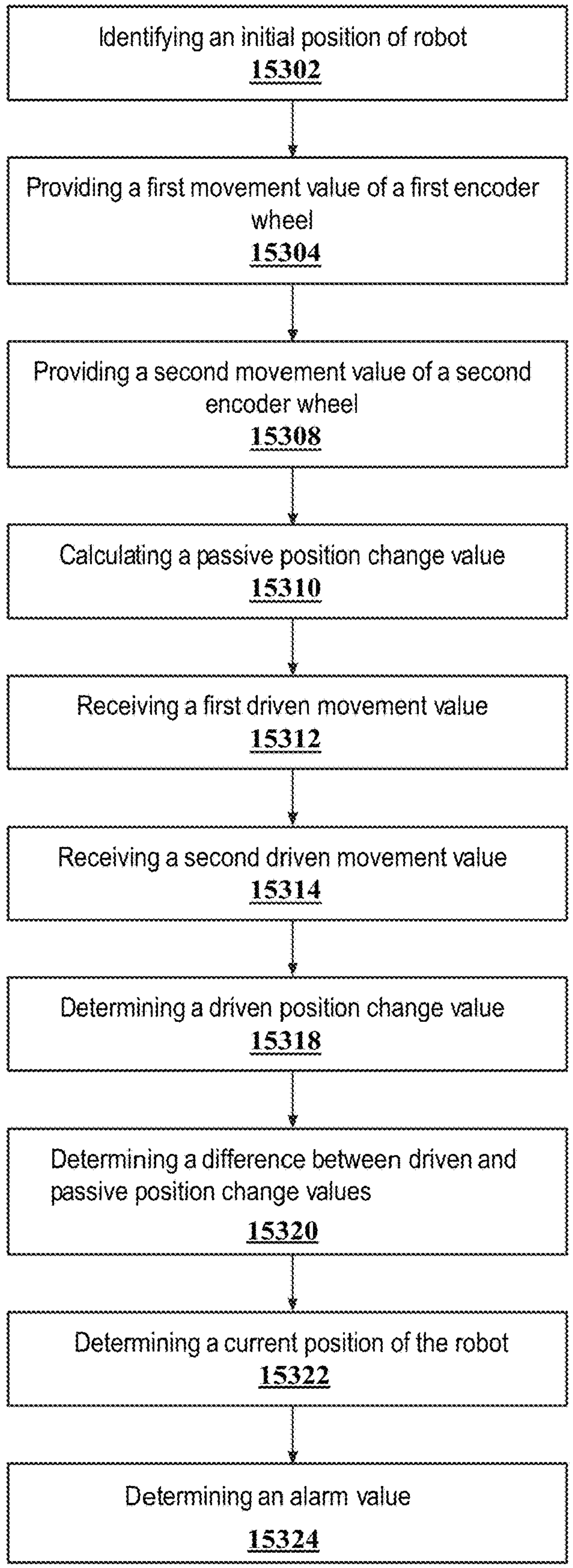

FIG. 155 depicts a method.

Figure 156:
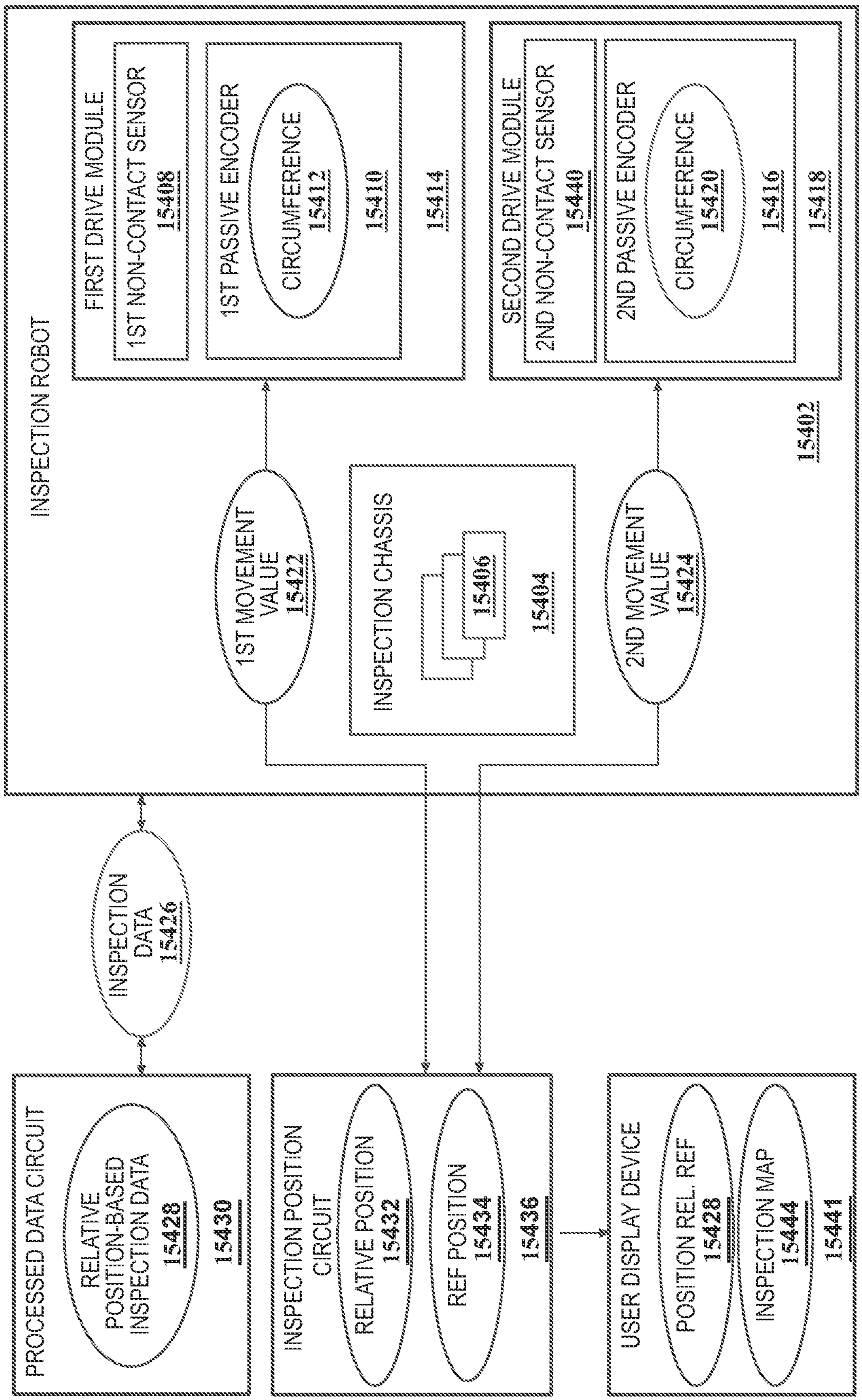

FIG. 156 depicts a system.

Figure 157:
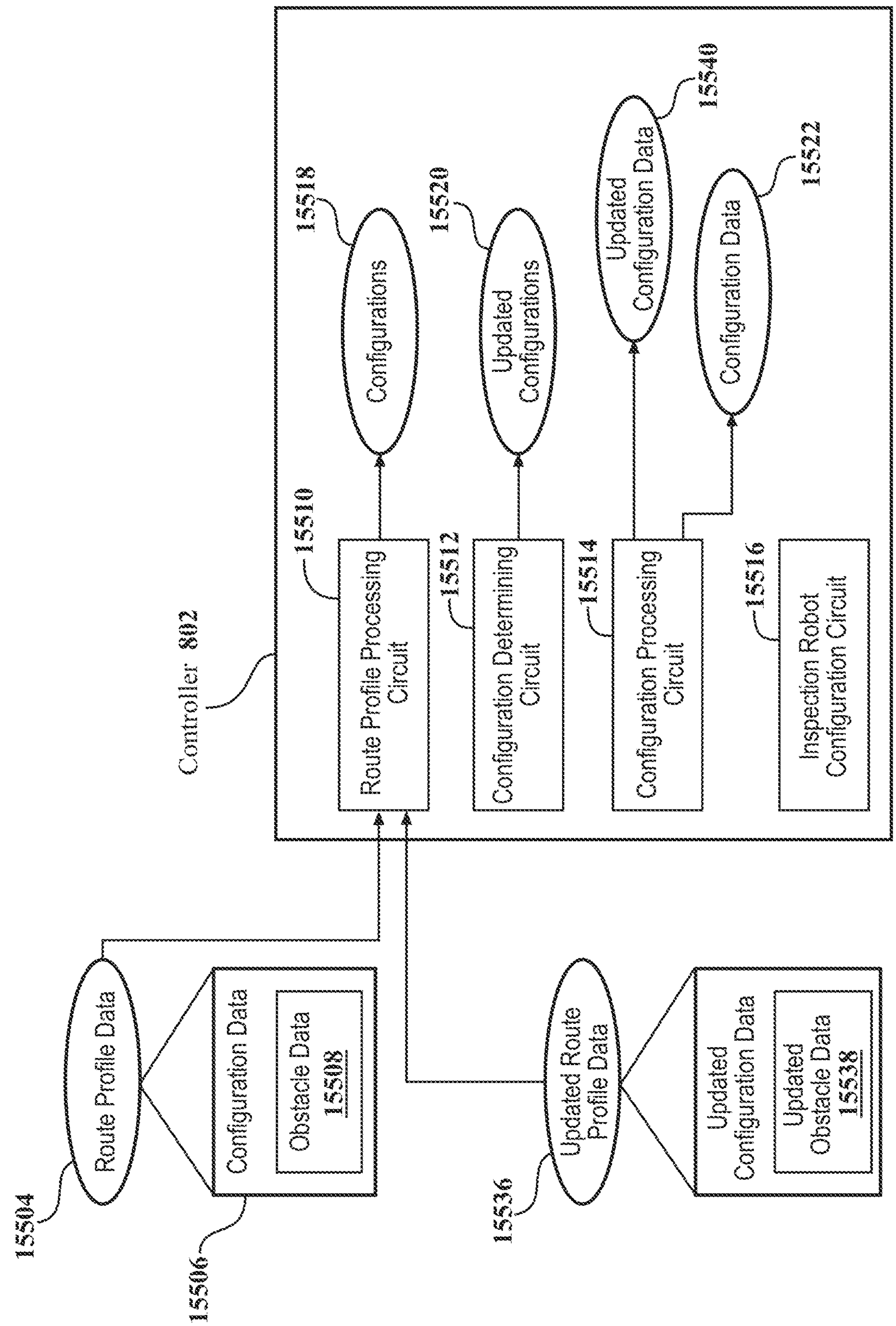

FIG. 157 depicts a controller.

Figure 158:
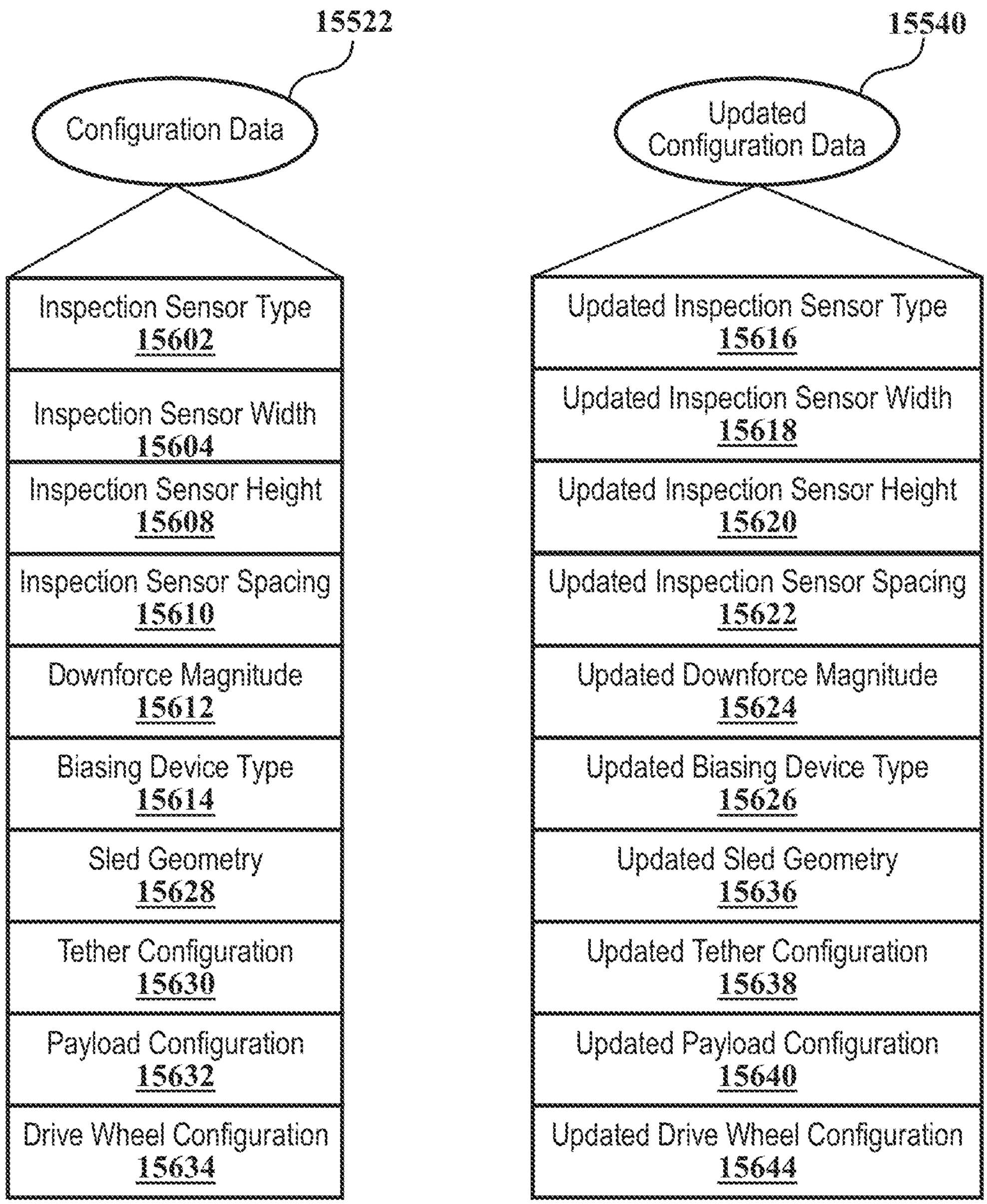

FIG. 158 depicts data.

Figure 159:
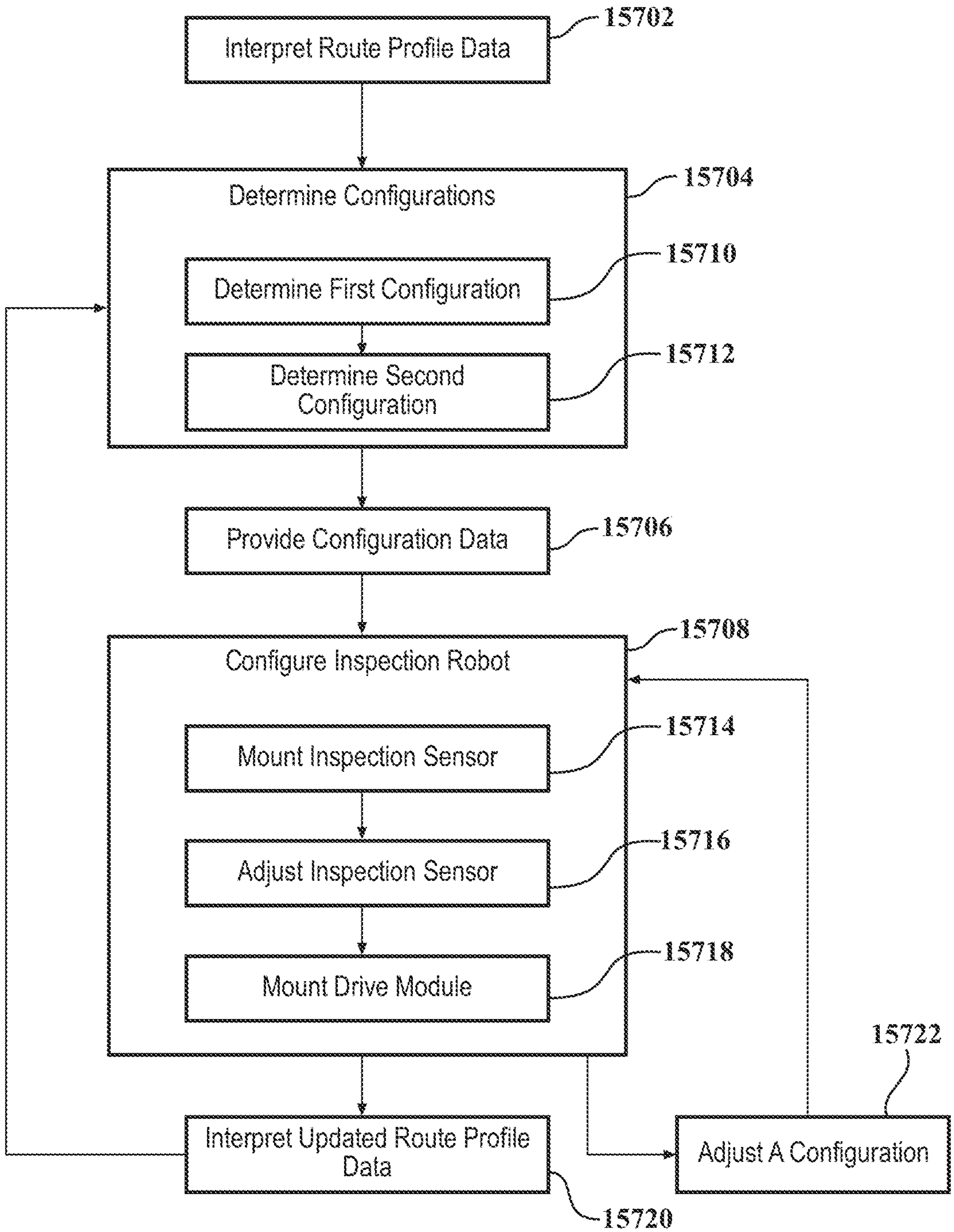

FIG. 159 depicts a method.

Figure 160:
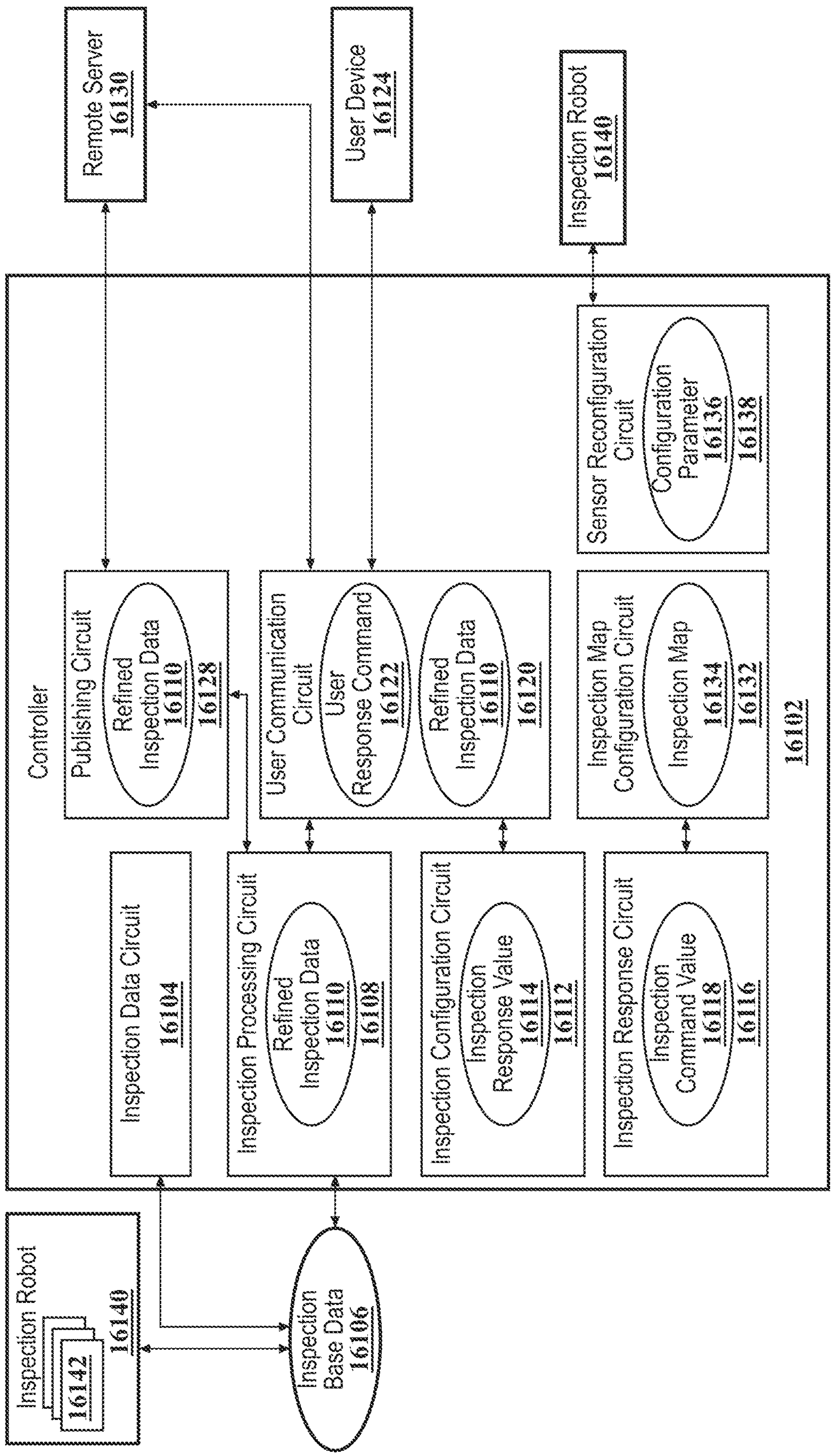

FIG. 160 depicts an example controller configured to perform operations for rapid response to inspection data.

Figure 161:
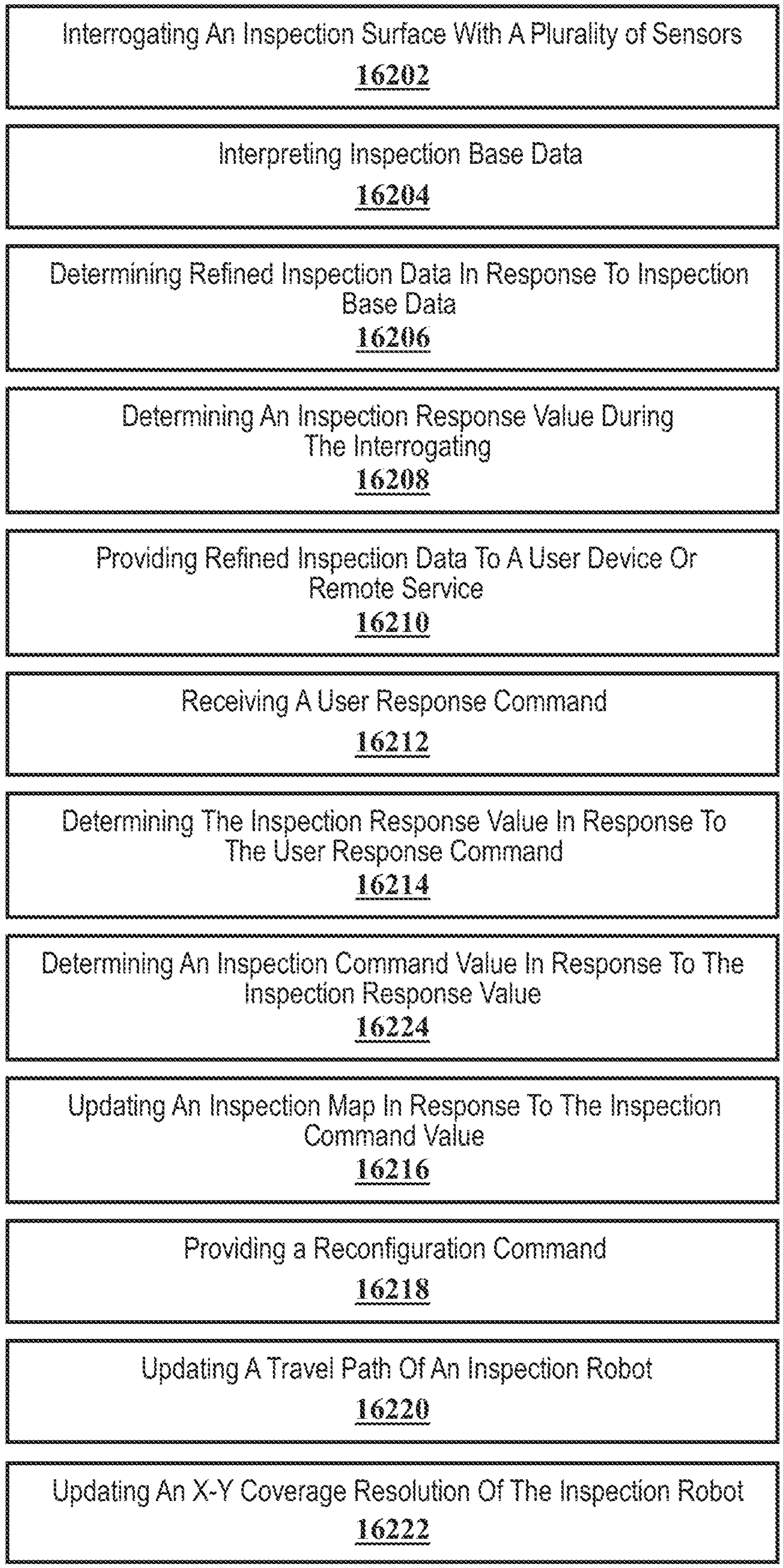

FIG. 161 is a schematic diagram of an example system for rapid response to inspection data.

Figure 162:
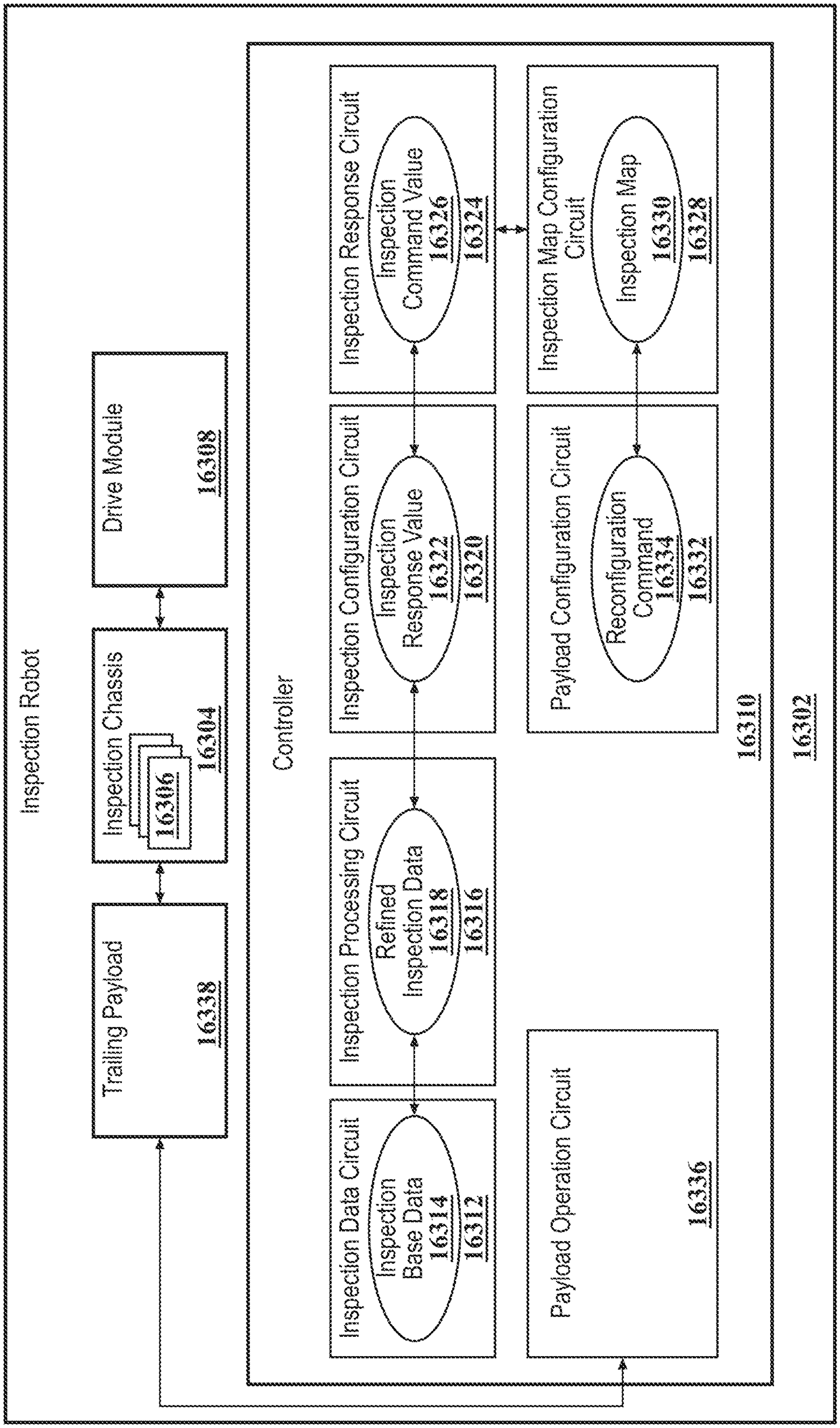

FIG. 162 is a schematic flow diagram of a procedure for rapid response to inspection data.

Figure 163:
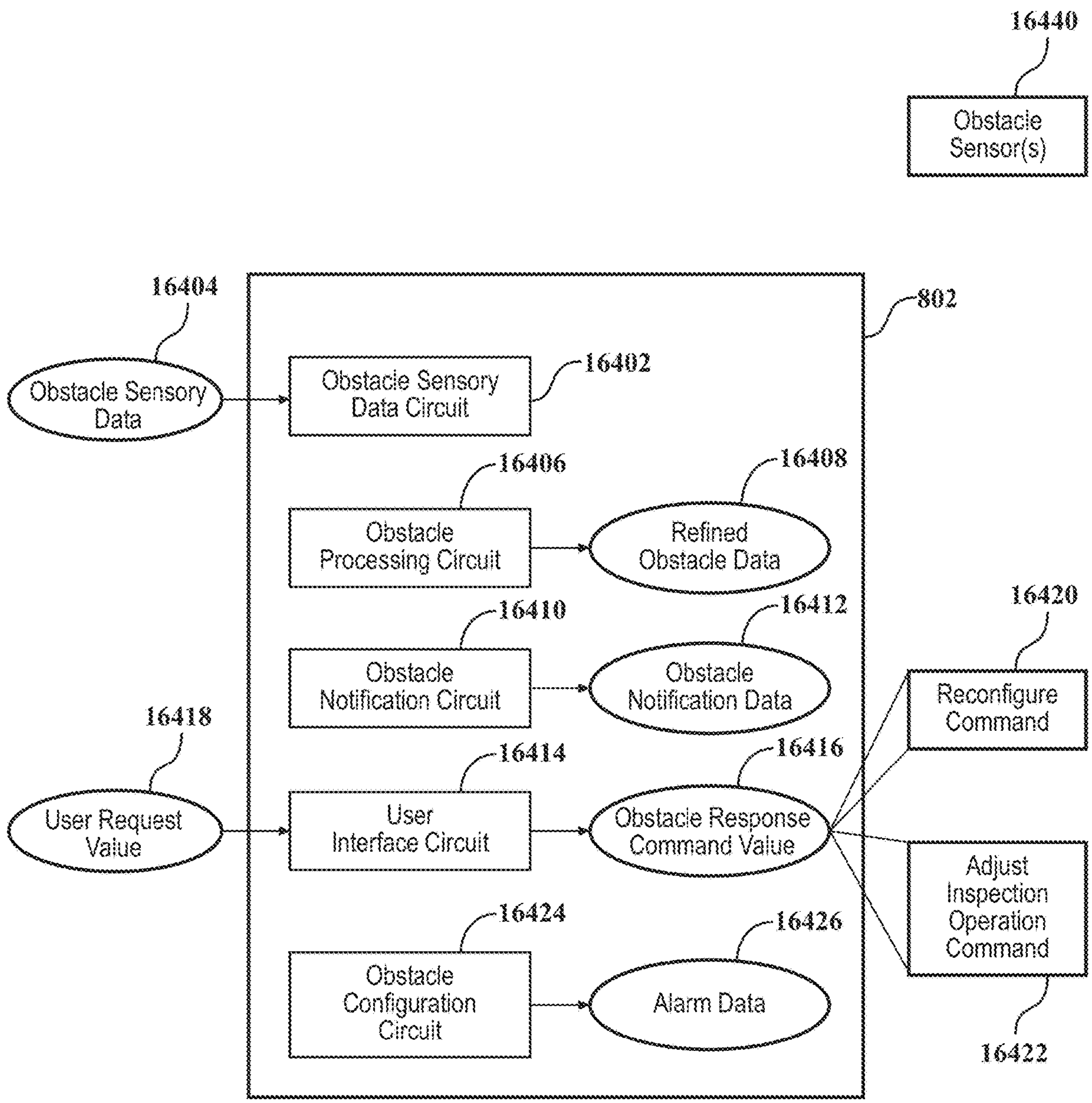

FIG. 163 is a schematic diagram of a system for traversing an obstacle with an inspection robot.

Figure 164:
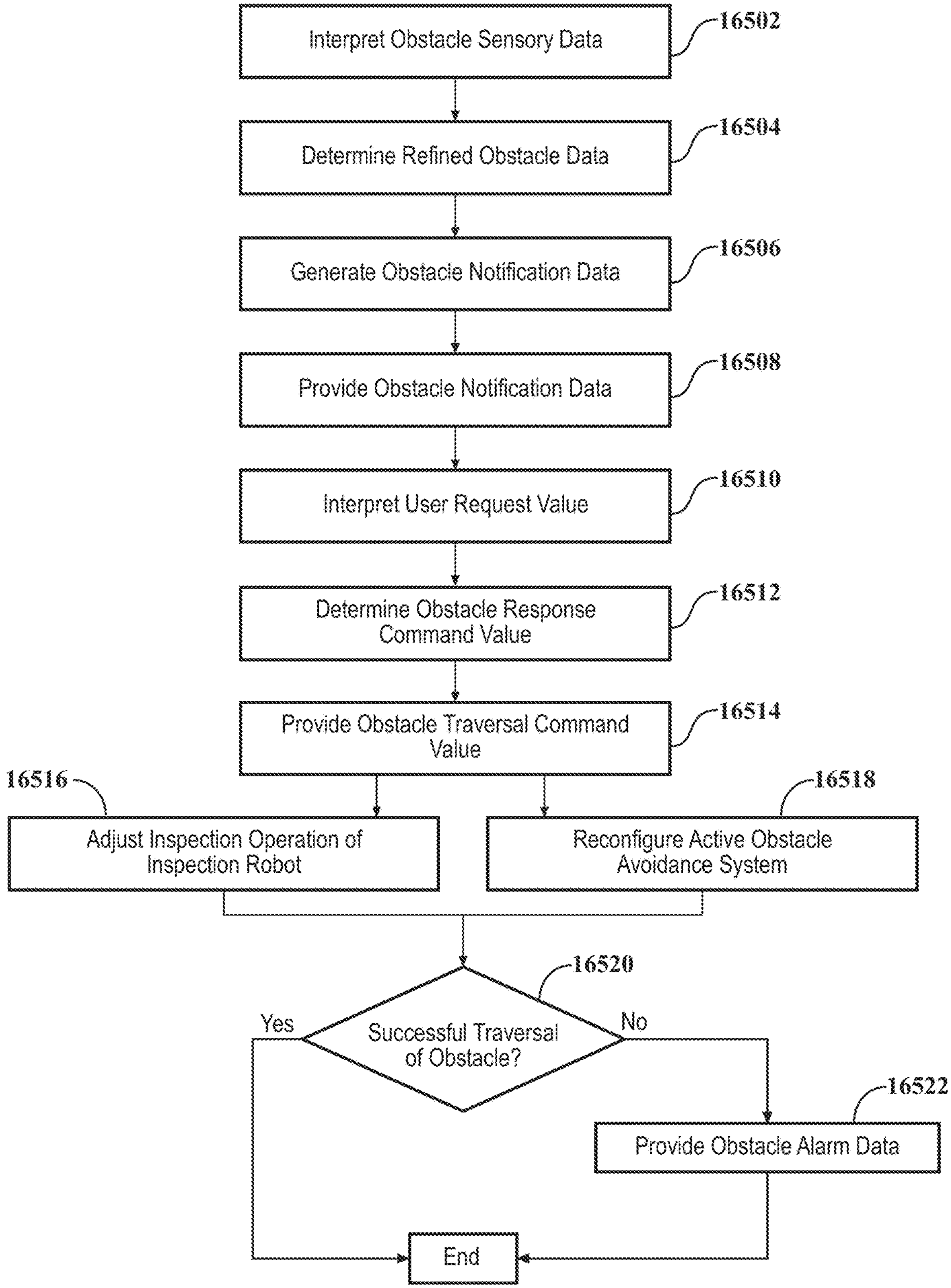

FIG. 164 is a flow chart depicting a method for traversing an obstacle with an inspection robot.

Figure 165:
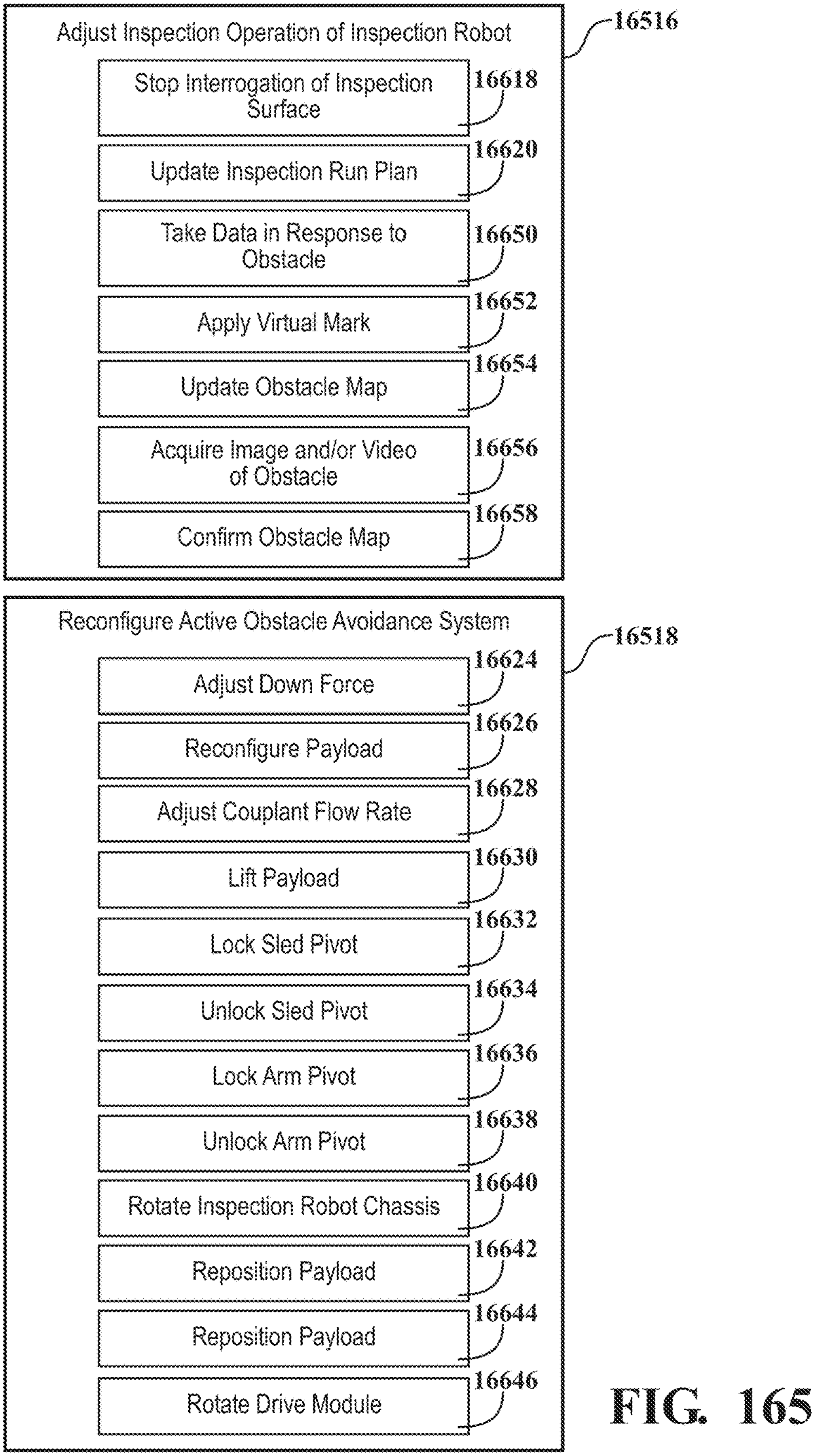

FIG. 165 is another flow chart depicting the method for traversing the obstacle with the inspection robot.

Figure 166:
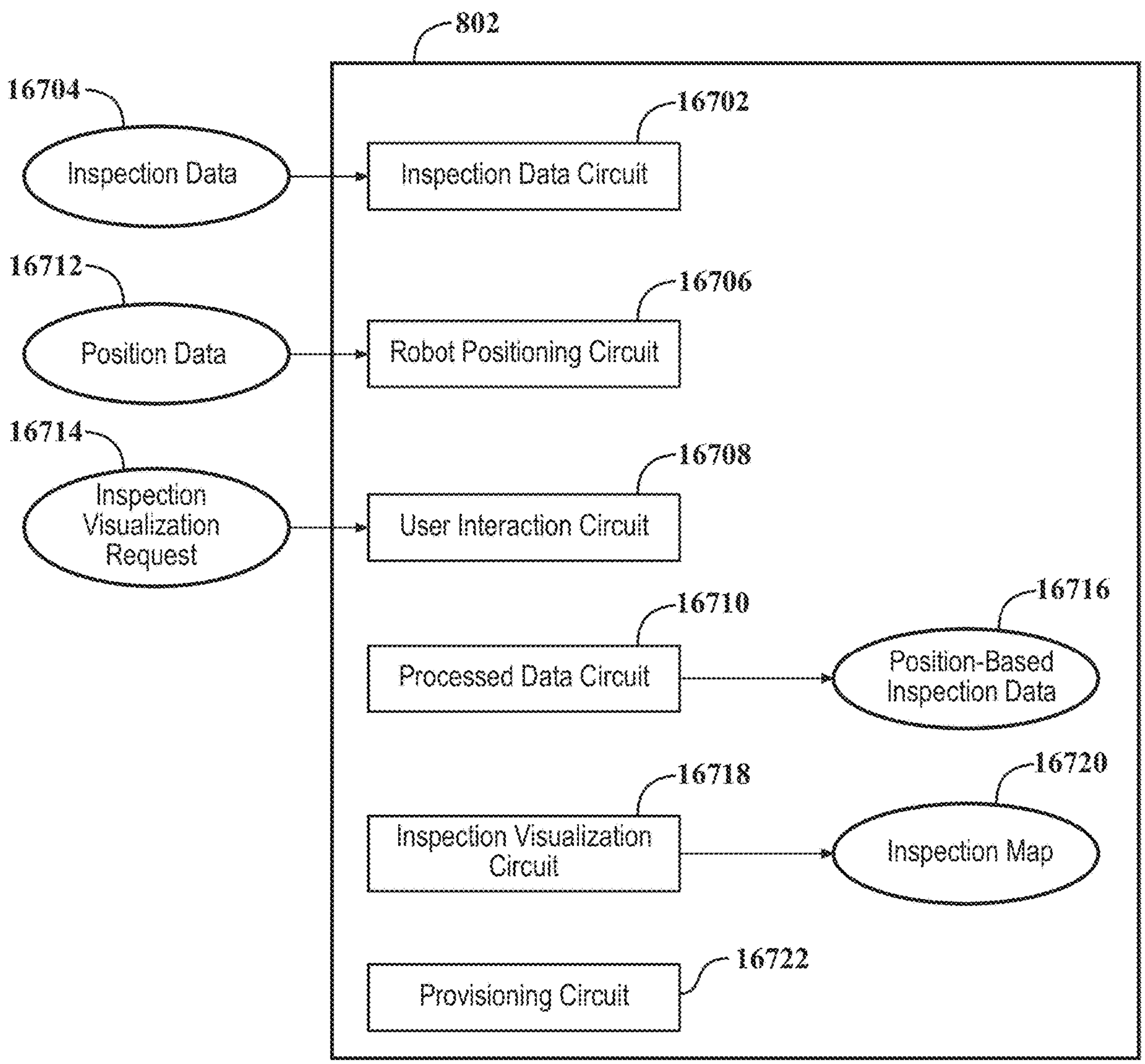

FIG. 166 depicts an apparatus for performing an inspection on an inspection surface with an inspection robot.

Figure 167:
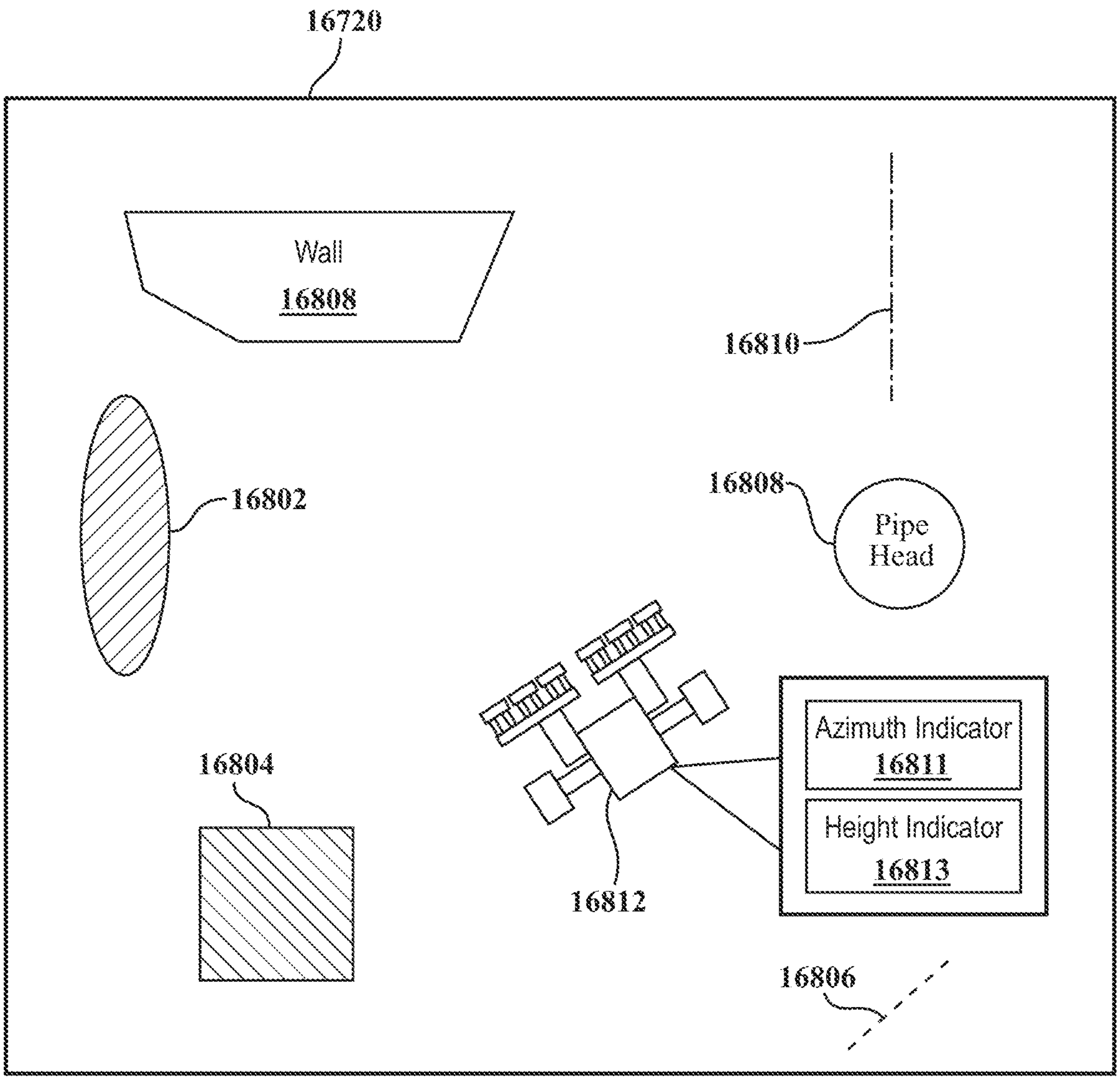
Figure 168:
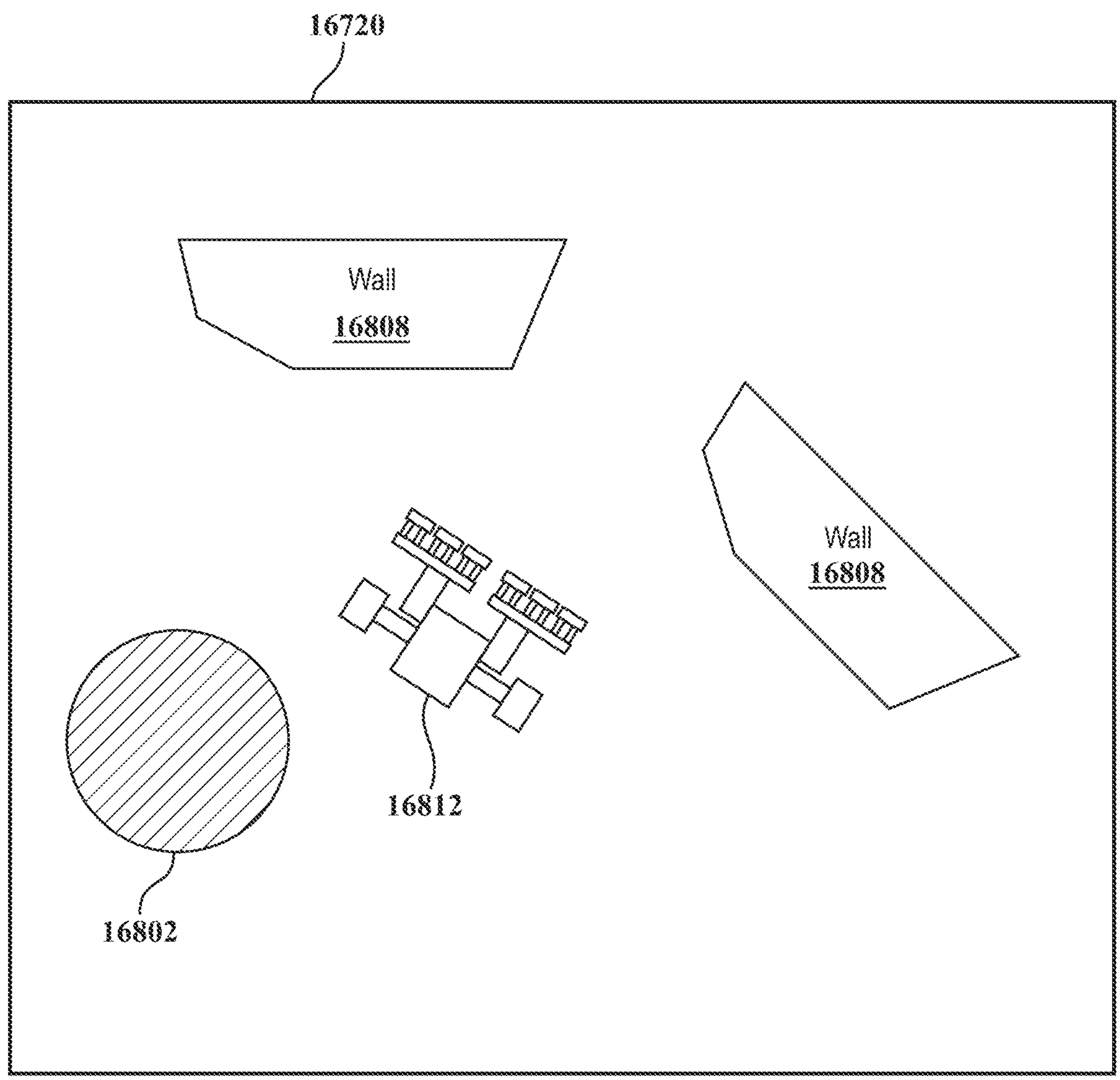

FIG. 167 and FIG. 168 depict an inspection map with features of the inspection surface and corresponding locations on the inspection surface.

Figure 169:
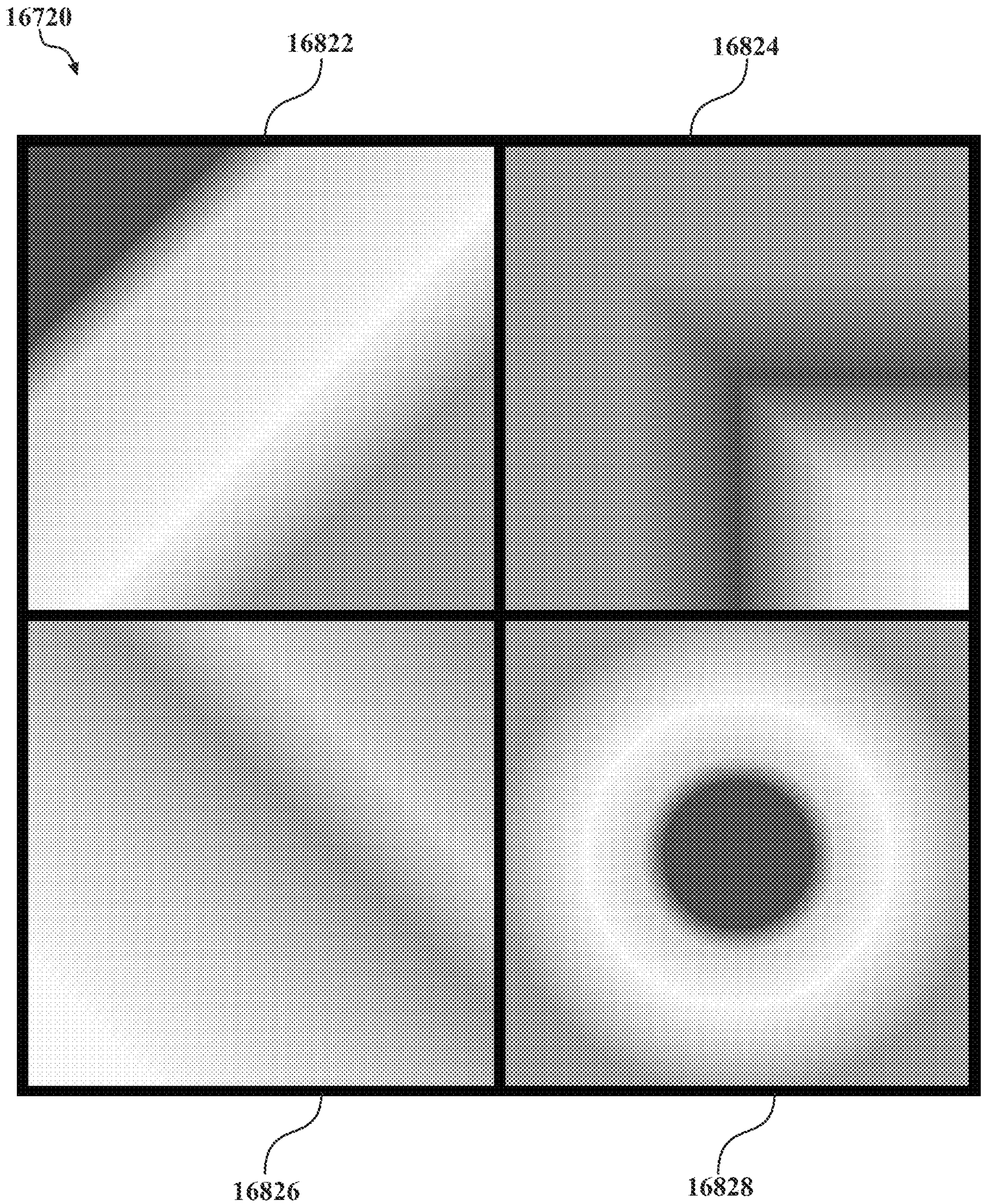

FIG. 169 is a schematic diagram of an inspection map depicting one or more features in one or more frames.

Figure 170:
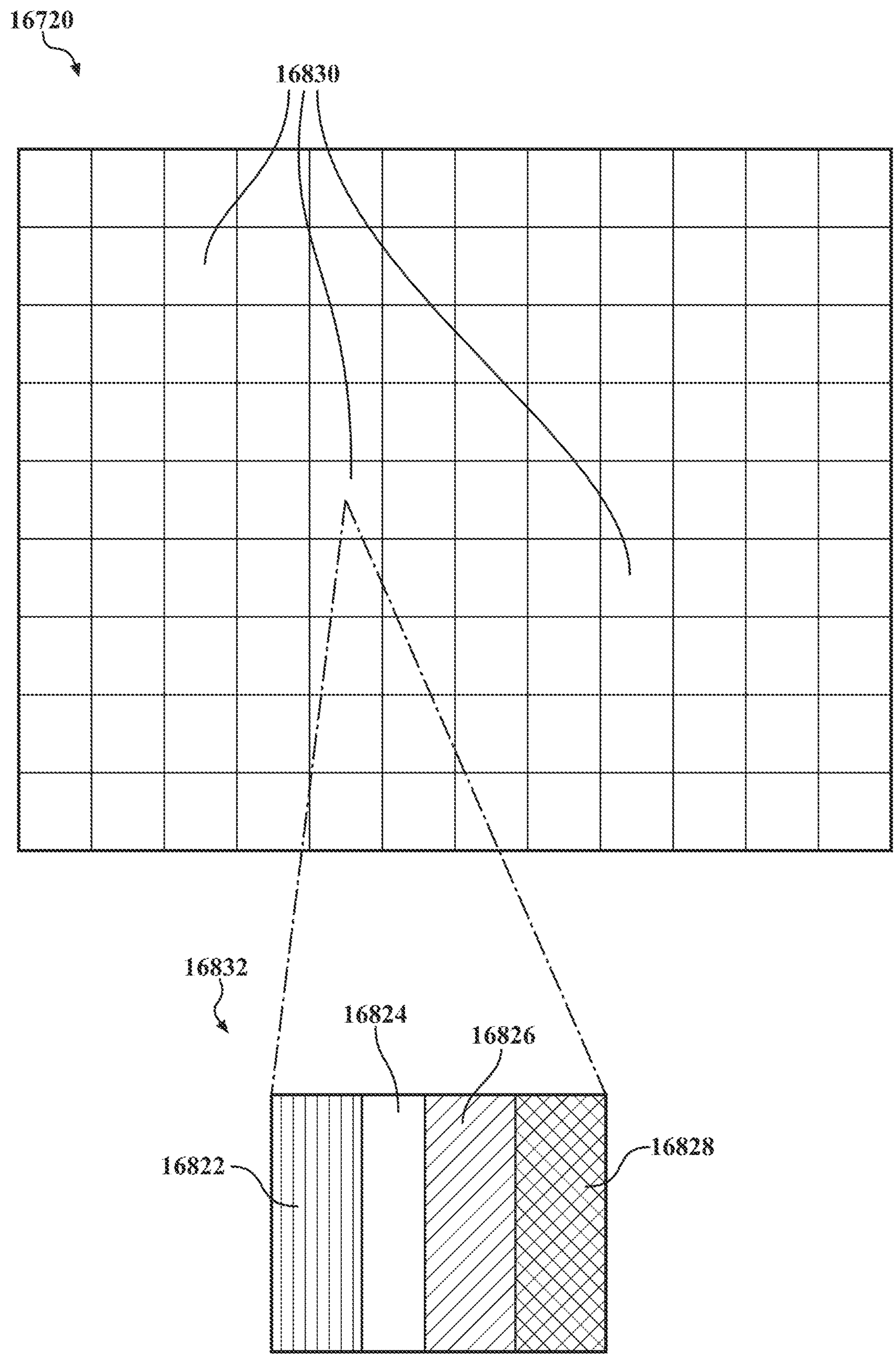

FIG. 170 is a schematic diagram of an inspection map depicting one or more features in one or more frames in a pop-up portion.

Figure 171:
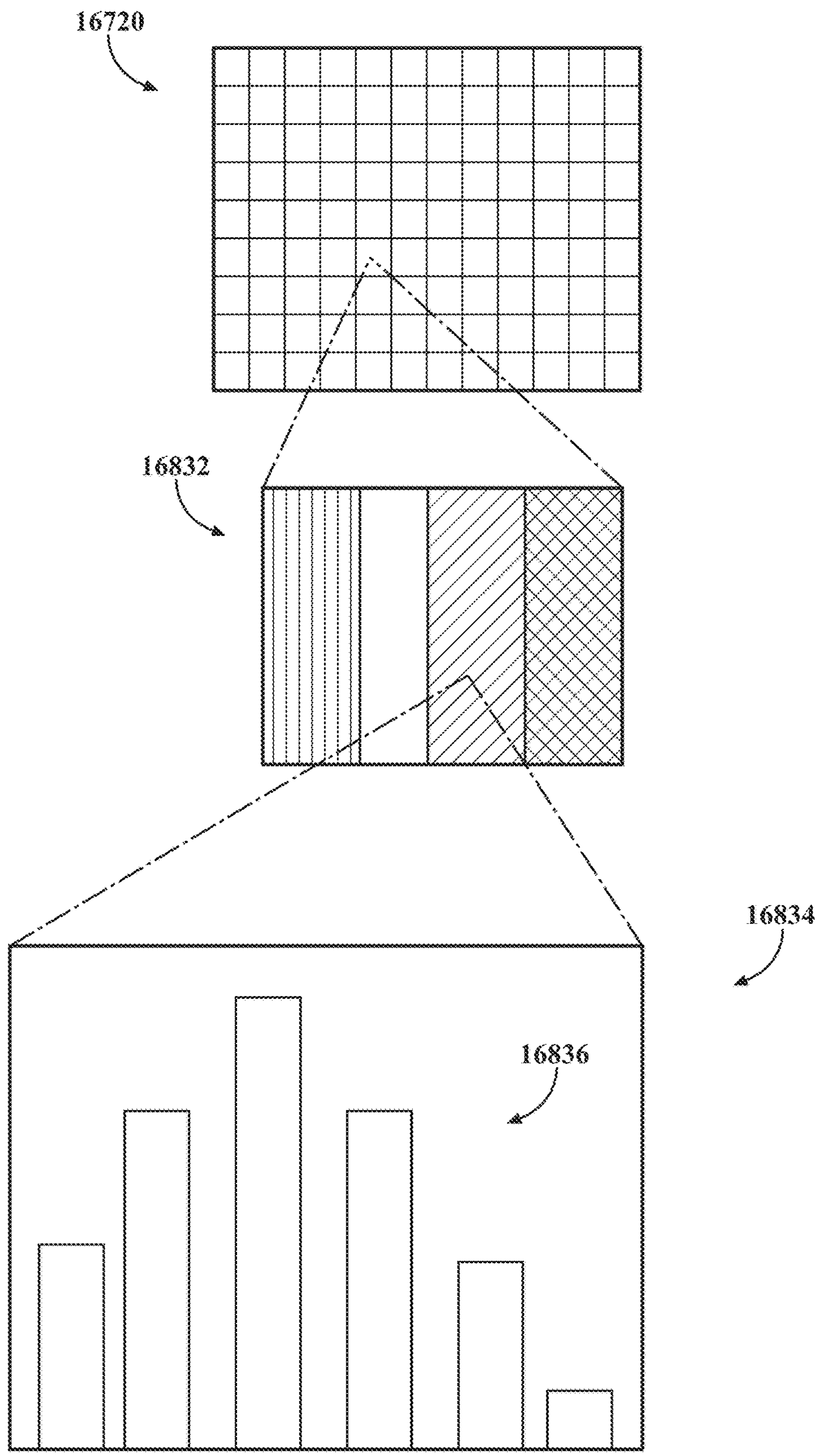

FIG. 171 is a schematic diagram of an inspection map depicting one or more features in one or more frames in a pop-up portion with a pop-up graph.

Figure 172:
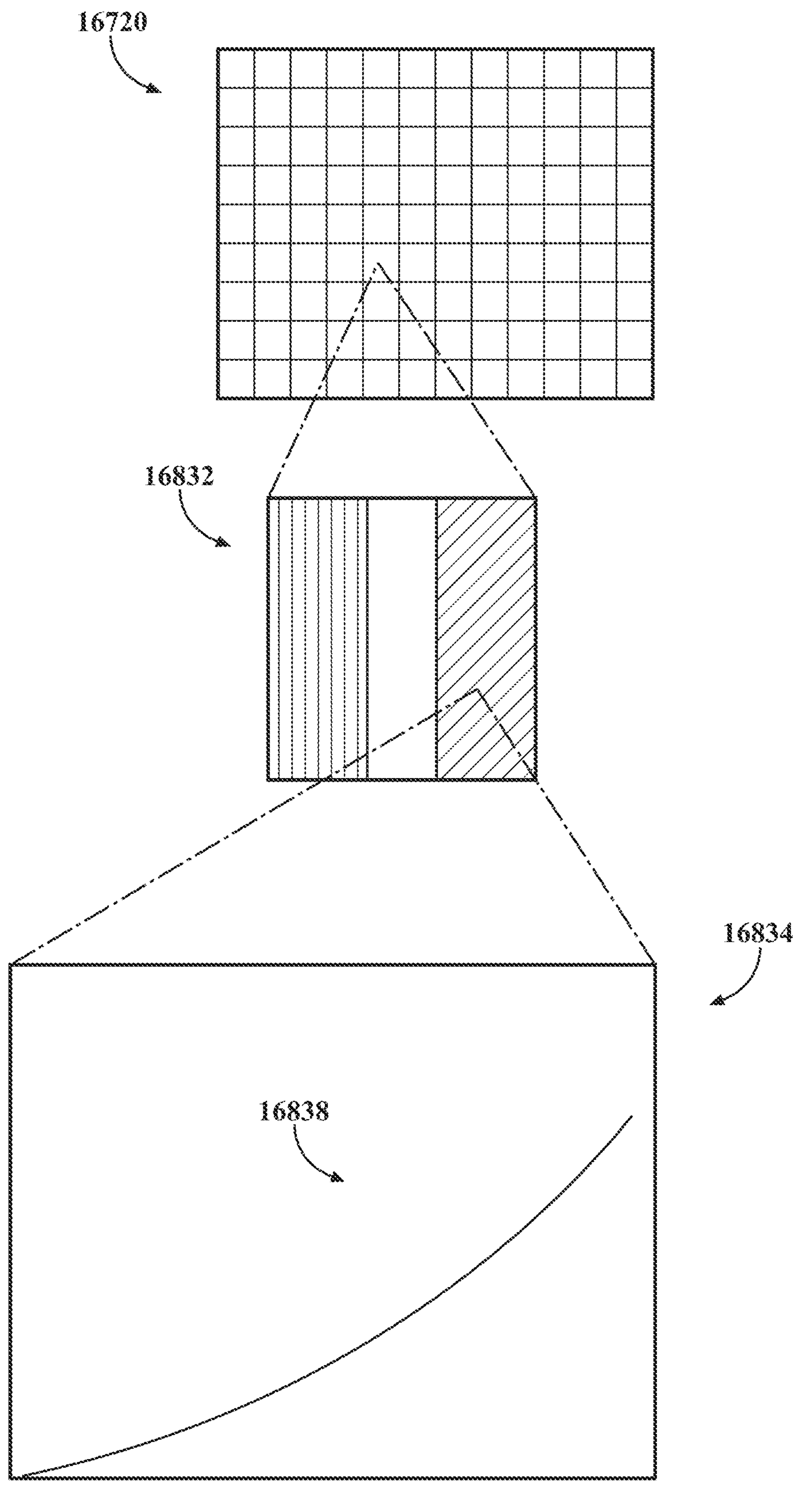

FIG. 172 is a schematic diagram of an inspection map depicting one or more features in one or more frames in a pop-up portion with a pop-up graph.

Figure 173:
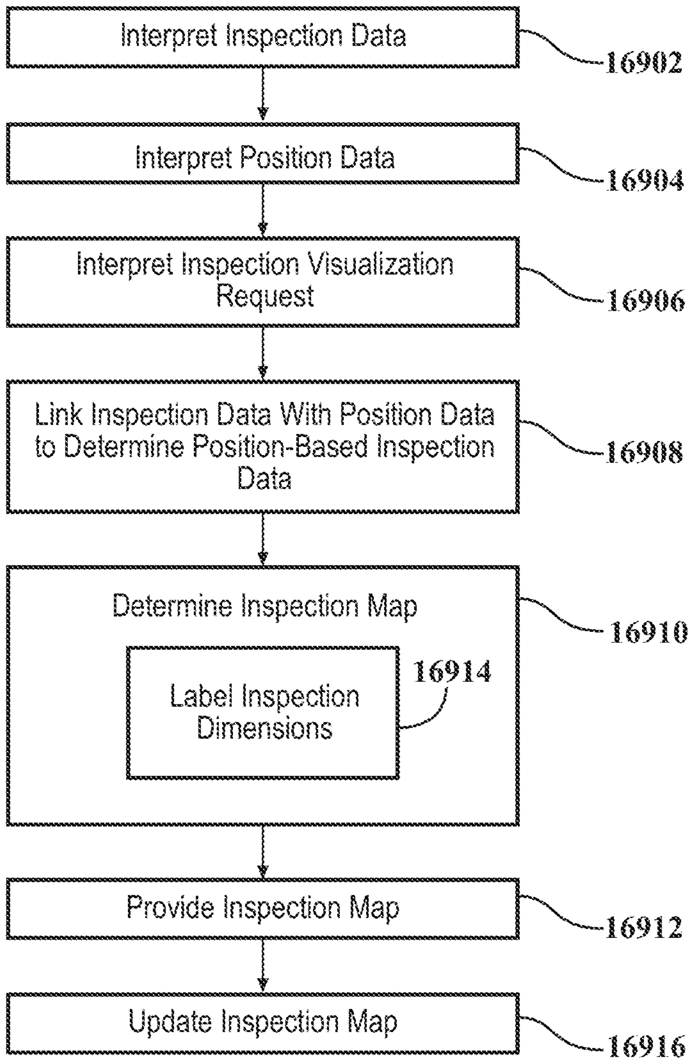

FIG. 173 depicts a method for performing an inspection on an inspection surface with an inspection robot.

Figure 174:
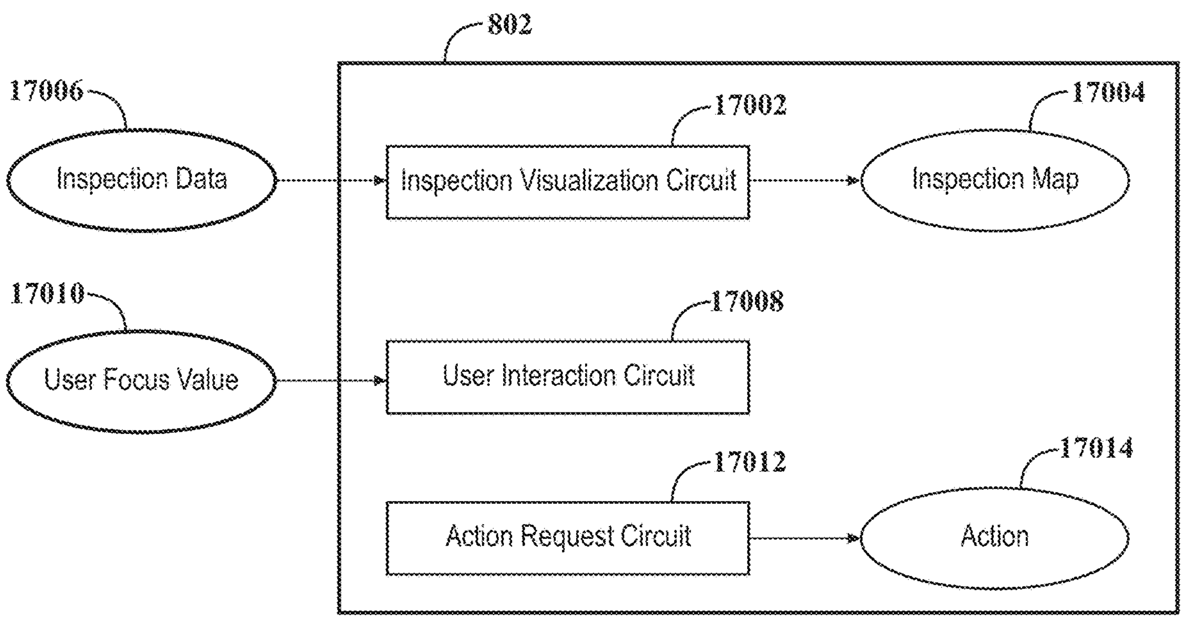

FIG. 174 is a schematic diagram of a controller for an inspection robot.

Figure 175:
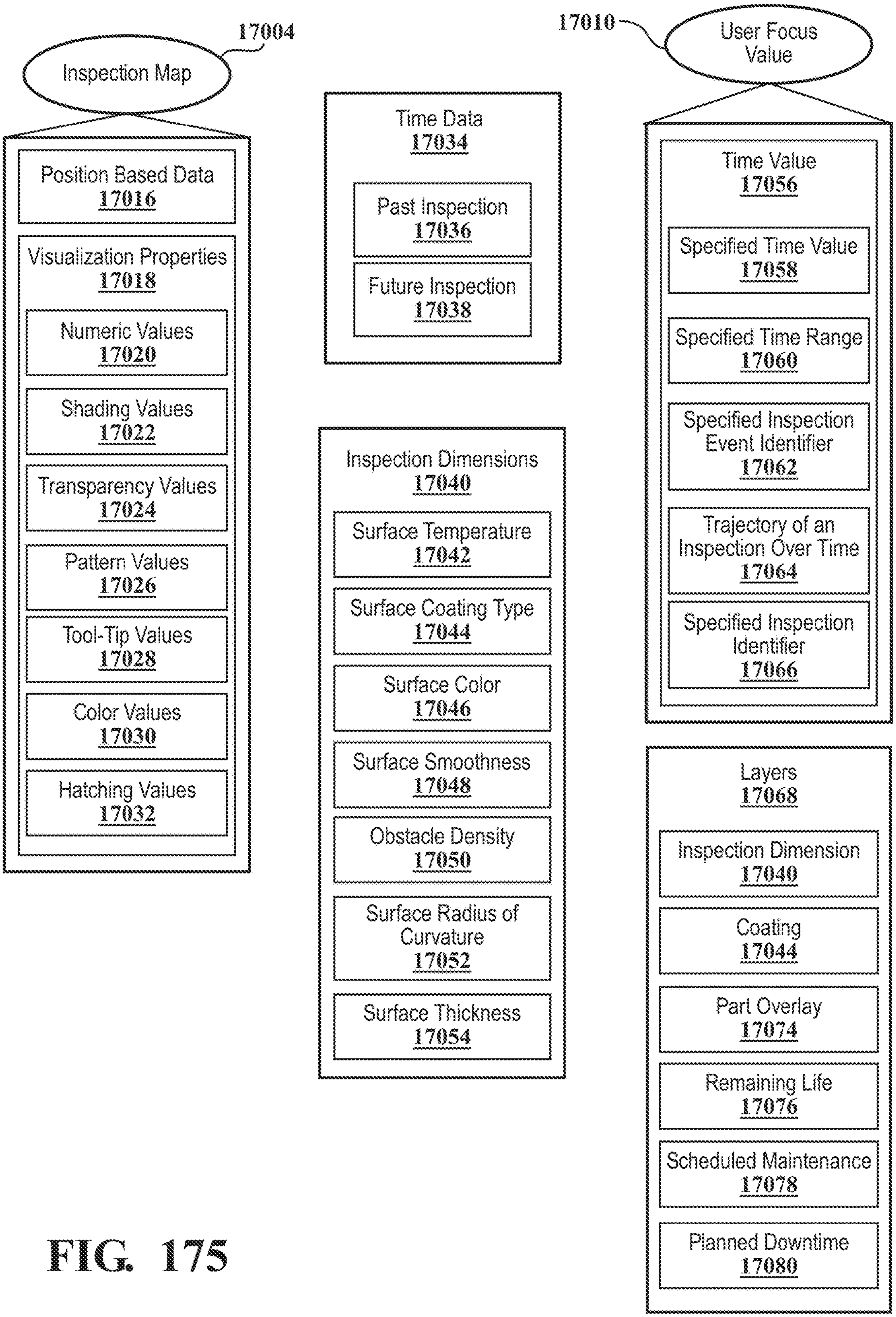

FIG. 175 is a schematic diagram depicting data structure used by embodiments of the controller of FIG. 174.

Figure 176:
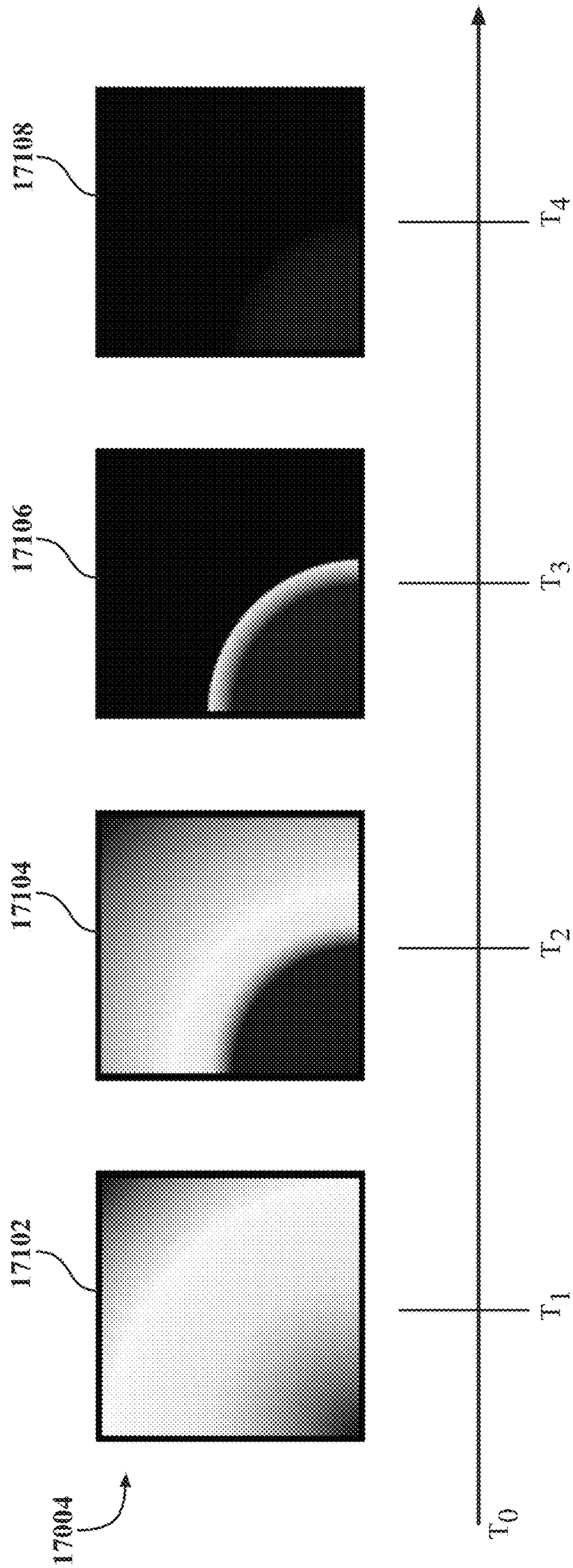

FIG. 176 is a schematic diagram of an inspection map.

Figure 177:
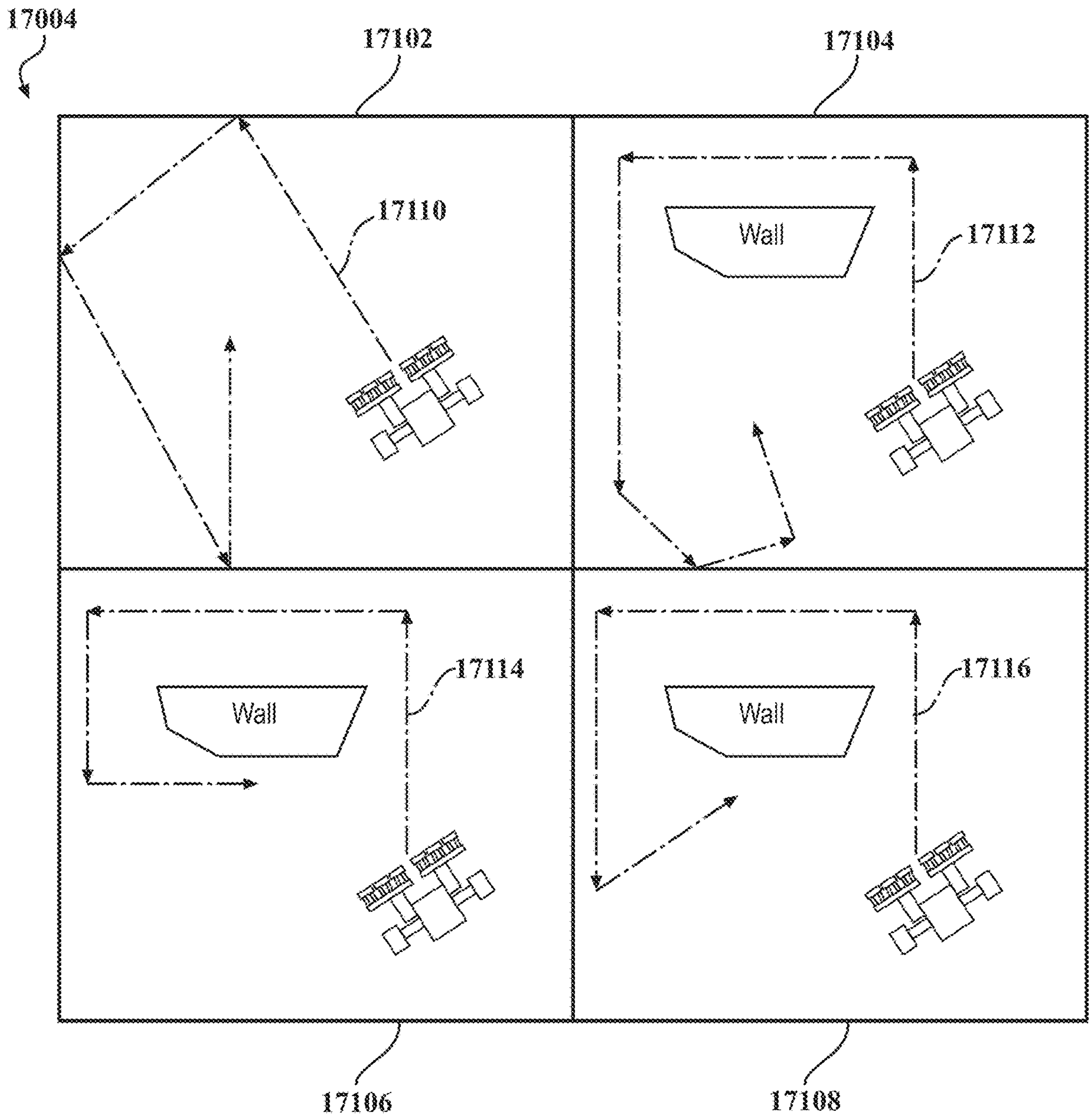

FIG. 177 is a schematic diagram of an inspection map.

Figure 178:
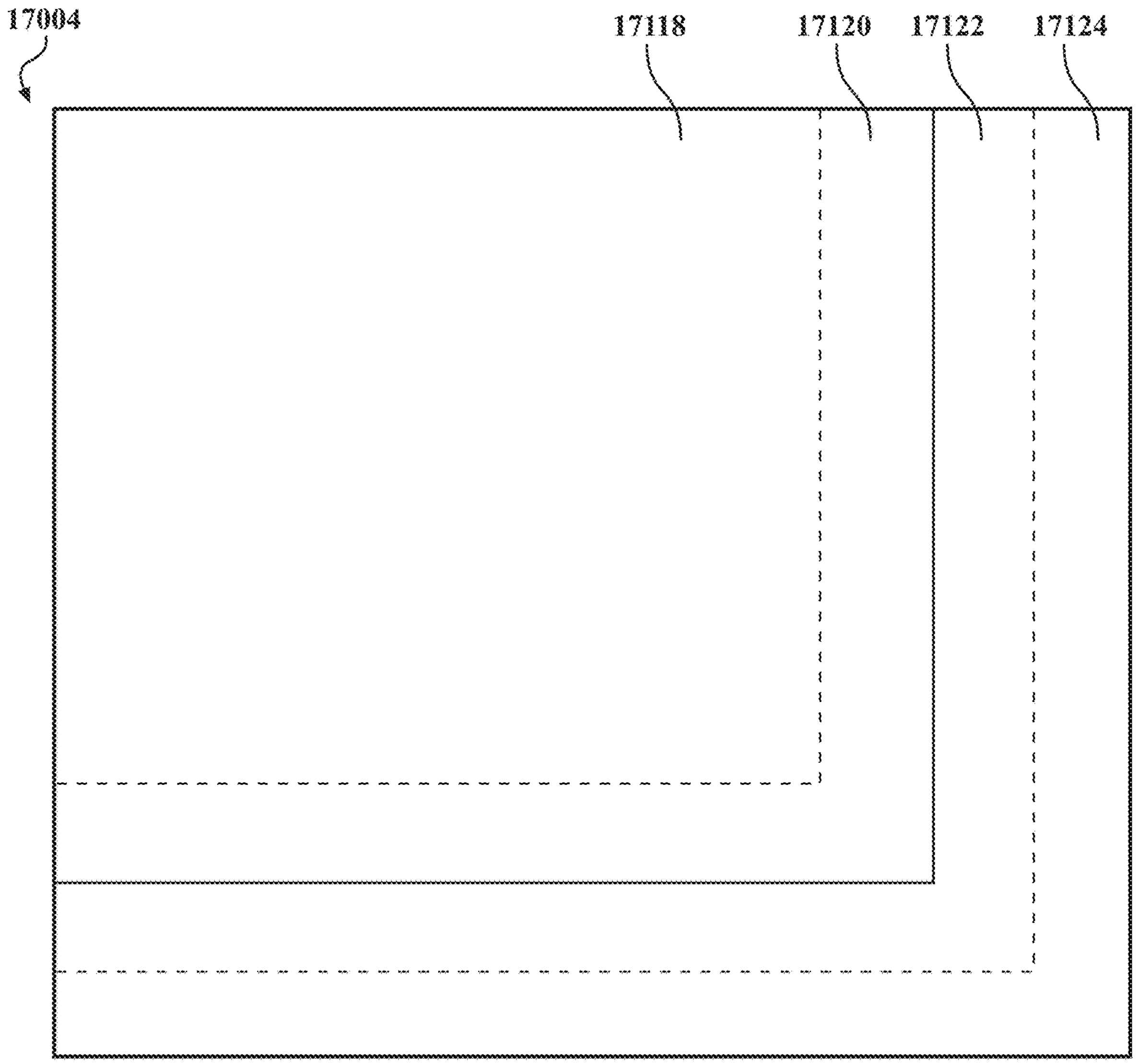

FIG. 178 is a schematic diagram of an inspection map.

Figure 179:
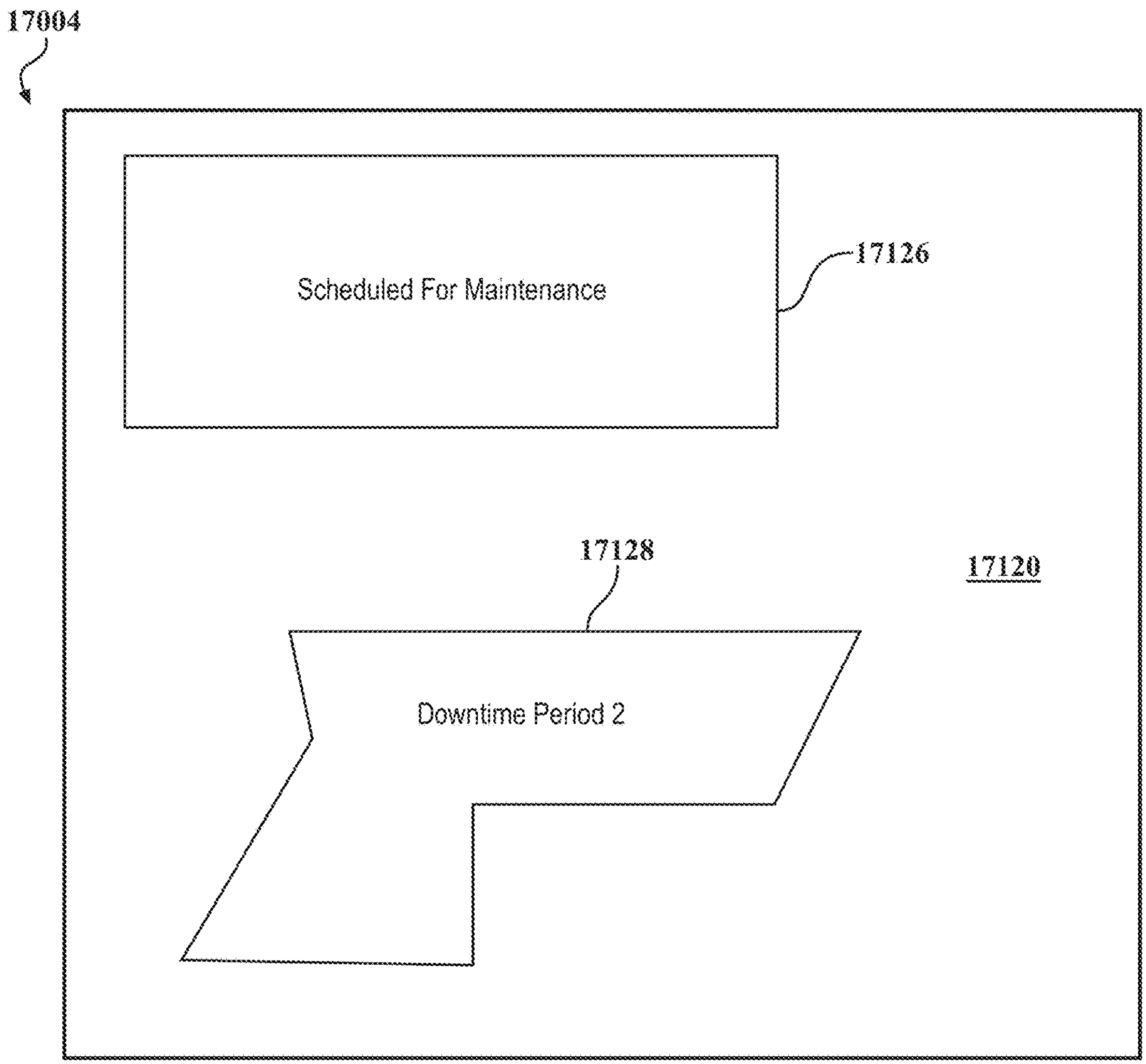

FIG. 179 is a diagram of an inspection map.

Figure 180:
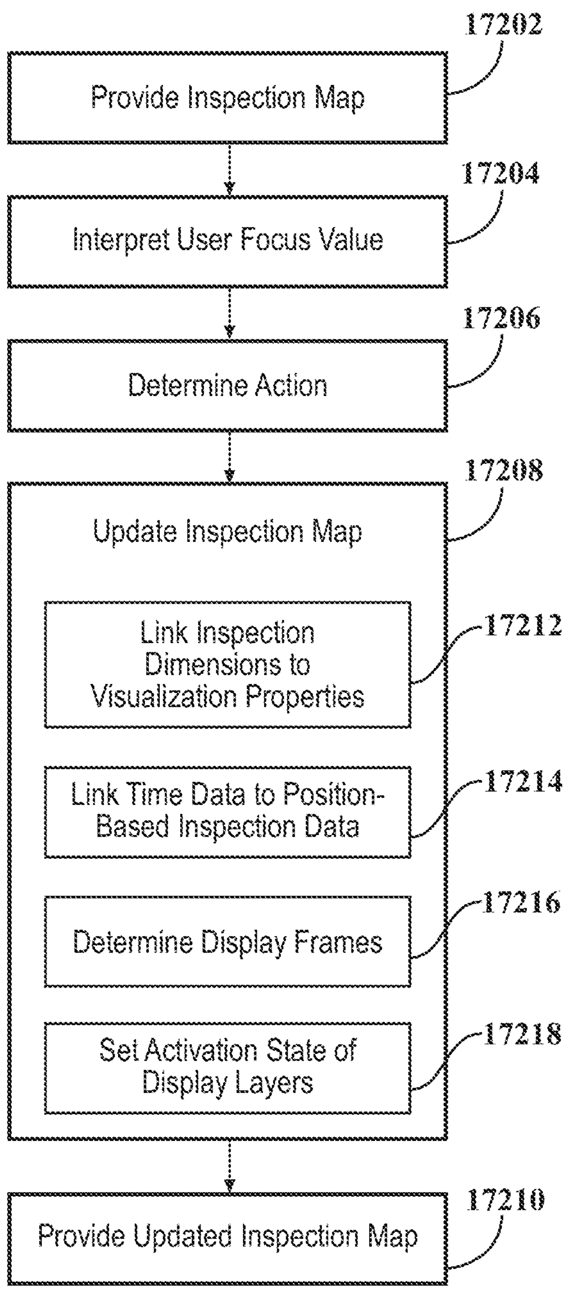

FIG. 180 is a flow chart depicting a method for providing an interactive inspection map.

Figure 181:
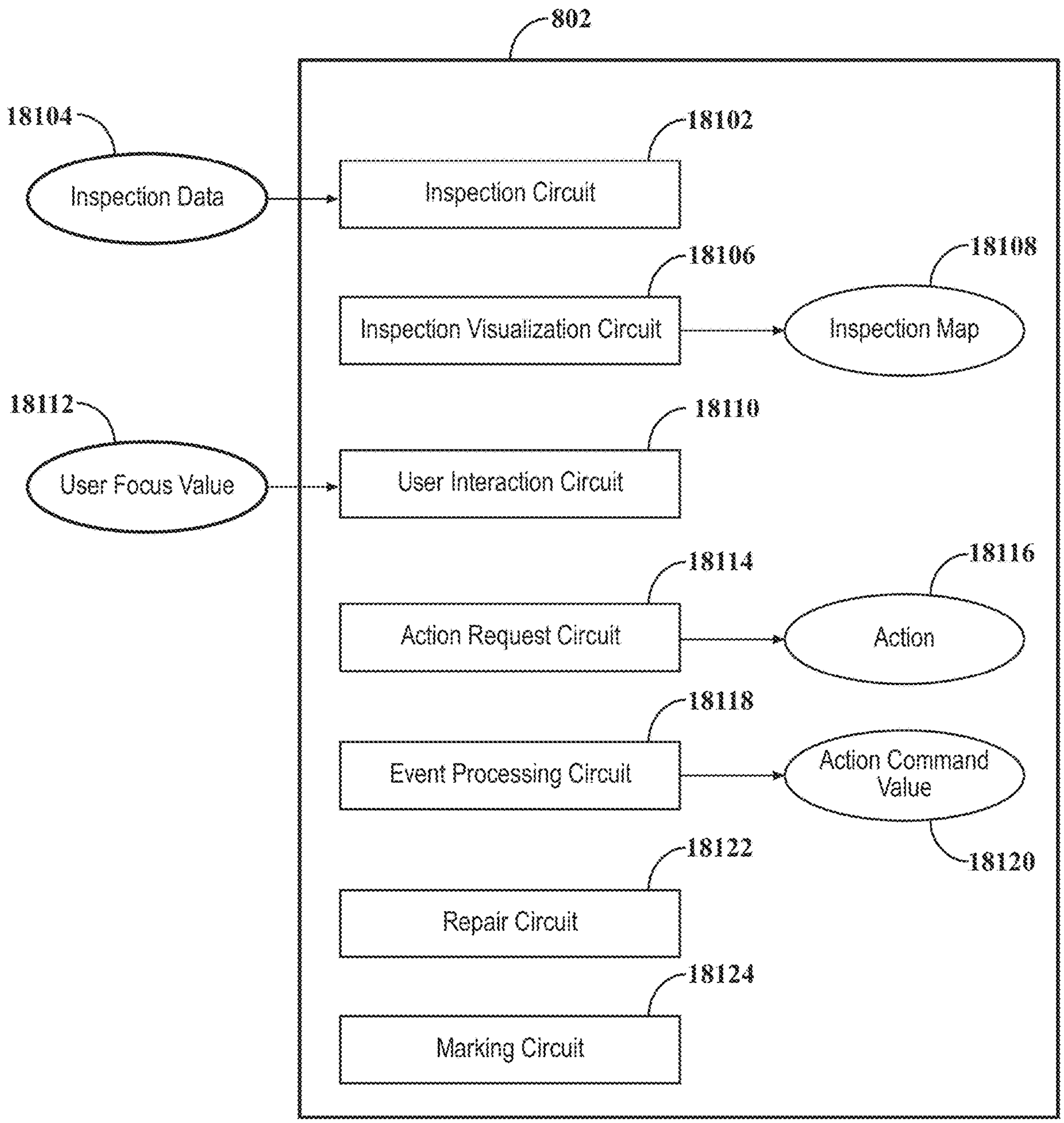

FIG. 181 is a schematic diagram of a controller for an inspection robot.

Figure 182:
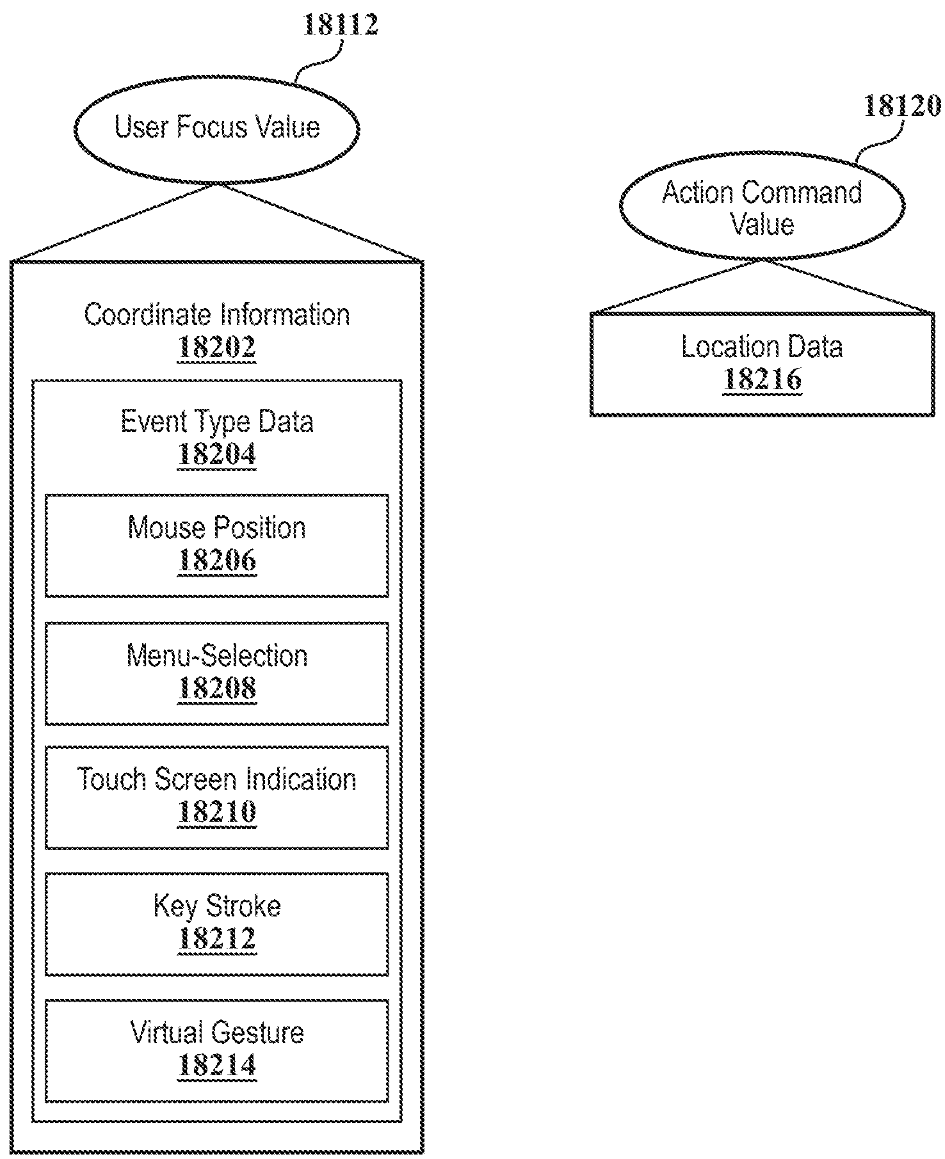

FIG. 182 is a schematic diagram of a user focus value and an action command value utilized by embodiments of the controller of FIG. 181.

Figure 183:
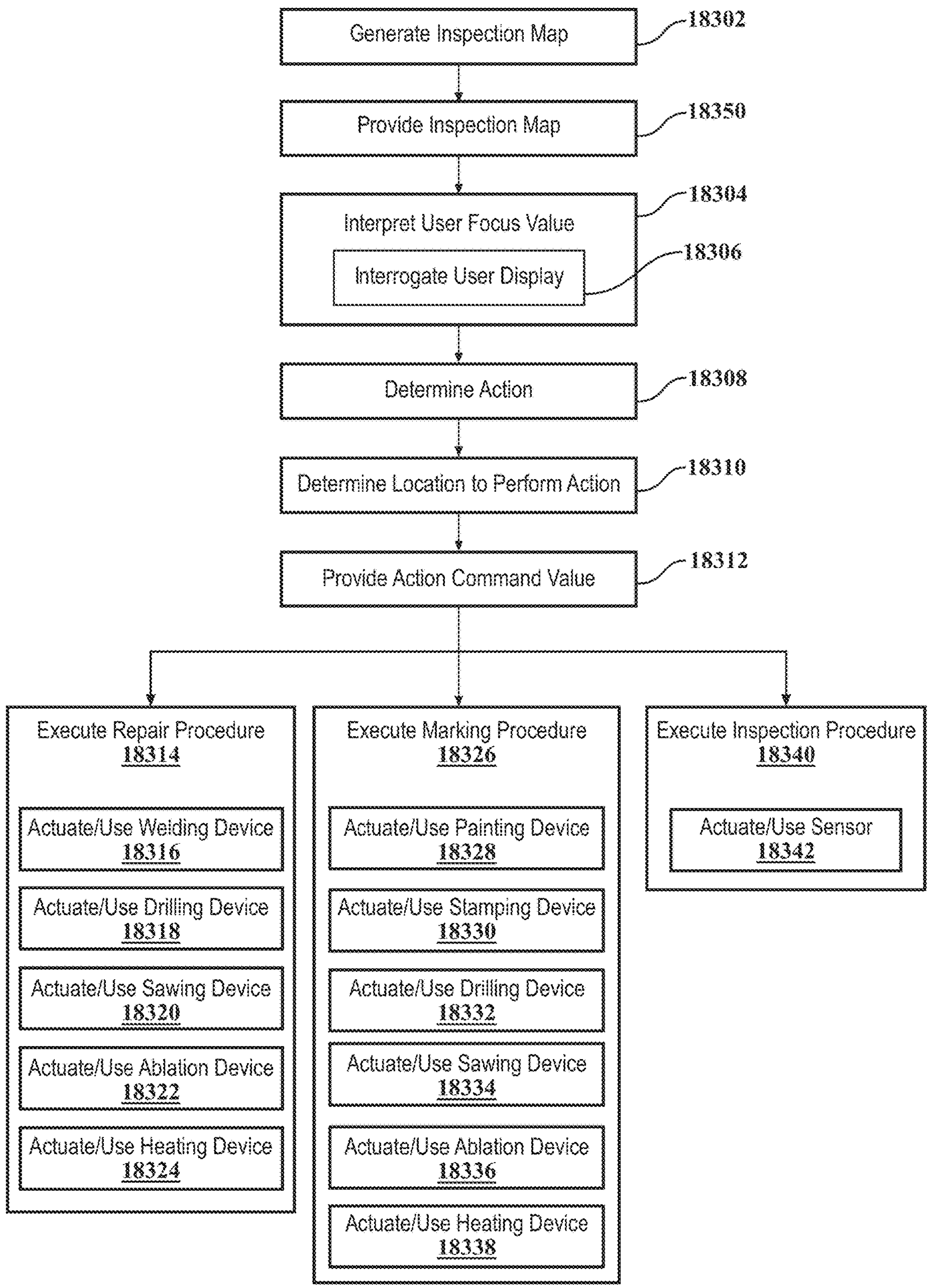

FIG. 183 is a flow chart depicting a method for inspecting and/or repairing an inspection surface.

Figure 184:
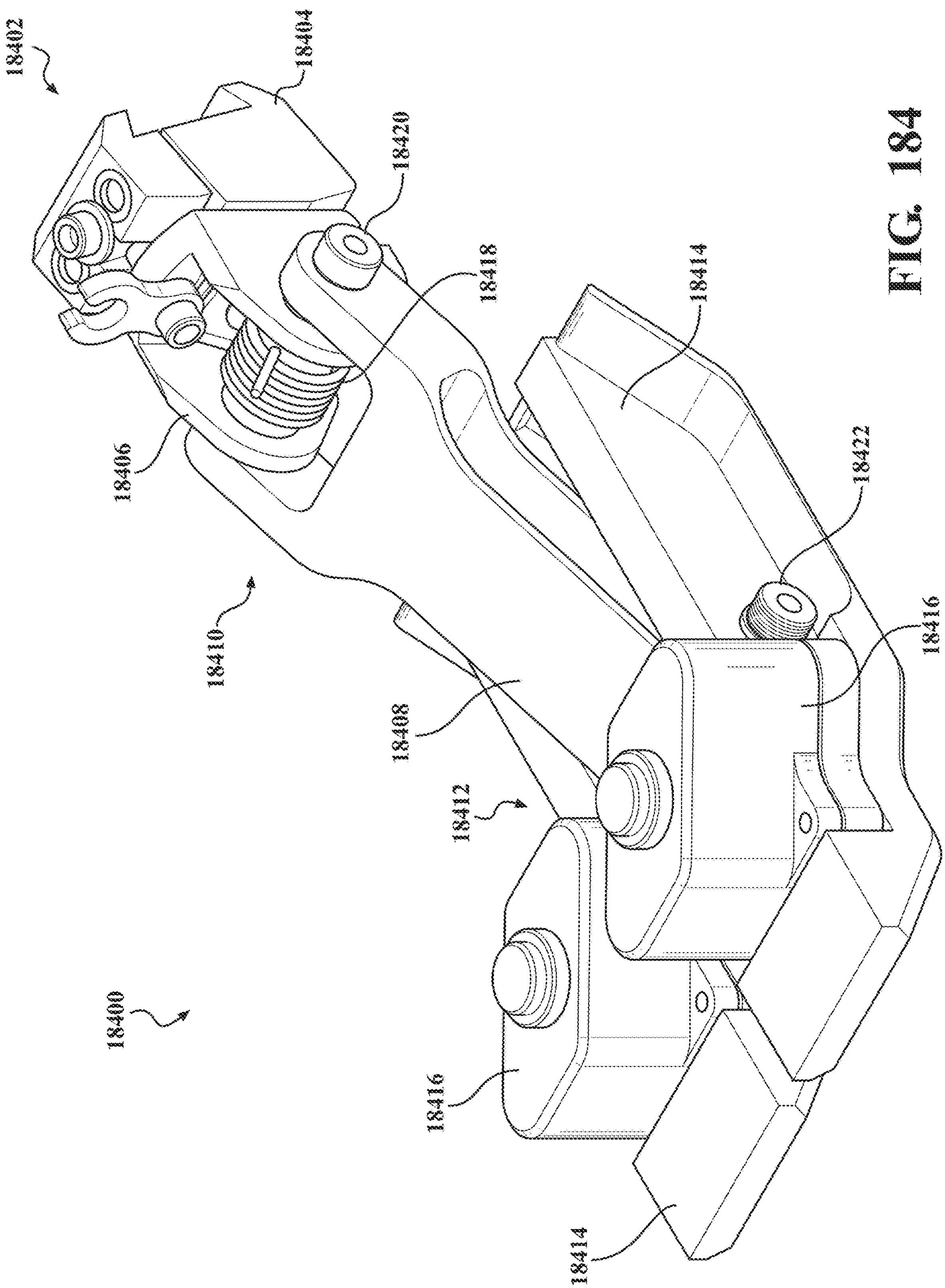

FIG. 184 depicts a payload for an inspection robot.

Figure 185:
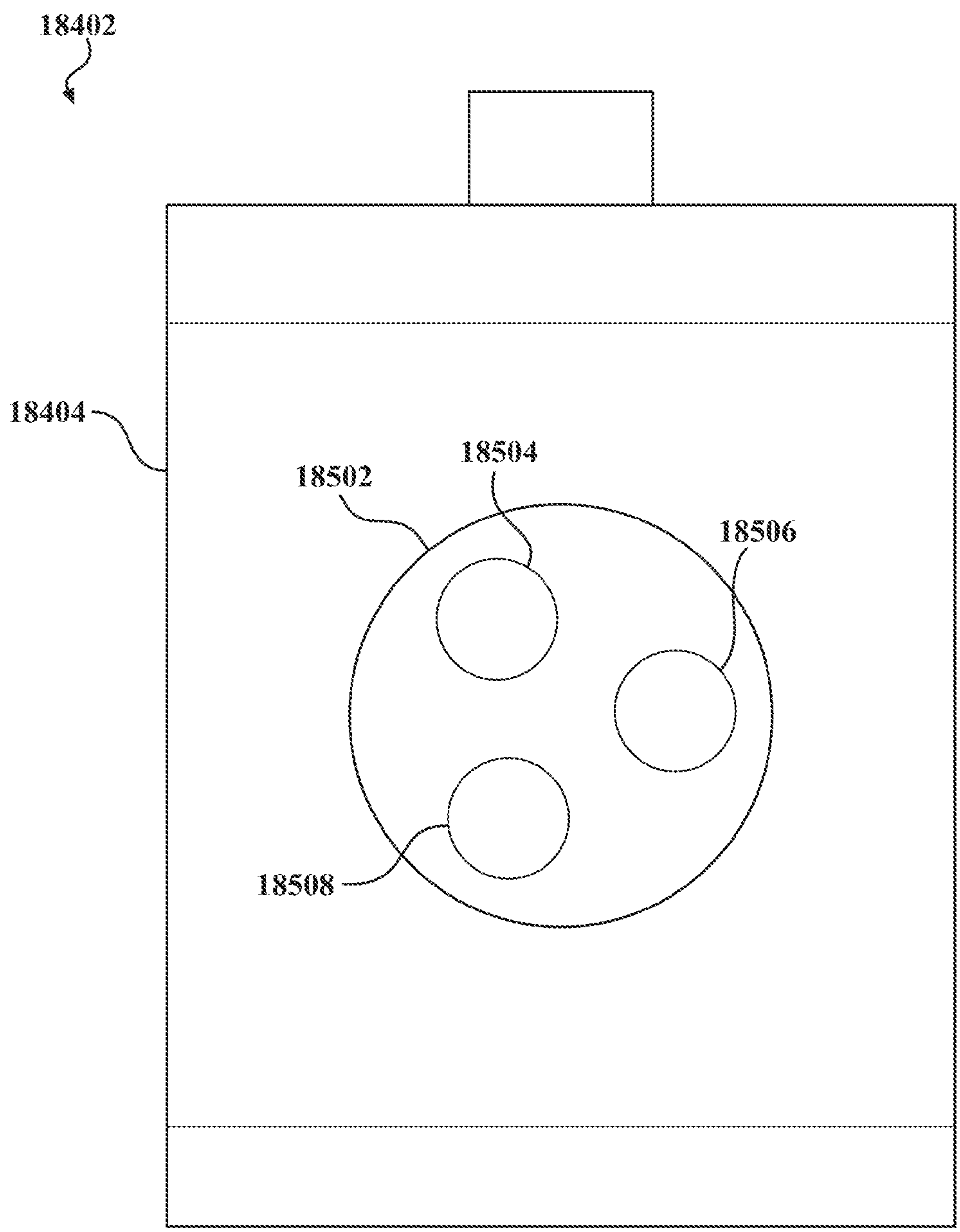

FIG. 185 depicts a payload coupler for a payload of an inspection robot for inspecting an inspection surface.

Figure 186:
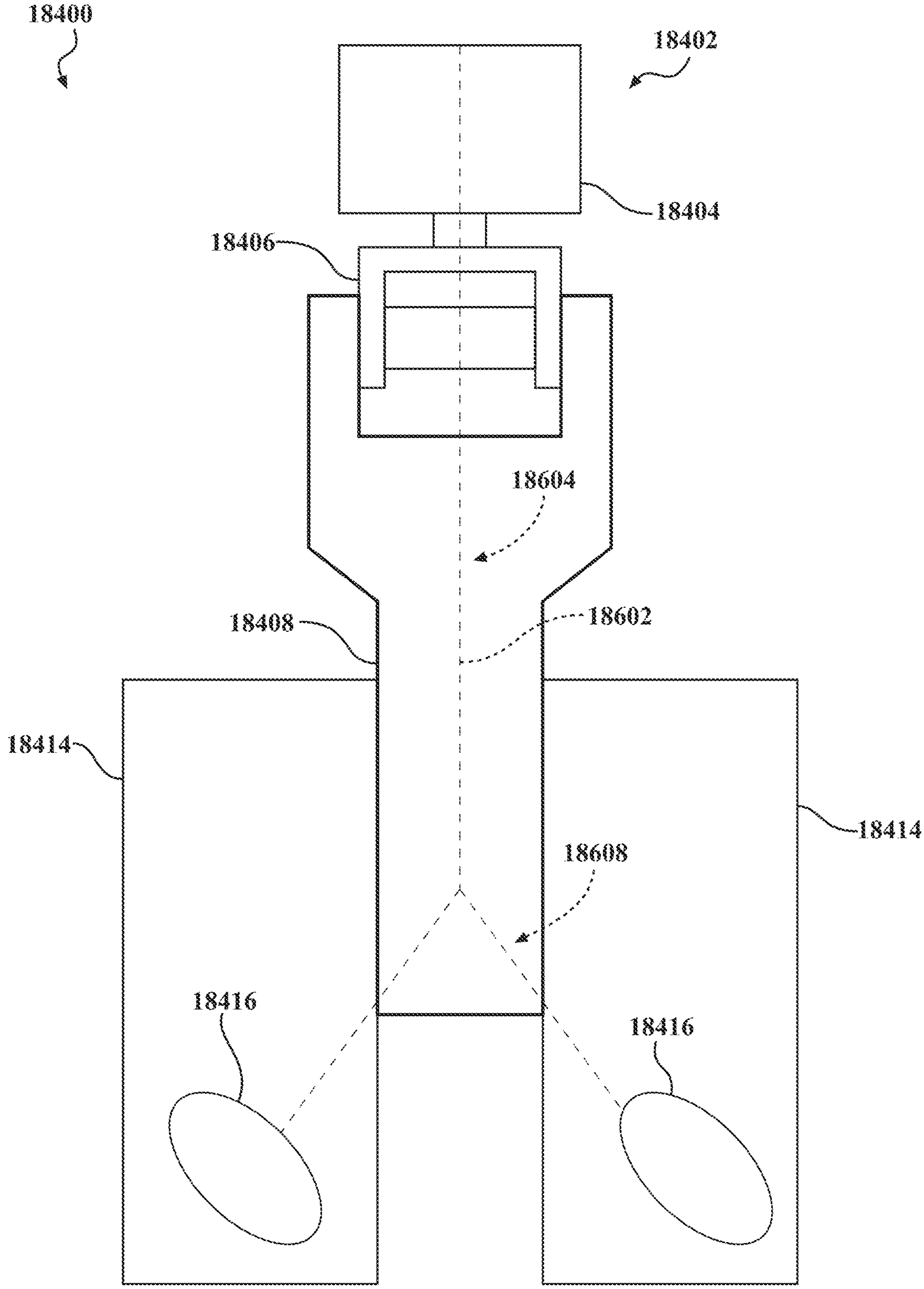

FIG. 186 depicts a payload for an inspection robot.

Figure 187:
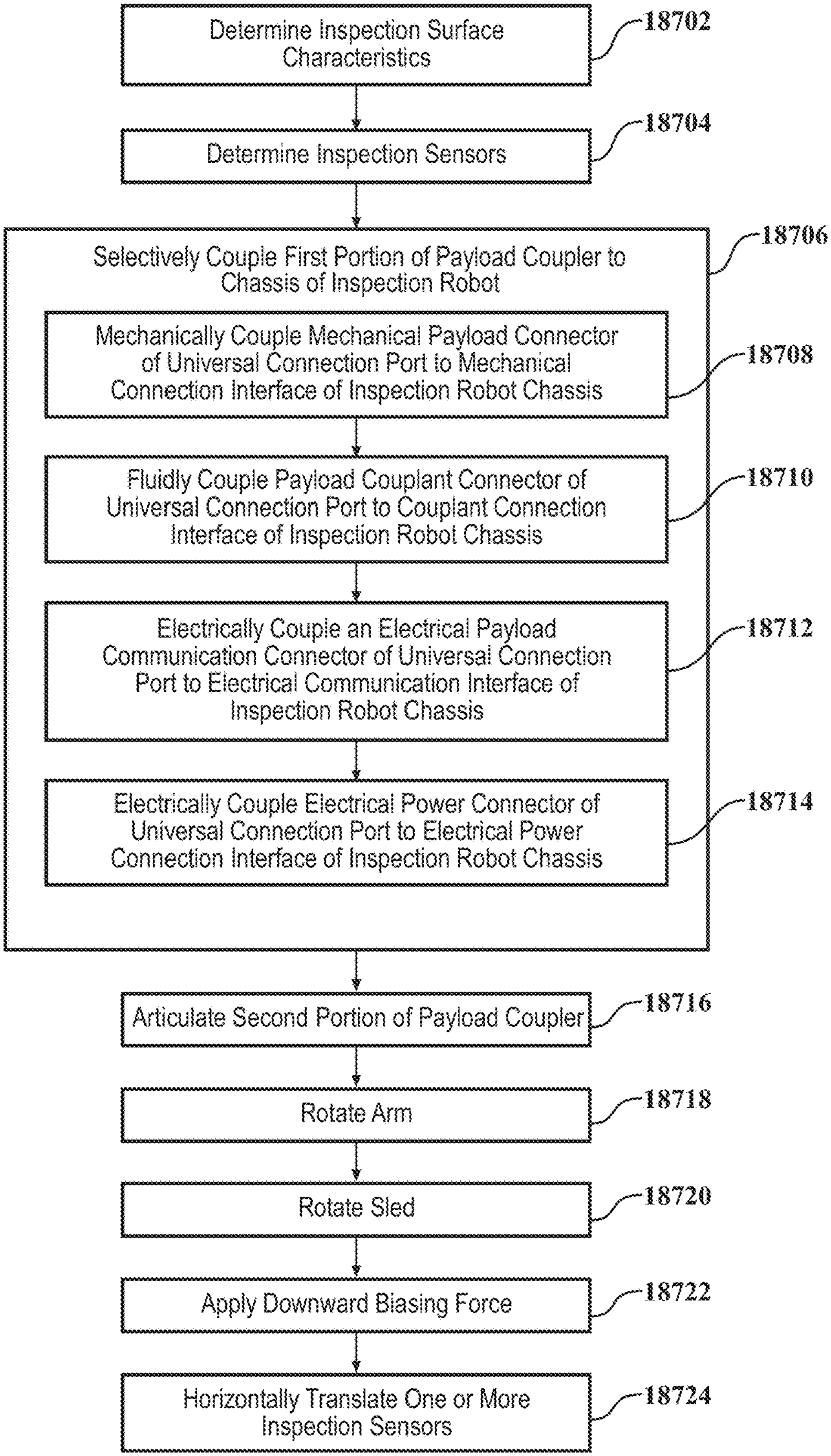

FIG. 187 depicts a method of inspecting an inspection surface with an inspection robot.

Figure 188:
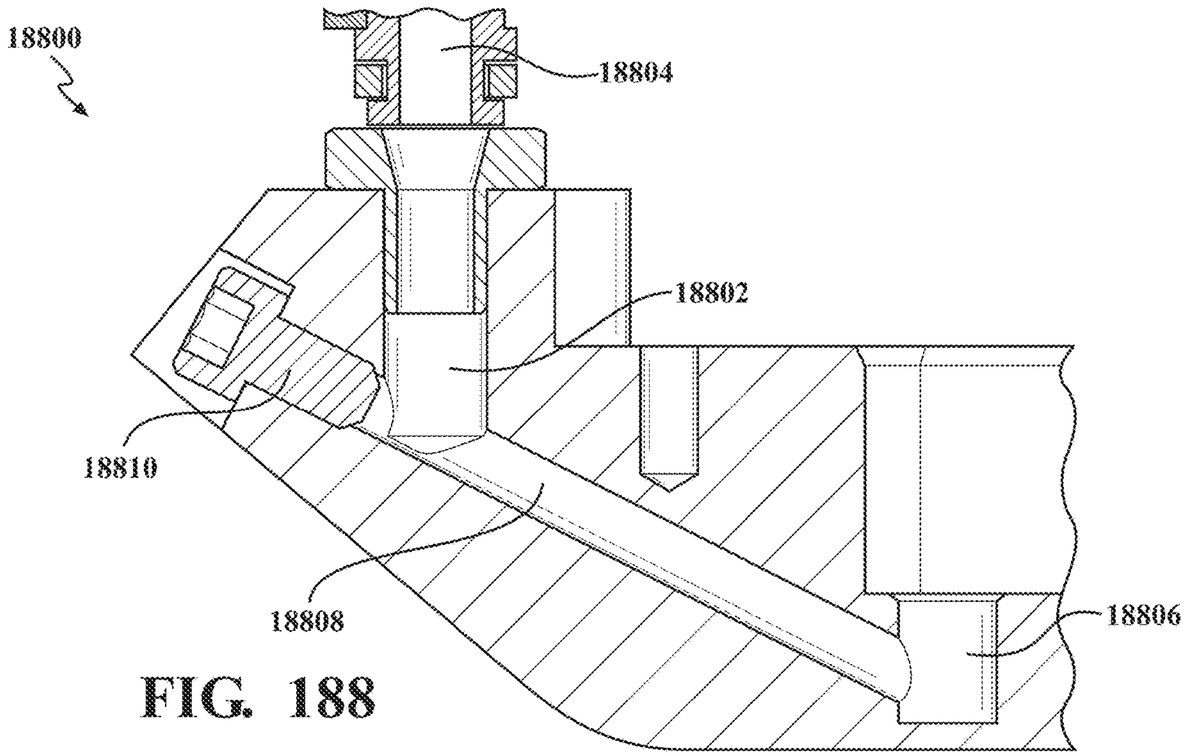

FIG. 188 depicts a side cutaway view of an example couplant routing mechanism for a sled.

Figure 189:
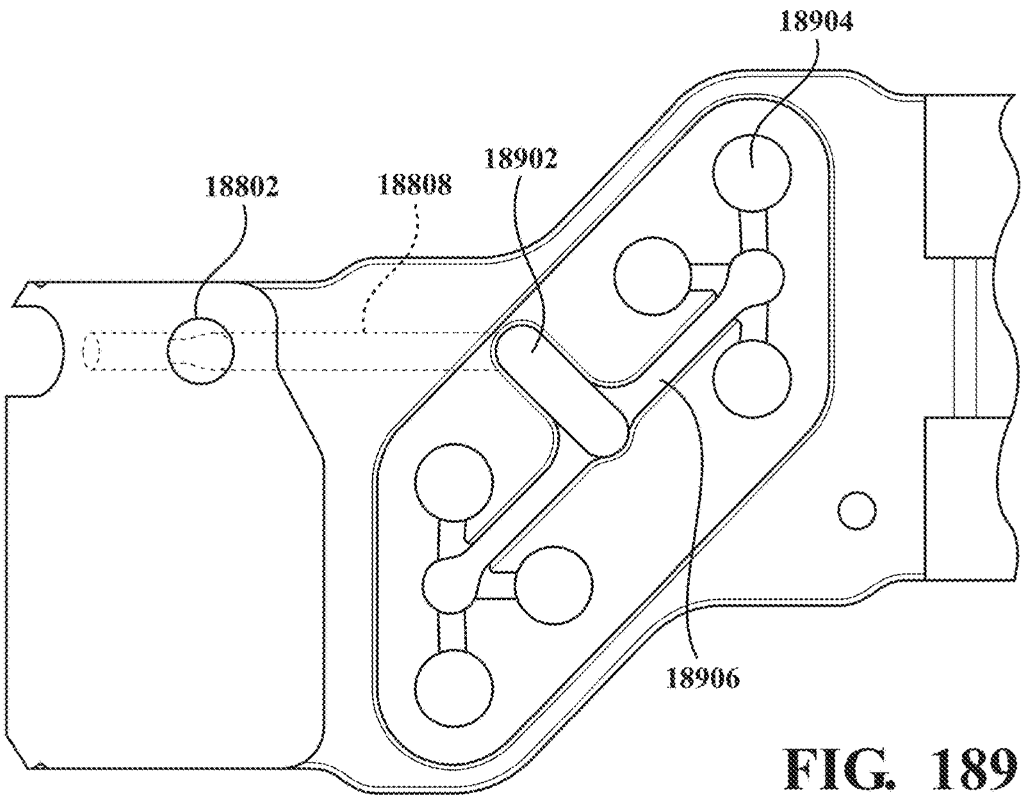

FIG. 189 depicts a partial cutaway bottom view of the example couplant routing mechanism for a sled.

Figure 190:
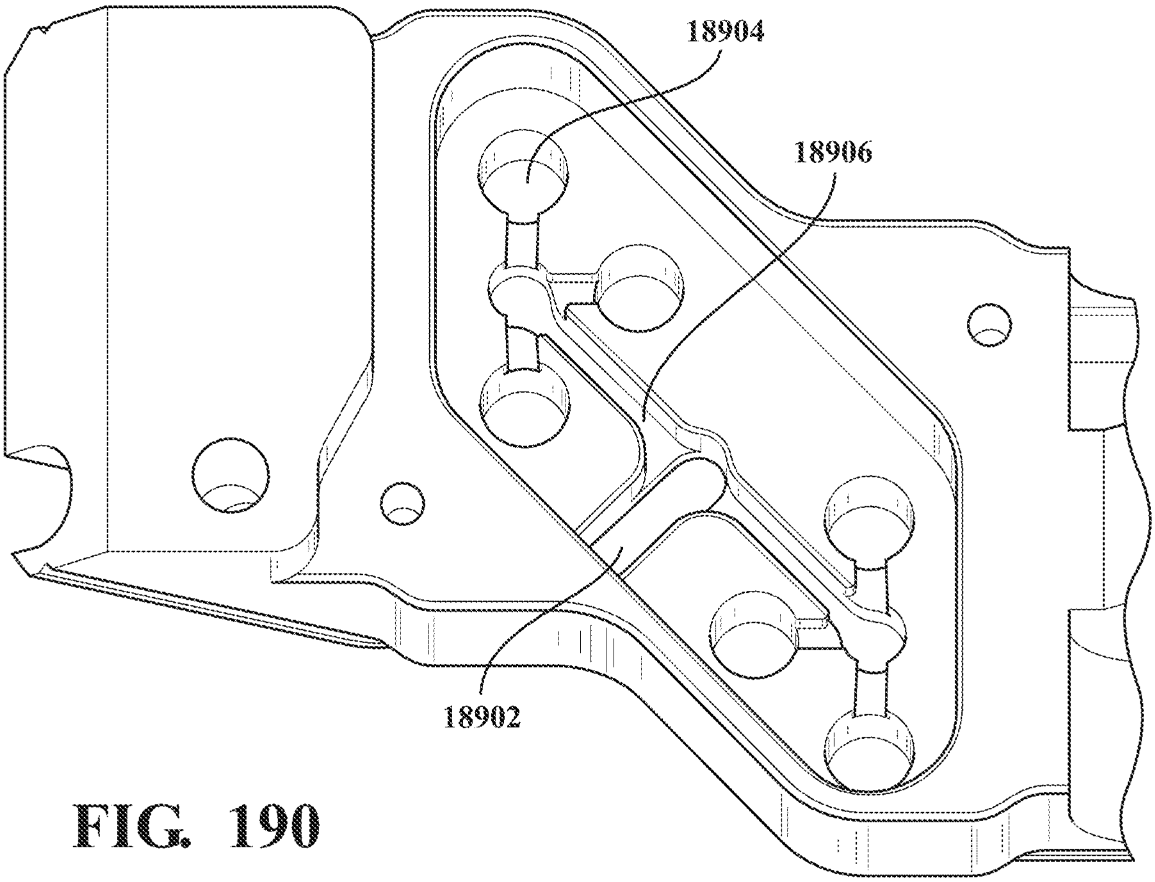

FIG. 190 depicts a perspective view of the example couplant routing mechanism for a sled.

Figure 191:
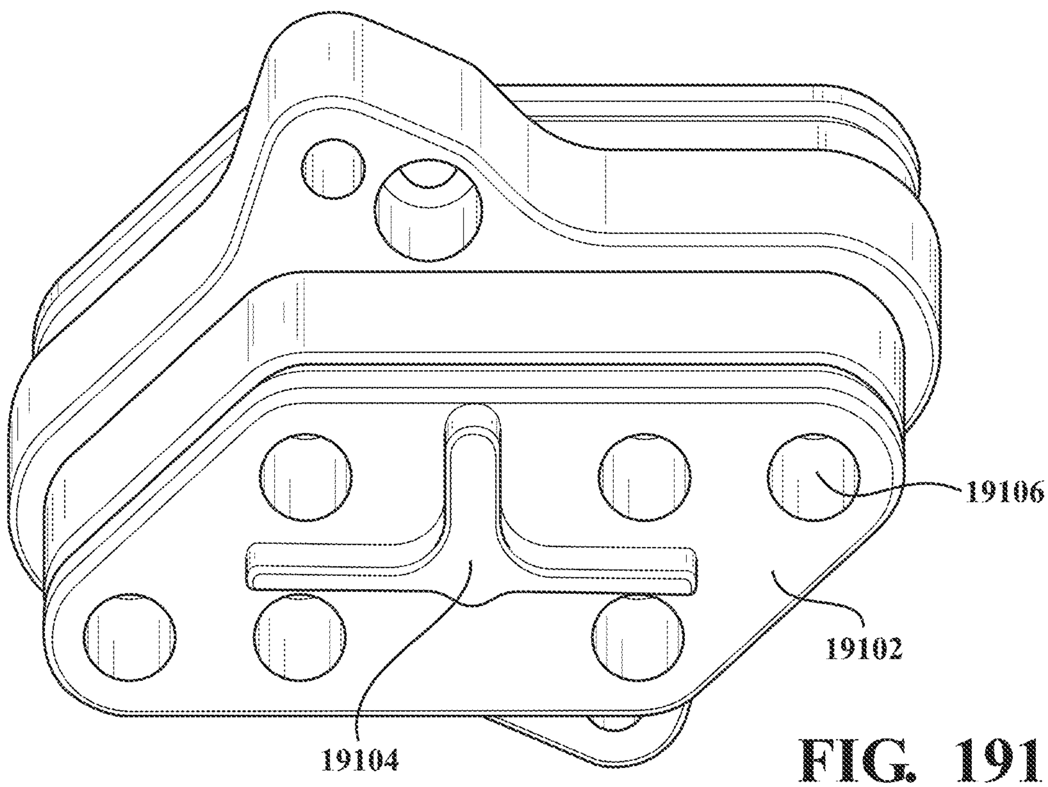

FIG. 191 depicts a perspective view of a sensor mounting insert for a sled.

Figure 192:
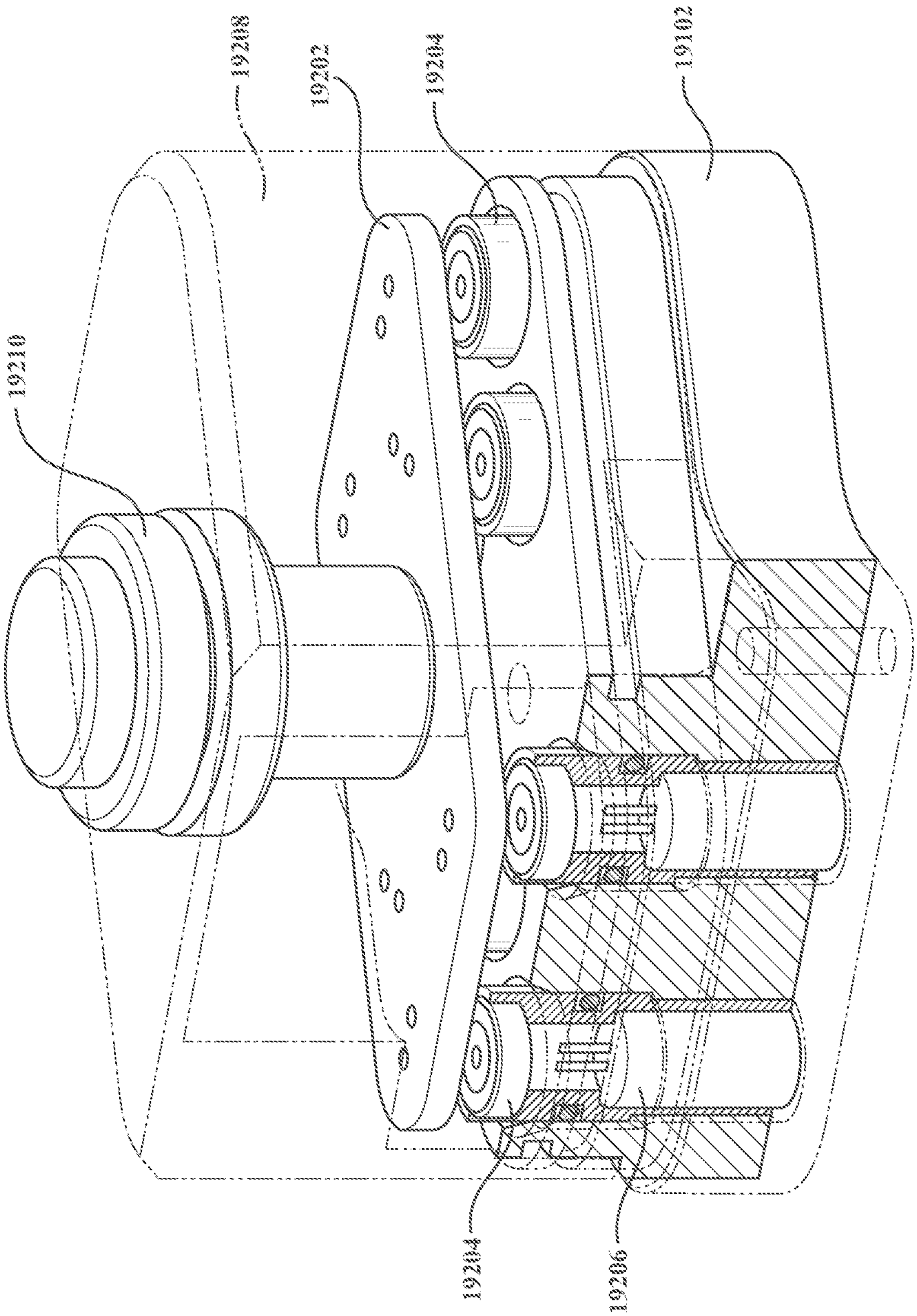

FIG. 192 depicts a partial cutaway view of a sensor electronics interface and a sensor mounting insert for a sled.

Figure 193:
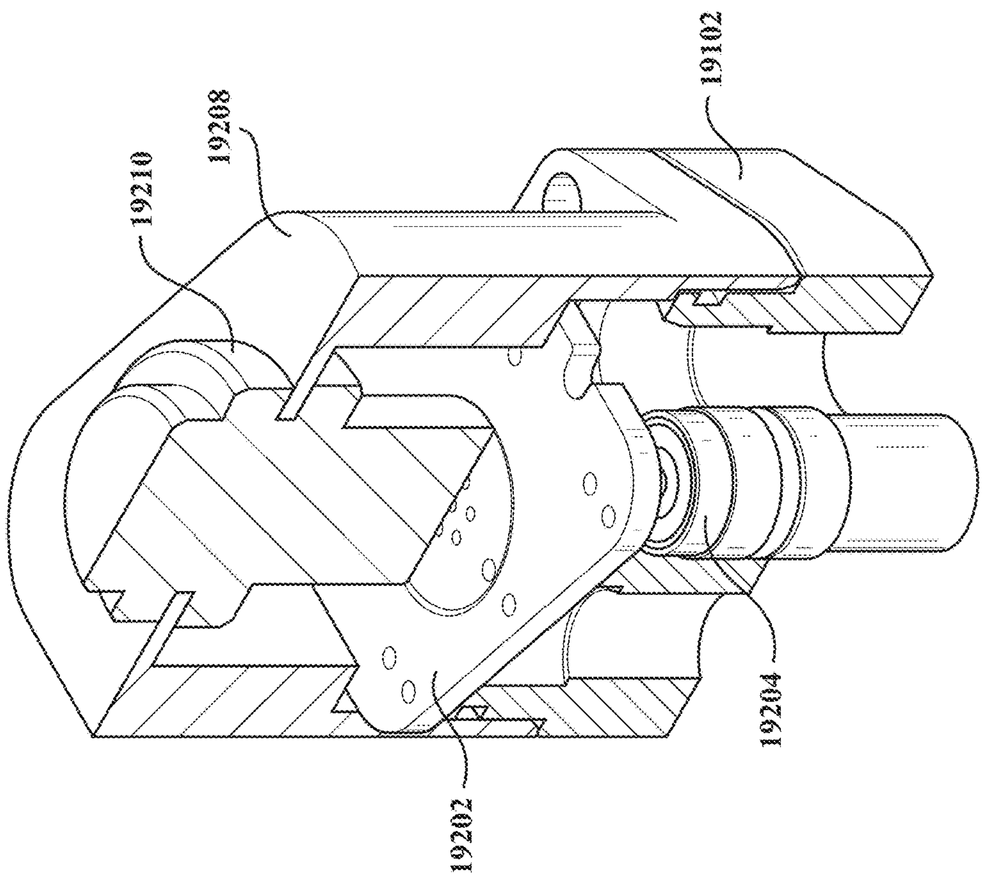

FIG. 193 depicts a cutaway perspective view of another embodiment of a sensor electronics interface and a sensor mounting insert for a sled.

Figure 194:
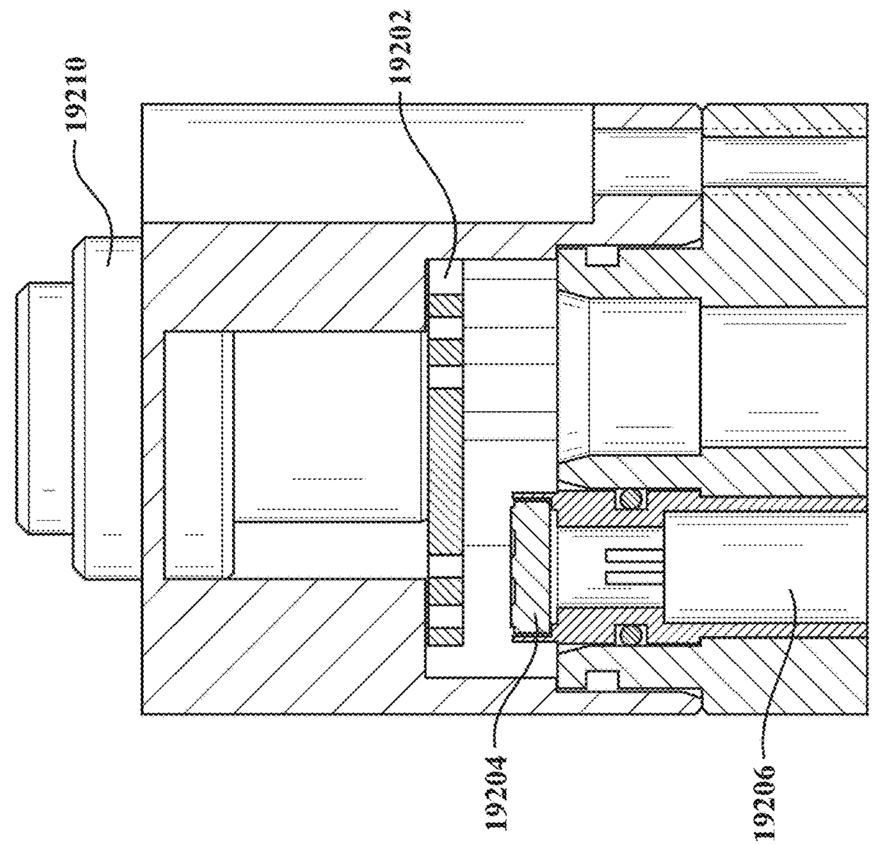

FIG. 194 depicts a cutaway side view of the sensor electronics interface and a sensor mounting insert for a sled.

Figure 195:
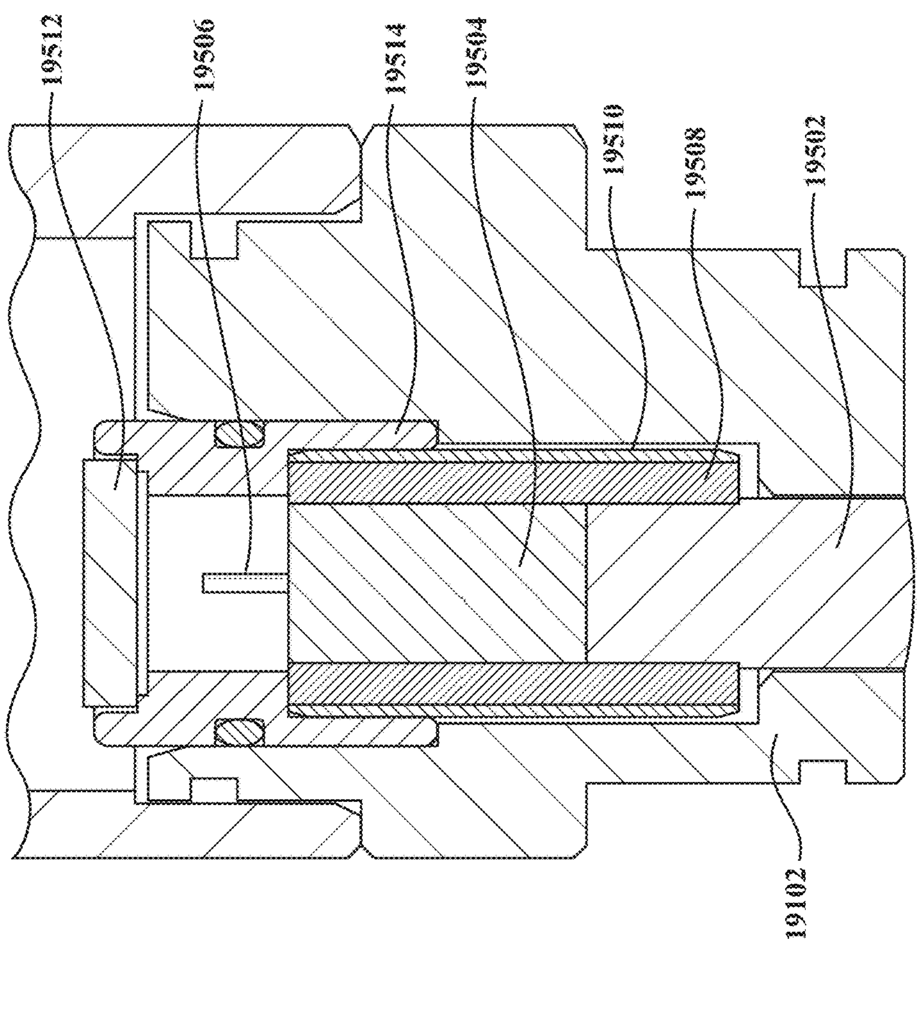

FIG. 195 depicts a side cutaway view of a sensor mounting interface.

Figure 196:
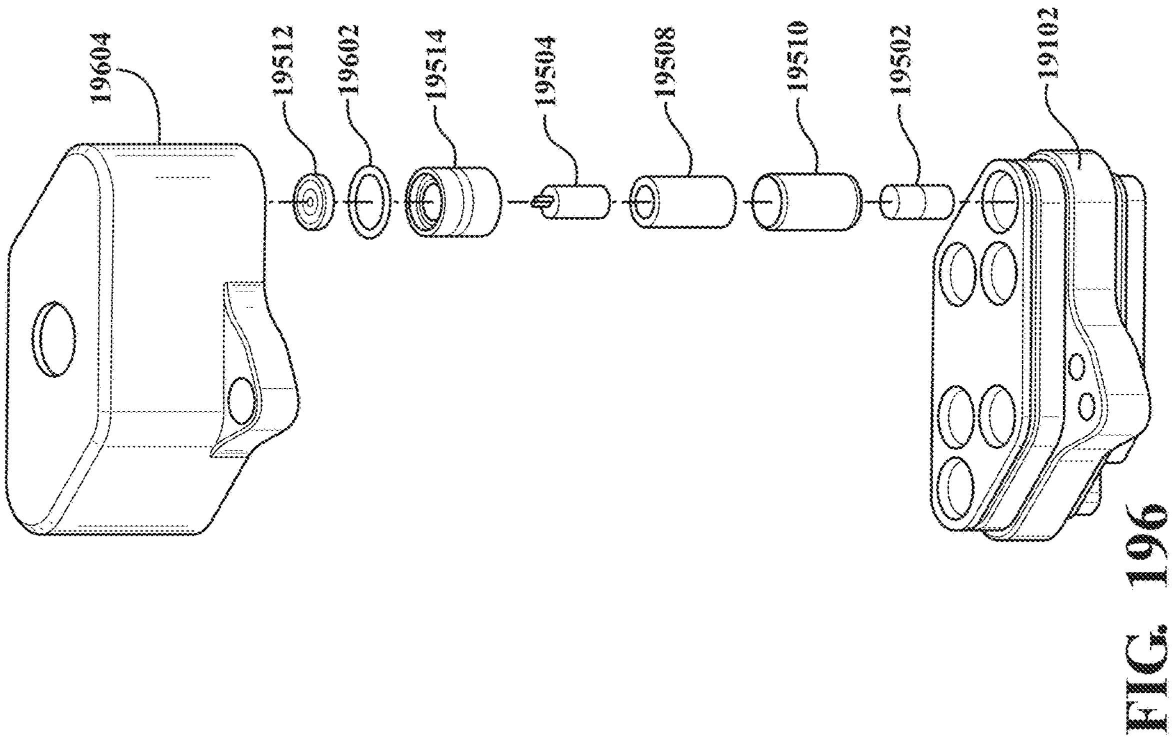

FIG. 196 depicts an exploded view of a sensor integrated into a sensor mounting insert.

Figure 197:
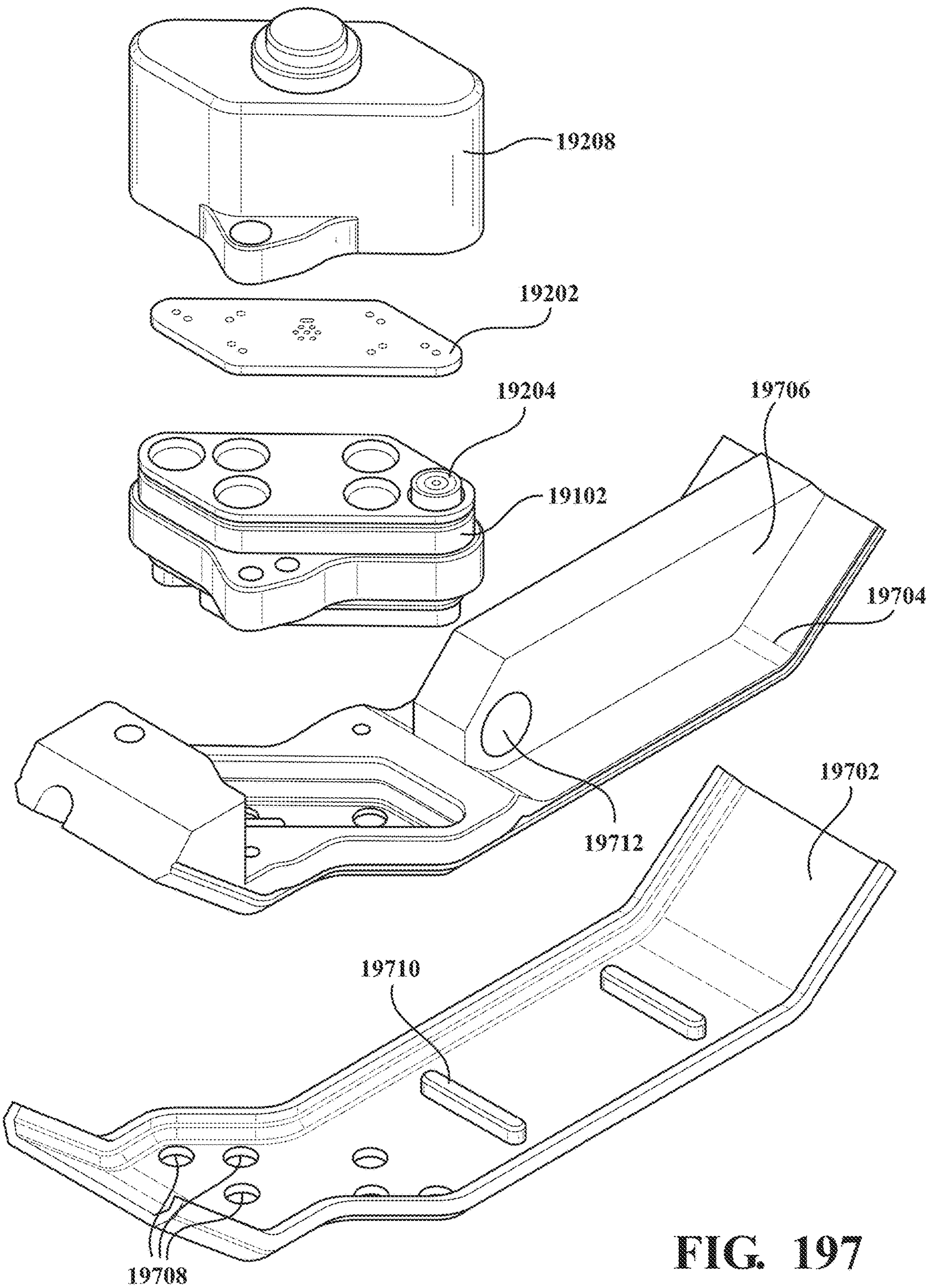

FIG. 197 depicts an exploded view of a sled and sensor mounting insert.

Figure 198:
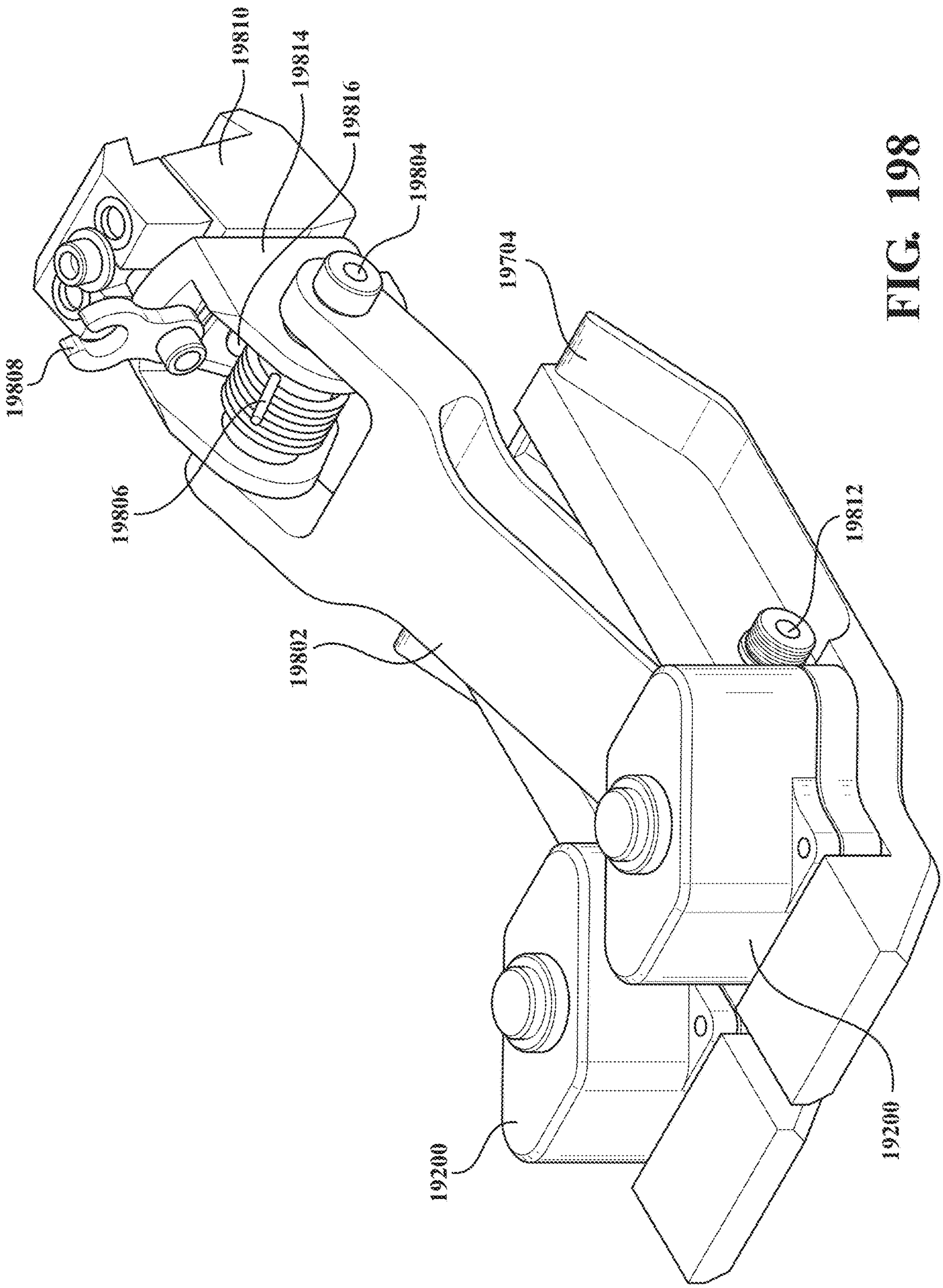

FIG. 198 depicts an example payload having an arm and two sleds mounted thereto.

Figure 199:
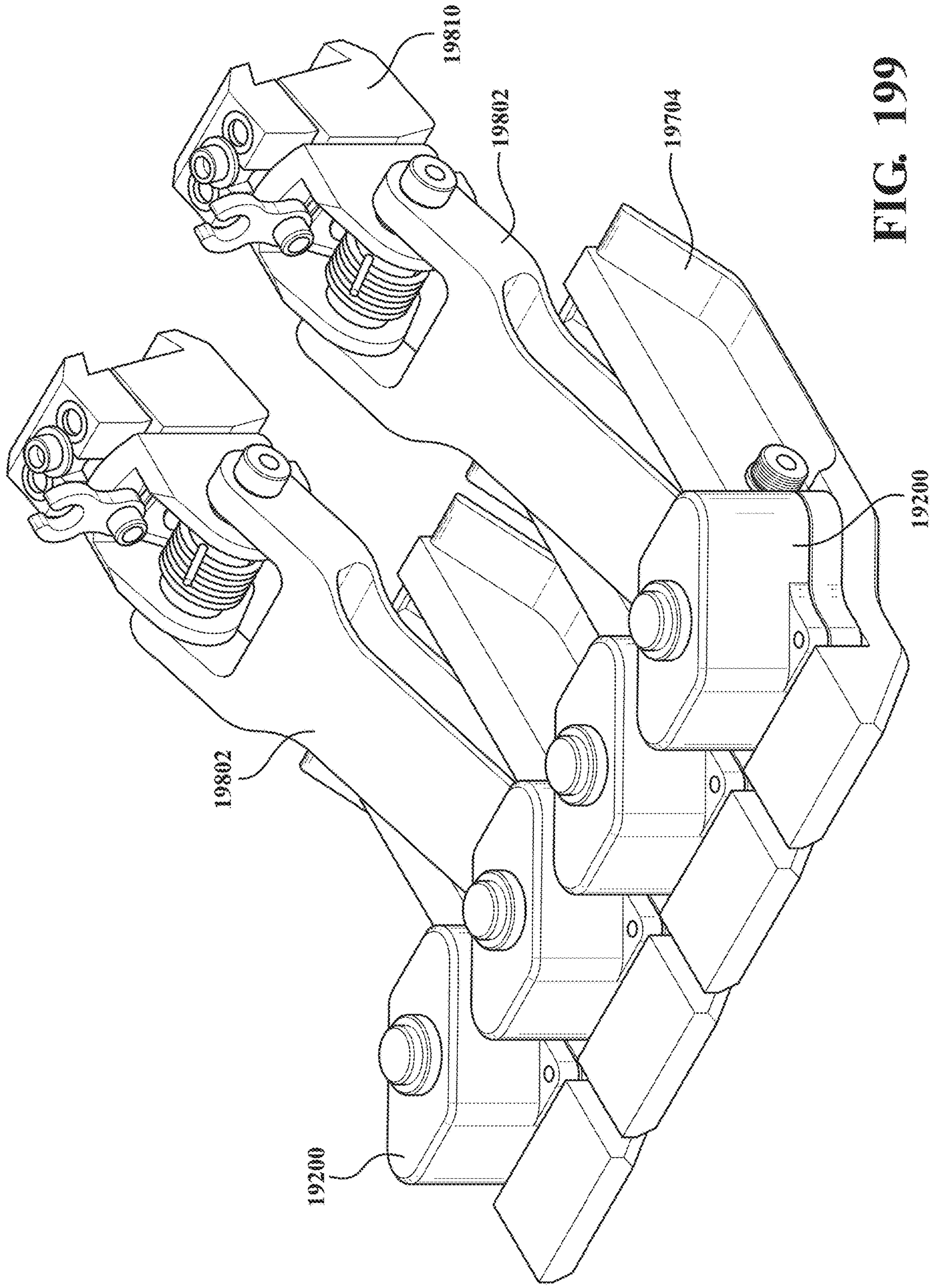

FIG. 199 depicts an example payload having two arms and four sleds mounted thereto.

Figure 200:
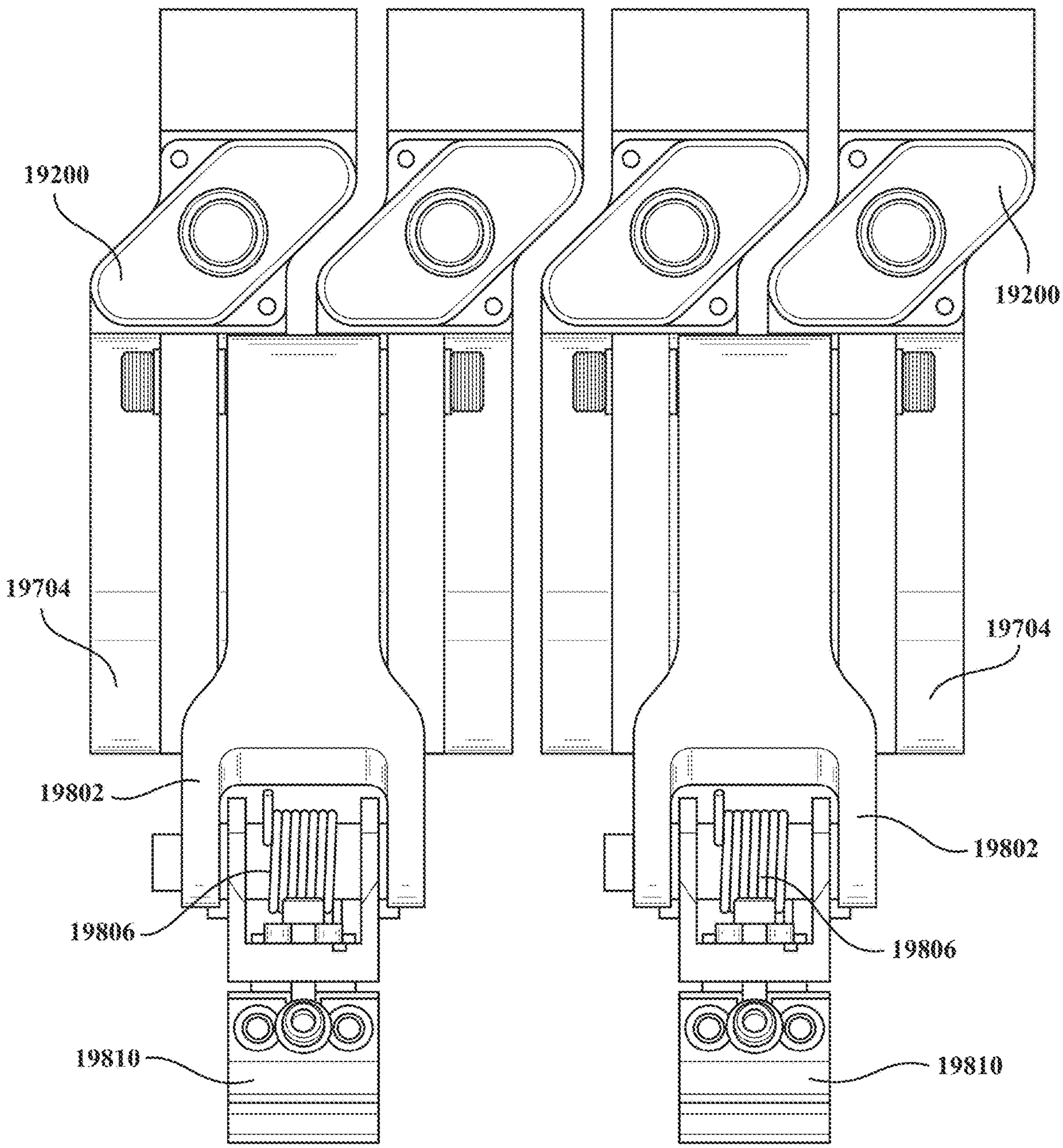

FIG. 200 depicts a top view of the example payload of FIG. 199.

Figure 201:
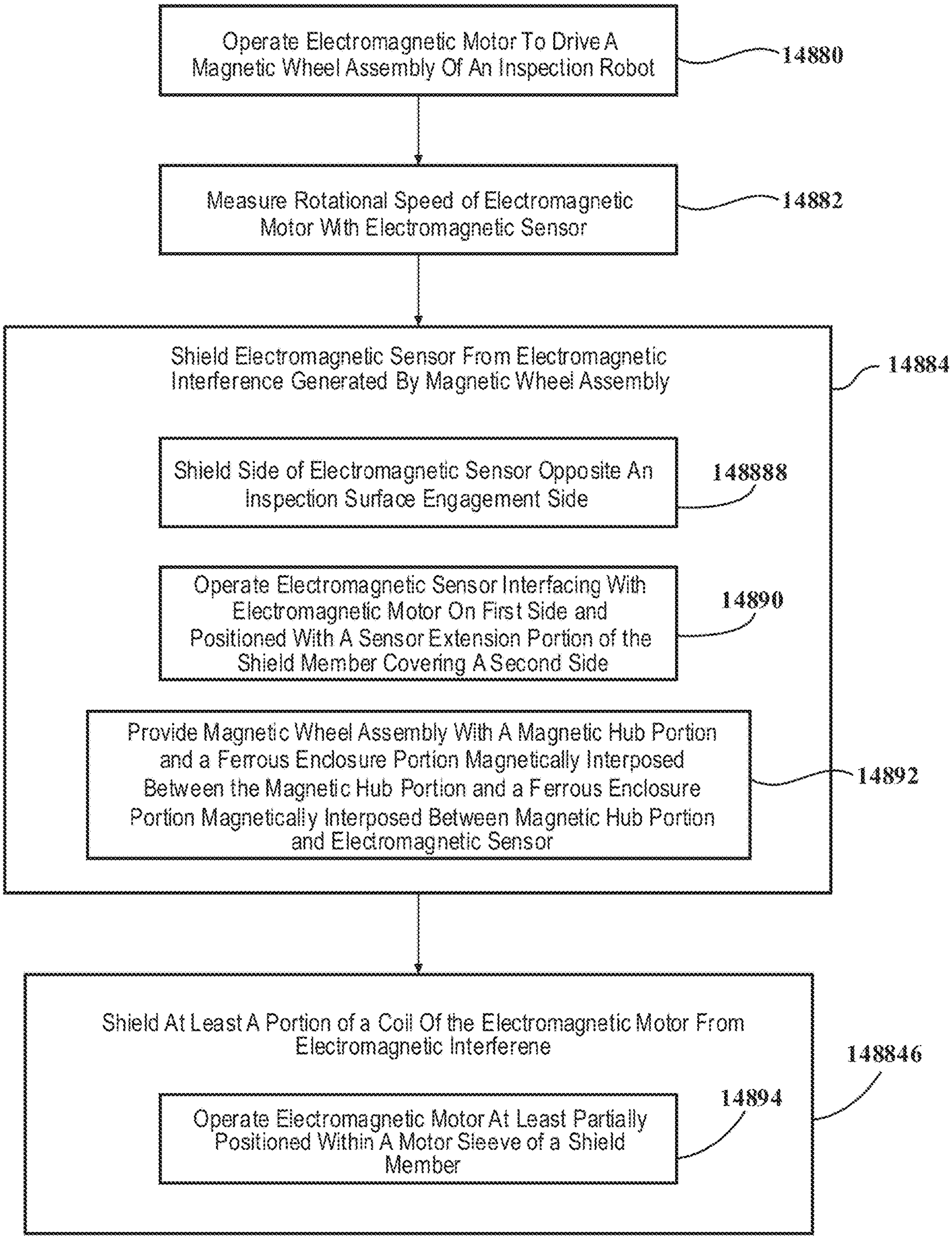

FIG. 201 is a flowchart depicting a method for inspecting an inspection surface with an inspection robot.

Figure 202:
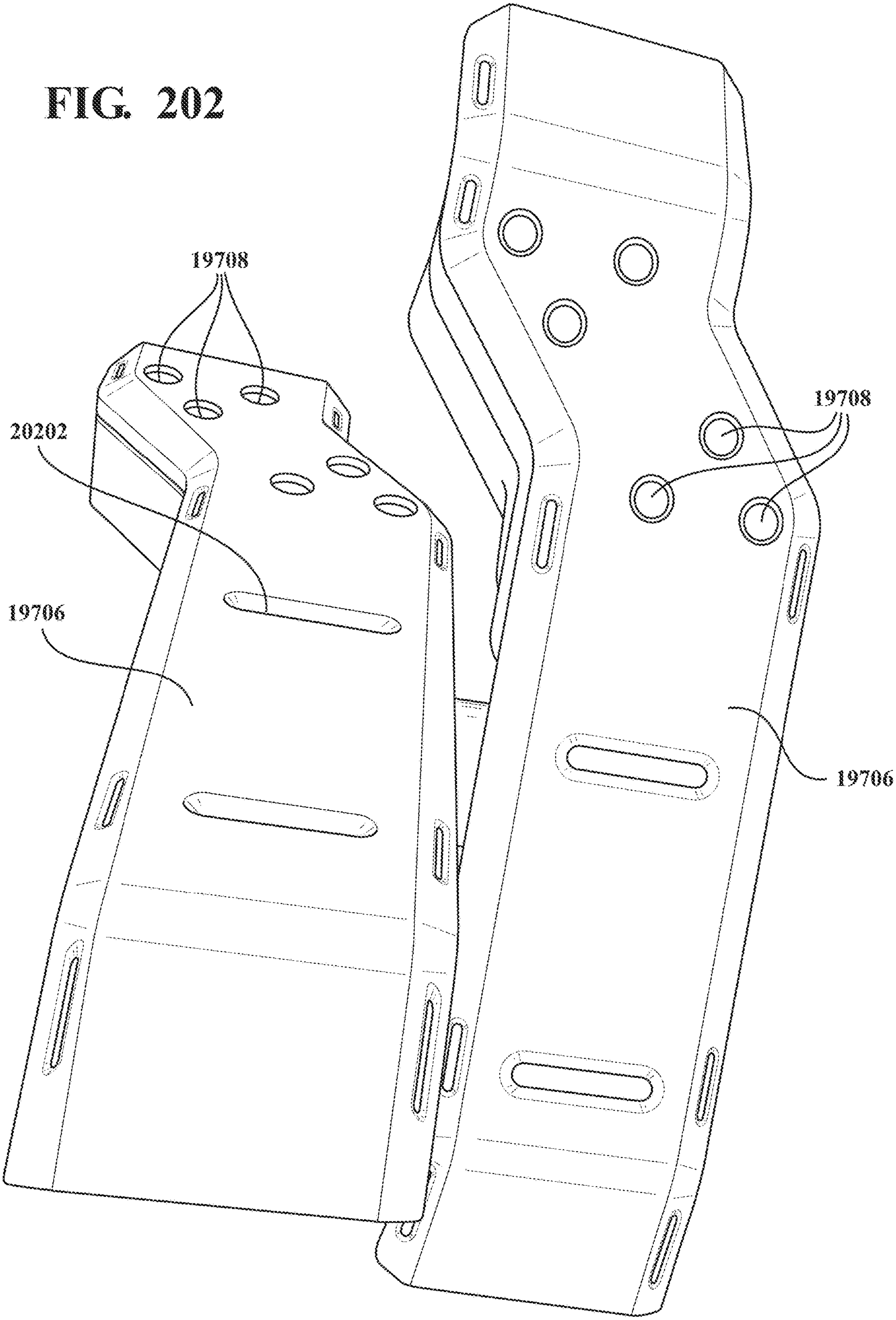

FIG. 202 depicts a bottom view of two sleds in a pivoted position.

Figure 203:
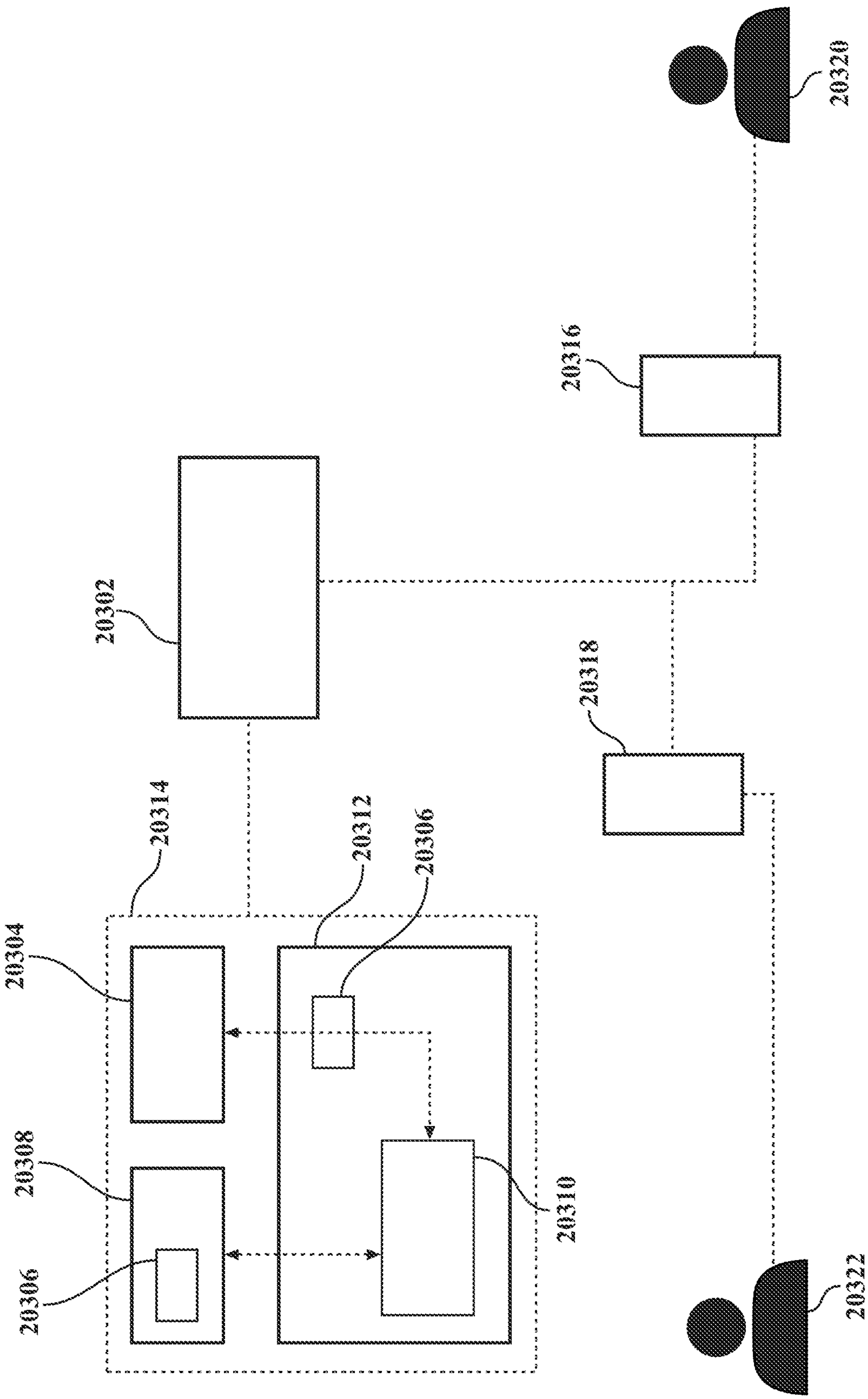

FIG. 203 depicts a system capable to perform rapid configuration of an inspection robot.

Figure 204:
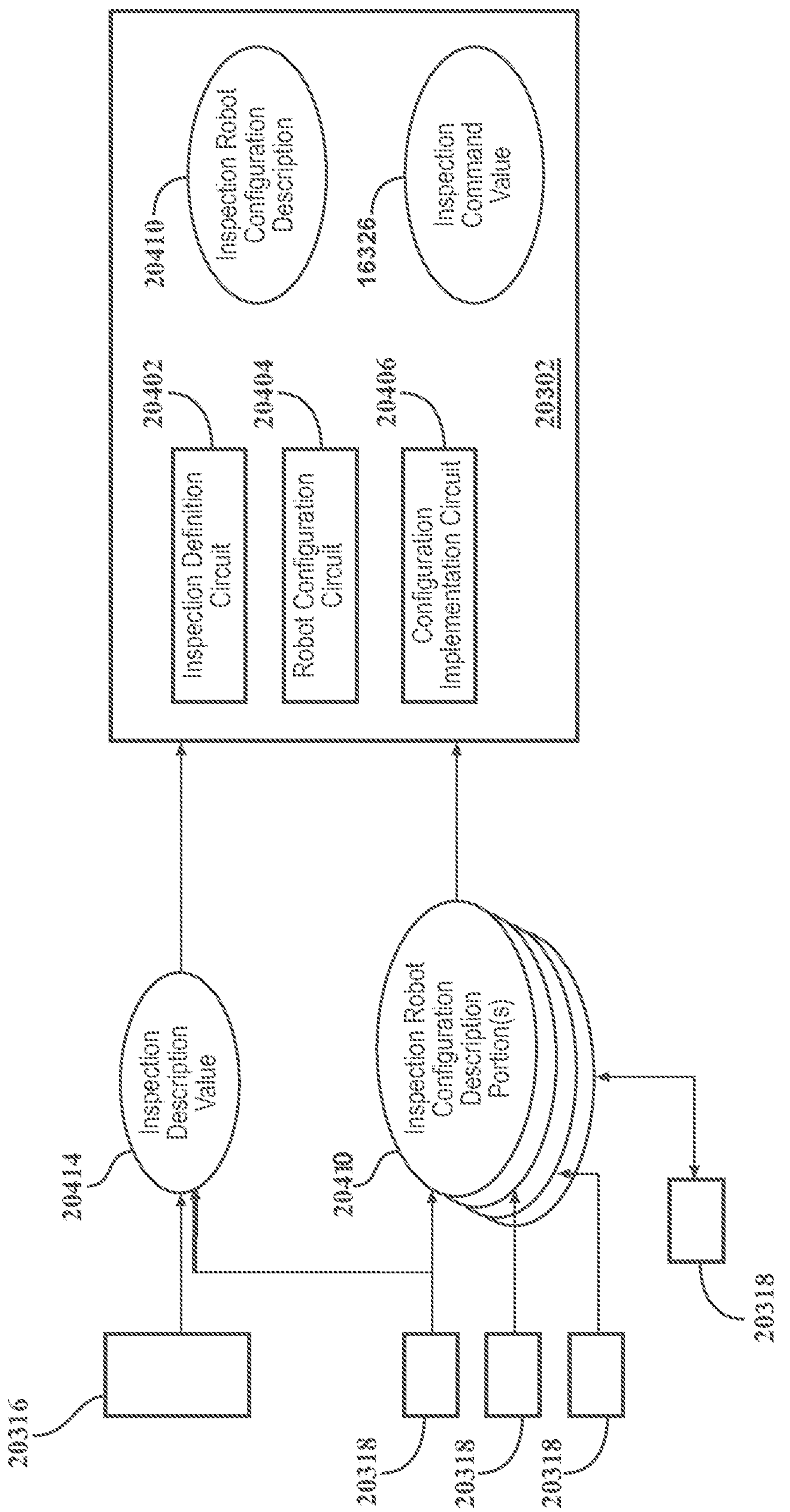

FIG. 204 depicts an example robot configuration controller having a number of circuits.

Figure 205:
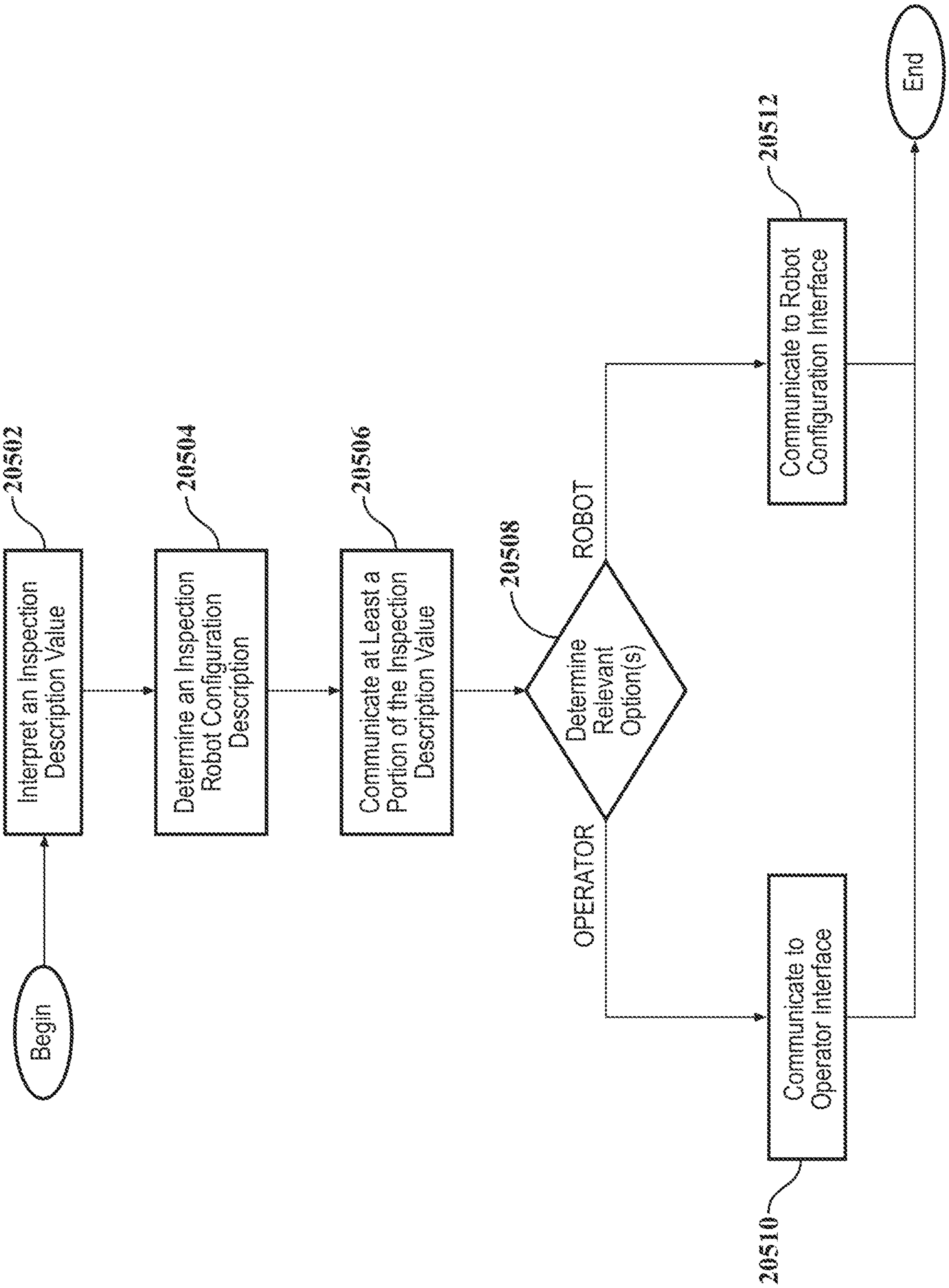

FIG. 205 is a schematic diagram of an example system for rapid development of an inspection scheme for an inspection robot.

Figure 206:
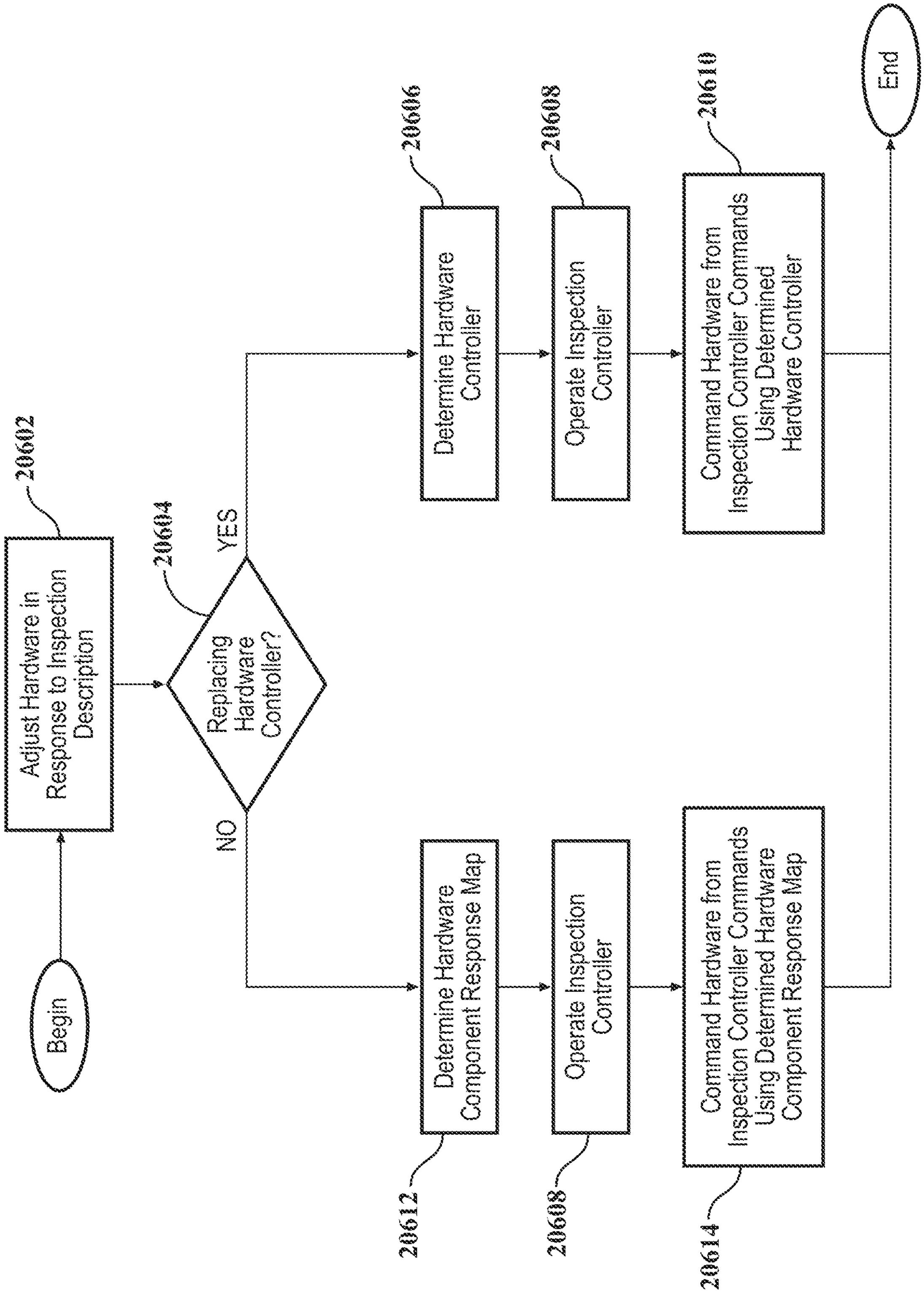

FIG. 206 is a schematic diagram of an example controller for providing rapid configuration of an inspection robot.

Figure 207:
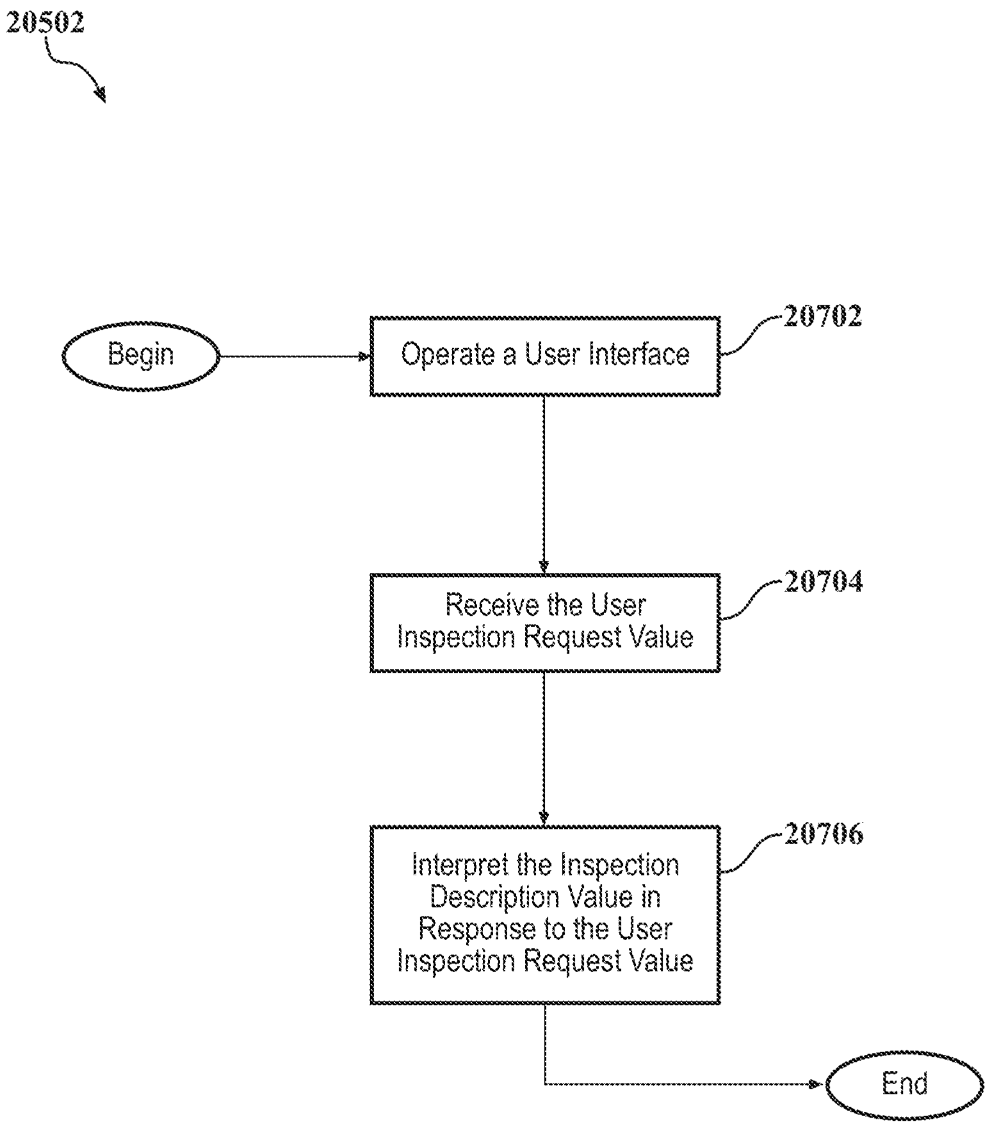

FIG. 207 is a schematic flow diagram of an example procedure to provide rapid configuration of an inspection robot.

Figure 208:
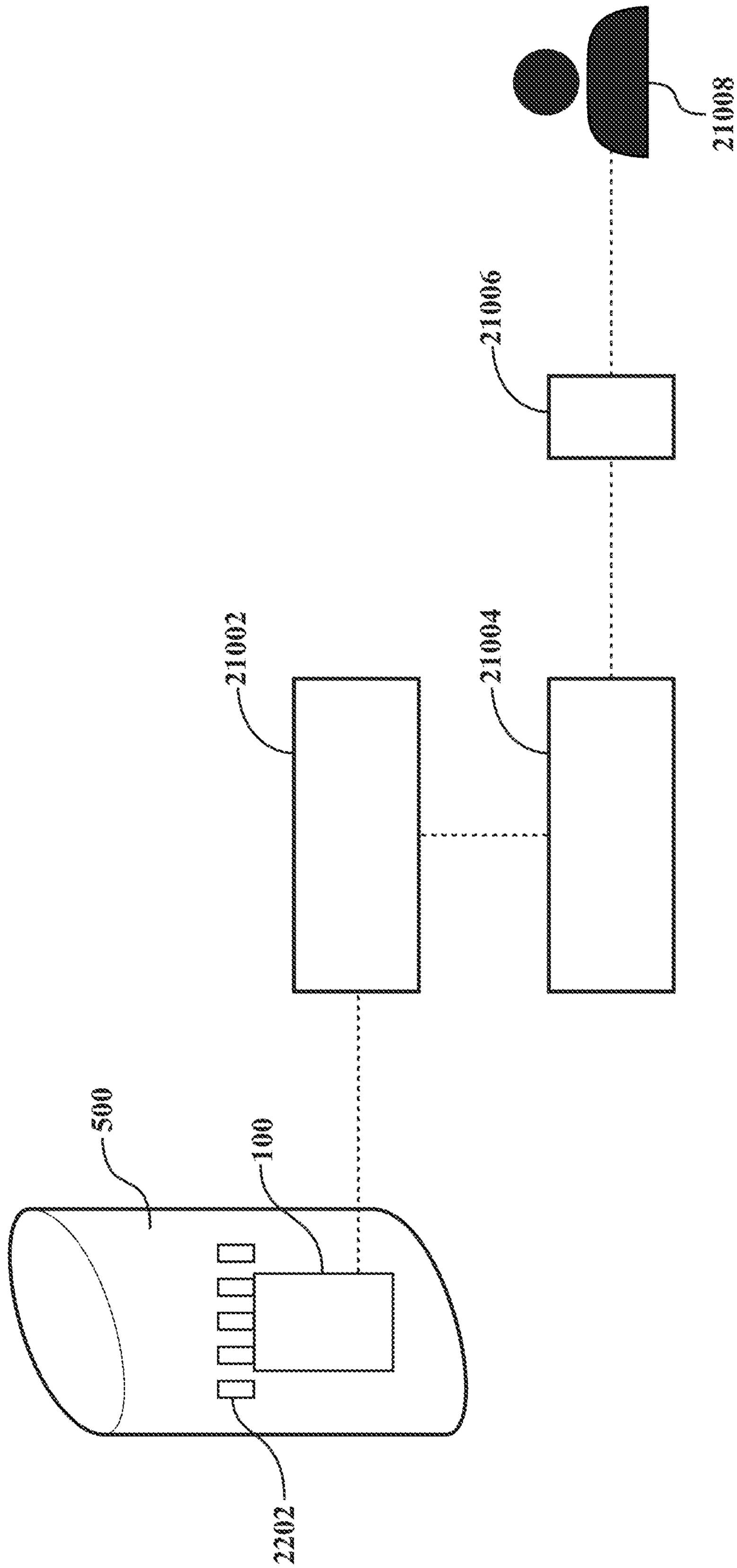

FIG. 208 is a schematic flow diagram of an example procedure to adjust a hardware component independently of an inspection controller for an inspection robot.

Figure 209:
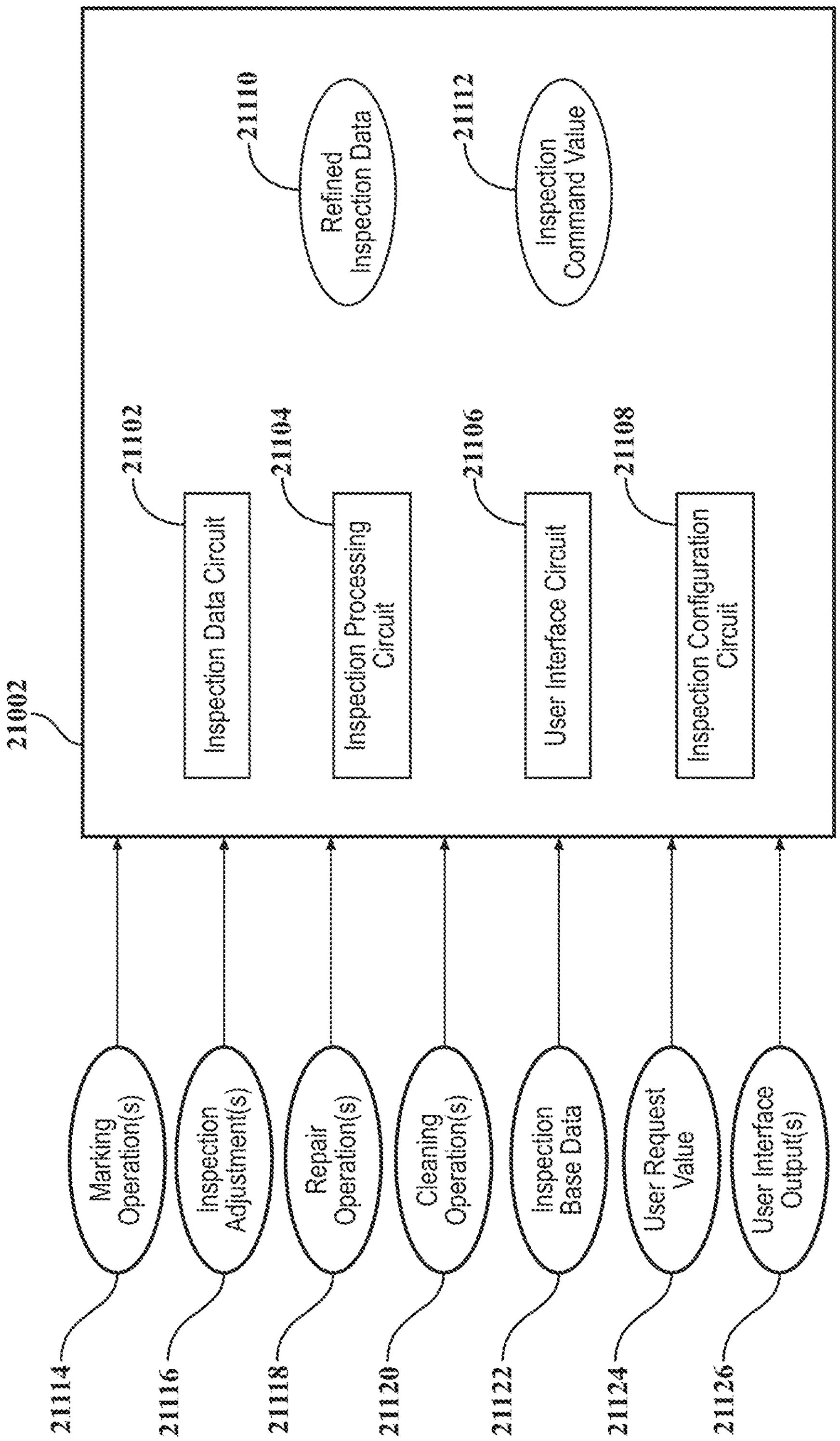

FIG. 209 is a schematic flow diagram of an example procedure to provide for configuration of an inspection scheme responsive to a user request.

Figure 210:
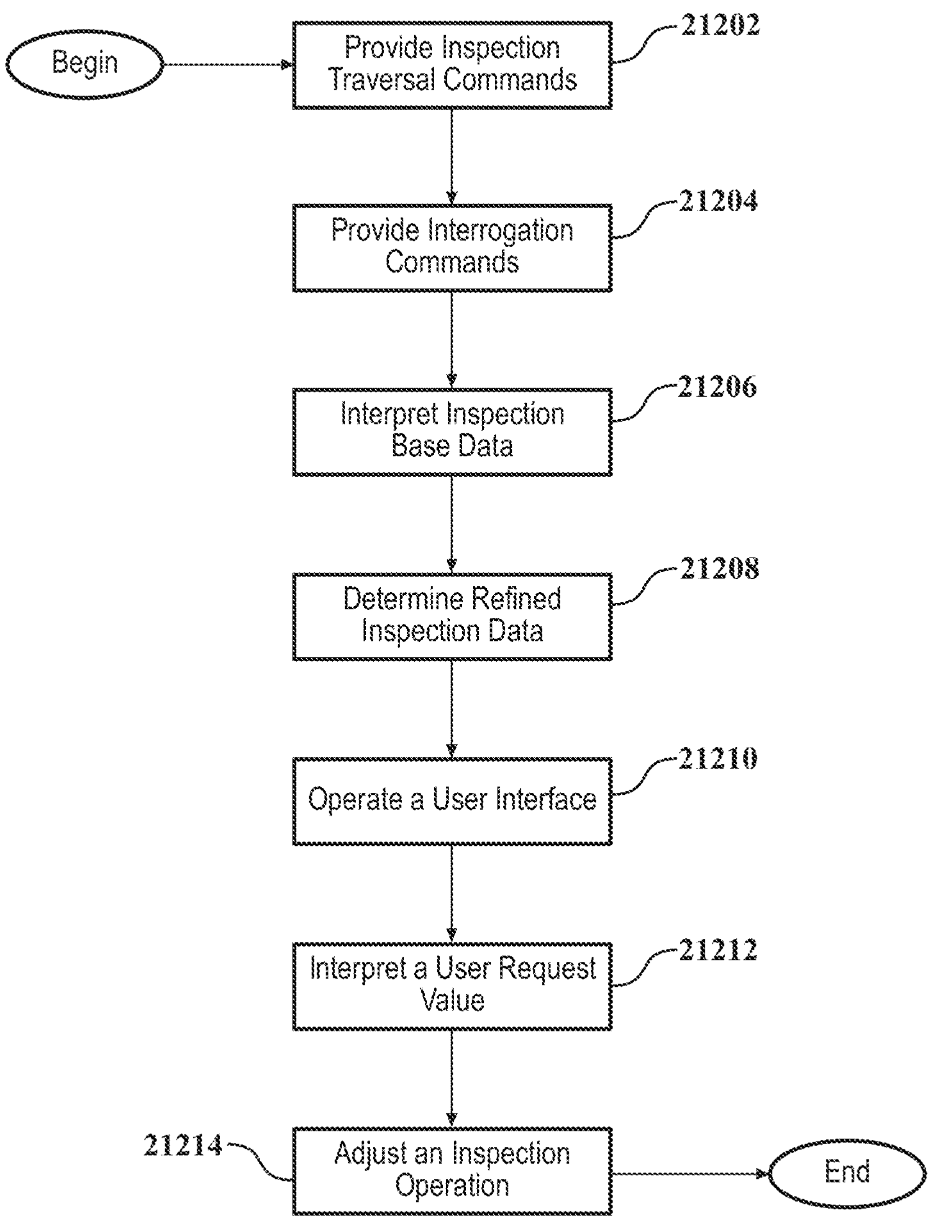

FIG. 210 is a schematic diagram of an example system for providing real-time processed inspection data to a user.

Figure 211:
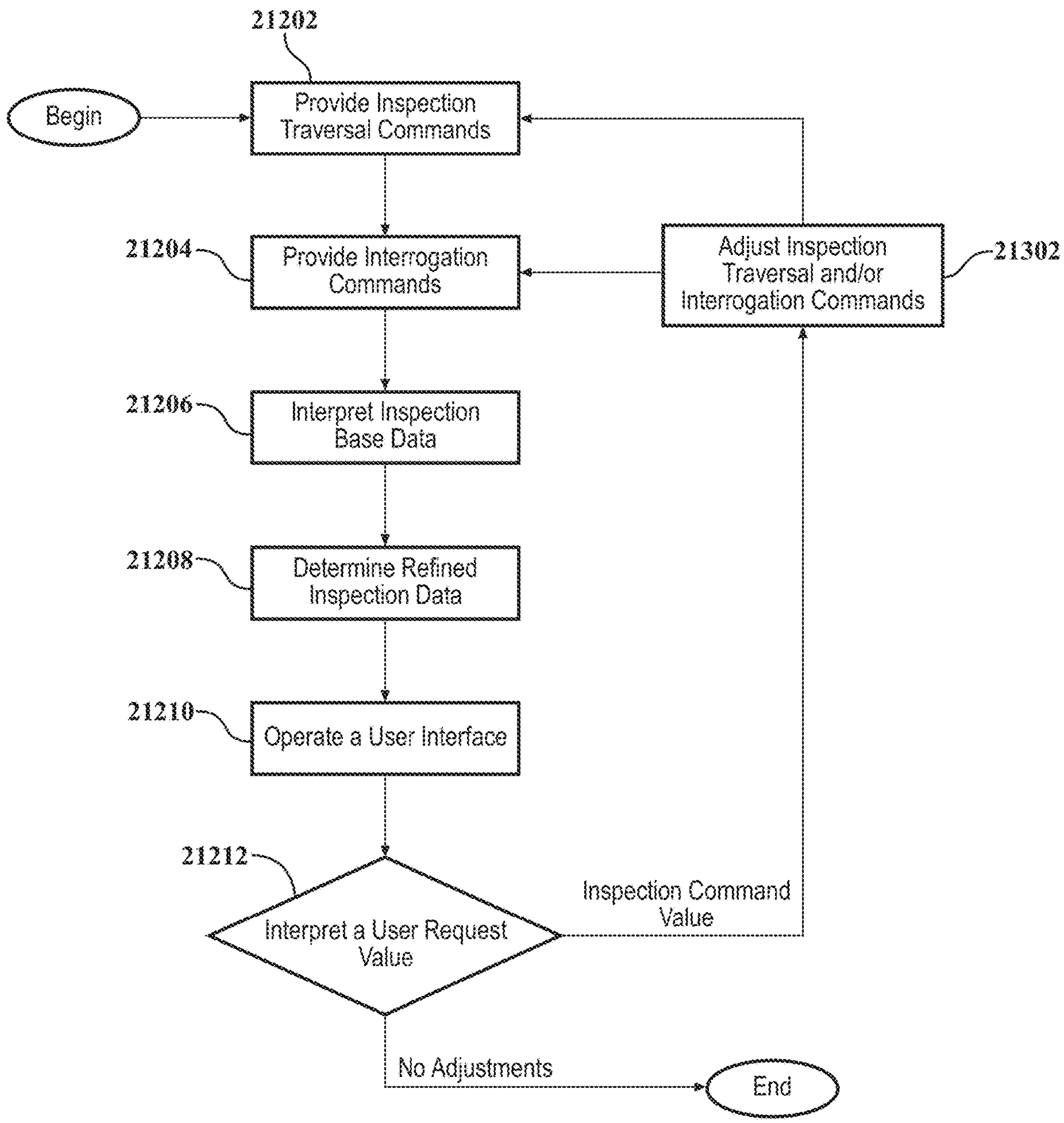

FIG. 211 is a schematic diagram of an example controller for providing real-time processed inspection data to a user.

Figure 212:
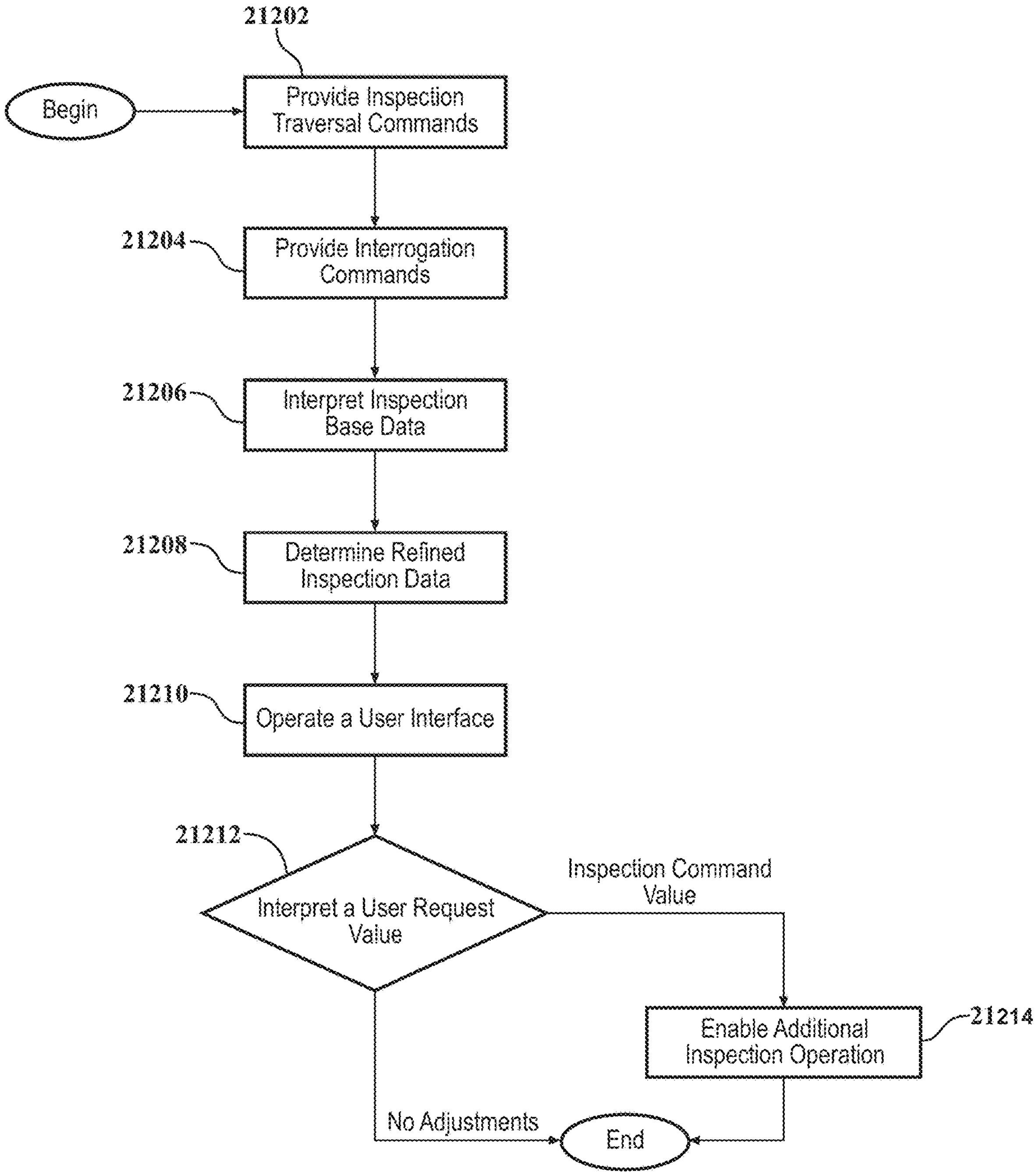

FIG. 212 is a schematic flow diagram of an example procedure to adjust inspection operations.

Figure 213:
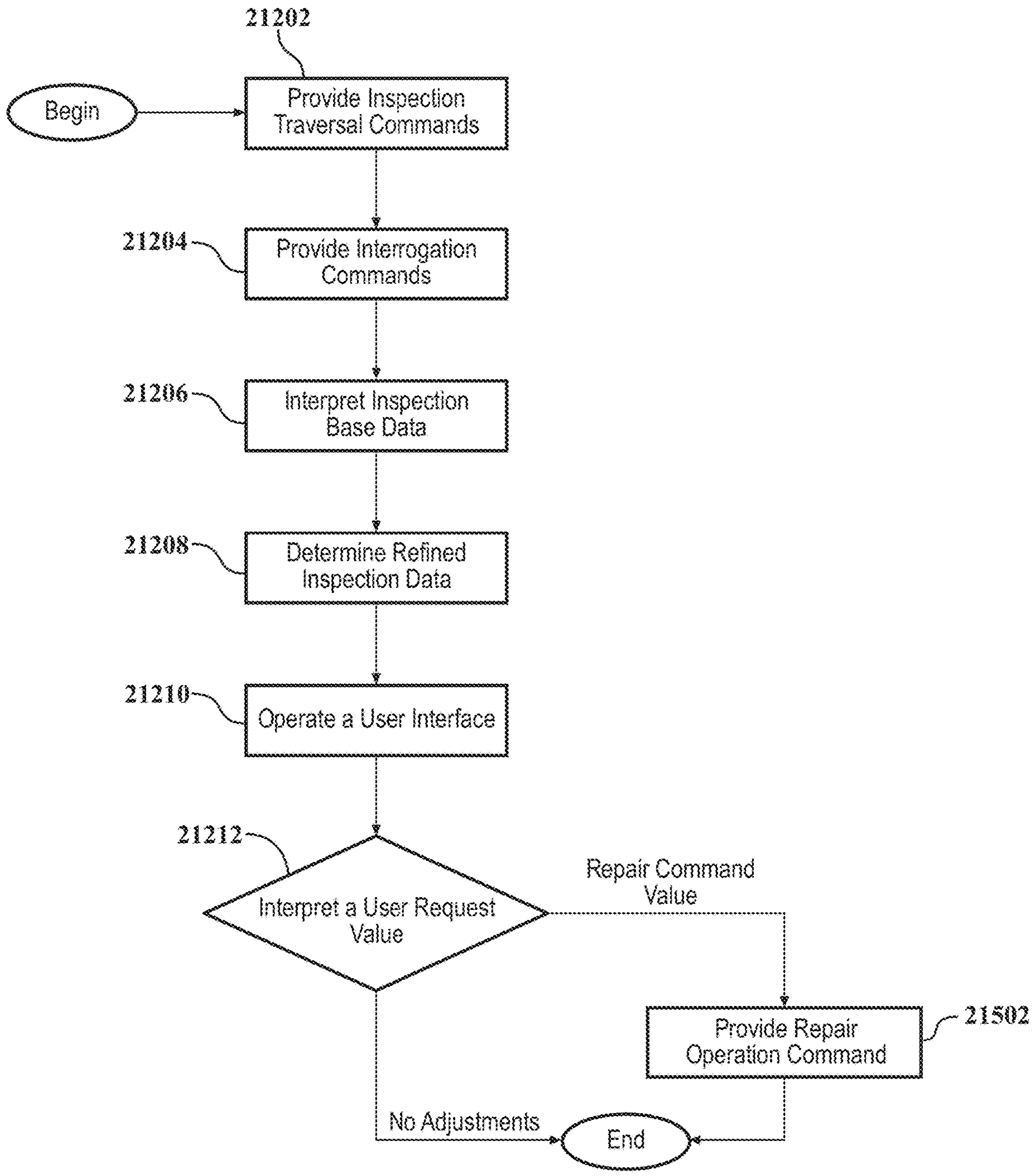

FIG. 213 is a schematic flow diagram of an example procedure to adjust inspection traversal and/or interrogation commands.

Figure 214:
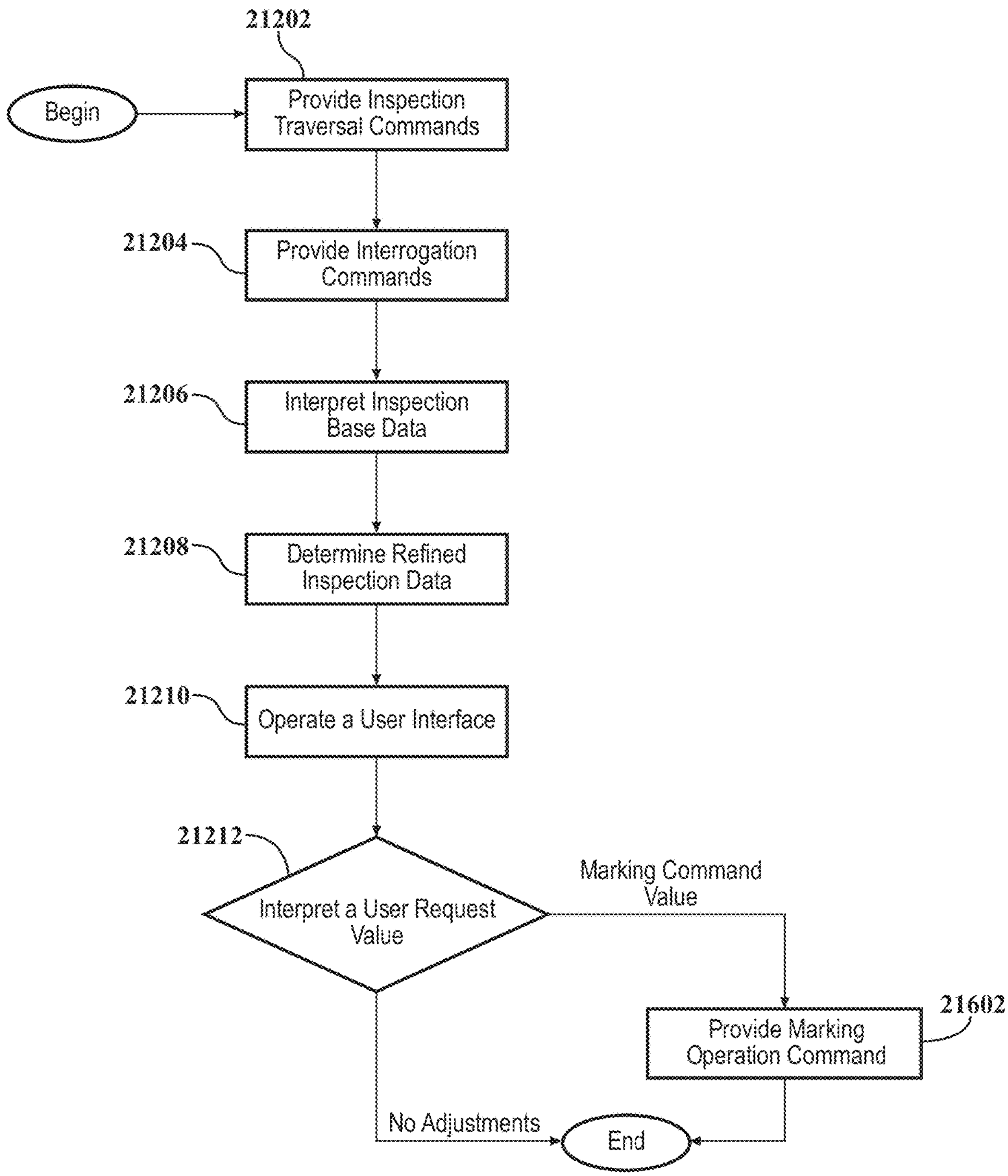

FIG. 214 is a schematic flow diagram of an example procedure to enable additional inspection operations.

Figure 215:
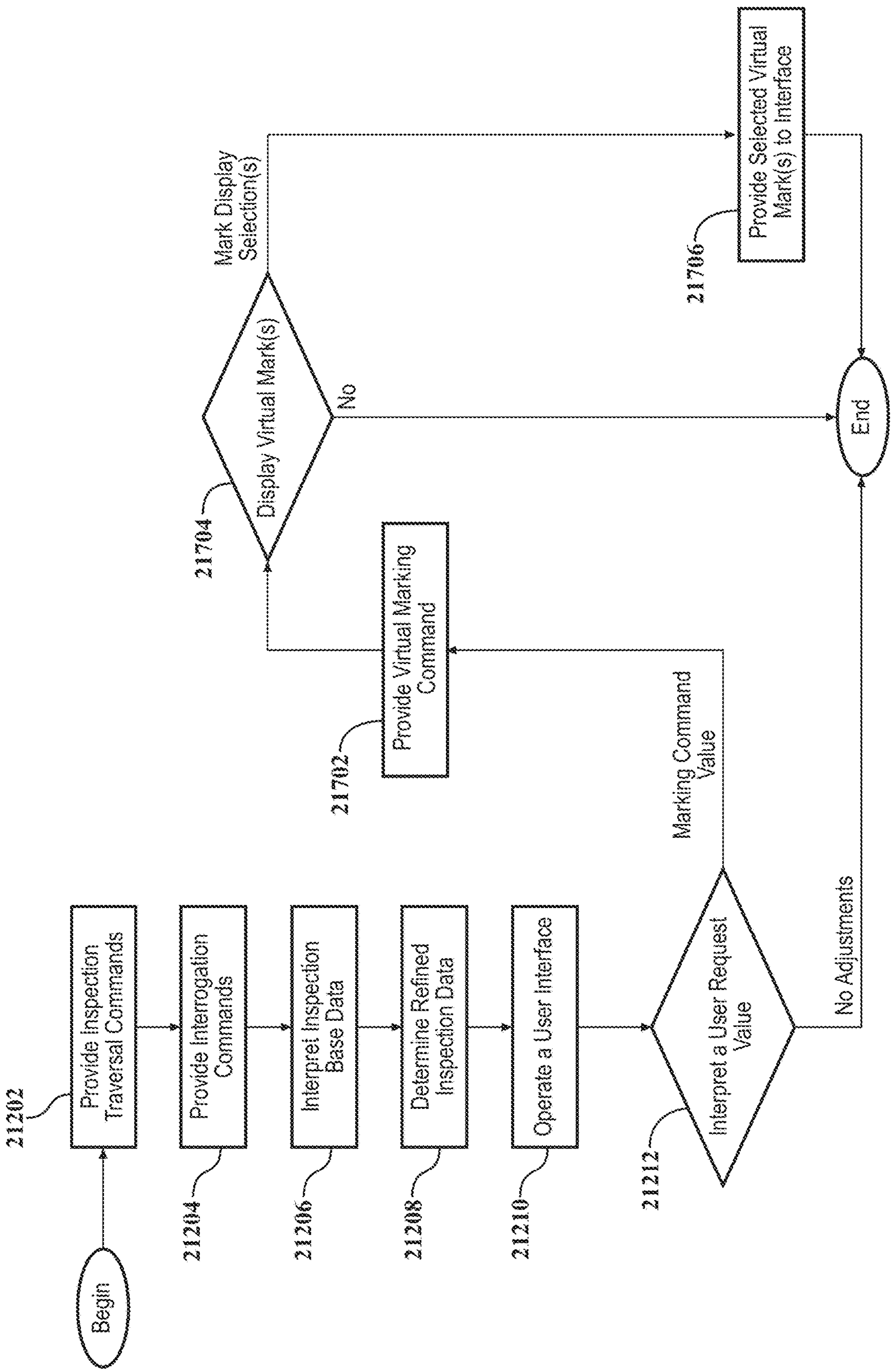
Figure 216:
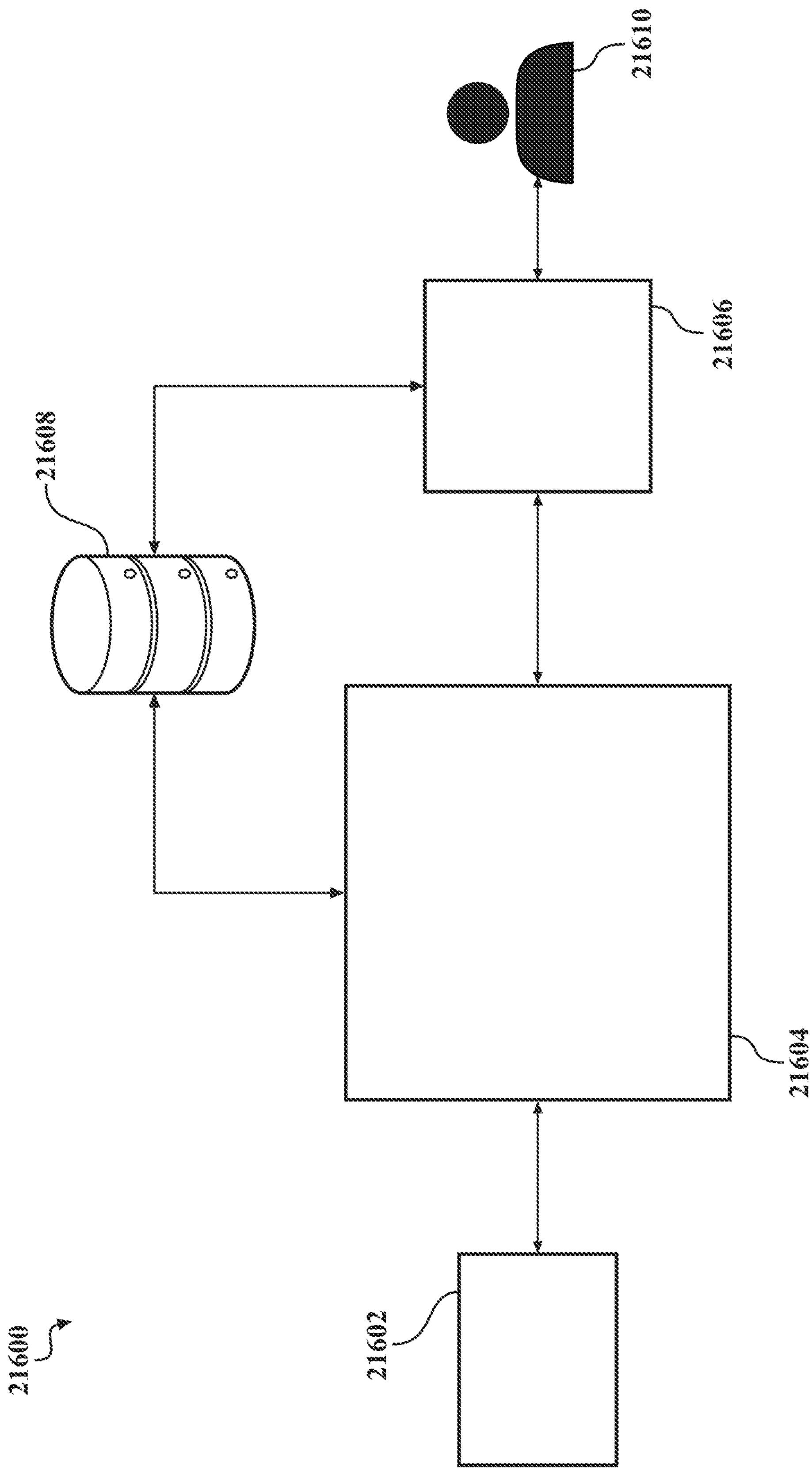

FIG. 215 is a schematic flow diagram of an example procedure to provide a repair operation FIG. 216 is a schematic flow diagram of an example procedure to provide a marking operation.

Figure 217:
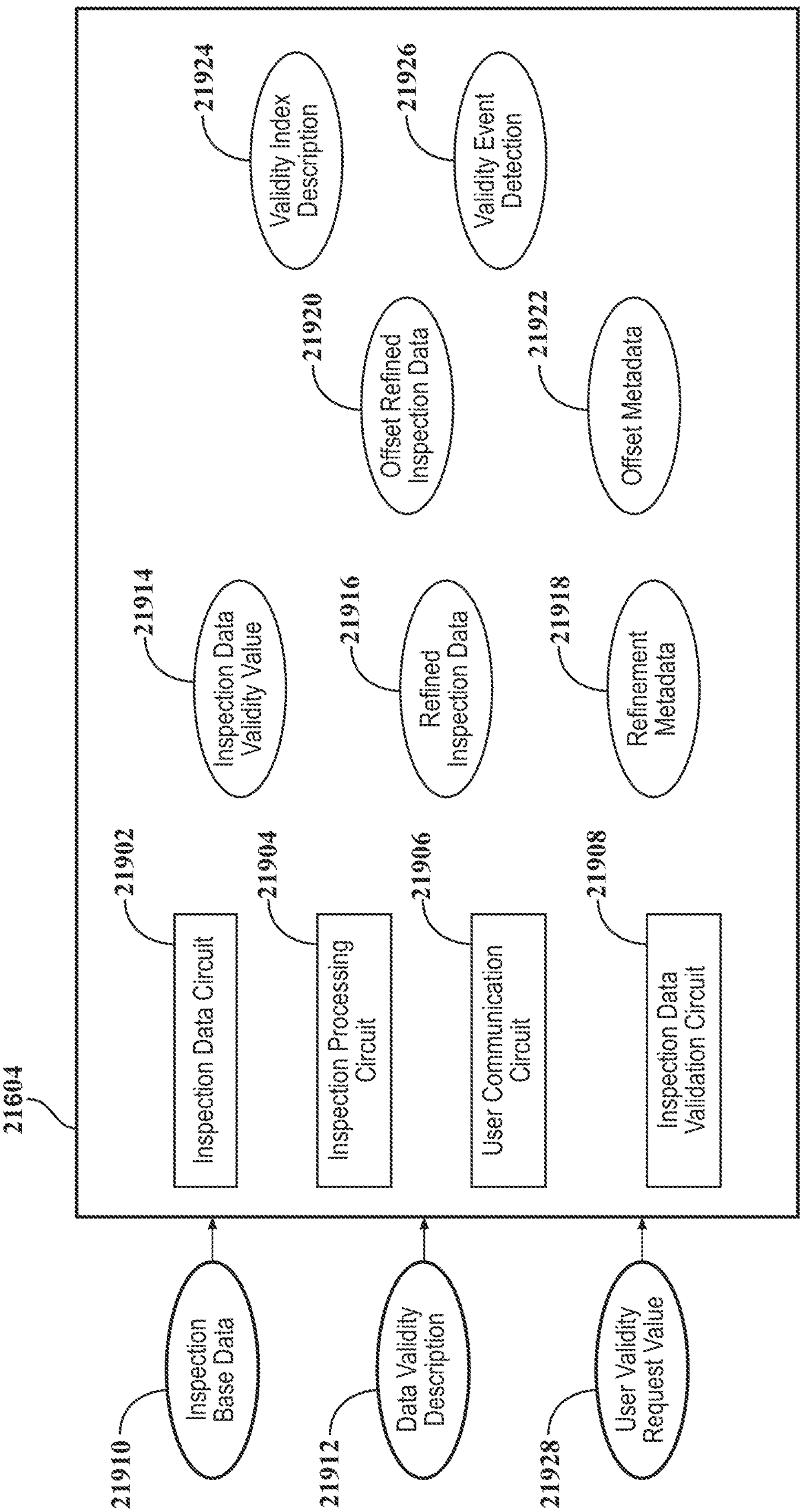

FIG. 217 is a schematic flow diagram of an example procedure to selectively display a virtual mark.

Figure 218:
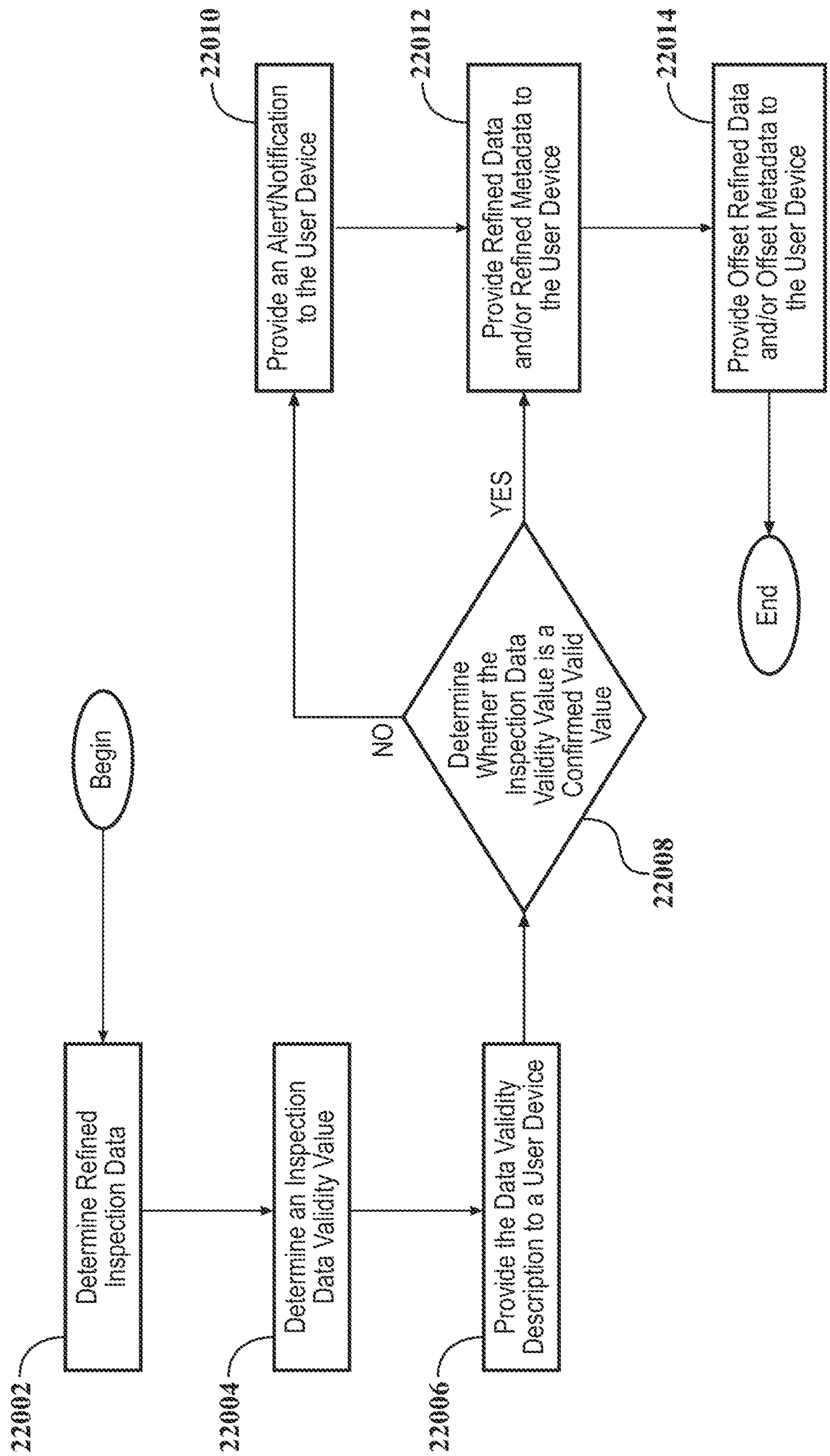

FIG. 218 is a schematic diagram of a system for providing rapid inspection data validation.

Figure 219:
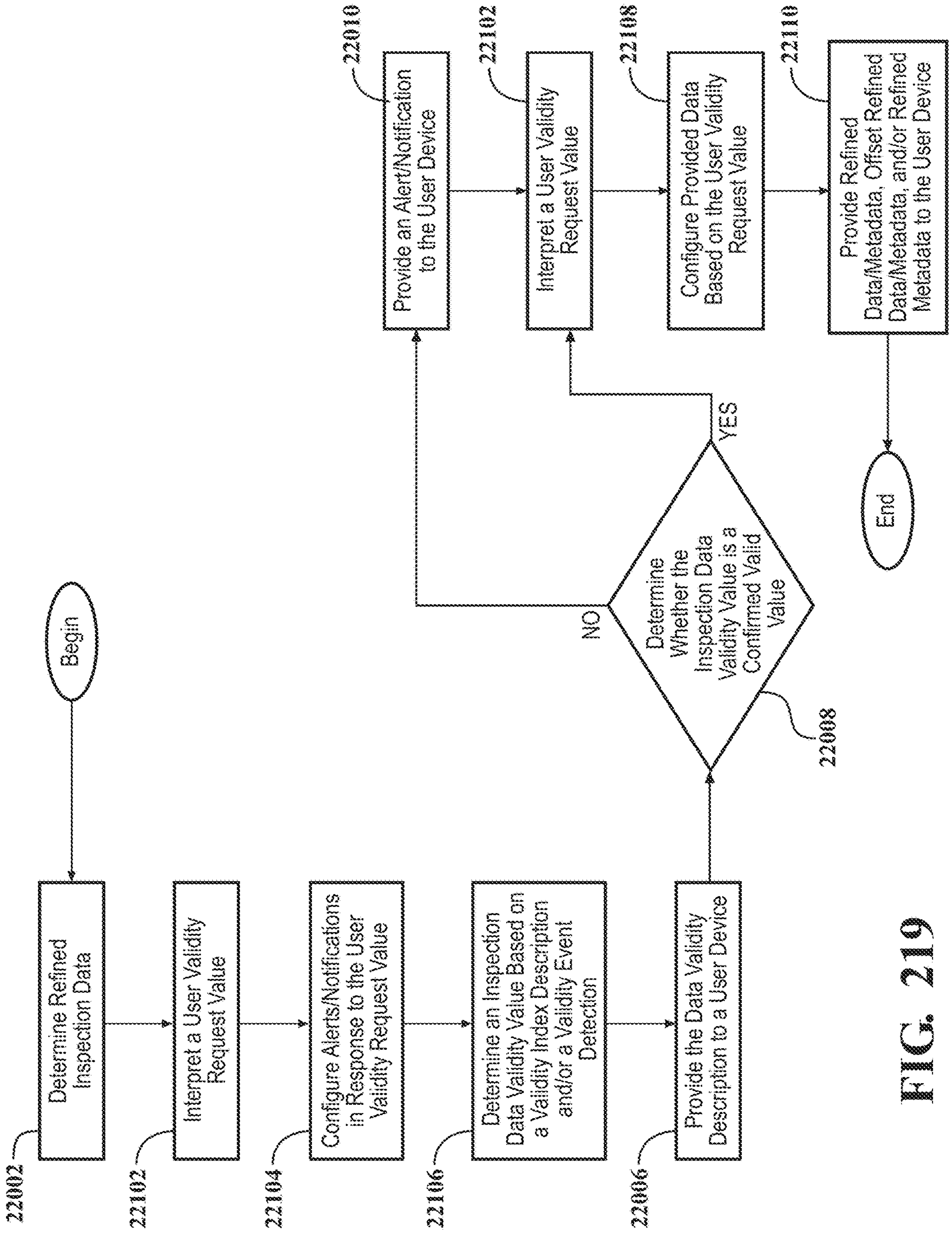

FIG. 219 is a schematic diagram of a controller for providing rapid inspection data validation.

Figure 220:
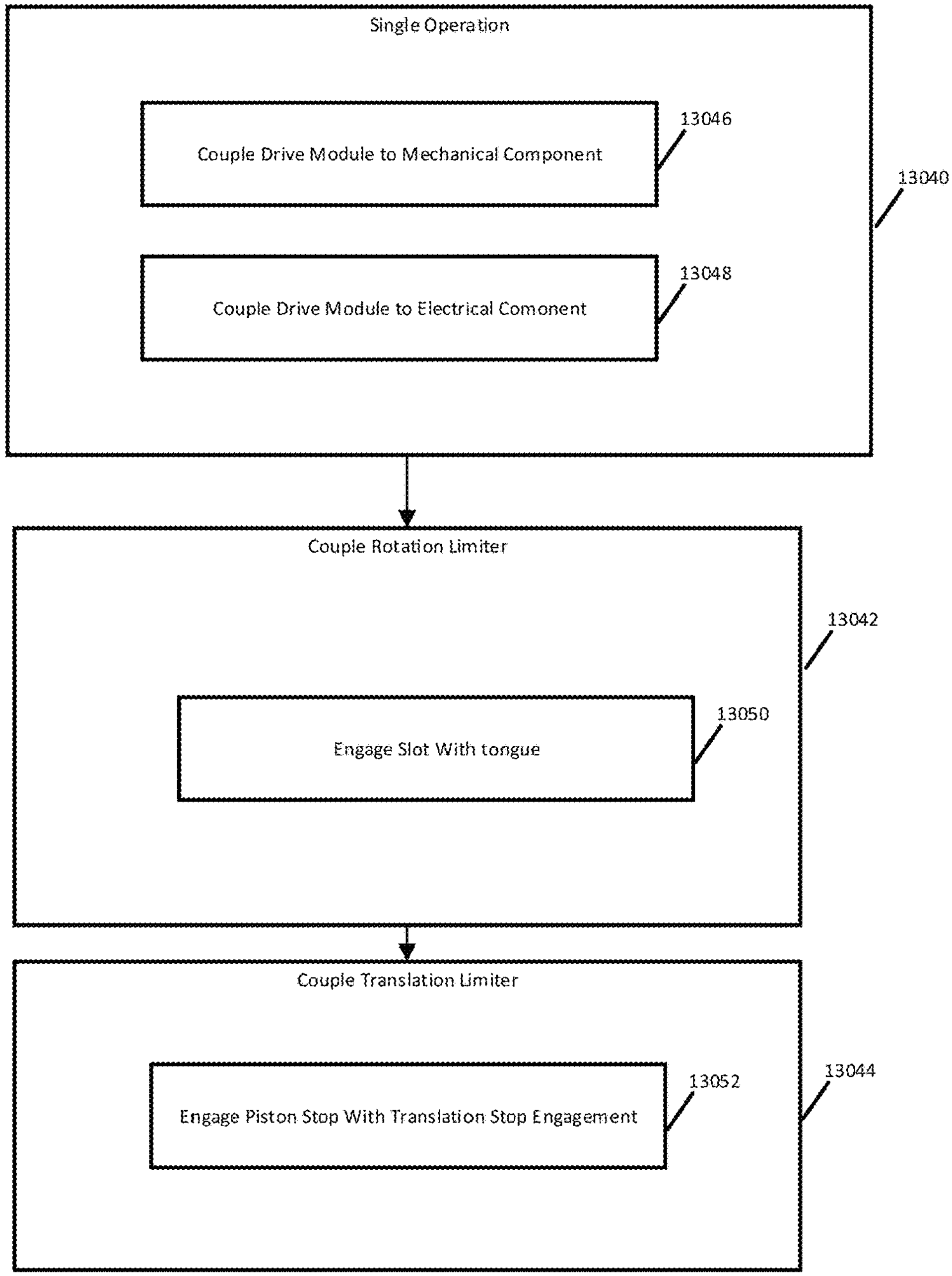

FIG. 220 is a schematic flow diagram of a procedure for rapid inspection data validation.

Figure 221:
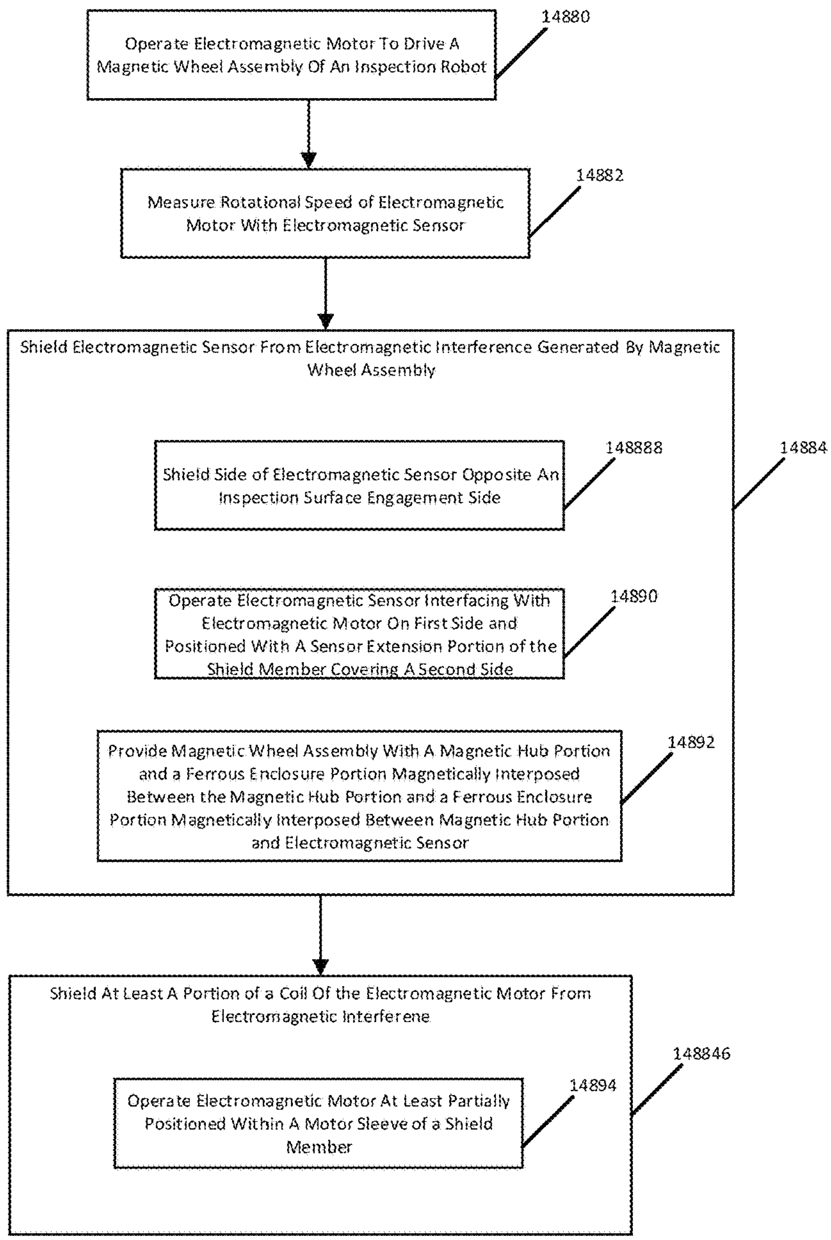

FIG. 221 is a schematic flow diagram of a procedure for rapid inspection data validation.

DETAILED DESCRIPTION

The present disclosure relates to a system developed for traversing, climbing, or otherwise traveling over walls (curved or flat), or other industrial surfaces. Industrial surfaces, as described herein, include any tank, pipe, housing, or other surface utilized in an industrial environment, including at least heating and cooling pipes, conveyance pipes or conduits, and tanks, reactors, mixers, or containers. In certain embodiments, an industrial surface is ferromagnetic, for example including iron, steel, nickel, cobalt, and alloys thereof. In certain embodiments, an industrial surface is not ferromagnetic.

Certain descriptions herein include operations to inspect a surface, an inspection robot or inspection device, or other descriptions in the context of performing an inspection. Inspections, as utilized herein, should be understood broadly. Without limiting any other disclosures or embodiments herein, inspection operations herein include operating one or more sensors in relation to an inspected surface, electromagnetic radiation inspection of a surface (e.g., operating a camera) whether in the visible spectrum or otherwise (e.g., infrared, UV, X-Ray, gamma ray, etc.), high-resolution inspection of the surface itself (e.g., a laser profiler, caliper, etc.), performing a repair operation on a surface, performing a cleaning operation on a surface, and/or marking a surface for a later operation (e.g., for further inspection, for repair, and/or for later analysis). Inspection operations include operations for a payload carrying a sensor or an array of sensors (e.g. on sensor sleds) for measuring characteristics of a surface being traversed such as thickness of the surface, curvature of the surface, ultrasound (or ultra-sonic) measurements to test the integrity of the surface and/or the thickness of the material forming the surface, heat transfer, heat profile/mapping, profiles or mapping any other parameters, the presence of rust or other corrosion, surface defects or pitting, the presence of organic matter or mineral deposits on the surface, weld quality and the like. Sensors may include magnetic induction sensors, acoustic sensors, laser sensors, LIDAR, a variety of image sensors, and the like. The inspection sled may carry a sensor for measuring characteristics near the surface being traversed such as emission sensors to test for gas leaks, air quality monitoring, radioactivity, the presence of liquids, electro-magnetic interference, visual data of the surface being traversed such as uniformity, reflectance, status of coatings such as epoxy coatings, wall thickness values or patterns, wear patterns, and the like. The term inspection sled may indicate one or more tools for repairing, welding, cleaning, applying a treatment or coating the surface being treated. Treatments and coatings may include rust proofing, sealing, painting, application of a coating, and the like. Cleaning and repairing may include removing debris, sealing leaks, patching cracks, and the like. The term inspection sled, sensor sled, and sled may be used interchangeably throughout the present disclosure.

In certain embodiments, for clarity of description, a sensor is described in certain contexts throughout the present disclosure, but it is understood explicitly that one or more tools for repairing, cleaning, and/or applying a treatment or coating to the surface being treated are likewise contemplated herein wherever a sensor is referenced. In certain embodiments, where a sensor provides a detected value (e.g., inspection data or the like), a sensor rather than a tool may be contemplated, and/or a tool providing a feedback value (e.g., application pressure, application amount, nozzle open time, orientation, etc.) may be contemplated as a sensor in such contexts.

Inspections are conducted with a robotic system 100 (e.g., an inspection robot, a robotic vehicle, etc.) which may utilize sensor sleds 1 and a sled array system 2 which enables accurate, self-aligning, and self-stabilizing contact with a surface (not shown) while also overcoming physical obstacles and maneuvering at varying or constant speeds. In certain embodiments, mobile contact of the system 100 with the surface includes a magnetic wheel 3. In certain embodiments, a sled array system 2 is referenced herein as a payload 2—wherein a payload 2 is an arrangement of sleds 1 with sensor mounted thereon, and wherein, in certain embodiments, an entire payload 2 can be changed out as a unit. The utilization of payloads 2, in certain embodiments, allows for a pre-configured sensor array that provides for rapid re-configuration by swapping out the entire payload 2. In certain embodiments, sleds 1 and/or specific sensors on sleds 1, are changeable within a payload 2 to reconfigure the sensor array.

An example sensor sled 1 includes, without limitation, one or more sensors mounted thereon such that the sensor(s) is operationally couplable to an inspection surface in contact with a bottom surface of the corresponding one of the sleds. For example, the sled 1 may include a chamber or mounting structure, with a hole at the bottom of the sled 1 such that the sensor can maintain line-of-sight and/or acoustic coupling with the inspection surface. The sled 1 as described throughout the present disclosure is mounted on and/or operationally coupled to the inspection robot 100 such that the sensor maintains a specified alignment to the inspection surface 500—for example a perpendicular arrangement to the inspection surface, or any other specified angle. In certain embodiments, a sensor mounted on a sled 1 may have a line-of-sight or other detecting arrangement to the inspection surface that is not through the sled 1—for example a sensor may be mounted at a front or rear of a sled 1, mounted on top of a sled 1 (e.g., having a view of the inspection surface that is forward, behind, to a side, and/or oblique to the sled 1). It will be seen that, regardless of the sensing orientation of the sensor to the inspection surface, maintenance of the sled 1 orientation to the inspection surface will support more consistent detection of the inspection surface by the sensor, and/or sensed values (e.g., inspection data) that is more consistently comparable over the inspection surface and/or that has a meaningful position relationship compared to position information determined for the sled 1 or inspection robot 100. In certain embodiments, a sensor may be mounted on the inspection robot 100 and/or a payload 2—for example a camera mounted on the inspection robot 100.

The present disclosure allows for gathering of structural information from a physical structure. Example physical structures include industrial structures such as boilers, pipelines, tanks, ferromagnetic structures, and other structures. An example system 100 is configured for climbing the outside of tube walls.

As described in greater detail below, in certain embodiments, the disclosure provides a system that is capable of integrating input from sensors and sensing technology that may be placed on a robotic vehicle. The robotic vehicle is capable of multi-directional movement on a variety of surfaces, including flat walls, curved surfaces, ceilings, and/or floors (e.g., a tank bottom, a storage tank floor, and/or a recovery boiler floor). The ability of the robotic vehicle to operate in this way provides unique access especially to traditionally inaccessible or dangerous places, thus permitting the robotic vehicle to gather information about the structure it is climbing on.

Figure 1:
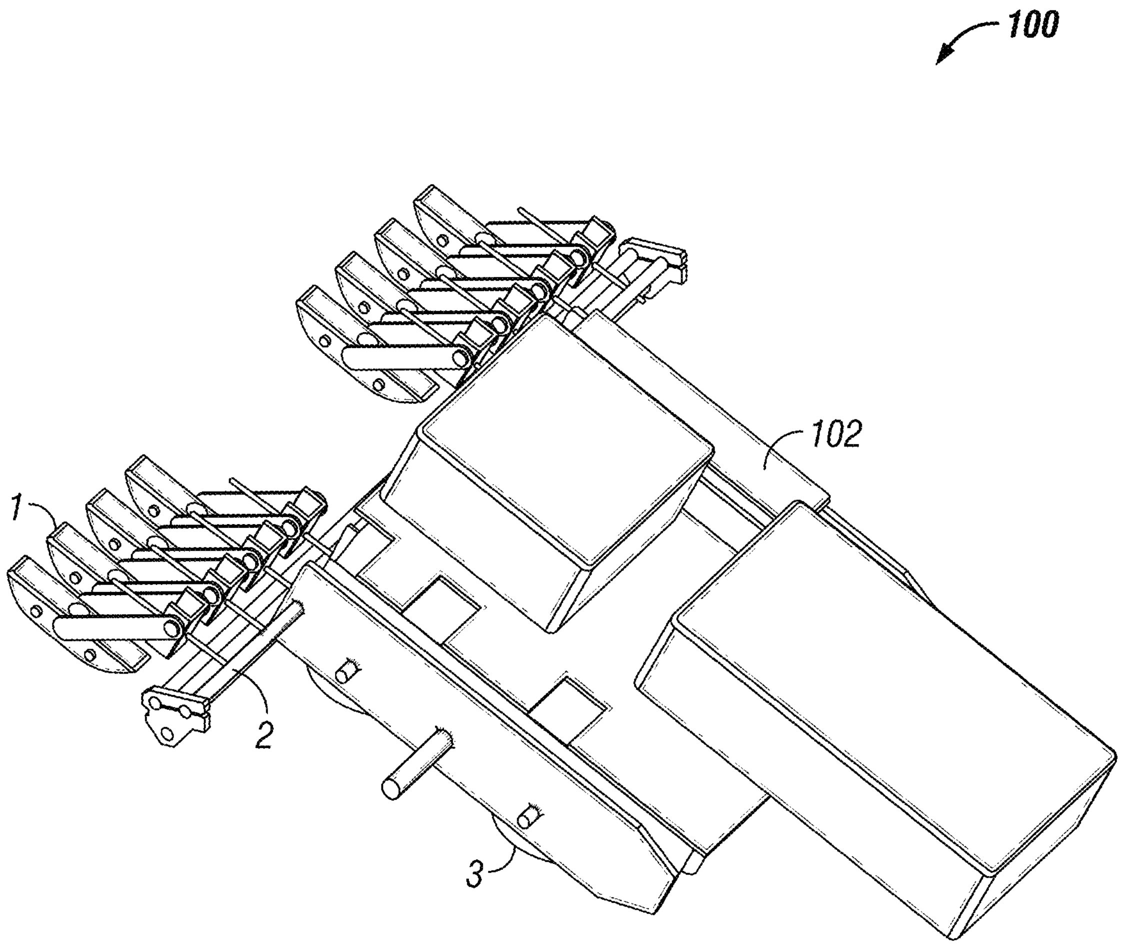
FIG. 1 is a schematic depiction of an inspection robot consistent with certain embodiments of the present disclosure.
Figure 3A:
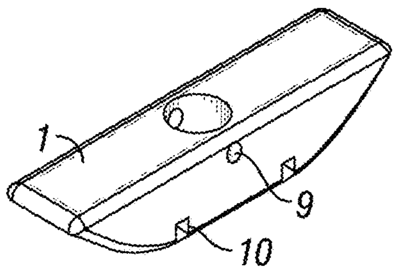
FIGS. 3A to 3C are schematic views of a sled consistent with certain embodiments of the present disclosure.
Figure 3B:
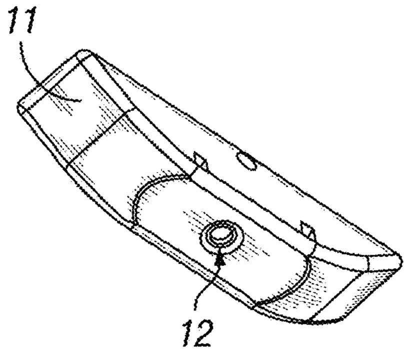

The system 100 (e.g., an inspection robot, a robotic vehicle, and/or supporting devices such as external computing devices, couplant or fluid reservoirs and delivery systems, etc.) in FIG. 1 includes the sled 1 mounted on a payload 2 to provide for an array of sensors having selectable contact (e.g., orientation, down force, sensor spacing from the surface, etc.) with an inspected surface. The payload 2 includes mounting posts mounted to a main body 102 of the system 100. The payload 2 thereby provides a convenient mounting position for a number of sleds 1, allowing for multiple sensors to be positioned for inspection in a single traverse of the inspected surface. The number and distance of the sleds 1 on the payload 2 are readily adjustable—for example by sliding the sled mounts on the payload 2 to adjust spacing. Referencing FIG. 3B, an example sled 1 has an aperture 12, for example to provide for couplant communication (e.g., an acoustically and/or optically continuous path of couplant) between the sensor mounted on the sled 1 and a surface to be inspected, to provide for line-of-sight availability between the sensor and the surface, or the like.

Figure 4:
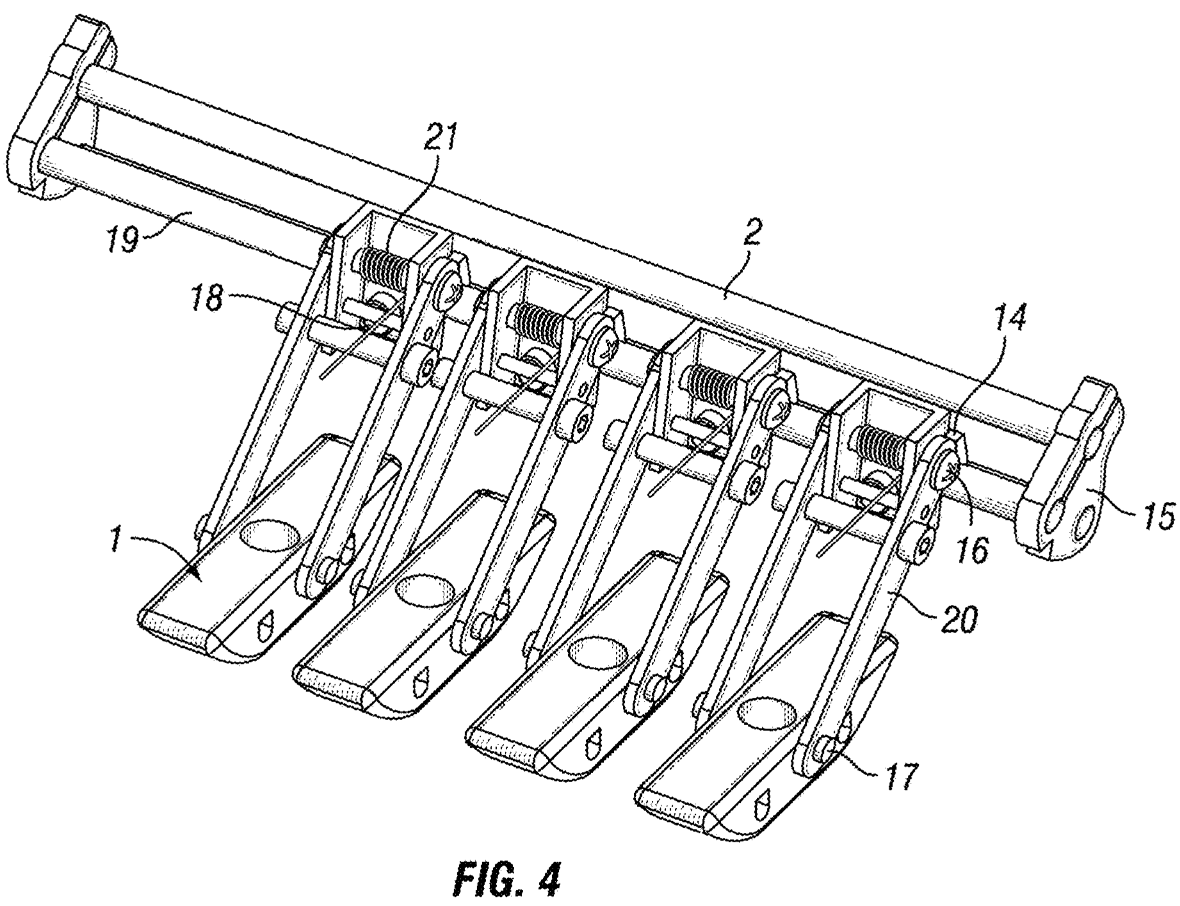
FIG. 4 is a schematic depiction of a payload consistent with certain embodiments of the present disclosure.

Referencing FIG. 4, an example system 100 includes the sled 1 held by an arm 20 that is connected to the payload 2 (e.g., a sensor array or sensor suite). An example system includes the sled 1 coupled to the arm 20 at a pivot point 17, allowing the sensor sled to rotate and/or tilt. On top of the arm 20, an example payload 2 includes a biasing member 21 (e.g., a torsion spring) with another pivot point 16, which provides for a selectable down-force of the arm 20 to the surface being inspected, and for an additional degree of freedom in sled 1 movement to ensure the sled 1 orients in a desired manner to the surface. In certain embodiments, down-force provides for at least a partial seal between the sensor sled 1 and surface to reduce or control couplant loss (e.g., where couplant loss is an amount of couplant consumed that is beyond what is required for operations), control distance between the sensor and the surface, and/or to ensure orientation of the sensor relative to the surface. Additionally or alternatively, the arm 20 can lift in the presence of an obstacle, while traversing between surfaces, or the like, and return to the desired position after the maneuver is completed. In certain embodiments, an additional pivot 18 couples the arm 20 to the payload 2, allowing for an additional rolling motion. In certain embodiments, pivots 16, 17, 18 provide for three degrees of freedom on arm 20 motion, allowing the arm 20 to be responsive to almost any obstacle or surface shape for inspection operations. In certain embodiments, various features of the system 100, including one or more pivots 16, 17, 18, co-operate to provide self-alignment of the sled 1 (and thus, the sensor mounted on the sled) to the surface. In certain embodiments, the sled 1 self-aligns to a curved surface and/or to a surface having variability in the surface shape.

In certain embodiments, the system is also able to collect information at multiple locations at once. This may be accomplished through the use of a sled array system. Modular in design, the sled array system allows for mounting sensor mounts, like the sleds, in fixed positions to ensure thorough coverage over varying contours. Furthermore, the sled array system allows for adjustment in spacing between sensors, adjustments of sled angle, and traveling over obstacles. In certain embodiments, the sled array system was designed to allow for multiplicity, allowing sensors to be added to or removed from the design, including changes in the type, quantity, and/or physical sensing arrangement of sensors. The sensor sleds that may be employed within the context of the present invention may house different sensors for diverse modalities useful for inspection of a structure. These sensor sleds are able to stabilize, align, travel over obstacles, and control, reduce, or optimize couplant delivery which allows for improved sensor feedback, reduced couplant loss, reduced post-inspection clean-up, reduced downtime due to sensor re-runs or bad data, and/or faster return to service for inspected equipment.

Figure 13:
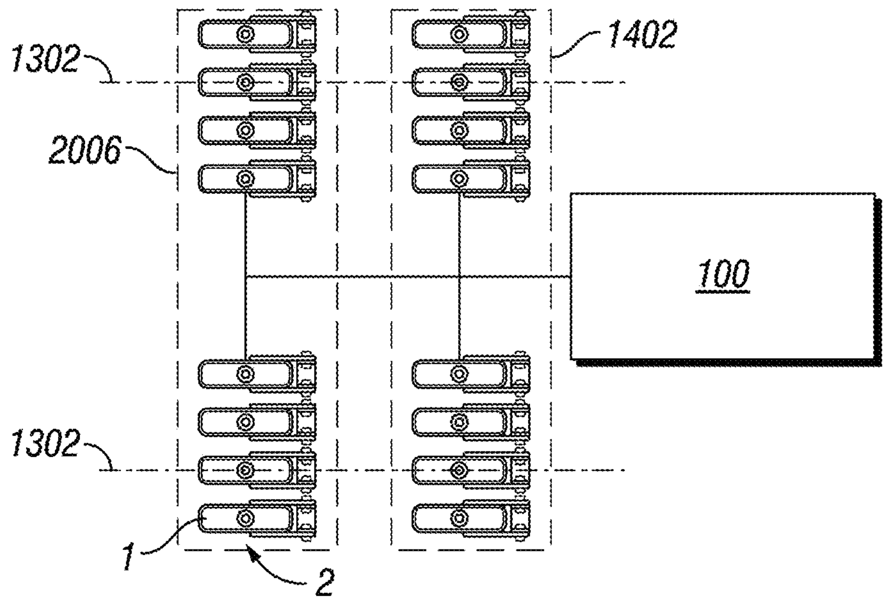
FIG. 13 is a schematic diagram of a payload arrangement.

There may be advantages to maintaining a sled with associated sensors or tools in contact and/or in a fixed orientation relative to the surface being traversed even when that surface is contoured, includes physical features, obstacles, and the like. In embodiments, there may be sled assemblies which are self-aligning to accommodate variabilities in the surface being traversed (e.g., an inspection surface) while maintaining the bottom surface of the sled (and/or a sensor or tool, e.g. where the sensor or tool protrudes through or is flush with a bottom surface of the sled) in contact with the inspection surface and the sensor or tool in a fixed orientation relative to the inspection surface. In an embodiment, as shown in FIG. 13 there may be a number of payloads 2, each payload 2 including a sled 1 positioned between a pair of sled arms 20, with each side exterior of the sled 1 attached to one end of each of the sled arms 20 at a pivot point 17 so that the sled 1 is able to rotate around an axis that would run between the pivot points 17 on each side of the sled 1. As described elsewhere herein, the payload 2 may include one or more inspection sleds 1 being pushed ahead of the payload 2, pulled behind the payload 2, or both. The other end of each sled arm 20 is attached to an inspection sled mount 14 with a pivot connection 16 which allows the sled arms to rotate around an axis running through the inspection sled mount 14 between the two pivot connections 16. Accordingly, each pair of sled arms 20 can raise or lower independently from other sled arms 20, and with the corresponding sled 1. The inspection sled mount 14 attaches to the payload 2, for example by mounting on shaft 19. The inspection sled mount 14 may connect to the payload shaft 19 with a connection 18 which allows the sled 1 and corresponding arms 20 to rotate from side to side in an arc around a perpendicular to the shaft 19. Together the up and down and side to side arc, where present, allow two degrees of rotational freedom to the sled arms. Connection 18 is illustrated as a gimbal mount in the example of FIG. 4, although any type of connection providing a rotational degree of freedom for movement is contemplated herein, as well as embodiments that do not include a rotational degree of freedom for movement. The gimbal mount 18 allows the sled 1 and associated arms 20 to rotate to accommodate side to side variability in the surface being traversed or obstacles on one side of the sled 1. The pivot points 17 between the sled arms 20 and the sled 1 allow the sled 1 to rotate (e.g., tilt in the direction of movement of the inspection robot 100) to conform to the surface being traversed and accommodate to variations or obstacles in the surface being traversed. Pivot point 17, together with the rotational freedom of the arms, provides the sled three degrees of rotational freedom relative to the inspection surface. The ability to conform to the surface being traversed facilitated the maintenance of a perpendicular interface between the sensor and the surface allowing for improved interaction between the sled 1 and the inspection surface. Improved interaction may include ensuring that the sensor is operationally couplable to the inspection surface.

Within the inspection sled mount 14 there may be a biasing member (e.g., torsion spring 21) which provides a down force to the sled 1 and corresponding arms 20. In the example, the down force is selectable by changing the torsion spring, and/or by adjusting the configuration of the torsion spring (e.g., confining or rotating the torsion spring to increase or decrease the down force). Analogous operations or structures to adjust the down force for other biasing members (e.g., a cylindrical spring, actuator for active down force control, etc.) are contemplated herein.

In certain embodiments, the inspection robot 100 includes a tether (not shown) to provide power, couplant or other fluids, and/or communication links to the robot 100. It has been demonstrated that a tether to support at least 200 vertical feet of climbing can be created, capable of couplant delivery to multiple ultra-sonic sensors, sufficient power for the robot, and sufficient communication for real-time processing at a computing device remote from the robot. Certain aspects of the disclosure herein, such as but not limited to utilizing couplant conservation features such as sled downforce configurations, the acoustic cone, and water as a couplant, support an extended length of tether. In certain embodiments, multiple ultra-sonic sensors can be provided with sufficient couplant through a ⅛" couplant delivery line, and/or through a ¼" couplant delivery line to the inspection robot 100, with ⅛" final delivery lines to individual sensors. While the inspection robot 100 is described as receiving power, couplant, and communications through a tether, any or all of these, or other aspects utilized by the inspection robot 100 (e.g., paint, marking fluid, cleaning fluid, repair solutions, etc.) may be provided through a tether or provided in situ on the inspection robot 100. For example, the inspection robot 100 may utilize batteries, a fuel cell, and/or capacitors to provide power; a couplant reservoir and/or other fluid reservoir on the robot to provide fluids utilized during inspection operations, and/or wireless communication of any type for communications, and/or store data in a memory location on the robot for utilization after an inspection operation or a portion of an inspection operation.

In certain embodiments, maintaining sleds 1 (and sensors or tools mounted thereupon) in contact and/or selectively oriented (e.g., perpendicular) to a surface being traversed provides for: reduced noise, reduced lost-data periods, fewer false positives, and/or improved quality of sensing; and/or improved efficacy of tools associated with the sled (less time to complete a repair, cleaning, or marking operation; lower utilization of associated fluids therewith; improved confidence of a successful repair, cleaning, or marking operation, etc.). In certain embodiments, maintaining sleds 1 in contacts and/or selectively oriented to the surface being traversed provides for reduced losses of couplant during inspection operations.

In certain embodiments, the combination of the pivot points 16, 17, 18) and torsion spring 21 act together to position the sled 1 perpendicular to the surface being traversed. The biasing force of the spring 21 may act to extend the sled arms 20 downward and away from the payload shaft 19 and inspection sled mount 14, pushing the sled 1 toward the inspection surface. The torsion spring 21 may be passive, applying a constant downward pressure, or the torsion spring 21 or other biasing member may be active, allowing the downward pressure to be varied. In an illustrative and non-limiting example, an active torsion spring 21 might be responsive to a command to relax the spring tension, reducing downward pressure and/or to actively pull the sled 1 up, when the sled 1 encounters an obstacle, allowing the sled 1 to more easily move over the obstacle. The active torsion spring 21 may then be responsive to a command to restore tension, increasing downward pressure, once the obstacle is cleared to maintain the close contact between the sled 1 and the surface. The use of an active spring may enable changing the angle of a sensor or tool relative to the surface being traversed during a traverse. Design considerations with respect to the surfaces being inspected may be used to design the active control system. If the spring 21 is designed to fail closed, the result would be similar to a passive spring and the sled 1 would be pushed toward the surface being inspected. If the spring 21 is designed to fail open, the result would be increased obstacle clearance capabilities. In embodiments, spring 21 may be a combination of passive and active biasing members.

The downward pressure applied by the torsion spring 21 may be supplemented by a spring within the sled 1 further pushing a sensor or tool toward the surface. The downward pressure may be supplemented by one or more magnets in/on the sled 1 pulling the sled 1 toward the surface being traversed. The one or more magnets may be passive magnets that are constantly pulling the sled 1 toward the surface being traversed, facilitating a constant distance between the sled 1 and the surface. The one or magnets may be active magnets where the magnet field strength is controlled based on sensed orientation and/or distance of the sled 1 relative to the inspection surface. In an illustrative and non-limiting example, as the sled 1 lifts up from the surface to clear an obstacle and it starts to roll, the strength of the magnet may be increased to correct the orientation of the sled 1 and draw it back toward the surface.

The connection between each sled 1 and the sled arms 20 may constitute a simple pin or other quick release connect/disconnect attachment. The quick release connection at the pivot points 17 may facilitate attaching and detaching sleds 1 enabling a user to easily change the type of inspection sled attached, swapping sensors, types of sensors, tools, and the like.

Figure 16:
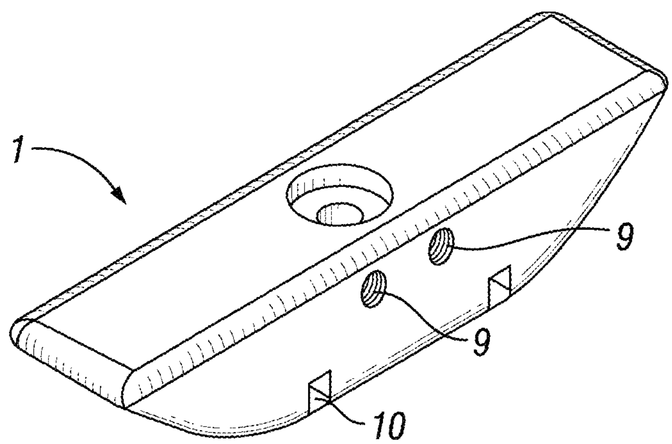
FIG. 16 is a schematic perspective view of a sled.

In embodiments, as depicted in FIG. 16, there may be multiple attachment or pivot point accommodations 9 available on the sled 1 for connecting the sled arms 20. The location of the pivot point accommodations 9 on the sled 1 may be selected to accommodate conflicting goals such as sled 1 stability and clearance of surface obstacles. Positioning the pivot point accommodations 9 behind the center of sled in the longitudinal direction of travel may facilitate clearing obstacles on the surface being traversed. Positioning the pivot point accommodation 9 forward of the center may make it more difficult for the sled 1 to invert or flip to a position where it cannot return to a proper inspection operation position. It may be desirable to alter the connection location of the sled arms 20 to the pivot point accommodations 9 (thereby defining the pivot point 17) depending on the direction of travel. The location of the pivot points 17 on the sled 1 may be selected to accommodate conflicting goals such as sensor positioning relative to the surface and avoiding excessive wear on the bottom of the sled. In certain embodiments, where multiple pivot point accommodations 9 are available, pivot point 17 selection can occur before an inspection operation, and/or be selectable during an inspection operation (e.g., arms 20 having an actuator to engage a selected one of the pivot points 9, such as extending pegs or other actuated elements, thereby selecting the pivot point 17).

Figure 17:
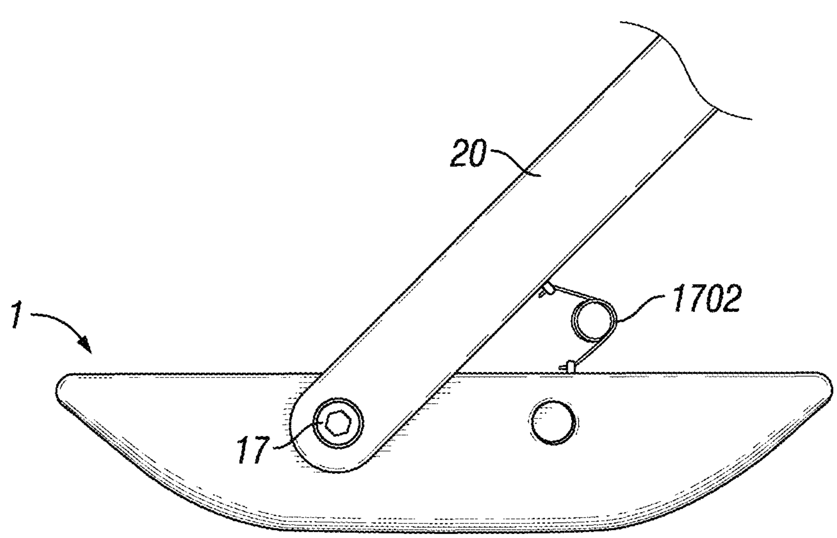
FIG. 17 is a schematic side view of a sled.

In embodiments, the degree of rotation allowed by the pivot points 17 may be adjustable. This may be done using mechanical means such as a physical pin or lock. In embodiments, as shown in FIG. 17, the connection between the sled 1 and the sled arms 20 may include a spring 1702 that biases the pivot points 17 to tend to pivot in one direction or another. The spring 1702 may be passive, with the selection of the spring based on the desired strength of the bias, and the installation of the spring 1702 may be such as to preferentially push the front or the back of the sled 1 down. In embodiments, the spring 1702 may be active and the strength and preferential pivot may be varied based on direction of travel, presence of obstacles, desired pivoting responsiveness of the sled 1 to the presence of an obstacle or variation in the inspection surface, and the like. In certain embodiments, opposing springs or biasing members may be utilized to bias the sled 1 back to a selected position (e.g., neutral/flat on the surface, tilted forward, tilted rearward, etc.). Where the sled 1 is biased in a given direction (e.g., forward or rearward), the sled 1 may nevertheless operate in a neutral position during inspection operations, for example due to the down force from the arm 20 on the sled 1.

Figure 18:
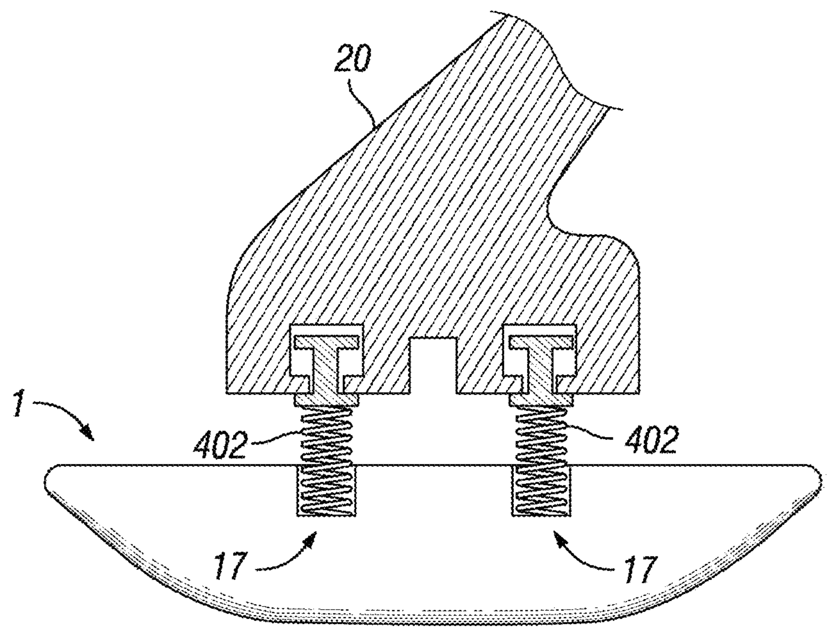
FIG. 18 is a schematic cutaway view of a sled.

An example sled 1, for example as shown in FIG. 18, includes more than one pivot point 17, for example utilizing springs 402 to couple to the sled arm 20. In the example of FIG. 16, the two pivot points 17 provide additional clearance for the sled 1 to clear obstacles. In certain embodiments, both springs 402 may be active, for example allowing some rotation of each pivot simultaneously, and/or a lifting of the entire sled. In certain embodiments, springs 402 may be selectively locked—for example before inspection operations and/or actively controlled during inspection operations. Additionally or alternatively, selection of pivot position, spring force and/or ease of pivoting at each pivot may be selectively controlled—for example before inspection operations and/or actively controlled during inspection operations (e.g., using a controller 802). The utilization of springs 402 is a non-limiting example of simultaneous multiple pivot points, and leaf springs, electromagnets, torsion springs, or other flexible pivot enabling structures are contemplated herein. The spring tension or pivot control may be selected based on the uniformity of the surface to be traversed. The spring tension may be varied between the front and rear pivot points depending on the direction of travel of the sled 1. In an illustrative and non-limiting example, the rear spring (relative to the direction of travel) might be locked and the front spring active when traveling forward to better enable obstacle accommodation. When direction of travel is reversed, the active and locked springs 402 may be reversed such that what was the rear spring 402 may now be active and what was the front spring 402 may now be locked, again to accommodate obstacles encountered in the new direction of travel.

Figure 19A:
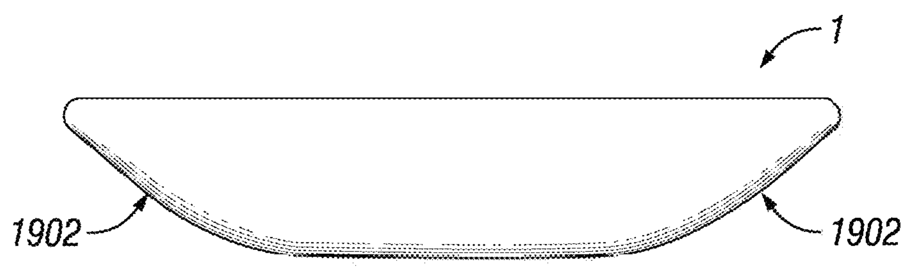
FIGS. 19A and 19B depict schematic side views of alternate embodiments of a sled.
Figure 19B:
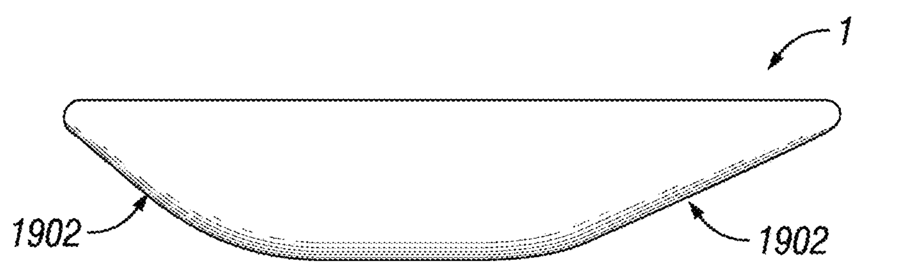

In embodiments, the bottom surface of the sled 1 may be shaped, as shown in FIGS. 19A, 19B, with one or more ramps 1902 to facilitate the sled 1 moving over obstacles encountered along the direction of travel. The shape and slope of each ramp 1902 may be designed to accommodate conflicting goals such as sled 1 stability, speed of travel, and the size of the obstacle the sled 1 is designed to accommodate. A steep ramp angle might be better for accommodating large obstacles but may be required to move more slowly to maintain stability and a good interaction with the surface. The slope of the ramp 1902 may be selected based on the surface to be traversed and expected obstacles. If the sled 1 is interacting with the surface in only one direction, the sled 1 may be designed with only one ramp 1902. If the sled 1 is interacting with the surface going in two directions, the sled 1 may be designed with two ramps 1902, e.g., a forward ramp and a rearward ramp, such that the sled 1 leads with a ramp 1902 in each direction of travel. Referencing FIG. 19B, the front and rear ramps 1902 may have different angles and/or different total height values. While the ramps 1902 depicted in FIGS. 19A and 19B are linear ramps, a ramp 1902 may have any shape, including a curved shape, a concave shape, a convex shape, and/or combinations thereof. The selection of the ramp angle, total ramp height, and bottom surface shape is readily determinable to one of skill in the art having the benefit of the disclosure herein and information ordinarily available when contemplating a system. Certain considerations for determining the ramp angle, ramp total height, and bottom surface shape include considerations of manufacturability, obstacle geometries likely to be encountered, obstacle materials likely to be encountered, materials utilized in the sled 1 and/or ramp 1902, motive power available to the inspection robot 100, the desired response to encountering obstacles of a given size and shape (e.g., whether it is acceptable to stop operations and re-configure the inspection operations for a certain obstacle, or whether maximum obstacle traversal capability is desired), and/or likely impact speed with obstacles for a sled.

Figure 20A:
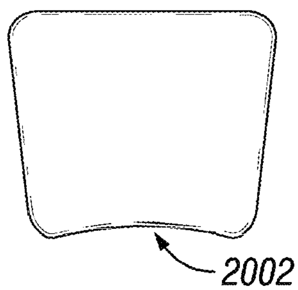
FIGS. 20A and 20B depict schematic front views of alternate embodiments of a sled.
Figure 20B:
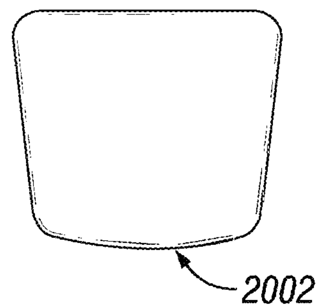

In embodiments, as shown in FIGS. 20A and 20B, the bottom surface 2002 of the sled 1 may be contoured or curved to accommodate a known texture or shape of the surface being traversed, for example such that the sled 1 will tend to remain in a desired orientation (e.g., perpendicular) with the inspection surface as the sled 1 is moved. The bottom surface 2002 of the sled 1 may be shaped to reduce rotation, horizontal translation and shifting, and/or yaw or rotation of the sled 1 from side to side as it traverses the inspection surface. Referencing FIG. 20B, the bottom surface 2002 of the sled 1 may be convex for moving along a rounded surface, on the inside of a pipe or tube, and/or along a groove in a surface. Referencing FIG. 20A, the bottom surface 2002 of the sled 1 may be concave for the exterior of a rounded surface, such as riding on an outer wall of a pipe or tube, along a rounded surface, and/or along a ridge in a surface. The radius of curvature of the bottom surface 2002 of the sled 1 may be selected to facilitate alignment given the curvature of the surface to be inspected. The bottom surface 2002 of the sled 1 may be shaped to facilitate maintaining a constant distance between sensors or tools in the sled 1 and the inspection surface being traversed. In embodiments, at least a portion the bottom of the sled 1 may be flexible such that the bottom of the sled 1 may comply to the shape of the surface being traversed. This flexibility may facilitate traversing surfaces that change curvature over the length of the surface without the adjustments to the sled 1.

For a surface having a variable curvature, a chamfer or curve on the bottom surface 2002 of a sled 1 tends to guide the sled 1 to a portion of the variable curvature matching the curvature of the bottom surface 2002. Accordingly, the curved bottom surface 2002 supports maintaining a selected orientation of the sled 1 to the inspection surface. In certain embodiments, the bottom surface 2002 of the sled 1 is not curved, and one or more pivots 16, 17, 18 combined with the down force from the arms 20 combine to support maintaining a selected orientation of the sled 1 to the inspection surface. In some embodiments, the bottom of the sled 1 may be flexible such that the curvature may adapt to the curvature of the surface being traversed.

Figure 21:
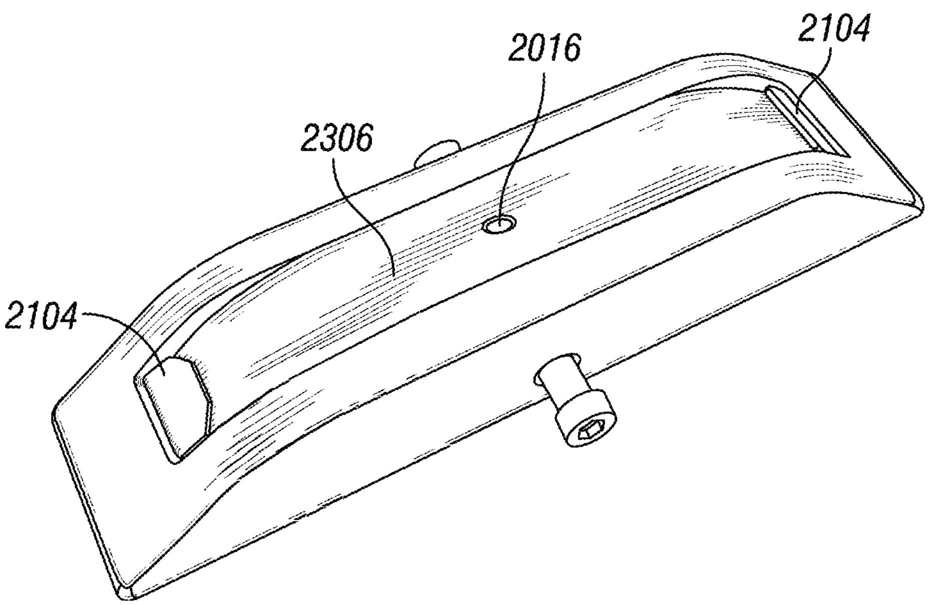
FIG. 21 is a schematic bottom view of a sled.
Figure 22:
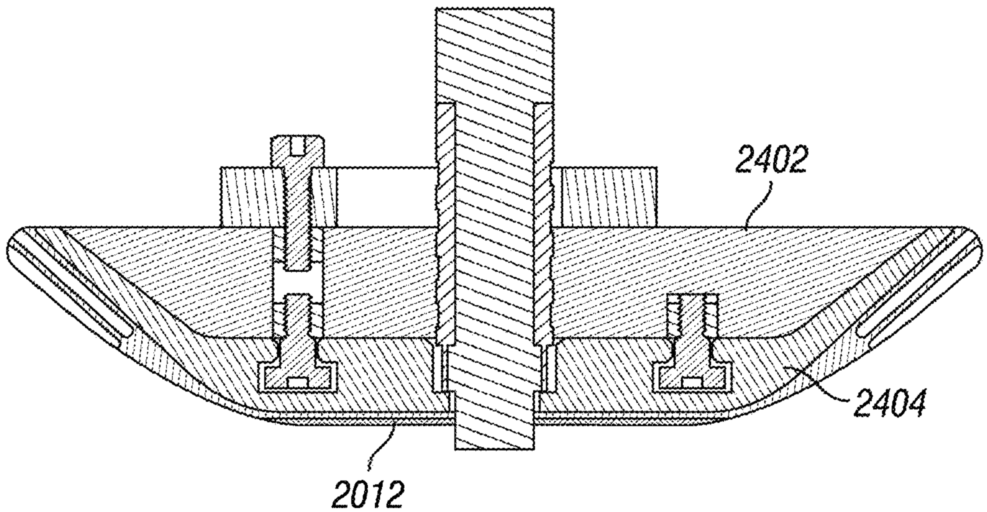
FIG. 22 is a schematic cutaway side view of a sled.

The material on the bottom of the sled 1 may be chosen to prevent wear on the sled 1, reduce friction between the sled 1 and the surface being traversed, or a combination of both. Materials for the bottom of the sled may include materials such as plastic, metal, or a combination thereof. Materials for the bottom of the sled may include an epoxy coat, a replaceable layer of polytetrafluoroethylene (e.g., Teflon), acetyl (e.g.,—Delrin® acetyl resin), ultrafine molecular weight polyethylene (PMW), and the like. In embodiments, as shown in FIG. 22, the material on the bottom of the sled 1 may be removable layer such as a sacrificial film 2012 (or layer, and/or removable layer) that is applied to the bottom of the sled 1 and then lifted off and replaced at selected intervals, before each inspection operation, and/or when the film 2012 or bottom of the sled begin to show signs of wear or an increase in friction. An example sled 1 includes an attachment mechanism 2104, such as a clip, to hold the sacrificial film 2012 in place. Referencing FIG. 21, an example sled 1 includes a recess 2306 in the bottom surface of the sled to retain the sacrificial film 2012 and allow the sacrificial film 2012 to have a selected spatial orientation between the inspection contact side (e.g., the side of the sacrificial film 2012 exposed to the inspection surface) with the bottom surface 2002 of the sled 1 (e.g., flush with the bottom, extending slightly past the bottom, etc.). In certain embodiments, the removable layer may include a thickness that provides a selected spatial orientation between an inspection contact side in contact with the inspection surface and the bottom surface of the sled. In certain embodiments, the sacrificial film 2012 includes an adhesive, for example with an adhesive backing to the layer, and/or may be applied as an adhesive (e.g., an epoxy layer or coating that is refreshed or reapplied from time to time). An example sacrificial film 2012 includes a hole therethrough, for example allowing for visual and/or couplant contact between a sensor 2202 attached to the sled 1 and the inspection surface. The hole may be positioned over the sensor 2202, and/or may accommodate the sensor 2202 to extend through the sacrificial film 2012, and/or may be aligned with a hole 2016 (e.g., FIG. 21) or aperture 12 (e.g., FIG. 3B) in the sled bottom.

Figure 23:
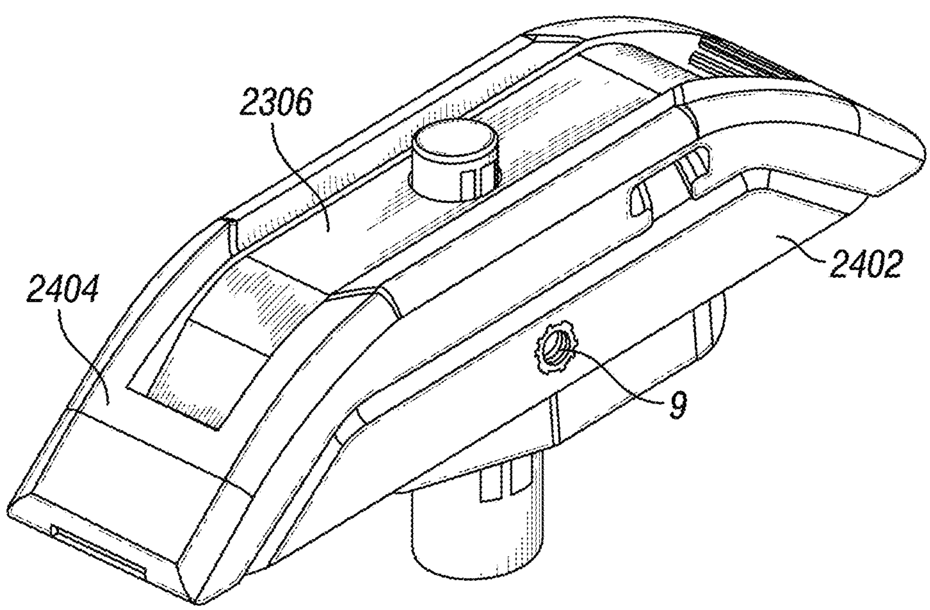
FIG. 23 is a schematic bottom view of a sled.
Figure 24:
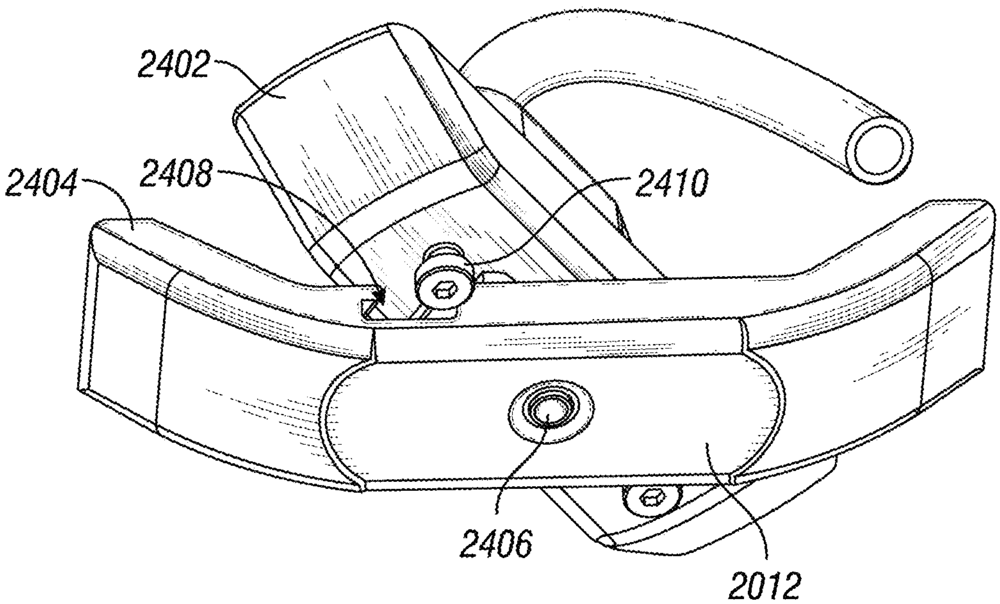
FIG. 24 is a schematic view of a sled having separable top and bottom portions.

In embodiments, as shown in FIG. 22-24, an example sled 1 includes an upper portion 2402 and a replaceable lower portion 2404 having a bottom surface. In some embodiments, the lower portion 2404 may be designed to allow the bottom surface and shape to be changed to accommodate the specific surface to be traversed without having to disturb or change the upper portion 2402. Accordingly, where sensors or tools engage the upper portion 2402, the lower portion 2404 can be rapidly changed out to configure the sled 1 to the inspection surface, without disturbing sensor connections and/or coupling to the arms 20. The lower portion 2404 may additionally or alternatively be configured to accommodate a sacrificial layer 2012, including potentially with a recess 2306. An example sled 1 includes a lower portion 2404 designed to be easily replaced by lining up the upper portion 2402 and the lower portion 2404 at a pivot point 2406, and then rotating the pieces to align the two portions. In certain embodiments, the sensor, installation sleeve, cone tip, or other portion protruding through aperture 12 forms the pivot point 2406. One or more slots 2408 and key 2410 interfaces or the like may hold the two portions together.

The ability to quickly swap the lower portion 2404 may facilitate changing the bottom surface of the sled 1 to improve or optimize the bottom surface of the sled 1 for the surface to be traversed. The lower portion may be selected based on bottom surface shape, ramp angle, or ramp total height value. The lower portion may be selected from a multiplicity of pre-configured replaceable lower portions in response to observed parameters of the inspection surface after arrival to an inspection site. Additionally or alternatively, the lower portion 2404 may include a simple composition, such as a wholly integrated part of a single material, and/or may be manufactured on-site (e.g., in a 3-D printing operation) such as for a replacement part and/or in response to observed parameters of the inspection surface after arrival to an inspection site. Improvement and/or optimization may include: providing a low friction material as the bottom surface to facilitate the sled 1 gliding over the surface being traversed, having a hardened bottom surface of the sled 1 if the surface to be traversed is abrasive, producing the lower portion 2404 as a wear material or low-cost replacement part, and the like. The replacement lower portion 2404 may allow for quick replacement of the bottom surface when there is wear or damage on the bottom surface of the sled 1. Additionally or alternatively, a user may alter a shape/curvature of the bottom of the sled, a slope or length of a ramp, the number of ramps, and the like. This may allow a user to swap out the lower portion 2404 of an individual sled 1 to change a sensor to a similar sensor having a different sensitivity or range, to change the type of sensor, manipulate a distance between the sensor and the inspection surface, replace a failed sensor, and the like. This may allow a user to swap out the lower portion 2404 of an individual sled 1 depending upon the surface curvature of the inspection surface, and/or to swap out the lower portion 2404 of an individual sled 1 to change between various sensors and/or tools.

Figure 25:
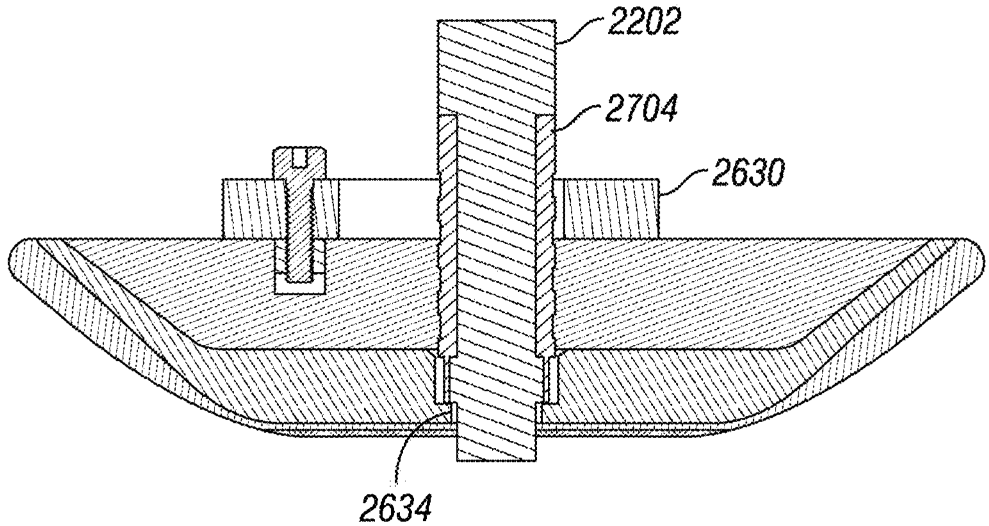
FIG. 25 is a schematic cutaway side view of a sled.
Figure 26:
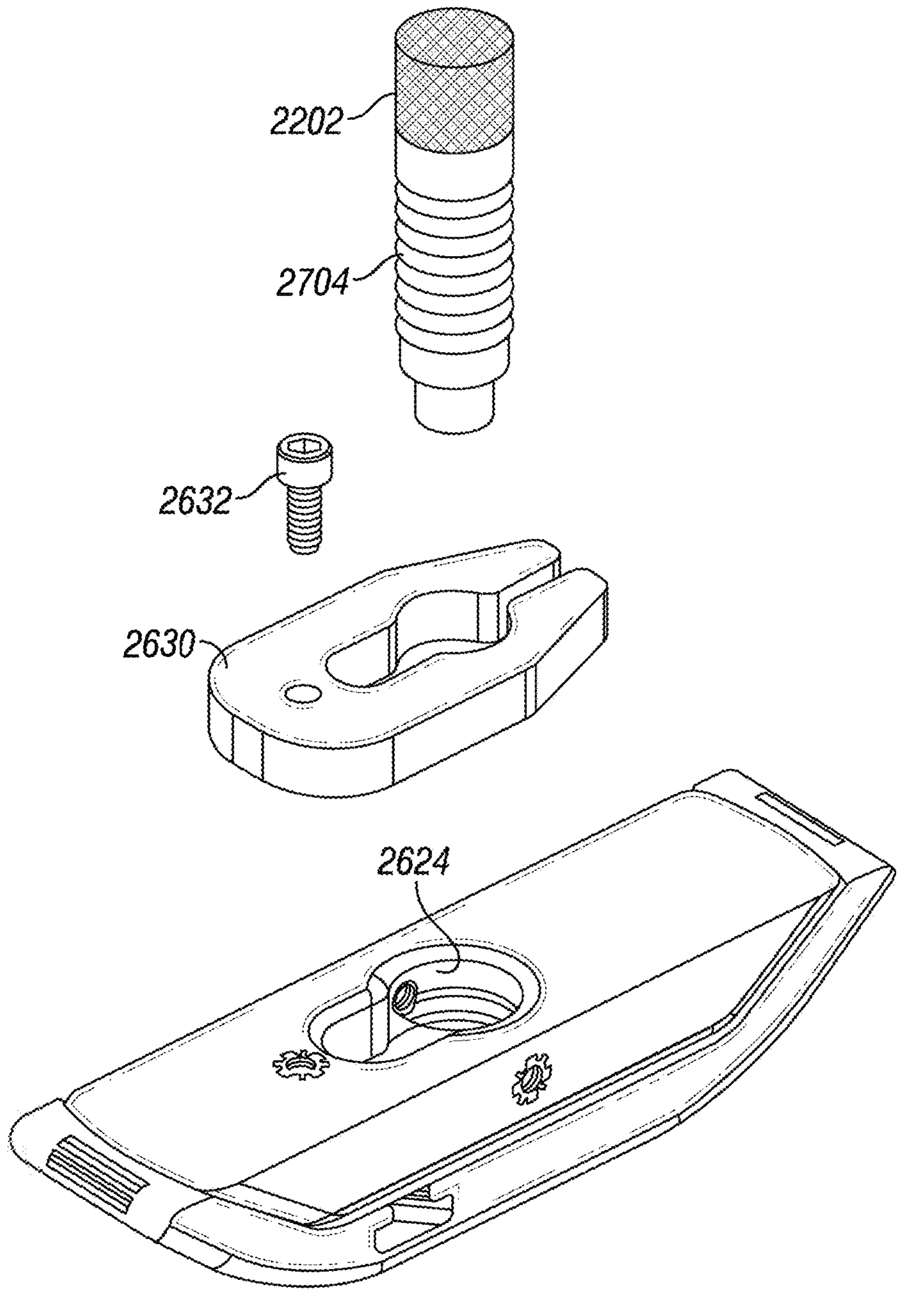
FIG. 26 is a schematic exploded view of a sled with a sensor.
Figure 27:
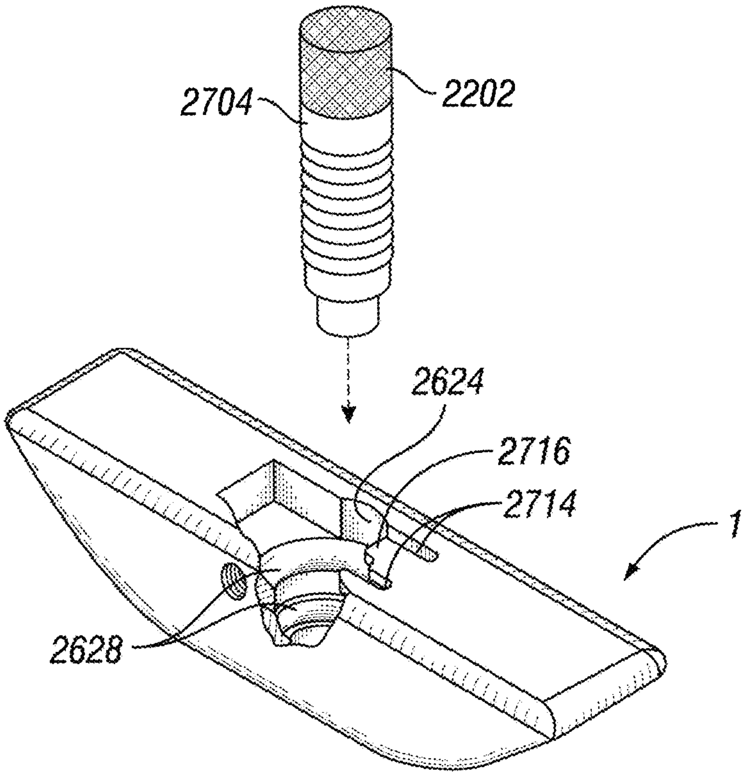
FIG. 27 is a schematic, partially exploded, partially cutaway view of a sled with a sensor.

In embodiments, as shown in FIGS. 25-27, a sled 1 may have a chamber 2624 sized to accommodate a sensor 2202, and/or into which a sensor 2202 may be inserted. The chamber 2624 may have chamfers 2628 on at least one side of the chamber to facilitate ease of insertion and proper alignment of the sensor 2202 in the chamber 2624. An example sled 1 includes a holding clamp 2630 that accommodates the sensor 2202 to pass therethrough, and is attached to the sled 1 by a mechanical device 2632 such as a screw or the like. An example sled 1 includes stops 2634 at the bottom of the chamber 2624, for example to ensure a fixed distance between the sensor 2202 and bottom surface of the sled and/or the inspection surface, and/or to ensure a specific orientation of the sensor 2202 to the bottom surface of the sled and/or the inspection surface.

Referencing FIG. 27, an example sled 1 includes a sensor installation sleeve 2704, which may be positioned, at least partially, within the chamber. The example sensor installation sleeve 2704 may be formed from a compliant material such as neoprene, rubber, an elastomeric material, and the like, and in certain embodiments may be an insert into a chamber 2624, a wrapper material on the sensor 2202, and/or formed by the substrate of the sled 1 itself (e.g., by selecting the size and shape of the chamber 2624 and the material of the sled 1 at least in the area of the chamber 2624). An example sleeve 2704 includes an opening 2 sized to receive a sensor 2202 and/or a tool (e.g., marking, cleaning, repair, and/or spray tool). In the example of FIG. 27, the sensor installation sleeve 2704 flexes to accommodate the sensor 2202 as the sensor 2202 is inserted. Additionally or alternatively, a sleeve 2704 may include a material wrapping the sensor 2202 and slightly oversized for the chamber 2624, where the sleeve compresses through the hole into the chamber 2624, and expands slightly when released, thereby securing the sensor 2202 into the sled 1. In the example of FIG. 27, an installation tab 2716 is formed by relief slots 2714. The tab 2716 flexes to engage the sensor 2202, easing the change of the sensor 2202 while securing the sensor 2202 in the correct position once inserted into the sled 1.

It can be seen that a variety of sensor and tool types and sizes may be swapped in and out of a single sled 1 using the same sensor installation sleeve 2704. The opening of the chamber 2624 may include the chamfers 2628 to facilitate insertion, release, and positioning of the sensor 2202, and/or the tab 2716 to provide additional compliance to facilitate insertion, release, and positioning of the sensor 2202 and/or to accommodate varying sizes of sensors 2202. Throughout the present disclosure, a sensor 2202 includes any hardware of interest for inserting or coupling to a sled 1, including at least: a sensor, a sensor housing or engagement structure, a tool (e.g., a sprayer, marker, fluid jet, etc.), and/or a tool housing or engagement structure.

Figure 28:
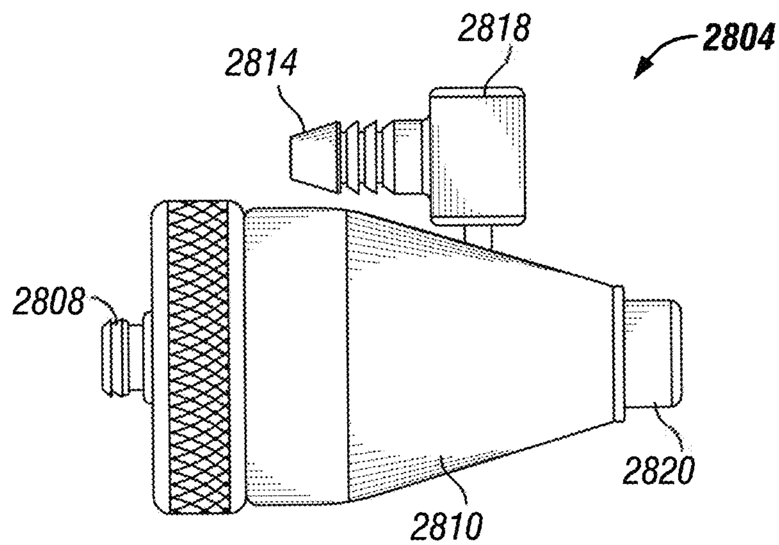
FIG. 28 is a schematic depiction of an acoustic cone.

Referencing FIG. 28, an acoustic cone 2804 is depicted. The acoustic cone 2804 includes a sensor interface 2808, for example to couple an acoustic sensor with the cone 2804. The example acoustic cone 2804 includes a couplant interface 2814, with a fluid chamber 2818 coupling the couplant interface 2814 to the cone fluid chamber 2810. In certain embodiments, the cone tip 2820 of the acoustic cone 2804 is kept in contact with the inspection surface, and/or kept at a predetermined distance from the inspection surface while the acoustic sensor is mounted at the opposite end of the acoustic cone 2804 (e.g., at sensor interface 2808). The cone tip 2820 may define a couplant exit opening between the couplant chamber and the inspection surface. The couplant exit opening may be flush with the bottom surface or extend through the bottom of the sled. Accordingly, a delay line (e.g., acoustic or vibration coupling of a fixed effective length) between the sensor and the inspection surface is kept at a predetermined distance throughout inspection operations. Additionally, the acoustic cone 2804 couples to the sled 1 in a predetermined arrangement, allowing for replacement of the sensor, and/or swapping of a sled 1 without having to recalibrate acoustic and/or ultra-sonic measurements. The volume between the sensor and the inspection surface is maintained with couplant, providing a consistent delay line between the sensor and the inspection surface. Example and non-limiting couplant fluids include alcohol, a dye penetrant, an oil-based liquid, an ultra-sonic gel, or the like. An example couplant fluid includes particle sizes not greater than 1/16 of an inch. In certain embodiments, the couplant is filtered before delivery to the sled 1. In certain embodiments, the couplant includes water, which is low cost, low viscosity, easy to pump and compatible with a variety of pump types, and may provide lower resistance to the movement of the inspection sled over the surface than gels. In certain embodiments, water may be an undesirable couplant, and any type of couplant fluid may be provided.

An example acoustic cone 2804 provides a number of features to prevent or remove air bubbles in the cone fluid chamber 2810. An example acoustic cone 2804 includes entry of the fluid chamber 2818 into a vertically upper portion of the cone fluid chamber 2810 (e.g., as the inspection robot 100 is positioned on the inspection surface, and/or in an intended orientation of the inspection robot 100 on the inspection surface, which may toward the front of the robot where the robot is ascending vertically), which tends to drive air bubbles out of the cone fluid chamber 2810. In certain embodiments, the utilization of the acoustic cone 2804, and the ability to minimize sensor coupling and de-coupling events (e.g., a sled can be swapped out without coupling or decoupling the sensor from the cone) contributes to a reduction in leaks and air bubble formation. In certain embodiments, a controller 802 periodically and/or in response to detection of a potential air bubble (e.g., due to an anomalous sensor reading) commands a de-bubbling operation, for example increasing a flow rate of couplant through the cone 2804. In certain embodiments, the arrangements described throughout the present disclosure provide for sufficient couplant delivery to be in the range of 0.06 to 0.08 gallons per minute using a 1/8" fluid delivery line to the cone 2804. In certain embodiments, nominal couplant flow and pressure is sufficient to prevent the formation of air bubbles in the acoustic cone 2804.

Figure 29:
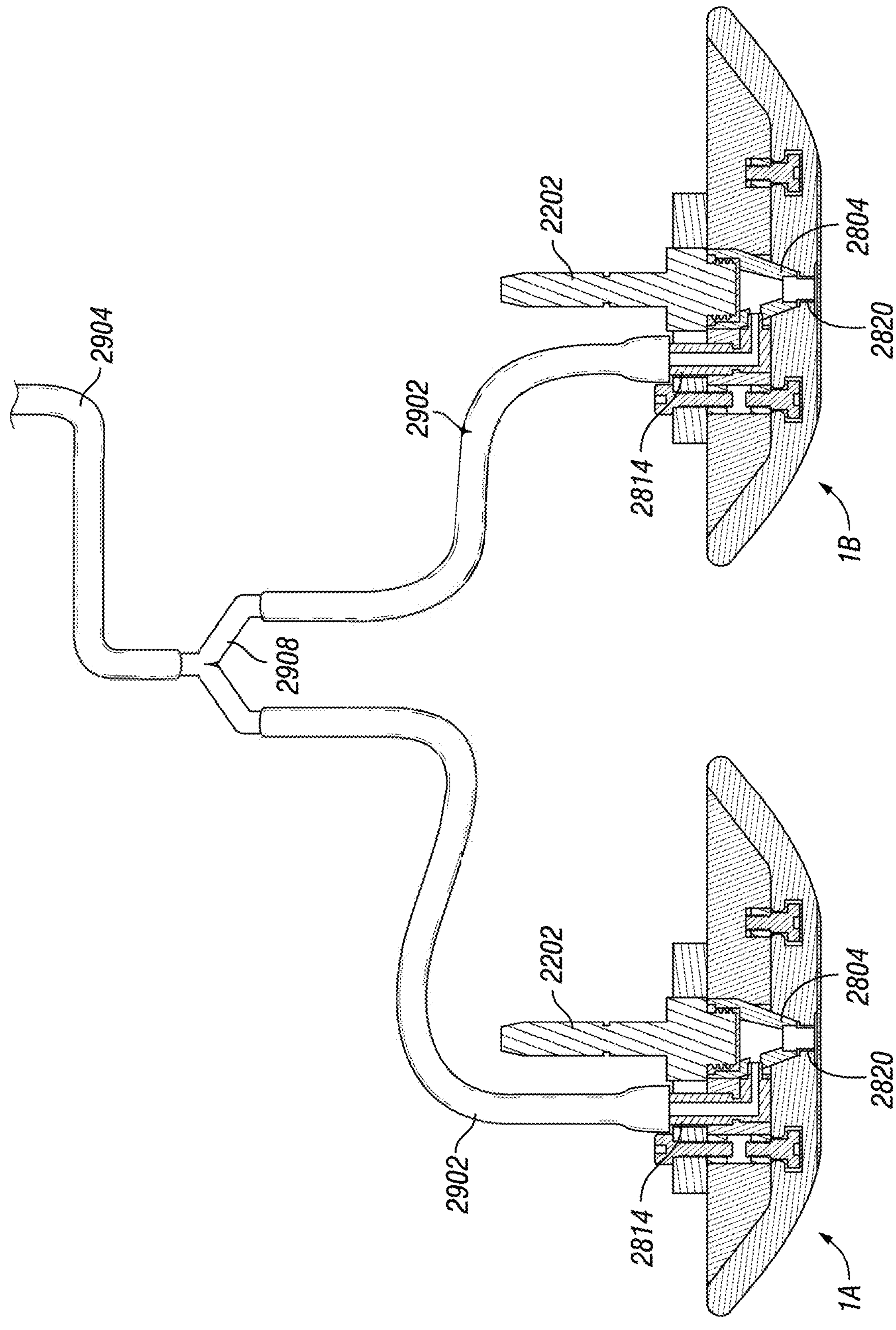
FIG. 29 is a schematic view of couplant lines to a number of sleds.

As shown in FIG. 29, individual tubing 2902 may be connected to each couplant interface 2814. In some embodiments, the individual tubing 2902 may be connected directly to a sled 1A, 1B rather than the individual tubing 2902, for example with sled 1A, 1B plumbing permanently coupled to the couplant interface 2814. Two or more individual tubing 2902 sections may then be joined together in a tubing junction 2908 with a single tube 2904 leaving the junction. In this way, a number of individual tubes 2902 may be reduced to a single tube 2904 that may be easily connected/disconnected from the source of the couplant. In certain embodiments, an entire payload 2 may include a single couplant interface, for example to the inspection robot 100. The inspection robot 100 may include a couplant reservoir and/or a delivery pump thereupon, and/or the inspection robot 100 may be connected to an external couplant source. In certain embodiments, an entire payload 2 can be changed out with a single couplant interface change, and without any of the cone couplant interfaces and/or sensor couplant interface being disconnected. In certain embodiments, the integration of the sensor 2202, acoustic cone 2804, and cone tip 2820 is designed to maintain a constant distance between the surface being measured and the acoustic sensor 2202. The constant distance facilitates in the interpretation of the data recorded by the acoustic sensor 2202. In certain embodiments, the distance between the surface being measured and the acoustic sensor 2202 may be described as the "delay line."

Certain embodiments include an apparatus for providing acoustic coupling between a carriage (or sled) mounted sensor and an inspection surface. Example and non-limiting structures to provide acoustic coupling between a carriage mounted sensor and an inspection surface include an acoustic (e.g., an ultra-sonic) sensor mounted on a sled 1, the sled 1 mounted on a payload 2, and the payload 2 coupled to an inspection robot. An example apparatus further includes providing the sled 1 with a number of degrees of freedom of motion, such that the sled 1 can maintain a selected orientation with the inspection surface—including a perpendicular orientation and/or a selected angle of orientation. Additionally or alternatively, the sled 1 is configured to track the surface, for example utilizing a shaped bottom of the sled 1 to match a shape of the inspection surface or a portion of the inspection surface, and/or the sled 1 having an orientation such that, when the bottom surface of the sled 1 is positioned against the inspection surface, the sensor maintains a selected angle with respect to the inspection surface.

Certain additional embodiments of an apparatus for providing acoustic coupling between a carriage mounted sensor and an inspection surface include utilization of a fixed-distance structure that ensures a consistent distance between the sensor and the inspection surface. For example, the sensor may be mounted on a cone, wherein an end of the cone touches the inspection surface and/or is maintained in a fixed position relative to the inspection surface, and the sensor mounted on the cone thereby is provided at a fixed distance from the inspection surface. In certain embodiments, the sensor may be mounted on the cone, and the cone mounted on the sled 1, such that a change-out of the sled 1 can be performed to change out the sensor, without engaging or disengaging the sensor from the cone. In certain embodiments, the cone may be configured such that couplant provided to the cone results in a filled couplant chamber between a transducer of the sensor and the inspection surface. In certain additional embodiments, a couplant entry position for the cone is provided at a vertically upper position of the cone, between the cone tip portion and the sensor mounting end, in an orientation of the inspection robot as it is positioned on the surface, such that couplant flow through the cone tends to prevent bubble formation in the acoustic path between the sensor and the inspection surface. In certain further embodiments, the couplant flow to the cone is adjustable, and is capable, for example, to be increased in response to a determination that a bubble may have formed within the cone and/or within the acoustic path between the sensor and the inspection surface. In certain embodiments, the sled 1 is capable of being lifted, for example with an actuator that lifts an arm 20, and/or that lifts a payload 2, such that a free fluid path for couplant and attendant bubbles to exit the cone and/or the acoustic path is provided. In certain embodiments, operations to eliminate bubbles in the cone and/or acoustic path are performed periodically, episodically (e.g., after a given inspection distance is completed, at the beginning of an inspection run, after an inspection robot pauses for any reason, etc.), and/or in response to an active determination that a bubble may be present in the cone and/or the acoustic path.

An example apparatus provides for low or reduced fluid loss of couplant during inspection operations. Example and non-limiting structures to provide for low or reduced fluid loss include providing for a limited flow path of couplant out of the inspection robot system—for example utilizing a cone having a smaller exit couplant cross-sectional area than a cross-sectional area of a couplant chamber within the cone. In certain embodiments, an apparatus for low or reduced fluid loss of couplant includes structures to provide for a selected down force on a sled 1 which the sensor is mounted on, on an arm 20 carrying a sled 1 which the sensor is mounted on, and/or on a payload 2 which the sled 1 is mounted on. Additionally or alternatively, an apparatus providing for low or reduced fluid loss of couplant includes a selected down force on a cone providing for couplant connectivity between the sensor and the inspection surface—for example a leaf spring or other biasing member within the sled 1 providing for a selected down force directly to the cone. In certain embodiments, low or reduced fluid loss includes providing for an overall fluid flow of between 0.12 to 0.16 gallons per minute to the inspection robot to support at least 10 ultra-sonic sensors. In certain embodiments, low or reduced fluid loss includes providing for an overall fluid flow of less than 50 feet per minute, less than 100 feet per minute, and less than 200 feet per minute fluid velocity in a tubing line feeding couplant to the inspection robot. In certain embodiments, low or reduced fluid loss includes providing sufficient couplant through a ¼" tubing line to feed couplant to at least 6, at least 8, at least 10, at least 12, or at least 16 ultra-sonic sensors to a vertical height of at least 25 feet, at least 50 feet, at least 100 feet, at least 150 feet, or at least 200 feet. An example apparatus includes a ¼" feed line to the inspection robot and/or to the payload 2, and a ⅛" feed line to individual sleds 1 and/or sensors (or acoustic cones associated with the sensors). In certain embodiments, larger and/or smaller diameter feed and individual fluid lines are provided.

Figure 30:
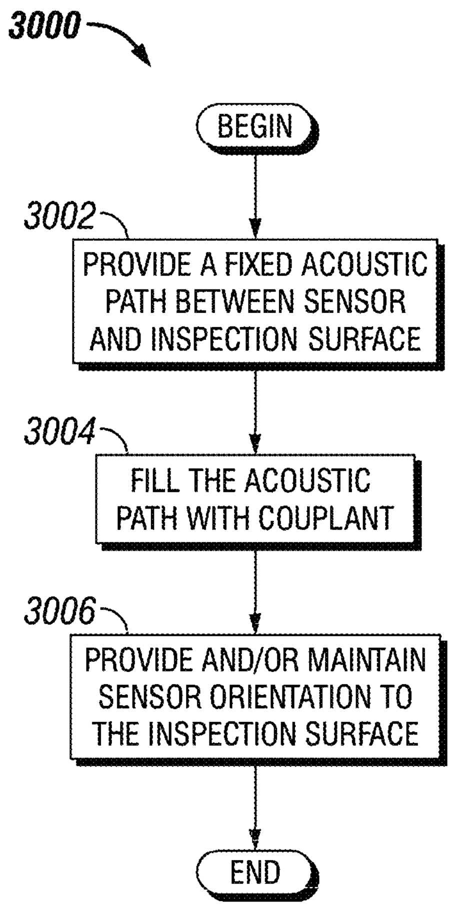
FIG. 30 is a schematic flow diagram of a procedure to provide sensors for inspection of an inspection surface.

Referencing FIG. 30, an example procedure 3000 to provide acoustic coupling between a sensor and an inspection surface is depicted schematically. The example procedure 3000 includes an operation 3002 to provide a fixed acoustic path between the sensor and the inspection surface. The example procedure 3000 further includes an operation 3004 to fill the acoustic path with a couplant. The example procedure 3000 further includes an operation 3006 to provide for a selected orientation between the sensor and the inspection surface. In certain embodiments, certain operations of the procedure 3000 are performed iteratively throughout inspection operations—for example operations 3006 may include maintaining the orientation throughout inspection operations—such as providing the sensor on a sled having a bottom surface and/or maneuverability to passively or actively self-align to the inspection surface, and/or to return to alignment after a disturbance such as traversal of an obstacle. In another example, operations 3004 include providing a couplant flow to keep the acoustic path between the sensor and the inspection surface filled with couplant, and/or adjusting the couplant flow during inspection operations. Certain operations of procedure 3000 may be performed by a controller 802 during inspection operations.

Figure 31:
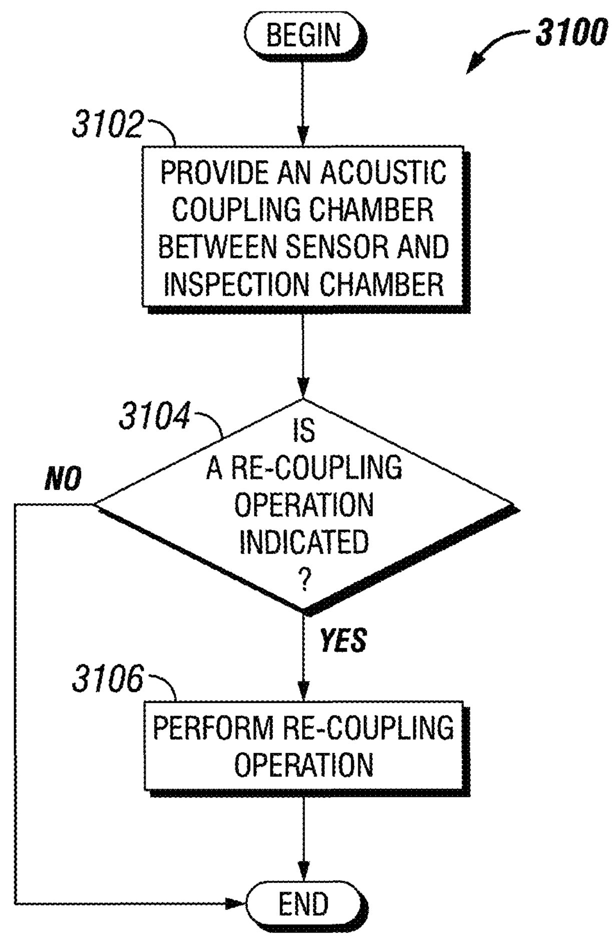
FIG. 31 is a schematic flow diagram of a procedure to re-couple a sensor to an inspection surface.

Referencing FIG. 31, an example procedure 3100 to ensure acoustic engagement between a sensor and an inspection surface is depicted schematically. The example procedure 3100 includes an operation 3102 to provide an acoustic coupling chamber between the sensor and the inspection surface. Example and non-limiting operations 3102 include providing the acoustic coupling chamber with an arrangement that tends to reduce bubble formation within the acoustic path between the sensor and the inspection surface. The example procedure 3100 further includes an operation 3104 to determine that the sensor should be re-coupled to the inspection surface. Example and non-limiting operations 3104 include determining that a time has elapsed since a last re-coupling operation, determining that an event has occurred and performing a re-coupling operation in response to the event, and/or actively determining that the acoustic path has been interrupted. Example and non-limiting events include a pausing of the inspection robot, a beginning of inspection operations and/or completion of a selected portion of inspection operations, and/or an interruption of couplant flow to the inspection robot. Example and non-limiting operation to actively determine that the acoustic path has been interrupted include an observation of a bubble (e.g., in an acoustic cone), an indication that couplant may have exited the acoustic path (e.g., the sled 1 has lifted either for an obstacle or for another operation, observation of an empty cone, etc.), and/or an indication that a sensor reading is off-nominal (e.g., signal seems to have been lost, anomalous reading has occurred, etc.). The example procedure 3100 further includes an operation 3106 to re-couple the sensor to the inspection surface. Example and non-limiting operations 3106 include resuming and/or increasing a couplant flow rate, and/or briefly raising a sled, sled arm, and/or payload from the inspection surface. The procedure 3100 and/or portions thereof may be repeated iteratively during inspection operations. Certain operations of procedure 3100 may be performed by a controller 802 during inspection operations.

Figure 32:
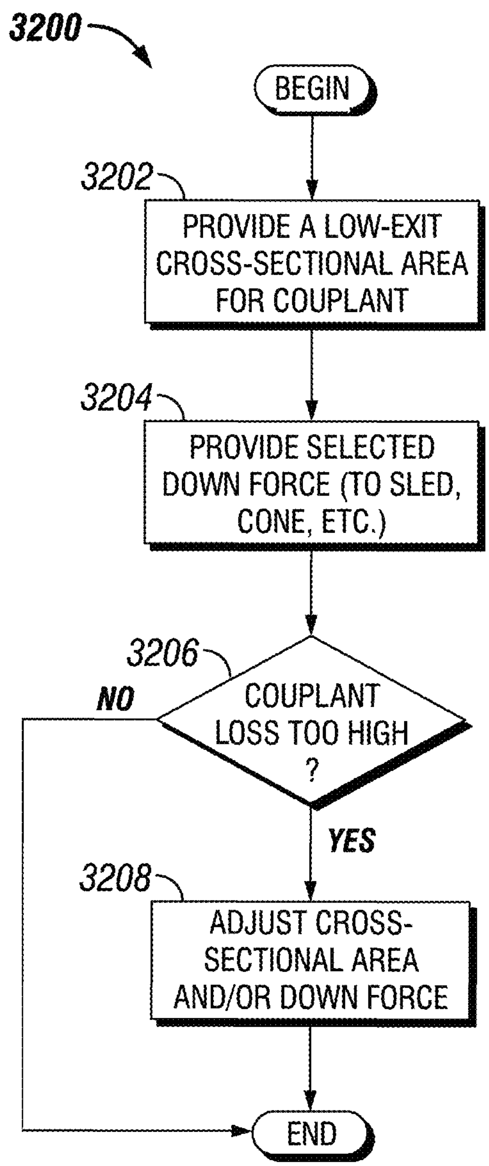
FIG. 32 is a schematic flow diagram of a procedure to provide for low couplant loss.

Referencing FIG. 32, an example procedure 3200 to provide low fluid loss (and/or fluid consumption) between an acoustic sensor and an inspection surface is depicted schematically. An example procedure 3200 includes an operation 3202 to provide for a low exit cross-sectional area for couplant from an acoustic path between the sensor and the inspection surface—including at least providing an exit from a couplant chamber formed by a cone as the exit cross-sectional area—and/or providing an exit cross-sectional area that is in a selected proximity to, and/or in contact with, the inspection surface. The example procedure 3200 further includes an operation 3204 to provide a selected down force to a sled having the sensor mounted thereon, and/or to a couplant chamber. In certain embodiments, the example procedure 3200 includes an operation 3206 to determine if fluid loss for the couplant is excessive (e.g., as measured by replacement couplant flow provided to an inspection robot, and/or by observed couplant loss), and an operation 3208 to increase a down force and/or reduce a couplant exit cross-sectional area from a couplant chamber. In certain embodiments, an inspection robot includes a configurable down force, such as: an active magnet strength control; a biasing member force adjustment (e.g., increasing confinement of a spring to increase down force); sliding of a weight in a manner to adjust down force on the sled and/or cone; combinations of these; or the like. In certain embodiments, an exit cross-sectional are for couplant is adjustable—for example an iris actuator (not shown), gate valve, or cross-sectional area adjustment is provided. In certain embodiments, cross-sectional area is related to the offset distance of the couplant chamber exit (e.g., cone tip) from the inspection surface, whereby a reduction of the selected offset distance of the couplant chamber exit to the inspection surface reduces the effective exit flow area of the couplant chamber. Example operations to adjust the selected offset distance include lowering the couplant chamber within the sled and/or increasing a down force on the sled and/or couplant chamber. Certain operations of procedure 3200 may be performed by a controller 802 during inspection operations.

Figure 2A:
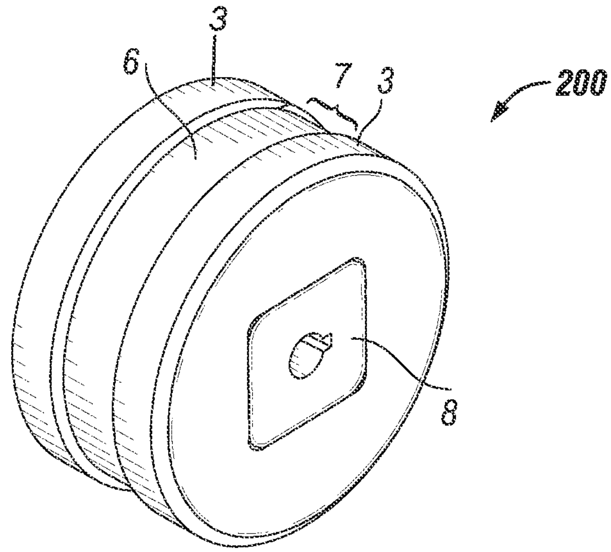
FIG. 2A is a schematic depiction of a wheel and splined hub design consistent with certain embodiments of the present disclosure.
Figure 2B:
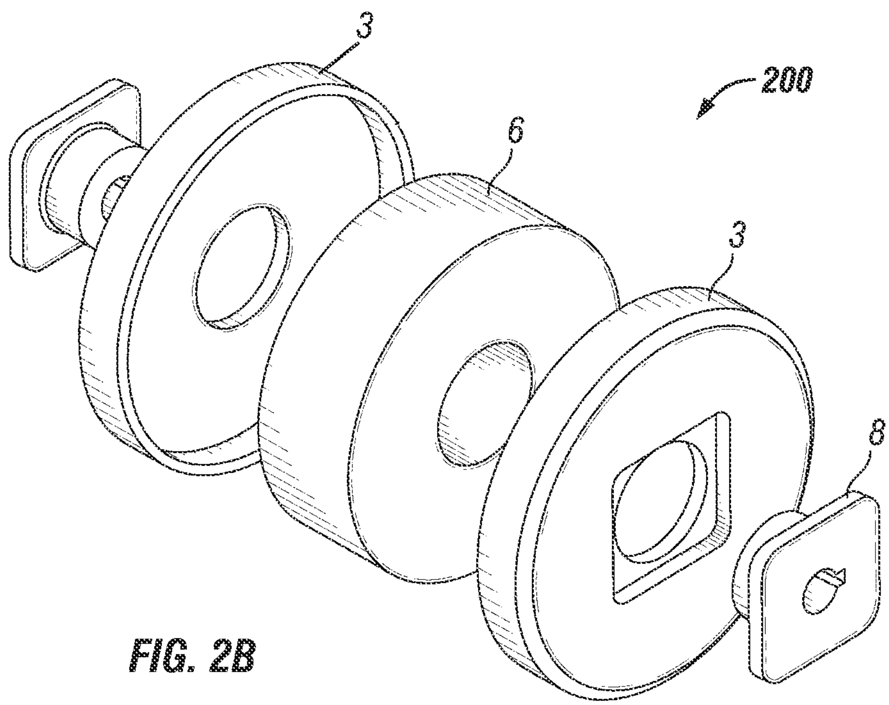
FIG. 2B is an exploded view of a wheel and splined hub design consistent with certain embodiments of the present disclosure.

Referencing FIGS. 2A and 2B, an example system includes a wheel 200 design that enables modularity, adhesion to the structure's surface, and obstacle traversing. A splined hub, wheel size, and the use of magnets allow the system to be effective on many different surfaces. In some embodiments, the wheel 200 includes a splined hub 8. The wheel 200 permits a robotic vehicle 100 to climb on walls, ceilings, and other ferromagnetic surfaces. As shown in the embodiment depicted in FIGS. 2A and 2B, this may be accomplished by embedding magnets 6 in a ferromagnetic enclosure 3 and/or an electrically conductive enclosure to protect the magnet 6, improve alignment, and allow for ease of assembly. For example, the magnet 6 may be a permanent magnet and/or a controllable electromagnet, and may further include a rare earth magnet. The ferromagnetic enclosure 3 protects the magnet 6 from directly impacting the inspected surface, reduces impacts and damage to the magnet 6, and reduces wear on the surface and the magnet 6. The ferromagnetic and/or electrical conductivity of the enclosure 3 reduces magnetic field lines in not-useful directions (e.g., into the housing 102, electrical lines or features that may be present near the inspected surface, etc.) and guides the magnetic field lines to the inspected surface. In certain embodiments, the enclosure 3 may not be ferromagnetic or conductive, and/or the enclosure 3 may be at least partially covered by a further material (e.g., molded plastic, a coating, paint, etc.), for example to protect the inspected surface from damage, to protect the enclosure 3 from wear, for aesthetic reasons, or for any other reason. In certain embodiments, the magnet 6 is not present, and the system 100 stays in contact with the surface in another manner (e.g., surface tension adhesion, gravity such as on a horizontal or slightly inclined inspection surface, movement along a track fixed to the surface, or the like). Any arrangements of an inspection surface, including vertical surfaces, overhang or upside-down surfaces, curved surfaces, and combinations of these, are contemplated herein.

Figure 3C:
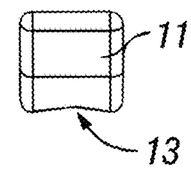

The wheel 200 includes a channel 7 formed between enclosures 3, for example at the center of the wheel 200. In certain embodiments, the channel 7 provides for self-alignment on surfaces such as tubes or pipes. In certain embodiments, the enclosures 300 include one or more chamfered edges or surfaces (e.g., the outer surface in the example of FIGS. 3B-3C), for example to improve contact with a rough or curved surface, and/or to provide for a selected surface contact area to avoid damage to the surface and/or the wheel 200. The flat face along the rim also allows for adhesion and predictable movement on flat surfaces.

The wheel 200 may be connected to the shaft using a splined hub 8. This design makes the wheel modular and also prevents it from binding due to corrosion. The splined hub 8 transfers the driving force from the shaft to the wheel. An example wheel 200 includes a magnetic aspect (e.g., magnet 6) capable to hold the robot on the wall, and accept a driving force to propel the robot, the magnet 6 positioned between conductive and/or ferromagnetic plates or enclosures, a channel 7 formed by the enclosures or plates, one or more chamfered and/or shaped edges, and/or a splined hub attachment to a shaft upon which the wheel is mounted.

The robotic vehicle may utilize a magnet-based wheel design that enables the vehicle to attach itself to and operate on ferromagnetic surfaces, including vertical and inverted surfaces (e.g., walls and ceilings). As shown in FIGS. 2A and 2B, the wheel design may comprise a cylindrical magnet 6 mounted between two wheel enclosures 3 with a splined hub 8 design for motor torque transfer, where the outer diameter of the two enclosures 3 is greater than the outer diameter of the magnet 6. Once assembled, this configuration creates a channel 7 between the two wheel enclosures 3 that prevents the magnet 6 from making physical contact with the surface as the wheel rolls on the outer diameter surface of the wheel enclosures 3. In certain embodiments, the material of the magnet 6 may include a rare earth material (e.g., neodymium, yttrium-cobalt, samarium-cobalt, etc.), which may be expensive to produce, handle, and/or may be highly subject to damage or corrosion. Additionally, any permanent magnet material may have a shorter service life if exposed to direct shocks or impacts.

Figure 11A:
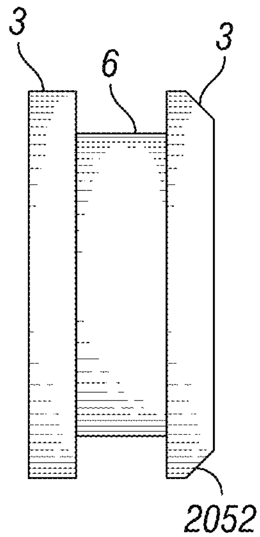
FIGS. 11A to 11E are schematic depictions of wheels for an inspection robot.
Figure 11B:
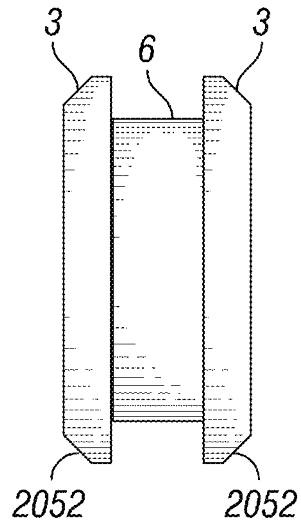
Figure 11C:
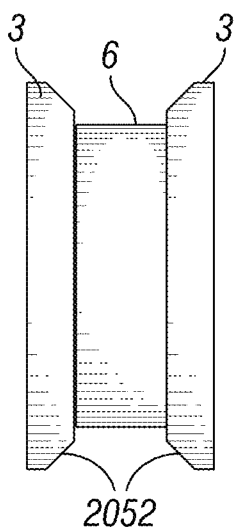
Figure 11D:
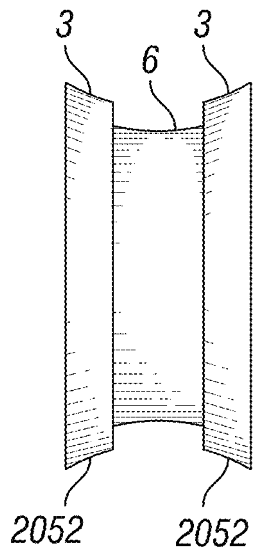
Figure 11E:
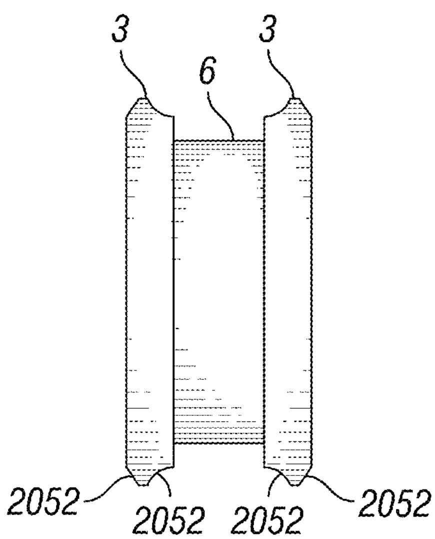

The channel 7 may also be utilized to assist in guiding the robotic vehicle along a feature of an inspection surface 500 (e.g., reference FIG. 5), such as where the channel 7 is aligned along the top of a rounded surface (e.g., pipe, or other raised feature) that the wheel uses to guide the direction of travel. The wheel enclosures 3 may also have guiding features 2052 (reference FIGS. 11A to 11E), such as grooves, concave or convex curvature, chamfers on the inner and/or outer edges, and the like. Referencing FIG. 11A, an example guiding feature 2052 includes a chamfer on an outer edge of one or both enclosures 3, for example providing self-alignment of the wheels along a surface feature, such as between raised features, on top of raised features, between two pipes 502 (which may be adjacent pipes or spaced pipes), and/or a curvature of a tube, pipe, or tank (e.g., when the inspection robot 100 traverses the interior of a pipe 502). For instance, having a chamfer on the outer edge of the outside enclosure may enable the wheel to more easily seat next to and track along a pipe 502 that is located outside the wheel. In another instance, having chamfers on both edges may enable the wheel to track with greater stability between two pipes 502. Referencing FIG. 11B, guiding features 2052 are depicted as chamfers on both sides of the wheel enclosures 3—for example allowing the inspection robot 100 to traverse between pipes 502; on top of a single pipe 502 or on top of a span of pipes 502; along the exterior of a pipe, tube, or tank; and/or along the interior of a pipe, tube, or tank. Referencing FIG. 11C, guiding features 2052 are depicted as chamfers on the interior channel 7 side of the enclosures 3, for example allowing the wheel to self-align on top of a single pipe or other feature. Referencing FIG. 11D, guiding features 2052 are depicted as a concave curved surface, for example sized to match a pipe or other feature to be traversed by the wheel. Referencing FIG. 11E, guiding features 2052 are depicted as a concave curved surface formed on an interior of the channel 7, with chamfers 2052 on the exterior of the enclosure 3—for example allowing the wheel to self-align on a single pipe or feature on the interior of the enclosure, and/or to align between pipes on the exterior of the enclosure.

One skilled in the art will appreciate that a great variety of different guiding features 2052 may be used to accommodate the different surface characteristics to which the robotic vehicle may be applied. In certain embodiments, combinations of features (e.g., reference FIG. 11E) provide for the inspection robot 100 to traverse multiple surfaces for a single inspection operation, reducing change-time for the wheels and the like. In certain embodiments, chamfer angles, radius of curvature, vertical depth of chamfers or curves, and horizontal widths of chamfers or curves are selectable to accommodate the sizing of the objects to be traversed during inspection operations. It can be seen that the down force provided by the magnet 6 combined with the shaping of the enclosure 3 guiding features 2052 combine to provide for self-alignment of the inspection robot 100 on the surface 500, and additionally provide for protection of the magnet 6 from exposure to shock, impacts, and/or materials that may be present on the inspection surface. In certain embodiments, the magnet 6 may be shaped—for example with curvature (reference FIG. 11D), to better conform to the inspection surface 500 and/or prevent impact or contact of the magnet 6 with the surface.

Figure 8:
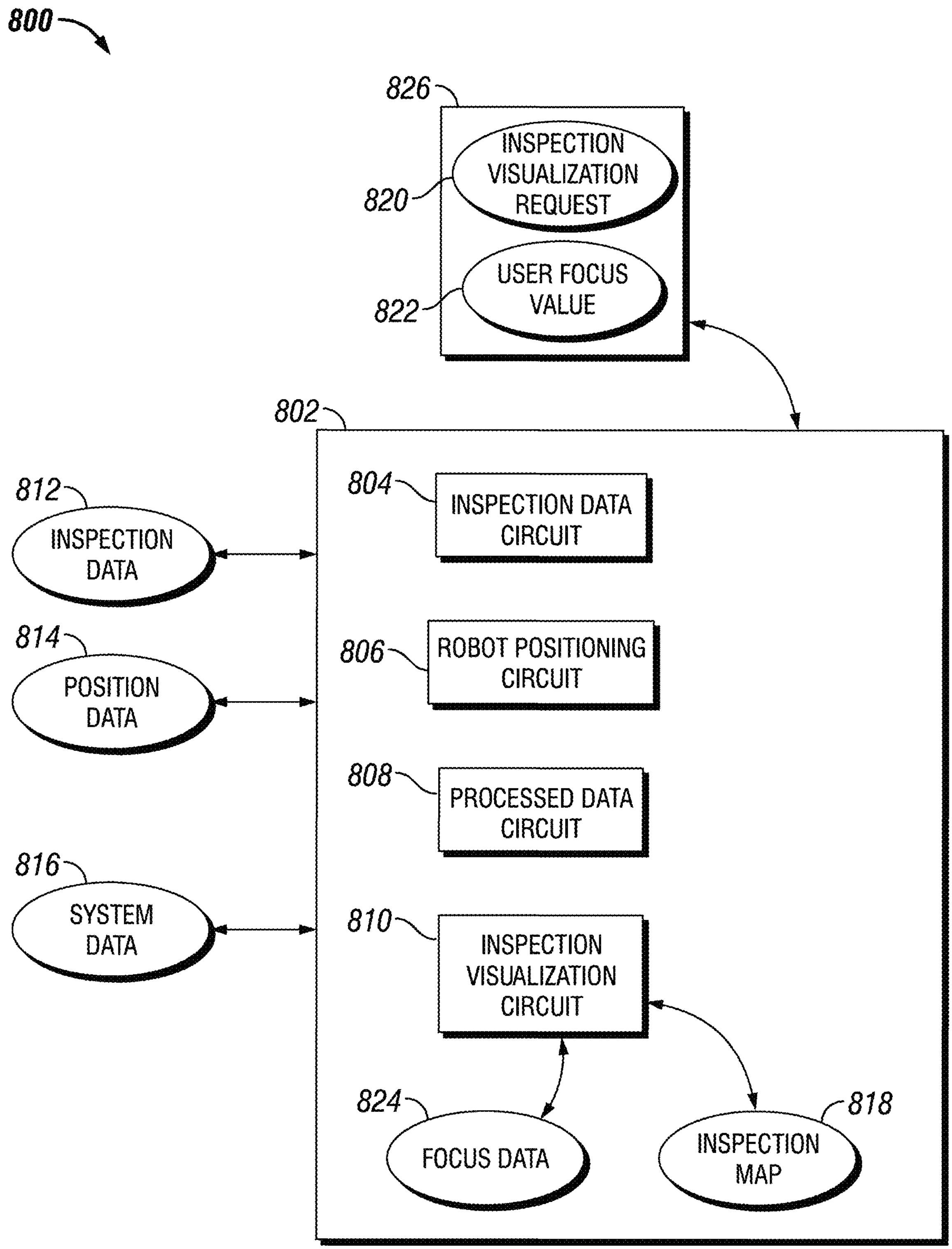
FIG. 8 is a schematic block diagram of an apparatus for providing an inspection map.

Additionally or alternatively, guiding features may be selectable for the inspection surface—for example multiple enclosures 3 (and/or multiple wheel assemblies including the magnet 6 and enclosure 3) may be present for an inspection operation, and a suitable one of the multiple enclosures 3 provided according to the curvature of surfaces present, the spacing of pipes, the presence of obstacles, or the like. In certain embodiments, an enclosure 3 may have an outer layer (e.g., a removable layer—not shown)—for example a snap on, slide over, coupled with set screws, or other coupling mechanism for the outer layer, such that just an outer portion of the enclosure is changeable to provide the guiding features. In certain embodiments, the outer layer may be a non-ferrous material (e g, making installation and changes of the outer layer more convenient in the presence to the magnet 6, which may complicate quick changes of a fully ferromagnetic enclosure 3), such as a plastic, elastomeric material, aluminum, or the like. In certain embodiments, the outer layer may be a 3-D printable material (e.g., plastics, ceramics, or any other 3-D printable material) where the outer layer can be constructed at an inspection location after the environment of the inspection surface 500 is determined. An example includes the controller 802 (e.g., reference FIG. 8 and the related description) structured to accept inspection parameters (e.g., pipe spacing, pipe sizes, tank dimensions, etc.), and to provide a command to a 3-D printer responsive to the command to provide an outer layer configured for the inspection surface 500. In certain embodiments, the controller 802 further accepts an input for the wheel definition (e.g., where selectable wheel sizes, clearance requirements for the inspection robot 100, or other parameters not necessarily defined by the inspection surface 500), and further provides the command to the 3-D printer, to provide an outer layer configured for the inspection surface 500 and the wheel definition.

An example splined hub 8 design of the wheel assembly may enable modular re-configuration of the wheel, enabling each component to be easily switched out to accommodate different operating environments (e.g., ferromagnetic surfaces with different permeability, different physical characteristics of the surface, and the like). For instance, enclosures with different guiding features may be exchanged to accommodate different surface features, such as where one wheel configuration works well for a first surface characteristic (e.g., a wall with tightly spaced small pipes) and a second wheel configuration works well for a second surface characteristic (e.g., a wall with large pipes). The magnet 6 may also be exchanged to adjust the magnetic strength available between the wheel assembly and the surface, such as to accommodate different dimensional characteristics of the surface (e.g., features that prevent close proximity between the magnet 6 and a surface ferromagnetic material), different permeability of the surface material, and the like. Further, one or both enclosures 3 may be made of ferromagnetic material, such as to direct the flux lines of the magnet toward a surface upon which the robotic vehicle is riding, to direct the flux lines of the magnet away from other components of the robotic vehicle, and the like, enabling the modular wheel configuration to be further configurable for different ferromagnetic environments and applications.

The present disclosure provides for robotic vehicles that include a sensor sled components, permitting evaluation of particular attributes of the structure. As shown in the embodiments depicted in FIGS. 3A to 3C, the sled 1 may hold the sensor that can perform inspection of the structure. The sensor may be perpendicular to the surface being inspected and, in some embodiments, may have a set distance from the surface to protect it from being damaged. In other embodiments, the distance from the surface to the sensor may be adjusted to accommodate the technical requirements of the sensor being utilized. A couplant retaining column may be added at the sensor outlet to retain couplant depending on the type of sensor being used. In certain embodiments, an opening 12 may be provided at a bottom of the sled 1 to allow an installed sensor to operatively communicate with an inspection surface.

The sleds of the present disclosure may slide on a flat or curved surface and may perform various types of material testing using the sensors incorporated into the sled. The bottom surface 13 of the sled may be fabricated from numerous types of materials which may be chosen by the user to fit the shape of the surface. Note that depending on the surface condition, a removeable, replaceable, and/or sacrificial layer of thin material may be positioned on the bottom surface of the sled to reduce friction, create a better seal, and protect the bottom of the sled from physical damage incurred by the surface. In certain embodiments, the sled may include ramp surfaces 11 at the front and back of the sled. The ramp and available pivot point accommodation 9 (described below—for example an option for pivot point 17) give the sled the ability to travel over obstacles. This feature allows the sled to work in industrial environments with surfaces that are not clean and smooth. In certain embodiments, one or more apertures 10 may be provided, for example to allow a sacrificial layer to be fixed to the bottom of the sled 1.

In summary, an example robotic vehicle 100 includes sensor sleds having the following properties capable of providing a number of sensors for inspecting a selected object or surface, including a soft or hard bottom surface, including a bottom surface that matches an inspection surface (e.g., shape, contact material hardness, etc.), having a curved surface and/or ramp for obstacle clearance (including a front ramp and/or a back ramp), includes a column and/or couplant insert (e.g., a cone positioned within the sled, where the sensor couples to the cone) that retains couplant, improves acoustic coupling between the sensor and the surface, and/or assists in providing a consistent distance between the surface and the sensor; a plurality of pivot points between the main body 102 and the sled 1 to provide for surface orientation, improved obstacle traversal, and the like, a sled 1 having a mounting position configured to receive multiple types of sensors, and/or magnets in the sled to provide for control of downforce and/or stabilized positioning between the sensor and the surface. In certain implementations of the present invention, it is advantageous to not only be able to adjust spacing between sensors but also to adjust their angular position relative to the surface being inspected. The present invention may achieve this goal by implementing systems having several translational and rotational degrees of freedom.

Referencing FIG. 4, an example payload 2 includes selectable spacing between sleds 1, for example to provide selectable sensor spacing. In certain embodiments, spacing between the sensors may be adjusted using a lockable translational degree of freedom such as a set screw allowing for the rapid adjustment of spacing. Additionally or alternatively, any coupling mechanism between the arm 20 and the payload 2 is contemplated herein. In certain embodiments, a worm gear or other actuator allows for the adjustment of sensor spacing by a controller and/or in real time during operations of the system 100. In certain embodiments, the payload 2 includes a shaft 19 whereupon sleds 1 are mounted (e.g., via the arms 20). In these embodiments, the sensor mounts 14 are mounted on a shaft 19. The example of FIG. 4 includes a shaft cap 15 providing structural support to a number of shafts of the payload 2. In the example of FIG. 4, two shafts are utilized to mount the payload 2 onto the housing 102, and one shaft 19 is utilized to mount the arms 20 onto the payload 2. The arrangement utilizing a payload 2 is a non-limiting example, that allows multiple sensors and sleds 1 to be configured in a particular arrangement, and rapidly changed out as a group (e.g., swapping out a first payload and set of sensors for a second payload and set of sensors, thereby changing an entire sensor arrangement in a single operation). However, in certain embodiments one or more of the payload 2, arms 20, and/or sleds 1 may be fixedly coupled to the respective mounting features, and numerous benefits of the present disclosure are nevertheless achieved in such embodiments.

During operation, an example system 100 encounters obstacles on the surface of the structure being evaluated, and the pivots 16, 17, 18 provide for movement of the arm 20 to traverse the obstacle. In certain embodiments, the system 100 is a modular design allowing various degrees of freedom of movement of sleds 1, either in real-time (e.g., during an inspection operation) and/or at configuration time (e.g., an operator or controller adjusts sensor or sled positions, down force, ramp shapes of sleds, pivot angles of pivots 16, 17, 18 in the system 100, etc.) before an inspection operation or a portion of an inspection operation, and including at least the following degrees of freedom: translation (e.g., payload 2 position relative to the housing 102); translation of the sled arm 20 relative to the payload 2, rotation of the sled arm 20, rotation of the sled arm 20 mount on the payload 2, and/or rotation of the sled 1 relative to the sled arm 20.

In certain embodiments, a system 100 allows for any one or more of the following adjustments: spacing between sensors (perpendicular to the direction of inspection motion, and/or axially along the direction of the inspection motion); adjustments of an angle of the sensor to an outer diameter of a tube or pipe; momentary or longer term displacement to traverse obstacles; provision of an arbitrary number and positioning of sensors; etc.

An example inspection robot 100 may utilize downforce capabilities for sensor sleds 1, such as to control proximity and lateral stabilization of sensors. For instance, an embedded magnet (not shown) positioned within the sled 1 may provide passive downforce that increases stabilization for sensor alignment. In another example, the embedded magnet may be an electromagnet providing active capability (e.g., responsive to commands from a controller 802—reference FIG. 8) that provide adjustable or dynamic control of the downforce provided to the sensor sled. In another example, magnetic downforce may be provided through a combination of a passive permanent magnet and an active electromagnet, providing a default minimum magnetic downforce, but with further increases available through the active electromagnet. In embodiments, the electromagnet may be controlled by a circuit where the downforce is set by the operator, controlled by an on-board processor, controlled by a remote processor (e.g., through wireless communications), and the like, where processor control may utilize sensor data measurements to determine the downforce setting. In embodiments, downforce may be provided through suction force, spring force, and the like. In certain embodiments, downforce may be provided by a biasing member, such as a torsion spring or leaf spring, with active or passive control of the downforce—for example positioning a tension or confinement of the spring to control the downforce. In certain embodiments, the magnet, biasing member, or other downforce adjusting member may adjust the downforce on the entire sled 1, on an entire payload 2, and/or just on the sensor (e.g., the sensor has some flexibility to move within the sled 1, and the downforce adjustment acts on the sensor directly).

Figure 5:
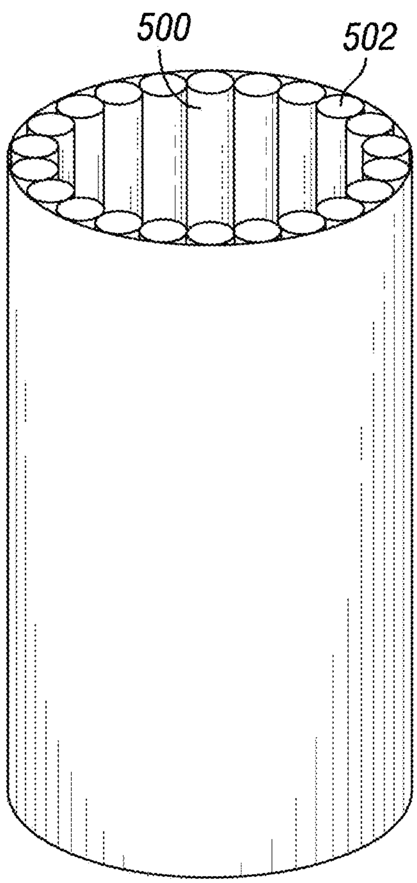
FIG. 5 is a schematic depiction of an inspection surface.

An example system 100 includes an apparatus 800 (reference FIG. 8 and the disclosure referencing FIG. 8) for providing enhanced inspection information, including position-based information. The apparatus 800 and operations to provide the position-based information are described in the context of a particular physical arrangement of an industrial system for convenient illustration, however any physical arrangement of an industrial system is contemplated herein. Referencing FIG. 5, an example system includes a number of pipes 502—for example vertically arranged pipes such as steam pipes in a power plant, pipes in a cooling tower, exhaust or effluent gas pipes, or the like. The pipes 502 in FIG. 5 are arranged to create a tower having a circular cross-section for ease of description. In certain embodiments, periodic inspection of the pipes is utilized to ensure that pipe degradation is within limits, to ensure proper operation of the system, to determine maintenance and repair schedules, and/or to comply with policies or regulations. In the example of FIG. 5, an inspection surface 500 includes the inner portion of the tower, whereby an inspection robot 100 traverses the pipes 502 (e.g., vertically, inspecting one or more pipes on each vertical run). An example inspection robot 100 includes configurable payloads 2, and may include ultra-sonic sensors (e.g., to determine wall thickness and/or pipe integrity), magnetic sensors (e.g., to determine the presence and/or thickness of a coating on a pipe), cameras (e.g., to provide for visual inspection, including in EM ranges outside of the visual range, temperatures, etc.), composition sensors (e.g., gas chromatography in the area near the pipe, spectral sensing to detect leaks or anomalous operation, etc.), temperature sensing, pressure sensing (ambient and/or specific pressures), vibration sensing, density sensing, etc. The type of sensing performed by the inspection robot 100 is not limiting to the present disclosure except where specific features are described in relation to specific sensing challenges and opportunities for those sensed parameters as will be understood to one of skill in the art having the benefit of the disclosures herein.

Figure 6:
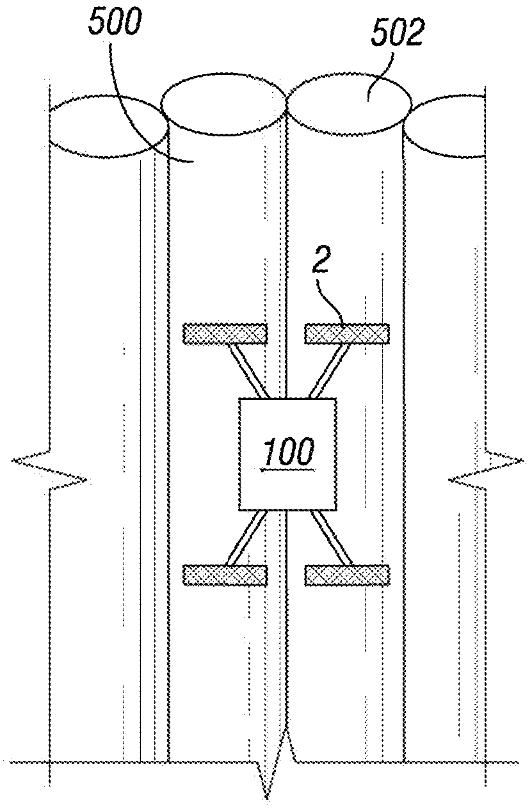
FIG. 6 is a schematic depiction of an inspection robot positioned on an inspection surface.

In certain embodiments, the inspection robot 100 has alternatively or additionally, payload(s) 2 configured to provide for marking of aspects of the inspection surface 500 (e.g., a paint sprayer, an invisible or UV ink sprayer, and/or a virtual marking device configured to mark the inspection surface 500 in a memory location of a computing device but not physically), to repair a portion of the inspection surface 500 (e.g., apply a coating, provide a welding operation, apply a temperature treatment, install a patch, etc.), and/or to provide for a cleaning operation. Referencing FIG. 6, an example inspection robot 100 is depicted in position on the inspection surface 500 at a location. In the example, the inspection robot 100 traverses vertically and is positioned between two pipes 502, with payloads 2 configured to clean, sense, treat, and/or mark two adjacent pipes 502 in a single inspection run. The inspection robot 100 in the example includes two payloads 2 at the “front” (ahead of the robot housing in the movement direction) and two payloads 2 at the “rear” (behind the robot housing in the movement direction). The inspection robot 100 may include any arrangement of payloads 2, including just one or more payloads in front or behind, just one or more payloads off to either or both sides, and combinations of these. Additionally or alternatively, the inspection robot 100 may be positioned on a single pipe, and/or may traverse between positions during an inspection operation, for example to inspect selected areas of the inspection surface 500 and/or to traverse obstacles which may be present.

In certain embodiments, a “front” payload 2 includes sensors configured to determine properties of the inspection surface, and a “rear” payload 2 includes a responsive payload, such as an enhanced sensor, a cleaning device such as a sprayer, scrubber, and/or scraper, a marking device, and/or a repair device. The front-back arrangement of payloads 2 provides for adjustments, cleaning, repair, and/or marking of the inspection surface 500 in a single run—for example where an anomaly, gouge, weld line, area for repair, previously repaired area, past inspection area, etc., is sensed by the front payload 2, the anomaly can be marked, cleaned, repaired, etc. without requiring an additional run of the inspection robot 100 or a later visit by repair personnel. In another example, a first calibration of sensors for the front payload may be determined to be incorrect (e.g., a front ultra-sonic sensor calibrated for a particular coating thickness present on the pipes 502) and a rear sensor can include an adjusted calibration to account for the detected aspect (e.g., the rear sensor calibrated for the observed thickness of the coating). In another example, certain enhanced sensing operations may be expensive, time consuming, consume more resources (e.g., a gamma ray source, an alternate coupling such as a non-water or oil-based acoustic coupler, require a high energy usage, require greater processing resources, and/or incur usage charges to an inspection client for any reason) and the inspection robot 100 can thereby only utilize the enhanced sensing operations selectively and in response to observed conditions.

Figure 7:
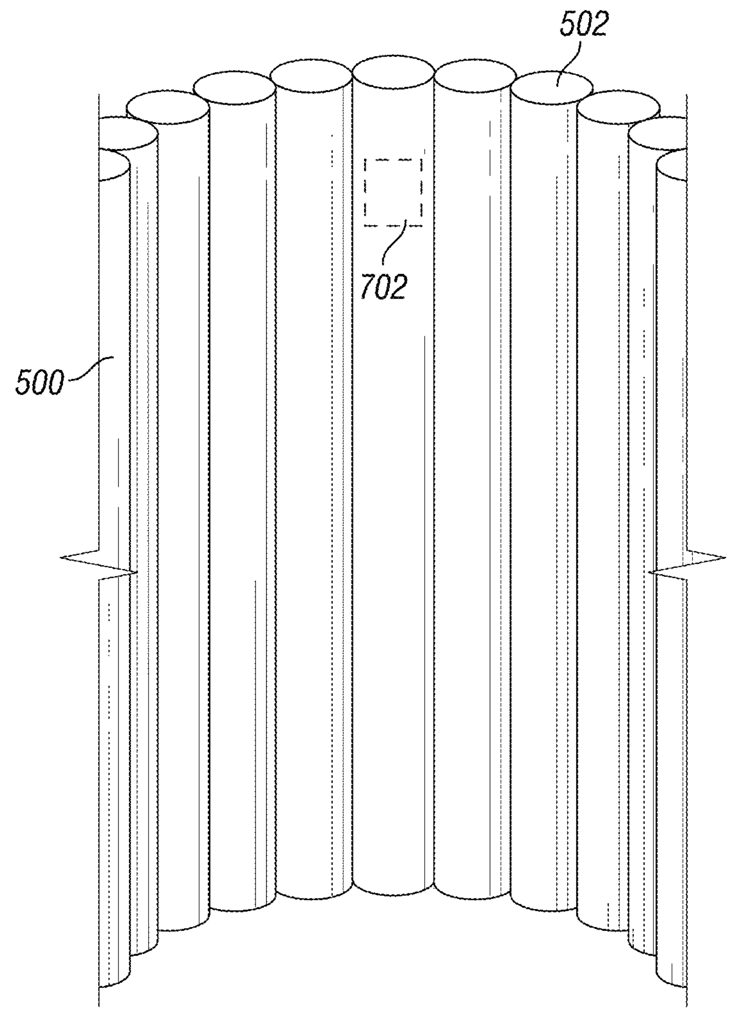
FIG. 7 is a schematic depiction of a location on an inspection surface.

Referencing FIG. 7, a location 702 on the inspection surface 500 is identified for illustration. In certain embodiments, the inspection robot 100 and/or apparatus 800 includes a controller 802 having a number of circuits structured to functionally execute operations of the controller 802. The controller 802 may be a single device (e.g., a computing device present on the robot 100, a computing device in communication with the robot 100 during operations and/or post-processing information communicated after inspection operations, etc.) and/or a combination of devices, such as a portion of the controller 802 positioned on the robot 100, a portion of the controller 802 positioned on a computing device in communication with the robot 100, a portion of the controller 802 positioned on a handheld device (not shown) of an inspection operator, and/or a portion of the controller 802 positioned on a computing device networked with one or more of the preceding devices. Additionally or alternatively, aspects of the controller 802 may be included on one or more logic circuits, embedded controllers, hardware configured to perform certain aspects of the controller 802 operations, one or more sensors, actuators, network communication infrastructure (including wired connections, wireless connections, routers, switches, hubs, transmitters, and/or receivers), and/or a tether between the robot 100 and another computing device. The described aspects of the example controller 802 are non-limiting examples, and any configuration of the robot 100 and devices in communication with the robot 100 to perform all or selected ones of operations of the controller 802 are contemplated herein as aspects of an example controller 802.

An example controller 802 includes an inspection data circuit 804 that interprets inspection data 812—for example sensed information from sensors mounted on the payload and determining aspects of the inspection surface 500, the status, deployment, and/or control of marking devices, cleaning devices, and/or repair devices, and/or post-processed information from any of these such as a wall thickness determined from ultra-sonic data, temperature information determined from imaging data, and the like. The example controller 802 further includes a robot positioning circuit 806 that interprets position data 814. An example robot positioning circuit 806 determines position data by any available method, including at least triangulating (or other positioning methods) from a number of available wireless devices (e.g., routers available in the area of the inspection surface 500, intentionally positioned transmitters/transceivers, etc.), a distance of travel measurement (e.g., a wheel rotation counter which may be mechanical, electro-magnetic, visual, etc.; a barometric pressure measurement; direct visual determinations such as radar, Lidar, or the like), a reference measurement (e.g., determined from distance to one or more reference points); a time-based measurement (e.g., based upon time and travel speed); and/or a dead reckoning measurement such as integration of detection movements. In the example of FIG. 5, a position measurement may include a height determination combined with an azimuthal angle measurement and/or a pipe number value such that the inspection surface 500 location is defined thereby. Any coordinate system and/or position description system is contemplated herein. In certain embodiments, the controller 802 includes a processed data circuit 808 that combines the inspection data 812 with the position data 814 to determine position-based inspection data. The operations of the processed data circuit 808 may be performed at any time—for example during operations of the inspection robot 100 such that inspection data 812 is stored with position data 814, during a post-processing operation which may be completed separately from the inspection robot 100, and/or which may be performed after the inspection is completed, and/or which may be commenced while the inspection is being performed. In certain embodiments, the linking of the position data 814 with the inspection data 812 may be performed if the linked position-inspection data is requested—for example upon a request by a client for an inspection map 818. In certain embodiments, portions of the inspection data 812 are linked to the position data 814 at a first time, and other portions of the inspection data 812 are linked to the position data 814 at a later time and/or in response to post-processing operations, an inspection map 818 request, or other subsequent event.

The example controller 802 further includes an inspection visualization circuit 810 that determines the inspection map 818 in response to the inspection data 812 and the position data 814, for example using post-processed information from the processed data circuit 808. In a further example, the inspection visualization circuit 810 determines the inspection map 818 in response to an inspection visualization request 820, for example from a client computing device 826. In the example, the client computing device 826 may be communicatively coupled to the controller 802 over the internet, a network, through the operations of a web application, and the like. In certain embodiments, the client computing device 826 securely logs in to control access to the inspection map 818, and the inspection visualization circuit 810 may prevent access to the inspection map 818, and/or provide only portions of the inspection map 818, depending upon the successful login from the client computing device 826, the authorizations for a given user of the client computing device 826, and the like.

In certain embodiments, the inspection visualization circuit 810 and/or inspection data circuit 804 further accesses system data 816, such as a time of the inspection, a calendar date of the inspection, the robot 100 utilized during the inspection and/or the configurations of the robot 100, a software version utilized during the inspection, calibration and/or sensor processing options selected during the inspection, and/or any other data that may be of interest in characterizing the inspection, that may be requested by a client, that may be required by a policy and/or regulation, and/or that may be utilized for improvement to subsequent inspections on the same inspection surface 500 or another inspection surface. In certain embodiments, the processed data circuit 808 combines the system data 816 with the processed data for the inspection data 812 and/or the position data 814, and/or the inspection visualization circuit incorporates the system data 816 or portions thereof into the inspection map 818. In certain embodiments, any or all aspects of the inspection data 812, position data 814, and/or system data 816 may be stored as meta-data (e.g., not typically available for display), may be accessible in response to prompts, further selections, and/or requests from the client computing device 826, and/or may be utilized in certain operations with certain identifiable aspects removed (e.g., to remove personally identifiable information or confidential aspects) such as post-processing to improve future inspection operations, reporting for marketing or other purposes, or the like.

In certain embodiments, the inspection visualization circuit 810 is further responsive to a user focus value 822 to update the inspection map 818 and/or to provide further information (e.g., focus data 824) to a user, such as a user of the client computing device 826. For example, a user focus value 822 (e.g., a user mouse position, menu selection, touch screen indication, keystroke, or other user input value indicating that a portion of the inspection map 818 has received the user focus) indicates that a location 702 of the inspection map 818 has the user focus, and the inspection visualization circuit 810 generates the focus data 824 in response to the user focus value 822, including potentially the location 702 indicated by the user focus value 822.

Figure 9:
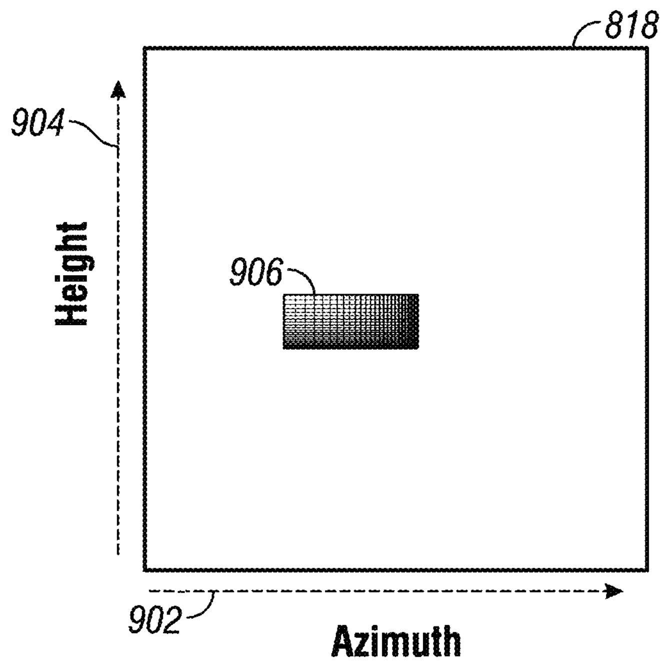
FIG. 9 depicts an illustrative inspection map.

Referencing FIG. 9, an example inspection map 818 is depicted. In the example, the inspection surface 500 may be similar to that depicted in FIG. 5—for example the interior surface of tower formed by a number of pipes to be inspected. The example inspection map 818 includes an azimuthal indication 902 and a height indication 904, with data from the inspection depicted on the inspection map 818 (e.g., shading at 906 indicating inspection data corresponding to that visual location). Example and non-limiting inspection maps 818 include numeric values depicted on the visualization, colors, shading or hatching, and/or any other visual depiction method. In certain embodiments, more than one inspection dimension may be visualized (e.g., temperatures and wall thickness), and/or the inspection dimension may be selected or changed by the user. Additionally or alternatively, physical elements such as obstacles, build up on the inspection surface, weld lines, gouges, repaired sections, photos of the location (e.g., the inspection map 818 laid out over a panoramic photograph of the inspection surface 500 with data corresponding to the physical location depicted), may be depicted with or as a part of the inspection map 818. Additionally or alternatively, visual markers may be positioned on the inspection map 818—for example a red "X" (or any other symbol, including a color, bolded area, highlight, image data, a thumbnail, etc.) at a location of interest on the map—which marking may be physically present on the actual inspection surface 500 or only virtually depicted on the inspection map 818. It can be seen that the inspection map 818 provides for a convenient and powerful reference tool for a user to determine the results of the inspection operation and plan for future maintenance, repair, or inspections, as well as planning logistics in response to the number of aspects of the system requiring further work or analysis and the location of the aspects requiring further work or analysis. Accordingly, inspection results can be analyzed more quickly, regulatory or policy approvals and system up-time can be restored more quickly (if the system was shut-down for the inspection), configurations of an inspection robot 100 for a future inspection can be performed more quickly (e.g. preparing payload 2 configurations, obstacle management, and/or sensor selection or calibration), any of the foregoing can be performed with greater confidence that the results are reliable, and/or any combinations of the foregoing. Additionally or alternatively, less invasive operations can be performed, such as virtual marking which would not leave marks on the inspection surface 500 that might be removed (e.g., accidentally) before they are acted upon, which may remain after being acted upon, or which may create uncertainty as to when the marks were made over the course of multiple inspections and marking generations.

Figure 10:
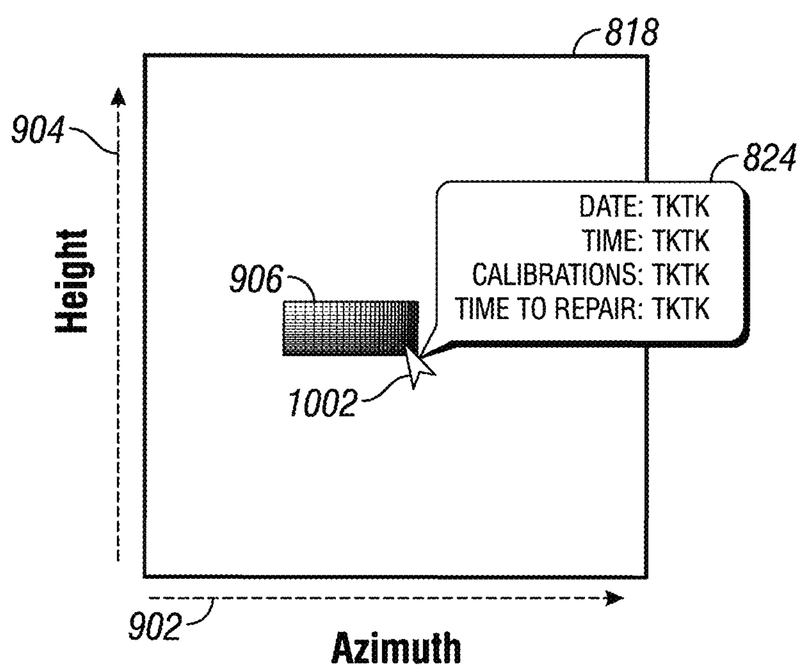
FIG. 10 depicts an illustrative inspection map and focus data.

Referencing FIG. 10, an illustrative example inspection map 818 having focus data 824 is depicted. The example inspection map 818 is responsive to a user focus value 822, such as a mouse cursor 1002 hovering over a portion of the inspection map 818. In the example, the focus data 824 comes up as a tool-tip, although any depiction operations such as output to a file, populating a static window for focus data 824, or any other operations known in the art are contemplated herein. The example focus data 824 includes a date (e.g., of the inspection), a time (e.g., of the inspection), the sensor calibrations utilized for the inspection, and the time to repair (e.g., down-time that would be required, actual repair time that would be required, the estimated time until the portion of the inspection surface 500 will require a repair, or any other description of a "time to repair"). The depicted focus data 824 is a non-limiting example, and any other information of interest may be utilized as focus data 824. In certain embodiments, a user may select the information, or portions thereof, utilized on the inspection map 818—including at least the axes 902, 904 (e.g., units, type of information, relative versus absolute data, etc.) and the depicted data (e.g., units, values depicted, relative versus absolute values, thresholds or cutoffs of interest, processed values such as virtually determined parameters, and/or categorical values such as "PASSED" or "FAILED"). Additionally or alternatively, a user may select the information, or portions thereof, utilized as the focus data 824.

In certain embodiments, an inspection map 818 (or display) provides an indication of how long a section of the inspection surface 500 is expected to continue under nominal operations, how much material should be added to a section of the inspection surface 500 (e.g., a repair coating or other material), and/or the type of repair that is needed (e.g., wall thickness correction, replacement of a coating, fixing a hole, breach, rupture, etc.).

Figure 41:
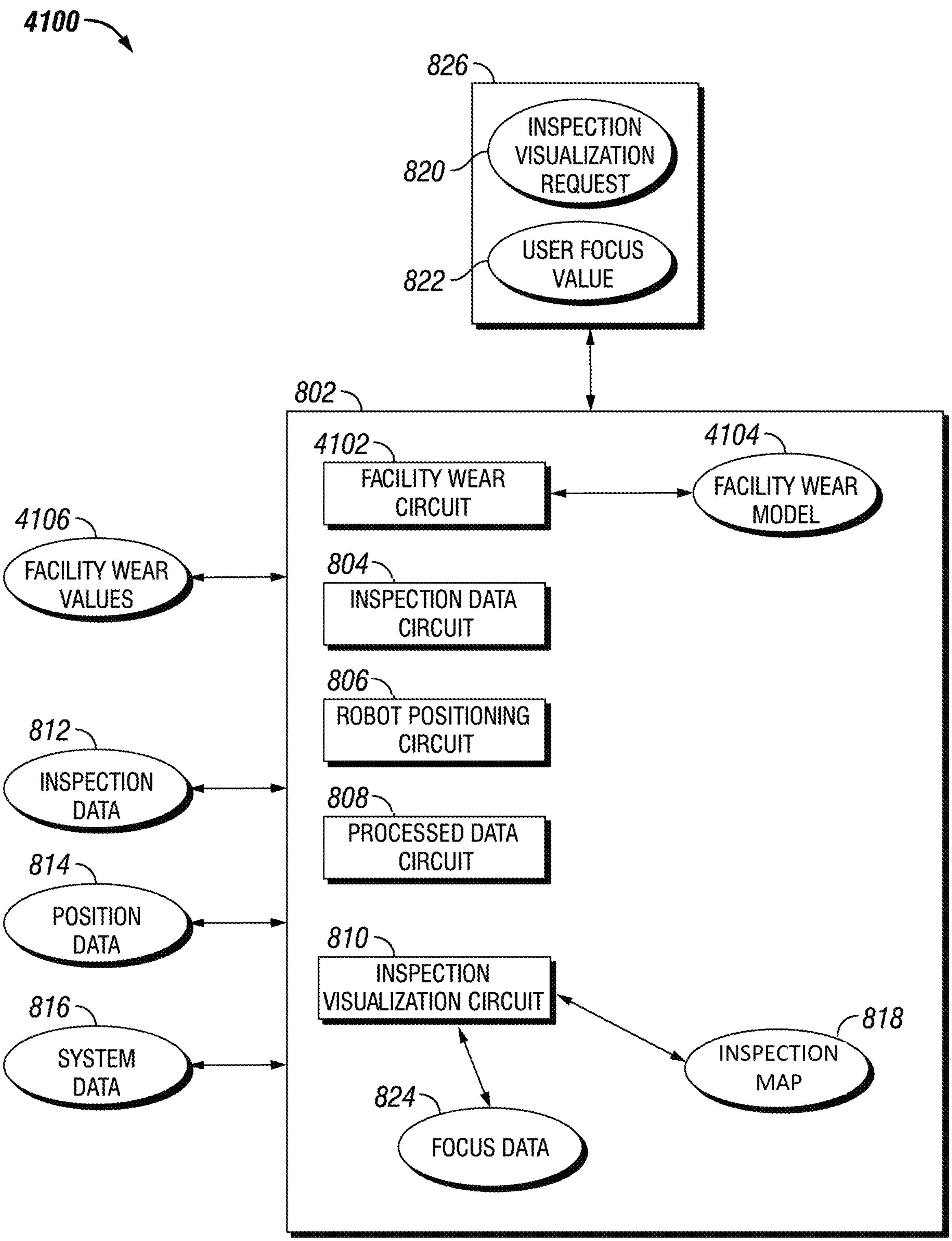
FIG. 41 is a schematic block diagram of an apparatus for providing a facility wear value.

Referencing FIG. 41, an apparatus 4100 for determining a facility wear value 4106 is depicted. The example apparatus 4100 includes a facility wear circuit 4102 that determines a facility wear model 4104 corresponding to the inspection surface 500 and/or an industrial facility, industrial system, and/or plant including the inspection surface 500. An example facility wear circuit 4102 accesses a facility wear model 4104, and utilizes the inspection data 812 to determine which portions of the inspection surface 500 will require repair, when they will require repair, what type of repair will be required, and a facility wear value 4106 including a description of how long the inspection surface 500 will last without repair, and/or with selected repairs. In certain embodiments, the facility wear model 4104 includes historical data for the particular facility, system, or plant having the inspection surface 500—for example through empirical observation of previous inspection data 812, when repairs were performed, what types of repairs were performed, and/or how long repaired sections lasted after repairs.

Additionally or alternatively, the facility wear model 4104 includes data from offset facilities, systems, or plants (e.g., a similar system that operates a similar duty cycle of relevant temperatures, materials, process flow streams, vibration environment, etc. for the inspection surface 500; and which may include inspection data, repair data, and/or operational data from the offset system), canonical data (e.g., pre-entered data based on estimates, modeling, industry standards, or other indirect sources), data from other facilities from the same data client (e.g., an operator, original equipment manufacturer, owner, etc. for the inspection surface), and/or user-entered data (e.g., from an inspection operator and/or client of the data) such as assumptions to be utilized, rates of return for financial parameters, policies or regulatory values, and/or characterizations of experience in similar systems that may be understood based on the experience of the user. Accordingly, operations of the facility wear circuit 4102 can provide an overview of repair operations recommended for the inspection surface 500, including specific time frame estimates of when such repairs will be required, as well as a number of options for repair operations and how long they will last.

In certain embodiments, the facility wear value 4106, and/or facility wear value 4106 displayed on an inspection map 818, allows for strategic planning of repair operations, and/or coordinating the life cycle of the facility including the inspection surface 500—for example performing a short-term repair at a given time, which might not be intuitively the "best" repair operation, but in view of a larger repair cycle that is upcoming for the facility. Additionally or alternatively, we facility wear value 4106 allows for a granular review of the inspection surface 500—for example to understand operational conditions that drive high wear, degradation, and/or failure conditions of aspects of the inspection surface 500. In certain embodiments, repair data and/or the facility wear value 4106 are provided in a context distinct from an inspection map 818—for example as part of an inspection report (not shown), as part of a financial output related to the system having the inspection surface (e.g., considering the costs and shutdown times implicated by repairs, and/or risks associated with foregoing a repair).

Figure 42:
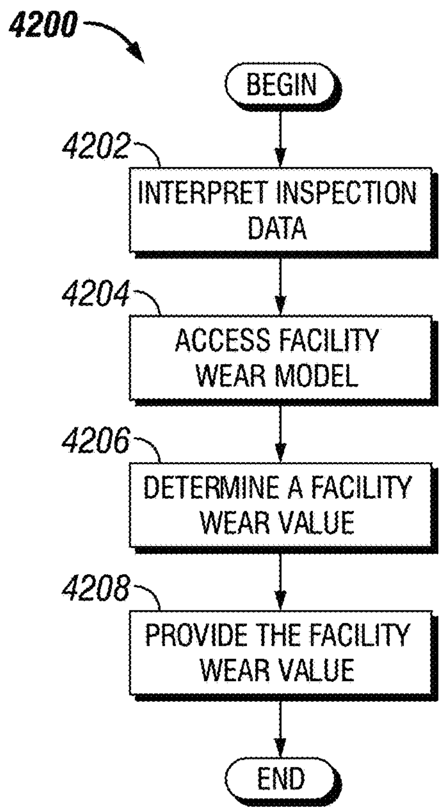
FIG. 42 is a schematic flow diagram of a procedure to provide a facility wear value.

Referencing FIG. 42, a procedure 4200 for determining a facility wear value is depicted schematically. An example procedure 4200 includes an operation 4202 to interpret inspection data for an inspection surface, and an operation 4204 to access a facility wear model. The example procedure 4200 further includes an operation 4206 to determine a facility wear value in response to the inspection data and the facility wear model. The example procedure 4200 further includes an operation 4208 to provide the facility wear value—for example as a portion of an inspection map, an inspection report, and/or a financial report for a facility having the inspection surface.

In embodiments, the robotic vehicle may incorporate a number of sensors distributed across a number of sensor sleds 1, such as with a single sensor mounted on a single sensor sled 1, a number of sensors mounted on a single sensor sled 1, a number of sensor sleds 1 arranged in a linear configuration perpendicular to the direction of motion (e.g., side-to-side across the robotic vehicle), arranged in a linear configuration along the direction of motion (e.g., multiple sensors on a sensor sled 1 or multiple sensor sleds 1 arranged to cover the same surface location one after the other as the robotic vehicle travels). Additionally or alternatively, a number of sensors may be arranged in a two-dimensional surface area, such as by providing sensor coverage in a distributed manner horizontally and/or vertically (e.g., in the direction of travel), including offset sensor positions (e.g., reference FIG. 14). In certain embodiments, the utilization of payloads 2 with sensor sleds mounted thereon enables rapid configuration of sensor placement as desired, sleds 1 on a given payload 2 can be further adjusted, and/or sensor(s) on a given sled can be changed or configured as desired.

In certain embodiments, two payloads 2 side-by-side allow for a wide horizontal coverage of sensing for a given travel of the inspection robot 100—for example as depicted in FIG. 1. In certain embodiments, a payload 2 is coupled to the inspection robot 100 with a pin or other quick-disconnect arrangement, allowing for the payload 2 to be removed, to be reconfigured separately from the inspection robot 100, and/or to be replaced with another payload 2 configured in a desired manner. The payload 2 may additionally have a couplant connection to the inspection robot 100 (e.g., reference FIG. 29—where a single couplant connection provides coupling connectivity to all sleds 1A and 1B) and/or an electrical connection to the inspection robot 100. Each sled may include a couplant connection conduit where the couplant connection conduit is coupled to a payload couplant connection at the upstream end and is coupled to the couplant entry of the cone at the downstream end. Multiple payload couplant connections on a single payload may be coupled together to form a single couplant connection between the payload and the inspection robot. The single couplant connection per payload facilitates the changing of the payload without having to connect/disconnect the couplant line connections at each sled. The couplant connection conduit between the payload couplant connection and the couplant entry of the cone facilitates connecting/disconnecting a sled from a payload without having to connect/disconnect the couplant connection conduit from the couplant entry of the cone. The couplant and/or electrical connections may include power for the sensors as required, and/or communication coupling (e.g., a datalink or network connection). Additionally or alternatively, sensors may communicate wirelessly to the inspection robot 100 or to another computing device, and/or sensors may store data in a memory associated with the sensor, sled 1, or payload 2, which may be downloaded at a later time. Any other connection type required for a payload 2, such as compressed air, paint, cleaning solutions, repair spray solutions, or the like, may similarly be coupled from the payload 2 to the inspection robot 100.

The horizontal configuration of sleds 1 (and sensors) is selectable to achieve the desired inspection coverage. For example, sleds 1 may be positioned to provide a sled running on each of a selected number of pipes of an inspection surface, positioned such that several sleds 1 combine on a single pipe of an inspection surface (e.g., providing greater radial inspection resolution for the pipe), and/or at selected horizontal distances from each other (e.g., to provide 1 inch resolution, 2 inch resolution, 3 inch resolution, etc.). In certain embodiments, the degrees of freedom of the sensor sleds 1 (e.g., from pivots 16, 17, 18) allow for distributed sleds 1 to maintain contact and orientation with complex surfaces.

In certain embodiments, sleds 1 are articulable to a desired horizontal position. For example, quick disconnects may be provided (pins, claims, set screws, etc.) that allow for the sliding of a sled 1 to any desired location on a payload 2, allowing for any desired horizontal positioning of the sleds 1 on the payload 2. Additionally or alternatively, sleds 1 may be movable horizontally during inspection operations. For example, a worm gear or other actuator may be coupled to the sled 1 and operable (e.g., by a controller 802) to position the sled 1 at a desired horizontal location. In certain embodiments, only certain ones of the sleds 1 are moveable during inspection operations—for example outer sleds 1 for maneuvering past obstacles. In certain embodiments, all of the sleds 1 are moveable during inspection operations—for example to support arbitrary inspection resolution (e.g., horizontal resolution, and/or vertical resolution), to configure the inspection trajectory of the inspection surface, or for any other reason. In certain embodiments, the payload 2 is horizontally moveable before or during inspection operations. In certain embodiments, an operator configures the payload 2 and/or sled 1 horizontal positions before inspection operations (e.g., before or between inspection runs). In certain embodiments, an operator or a controller 802 configures the payload 2 and/or sled 1 horizontal positions during inspection operations. In certain embodiments, an operator can configure the payload 2 and/or sled 1 horizontal positions remotely, for example communicating through a tether or wirelessly to the inspection robot.

The vertical configuration of sleds 1 is selectable to achieve the desired inspection coverage (e.g., horizontal resolution, vertical resolution, and/or redundancy). For example, referencing FIG. 13, multiple payloads 2 are positioned on a front side of the inspection robot 100, with forward payloads 2006 and rear payloads 1402. In certain embodiments, a payload 2 may include a forward payload 2006 and a rear payload 1402 in a single hardware device (e.g., with a single mounting position to the inspection robot 100), and/or may be independent payloads 2 (e.g., with a bracket extending from the inspection robot 100 past the rear payload 1402 for mounting the forward payloads 2006). In the example of FIG. 13, the rear payload 1402 and front payload 2006 include sleds 1 mounted thereupon which are in vertical alignment 1302—for example a given sled 1 of the rear payload 1402 traverses the same inspection position (or horizontal lane) of a corresponding sled 1 of the forward payload 2006. The utilization of aligned payloads 2 provides for a number of capabilities for the inspection robot 100, including at least: redundancy of sensing values (e.g., to develop higher confidence in a sensed value); the utilization of more than one sensing calibration for the sensors (e.g., a front sensor utilizes a first calibration set, and a rear sensor utilizes a second calibration set); the adjustment of sensing operations for a rear sensor relative to a forward sensor (e.g., based on the front sensed parameter, a rear sensor can operate at an adjusted range, resolution, sampling rate, or calibration); the utilization of a rear sensor in response to a front sensor detected value (e.g., a rear sensor may be a high cost sensor—either high power, high computing/processing requirements, an expensive sensor to operate, etc.) where the utilization of the rear sensor can be conserved until a front sensor indicates that a value of interest is detected; the operation of a repair, marking, cleaning, or other capability rear payload 1402 that is responsive to the detected values of the forward payload 2006; and/or for improved vertical resolution of the sensed values (e.g., if the sensor has a given resolution of detection in the vertical direction, the front and rear payloads can be operated out of phase to provide for improved vertical resolution).

Figure 14:
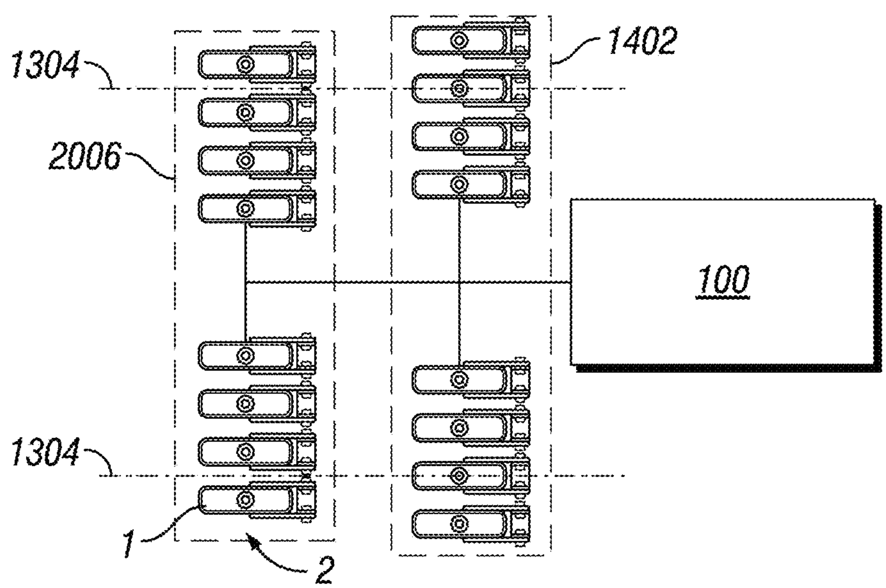
FIG. 14 is another schematic diagram of a payload arrangement.

In another example, referencing FIG. 14, multiple payloads 2 are positioned on the front of the inspection robot 100, with sleds 1 mounted on the front payload 2006 and rear payload 1402 that are not aligned (e.g., lane 1304 is not shared between sleds of the front payload 2006 and rear payload 1402). The utilization of not aligned payloads 2 allows for improved resolution in the horizontal direction for a given number of sleds 1 mounted on each payload 2. In certain embodiments, not aligned payloads may be utilized where the hardware space on a payload 2 is not sufficient to conveniently provide a sufficient number or spacing of sleds 1 to achieve the desired horizontal coverage. In certain embodiments, not aligned payloads may be utilized to limit the number of sleds 1 on a given payload 2, for example to provide for a reduced flow rate of couplant through a given payload-inspection robot connection, to provide for a reduced load on an electrical coupling (e.g., power supply and/or network communication load) between a given payload and the inspection robot. While the examples of FIGS. 13 and 14 depict aligned or not aligned sleds for convenience of illustration, a given inspection robot 100 may be configured with both aligned and not aligned sleds 1, for example to reduce mechanical loads, improve inspection robot balance, in response to inspection surface constraints, or the like.

It can be seen that sensors may be modularly configured on the robotic vehicle to collect data on specific locations across the surface of travel (e.g., on a top surface of an object, on the side of an object, between objects, and the like), repeat collection of data on the same surface location (e.g., two sensors serially collecting data from the same location, either with the same sensor type or different sensor types), provide predictive sensing from a first sensor to determine if a second sensor should take data on the same location at a second time during a single run of the robotic vehicle (e.g., an ultra-sonic sensor mounted on a leading sensor sled taking data on a location determines that a gamma-ray measurement should be taken for the same location by a sensor mounted on a trailing sensor sled configured to travel over the same location as the leading sensor), provide redundant sensor measurements from a plurality of sensors located in leading and trailing locations (e.g., located on the same or different sensor sleds to repeat sensor data collection), and the like.

In certain embodiments, the robotic vehicle includes sensor sleds with one sensor and sensor sleds with a plurality of sensors. A number of sensors arranged on a single sensor sled may be arranged with the same sensor type across the direction of robotic vehicle travel (e.g., perpendicular to the direction of travel, or "horizontal") to increase coverage of that sensor type (e.g., to cover different surfaces of an object, such as two sides of a pipe), arranged with the same sensor type along the direction of robotic vehicle travel (e.g., parallel to the direction of travel, or "vertical") to provide redundant coverage of that sensor type over the same location (e.g., to ensure data coverage, to enable statistical analysis based on multiple measurements over the same location), arranged with a different sensor type across the direction of robotic vehicle travel to capture a diversity of sensor data in side-by-side locations along the direction of robotic vehicle travel (e.g., providing both ultra-sonic and conductivity measurements at side-by-side locations), arranged with a different sensor type along the direction of robotic vehicle travel to provide predictive sensing from a leading sensor to a trailing sensor (e.g., running a trailing gamma-ray sensor measurement only if a leading ultra-sonic sensor measurement indicates the need to do so), combinations of any of these, and the like. The modularity of the robotic vehicle may permit exchanging sensor sleds with the same sensor configuration (e.g., replacement due to wear or failure), different sensor configurations (e.g., adapting the sensor arrangement for different surface applications), and the like.

Providing for multiple simultaneous sensor measurements over a surface area, whether for taking data from the same sensor type or from different sensor types, provides the ability to maximize the collection of sensor data in a single run of the robotic vehicle. If the surface over which the robotic vehicle was moving were perfectly flat, the sensor sled could cover a substantial surface with an array of sensors. However, the surface over which the robotic vehicle travels may be highly irregular, and have obstacles over which the sensor sleds must adjust, and so the preferred embodiment for the sensor sled is relatively small with a highly flexible orientation, as described herein, where a plurality of sensor sleds is arranged to cover an area along the direction of robotic vehicle travel. Sensors may be distributed amongst the sensor sleds as described for individual sensor sleds (e.g., single sensor per sensor sled, multiple sensors per sensor sled (arranged as described herein)), where total coverage is achieved through a plurality of sensor sleds mounted to the robotic vehicle. One such embodiment, as introduced herein, such as depicted in FIG. 1, comprises a plurality of sensor sleds arranged linearly across the direction of robotic vehicle travel, where the plurality of sensor sleds are capable of individually adjusting to the irregular surface as the robotic vehicle travels. Further, each sensor sled may be positioned to accommodate regular characteristics in the surface (e.g., positioning sensor sleds to ride along a selected portion of a pipe aligned along the direction of travel), to provide for multiple detections of a pipe or tube from a number of radial positions, sensor sleds may be shaped to accommodate the shape of regular characteristics in the surface (e.g., rounded surface of a pipe), and the like. In this way, the sensor sled arrangement may accommodate both the regular characteristics in the surface (e.g., a series of features along the direction of travel) and irregular characteristics along the surface (e.g., obstacles that the sensor sleds flexibly mitigate during travel along the surface).

Although FIG. 1 depicts a linear arrangement of sensor sleds with the same extension (e.g., the same connector arm length), another example arrangement may include sensor sleds with different extensions, such as where some sensor sleds are arranged to be positioned further out, mounted on longer connection arms. This arrangement may have the advantage of allowing a greater density of sensors across the configuration, such as where a more leading sensor sled could be positioned linearly along the configuration between two more trailing sensor sleds such that sensors are provided greater linear coverage than would be possible with all the sensor sleds positioned side-by-side. This configuration may also allow improved mechanical accommodation between the springs and connectors that may be associated with connections of sensor sleds to the arms and connection assembly (e.g., allowing greater individual movement of sensor sleds without the sensor sleds making physical contact with one another).

Figure 15:
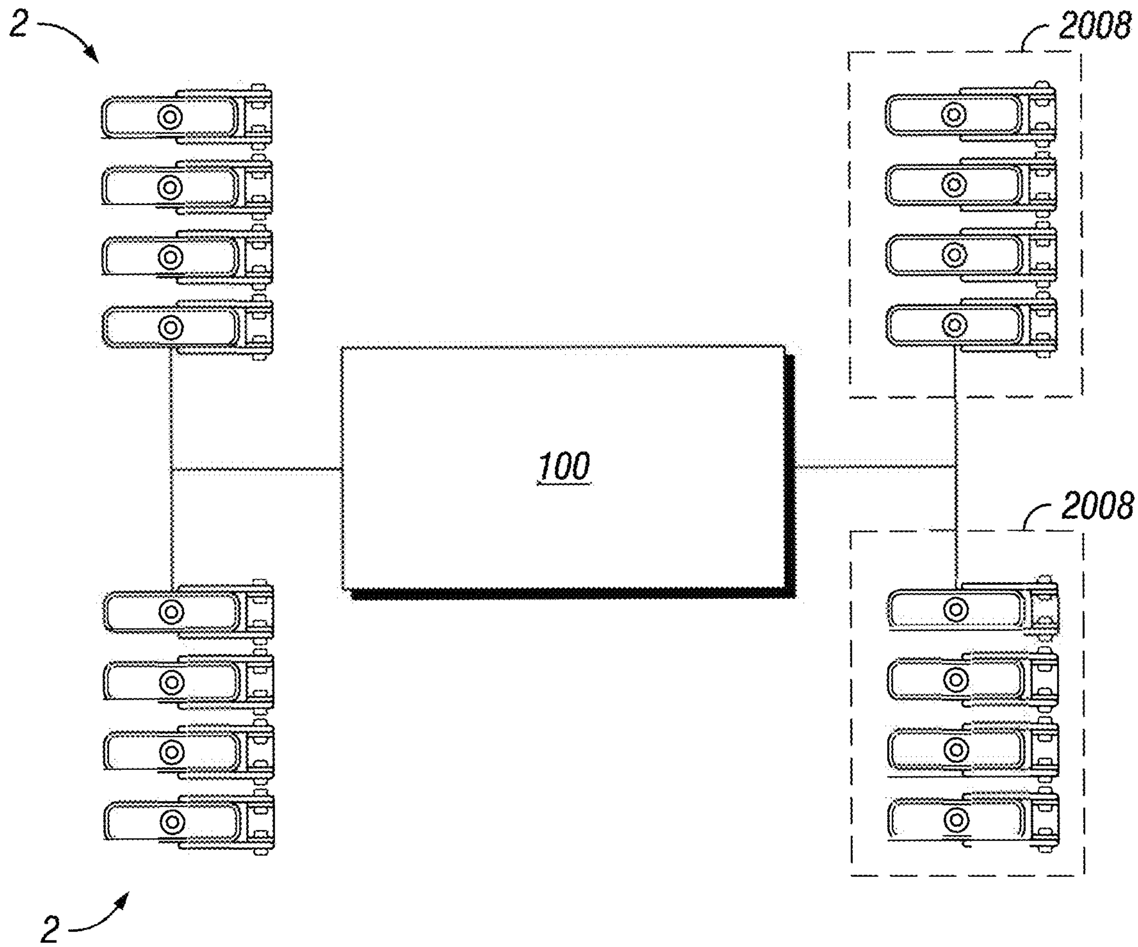
FIG. 15 is another schematic diagram of a payload arrangement.

Referring to FIG. 13, an example configuration of sensor sleds includes the forward sensor sled array 2006 ahead of the rear sled array 1402, such as where each utilizes a sensor sled connector assembly 2004 for mounting the payloads. Again, although FIG. 13 depicts the sensor sleds arranged on the sensor sled connector assembly 2004 with equal length arms, different length arms may be utilized to position, for instance, sensor sleds of sensor sled array 1402 in intermediate positions between rear sensor sleds of rear payload 1402 and forward sensor sleds of the forward payload 2006. As was the case with the arrangement of a plurality of sensors on a single sensor sled to accommodate different coverage options (e.g., maximizing coverage, predictive capabilities, redundancy, and the like), the extended area configuration of sensors in this multiple sensor sled array arrangement allows similar functionality. For instance, a sensor sled positioned in a lateral position on the forward payload 2006 may provide redundant or predictive functionality for another sensor sled positioned in the same lateral position on the rear payload 1402. In the case of a predictive functionality, the greater travel distance afforded by the separation between a sensor sled mounted on the second sensor sled array 2006 and the sensor sled array 1402 may provide for additional processing time for determining, for instance, whether the sensor in the trailing sensor sled should be activated. For example, the leading sensor collects sensor data and sends that data to a processing function (e.g., wired communication to on-board or external processing, wireless communication to external processing), the processor takes a period of time to determine if the trailing sensor should be activated, and after the determination is made, activates the trailing sensor. The separation of the two sensors, divided by the rate of travel of the robotic vehicle, determines the time available for processing. The greater the distance, the greater the processing time allowed. Referring to FIG. 15, in another example, distance is increased further by utilizing a trailing payload 2008, thus increasing the distance and processing time further. Additionally or alternatively, the hardware arrangement of FIG. 15 may provide for more convenient integration of the trailing payload 2008 rather than having multiple payloads 1402, 2006 in front of the inspection robot 100. In certain embodiments, certain operations of a payload 2 may be easier or more desirable to perform on a trailing side of the inspection robot 100—such as spraying of painting, marking, or repair fluids, to avoid the inspection robot 100 having to be exposed to such fluids as a remaining mist, by gravity flow, and/or having to drive through the painted, cleaned, or repaired area. In certain embodiments, an inspection robot 100 may additionally or alternatively include both multiple payloads 1402, 2006 in front of the inspection robot (e.g., as depicted in FIGS. 13 and 14) and/or one or more trailing payloads (e.g., as depicted in FIG. 15).

In another example, the trailing payload 2008 (e.g. a sensor sled array) may provide a greater distance for functions that would benefit the system by being isolated from the sensors in the forward end of the robotic vehicle. For instance, the robotic vehicle may provide for a marking device (e.g., visible marker, UV marker, and the like) to mark the surface when a condition alert is detected (e.g., detecting corrosion or erosion in a pipe at a level exceeding a predefined threshold, and marking the pipe with visible paint).

Embodiments with multiple sensor sled connector assemblies provide configurations and area distribution of sensors that may enable greater flexibility in sensor data taking and processing, including alignment of same-type sensor sleds allowing for repeated measurements (e.g., the same sensor used in a leading sensor sled as in a trailing sensor sled, such as for redundancy or verification in data taking when leading and trailing sleds are co-aligned), alignment of different-type sensor sleds for multiple different sensor measurements of the same path (e.g., increase the number of sensor types taking data, have the lead sensor provide data to the processor to determine whether to activate the trailing sensor (e.g., ultra-sonic/gamma-ray, and the like)), off-set alignment of same-type sensor sleds for increased coverage when leading and trailing sleds are off-set from one another with respect to travel path, off-set alignment of different-type sensor sleds for trailing sensor sleds to measure surfaces that have not been disturbed by leading sensor sleds (e.g., when the leading sensor sled is using a couplant), and the like.

The modular design of the robotic vehicle may provide for a system flexible to different applications and surfaces (e.g., customizing the robot and modules of the robot ahead of time based on the application, and/or during an inspection operation), and to changing operational conditions (e.g., flexibility to changes in surface configurations and conditions, replacement for failures, reconfiguration based on sensed conditions), such as being able to change out sensors, sleds, assemblies of sleds, number of sled arrays, and the like.

Figure 12:
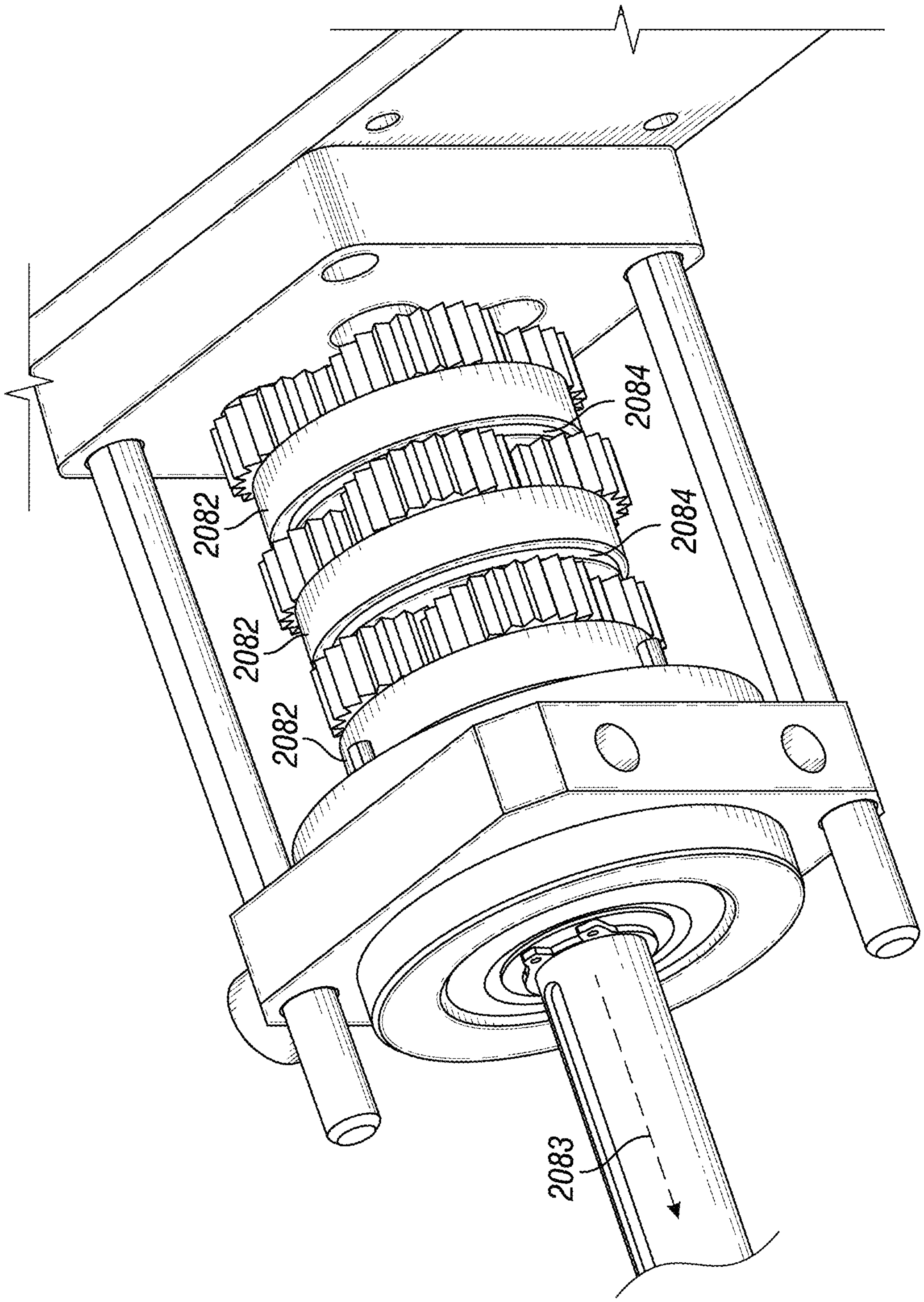
FIG. 12 is a schematic depiction of a gearbox.

An example inspection robot utilizes a magnet-based wheel design (e.g., reference FIGS. 2A-2B and the related description). Although the inspection robot may utilize flux directing ferromagnetic wheel components, such as ferromagnetic magnet enclosures 3 to minimize the strength of the extended magnetic field, ferromagnetic components within the inspection robot may be exposed to a magnetic field. One component that may experience negative effects from the magnetic field is the gearbox, which may be mounted proximate to the wheel assembly. FIG. 12 illustrates an example gearbox configuration, showing the direction 2083 of magnetic attraction axially along the drive shaft to the wheel (wheel not shown). The magnetic attraction, acting on, in this instance, ferromagnetic gears, results in an axial load applied to the gears, pulling the gears against the gear carrier plates 2082 with forces that the gears would otherwise not experience. This axial load may result in increased friction, heat, energy loss, and wear.

Referencing FIG. 12, an example arrangement depicts the inclusion of wear-resistant thrust washers 2084, placed to provide a reduced frictional interface between the gears and the adjacent surface. Thus, the negative effects of the axial load are minimized without significant changes to a gearbox design. In a second example, with wheels on opposing sides of the gear box assembly(s), the gearbox configuration of the inspection robot may be spatially arranged such that the net magnetic forces acting on the gears are largely nullified, that is, balanced between forces from a wheel magnet on one side and a second wheel magnet on the other side. Careful layout of the gearbox configuration could thus reduce the net forces acting on the gears. In embodiments, example one and example two may be applied alone or in combination. For instance, the gearbox configuration may be spatially arranged to minimize the net magnetic forces acting on gears, where thrust washers are applied to further reduce the negative effects of any remaining net magnetic forces. In a third example, the negative effects upon the gearbox resulting from magnetic fields may be eliminated by making the gears from non-ferrous materials. Example and non-limiting examples of non-ferrous materials include polyoxymethylene (e.g., Delrin® acetyl resin, etc.), a low- or non-magnetic steel (e.g. 316 stainless steel or 304 stainless steel), and/or aluminum (e.g., 2024 Al). In certain embodiments, other materials such as ceramic, nylon, copper, or brass may be used for gears, depending upon the wear and load requirements of the gearbox, the potential intrusion of water to the gearbox, and/or the acceptable manufacturing costs and tolerances.

Throughout the present description, certain orientation parameters are described as “horizontal,” “perpendicular,” and/or “across” the direction of travel of the inspection robot, and/or described as “vertical,” “parallel,” and/or in line with the direction of travel of the inspection robot. It is specifically contemplated herein that the inspection robot may be travelling vertically, horizontally, at oblique angles, and/or on curves relative to a ground-based absolute coordinate system. Accordingly, except where the context otherwise requires, any reference to the direction of travel of the inspection robot is understood to include any orientation of the robot—such as an inspection robot traveling horizontally on a floor may have a “vertical” direction for purposes of understanding sled distribution that is in a “horizontal” absolute direction. Additionally, the “vertical” direction of the inspection robot may be a function of time during inspection operations and/or position on an inspection surface—for example as an inspection robot traverses over a curved surface. In certain embodiments, where gravitational considerations or other context based aspects may indicate—vertical indicates an absolute coordinate system vertical—for example in certain embodiments where couplant flow into a cone is utilized to manage bubble formation in the cone. In certain embodiments, a trajectory through the inspection surface of a given sled may be referenced as a "horizontal inspection lane"—for example, the track that the sled takes traversing through the inspection surface.

Certain embodiments include an apparatus for acoustic inspection of an inspection surface with arbitrary resolution. Arbitrary resolution, as utilized herein, includes resolution of features in geometric space with a selected resolution—for example resolution of features (e.g., cracks, wall thickness, anomalies, etc.) at a selected spacing in horizontal space (e.g., perpendicular to a travel direction of an inspection robot) and/or vertical space (e.g., in a travel direction of an inspection robot). While resolution is described in terms of the travel motion of an inspection robot, resolution may instead be considered in any coordinate system, such as cylindrical or spherical coordinates, and/or along axes unrelated to the motion of an inspection robot. It will be understood that the configurations of an inspection robot and operations described in the present disclosure can support arbitrary resolution in any coordinate system, with the inspection robot providing sufficient resolution as operated, in view of the target coordinate system. Accordingly, for example, where inspection resolution of 6-inches is desired in a target coordinate system that is diagonal to the travel direction of the inspection robot, the inspection robot and related operations described throughout the present disclosure can support whatever resolution is required (whether greater than 6-inches, less than 6-inches, or variable resolution depending upon the location over the inspection surface) to facilitate the 6-inch resolution of the target coordinate system. It can be seen that an inspection robot and/or related operations capable of achieving an arbitrary resolution in the coordinates of the movement of the inspection robot can likewise achieve arbitrary resolution in any coordinate system for the mapping of the inspection surface. For clarity of description, apparatus and operations to support an arbitrary resolution are described in view of the coordinate system of the movement of an inspection robot.

An example apparatus to support acoustic inspection of an inspection surface includes an inspection robot having a payload and a number of sleds mounted thereon, with the sleds each having at least one acoustic sensor mounted thereon. Accordingly, the inspection robot is capable of simultaneously determining acoustic parameters at a range of positions horizontally. Sleds may be positioned horizontally at a selected spacing, including providing a number of sleds to provide sensors positioned radially around several positions on a pipe or other surface feature of the inspection surface. In certain embodiments, vertical resolution is supported according to the sampling rate of the sensors, and/or the movement speed of the inspection robot. Additionally or alternatively, the inspection robot may have vertically displaced payloads, having an additional number of sleds mounted thereon, with the sleds each having at least one acoustic sensor mounted thereon. The utilization of additional vertically displaced payloads can provide additional resolution, either in the horizontal direction (e.g., where sleds of the vertically displaced payload(s) are offset from sleds in the first payload(s)) and/or in the vertical direction (e.g., where sensors on sleds of the vertically displaced payload(s) are sampling such that sensed parameters are vertically offset from sensors on sleds of the first payload(s)). Accordingly, it can be seen that, even where physical limitations of sled spacing, numbers of sensors supported by a given payload, or other considerations limit horizontal resolution for a given payload, horizontal resolution can be enhanced through the utilization of additional vertically displaced payloads. In certain embodiments, an inspection robot can perform another inspection run over a same area of the inspection surface, for example with sleds tracking in an offset line from a first run, with positioning information to ensure that both horizontal and/or vertical sensed parameters are offset from the first run.

Accordingly, an apparatus is provided that achieves significant resolution improvements, horizontally and/or vertically, over previously known systems. Additionally or alternatively, an inspection robot performs inspection operations at distinct locations on a descent operation than on an ascent operation, providing for additional resolution improvements without increasing a number of run operations required to perform the inspection (e.g., where an inspection robot ascends an inspection surface, and descends the inspection surface as a normal part of completing the inspection run). In certain embodiments, an apparatus is configured to perform multiple run operations to achieve the selected resolution. It can be seen that the greater the number of inspection runs required to achieve a given spatial resolution, the longer the down time for the system (e.g., an industrial system) being inspected (where a shutdown of the system is required to perform the inspection), the longer the operating time and greater the cost of the inspection, and/or the greater chance that a failure occurs during the inspection. Accordingly, even where multiple inspection runs are required, a reduction in the number of the inspection runs is beneficial.

In certain embodiments, an inspection robot includes a low fluid loss couplant system, enhancing the number of sensors that are supportable in a given inspection run, thereby enhancing available sensing resolution. In certain embodiments, an inspection robot includes individual down force support for sleds and/or sensors, providing for reduced fluid loss, reduced off-nominal sensing operations, and/or increasing the available number of sensors supportable on a payload, thereby enhancing available sensing resolution. In certain embodiments, an inspection robot includes a single couplant connection for a payload, and/or a single couplant connection for the inspection robot, thereby enhancing reliability and providing for a greater number of sensors on a payload and/or on the inspection robot that are available for inspections under commercially reasonable operations (e.g., configurable for inspection operations with reasonable reliability, checking for leaks, expected to operate without problems over the course of inspection operations, and/or do not require a high level of skill or expensive test equipment to ensure proper operation). In certain embodiments, an inspection robot includes acoustic sensors coupled to acoustic cones, enhancing robust detection operations (e.g., a high percentage of valid sensing data, ease of acoustic coupling of a sensor to an inspection surface, etc.), reducing couplant fluid losses, and/or easing integration of sensors with sleds, thereby supporting an increased number of sensors per payload and/or inspection robot, and enhancing available sensing resolution. In certain embodiments, an inspection robot includes utilizing water as a couplant, thereby reducing fluid pumping losses, reducing risks due to minor leaks within a multiple plumbing line system to support multiple sensors, and/or reducing the impact (environmental, hazard, clean-up, etc.) of performing multiple inspection runs and/or performing an inspection operation with a multiplicity of acoustic sensors operating.

Figure 33:
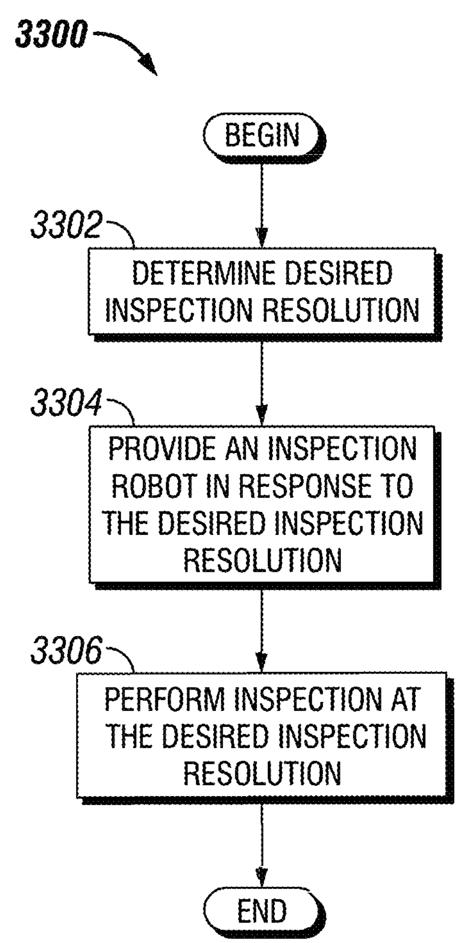
FIG. 33 is a schematic flow diagram of a procedure to perform an inspection at an arbitrary resolution.

Referencing FIG. 33, an example procedure 3300 to acoustically inspect an inspection surface with an arbitrary (or selectable) resolution is schematically depicted. The example procedure 3300 includes an operation 3302 to determine a desired resolution of inspection for the surface. The operation 3302 includes determining the desired resolution in whatever coordinate system is considered for the inspection surface, and translating the desired resolution for the coordinate system of the inspection surface to a coordinate system of an inspection robot (e.g., in terms of vertical and horizontal resolution for the inspection robot), if the coordinate system for the inspection surface is distinct from the coordinate system of the inspection robot. The example procedure 3300 further includes an operation 3304 to provide an inspection robot in response to the desired resolution of inspection, the inspection robot having at least one payload, a number of sleds mounted on the payload, and at least one acoustic sensor mounted on each sled. It will be understood that certain sleds on the payload may not have an acoustic sensor mounted thereupon, but for provision of selected acoustic inspection resolution, only the sleds having an acoustic sensor mounted thereupon are considered. In certain embodiments, operation 3304 additionally or alternatively includes one or more operations such as: providing multiple payloads; providing vertically displaced payloads; providing offset sleds on one or more vertically displaced payloads; providing payloads having a single couplant connection for the payload; providing an inspection robot having a single couplant connection for the inspection robot; providing an inspection robot utilizing water as a couplant; providing a down force to the sleds to ensure alignment and/or reduced fluid loss; providing degrees of freedom of movement to the sleds to ensure alignment and/or robust obstacle traversal; providing the sensors coupled to an acoustic cone; and/or configuring a horizontal spacing of the sleds in response to the selected resolution (e.g., spaced to support the selected resolution, spaced to support the selected resolution between an ascent and a descent, and/or spaced to support the selected resolution with a scheduled number of inspection runs).

The example procedure 3300 further includes an operation 3306 to perform an inspection operation of an inspection surface with arbitrary resolution. For example, operation 3306 includes at least: operating the number of horizontally displaced sensors to achieve the arbitrary resolution; operating vertically displaced payloads in a scheduled manner (e.g., out of phase with the first payload thereby inspecting a vertically distinct set of locations of the inspection surface); operating vertically displaced payloads to enhance horizontal inspection resolution; performing an inspection on a first horizontal track on an ascent, and a second horizontal track distinct from the first horizontal track on a descent; performing an inspection on a first vertical set of points on an ascent, and on a second vertical set of points on a descent (which may be on the same or a distinct horizontal track); and/or performing a plurality of inspection runs where the horizontal and/or vertical inspection positions of the multiple runs are distinct from the horizontal and/or vertical inspection positions of a first run. Certain operations of the example procedure 3300 may be performed by a controller 802.

While operations of procedure 3300, and an apparatus to provide for arbitrary or selected resolution inspections of a system are described in terms of acoustic sensing, it will be understood that arbitrary or selected resolution of other sensed parameters are contemplated herein. In certain embodiments, acoustic sensing provides specific challenges that are addressed by certain aspects of the present disclosure. However, sensing of any parameter, such as temperature, magnetic or electro-magnetic sensing, infra-red detection, UV detection, composition determinations, and other sensed parameters also present certain challenges addressed by certain aspects of the present disclosure. For example, the provision of multiple sensors in a single inspection run at determinable locations, the utilization of an inspection robot (e.g., instead of a person positioned in the inspection space), including an inspection robot with position sensing, and/or the reduction of sensor interfaces including electrical and communication interfaces, provides for ease of sensing for any sensed parameters at a selected resolution. In certain embodiments, a system utilizes apparatuses and operations herein to achieve arbitrary resolution for acoustic sensing. In certain embodiments, a system additionally or alternatively utilizes apparatuses and operations herein to achieve arbitrary resolution for any sensed parameter.

Figure 34:
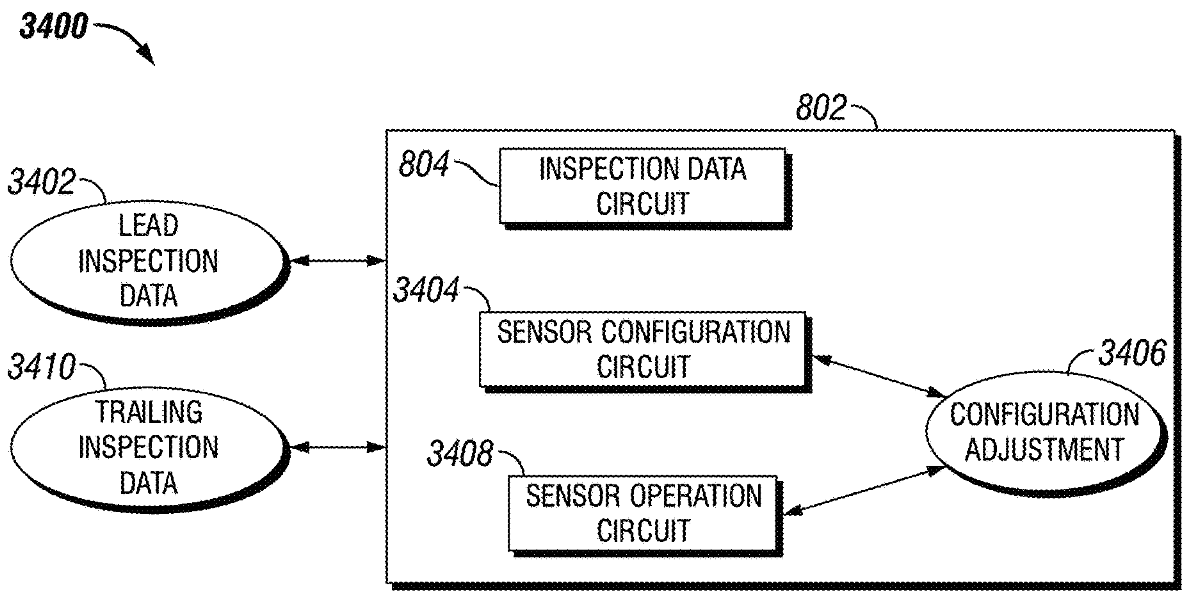
FIG. 34 is a schematic block diagram of an apparatus for adjusting a trailing sensor configuration.

Referencing FIG. 34, an example apparatus 3400 is depicted for configuring a trailing sensor inspection scheme in response to a leading sensor inspection value. The example apparatus 3400 includes a controller 802 having an inspection data circuit 804 that interprets lead inspection data 3402 from a lead sensor. Example and non-limiting lead sensors include a sensor mounted on a sled of a forward payload 2006, a sensor mounted on either a forward payload 2006 or a rear payload 1402 of an inspection robot having a trailing payload 2008, and/or a sensor operated on a first run of an inspection robot, where operations of the apparatus 3400 proceed with adjusting operations of a sensor on a subsequent run of the inspection robot (e.g., the first run is ascending, and the subsequent run is descending; the first run is descending, and the subsequent run is ascending; and/or the first run is performed at a first time, and the subsequent run is performed at a second, later, time).

The example controller 802 further includes a sensor configuration circuit 3404 structured to determine a configuration adjustment 3406 for a trailing sensor. Example and non-limiting trailing sensors include any sensor operating over the same or a substantially similar portion of the inspection surface as the lead sensor, at a later point in time. A trailing sensor may be a sensor positioned on a payload behind the payload having the lead sensor, a physically distinct sensor from the lead sensor operating over the same or a substantially similar portion of the inspection surface after the lead sensor, and/or a sensor that is physically the same sensor as the lead sensor, but reconfigured in some aspect (e.g., sampling parameters, calibrations, inspection robot rate of travel change, etc.). A portion that is substantially similar includes a sensor operating on a sled in the same horizontal track (e.g., in the direction of inspection robot movement) as the lead sensor, a sensor that is sensing a portion of the inspection sensor that is expected to determine the same parameters (e.g., wall thickness in a given area) of the inspection surface as that sensed by the lead sensor, and/or a sensor operating in a space of the inspection area where it is expected that determinations for the lead sensor would be effective in adjusting the trailing sensor. Example and non-limiting determinations for the lead sensor to be effective in adjusting the trailing sensor include pipe thickness determinations for a same pipe and/or same cooling tower, where pipe thickness expectations may affect the calibrations or other settings utilized by the lead and trailing sensors; determination of a coating thickness where the trailing sensor operates in an environment that has experienced similar conditions (e.g., temperatures, flow rates, operating times, etc.) as the conditions experienced by the environment sensed by the lead sensor; and/or any other sensed parameter affecting the calibrations or other settings utilized by the lead and trailing sensors where knowledge gained by the lead sensor could be expected to provide information utilizable for the trailing sensor.

Example and non-limiting configuration adjustments 3406 include changing of sensing parameters such as cut-off times to observe peak values for ultra-sonic processing, adjustments of rationality values for ultra-sonic processing, enabling of trailing sensors or additional trailing sensors (e.g., X-ray, gamma ray, high resolution camera operations, etc.), adjustment of a sensor sampling rate (e.g., faster or slower), adjustment of fault cut-off values (e.g., increase or decrease fault cutoff values), adjustment of any transducer configurable properties (e.g., voltage, waveform, gain, filtering operations, and/or return detection algorithm), and/or adjustment of a sensor range or resolution value (e.g., increase a range in response to a lead sensing value being saturated or near a range limit, decrease a range in response to a lead sensing value being within a specified range window, and/or increase or decrease a resolution of the trailing sensor). In certain embodiments, a configuration adjustment 3406 to adjust a sampling rate of a trailing sensor includes by changing a movement speed of an inspection robot. Example and non-limiting configuration adjustments include any parameters described in relation to FIGS. 39, 40, and 43-48 and the related descriptions. It can be seen that the knowledge gained from the lead inspection data 3402 can be utilized to adjust the trailing sensor plan which can result more reliable data (e.g., where calibration assumptions appear to be off-nominal for the real inspection surface), the saving of one or more inspection runs (e.g., reconfiguring the sensing plan in real-time to complete a successful sensing run during inspection operations), improved operations for a subsequent portion of a sensing run (e.g., a first inspection run of the inspection surface improves the remaining inspection runs, even if the vertical track of the first inspection run must be repeated), and/or efficient utilization of expensive sensing operations by utilizing such operations only when the lead inspection data 3402 indicates such operations are useful or required. The example controller 802 includes a sensor operation circuit 3408 that adjusts parameters of the trailing sensor in response to the configuration adjustment 3406, and the inspection data circuit 804 interpreting trailing inspection data 3410, wherein the trailing sensors are responsive to the adjusted parameters by the sensor operation circuit.

Figure 35:
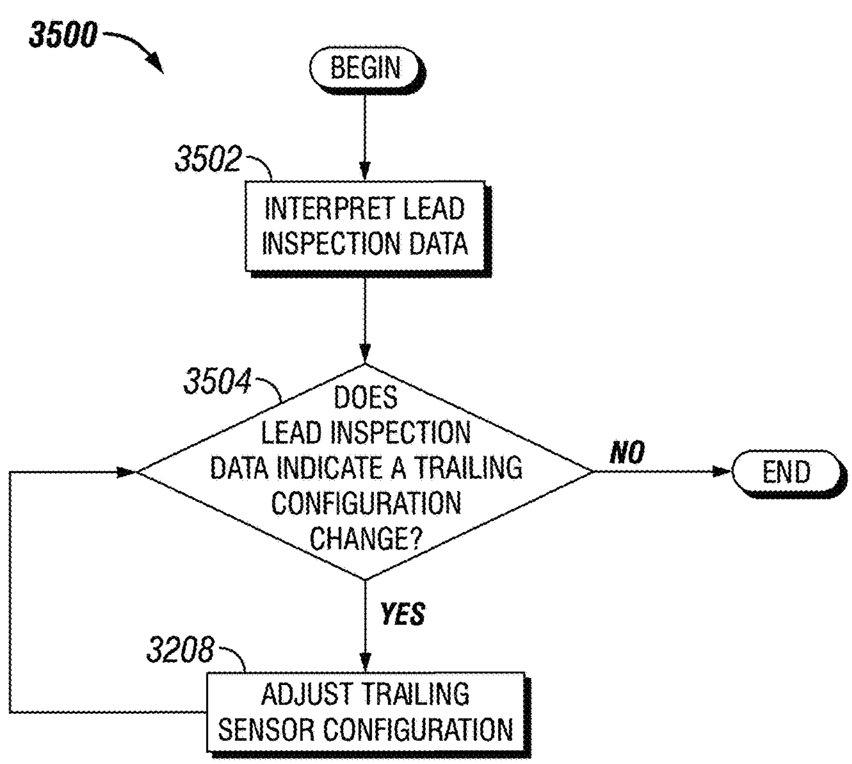
FIG. 35 is a schematic flow diagram of a procedure to adjust a trailing sensor configuration.

Referencing FIG. 35, an example procedure 3500 to configure a trailing sensor in response to a leading sensor value is depicted. The example procedure 3500 includes an operation 3502 to interpret lead inspection data provided by a leading sensor, and an operation 3504 to determine whether the lead inspection data indicates that a trailing sensor configuration should be adjusted. Where the operation 3504 determines that the trailing sensor configuration should be adjusted, the example procedure 3500 includes an operation 3506 to adjust the trailing sensor configuration in response to the lead inspection data. Example and non-limiting operations 3506 to adjust a trailing sensor configuration include changing a calibration for the sensor (e.g., an analog/digital processor configuration, cutoff time values, and/or speed-of-sound values for one or more materials), changing a range or resolution of the trailing sensor, enabling or disabling sensing operations of a trailing sensor, and/or adjusting a speed of travel of an inspection robot. In certain embodiments, operations 3506 include adjusting a horizontal position of a trailing sensor (e.g., where a horizontal position of a sled 1 on a payload 2 is actively controllable by a controller 802, and/or adjusted manually between the lead sensing operation and the trailing sensing operation).

In certain embodiments, lead inspection data 3402 includes ultra-sonic information such as processed ultra-sonic information from a sensor, and the sensor configuration circuit 3404 determines to utilize a consumable, slower, and/or more expensive sensing, repair, and/or marking operation by providing a configuration adjustment 3406 instructing a trailing sensor to operate, or to change nominal operations, in response to the lead inspection data 3402. For example, lead inspection data 3402 may indicate a thin wall, and sensor configuration circuit 3404 provides the configuration adjustment 3406 to alter a trailing operation such as additional sensing with a more capable sensor (e.g., a more expensive or capable ultra-sonic sensor, an X-ray sensor, a gamma ray sensor, or the like) and/or to operate a repair or marking tool (e.g., which may have a limited or consumable amount of coating material, marking material, or the like) at the location determined to have the thin wall. Accordingly, expense, time, and/or operational complication can be added to inspection operations in a controlled manner according to the lead inspection data 3402.

An example apparatus is disclosed to perform an inspection of an industrial surface. Many industrial surfaces are provided in hazardous locations, including without limitation where heavy or dangerous mechanical equipment operates, in the presence of high temperature environments, in the presence of vertical hazards, in the presence of corrosive chemicals, in the presence of high pressure vessels or lines, in the presence of high voltage electrical conduits, equipment connected to and/or positioned in the vicinity of an electrical power connection, in the presence of high noise, in the presence of confined spaces, and/or with any other personnel risk feature present. Accordingly, inspection operations often include a shutdown of related equipment, and/or specific procedures to mitigate fall hazards, confined space operations, lockout-tagout procedures, or the like. In certain embodiments, the utilization of an inspection robot allows for an inspection without a shutdown of the related equipment. In certain embodiments, the utilization of an inspection robot allows for a shutdown with a reduced number of related procedures that would be required if personnel were to perform the inspection. In certain embodiments, the utilization of an inspection robot provides for a partial shutdown to mitigate some factors that may affect the inspection operations and/or put the inspection robot at risk, but allows for other operations to continue. For example, it may be acceptable to position the inspection robot in the presence of high pressure or high voltage components, but operations that generate high temperatures may be shut down.

In certain embodiments, the utilization of an inspection robot provides additional capabilities for operation. For example, an inspection robot having positional sensing within an industrial environment can request shutdown of only certain aspects of the industrial system that are related to the current position of the inspection robot, allowing for partial operations as the inspection is performed. In another example, the inspection robot may have sensing capability, such as temperature sensing, where the inspection robot can opportunistically inspect aspects of the industrial system that are available for inspection, while avoiding other aspects or coming back to inspect those aspects when operational conditions allow for the inspection. Additionally, in certain embodiments, it is acceptable to risk the industrial robot (e.g., where shutting down operations exceed the cost of the loss of the industrial robot) to perform an inspection that has a likelihood of success, where such risks would not be acceptable for personnel. In certain embodiments, a partial shutdown of a system has lower cost than a full shutdown, and/or can allow the system to be kept in a condition where restart time, startup operations, etc. are at a lower cost or reduced time relative to a full shutdown. In certain embodiments, the enhanced cost, time, and risk of performing additional operations beyond mere shutdown, such as compliance with procedures that would be required if personnel were to perform the inspection, can be significant.

Figure 36:
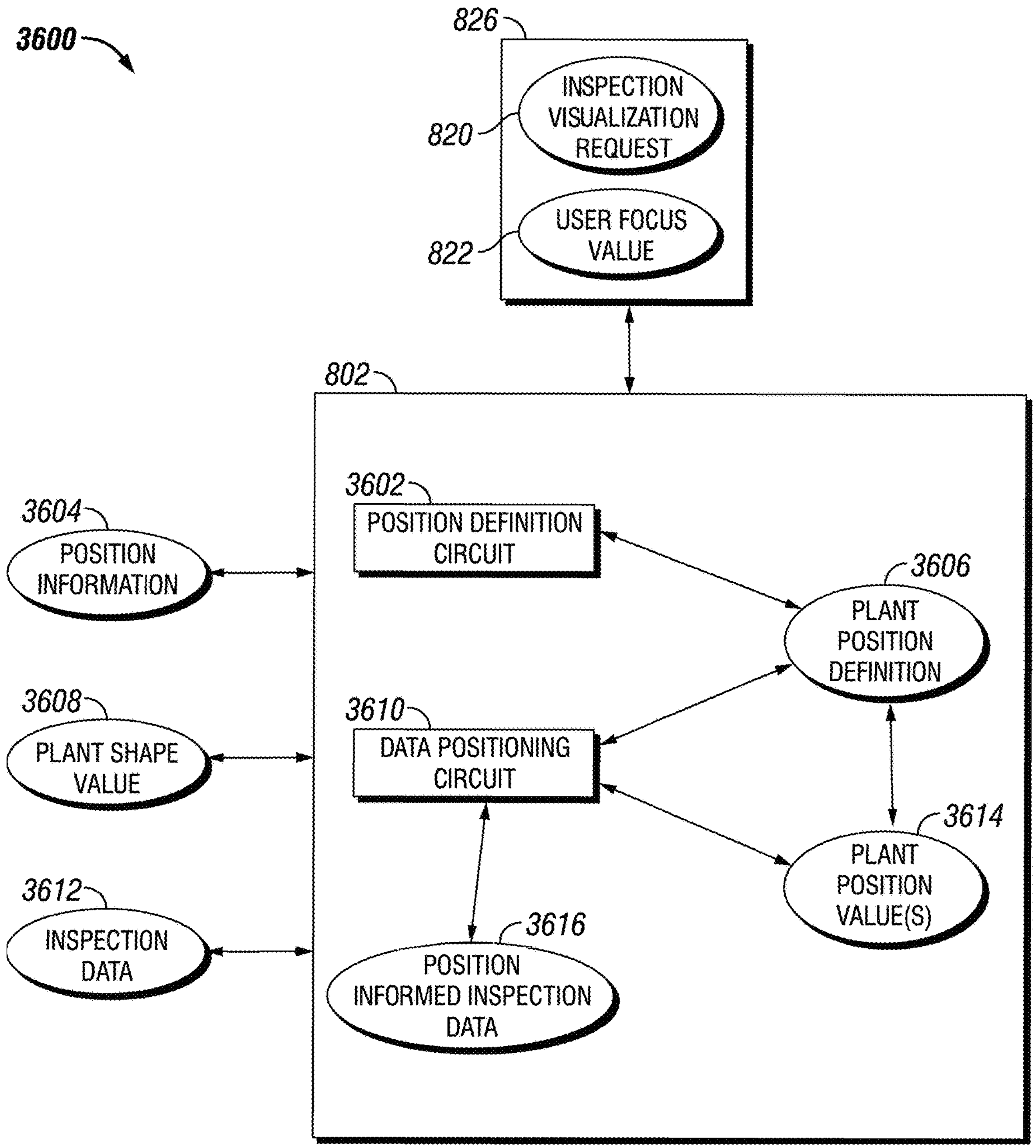
FIG. 36 is a schematic block diagram of an apparatus for providing position informed inspection data.

Referencing FIG. 36, an example apparatus 3600 to inspect a plant, industrial system, and/or inspection surface utilizing position information is depicted schematically. The example apparatus 3600 includes a position definition circuit 3602 that interprets position information 3604, and/or determines a plant position definition 3606 (e.g., a plant definition value) and an inspection robot position (e.g., as one or more plant position values 3614) in response to the position information 3604. Example and non-limiting position information 3604 includes relative and/or absolute position information—for example a distance from a reference position (e.g., a starting point, stopping point, known object in proximity to the plant, industrial system, and/or inspection surface, or the like). In certain embodiments, position information 3604 is determinable according to a global positioning service (GPS) device, ultra-wide band radio frequency (RF) signaling, LIDAR or other direct distance measurement devices (including line-of-sight and/or sonar devices), aggregating from reference points (e.g., routers, transmitters, know devices in communication with the inspection robot, or the like), utilizing known obstacles as a reference point, encoders (e.g., a wheel counter or other device), barometric sensors (e.g., altitude determination), utilization of a known sensed value correlated to position (e.g., sound volume or frequency, temperature, vibration, etc.), and/or utilizing an inertial measurement unit (e.g., measuring and/or calculating utilizing an accelerometer and/or gyroscope). In certain embodiments, values may be combined to determine the position information 3604—for example in 3-D space without further information, four distance measurements are ordinarily required to determine a specific position value. However, utilizing other information, such as a region of the inspection surface that the inspection robot is operating on (e.g., which pipe the inspection robot is climbing), an overlay of the industrial surface over the measurement space, a distance traveled from a reference point, a distance to a reference point, etc., the number of distance measurements required to determine a position value can be reduced to three, two, one, or even eliminated and still position information 3604 is determinable. In certain embodiments, the position definition circuit 3602 determines the position information 3604 completely or partially on dead reckoning (e.g., accumulating speed and direction from a known position, and/or direction combined with a distance counter), and/or corrects the position information 3604 when feedback based position data (e.g., a true detected position) is available.

Example and non-limiting plant position values 3608 include the robot position information 3604 integrated within a definition of the plant space, such as the inspection surface, a defined map of a portion of the plant or industrial system, and/or the plant position definition 3606. In certain embodiments, the plant space is predetermined, for example as a map interpreted by the controller 802 and/or pre-loaded in a data file describing the space of the plant, inspection surface, and/or a portion of the plant or industrial surface. In certain embodiments, the plant position definition 3606 is created in real-time by the position definition circuit 3602—for example by integrating the position information 3604 traversed by the inspection robot, and/or by creating a virtual space that includes the position information 3604 traversed by the inspection robot. For example, the position definition circuit 3602 may map out the position information 3604 over time, and create the plant position definition 3606 as the aggregate of the position information 3604, and/or create a virtual surface encompassing the aggregated plant position values 3614 onto the surface. In certain embodiments, the position definition circuit 3602 accepts a plant shape value 3608 as an input (e.g., a cylindrical tank being inspected by the inspection robot having known dimensions), deduces the plant shape value 3608 from the aggregated position information 3604 (e.g., selecting from one of a number of simple or available shapes that are consistent with the aggregated plant position definition 3606), and/or prompts a user (e.g., an inspection operator and/or a client for the data) to select one of a number of available shapes to determine the plant position definition 3606.

The example apparatus 3600 includes a data positioning circuit 3610 that interprets inspection data 3612 and correlates the inspection data 3612 to the position information 3604 and/or to the plant position values 3614. Example and non-limiting inspection data 3612 includes: sensed data by an inspection robot; environmental parameters such as ambient temperature, pressure, time-of-day, availability and/or strength of wireless communications, humidity, etc.; image data, sound data, and/or video data taken during inspection operations; metadata such as an inspection number, customer number, operator name, etc.; setup parameters such as the spacing and positioning of sleds, payloads, mounting configuration of sensors, and the like; calibration values for sensors and sensor processing; and/or operational parameters such as fluid flow rates, voltages, pivot positions for the payload and/or sleds, inspection robot speed values, downforce parameters, etc. In certain embodiments, the data positioning circuit 3610 determines the positional information 3604 corresponding to inspection data 3612 values, and includes the positional information 3604 as an additional parameter with the inspection data 3612 values and/or stores a correspondence table or other data structure to relate the positional information 3604 to the inspection data values 3612. In certain embodiments, the data positioning circuit 3610 additionally or alternatively determines the plant position definition 3606, and includes a plant position value 3614 (e.g., as a position within the plant as defined by the plant position definition 3606) as an additional parameter with the inspection data 3612 values and/or stores a correspondence table or other data structure to relate the plant position values 3614 to the inspection data values 3612. In certain embodiments, the data positioning circuit 3610 creates position informed data 3616, including one or more, or all, aspects of the inspection data 3612 correlated to the position information 3604 and/or to the plant position values 3614.

In certain embodiments, for example where dead reckoning operations are utilized to provide position information 3604 over a period of time, and then a corrected position is available through a feedback position measurement, the data positioning circuit 3602 updates the position informed inspection data 3616—for example re-scaling the data according to the estimated position for values according to the changed feedback position (e.g., where the feedback position measurement indicates the inspection robot traveled 25% further than expected by dead reckoning, position information 3604 during the dead reckoning period can be extended by 25%) and/or according to rationalization determinations or externally available data (e.g., where over 60 seconds the inspection robot traverses 16% less distance than expected, but sensor readings or other information indicate the inspection robot may have been stuck for 10 seconds, then the position information 3604 may be corrected to represent the 10-seconds of non-motion rather than a full re-scale of the position informed inspection data 3616). In certain embodiments, dead reckoning operations may be corrected based on feedback measurements as available, and/or in response to the feedback measurement indicating that the dead reckoning position information exceeds a threshold error value (e.g., 1%, 0.1%, 0.01%, etc.).

It can be seen that the operations of apparatus 3600 provide for position-based inspection information. Certain systems, apparatuses, and procedures throughout the present disclosure utilize and/or can benefit from position informed inspection data 3616, and all such embodiments are contemplated herein. Without limitation to any other disclosures herein, certain aspects of the present disclosure include: providing a visualization of inspection data 3612 in position information 3604 space and/or in plant position value 3614 space; utilizing the position informed inspection data 3616 in planning for a future inspection on the same or a similar plant, industrial system, and/or inspection surface (e.g., configuring sled number and spacing, inspection robot speed, inspection robot downforce for sleds and/or sensors, sensor calibrations, planning for traversal and/or avoidance of obstacles, etc.); providing a format for storing a virtual mark (e.g., replacing a paint or other mark with a virtual mark as a parameter in the inspection data 3612 correlated to a position); determining a change in a plant condition in response to the position informed inspection data 3616 (e.g., providing an indication that expected position information 3604 did not occur in accordance with the plant position definition 3606—for example indicating a failure, degradation, or unexpected object in a portion of the inspected plant that is not readily visible); and/or providing a health indicator of the inspection surface (e.g., depicting regions that are nominal, passed, need repair, will need repair, and/or have failed). In certain embodiments, it can be seen that constructing the position informed inspection data 3616 using position information 3604 only, including dead reckoning based position information 3604, nevertheless yields many of the benefits of providing the position informed inspection data 3616. In certain further embodiments, the position informed inspection data 3616 is additionally or alternatively constructed utilizing the plant position definition 3606, and/or the plant position values 3614.

Figure 37:
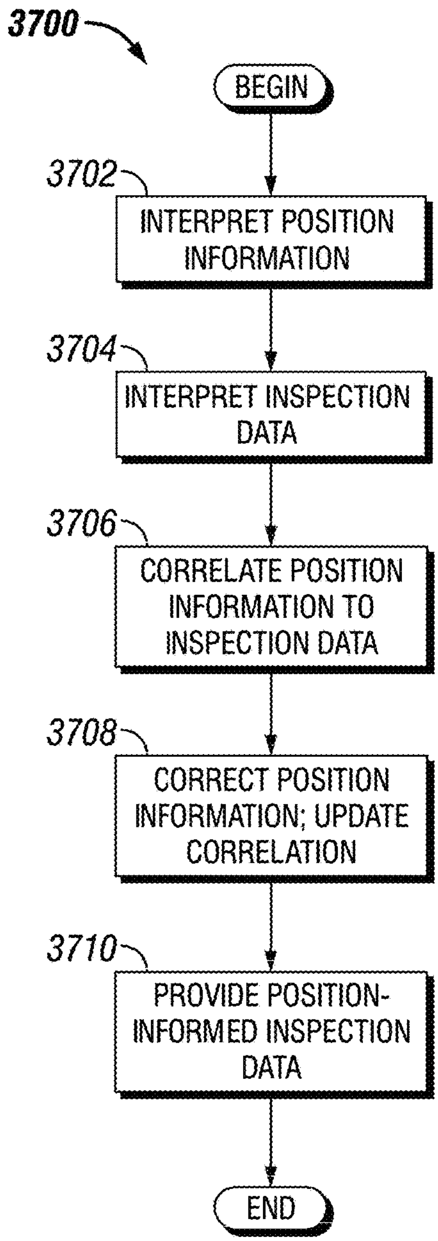
FIG. 37 is a schematic flow diagram of a procedure to provide position informed inspection data.

Referencing FIG. 37, an example procedure 3700 to inspect a plant, industrial system, and/or inspection surface utilizing position information is depicted. The example procedure 3700 includes an operation 3702 to interpret position information, an operation 3704 to interpret inspection data, and an operation 3706 correlate the inspection data to the position information. The example procedure 3700 further includes an operation 3708 to correct the position information (e.g., updating a dead reckoning-based position information), and to update the correlation of the inspection data to the position information. The example procedure further includes an operation 3710 to provide position informed inspection data in response to the correlated inspection data. In certain embodiments, operation 3706 is additionally or alternatively performed on the position informed inspection data, where the position informed inspection data is corrected, and operation 3710 includes providing the position informed inspection data. In certain embodiments, one or more operations of a procedure 3700 are performed by a controller 802.

Figure 38:
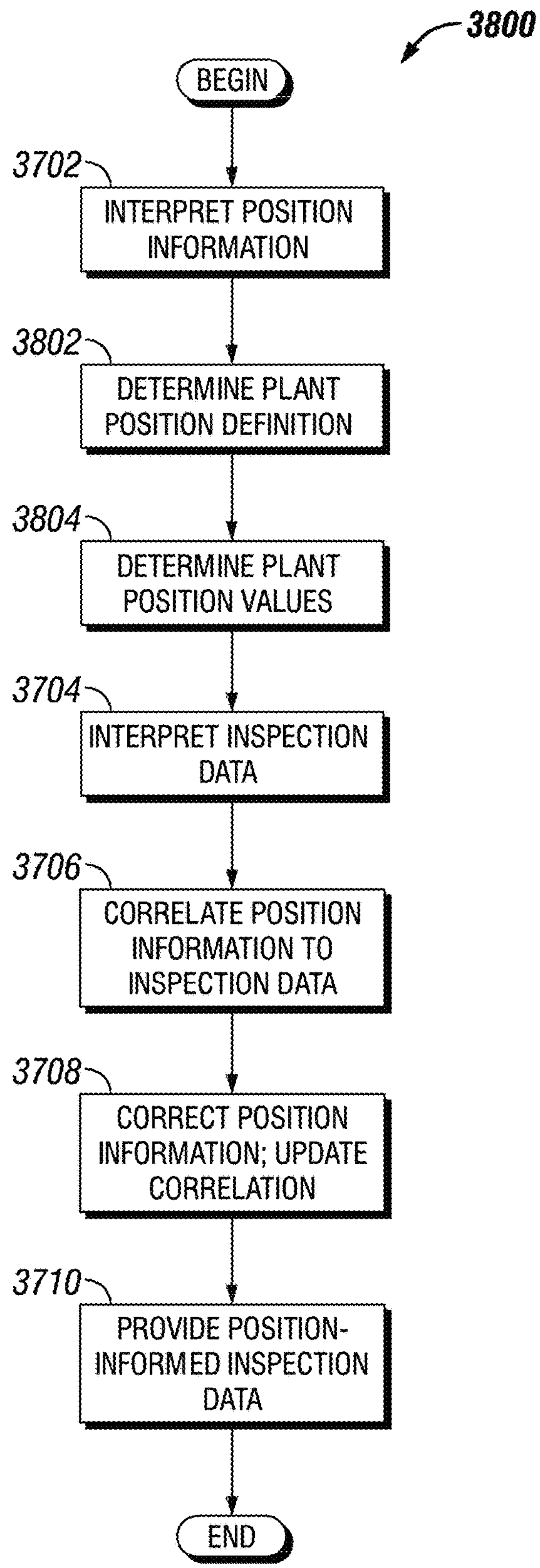
FIG. 38 is a schematic flow diagram of another procedure to provide position informed inspection data.

Referencing FIG. 38, an example procedure 3800 to inspect a plant, industrial system, and/or inspection surface utilizing position information is depicted. In addition to operations of procedure 3700, example procedure 3800 includes an operation 3802 to determine a plant definition value, and an operation 3804 to determine plant position values in response to the position information and the plant position definition. Operation 3706 further includes an operation to correlate the inspection data with the position information and/or the plant position values. In certain embodiments, one or more operations of procedure 3800 are performed by a controller 802.

Figure 39:
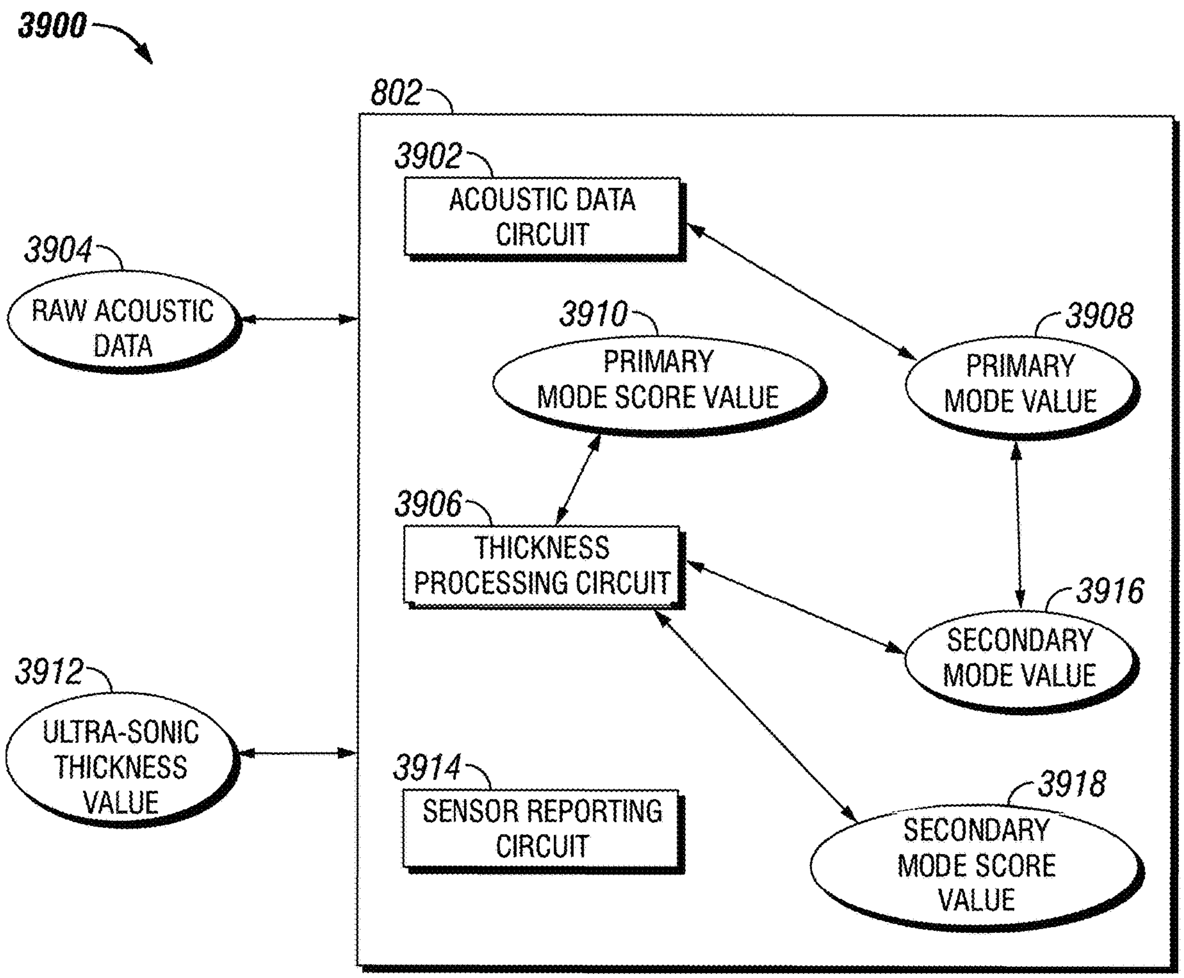
FIG. 39 is a schematic block diagram of an apparatus for providing an ultra-sonic thickness value.

Referencing FIG. 39, an example apparatus 3900 for processing ultra-sonic sensor readings is depicted schematically. The example apparatus 3900 includes a controller 802 having an acoustic data circuit 3902 that determines return signals from the tested surface—for example a transducer in the sensor 2202 sends a sound wave through the couplant chamber to the inspection surface, and the raw acoustic data 3904 includes primary (e.g., from the surface inspection surface), secondary (e.g., from a back wall, such as a pipe wall or tank wall) and/or tertiary (e.g., from imperfections, cracks, or defects within the wall) returns from the inspection surface.

In certain embodiments, the controller 802 includes a thickness processing circuit 3906 that determines a primary mode value 3908 in response to the raw acoustic data 3904. The primary mode value 3908, in certain embodiments, includes a determination based upon a first return and a second return of the raw acoustic data 3904, where a time difference between the first return and the second return indicates a thickness of the inspection surface material (e.g., a pipe). The foregoing operations of the thickness processing circuit 3906 are well known in the art, and are standard operations for ultra-sonic thickness testing. However, the environment for the inspection robot is not typical, and certain further improvements to operations are described herein. An inspection robot, in certain embodiments, performs a multiplicity of ultra-sonic thickness determinations, often with simultaneous (or nearly) operations from multiple sensors. Additionally, in certain embodiments, it is desirable that the inspection robot operate: autonomously without the benefit of an experienced operator; without high-end processing in real-time to provide substantial displays to a user to determine whether parameters are not being determined properly; and/or with limited communication resources utilized for post-processing that is fast enough that off nominal operation can be adjusted after significant post-processing.

In certain embodiments, the thickness processing circuit 3906 determines a primary mode score value 3910. In certain embodiments, the thickness processing circuit 3906 determines the primary mode score value 3910 in response to a time of arrival for the primary (e.g., inspection surface face) return from the raw acoustic data 3904. Because the delay time for the sensor is a known and controlled value (e.g., reference FIGS. 28 and 31, and the related description), the return time of the primary return is known with high confidence. Additionally or alternatively, the thickness processing circuit 3906 determines the primary mode score value 3910 in response to the character of the primary return—for example a sharp peak of a known width and/or amplitude. In certain embodiments, the primary mode score value 3910 calculation is calibrated in response to the material of the inspection surface—although known materials such as iron, various types of steel, and other surfaces can utilize nominal calibrations. In certain embodiments, the configuration adjustment 3406 based on lead inspection data 3402 is utilized to calibrate a primary mode score value 3910 calculation for a sensor providing the trailing inspection data 3410. In certain embodiments, determining that the first peak (related to the primary return) meets expected characteristics is sufficient to provide confidence to utilize the primary mode value 3908 as the ultra-sonic thickness value 3912. In certain embodiments, the ultra-sonic thickness value 3912 is the inspection data for the sensor, and/or a part of the inspection data for the sensor.

In certain embodiments, the thickness processing circuit 3906 additionally or alternatively considers the timing of arrival for a secondary return, peak arrival time, and/or peak width of the secondary return (e.g., from the back wall) in determining the primary mode score value 3910. For example, if the secondary return indicates a wall thickness that is far outside of an expected thickness value, either greater or lower, the primary mode score value 3910 may be reduced. In certain embodiments, if the secondary return has a peak characteristic that is distinct from the expected characteristic (e.g., too narrow, not sharp, etc.) then the primary mode score value 3910 may be reduced. Additionally or alternatively, feedback data regarding the sensor may be utilized to adjust the primary mode score value 3910—for example if the sensor is out of alignment with the inspection surface, the sensor (or sled) has lifted off of the inspection surface, a sled position for a sled having an acoustic sensor, and/or if a couplant anomaly is indicated (e.g., couplant flow is lost, a bubble is detected, etc.) then the primary mode score value 3910 may be reduced.

In certain embodiments, for example when the primary mode score value 3910 indicates that the primary mode value 3908 is to be trusted, the controller 802 includes a sensor reporting circuit 3914 that provides the ultra-sonic thickness value 3912 in response to the primary mode value 3908. In certain embodiments, if the primary mode score value 3910 is sufficiently high, the thickness processing circuit 3906 omits operations to determine a secondary mode value 3916. In certain embodiments, the thickness processing circuit 3906 performs operations to determine the secondary mode value 3916 in response to the primary mode score value 3910 is at an intermediate value, and/or if feedback data regarding the sensor indicates off-nominal operation, even when the primary mode score value 3910 is sufficiently high (e.g., to allow for improved post-processing of the inspection data). In certain embodiments, the thickness processing circuit 3906 determines the secondary mode value 3916 at all times, for example to allow for improved post-processing of the inspection data. In certain embodiments, the sensor reporting circuit 3914 provides processed values for the primary mode value 3908 and/or the secondary mode value 3916, and/or the primary mode scoring value 3910 and/or a secondary mode score value 3918, either as the inspection data and/or as stored data to enable post-processing and/or future calibration improvements. In certain embodiments, the sensor reporting circuit 3914 provides the raw acoustic data 3904, either as the inspection data and/or as stored data to enable post-processing and/or future calibration improvements.

The example thickness processing circuit 3906 further determines, in certain embodiments, a secondary mode value 3916. An example secondary mode value 3916 includes values determined from a number of reflected peaks—for example determining which of a number of reflected peaks are primary returns (e.g., from a face of the inspection surface) and which of a number of reflected peaks are secondary returns (e.g., from a back wall of the inspection surface). In certain embodiments, a Fast-Fourier Transform (FFT), wavelet analysis, or other frequency analysis technique is utilized by the thickness processing circuit 3906 to determine the energy and character of the number of reflected peaks. In certain embodiments, the thickness processing circuit 3906 determines a secondary mode score value 3918—for example from the character and consistency of the peaks, and determines an ultra-sonic thickness value 3912 from the peak-to-peak distance of the number of reflected peaks. The operations of the example apparatus 3900, which in certain embodiments favor utilization of the primary mode value 3908, provide for rapid and high confidence determinations of the ultra-sonic thickness value 3912 in an environment where a multiplicity of sensors are providing raw acoustic data 3904, computing resources are limited, and a large number of sensor readings are to be performed without supervision of an experienced operator.

In certain embodiments, any one or more of the ultra-sonic thickness value 3912, the primary mode value 3908, the secondary mode value 3916, the primary mode score value 3910, and/or the secondary mode score value 3918 are provided or stored as position informed inspection data 3616. The correlation of the values 3912, 3908, 3916, 3910, and/or 3918 with position data as position informed inspection data 3616 provides for rapid visualizations of the characteristics of the inspection surface, and provides for rapid convergence of calibration values for inspection operations on the inspection surface and similar surfaces. In certain embodiments, the raw acoustic data 3904 is provided or stored as position informed inspection data 3616.

Figure 40:
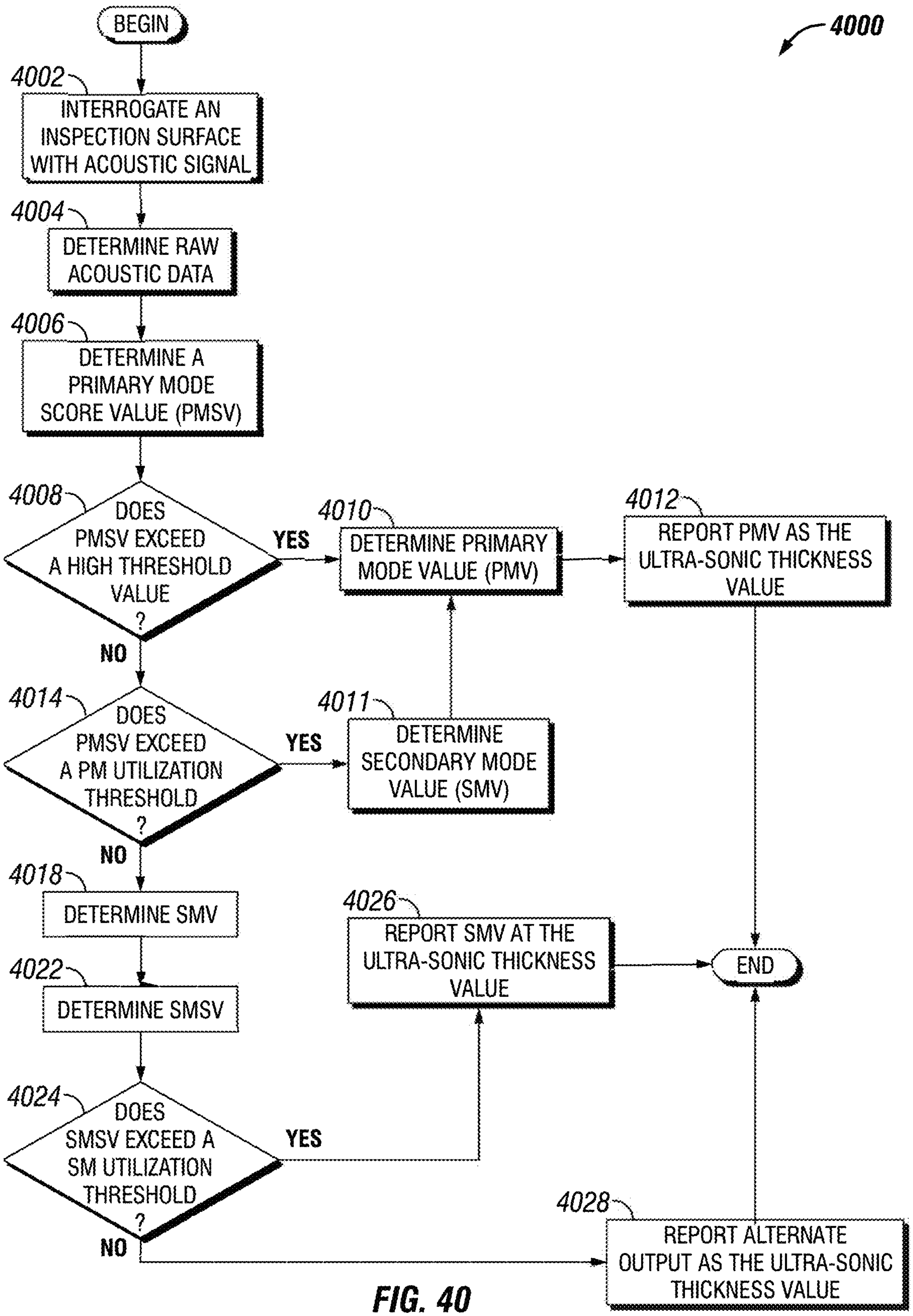
FIG. 40 is a schematic flow diagram of a procedure to provide an ultra-sonic thickness value.

Referencing FIG. 40, an example procedure 4000 to process ultra-sonic sensor readings is depicted schematically. In certain embodiments, procedure 4000 processes ultra-sonic sensor readings for an inspection robot having a number of ultra-sonic sensor mounted thereon. The example procedure 4000 includes an operation 4002 to interrogate an inspection surface with an acoustic signal (e.g., acoustic impulse from a transducer). The example procedure 4000 further includes an operation 4004 to determine raw acoustic data, such as return signals from the inspection surface. The example procedure 4000 further includes an operation 4006 to determine a primary mode score value in response to a primary peak value, and/or further in response to a secondary peak value, from the raw acoustic data. The example procedure 4000 further includes an operation 4008 to determine whether the primary mode score value exceeds a high threshold value, such as whether the primary mode value is deemed to be reliable without preserving a secondary mode value. In response to the operation 4008 determining the primary mode score value exceeds the high threshold value, the procedure 4000 further includes an operation 4010 to determine the primary mode value, and an operation 4012 to report the primary mode value as an ultra-sonic thickness value. In response to the operation 4008 determining the primary mode score value does not exceed the high threshold value, the procedure includes an operation 4014 to determine whether the primary mode score value exceeds a primary mode utilization value. In certain embodiments, in response to the operation 4014 determining the primary mode score value exceeds the primary mode utilization value, the procedure 4000 includes the operation 4010 to determine the primary mode value, an operation 4011 to determine the secondary mode value, and the operation 4012 to provide the primary mode value as the ultra-sonic thickness value. In response to the operation 4014 determining the primary mode score value does not exceed the primary mode utilization value, the procedure 4000 includes the operation 4018 to determine the secondary mode value and an operation 4022 to determine the secondary mode score value. The procedure 4000 further includes an operation 4024 to determine whether the secondary mode score value exceeds a secondary mode utilization value, and in response to operation 4024 determining the secondary mode score value exceeds the secondary mode utilization value, the procedure 4000 includes an operation 4026 to provide the secondary mode value as the ultra-sonic thickness value. In response to the operation 4024 determining the secondary mode score value does not exceed the secondary mode utilization value, the procedure 4000 includes an operation 4028 to provide an alternate output as the ultra-sonic thickness value. In certain embodiments, operation 4028 includes providing an error value (e.g., data not read), one of the primary mode value and the secondary mode value having a higher score, and/or combinations of these (e.g., providing a "best" value, along with an indication that the ultra-sonic thickness value for that reading may not be reliable).

As with all schematic flow diagrams and operational descriptions throughout the present disclosure, operations of procedure 4000 may be combined or divided, in whole or part, and/or certain operations may be omitted or added. Without limiting the present description, it is noted that operation 4022 to determine the secondary mode score value and operation 4024 to determine whether the secondary mode score value exceeds a utilization threshold may operate together such that operation 4018 to determine the secondary mode score is omitted. For example, where the secondary mode score value indicates that the secondary mode value is not sufficiently reliable to use as the ultra-sonic thickness value, in certain embodiments, processing to determine the secondary mode value are omitted. In certain embodiments, one or more of operations 4014 and/or 4008 to compare the primary mode score value to certain thresholds may additionally or alternatively include comparison of the primary mode score value to the secondary mode score value, and/or utilization of the secondary mode value instead of the primary mode value where the secondary mode score value is higher, or sufficiently higher, than the primary mode score value. In certain embodiments, both the primary mode value and the secondary mode value are determined and stored or communicated, for example to enhance future calibrations and/or processing operations, and/or to enable post-processing operations. In certain embodiments, one or more operations of procedure 4200 are performed by a controller 802.

Figure 43:
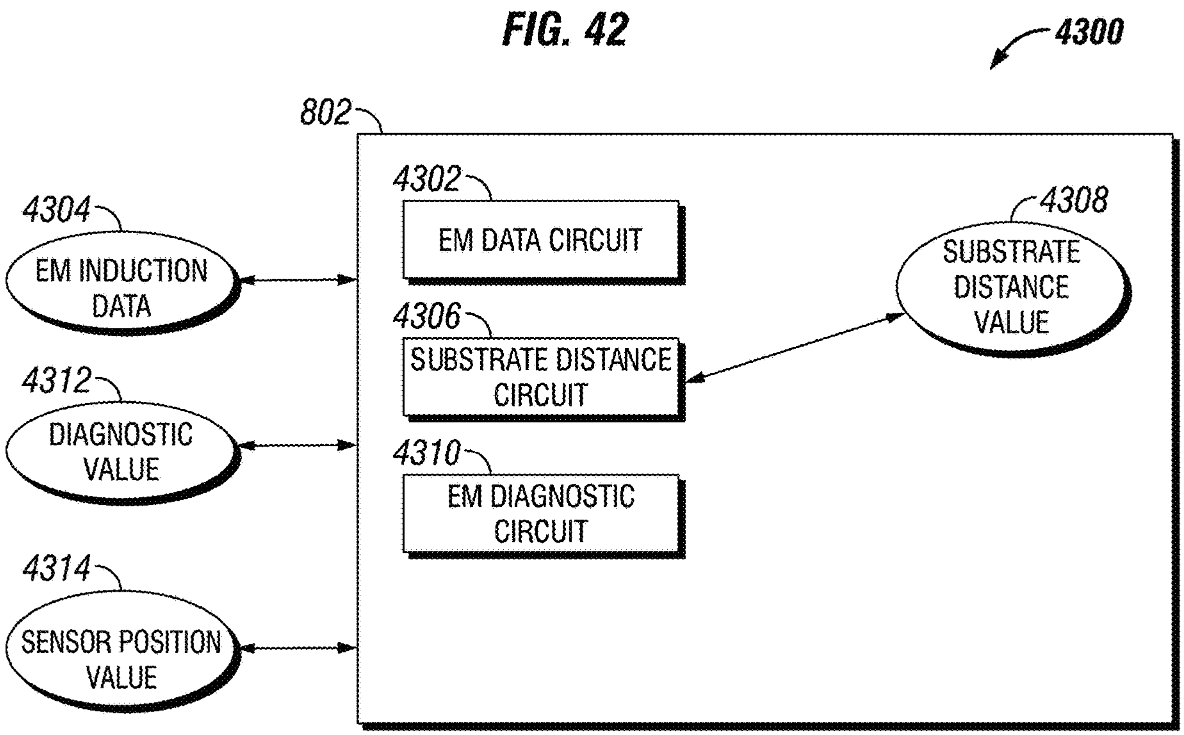
FIG. 43 is a schematic block diagram of an apparatus for utilizing EM induction data.

Referencing FIG. 43, an example apparatus 4300 for operating a magnetic induction sensor for an inspection robot is depicted. In certain embodiments, the magnetic induction sensor is mounted on a sled 1, and/or on a payload 2. In certain embodiments, the magnetic induction sensor is a lead sensor as described throughout the present disclosure, although operations of the apparatus 4300 for operating the magnetic induction sensor for the inspection robot include the magnetic induction sensor positioned on any payload and/or any logistical inspection operation runs. In certain embodiments, the magnetic induction sensor is a lead sensor and positioned on a same sled as an ultra-sonic or other sensor. In certain embodiments, the magnetic induction sensor is included on a payload 2 with other sensors, potentially including an ultra-sonic sensor, and may be on a same sled 1 or an offset sled (e.g., one or more magnetic sensors on certain sleds 1 of a payload 2, and ultra-sonic or other sensors on other sleds 1 of the payload 2).

An example apparatus 4300 includes an EM data circuit 4302 structured to interpret EM induction data 4304 provided by a magnetic induction sensor. The EM induction data 4304 provides an indication of the thickness of material, including coatings, debris, non-ferrous metal spray material (e.g., repair material), and/or damage, between the sensor and a substrate ferrous material, such as a pipe, tube, wall, tank wall, or other material provided as a substrate for an inspection surface. The foregoing operations of the EM data circuit 4302 and magnetic induction sensor are well known in the art, and are standard operations for determining automotive paint thickness or other applications. However, the environment for the inspection robot is not typical, and certain further improvements to operations are described herein.

In certain embodiments, an inspection robot includes sled configurations, including any configurations described throughout the present disclosure, to ensure expected contact, including proximity and/or orientation, between the inspection surface and the magnetic induction sensor. Accordingly, a magnetic induction sensor included on a sled 1 of the inspection robot in accordance with the present disclosure provides a reliable reading of distance to the substrate ferrous material. In certain embodiments, the apparatus 4300 includes a substrate distance circuit 4306 that determines a substrate distance value 4308 between the magnetic induction sensor and a ferrous substrate of the inspection surface. Additionally or alternatively, the substrate distance value 4308 may be a coating thickness, a delay line correction factor (e.g., utilized by a thickness processing circuit 3906), a total debris-coating distance, or other value determined in response to the substrate distance value 4308.

In certain embodiments, the controller 802 further includes an EM diagnostic circuit 4310 that supports one or more diagnostics in response to the substrate distance value 4308. An example diagnostic includes a diagnostic value 4312 (e.g., a rationality diagnostic value, or another value used for a diagnostic check), wherein the EM diagnostic circuit 4310 provides information utilized by the thickness processing circuit 3906, for example to a thickness processing circuit 3906. For example, the layer of coating, debris, or other material between the substrate of the inspection surface and an ultra-sonic sensor can affect the peak arrival times. In a further example, the layer of coating, debris, or other material between the substrate of the inspection surface and an ultra-sonic sensor can act to increase the effective delay line between the transducer of the ultra-sonic sensor and the inspection surface. In certain embodiments, the thickness processing circuit 3906 utilizes the rationality diagnostic value 4312 to adjust expected arrival times for the primary return and/or secondary return values, and/or to adjust a primary mode scoring value and/or a secondary mode score value.

In certain embodiments, the EM diagnostic circuit 4310 operates to determine a sensor position value 4314. In certain embodiments, the sensor position value 4314 provides a determination of the sensor distance to the substrate. In certain embodiments, the sensor position value 4314 provides a rationality check whether the sensor is positioned in proximity to the inspection surface. For example, an excursion of the EM induction data 4304 and/or substrate distance value 4308 may be understood to be a loss of contact of the sensor with the inspection surface, and/or may form a part of a determination, combined with other information such as an arm 20, sled 1, or payload 2 position value, a value of any of the pivots 16, 17, 18, and/or information from a camera or other visual indicator, to determine that a sled 1 including the magnetic induction sensor, and/or the magnetic induction sensor, is not properly positioned with regard to the inspection surface. Additionally or alternatively, a thickness processing circuit 3906 may utilize the sensor position value 4314 to adjust the primary mode scoring value and/or the secondary mode score value—for example to exclude or label data that is potentially invalid. In certain embodiments, the sensor position value 4314 is utilized on a payload 2 having both an ultra-sonic sensor and a magnetic induction sensor, and/or on a sled 1 having both an ultra-sonic sensor and a magnetic induction sensor (e.g., where the sensor position value 4314 is likely to provide direct information about the ultra-sonic sensor value). In certain embodiments, the sensor position value 4314 is utilized when the magnetic induction sensor is not on a same payload 2 or sled 1 with an ultra-sonic sensor—for example by correlating with position data to identify a potential obstacle or other feature on the inspection surface that may move the sled 1 out of a desired alignment with the inspection surface. In certain embodiments, the sensor position value 4314 is utilized when the magnetic induction sensor is not on a same payload 2 or sled 1 with an ultra-sonic sensor, and is combined with other data in a heuristic check to determine if the ultra-sonic sensor (and/or related sled or payload) experiences the same disturbance at the same location that the magnetic induction sensor (and/or related sled or payload) experienced.

In certain embodiments, the substrate distance value 4308 is provided to a thickness processing circuit 3906, which utilizes the substrate distance value 4308 to differentiate between a utilization of the primary mode value 3908 and/or the secondary mode value 3916. For example, the thickness of a coating on the inspection surface can affect return times and expected peak times. Additionally or alternatively, where the speed of sound through the coating is known or estimated, the peak analysis of the primary mode value 3908 and/or the secondary mode value 3916 can be adjusted accordingly. For example, the secondary mode value 3916 will demonstrate additional peaks, which can be resolved with a knowledge of the coating thickness and material, and/or the speed of sound of the coating material can be resolved through deconvolution and frequency analysis of the returning peaks if the thickness of the coating is known. In another example, the primary mode value 3908 can be adjusted to determine a true substrate first peak response (which will, in certain embodiments, occur after a return from the coating surface), which can be resolved with a knowledge of the coating thickness and/or the speed of sound of the coating material. In certain embodiments, a likely composition of the coating material is known—for example based upon prior repair operations performed on the inspection surface. In certain embodiments, as described, sound characteristics of the coating material, and/or effective sound characteristics of a pseudo-material (e.g., a mix of more than one material modeled as an aggregated pseudo-material) acting as the aggregate of the coating, debris, or other matter on the substrate of the inspection surface, can be determined through an analysis of the ultra-sonic data and/or coupled with knowledge of the thickness of the matter on the substrate of the inspection surface.

Figure 44:
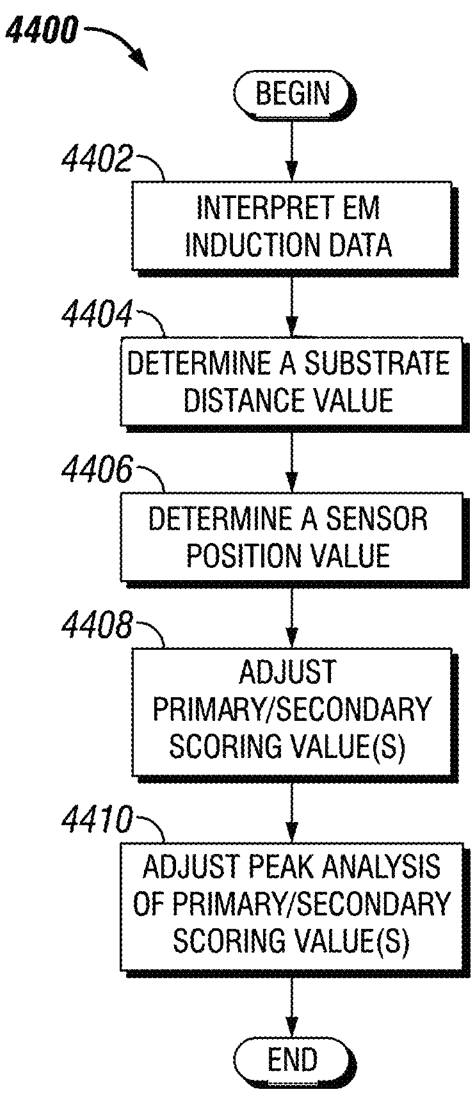
FIG. 44 is a schematic flow diagram of a procedure to utilize EM induction data.

Referencing FIG. 44, an example procedure 4400 for operating and analyzing a magnetic induction sensor on an inspection robot is schematically depicted. The example procedure 4400 includes an operation 4402 to interpret EM induction data provided by a magnetic induction sensor, and an operation 4404 to determine a substrate distance value between the magnetic induction sensor and a ferrous substrate of the inspection surface. The example procedure 4400 further includes an operation 4406 to determine a sensor position value, such as: a sensor distance from a substrate of the inspection surface; and/or a sensor pass/fail orientation, alignment or position check. In certain embodiments, the example procedure 4400 further includes an operation 4408 to adjust a primary mode scoring value and/or a secondary mode score value in response to the substrate distance value and/or the sensor position value. In certain embodiments, operation 4408 includes an operation to set the primary mode scoring value and/or secondary mode score value to a value that excludes the primary mode value and/or the secondary mode value from being used, and/or labels the primary mode value and/or the secondary mode value as potentially erroneous. In certain embodiments, operation 4410 determines a reliability of the primary mode value and/or the secondary mode value—for example where sonic properties of the matter between the ultra-sonic sensor and the inspection surface substrate are determined with a high degree of reliability—and the reliability determined from operation 4410 for the primary mode value and/or the secondary mode value is utilized to adjust the primary mode scoring value and/or the secondary mode score value. An example procedure 4400 further includes an operation 4410 to adjust a peak analysis of a primary mode value and/or a secondary mode value in response to the substrate distance value and/or the sensor position value. In certain embodiments, one or more operations of procedure 4400 are performed by a controller 802.

Figure 45:
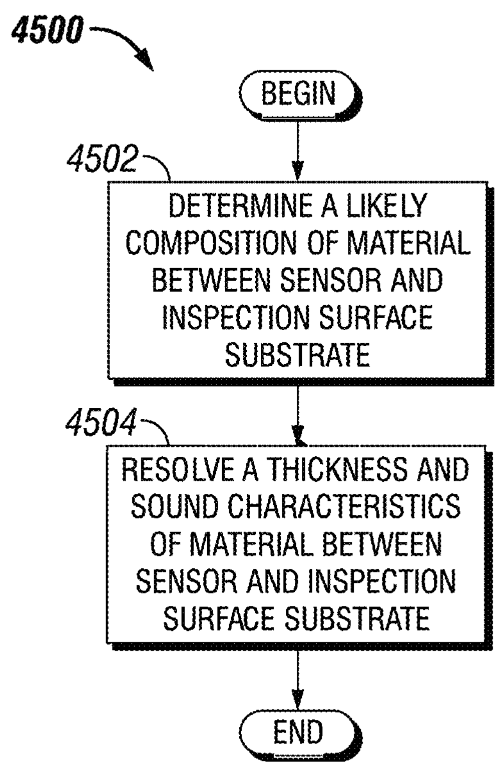
FIG. 45 is a schematic flow diagram of a procedure to determine a coating thickness and composition.

Referencing FIG. 45, an example procedure 4410 to adjust a peak analysis of a primary mode value and/or a secondary mode value is schematically depicted. The example procedure 4410 includes an operation 4504 to resolve a thickness and a sound characteristic of material positioned between a substrate of an inspection surface and an ultra-sonic sensor. In certain embodiments, operation 4504 includes a deconvolution of peak values including a frequency analysis of peaks observed in view of the substrate distance value and/or the sensor position value. In certain embodiments, the example procedure 4410 further includes an operation 4502 to determine a likely composition of the coating material—for example in response to a defined parameter by an inspection operator, and/or a previously executed repair operation on the inspection surface. In certain embodiments, operations of any of procedure 4400 and/or procedure 4410 are performed in view of position information of the magnetic induction sensor, and/or correlating position information of the ultra-sonic sensor. In certain embodiments, one or more operations of procedure 4410 are performed by a controller 802.

Figure 46:
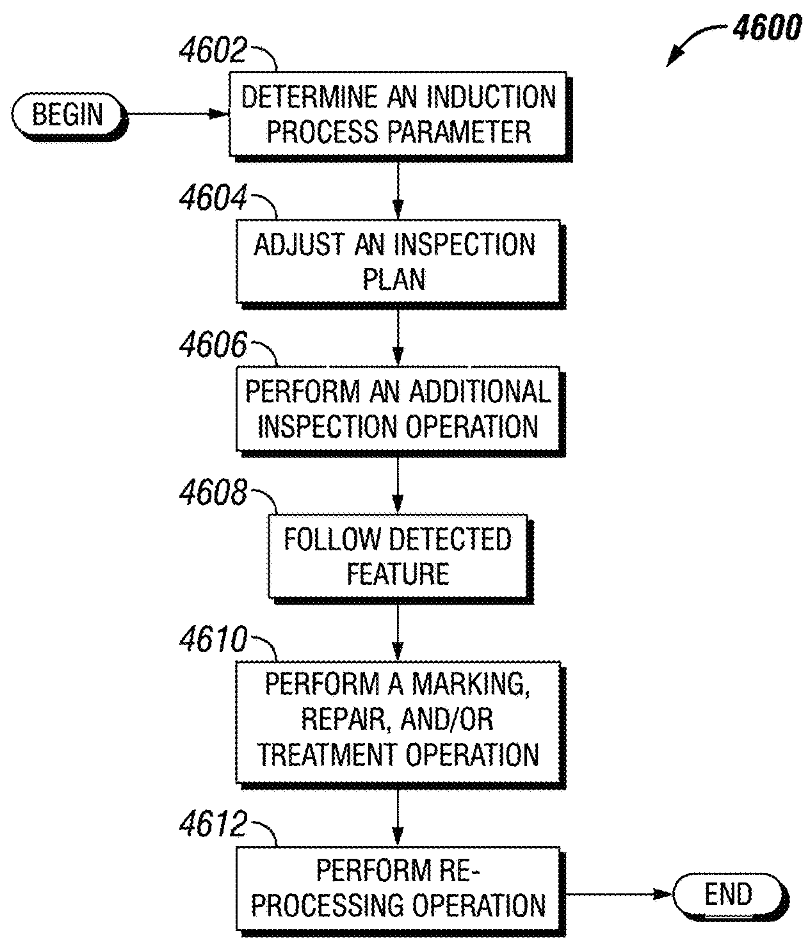
FIG. 46 is a schematic flow diagram of a procedure to re-process sensor data based on an induction process parameter.

Referencing FIG. 46, an example procedure 4600 to adjust an inspection operation in real-time in response to a magnetic induction sensor is schematically depicted. In certain embodiments, example procedure 4600 includes an operation 4602 to determine an induction processing parameter, such as a substrate distance value, a sensor position value, and/or a rationality diagnostic value. In certain embodiments, the example procedure 4600 includes an operation 4604 to adjust an inspection plan in response to the induction processing parameter. Example and non-limiting operations 4604 to an inspection plan include: adjusting a sensor calibration value (e.g., for an ultra-sonic sensor, a temperature sensor, etc.) for a sensor that may be affected by the coating, debris, or other matter between the magnetic induction sensor and a substrate of the inspection surface; adjusting an inspection resolution for one or more sensors for a planned inspection operation; adjusting a planned inspection map display for an inspection operation, and/or including adjusting sensors, sled positions, and/or an inspection robot trajectory to support the planned inspection map display; adjusting an inspection robot trajectory (e.g., locations, paths, number of runs, and/or movement speed on the inspection surface); adjusting a number, type, and/or positioning (e.g., sled numbers, placement, and/or payload positions) for sensors for an inspection operation; adjusting a wheel magnet strength and/or wheel configuration of an inspection robot in response to the induction processing parameter (e.g., adjusting for an expected distance to a ferrous material, configuring the wheels to manage debris, etc.); adjusting a sled ramp configuration (e.g., sled ramp leading and/or following slope, shape, and/or depth); and/or adjusting a down force for a sled and/or sensor. Operations 4604 may be performed in real-time, such as a change of an inspection plan during inspection operations, and/or at design or set-up time, such as a change of a configuration for the inspection robot or any other aspects described herein before an inspection run, between inspection runs, or the like.

In certain embodiments, the example procedure 4600 includes an operation 4606 to perform an additional inspection operation in response to the induction processing parameter. For example, operation 4606 may include operations such as: inspecting additional portions of the inspection surface and/or increasing the size of the inspection surface (e.g., to inspect other portions of an industrial system, facility, and/or inspection area encompassing the inspection surface); to activate trailing payloads and/or a rear payload to perform the additional inspection operation; re-running an inspection operation over an inspection area that at least partially overlaps a previously inspected area; and/or performing a virtual additional inspection operation—for example re-processing one or more aspects of inspection data in view of the induction processing parameter.

In certain embodiments, the example procedure 4600 includes an operation 4608 to follow a detected feature, for example activating a sensor configured to detect the feature as the inspection robot traverses the inspection surface, and/or configuring the inspection robot to adjust a trajectory to follow the feature (e.g., by changing the robot trajectory in real-time, and/or performing additional inspection operations to cover the area of the feature). Example and non-limiting features include welds, grooves, cracks, coating difference areas (e.g., thicker coating, thinner coating, and/or a presence or lack of a coating). In certain embodiments, the example procedure 4600 includes an operation 4610 to perform at least one of a marking, repair, and/or treatment operation, for example marking features (e.g., welds, grooves, cracks, and/or coating difference areas), and/or performing a repair and/or treatment operation (e.g., welding, applying an epoxy, applying a cleaning operation, and/or applying a coating) appropriate for a feature. In certain embodiments, operation 4610 to perform a marking operation includes marking the inspection surface in virtual space—for example as a parameter visible on an inspection map but not physically applied to the inspection surface.

In certain embodiments, the example procedure 4600 includes an operation 4612 to perform a re-processing operation in response to the induction processing parameter. For example, and without limitation, acoustic raw data, primary mode values and/or primary mode score values, and/or secondary mode values and/or secondary mode score values may be recalculated over at least a portion of an inspection area in response to the induction processing parameter. In certain embodiments, ultra-sonic sensor calibrations may be adjusted in a post-processing operation to evaluate, for example, wall thickness and/or imperfections (e.g., cracks, deformations, grooves, etc.) utilizing the induction processing parameter(s).

Operations for procedure 4600 are described in view of an induction processing parameter for clarity of description. It is understood that a plurality of induction processing parameters, including multiple parameter types (e.g., coating presence and/or coating thickness) as well as a multiplicity of parameter determinations (e.g., position based induction processed values across at least a portion of the inspection surface) are likewise contemplated herein. In certain embodiments, one or more operations of procedure 4600 are performed by a controller 802.

Figure 47:
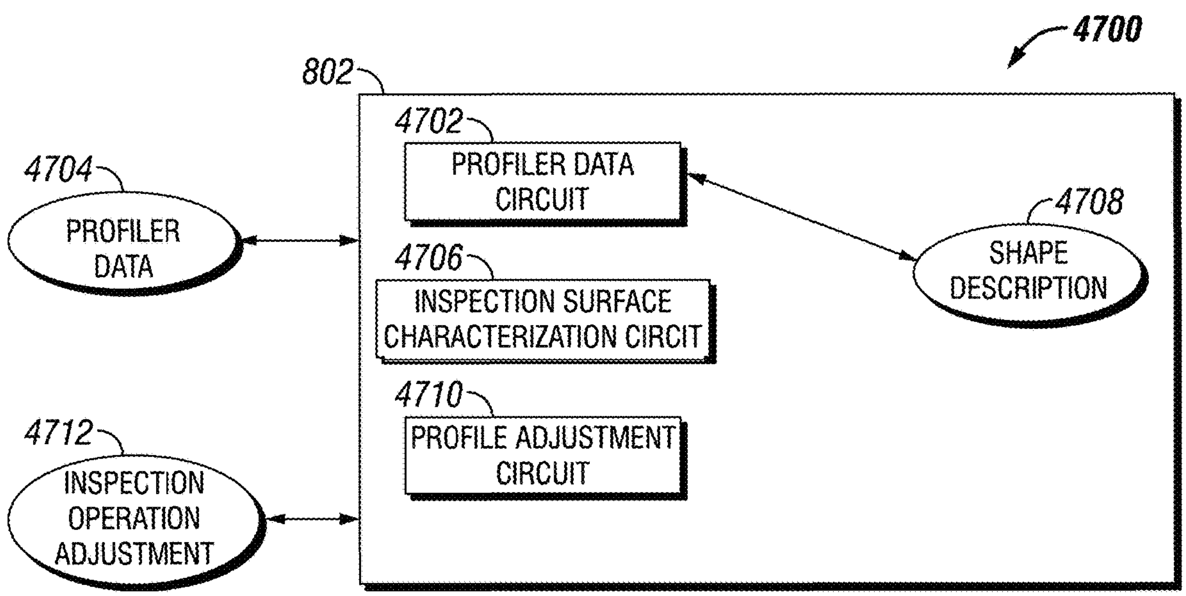
FIG. 47 is a schematic block diagram of a procedure to utilize a shape description.

Referencing FIG. 47, an example apparatus 4700 for utilizing a profiling sensor on an inspection robot is schematically depicted. Example and non-limiting profiling sensors include a laser profiler (e.g., a high spatial resolution laser beam profiler) and/or a high resolution caliper log. A profiling sensor provides for a spatial description of the inspection surface—for example variations in a pipe 502 or other surface can be detected, and/or a high resolution contour of at least a portion of the inspection surface can be determined. In certain embodiments, a controller 802 includes a profiler data circuit 4702 that interprets profiler data 4704 provided by the profiling sensor. The example controller 802 further includes an inspection surface characterization circuit 4706 that provides a characterization of the shape of the inspection surface in response to the profiler data—for example as a shape description 4708 of the inspection surface, including anomalies, variations in the inspection surface geometry, and/or angles of the inspection surface (e.g., to determine a perpendicular angle to the inspection surface). The example controller 802 further includes a profile adjustment circuit 4710 that provides an inspection operation adjustment 4712 in response to the shape description 4708. Example and non-limiting inspection operation adjustments 4712 include: providing an adjustment to a sled, payload, and/or sensor orientation within a sled (e.g., to provide for a more true orientation due to a surface anomaly, including at least changing a number and configuration of sleds on a payload, configuring a payload to avoid an obstacle, adjusting a down force of a sled, arm, sensor, and/or payload, and/or adjusting a shape of a sled bottom surface); a change to a sensor resolution value (e.g., to gather additional data in the vicinity of an anomaly or shape difference of the inspection surface); a post-processing operation (e.g., re-calculating ultra-sonic and/or magnetic induction data—for example in response to a shape of the inspection surface, and/or in response to a real orientation of a sensor to the inspection surface—such as correcting for oblique angles and subsequent sonic and/or magnetic effects); a marking operation (e.g., marking an anomaly, shape difference, and/or detected obstacle in real space—such as on the inspection surface—and/or in virtual space such as on an inspection map); and/or providing the inspection operation adjustment 4712 as an instruction to a camera to capture an image of an anomaly and/or a shape difference.

Figure 48:
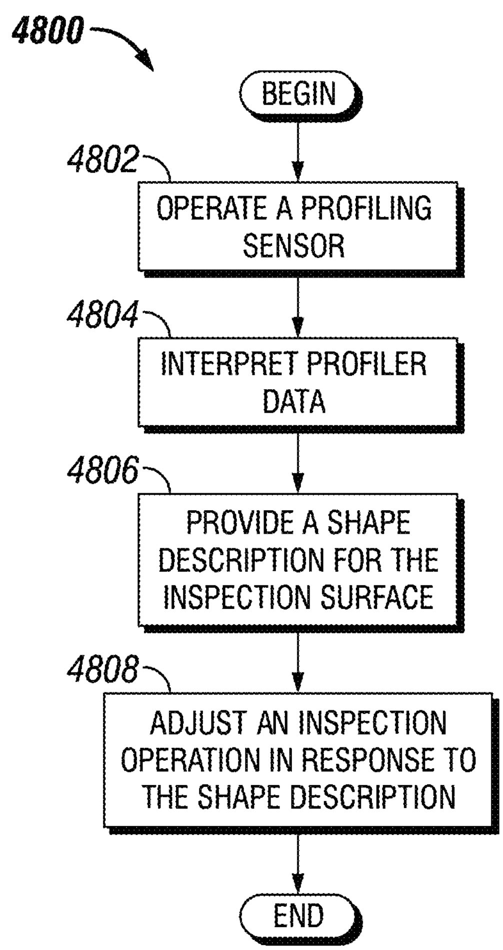
FIG. 48 is a schematic flow diagram of a procedure to adjust an inspection operation in response to profiler data.

Referencing FIG. 48, an example procedure 4800 for utilizing a profiling sensor on an inspection robot is schematically depicted. The example procedure 4800 includes an operation 4802 to operate a profiling sensor on at least a portion of an inspection surface, and an operation 4804 to interpret profiler data in response to the operation 4802. The example procedure 4800 further includes an operation 4806 to characterize a shape of the inspection surface, and/or thereby provide a shape description for the inspection surface, and an operation 4808 to adjust an inspection operation in response to the shape of the inspection surface.

An example system includes: an inspection robot including a plurality of payloads; a plurality of arms, wherein each of the plurality of arms is pivotally mounted to one of the plurality of payloads; a plurality of sleds, wherein each sled is pivotally mounted to one of the plurality of arms; and a plurality of sensors, wherein each sensor is mounted to a corresponding one of the sleds such that the sensor is operationally couplable to an inspection surface in contact with a bottom surface of the corresponding one of the sleds.

Certain further aspects of an example system are described following, any one or more of which may be included in certain embodiments of the example system.

An example system may further include wherein the bottom surface of the corresponding one of the sleds is contoured in response to a shape of the inspection surface.

An example system may further include wherein the inspection surface includes a pipe outer wall, and wherein the bottom surface of the corresponding one of the sleds includes a concave shape.

An example system may further include wherein the bottom surface of the corresponding one of the sleds includes at least one shape selected from the shapes consisting of: a concave shape, a convex shape, and a curved shape.

An example system may further include wherein each of the plurality of arms is further pivotally mounted to the one of the plurality of payloads with two degrees of rotational freedom.

An example system may further include wherein the sleds as mounted on the arms include three degrees of rotational freedom.

An example system may further include a biasing member coupled to each one of the plurality of arms, and wherein the biasing member provides a biasing force to corresponding one of the plurality of sleds, wherein the biasing force is directed toward the inspection surface.

An example system may further include wherein each of the plurality of payloads has a plurality of the plurality of arms mounted thereon.

An example system includes an inspection robot, and a plurality of sleds mounted to the inspection robot; a plurality of sensors, wherein each sensor is mounted to a corresponding one of the sleds such that the sensor is operationally couplable to an inspection surface in contact with a bottom surface of the corresponding one of the sleds; and a couplant chamber disposed within each of the plurality of sleds, each couplant chamber interposed between a transducer of the sensor mounted to the sled and the inspection surface.

Certain further aspects of an example system are described following, any one or more of which may be included in certain embodiments of the example system.

An example system may further include wherein each couplant chamber includes a cone, the cone including a cone tip portion at an inspection surface end of the cone, and a sensor mounting end opposite the cone tip portion, and wherein the cone tip portion defines a couplant exit opening.

An example system may further include a couplant entry for the couplant chamber, wherein the couplant entry is positioned between the cone tip portion and the sensor mounting end.

An example system may further include wherein the couplant entry is positioned at a vertically upper side of the cone when the inspection robot is positioned on the inspection surface.

An example system may further include wherein the couplant exit opening includes one of flush with the bottom surface and extending through the bottom surface.

An example system includes an inspection robot including a plurality of payloads; a plurality of arms, wherein each of the plurality of arms is pivotally mounted to one of the plurality of payloads; a plurality of sleds, wherein each sled is mounted to one of the plurality of arms; a plurality of sensors, wherein each sensor is mounted to a corresponding one of the sleds such that the sensor is operationally couplable to an inspection surface in contact with a bottom surface of the corresponding one of the sleds; a couplant chamber disposed within each of the plurality of sleds, each couplant chamber interposed between a transducer of the sensor mounted to the sled and the inspection surface; and a biasing member coupled to each one of the plurality of arms, and wherein the biasing member provides a biasing force to corresponding one of the plurality of sleds, wherein the biasing force is directed toward the inspection surface.

Certain further aspects of an example system are described following, any one or more of which may be included in certain embodiments of the example system.

An example system may further include wherein each couplant chamber includes a cone, the cone including a cone tip portion at an inspection surface end of the cone, and a sensor mounting end opposite the cone tip portion, and wherein the cone tip portion defines a couplant exit opening.

An example system may further include a couplant entry for the couplant chamber, wherein the couplant entry is positioned between the cone tip portion and the sensor mounting end.

An example system may further include wherein the couplant entry is positioned at a vertically upper side of the cone when the inspection robot is positioned on the inspection surface.

An example system may further include wherein the couplant exit opening includes one of flush with the bottom surface and extending through the bottom surface.

An example system may further include wherein each payload includes a single couplant connection to the inspection robot.

An example method includes providing an inspection robot having a plurality of payloads and a corresponding plurality of sleds for each of the payloads; mounting a sensor on each of the sleds, each sensor mounted to a couplant chamber interposed between the sensor and an inspection surface, and each couplant chamber including a couplant entry for the couplant chamber; changing one of the plurality of payloads to a distinct payload; and wherein the changing of the plurality of payloads does not include disconnecting a couplant line connection at the couplant chamber.

An example method includes providing an inspection robot having a plurality of payloads and a corresponding plurality of sleds for each of the payloads; mounting a sensor on each of the sleds, each sensor mounted to a couplant chamber interposed between the sensor and an inspection surface, and each couplant chamber including a couplant entry for the couplant chamber; changing one of the plurality of payloads to a distinct payload; and wherein the changing of the plurality of payloads does not include dismounting any of the sensors from corresponding couplant chambers.

An example system includes: an inspection robot including a plurality of payloads; a plurality of arms, wherein each of the plurality of arms is pivotally mounted to one of the plurality of payloads; and a plurality of sleds, wherein each sled is pivotally mounted to one of the plurality of arms, and wherein each sled defines a chamber sized to accommodate a sensor.

Certain further aspects of an example system are described following, any one or more of which may be included in certain embodiments of the example system.

An example system may further include a plurality of sensors, wherein each sensor is positioned in one of the chambers of a corresponding one of the plurality of sleds.

An example system may further include wherein each chamber further includes a stop, and wherein each of the plurality of sensors is positioned against the stop.

An example system may further include wherein each sensor positioned against the stop has a predetermined positional relationship with a bottom surface of the corresponding one of the plurality of sleds.

An example system may further include wherein each chamber further includes a chamfer on at least one side of the chamber.

An example system may further include wherein each sensor extends through a corresponding holding clamp, and wherein each holding clamp is mounted to the corresponding one of the plurality of sleds.

An example system may further include wherein each of the plurality of sleds includes an installation sleeve positioned at least partially within in the chamber.

An example system may further include wherein each of the plurality of sleds includes an installation sleeve positioned at least partially within in the chamber, and wherein each sensor positioned in one of the chambers engages the installation sleeve positioned in the chamber.

An example system may further include wherein each of the plurality of sensors is positioned at least partially within an installation sleeve, and wherein each installation sleeve is positioned at least partially within the chamber of the corresponding one of the plurality of sleds.

An example system may further include wherein each chamber further includes wherein each of the plurality of sensors includes an installation tab, and wherein each of the plurality of sensors positioned in one of the chambers engages the installation tab.

An example system may further include wherein each installation tab is formed by relief slots.

An example system includes: an inspection robot including a plurality of payloads; a plurality of arms, wherein each of the plurality of arms is pivotally mounted to one of the plurality of payloads; and a plurality of sleds, wherein each sled is pivotally mounted to one of the plurality of arms, and wherein each sled includes a bottom surface; and a removable layer positioned on each of the bottom surfaces.

Certain further aspects of an example system are described following, any one or more of which may be included in certain embodiments of the example system.

An example system may further include wherein the removable layer includes a sacrificial film.

An example system may further include wherein the sacrificial film includes an adhesive backing on a side of the sacrificial film that faces the bottom surface.

An example system may further include wherein the removable layer includes a hole positioned vertically below a chamber of the corresponding one of the plurality of sleds.

An example system may further include wherein the removable layer is positioned at least partially within a recess of the bottom surface.

An example system may further include wherein the removable layer includes a thickness providing a selected spatial orientation between an inspection contact side of the removable layer and the bottom surface.

An example system includes: an inspection robot including a plurality of payloads; a plurality of arms, wherein each of the plurality of arms is pivotally mounted to one of the plurality of payloads; and a plurality of sleds, wherein each sled is pivotally mounted to one of the plurality of arms, and wherein each sled includes an upper portion and a replaceable lower portion having a bottom surface.

Certain further aspects of an example system are described following, any one or more of which may be included in certain embodiments of the example system.

An example system may further include wherein the replaceable lower portion includes a single, 3-D printable material.

An example system may further include wherein the upper portion and the replaceable lower portion are configured to pivotally engage and disengage.

An example system may further include wherein the bottom surface further includes at least one ramp.

An example method includes interrogating an inspection surface with an inspection robot having a plurality of sleds, each sled including an upper portion and a replaceable lower portion having a bottom surface; determining that the replaceable lower portion of one of the sleds is one of damaged or worn; and in response to the determining, disengaging the worn or damaged replaceable portion from the corresponding upper portion, and engaging a new or undamaged replaceable portion to the corresponding upper portion.

An example method may further include wherein the disengaging includes turning the worn or damaged replaceable portion relative to the corresponding upper portion.

An example method may further include performing a 3-D printing operation to provide the new or undamaged replaceable portion.

An example method includes determining a surface characteristic for an inspection surface; providing a replaceable lower portion having a bottom surface, the replaceable lower portion including a lower portion of a sled having an upper portion, wherein the sled includes one of a plurality of sleds for an inspection robot; and wherein the providing includes one of performing a 3-D printing operation or selecting one from a multiplicity of pre-configured replaceable lower portions.

Certain further aspects of an example system are described following, any one or more of which may be included in certain embodiments of the example system.

An example method may further include determining the surface characteristic includes determining a surface curvature of the inspection surface.

An example method may further include providing includes providing the replaceable lower portion having at least one of a selected bottom surface shape or at least one ramp.

An example method may further include wherein the at least one ramp includes at least one of a ramp angle and a ramp total height value.

An example system includes an inspection robot including a plurality of payloads; a plurality of arms, wherein each of the plurality of arms is pivotally mounted to one of the plurality of payloads; and a plurality of sleds, wherein each sled is pivotally mounted to one of the plurality of arms, and wherein each sled includes a bottom surface defining a ramp.

Certain further aspects of an example system are described following, any one or more of which may be included in certain embodiments of the example system.

An example system may further include wherein each sled further includes the bottom surface defining two ramps, wherein the two ramps include a forward ramp and a rearward ramp.

An example system may further include wherein the ramp include at least one of a ramp angle and a ramp total height value.

An example system may further include wherein the at least one of the ramp angle and the ramp total height value are configured to traverse an obstacle on an inspection surface to be traversed by the inspection robot.

An example system may further include wherein the ramp includes a curved shape.

An example system includes an inspection robot including a plurality of payloads; a plurality of arms, wherein each of the plurality of arms is mounted to one of the plurality of payloads; a plurality of sleds, wherein each sled is pivotally mounted to one of the plurality of arms; and a plurality of sensors, wherein each sensor is mounted to a corresponding one of the sleds such that the sensor is operationally couplable to an inspection surface in contact with a bottom surface of the corresponding one of the sleds.

Certain further aspects of an example system are described following, any one or more of which may be included in certain embodiments of the example system.

An example system may further include wherein each sled is pivotally mounted to one of the plurality of arms at a selected one of a plurality of pivot point positions.

An example system may further include a controller configured to select the one of the plurality of pivot point positions during an inspection run of the inspection robot.

An example system may further include wherein the controller is further configured to select the one of the plurality of pivot point positions in response to a travel direction of the inspection robot.

An example system may further include wherein each sled is pivotally mounted to one of the plurality of arms at a plurality of pivot point positions.

An example method includes providing a plurality of sleds for an inspection robot, each of the sleds mountable to a corresponding arm of the inspection robot at a plurality of pivot point positions; determining which of the plurality of pivot point positions is to be utilized for an inspection operation; and pivotally mounting each of the sleds to the corresponding arm at a selected one of the plurality of pivot point positions in response to the determining.

Certain further aspects of an example method are described following, any one or more of which may be included in certain embodiments of the example method.

An example method may further include wherein the pivotally mounting is performed before an inspection run by the inspection robot.

An example method may further include wherein the pivotally mounting is performed during an inspection run by the inspection robot.

An example method may further include wherein the pivotally mounting is performed in response to a travel direction of the inspection robot.

An example method may further include pivotally mounting each of the sleds at a selected plurality of the plurality of pivot point positions in response to the determining.

An example method includes determining an inspection resolution for an inspection surface; configuring an inspection robot by providing a plurality of horizontally distributed sensors operationally coupled to the inspection robot in response to the inspection resolution; and performing an inspection operation on the inspection surface at a resolution at least equal to the inspection resolution.

One or more certain further aspects of the example method may be incorporated in certain embodiments. Performing the inspection operation may include interrogating the inspection surface acoustically utilizing the plurality of horizontally distributed sensors. The plurality of horizontally distributed sensors may be provided on a first payload of the inspection robot, and wherein the configuring the inspection robot further enhances at least one of a horizontal sensing resolution or a vertical sensing resolution of the inspection robot by providing a second plurality of horizontally distributed sensors on a second payload of the inspection robot. The inspection robot may include providing the first payload defining a first horizontal inspection lane and the second payload defining a second horizontal inspection lane. The inspection robot may include providing the first payload and the second payload such that the first horizontal inspection lane is distinct from the second horizontal inspection lane. The inspection robot may include providing the first payload and the second payload such that the first horizontal inspection lane at least partially overlaps the second horizontal inspection lane. The inspection robot may include determining an inspection trajectory of the inspection robot over the inspection surface, such as the inspection trajectory determining a first inspection run and a second inspection run, wherein a first area of the inspection surface traversed by the first inspection run at least partially overlaps a second area of the inspection surface traversed by the second inspection run.

An example system includes an inspection robot including at least one payload; a plurality of arms, wherein each of the plurality of arms is pivotally mounted to the at least one payload; and a plurality of sleds, wherein each sled is pivotally mounted to one of the plurality of arms, and wherein the plurality of sleds is distributed horizontally across the payload.

One or more certain further aspects of the example system may be incorporated in certain embodiments. The plurality of sleds may be distributed across the payload with a spacing defining a selected horizontal sensing resolution of the inspection robot. The sleds may be distributed across the payload, wherein a plurality of sleds is provided within a horizontal distance that is less than a horizontal width of a pipe to be inspected. There may be a plurality of sensors, wherein each sensor is mounted to a corresponding one of the sleds such that the sensor is operationally couplable to an inspection surface in contact with a bottom surface of the corresponding one of the sleds. At least one payload may include a first payload and a second payload, and wherein the first payload and the second payload define distinct horizontal inspection lanes for the inspection surface. There may be a plurality of sensors including ultra-sonic sensors, and wherein each of the plurality of payloads comprises a single couplant connection to the inspection robot.

An example system includes an inspection robot having a number of sensors operationally coupled thereto; and a means for horizontally distributing the number of sensors across a selected horizontal inspection lane of an inspection surface. In a further aspect, a plurality of the number of sensors may be provided to inspect a single pipe of the inspection surface at a plurality of distinct horizontal positions of the pipe.

An example system includes an inspection robot comprising a first payload and a second payload; a first plurality of arms pivotally mounted to the first payload, and a second plurality of arms pivotally mounted to the second payload; a first plurality of sleds mounted to corresponding ones of the first plurality of arms, and a second plurality of sleds mounted to corresponding ones of the second plurality of arms; wherein the first payload defines a first horizontal inspection lane for an inspection surface, and wherein the second payload defines a second horizontal inspection lane for the inspection surface; and wherein the first horizontal inspection lane at least partially overlaps the second horizontal inspection lane.

One or more certain further aspects of the example system may be incorporated in certain embodiments. At least one of the second plurality of sleds may be horizontally aligned with at least one of the first plurality of sleds. There may be a plurality of sensors, wherein each sensor is mounted to a corresponding one of the first plurality of sleds and the second plurality of sleds, such that the sensor is operationally couplable to an inspection surface in contact with a bottom surface of the corresponding one of the first plurality of sleds and the second plurality of sleds. Sensors may be mounted on the horizontally aligned sleds for interrogating vertically distinct portions of the inspection surface. At least one of the second plurality of sleds and at least one of the first plurality of sleds may be horizontally offset. The first payload may include a forward payload and wherein the second payload comprises a rear payload. The first payload may include a forward payload and wherein the second payload comprises a trailing payload.

An example apparatus includes an inspection data circuit structured to interpret lead inspection data from a lead sensor; a sensor configuration circuit structured to determine a configuration adjustment for a trailing sensor in response to the lead inspection data; and a sensor operation circuit structured to adjust at least one parameter of the trailing sensor in response to the configuration adjustment.

One or more certain further aspects of the example apparatus may be incorporated in certain embodiments. The inspection data circuit may be further structured to interpret trailing sensor data from a trailing sensor, wherein the trailing sensor is responsive to the configuration adjustment. The configuration adjustment may include at least one adjustment selected from the adjustments consisting of: changing of sensing parameters of the trailing sensor; changing a cut-off time to observe a peak value for an ultra-sonic trailing sensor; enabling operation of a trailing sensor; adjusting a sensor sampling rate of a trailing sensor; adjusting a fault cut-off values for a trailing sensor; adjusting a sensor range of a trailing sensor; adjusting a resolution value of a trailing sensor; changing a movement speed of an inspection robot, wherein the trailing sensors are operationally coupled to the inspection robot. The lead sensor and the trailing sensor may be operationally coupled to an inspection robot. The lead sensor may include a first sensor during a first inspection run, and wherein the trailing sensor comprises the first sensor during a second inspection run. The inspection data circuit may be further structured to interpret the lead inspection data and interpret the trailing sensor data in a single inspection run.

An example system may include an inspection robot; a lead sensor operationally coupled to the inspection robot and structured to provide lead inspection data; a controller, the controller including: an inspection data circuit structured to interpret the lead inspection data; a sensor configuration circuit structured to determine a configuration adjustment for a trailing sensor in response to the lead inspection data; and a sensor operation circuit structured to adjust at least one parameter of the trailing sensor in response to the configuration adjustment; and a trailing sensor responsive to the configuration adjustment.

One or more certain further aspects of the example system may be incorporated in certain embodiments. The controller may be at least partially positioned on the inspection robot. The inspection data circuit may be further structured to interpret trailing inspection data from the trailing sensor. The configuration adjustment may include at least one adjustment selected from the adjustments consisting of: changing of sensing parameters of the trailing sensor; wherein the trailing sensor comprises an ultra-sonic sensor, and changing a cut-off time to observe a peak value for the trailing sensor; enabling operation of the trailing sensor; adjusting a sensor sampling rate of the trailing sensor; adjusting a fault cut-off values for the trailing sensor; adjusting a sensor range of the trailing sensor; adjusting a resolution value of the trailing sensor; changing a movement speed of the inspection robot, wherein the trailing sensor is operationally coupled to the inspection robot. The trailing sensor may be operationally coupled to an inspection robot. The lead sensor may include a first sensor during a first inspection run, and wherein the trailing sensor comprises the first sensor during a second inspection run. The inspection data circuit may be further structured to interpret the lead inspection data and interpret the trailing inspection data in a single inspection run.

An example method may include interpreting a lead inspection data from a lead sensor; determining a configuration adjustment for a trailing sensor in response to the lead inspection data; and adjusting at least one parameter of a trailing sensor in response to the configuration adjustment.

One or more certain further aspects of the example method may be incorporated in certain embodiments. A trailing inspection data may be interpreted from the trailing sensor. The adjusting the at least one parameter of the trailing sensor may include at least one adjustment selected from the adjustments consisting of: changing of sensing parameters of the trailing sensor; changing a cut-off time to observe a peak value for an ultra-sonic trailing sensor; enabling operation of a trailing sensor; adjusting a sensor sampling rate of a trailing sensor; adjusting a fault cut-off values for a trailing sensor; adjusting a sensor range of a trailing sensor; adjusting a resolution value of a trailing sensor; changing a movement speed of an inspection robot, wherein the trailing sensors are operationally coupled to the inspection robot. Interpreting the lead sensor data may be provided during a first inspection run, and interpreting the trailing inspection data during a second inspection run. Interpreting the lead inspection data and interpreting the trailing inspection data may be performed in a single inspection run.

An example method includes accessing an industrial system comprising an inspection surface, wherein the inspection surface comprises a personnel risk feature; operating an inspection robot to inspect at least a portion of the inspection surface; and wherein the operating the inspection is performed with at least a portion of the industrial system providing the personnel risk feature still operating.

One or more certain further aspects of the example method may be incorporated in certain embodiments. The personnel risk feature may include a portion of the inspection surface having an elevated height. The elevated height may include at least one height value consisting of the height values selected from: at least 10 feet, at least 20 feet, at least 30 feet, greater than 50 feet, greater than 100 feet, and up to 150 feet. The personnel risk feature may include an elevated temperature of at least a portion of the inspection surface.

The personnel risk feature may include an enclosed space, and wherein at least a portion of the inspection surface is positioned within the enclosed space. The personnel risk feature may include an electrical power connection. Determining a position of the inspection robot within the industrial system during the operating the inspection robot, and shutting down only a portion of the industrial system during the inspection operation in response to the position of the inspection robot.

An example system includes an inspection robot comprising a payload; a plurality of arms, wherein each of the plurality of arms is pivotally mounted to the payload; and a plurality of sleds, wherein each sled is pivotally mounted to one of the plurality of arms, thereby configuring a horizontal distribution of the plurality of sleds.

One or more certain further aspects of the example system may be incorporated in certain embodiments. There may be a plurality of sensors, wherein each sensor is mounted to a corresponding one of the sleds such that the sensor is operationally couplable to an inspection surface in contact with a bottom surface of the corresponding one of the sleds. The horizontal distribution of the plurality of sleds may provide for a selected horizontal resolution of the plurality of sensors. A controller may be configured to determine the selected horizontal resolution and to configure a position of the plurality of arms on the payload in response to the selected horizontal resolution. The horizontal distribution of the plurality of sleds may provide for avoidance of an obstacle on an inspection surface to be traversed by the inspection robot. A controller may be configured to configure a position of the plurality of arms on the payload in response to the obstacle on the inspection surface, and to further configure the position of the plurality of arms on the payload in response to a selected horizontal resolution after the inspection robot clears the obstacle.

An example method includes determining at least one of an obstacle position on an inspection surface and a selected horizontal resolution for sensors to be utilized for operating an inspection robot on an inspection surface; and configuring a horizontal distribution of a plurality of sleds on a payload of the inspection robot in response to the at least one of the obstacle position and the selected horizontal resolution.

One or more certain further aspects of the example method may be incorporated in certain embodiments. The configuring of the horizontal distribution may be performed before an inspection run of the inspection robot on the inspection surface. The configuring of the horizontal distribution may be performed during inspection operations of the inspection robot on the inspection surface. 457

An example system includes an inspection robot including at least one payload; a plurality of arms, wherein each of the plurality of arms is pivotally mounted to the at least one payload; a plurality of sleds, wherein each sled is pivotally mounted to one of the plurality of arms, and wherein the plurality of sleds is distributed horizontally across the payload; and wherein a plurality of the sleds are provided within a horizontal distance that is less than a horizontal width of a pipe to be inspected.

One or more certain further aspects of the example system may be incorporated in certain embodiments. An acoustic sensor may be mounted to each of the plurality of sleds provided within the horizontal distance less than a horizontal width of the pipe to be inspected. The plurality of sleds may be provided within the horizontal distance less than a horizontal width of the pipe to be inspected oriented such that each of the acoustic sensors is perpendicularly oriented toward the pipe to be inspected. A sensor mounted to each of the plurality of sleds may be provided within the horizontal distance less than a horizontal width of the pipe to be inspected. The plurality of sleds may be provided within the horizontal distance less than a horizontal width of the pipe to be inspected oriented such that each of the sensors is perpendicularly oriented toward the pipe to be inspected.

An example system includes an inspection robot including at least one payload; a plurality of arms, wherein each of the plurality of arms is pivotally mounted to the at least one payload; a plurality of sleds, wherein each sled is pivotally mounted to one of the plurality of arms; and a plurality of sensors mounted on each of the plurality of sleds.

One or more certain further aspects of the example system may be incorporated in certain embodiments. The plurality of sensors on each of the plurality of sleds may be vertically separated. A vertically forward one of the plurality of sensors may be mounted on each of the plurality of sleds comprises a lead sensor, and wherein a vertically rearward one of the plurality of sensors comprises a trailing sensor.

An example system includes a first payload having a first plurality of sensors mounted thereupon, and a second payload having a second plurality of sensors mounted thereupon; an inspection robot; and one of the first payload and the second payload mounted upon the inspection robot, thereby defining a sensor suite for the inspection robot.

One or more certain further aspects of the example system may be incorporated in certain embodiments. A mounted one of the first payload and the second payload may include a single couplant connection to the inspection robot. A mounted one of the first payload and the second payload may include a single electrical connection to the inspection robot.

An example method includes determining a sensor suite for inspection operations of an inspection robot; selecting a payload for the inspection robot from a plurality of available payloads in response to the determined sensor suite; and mounting the selected payload to the inspection robot.

One or more certain further aspects of the example method may be incorporated in certain embodiments. The inspection operations may be performed with the inspection robot after the mounting. The mounting may comprise connecting a single couplant connection between the selected payload and the inspection robot. The mounting may include connecting a single electrical connection between the selected payload and the inspection robot. The mounting may include dis-mounting a previously mounted payload from the inspection robot before the mounting, where the dis-mounting may disconnect a single couplant connection between the previously mounted payload and the inspection robot, disconnect a single electrical connection between the previously mounted payload and the inspection robot, and the like. The mounting may include connecting a single electrical connection between the selected payload and the inspection robot.

An example system includes an inspection robot comprising a plurality of payloads; a plurality of arms, wherein each of the plurality of arms is pivotally mounted to one of the plurality of payloads; a plurality of sleds, wherein each sled is pivotally mounted to one of the plurality of arms; a plurality of sensors, wherein each sensor is mounted to a corresponding one of the sleds such that the sensor is operationally couplable to an inspection surface in contact with a bottom surface of the corresponding one of the sleds; and a biasing member disposed within each of the sleds, wherein the biasing member provides a down force to the corresponding one of the plurality of sensors.

One or more certain further aspects of the example system may be incorporated in certain embodiments. The biasing member may include at least one member selected from the members consisting of a leaf spring, a cylindrical spring, a torsion spring, and an electromagnet. A controller may be configured to adjust a biasing strength of the biasing member. The controller may be further configured to interpret a distance value between the corresponding one of the plurality of sensors and an inspection surface, and to further adjust the biasing strength of the biasing member in response to the distance value.

An example method includes providing a fixed acoustic path between a sensor coupled to an inspection robot and an inspection surface; filling the acoustic path with a couplant; and acoustically interrogating the inspection surface with the sensor.

One or more certain further aspects of the example system may be incorporated in certain embodiments. The filling of the acoustic path with the couplant may include injecting the couplant into the fixed acoustic path from a vertically upper direction. Determining that the sensor should be re-coupled to the inspection surface. Performing a re-coupling operation in response to the determining Lifting the sensor from the inspection surface, and returning the sensor to the inspection surface. Increasing a flow rate of the filling the acoustic path with the couplant. Performing at least one operation selected from the operations consisting of: determining that a predetermined time has elapsed since a last re-coupling operation; determining that an event has occurred indicating that a re-coupling operation is desired; and determining that the acoustic path has been interrupted.

An example system includes an inspection robot, and a plurality of sleds mounted to the inspection robot; a plurality of sensors, wherein each sensor is mounted to a corresponding one of the sleds such that the sensor is operationally couplable to an inspection surface in contact with a bottom surface of the corresponding one of the sleds; a couplant chamber disposed within each of the plurality of sleds, each couplant chamber interposed between a transducer of the sensor mounted to the sled and the inspection surface; wherein each couplant chamber comprises a cone, the cone comprising a cone tip portion at an inspection surface end of the cone, and a sensor mounting end opposite the cone tip portion, and wherein the cone tip portion defines a couplant exit opening.

One or more certain further aspects of the example system may be incorporated in certain embodiments, such as a plurality of payloads may be mounted to the inspection robot; a plurality of arms, wherein each of the plurality of arms is pivotally mounted to one of the plurality of payloads; wherein the plurality of sleds is each mounted to one of the plurality of arms; and a biasing member coupled to at least one of: one of the payloads or one of the arms; and wherein the biasing member provides a down force on one of the sleds corresponding to the one of the payloads or the one of the arms.

An example system includes an inspection robot, and a plurality of sleds mounted to the inspection robot; a plurality of sensors, wherein each sensor is mounted to a corresponding one of the sleds such that the sensor is operationally couplable to an inspection surface in contact with a bottom surface of the corresponding one of the sleds; a couplant chamber disposed within each of the plurality of sleds, each couplant chamber interposed between a transducer of the sensor mounted to the sled and the inspection surface; and a means for providing a low fluid loss of couplant from each couplant chamber.

An example system includes an inspection robot having a number of sleds mounted to the inspection robot (e.g., mounted on arms coupled to payloads). The example system further includes a number of sensors, where each sensor is mounted on one of the sleds—although in certain embodiments, each sled may have one or more sensors, or no sensors. The example system includes the sensors mounted on the sleds such that the sensor is operationally couplable to the inspection surface when a bottom surface of the corresponding sled is in contact with the inspection surface. For example, the sled may include a hole therethrough, a chamber such that when the sensor is mounted in the chamber, the sensor is in a position to sense parameters about the inspection surface, or any other orientation as described throughout the present disclosure. The example system further includes a couplant chamber disposed within a number of the sleds—for example in two or more of the sleds, in a horizontally distributed arrangement of the sleds, and/or with a couplant chamber disposed in each of the sleds. In certain embodiments, sleds may alternate with sensor arrangements—for example a magnetic induction sensor in a first sled, an acoustic sensor with a couplant chamber in a second sled, another magnetic induction sensor in third sled, an acoustic sensor with a couplant chamber in a fourth sled, and so forth. Any pattern or arrangement of sensors is contemplated herein. In certain embodiments, a magnetic induction sensor is positioned in a forward portion of a sled (e.g., as a lead sensor) and an acoustic sensor is positioned in a middle or rearward portion of the sled (e.g., as a trailing sensor). In certain embodiments, arms for sleds having one type of sensor are longer and/or provide for a more forward position than arms for sleds having a second type of sensor.

The example system further includes each couplant chamber provided as a cone, with the cone having a cone tip portion at an inspection surface end of the cone, and a sensor mounting end opposite the inspection surface end. An example cone tip portion defines a couplant exit opening. An example system further includes a couplant entry for each couplant chamber, which may be positioned between the cone tip portion and the sensor mounting end. In certain embodiments, the couplant entry is positioned at a vertically upper side of the cone in an intended orientation of the inspection robot on the inspection surface. For example, if the inspection robot is intended to be oriented on a flat horizontal inspection surface, the couplant entry may be positioned above the cone or at an upper end of the cone. In another example, if the inspection robot is intended to be oriented on a vertical inspection surface, the couplant entry may be positioned on a side of the cone, such as a forward side (e.g., for an ascending inspection robot) or a rearward side (e.g., for a descending inspection robot). The vertical orientation of the couplant entry, where present, should not be confused with a vertical or horizontal arrangement of the inspection robot (e.g., for sensor distribution orientations). In certain embodiments, a horizontal distribution of sensors is provided as perpendicular, and/or at an oblique angle, to a travel path of the inspection robot, which may be vertical, horizontal, or at any other angle in absolute geometric space.

Certain further aspects of an example system are described following, any one or more of which may be present in certain embodiments. An example system includes a controller 802 configured to fill the couplant chamber with a couplant—for example by providing a couplant command (e.g., flow rate, couplant rate, injection rate, and/or pump speed command) to a couplant pump which may be present on the inspection robot and/or remote from the inspection robot (e.g., providing couplant through a tether). In certain embodiments, the couplant pump is responsive to the couplant command to provide the couplant, to the inspection robot, to a payload, and/or to individual sleds (and thereby to the couplant chamber via the couplant chamber entry). In certain embodiments, the couplant command is a couplant injection command, and the couplant pump is responsive to the injection command to inject the couplant into the couplant chamber. In certain embodiments, the controller is further configured to determine that at least one of the sensors should be re-coupled to the inspection surface. Example and non-limiting operations to determine that at least one of the sensors should be re-coupled to the inspection surface include: determining that a predetermined time has elapsed since a last re-coupling operation; determining that an event has occurred indicating that a re-coupling operation is desired; and/or determining that the acoustic path has been interrupted. In certain embodiments, the controller provides a re-coupling instruction in response to determining that one or more sensors should be re-coupled to the inspection surface. Example and non-limiting re-coupling instructions include a sensor lift command—for example to lift the sensor(s) of a payload and/or arm briefly to clear bubbles from the couplant chamber. In certain embodiments, an actuator such as a motor, push-rod, and/or electromagnet, is present on the inspection robot to lift a payload, an arm, and/or tilt a sled in response to the sensor lift command. In certain embodiments, ramps or other features on a sled are configured such that the sled lifts (or tilts) or otherwise exposes the couplant exit opening—for example in response to a reversal of the direction of motion for the inspection robot. In a further embodiment, the inspection robot is responsive to the sensor lift command to briefly change a direction of motion and thereby perform the re-coupling operation. In certain embodiments, the controller is configured to provide the re-coupling instruction as an increased couplant injection command—for example to raise the couplant flow rate through the couplant chamber and thereby clear bubbles or debris.

An example procedure includes an operation to provide a fixed acoustic path (e.g., a delay line) between a sensor coupled to an inspection robot and an inspection surface. The example procedure includes an operation to fill the acoustic path with couplant, and to acoustically interrogate the inspection surface with the sensor. Certain further aspects of the example procedure are described following, any one or more of which may be present in certain embodiments. An example procedure further includes an operation to fill the acoustic path with the couplant by injecting the couplant into the fixed acoustic path from a vertically upper direction. An example procedure further includes an operation to determine that the sensor should be re-coupled to the surface, and/or to perform a re-coupling operation in response to the determining. In certain further embodiments, example operations to perform a re-coupling operation include at least: lifting the sensor from the inspection surface, and returning the sensor to the inspection surface; and/or increasing a flow rate of the filling of the acoustic path with the couplant. Example operations to determine the sensor should be re-coupled to the surface include at least: determining that a predetermined time has elapsed since a last re-coupling operation; determining that an event has occurred indicating that a re-coupling operation is desired; and determining that the acoustic path has been interrupted.

An example procedure includes performing an operation to determine an inspection resolution for an inspection surface (e.g., by determining a likely resolution that will reveal any features of interest such as damage or corrosion, and/or to meet a policy or regulatory requirement); an operation to configure an inspection robot by providing a number of horizontally distributed acoustic sensors operationally coupled to the inspection robot (e.g., mounted to be moved by the inspection robot, and/or with couplant or other fluid provisions, electrical or other power provisions, and/or with communication provisions); an operation to provide a fixed acoustic path between the acoustic sensors and the inspection surface; an operation to fill the acoustic path with a couplant; and an operation to perform an inspection operation on the inspection surface with the acoustic sensors. It will be understood that additional sensors beyond the acoustic sensors may be operationally coupled to the inspection robot in addition to the acoustic sensors.

Certain further aspects of an example procedure are described following, any one or more of which may be present in certain embodiments. An example procedure includes an operation to perform the inspection operation on the inspection surface at a resolution at least equal to an inspection resolution, and/or where the inspection resolution is smaller (e.g., higher resolution) than a spacing of the horizontally distributed acoustic sensors (e.g., the procedure provides for a greater resolution than that provided by the horizontally spacing of the sensors alone). An example procedure includes the operation to fill the acoustic path with the couplant including injecting the couplant into the fixed acoustic path from a vertically upper direction, and/or an operation to determine that at least one of the acoustic sensors should be re-coupled to the inspection surface.

An example system includes an inspection robot having a plurality of wheels, wherein the plurality of wheels are positioned to engage an inspection surface when the inspection robot is positioned on the inspection surface; wherein each of the plurality of wheels comprises a magnetic hub portion interposed between enclosure portions; wherein the enclosure portions extend past the magnetic hub portion and thereby prevent contact of the magnetic hub portion with the inspection surface.

One or more certain further aspects of the example system may be incorporated in certain embodiments. The enclosure portions may define a channel therebetween. A shape of the channel may be provided in response to a shape of a feature on the inspection surface. The shape of the channel may correspond to a curvature of the feature of the inspection surface. An outer covering for each of the enclosure portions may be provided, such as where the outer covering for each of the enclosure portions define a channel therebetween. The ferrous enclosure portions may include one of an outer chamfer and an outer curvature, and wherein the one of the outer chamfer and the outer curvature correspond to a shape of a feature on the inspection surface. The enclosure portions may include ferrous enclosure portions.

An example system includes an inspection robot having a plurality of wheels, wherein the plurality of wheels are positioned to engage an inspection surface when the inspection robot is positioned on the inspection surface; wherein each of the plurality of wheels comprises a magnetic hub portion interposed between enclosure portions; and wherein the inspection robot further comprises a gear box motively coupled to at least one of the wheels, and wherein the gear box comprises at least one thrust washer axially interposed between two gears of the gear box.

An example system includes an inspection robot having a plurality of wheels, wherein the plurality of wheels are positioned to engage an inspection surface when the inspection robot is positioned on the inspection surface; wherein each of the plurality of wheels comprises a magnetic hub portion interposed between enclosure portions; and wherein the inspection robot further comprises a gear box motively coupled to at least one of the wheels, and wherein the gear box comprises gears that are not a ferromagnetic material.

An example system includes an inspection robot having a plurality of wheels, wherein the plurality of wheels are positioned to engage an inspection surface when the inspection robot is positioned on the inspection surface; wherein each of the plurality of wheels comprises a magnetic hub portion interposed between enclosure portions; and wherein the inspection robot further comprises a gear box motively coupled to at least one of the wheels, and a means for reducing magnetically induced axial loads on gears of the gear box.

An example system includes an inspection robot, and a plurality of sleds mounted to the inspection robot; a plurality of acoustic sensors, wherein each acoustic sensor is mounted to a corresponding one of the sleds such that the sensor is operationally couplable to an inspection surface in contact with a bottom surface of the corresponding one of the sleds; and a couplant chamber disposed within each of the plurality of sleds, each couplant chamber interposed between a transducer of the acoustic sensor mounted to the sled and the inspection surface.

Certain further aspects of an example system are described following, any one or more of which may be included in certain embodiments of the example system.

An example system may further include wherein each couplant chamber includes a cone, the cone including a cone tip portion at an inspection surface end of the cone, and a sensor mounting end opposite the cone tip portion, and wherein the cone tip portion defines a couplant exit opening.

An example system may further include a couplant entry for the couplant chamber, wherein the couplant entry is positioned between the cone tip portion and the sensor mounting end.

An example system may further include wherein the couplant entry is positioned at a vertically upper side of the cone when the inspection robot is positioned on the inspection surface.

An example system may further include wherein each sled includes a couplant connection conduit, wherein the couplant connection conduit is coupled to a payload couplant connection at an upstream end, and coupled to the couplant entry of the cone at a downstream end.

An example method includes providing a sled for an inspection robot, the sled including an acoustic sensor mounted thereon and a couplant chamber disposed within the sled, and the couplant chamber having a couplant entry; coupling the sled to a payload of the inspection robot at an upstream end of a couplant connection conduit, the couplant connection conduit coupled to the couplant entry at a downstream end.

Certain further aspects of an example method are described following, any one or more of which may be included in certain embodiments of the example method.

An example method may further include de-coupling the sled from the payload of the inspection robot, and coupling a distinct sled to the payload of the inspection robot, without disconnecting the couplant connection conduit from the couplant entry.

An example apparatus includes a controller, the controller including: a position definition circuit structured to interpret position information for an inspection robot on an inspection surface; a data positioning circuit structured to interpret inspection data from the inspection robot, and to correlate the inspection data to the position information to determine position informed inspection data; and wherein the data positioning circuit is further structured to provide the position informed inspection data as one of additional inspection data or updated inspection data.

Certain further aspects of an example apparatus are described following, any one or more of which may be included in certain embodiments of the example apparatus.

An example apparatus may further include wherein the position information includes one of relative position information or absolute position information.

An example apparatus may further include wherein the position definition circuit is further structured to determine the position information according to at least one of: global positioning service (GPS) data; an ultra-wide band radio frequency (RF) signal; a LIDAR measurement; a dead reckoning operation; a relationship of the inspection robot position to a reference point; a barometric pressure value; and a known sensed value correlated to a position of the inspection robot.

An example apparatus may further include wherein the position definition circuit is further structured to interpret a plant shape value, to determine a definition of a plant space including the inspection surface in response to the plant shape value, and to correlate the inspection data with a plant position information (e.g., into plant position values) in response to the definition of the plant space and the position information.

An example method includes: interpreting position information for an inspection robot on an inspection surface; interpreting inspection data from the inspection robot; correlating the inspection data to the position information to determine position informed inspection data; and providing the position informed inspection data as one of additional inspection data or updated inspection data.

Certain further aspects of an example method are described following, any one or more of which may be included in certain embodiments of the example method.

An example method may further include updating the position information for the inspection robot, and correcting the position informed inspection data.

An example method may further include wherein the position information includes position information determined at least partially in response to a dead reckoning operation, and wherein the updated position information is determined at least partially in response to feedback position operation.

An example method may further include determining a plant definition value, and to determine plant position values in response to the plant definition value and the position information.

An example method may further include providing the position informed inspection data further in response to the plant position values.

An example apparatus includes: an inspection data circuit structured to interpret inspection data from an inspection robot on an inspection surface; a robot positioning circuit structured to interpret position data for the inspection robot; and an inspection visualization circuit structured to determine an inspection map in response to the inspection data and the position data, and to provide at least a portion of the inspection map for display to a user.

Certain further aspects of an example apparatus are described following, any one or more of which may be included in certain embodiments of the example apparatus.

An example apparatus may further include wherein the inspection visualization circuit is further responsive structured to interpret a user focus value, and to update the inspection map in response to the user focus value.

An example apparatus may further include wherein the inspection visualization circuit is further responsive structured to interpret a user focus value, and to provide focus data in response to the user focus value.

An example apparatus may further include wherein the inspection map includes a physical depiction of the inspection surface.

An example apparatus may further include the inspection map further includes a visual representation of at least a portion of the inspection data depicted on the inspection surface.

An example apparatus may further include wherein the inspection map includes a virtual mark for a portion of the inspection surface.

An example apparatus includes: an acoustic data circuit structured to interpret return signals from an inspection surface to determine raw acoustic data; a thickness processing circuit structured to determine a primary mode score value in response to the raw acoustic data, and in response to the primary mode score value exceeding a predetermined threshold, determining a primary mode value corresponding to a thickness of the inspection surface material.

Certain further aspects of an example apparatus are described following, any one or more of which may be included in certain embodiments of the example apparatus.

An example apparatus may further include wherein the thickness processing circuit is further structured to determine, in response to the primary mode score value not exceeding the predetermined threshold, a secondary mode score value in response to the raw acoustic data.

An example apparatus may further include wherein the thickness processing circuit is further structured to determine, in response to the secondary mode score value exceeding a threshold, a secondary mode value corresponding to a thickness of the inspection surface material.

An example apparatus may further include wherein the thickness processing circuit is further structured to determine the primary mode score value in response to at least one parameter selected from the parameters consisting of: a time of arrival for a primary return; a time of arrival for a secondary return; a character of a peak for the primary return; a character of a peak for the secondary return; a sensor alignment determination for an acoustic sensor providing the return signals; a sled position for a sled having the acoustic sensor mounted thereupon; and a couplant anomaly indication.

An example apparatus may further include wherein the secondary mode value including a value determined from a number of reflected peaks of the return signals.

An example apparatus may further include wherein the raw acoustic data includes a lead inspection data, the apparatus further including: a sensor configuration circuit structured to determine a configuration adjustment for a trailing sensor in response to the lead inspection data; and a sensor operation circuit structured to adjust at least one parameter of the trailing sensor in response to the configuration adjustment; and a trailing sensor responsive to the configuration adjustment.

An example apparatus may further include wherein the acoustic data circuit is further structured to interpret trailing inspection data from the trailing sensor.

An example apparatus may further include wherein the configuration adjustment includes at least one adjustment selected from the adjustments consisting of: changing of sensing parameters of the trailing sensor; wherein the trailing sensor includes an ultra-sonic sensor, and changing a cut-off time to observe a peak value for the trailing sensor; enabling operation of the trailing sensor; adjusting a sensor sampling rate of the trailing sensor; adjusting a fault cut-off value for the trailing sensor; adjusting a sensor range of the trailing sensor; adjusting a resolution value of the trailing sensor; changing a movement speed of an inspection robot, wherein the trailing sensor is operationally coupled to the inspection robot.

An example apparatus may further include wherein a lead sensor providing the lead inspection data includes a first sensor during a first inspection run, and wherein the trailing sensor includes the first sensor during a second inspection run.

An example apparatus may further include wherein the acoustic data circuit is further structured to interpret the lead inspection data and interpret the trailing inspection data in a single inspection run.

An example apparatus may further include the wherein the raw acoustic data includes a lead inspection data, the apparatus further including: a sensor configuration circuit structured to determine a configuration adjustment in response to the lead inspection data, and wherein the configuration includes an instruction to utilize at least one of a consumable, a slower, or a more expensive trailing operation in response to the lead inspection data.

An example apparatus may further include wherein the trailing operation includes at least one operation selected from the operations consisting of: a sensing operation; a repair operation; and a marking operation.

An example apparatus includes: an electromagnetic (EM) data circuit structured to interpret EM induction data provided by a magnetic induction sensor; a substrate distance circuit structured to determine a substrate distance value between the magnetic induction sensor and a ferrous substrate of an inspection surface; and an EM diagnostic circuit structured to provide a diagnostic value in response to the substrate distance value.

Certain further aspects of an example apparatus are described following, any one or more of which may be included in certain embodiments of the example apparatus.

An example apparatus may further include wherein the diagnostic value includes at least one value selected from the values consisting of: a rationality check indicating whether the sensor is positioned in proximity to the inspection surface; and a sensor position value indicating a distance from a second sensor to the substrate of the inspection surface.

An example apparatus may further include: an acoustic data circuit structured to interpret return signals from the inspection surface to determine raw acoustic data; a thickness processing circuit structured to: determine a primary mode score value in response to the raw acoustic data and further in response to the rationality check; and in response to the primary mode score value exceeding a predetermined threshold, determining a primary mode value corresponding to a thickness of the inspection surface material.

An example apparatus may further include: an acoustic data circuit structured to interpret return signals from the inspection surface to determine raw acoustic data; a thickness processing circuit structured to: determine a primary mode score value in response to the raw acoustic data and further in response to the sensor position value; and in response to the primary mode score value exceeding a predetermined threshold, determining a primary mode value corresponding to a thickness of the inspection surface material.

An example apparatus may further include: an acoustic data circuit structured to interpret return signals from the inspection surface to determine raw acoustic data; a thickness processing circuit structured to: determine a primary mode score value in response to the raw acoustic data and further in response to the diagnostic value; and in response to the primary mode score value exceeding a predetermined threshold, determining a primary mode value corresponding to a thickness of the inspection surface material.

An example method includes: determining an induction processing parameter; and adjusting an inspection plan for an inspection robot in response to the induction processing parameter.

Certain further aspects of an example method are described following, any one or more of which may be included in certain embodiments of the example method.

An example method may further include wherein the induction processing parameter includes at least one parameter selected from the parameters consisting of: a substrate distance value, a sensor position value, and a rationality diagnostic value.

An example method may further include wherein the adjusting the inspection plan includes at least one operation selected from the operations consisting of: adjusting a sensor calibration value; adjusting a trailing sensor calibration value; adjusting an inspection resolution value for a sensor used in the inspection plan; adjusting at least one of a number, a type, or a positioning of a plurality of sensors used in the inspection plan; adjusting an inspection trajectory of the inspection robot; adjusting a sled ramp configuration for the inspection robot; adjusting a down force for a sled of the inspection robot; and adjusting a down force for a sensor of the inspection robot.

An example method may further include performing an additional inspection operation in response to the induction processing parameter.

An example method may further include wherein the adjusting includes adjusting an inspection trajectory of the inspection robot to follow a detected feature on an inspection surface.

An example method may further include wherein the detected feature includes at least one feature selected from the features consisting of: a weld, a groove, a crack, and a coating difference area.

An example method may further include an operation to respond to the detected feature.

An example method may further include wherein the operation to respond to the detected feature includes at least one operation selected from the operations consisting of: a repair operation; a treatment operation; a weld operation; an epoxy application operation; a cleaning operation; a marking operation; and a coating operation.

An example method may further include detecting a feature on the inspection surface, and marking the feature virtually on an inspection map.

An example method may further include detecting a feature on the inspection surface, and marking the feature with a mark not in the visible spectrum.

An example method may further include wherein the marking further includes utilizing at least one of an ultraviolet dye, a penetrant, and a virtual mark.

An example method includes: performing an inspection operation on an inspection surface, the inspection operation including an inspection surface profiling operation; determining a contour of at least a portion of the inspection surface in response to the surface profiling operation; and adjusting a calibration of an ultra-sonic sensor in response to the contour.

Certain further aspects of an example method are described following, any one or more of which may be included in certain embodiments of the example method.

An example method may further include wherein the adjusting is performed as a post-processing operation.

An example method includes: performing an inspection operation on an inspection surface, the inspection operation including interrogating the inspection surface with an electromagnetic sensor; determining an induction processing parameter in response to the interrogating; and adjusting a calibration of an ultra-sonic sensor in response to the induction processing parameter.

Certain further aspects of an example method are described following, any one or more of which may be included in certain embodiments of the example method.

An example method may further include wherein the adjusting is performed as a post-processing operation.

An example method includes: interpreting inspection data from an inspection robot on an inspection surface; interpreting position data for the inspection robot; and determining an inspection map in response to the inspection data and the position data, and providing at least a portion of the inspection map for display to a user.

Certain further aspects of an example method are described following, any one or more of which may be included in certain embodiments of the example method.

An example method may further include wherein the inspection map includes at least one parameter selected from the parameters consisting of: how much material should be added to the inspection surface; and a type of repair that should be applied to the inspection surface.

An example method may further include wherein the inspection map further includes an indication of a time until a repair of the inspection surface will be required.

An example method may further include accessing a facility wear model, and determining the time until a repair of the inspection surface will be required in response to the facility wear model.

An example method may further include wherein the inspection map further includes an indication a time that a repair of the inspection surface is expected to last.

An example method may further include accessing a facility wear model, and determining the time that the repair of the inspection surface is expected to last in response to the facility wear model.

An example method may further include determining the time that the repair of the inspection surface is expected to last in response to a type of repair to be performed.

An example method may further include presenting a user with a number of repair options, and further determining the time that the repair of the inspection surface is expected to last in response to a selected one of the number of repair options.

An example method includes accessing an industrial system comprising an inspection surface, wherein the inspection surface comprises a personnel risk feature; operating an inspection robot to inspect at least a portion of the inspection surface, wherein the operating the inspection is performed with at least a portion of the industrial system providing the personnel risk feature still operating; interpreting position information for the inspection robot on the inspection surface; interpreting inspection data from the inspection robot; correlating the inspection data to the position information to determine position informed inspection data; and providing the position informed inspection data as one of additional inspection data or updated inspection data.

An example system including an inspection robot with a sensor configuration circuit structured to determine a configuration adjustment for a trailing sensor in response to the lead inspection data; a sensor operation circuit structured to adjust at least one parameter of the trailing sensor in response to the configuration adjustment; and a trailing sensor responsive to the configuration adjustment, the inspection robot interpreting position information on an inspection surface, interpreting inspection data from the inspection robot, correlating the inspection data to the position information to determine position informed inspection data, and providing the position informed inspection data as one of additional inspection data or updated inspection data.

An example system including an inspection robot comprising at least one payload; a plurality of arms, wherein each of the plurality of arms is pivotally mounted to the at least one payload; a plurality of sleds, wherein each sled is pivotally mounted to one of the plurality of arms, wherein the plurality of sleds is distributed horizontally across the payload; and a plurality of sensors, wherein each sensor is mounted to a corresponding plurality of sleds such that the sensor is operationally couplable to an inspection surface in contact with a bottom surface of the plurality of sleds.

An example system including an inspection robot, and a plurality of sleds mounted to the inspection robot; a plurality of acoustic sensors, wherein each acoustic sensor is mounted to a corresponding one of the sleds such that the sensor is operationally couplable to an inspection surface in contact with a bottom surface of the corresponding one of the sleds; and a couplant chamber disposed within each of the plurality of sleds, each couplant chamber interposed between a transducer of the acoustic sensor mounted to the sled and the inspection surface; the inspection robot providing a fixed acoustic path between a sensor coupled to an inspection robot and an inspection surface, filling the acoustic path with a couplant, and acoustically interrogating the inspection surface with the sensor.

An example system including an inspection robot, and a plurality of sleds mounted to the inspection robot; a plurality of acoustic sensors, wherein each acoustic sensor is mounted to a corresponding one of the sleds such that the sensor is operationally couplable to an inspection surface in contact with a bottom surface of the corresponding one of the sleds; a couplant chamber disposed within each of the plurality of sleds, each couplant chamber interposed between a transducer of the acoustic sensor mounted to the sled and the inspection surface; wherein each couplant chamber comprises a cone, the cone comprising a cone tip portion at an inspection surface end of the cone, and a sensor mounting end opposite the cone tip portion, and wherein the cone tip portion defines a couplant exit opening.

An example system including an inspection robot, and a plurality of sleds mounted to the inspection robot; a plurality of sensors, wherein each sensor is mounted to a corresponding one of the sleds such that the sensor is operationally couplable to an inspection surface in contact with a bottom surface of the corresponding one of the sleds; a couplant chamber disposed within each of the plurality of sleds, each couplant chamber interposed between a transducer of the sensor mounted to the sled and the inspection surface, wherein each couplant chamber comprises a cone, the cone comprising a cone tip portion at an inspection surface end of the cone, and a sensor mounting end opposite the cone tip portion, and wherein the cone tip portion defines a couplant exit opening; the inspection robot providing a fixed acoustic path between a sensor coupled to an inspection robot and an inspection surface; filling the acoustic path with a couplant; and acoustically interrogating the inspection surface with the sensor.

A system, comprising: an inspection robot comprising a plurality of payloads; a plurality of arms, wherein each of the plurality of arms is pivotally mounted to one of the plurality of payloads; and a plurality of sleds, wherein each sled is pivotally mounted to one of the plurality of arms, wherein each sled comprises an upper portion and a replaceable lower portion having a bottom surface, and a plurality of sensors, wherein each sensor is mounted to a corresponding one of the sleds such that the sensor is operationally couplable to an inspection surface in contact with a bottom surface of the corresponding one of the sleds.

An example system including an inspection robot comprising at least one payload; a plurality of arms, wherein each of the plurality of arms is pivotally mounted to the at least one payload; a plurality of sleds, wherein each sled is pivotally mounted to one of the plurality of arms, and wherein the plurality of sleds is distributed horizontally across the payload; an acoustic data circuit structured to interpret return signals from an inspection surface to determine raw acoustic data; a thickness processing circuit structured to determine a primary mode score value in response to the raw acoustic data, and in response to the primary mode score value exceeding a predetermined threshold, determining a primary mode value corresponding to a thickness of the inspection surface material.

An example system including an inspection robot comprising at least one payload; a plurality of arms, wherein each of the plurality of arms is pivotally mounted to the at least one payload; a plurality of sleds, wherein each sled is pivotally mounted to one of the plurality of arms, and wherein the plurality of sleds is distributed horizontally across the payload; an electromagnetic (EM) data circuit structured to interpret EM induction data provided by a magnetic induction sensor; a substrate distance circuit structured to determine a substrate distance value between the magnetic induction sensor and a ferrous substrate of an inspection surface; and an EM diagnostic circuit structured to provide a diagnostic value in response to the substrate distance value.

An example system including an inspection robot comprising a plurality of payloads; a plurality of arms, wherein each of the plurality of arms is pivotally mounted to one of the plurality of payloads; a plurality of sleds, wherein each sled is pivotally mounted to one of the plurality of arms; a plurality of sensors, wherein each sensor is mounted to a corresponding one of the sleds such that the sensor is operationally couplable to an inspection surface in contact with a bottom surface of the corresponding one of the sleds; a biasing member disposed within each of the sleds, wherein the biasing member provides a down force to the corresponding one of the plurality of sensors; the inspection robot providing a fixed acoustic path between a sensor coupled to an inspection robot and an inspection surface, filling the acoustic path with a couplant, and acoustically interrogating the inspection surface with the sensor.

An example system includes an inspection robot having a plurality of wheels, wherein the plurality of wheels are positioned to engage an inspection surface when the inspection robot is positioned on the inspection surface; wherein each of the plurality of wheels comprises a magnetic hub portion interposed between enclosure portions; wherein the inspection robot further comprises a gear box motively coupled to at least one of the wheels, and wherein the gear box comprises at least one thrust washer axially interposed between two gears of the gear box; and wherein the enclosure portions extend past the magnetic hub portion and thereby prevent contact of the magnetic hub portion with the inspection surface.

An example system including an inspection robot comprising a plurality of payloads; a plurality of arms, wherein each of the plurality of arms is mounted to one of the plurality of payloads; a plurality of sleds, wherein each sled is pivotally mounted to one of the plurality of arms; a plurality of sensors, wherein each sensor is mounted to a corresponding one of the sleds such that the sensor is operationally couplable to an inspection surface in contact with a bottom surface of the corresponding one of the sleds, wherein each sled is pivotally mounted to one of the plurality of arms at a selected one of a plurality of pivot point positions; and a controller configured to select the one of the plurality of pivot point positions during an inspection run of the inspection robot, the controller configured to select the one of the plurality of pivot point positions in response to a travel direction of the inspection robot, wherein each sled is pivotally mounted to one of the plurality of arms at a plurality of pivot point positions.

An example system including an inspection data circuit structured to interpret lead inspection data from a lead sensor; a sensor configuration circuit structured to determine a configuration adjustment for a trailing sensor in response to the lead inspection data; a sensor operation circuit structured to adjust at least one parameter of the trailing sensor in response to the configuration adjustment;

the system interpreting inspection data from an inspection robot on an inspection surface; interpreting position data for the inspection robot; and determining an inspection map in response to the inspection data and the position data, and providing at least a portion of the inspection map for display to a user.

An example method including determining an inspection resolution for an inspection surface; configuring an inspection robot by providing a plurality of horizontally distributed sensors operationally coupled to the inspection robot in response to the inspection resolution; performing an inspection operation on the inspection surface at a resolution at least equal to the inspection resolution, wherein the plurality of horizontally distributed sensors are provided on a first payload of the inspection robot, and wherein the configuring the inspection robot further comprises enhancing at least one of a horizontal sensing resolution or a vertical sensing resolution of the inspection robot by providing a second plurality of horizontally distributed sensors on a second payload of the inspection robot; interpreting inspection data from the inspection robot on an inspection surface; interpreting position data for the inspection robot; and determining an inspection map in response to the inspection data and the position data, and providing at least a portion of the inspection map for display to a user.

An example system including an inspection robot comprising at least one payload; a plurality of arms, wherein each of the plurality of arms is pivotally mounted to the at least one payload; a plurality of sleds, wherein each sled is pivotally mounted to one of the plurality of arms; and a plurality of sensors mounted on each of the plurality of sleds; the inspection robot determining an induction processing parameter, and adjusting an inspection plan for an inspection robot in response to the induction processing parameter.

An example system including an inspection robot comprising at least one payload; a plurality of arms, wherein each of the plurality of arms is pivotally mounted to the at least one payload; a plurality of sleds, wherein each sled is pivotally mounted to one of the plurality of arms; a plurality of sensors mounted on each of the plurality of sleds; an inspection data circuit structured to interpret lead inspection data from a lead sensor; a sensor configuration circuit structured to determine a configuration adjustment for a trailing sensor in response to the lead inspection data; and a sensor operation circuit structured to adjust at least one parameter of the trailing sensor in response to the configuration adjustment.

An example system including an inspection robot comprising a plurality of payloads; a plurality of arms, wherein each of the plurality of arms is pivotally mounted to one of the plurality of payloads; a plurality of sleds, wherein each sled is pivotally mounted to one of the plurality of arms, and wherein each sled comprises a bottom surface; and a removable layer positioned on each of the bottom surfaces;

the inspection robot determining an induction processing parameter, and adjusting an inspection plan for an inspection robot in response to the induction processing parameter.

An example system including an inspection robot having a plurality of wheels, wherein the plurality of wheels are positioned to engage an inspection surface when the inspection robot is positioned on the inspection surface, wherein each of the plurality of wheels comprises a magnetic hub portion interposed between enclosure portions, wherein the enclosure portions extend past the magnetic hub portion and thereby prevent contact of the magnetic hub portion with the inspection surface, the inspection robot providing a fixed acoustic path between a sensor coupled to an inspection robot and an inspection surface, filling the acoustic path with a couplant, and acoustically interrogating the inspection surface with the sensor.

An example method includes: performing an inspection operation on an inspection surface, the inspection operation including an inspection surface profiling operation; detecting a feature on the inspection surface and marking the feature virtually on an inspection map; determining a contour of at least a portion of the inspection surface in response to the surface profiling operation; and adjusting a calibration of an ultra-sonic sensor in response to the contour.

Certain further aspects of an example method are described following, any one or more of which may be included in certain embodiments of the example method.

An example method may further include wherein the inspection operation includes interrogating the inspection surface with an electromagnetic sensor; determining an induction processing parameter in response to the interrogating; and further adjusting the calibration of the ultra-sonic sensor in response to the induction processing parameter.

An example method may further include wherein the detected feature includes at least one feature selected from the features consisting of: a weld, a groove, a crack, and a coating difference area.

An example apparatus includes: an inspection data circuit structured to interpret inspection data from an inspection robot on an inspection surface; a robot positioning circuit structured to interpret position data for the inspection robot; an electromagnetic (EM) data circuit structured to interpret EM induction data provided by a magnetic induction sensor; a substrate distance circuit structured to determine a substrate distance value between the magnetic induction sensor and a ferrous substrate of an inspection surface; an EM diagnostic circuit structured to provide a diagnostic value in response to the substrate distance value; and an inspection visualization circuit structured to determine an inspection map in response to the inspection data and the position data, and to provide at least a portion of the inspection map for display to a user.

Certain further aspects of an example apparatus are described following, any one or more of which may be included in certain embodiments of the example apparatus.

An example apparatus may further include wherein the diagnostic value includes at least one value selected from the values consisting of: a rationality check indicating whether the sensor is positioned in proximity to the inspection surface; and a sensor position value indicating a distance from a second sensor to the substrate of the inspection surface.

An example apparatus may further include wherein the inspection visualization circuit is further responsively structured to interpret a user focus value, and to update the inspection map in response to the user focus value.

An example method includes: determining an inspection resolution for an inspection surface; configuring an inspection robot by providing a plurality of horizontally distributed sensors operationally coupled to the inspection robot in response to the inspection resolution; performing an inspection operation on the inspection surface at a resolution at least equal to the inspection resolution; interpreting inspection data from the inspection robot on the inspection surface; interpreting position data for the inspection robot; determining an inspection map in response to the inspection data and the position data; detecting a feature on the inspection surface and marking the feature virtually on the inspection map; and providing at least a portion of the inspection map for display to a user.

Certain further aspects of an example method are described following, any one or more of which may be included in certain embodiments of the example method.

An example method may further include wherein the performing the inspection operation includes interrogating the inspection surface acoustically utilizing the plurality of horizontally distributed sensors.

An example apparatus includes: a controller, the controller including: an electromagnetic (EM) data circuit structured to interpret EM induction data provided by a magnetic induction sensor; a substrate distance circuit structured to determine a substrate distance value between the magnetic induction sensor and a ferrous substrate of an inspection surface; an EM diagnostic circuit structured to provide a diagnostic value in response to the substrate distance value; a position definition circuit structured to interpret position information for an inspection robot on an inspection surface; and a data positioning circuit to correlate the substrate distance values to the position information to determine position informed substrate distance values and wherein the data positioning circuit is further structured to provide the position informed substrate distance values as one of additional inspection data or updated inspection data.

Certain further aspects of an example apparatus are described following, any one or more of which may be included in certain embodiments of the example apparatus.

An example apparatus may further include wherein the diagnostic value includes at least one value selected from the values consisting of: a rationality check indicating whether the sensor is positioned in proximity to the inspection surface; and a sensor position value indicating a distance from a second sensor to the substrate of the inspection surface.

An example apparatus may further include wherein the position definition circuit is further structured to determine the position information according to at least one of: global positioning service (GPS) data; an ultra-wide band radio frequency (RF) signal; a LIDAR measurement; a dead reckoning operation; a relationship of the inspection robot position to a reference point; a barometric pressure value; and a known sensed value correlated to a position of the inspection robot.

An example apparatus includes: an acoustic data circuit structured to interpret return signals from an inspection surface to determine raw acoustic data; a thickness processing circuit structured to determine a primary mode score value in response to the raw acoustic data, and in response to the primary mode score value exceeding a predetermined threshold, determining a primary mode value corresponding to a thickness of the inspection surface material; a robot positioning circuit structured to interpret position data for the inspection robot; and an inspection visualization circuit structured to determine an inspection map in response to the thickness of the inspection surface material and the position data, and to provide at least a portion of the inspection map for display to a user.

Certain further aspects of an example apparatus are described following, any one or more of which may be included in certain embodiments of the example apparatus.

An example apparatus may further include wherein the inspection visualization circuit is further structured to determine an inspection map in response to the primary mode score value.

An example apparatus may further include wherein the thickness processing circuit is further structured to determine, in response to the primary mode score value not exceeding the predetermined threshold, a secondary mode score value in response to the raw acoustic data.

An example method includes: accessing an industrial system including an inspection surface, wherein the inspection surface includes a personnel risk feature; operating an inspection robot to inspect at least a portion of the inspection surface, wherein the inspection robot has a plurality of wheels and wherein each of the plurality of wheels includes a magnetic hub portion interposed between enclosure portions, the enclosure portions extending past the magnetic hub portion and thereby preventing contact of the magnetic hub portion with the inspection surf; and wherein operating the inspection is performed with at least a portion of the industrial system providing the personnel risk feature still operating.

Certain further aspects of an example method are described following, any one or more of which may be included in certain embodiments of the example method.

An example method may further include wherein the personnel risk feature includes at least one of a portion of the inspection surface having an elevated height, an elevated temperature of at least a portion of the inspection surface, a portion of the inspection surface is positioned within the enclosed space, and an electrical power connection.

An example method may further include determining a position of the inspection robot within the industrial system during the operating the inspection robot, and shutting down only a portion of the industrial system during the inspection operation in response to the position of the inspection robot.

An example system includes: an inspection robot including: a plurality of payloads; a plurality of arms, wherein each of the plurality of arms is pivotally mounted to one of the plurality of payloads; and a plurality of sleds, wherein each sled is pivotally mounted to one of the plurality of arms, and wherein each sled includes a bottom surface; and a removable layer positioned on each of the bottom surfaces; and a controller, the controller including: an electromagnetic (EM) data circuit structured to interpret EM induction data provided by a magnetic induction sensor; a substrate distance circuit structured to determine a substrate distance value between the magnetic induction sensor and a ferrous substrate of an inspection surface; and an EM diagnostic circuit structured to provide a diagnostic value in response to the substrate distance value.

Certain further aspects of an example system are described following, any one or more of which may be included in certain embodiments of the example system.

An example system may further include wherein at least one of the sleds includes a magnetic induction sensor.

An example system may further include wherein the removable layer includes a thickness providing a selected spatial orientation between an inspection contact side of the removable layer and the bottom surface.

An example system may further include wherein the diagnostic value includes at least one value selected from the values consisting of: a rationality check indicating whether the sensor is positioned in proximity to the inspection surface; and a sensor position value indicating a distance from a second sensor to the substrate of the inspection surface.

An example system includes: an inspection robot including: at least one payload; a plurality of arms, wherein each of the plurality of arms is pivotally mounted to the at least one payload; a plurality of sleds, wherein each sled is pivotally mounted to one of the plurality of arms, and wherein the plurality of sleds is distributed horizontally across the payload; and wherein the horizontal distribution of the plurality of sleds provides for a selected horizontal resolution of the plurality of sensors.

An example system includes: an inspection robot including: a payload; a plurality of arms, wherein each of the plurality of arms is pivotally mounted to the payload; a plurality of sleds, wherein each sled is pivotally mounted to one of the plurality of arms, thereby configuring a horizontal distribution of the plurality of sleds; a plurality of sensors, wherein each sensor is mounted to a corresponding one of the sleds such that the sensor is operationally couplable to an inspection surface in contact with a bottom surface of the corresponding one of the sleds; and a couplant chamber disposed within each of the plurality of sleds, each couplant chamber interposed between a transducer of the sensor mounted to the sled and the inspection surface.

Certain further aspects of an example system are described following, any one or more of which may be included in certain embodiments of the example system.

An example system may further include wherein the horizontal distribution of the plurality of sleds provides for a selected horizontal resolution of the plurality of sensors.

An example system may further include a controller configured to determine the selected horizontal resolution and to configure a position of the plurality of arms on the payload in response to the selected horizontal resolution.

An example system may further include wherein each couplant chamber includes a cone, the cone including a cone tip portion at an inspection surface end of the cone, and a sensor mounting end opposite the cone tip portion, and wherein the cone tip portion defines a couplant exit opening.

An example system includes: an inspection robot; a plurality of sleds mounted to the inspection robot, wherein each sled is pivotally mounted at a selected one of a plurality of pivot point positions; a plurality of sensors, wherein each sensor is mounted to a corresponding one of the sleds such that the sensor is operationally couplable to an inspection surface in contact with a bottom surface of the corresponding one of the sleds; and a couplant chamber disposed within each of the plurality of sleds, each couplant chamber interposed between a transducer of the sensor mounted to the sled and the inspection surface.

Certain further aspects of an example system are described following, any one or more of which may be included in certain embodiments of the example system.

An example system may further include a controller configured to select the one of the plurality of pivot point positions during an inspection run of the inspection robot.

An example system may further include wherein each couplant chamber includes a cone, the cone including a cone tip portion at an inspection surface end of the cone, and a sensor mounting end opposite the cone tip portion, and wherein the cone tip portion defines a couplant exit opening.

An example system includes an inspection robot including a plurality of payloads; a plurality of arms, wherein each of the plurality of arms is pivotally mounted to one of the plurality of payloads; a plurality of sleds, wherein each sled is mounted to one of the plurality of arms at a selected one of a plurality of pivot point positions; a plurality of sensors, wherein each sensor is mounted to a corresponding one of the sleds such that the sensor is operationally couplable to an inspection surface in contact with a bottom surface of the corresponding one of the sleds; a couplant chamber disposed within each of the plurality of sleds, each couplant chamber interposed between a transducer of the sensor mounted to the sled and the inspection surface; and a biasing member coupled to each one of the plurality of arms, and wherein the biasing member provides a biasing force to corresponding one of the plurality of sleds, wherein the biasing force is directed toward the inspection surface.

An example system includes: an inspection robot, and a plurality of sleds mounted to the inspection robot; a plurality of sensors, wherein each sensor is mounted to a corresponding one of the sleds such that the sensor is operationally couplable to an inspection surface in contact with a bottom surface of the corresponding one of the sleds, wherein the bottom surface of the corresponding one of the sleds is contoured in response to a shape of the inspection surface; and a couplant chamber disposed within each of the plurality of sleds, each couplant chamber interposed between a transducer of the sensor mounted to the sled and the inspection surface.

Certain further aspects of an example system are described following, any one or more of which may be included in certain embodiments of the example system.

An example system may further include wherein each couplant chamber includes a cone, the cone including a cone tip portion at an inspection surface end of the cone, and a sensor mounting end opposite the cone tip portion, and wherein the cone tip portion defines a couplant exit opening.

An example system may further include wherein the inspection surface includes a pipe outer wall, and wherein the bottom surface of the corresponding one of the sleds includes a concave shape.

An example system may further include wherein the bottom surface of the corresponding one of the sleds includes at least one shape selected from the shapes consisting of: a concave shape, a convex shape, and a curved shape.

An example system includes: an inspection robot including a plurality of payloads; a plurality of arms, wherein each of the plurality of arms is pivotally mounted to one of the plurality of payloads; a plurality of sleds, wherein each sled is mounted to one of the plurality of arms; a plurality of sensors, wherein each sensor is mounted to a corresponding one of the sleds such that the sensor is operationally couplable to an inspection surface in contact with a bottom surface of the corresponding one of the sleds, wherein the bottom surface of the corresponding one of the sleds is contoured in response to a shape of the inspection surface; a couplant chamber disposed within each of the plurality of sleds, each couplant chamber interposed between a transducer of the sensor mounted to the sled and the inspection surface; and a biasing member coupled to each one of the plurality of arms, and wherein the biasing member provides a biasing force to corresponding one of the plurality of sleds, wherein the biasing force is directed toward the inspection surface.

An example method includes: providing an inspection robot having a plurality of payloads and a corresponding plurality of sleds for each of the payloads, wherein the bottom surface of the corresponding one of the sleds is contoured in response to a shape of an inspection surface; mounting a sensor on each of the sleds, each sensor mounted to a couplant chamber interposed between the sensor and the inspection surface, and each couplant chamber including a couplant entry for the couplant chamber; changing one of the plurality of payloads to a distinct payload; and wherein the changing of the plurality of payloads does not include dismounting any of the sensors from corresponding couplant chambers.

An example system includes an inspection robot including a plurality of payloads; a plurality of arms, wherein each of the plurality of arms is pivotally mounted to one of the plurality of payloads; and a plurality of sleds, wherein each sled is pivotally mounted to one of the plurality of arms, and wherein each sled includes a bottom surface defining a ramp and wherein each sled defines a chamber sized to accommodate a sensor.

Certain further aspects of an example system are described following, any one or more of which may be included in certain embodiments of the example system.

An example system may further include wherein each chamber further includes a stop, and wherein each of the plurality of sensors is positioned against the stop.

An example system may further include wherein each sensor positioned against the stop has a predetermined positional relationship with a bottom surface of the corresponding one of the plurality of sleds.

An example system may further include wherein each sled further includes the bottom surface defining two ramps, wherein the two ramps include a forward ramp and a rearward ramp.

An example system may further include wherein the ramp include at least one of a ramp angle and a ramp total height value.

An example system may further include wherein the at least one of the ramp angle and the ramp total height value are configured to traverse an obstacle on an inspection surface to be traversed by the inspection robot.

An example system includes: an inspection robot including a plurality of payloads; a plurality of arms, wherein each of the plurality of arms is pivotally mounted to one of the plurality of payloads; and a plurality of sleds, wherein each sled is pivotally mounted to one of the plurality of arms, and wherein each sled defines a chamber sized to accommodate a sensor, and wherein the bottom surface of the corresponding one of the sleds is contoured in response to a shape of an inspection surface.

Certain further aspects of an example system are described following, any one or more of which may be included in certain embodiments of the example system.

An example system may further include wherein each chamber further includes a stop, and wherein each of the plurality of sensors is positioned against the stop.

An example system may further include wherein each sensor positioned against the stop has a predetermined positional relationship with a bottom surface of the corresponding one of the plurality of sleds.

An example system may further include wherein the inspection surface includes a pipe outer wall, and wherein the bottom surface of the corresponding one of the sleds includes a concave shape.

An example system may further include wherein the bottom surface of the corresponding one of the sleds includes at least one shape selected from the shapes consisting of: a concave shape, a convex shape, and a curved shape.

An example system includes: an inspection robot including: a payload; a plurality of arms, wherein each of the plurality of arms is pivotally mounted to the payload; a plurality of sleds, wherein each sled is pivotally mounted to one of the plurality of arms, thereby configuring a horizontal distribution of the plurality of sleds; a plurality of sensors, wherein each sensor is mounted to a corresponding one of the sleds such that the sensor is operationally couplable to an inspection surface in contact with a bottom surface of the corresponding one of the sleds, wherein the bottom surface of the corresponding one of the sleds is contoured in response to a shape of an inspection surface; and a couplant chamber disposed within each of the plurality of sleds, each couplant chamber interposed between a transducer of the sensor mounted to the sled and the inspection surface.

Certain further aspects of an example system are described following, any one or more of which may be included in certain embodiments of the example system.

An example system may further include wherein the horizontal distribution of the plurality of sleds provides for a selected horizontal resolution of the plurality of sensors.

An example system may further include a controller configured to determine the selected horizontal resolution and to configure a position of the plurality of arms on the payload in response to the selected horizontal resolution.

An example system may further include wherein each couplant chamber includes a cone, the cone including a cone tip portion at an inspection surface end of the cone, and a sensor mounting end opposite the cone tip portion, and wherein the cone tip portion defines a couplant exit opening.

An example system may further include wherein the inspection surface includes a pipe outer wall, and wherein the bottom surface of the corresponding one of the sleds includes a concave shape.

An example system may further include wherein the bottom surface of the corresponding one of the sleds includes at least one shape selected from the shapes consisting of: a concave shape, a convex shape, and a curved shape.

An example system includes: an inspection robot including: a payload; a plurality of arms, wherein each of the plurality of arms is pivotally mounted to the payload; a plurality of sleds, wherein each sled is pivotally mounted to one of the plurality of arms at a selected one of a plurality of pivot point positions; thereby configuring a horizontal distribution of the plurality of sleds; a plurality of sensors, wherein each sensor is mounted to a corresponding one of the sleds such that the sensor is operationally couplable to an inspection surface in contact with a bottom surface of the corresponding one of the sleds; and a couplant chamber disposed within each of the plurality of sleds, each couplant chamber interposed between a transducer of the sensor mounted to the sled and the inspection surface.

Certain further aspects of an example system are described following, any one or more of which may be included in certain embodiments of the example system.

An example system may further include wherein the horizontal distribution of the plurality of sleds provides for a selected horizontal resolution of the plurality of sensors.

An example system may further include a controller configured to determine the selected horizontal resolution and to configure a position of the plurality of arms on the payload in response to the selected horizontal resolution.

An example system may further include wherein each couplant chamber includes a cone, the cone including a cone tip portion at an inspection surface end of the cone, and a sensor mounting end opposite the cone tip portion, and wherein the cone tip portion defines a couplant exit opening.

An example system includes: an inspection robot; a plurality of sleds mounted to the inspection robot, wherein each sled is pivotally mounted at a selected one of a plurality of pivot point positions; a plurality of sensors, wherein each sensor is mounted to a corresponding one of the sleds such that the sensor is operationally couplable to an inspection surface in contact with a bottom surface of the corresponding one of the sleds, wherein the bottom surface of the corresponding one of the sleds is contoured in response to a shape of an inspection surface; and a couplant chamber disposed within each of the plurality of sleds, each couplant chamber interposed between a transducer of the sensor mounted to the sled and the inspection surface.

Certain further aspects of an example system are described following, any one or more of which may be included in certain embodiments of the example system.

An example system may further include a controller configured to select the one of the plurality of pivot point positions during an inspection run of the inspection robot.

An example system may further include wherein each couplant chamber includes a cone, the cone including a cone tip portion at an inspection surface end of the cone, and a sensor mounting end opposite the cone tip portion, and wherein the cone tip portion defines a couplant exit opening.

An example system may further include wherein the inspection surface includes a pipe outer wall, and wherein the bottom surface of the corresponding one of the sleds includes a concave shape.

An example system may further include wherein the bottom surface of the corresponding one of the sleds includes at least one shape selected from the shapes consisting of: a concave shape, a convex shape, and a curved shape.

An example system includes: an inspection robot including: a payload; a plurality of arms, wherein each of the plurality of arms is pivotally mounted to the payload; a plurality of sleds, wherein each sled is pivotally mounted to one of the plurality of arms at a selected one of a plurality of pivot point positions; thereby configuring a horizontal distribution of the plurality of sleds; a plurality of sensors, wherein each sensor is mounted to a corresponding one of the sleds such that the sensor is operationally couplable to an inspection surface in contact with a bottom surface of the corresponding one of the sleds, wherein the bottom surface of the corresponding one of the sleds is contoured in response to a shape of an inspection surface; and a couplant chamber disposed within each of the plurality of sleds, each couplant chamber interposed between a transducer of the sensor mounted to the sled and the inspection surface.

Certain further aspects of an example system are described following, any one or more of which may be included in certain embodiments of the example system.

An example system may further include wherein the horizontal distribution of the plurality of sleds provides for a selected horizontal resolution of the plurality of sensors.

An example system may further include a controller configured to determine the selected horizontal resolution and to configure a position of the plurality of arms on the payload in response to the selected horizontal resolution.

An example system may further include wherein each couplant chamber includes a cone, the cone including a cone tip portion at an inspection surface end of the cone, and a sensor mounting end opposite the cone tip portion, and wherein the cone tip portion defines a couplant exit opening.

An example system may further include wherein the inspection surface includes a pipe outer wall, and wherein the bottom surface of the corresponding one of the sleds includes a concave shape.

An example system may further include wherein the bottom surface of the corresponding one of the sleds includes at least one shape selected from the shapes consisting of: a concave shape, a convex shape, and a curved shape.

Certain additional or alternative aspects of an inspection robot and/or a base station operatively coupled with the inspection robot are described following. Any one or more of the aspects described following may be added, combined with, and/or utilized as a replacement for any one or more aspects of other embodiments described throughout the present disclosure.

Figure 49:
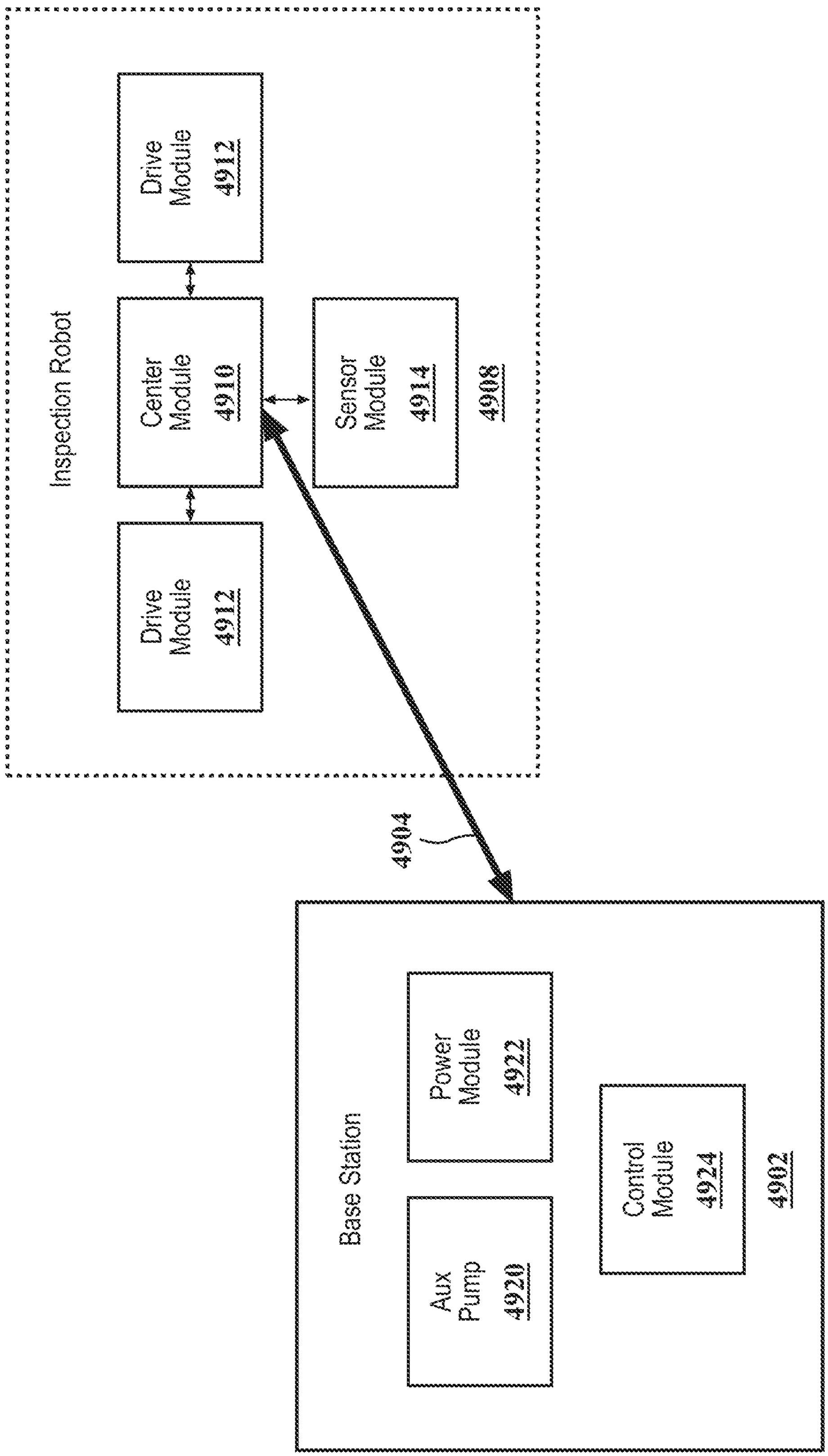
FIG. 49 depicts a schematic of an example system including a base station and an inspection robot.

As shown in FIG. 49, a system may comprise a base station 4902 connected by a tether 4904 to a center module 4910 of a robot 4908 used to traverse an industrial surface. The tether 4904 may be a conduit for power, fluids, control, and data communications between the base station 4902 and the robot 4908. The robot 4908 may include a center module 4910 connected to one or more drive modules 4912 which enable the robot 4908 to move along an industrial surface. The center module 4910 may be coupled to one or more sensor modules 4914 for measuring an industrial surface—for example the sensor modules 4914 may be positioned on a drive module 4912, on the payload, in the center body housing, and/or aspects of a sensor module 4914 may be distributed among these. An example embodiment includes the sensor modules 4914 each positioned on an associated drive module 4912, and electrically coupled to the center module 4910 for power, communications, and/or control. The base station 4902 may include an auxiliary pump 4920, a control module 4924 and a power module 4922. The example robot 4908 may be an inspection robot, which may include any one or more of the following features: inspection sensors, cleaning tools, and/or repair tools. In certain embodiments, it will be understood that an inspection robot 4908 is configured to perform only cleaning and/or repair operations, and/or may be configured for sensing, inspection, cleaning, and/or repair operations at different operating times (e.g., performing one type of operation at a first operating time, and performing another type of operation at a second operating time), and/or may be configured to perform more than one of these operations in a single run or traversal of an industrial surface (e.g., the "inspection surface"). The modules 4910, 4912, 4914, 4920, 4922, 4924 are configured to functionally execute operations described throughout the present disclosure, and may include any one or more hardware aspects as described herein, such as sensors, actuators, circuits, drive wheels, motors, housings, payload configurations, and the like.

Figure 50:
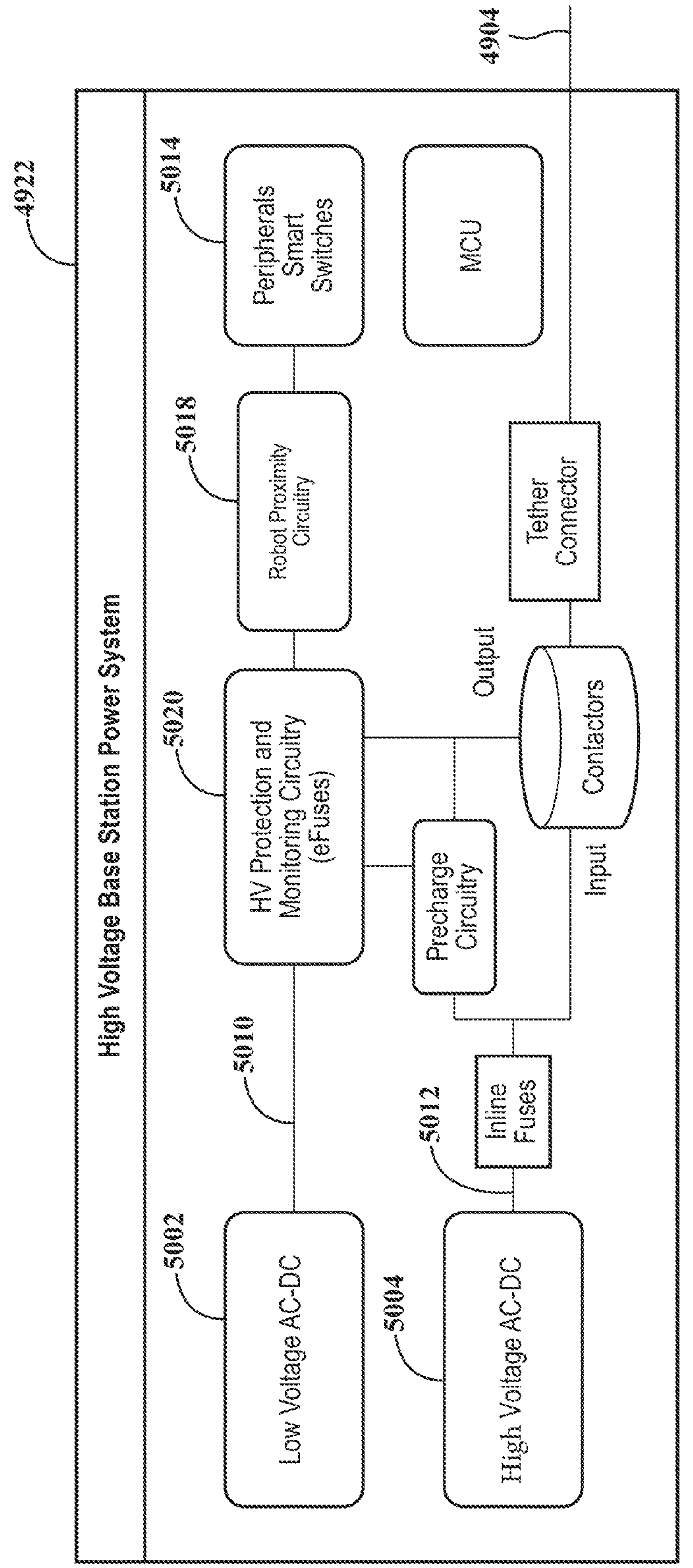
FIG. 50 depicts a schematic of a power module in a base station.

Referring to FIG. 50, the power module 4922 may receive AC electrical power as an input (e.g., from standard power outlets, available power at an industrial site, etc.), the input power may range, without limitation, from 85 Volts to 240 Volts and 10 Amps to 20 Amps. The power module 4922 may include transformers (e.g., two transformers 5002 5004). An example low power AC-DC transformer 5002 transforms the input power to a low output power 5010 of 24 Volts DC. An example high-power AC-DC transformer 5004 transforms the input power to a high output power 5012 of approximately 365 Volts DC. The use of the high output power 5012 as input to the robot 4908 provides a high-power density to the robot, and enables a reduction in the weight of the tether 4904 relative to that required if the lower output power 5010 were used to power the robot 4908, as well as providing for a higher robot climbing capability (e.g., using a longer tether), lower coupling forces on the tether, and/or providing extra capacity within a given tether weight profile for additional coupled aspects (e.g., communications, couplant flow capability, tether hardening or shielding capability, etc.). The low output power 5010 may be used to power peripherals 5014 on the base station 4902 such as an operator interface, a display, and the like. The low output power 5010 may also be used to power a robot proximity circuit 5018 and/or a HV protection and monitoring module 5020. An example system includes the control module 4924 of the base station using the low power output 5010 on the tether 4904 to verify the presence of the robot 4908 at the end of the tether 4904 using the robot proximity circuit 5018. The HV protection and monitoring module 5020 verifies the integrity of the tether by checking for overcurrent, shorts and voltage differences before coupling the high power output 5012. An example tether may include a proximity line having a specific resistor value. A safe, known low voltage may be supplied to the proximity line, the voltage at the top of the robot measured and the voltage drop compared with the expected voltage drop across the tether given the known resistance. Once the integrity of the tether 4904 and the presence of the robot 4908 are verified, the power through the tether 4904 is switched to the high output power 5012. The HV protection and monitoring module 5020 may include fuses of any type, which may be e-fuses allowing for re-coupling of protected circuits after a fuse is activated. The fuses protect the robot proximity module 5018 and the robot 4908 by shutting off power if an over current or short condition is detected. The use of the e-fuses enables the fuse to be reset with a command rather than having to physically replace the fuse.

The control module 4924 may be in communication with the robot 4908 by way of the tether 4904. Additionally or alternatively, the control module 4924 may communicate with the robot 4908 wirelessly, through a network, or in any other manner. The robot 4908 may provide the base station 4902 with any available information, such as, without limitation: the status of the robot 4908 and associated components, data collected by the sensor module 4914 regarding the industrial surface, vertical height of the robot 4908, water pressure and/or flow rate coming into the robot 4908, visual data regarding the robot's environment, position information for the robot 4908 and/or information (e.g., encoder traversal distances) from which the control module 4924 can determine the position of the robot. The control module 4924 may provide the robot 4908 with commands such as navigational commands, commands to the sensor modules regarding control of the sensor modules and the like, warning of an upcoming power loss, couplant pressure information, and the like.

The base station 4902 may receive an input of couplant, typically water, from an external source such as a plant or municipal water source. The base station 4902 may include a pressure and/or flow sensing device to measure incoming flow rate and/or pressure. Typically, the incoming couplant may be supplied directly to the tether 4904 for transport to the robot 4908. However, if the incoming pressure is low or the flow rate is insufficient, the couplant may be run through the auxiliary pump 4920 prior to supplying the couplant to the tether 4904. In certain embodiments, the base station 4902 may include a make-up tank and/or a couplant source tank, for example to supply couplant if an external source is unavailable or is insufficient for an extended period. The auxiliary pump 4920 may be regulated by the control module 4924 based on data from the sensor and/or combined with data received from the robot 4908. The auxiliary pump 4920 may be used to: adjust the pressure of the couplant sent to the robot 4908 based on the vertical height of the robot 4908; adjust for spikes or drops in the incoming couplant; provide intermittent pressure increases to flush out bubbles in the acoustic path of ultra-sonic sensors, and the like. The auxiliary pump 4920 may include a shut off safety valve in case the pressure exceeds a threshold.

Figure 51:
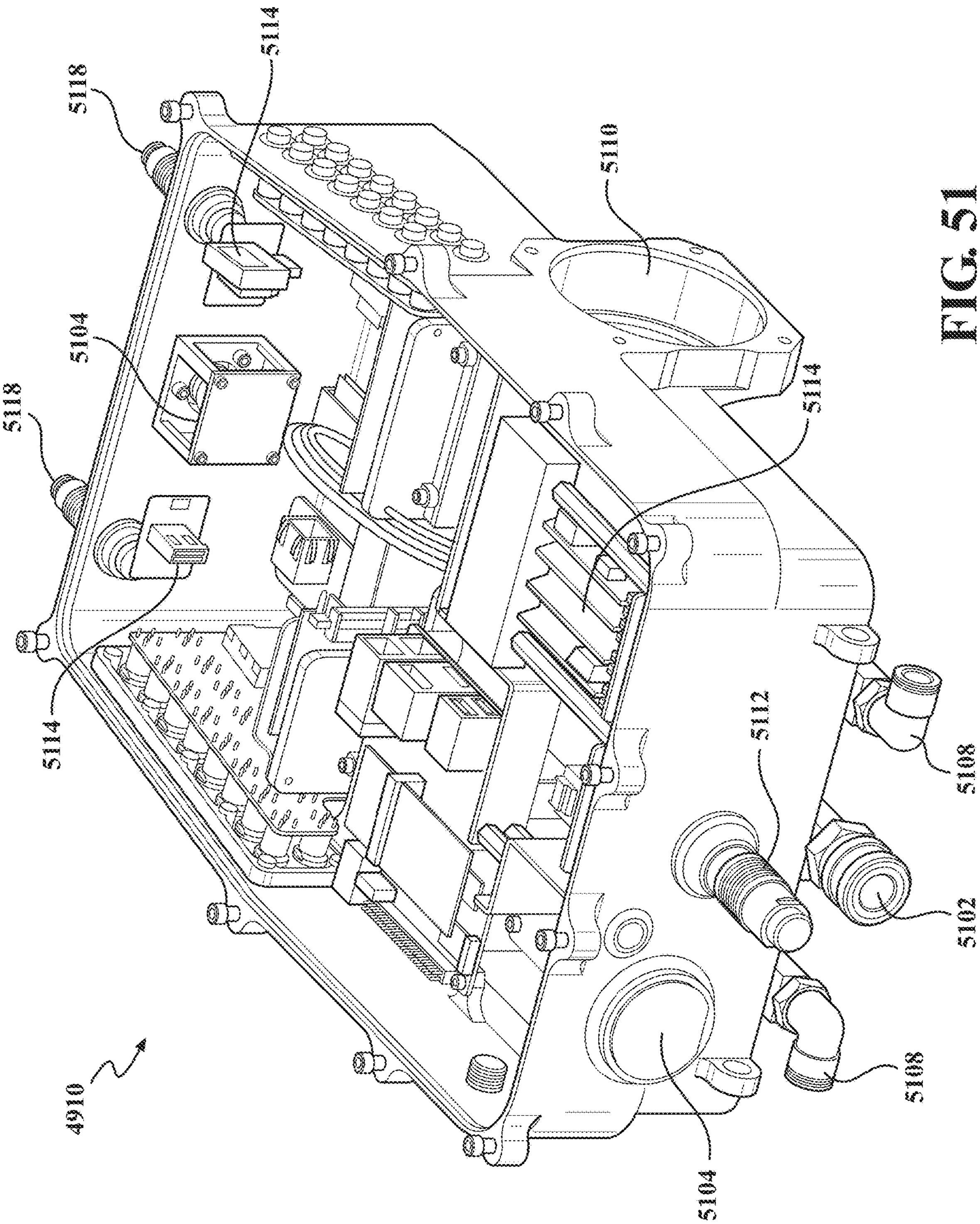
FIG. 51 depicts an internal view of certain components of the center module.

As shown in FIG. 51, the center module 4910 (or center body) of the robot may include a couplant inlet 5102, a data communications/control tether input 5112, forward facing and reverse facing navigation cameras 5104, multiple sensor connectors 5118, couplant outlets 5108 (e.g., to each payload), and one or more drive module connections 5110 (e.g., one on each side). An example center module 4910 includes a distributed controller design, with low-level and hardware control decision making pushed down to various low level control modules (e.g., 5114, and/or further control modules on the drive modules as described throughout the present disclosure). The utilization of a distributed controller design, for example as depicted schematically in FIG. 85, facilitates rapid design, rapid upgrades to components, and compatibility with a range of components and associated control modules 5114. For example, the distributed controller design allows the high level controller (e.g., the brain/gateway) to provide communications in a standardized high-level format (e.g., requesting movement rates, sensed parameter values, powering of components, etc.) without utilizing the hardware specific low-level controls and interfaces for each component, allowing independent development of hardware components and associated controls. The use of the low-level control modules may improve development time and enable the base level control module to be component neutral and send commands, leaving the specific implementation up to the low-level control module 5114 associated with a specific camera, sensor, sensor module, actuator, drive module, and the like. The distributed controller design may extend to distributing the local control to the drive module(s) and sensor module(s) as well.

Figure 52:
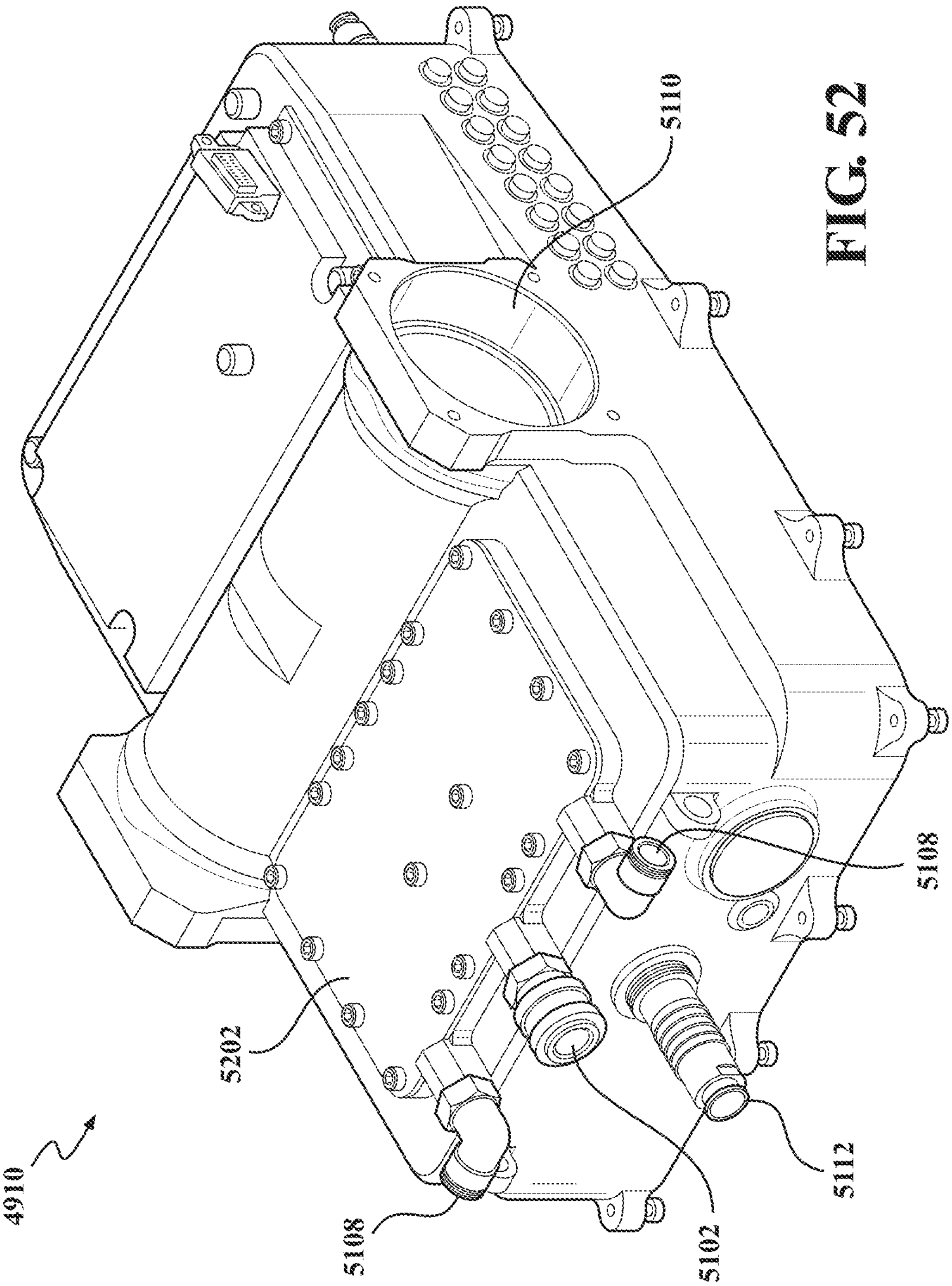
FIG. 52 depicts an example bottom surface of the center module.
Figure 53:
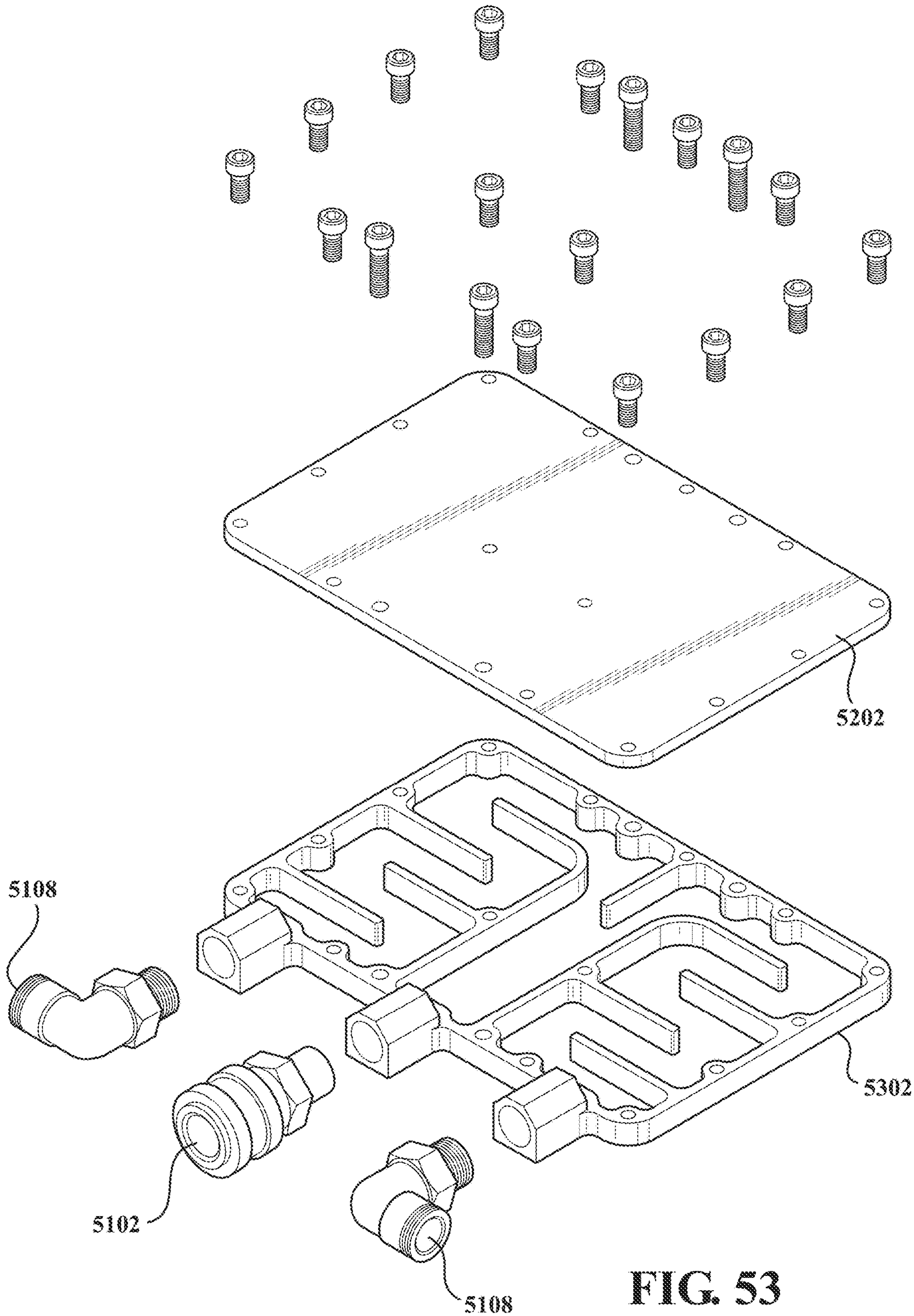
FIG. 53 depicts an exploded view of a cold plate on the bottom surface of the center module.

Referring to FIGS. 52-53, the bottom surface of the center module 4910 may include a cold plate 5202 to disperse heat built up by electronics in the center module 4910. Couplant transferred from the base station 4902 using the tether 4904 may be received at the couplant inlet 5102 where it then flows through a manifold 5302 where the couplant may transfer excess heat away from the central module 4910. The manifold 5302 may also split the water into multiple streams for output through two or more couplant outlets 5108. The utilization of the cold plate 5202 and heat transfer to couplant passing through the center body as a part of operations of the inspection robot provides for greater capability and reliability of the inspection robot by providing for improved heat rejection for heat generating components (e.g., power electronics and circuits), while adding minimal weight to the robot and tether. FIG. 53 depicts an example distribution of couplant flow through the cold plate and to each payload. In certain embodiments, couplant flow may also be provided to a rear payload, which may have a direct flow passage and/or may further include an additional cold plate on a rear portion of the inspection robot.

Figure 55:
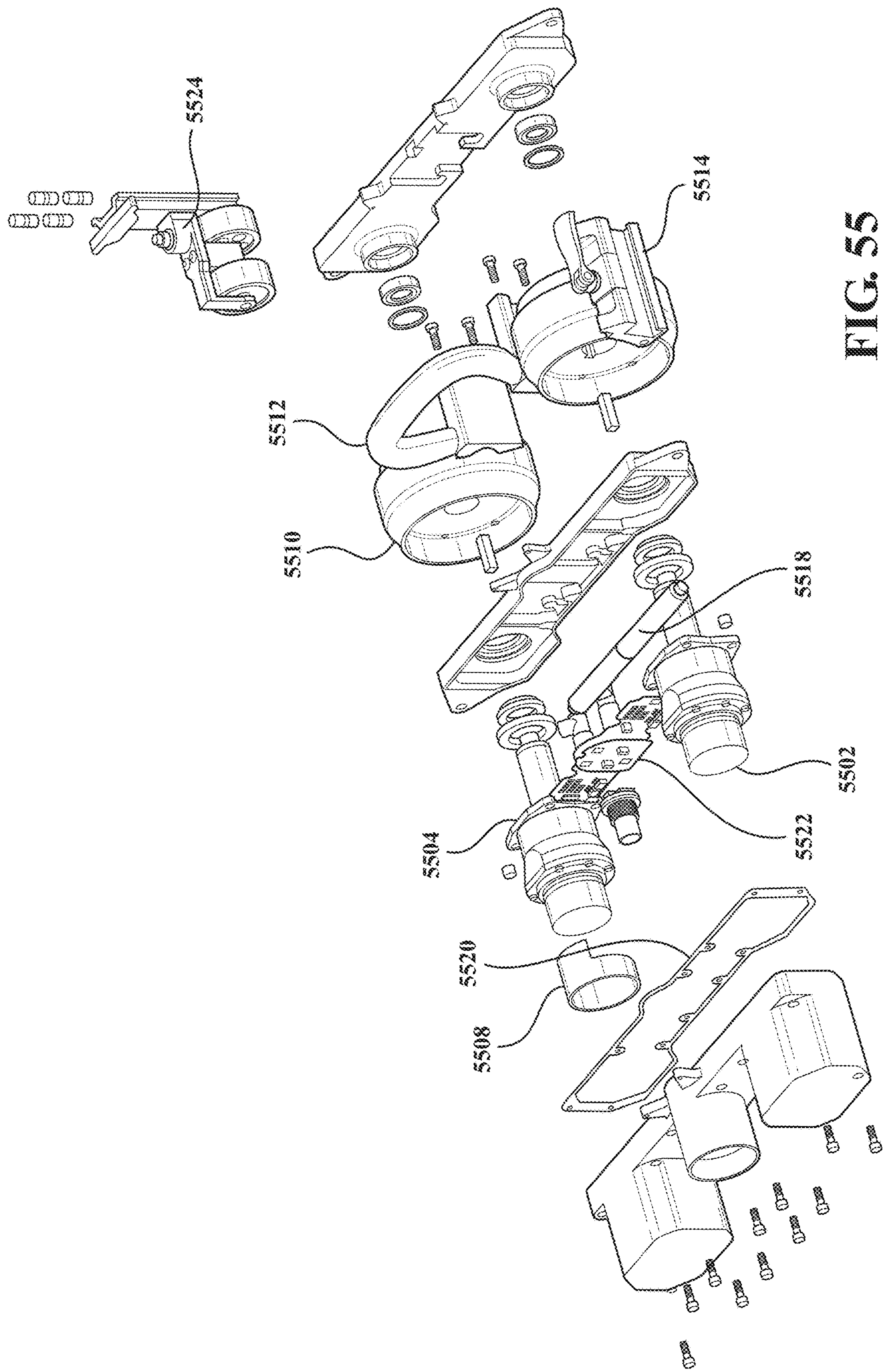
FIG. 55 depicts an exploded view of a drive module.

FIG. 55 shows an exterior and exploded view of a drive module 4912. A drive module 4912 may include motors 5502 and motor shielding 5508, a wheel actuator assembly 5504 housing the motor, and wheel assemblies 5510 including, for example, a magnetic wheel according to any magnetic wheel described throughout the present disclosure. An example drive module 4912 includes a handle 5512 to enable an operator to transport the robot 4908 and position the robot 4908 on an industrial surface. The motor shielding 5508 may be made of an electrically conductive material, and provide protection for the motors 5502 and associated motor position and/or speed sensors (e.g., a hall effect sensor) from electro-magnetic interference (EMI) generated by the wheel assembly 5510. The drive module 4912 provides a mounting rail 5514 for a payload and/or sensor module 4914, which may cooperate with a mounting rail on the center body to support the payload. An example drive module 4912 includes one or more payload actuators 5518 (e.g., the payload gas spring) for engaging and disengaging the payload or sensor module 4914 from an inspection surface (or industrial surface), and/or for adjusting a down force of the payload (and thereby a downforce for specific sensor carriages and/or sleds) relative to the inspection surface. The drive module 4912 may include a connecter 5520 that provides an interface with the center module for power and communications.

Figure 54B:
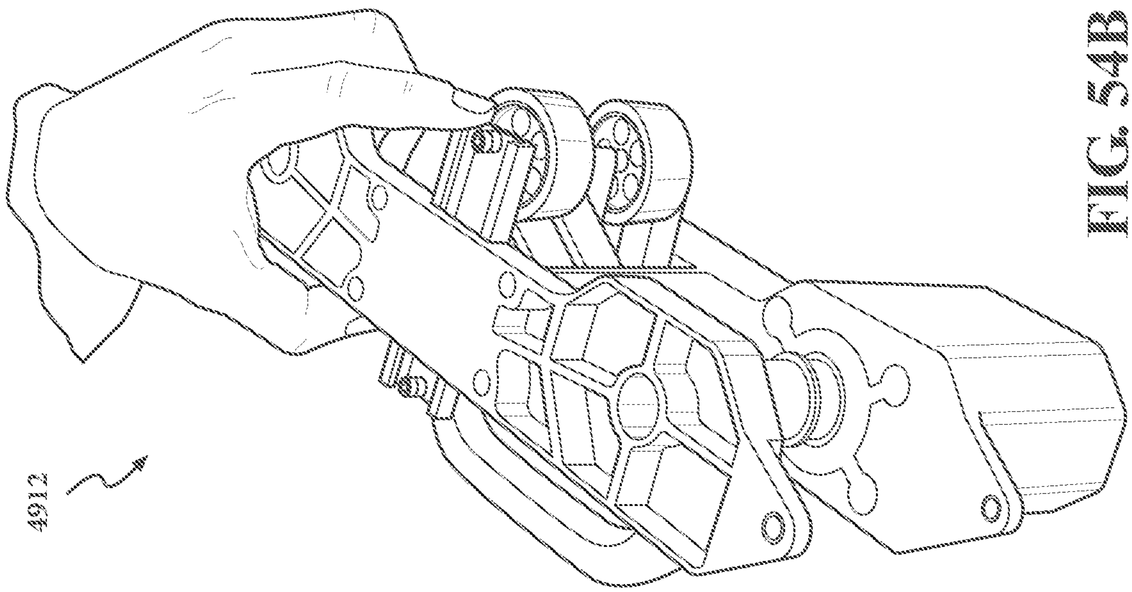
FIGS. 54A-54B depict an exterior view of a drive module, having an encoder in a first position and in a second position.
Figure 54A:
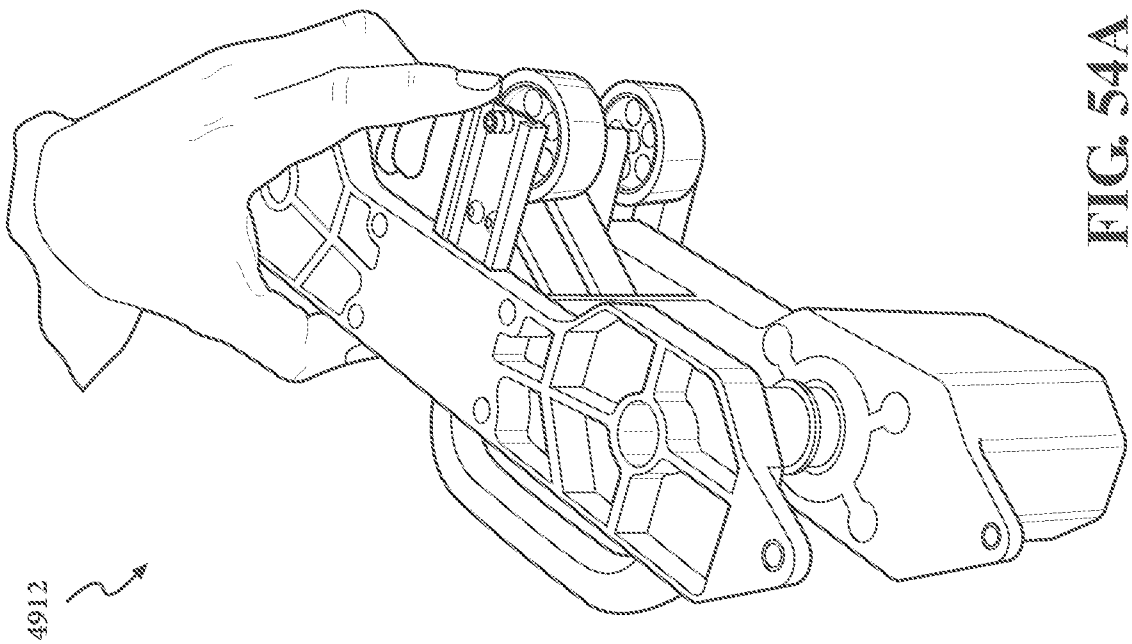

FIG. 54A depicts an external view of an example drive module 4912, with an encoder assembly 5524 (reference FIG. 55) depicted in an extended position (left figure) or a partially retracted position (right figure). The encoder assembly 5524 in the examples of FIGS. 54A-54B and FIG. 55 includes a passive wheel that remains in contact with the inspection surface, and an encoder detecting the turning of the wheel (e.g., including a hall effect sensor). The encoder assembly 5524 provides for an independent determination of the movement of the inspection robot, thereby allowing for corrections, for example, where the magnetic wheels may slip or lose contact with the inspection surface, and accordingly the determination of the inspection robot position and/or movement from the magnetic wheels may not provide an accurate representation of the movement of the inspection robot. In certain embodiments, a drive module on each side of the center body each include a separate encoder assembly 5524, thereby providing for detection and control for turning or other movement of the inspection robot.

Each drive module 4912 may have an embedded microcontroller 5522 which provides control and communications relating to the motors, actuators, sensors, and/or encoders associated with that drive module 4912. The embedded microcontroller 5522 responds to navigational and/or speed commands from the base station 4902 and/or high level center body controller, obstacle detection, error detection, and the like. In certain embodiments, the drive module 4912 is reversible and will function appropriately, independent of the side of the center module 4910 to which it is attached. The drive module 4912 may have hollowed out portions (e.g., the frame visible in FIGS. 54A-54B) which may be covered, at least in part, of a screen (e.g., a carbon fiber screen) to reduce the overall weight of the drive module. The utilization of a screen, in certain embodiments, provides protection from the hollowed out portion filling with debris or other material that may provide increased weight and/or undesirable operation of the inspection robot.

Figure 56A:
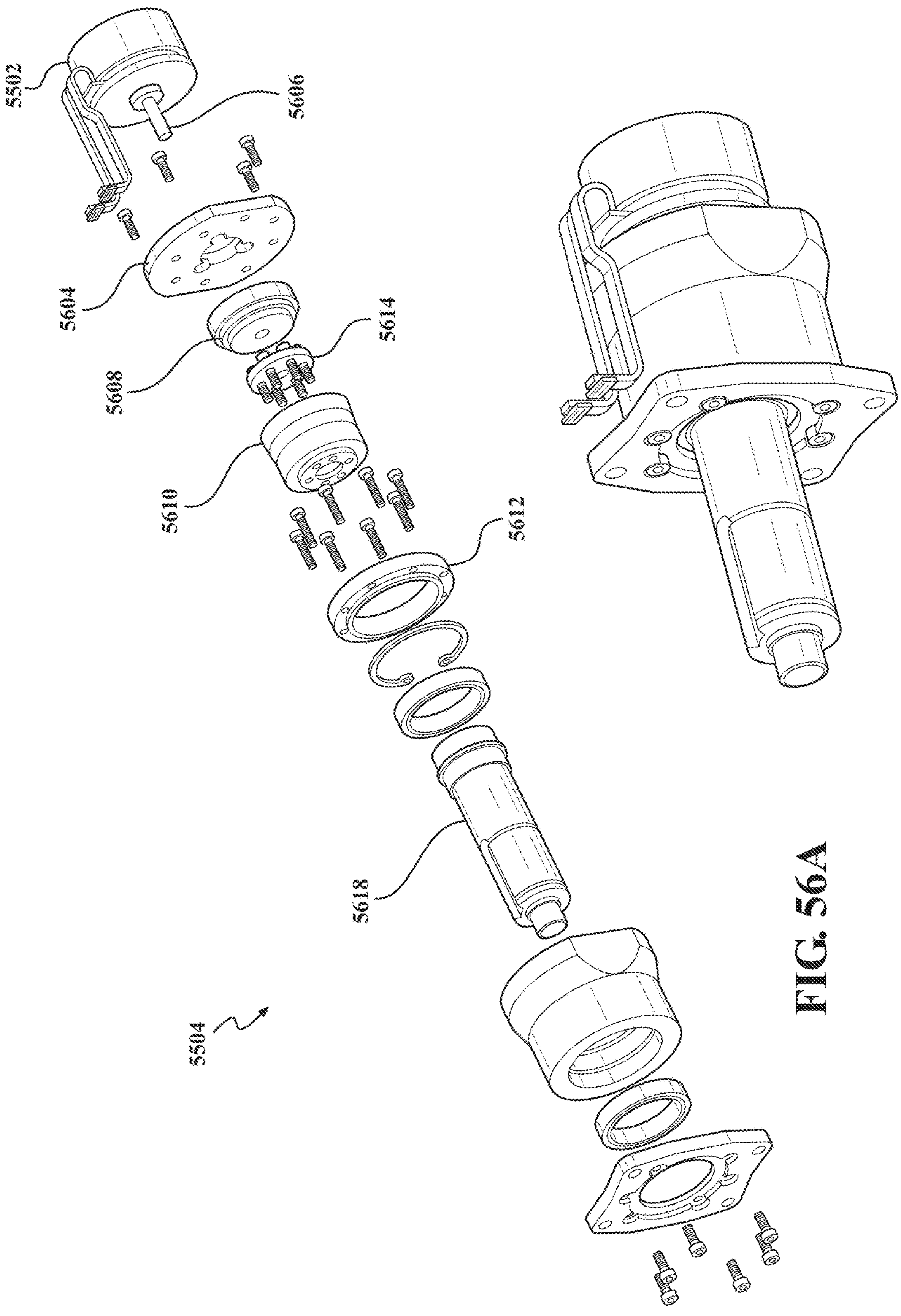
FIG. 56A depicts an exploded view of a drive wheel actuator.
Figure 56B:
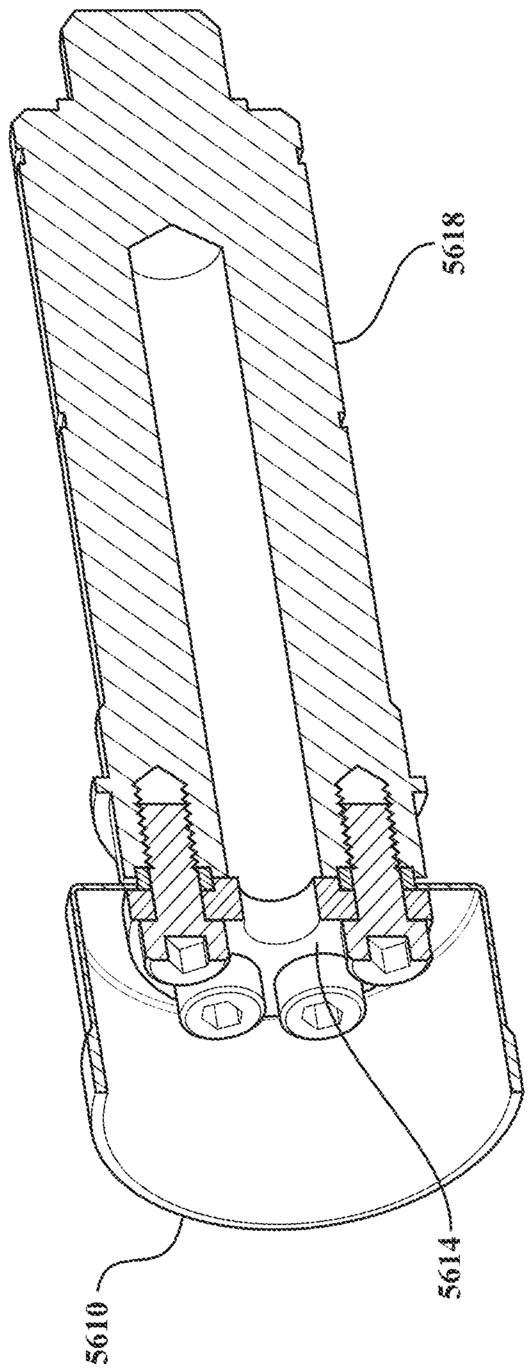
FIG. 56B depicts a cross section of drive shaft and flex cup of a strain wave transmission for a drive assembly of a drive module.

FIG. 56A shows an exploded view of an actuator assembly 5504 that drives a wheel assembly 5510 of the drive module 4912. FIG. 56B shows a cross section of a drive shaft and flex cup of a strain wave transmission. A motor 5502 may be attached to an aft plate 5604 with the motor shaft 5606 protruding through the aft plate 5604. A wave generator 5608, a non-circular ball bearing, may be mounted to the motor shaft 5606. The wave generator 5608 is spun inside of a cup style strain wave gearbox (flex spline cup 5610). The flex spline cup 5610 may spin on the wave generator 5608 and interact with a ring gear 5612, the ring gear 5612, having fewer teeth than the flex spline cup 5610. This causes the gear set to "walk" which provides for a high ratio of angular speed reduction in a compact form (e.g., a short axial distance). The flex spline cup 5610 may be bolted, using the bolt plate 5614 to the driveshaft output shaft 5618. The interaction of the wave generator 5608 and the flex spline cup 5610 result in, for example, a fifty to one (50:1) reduction in rotational speed between the motor shaft 5606 and the driveshaft output shaft 5618. The example reduction ratio is non-limiting, and any desired reduction ratio may be utilized. Example and non-limiting considerations for the reduction ratio include: the speed and/or torque profile of available motors 5502; the weight, desired trajectory (e.g., vertical, horizontal, or mixed), and/or desired speed of the inspection robot; the available space within the inspection robot for gear ratio management; the size (e.g. diameter) of the drive wheels, drive shaft, and/or any other aspect of the driveline (e.g., torque path between the motor 5502 and the drive wheels); and/or the available power to be provided to the inspection robot. Further, the use of this mechanical method of reduction in rotational speed is not affected by any EMI produced by the magnets in the wheel modules (e.g., as a planetary gear set or other gear arrangements might be).

In addition to providing power to drive a wheel assembly, a motor 5502 may act as a braking mechanism for the wheel assembly. The board with the embedded microcontroller 5522 for the motor 5502 may include a pair of power-off relays. When power to the drive module 4912 is lost or turned off, the power-off relays may short the three motor phases of the motor 5502 together, thus increasing the internal resistance of the motor 5502. The increased resistance of the motor 5502 may be magnified by the flex spline cup 5610, preventing the robot 4908 from rolling down a wall in the event of a power loss.

Figure 57A:
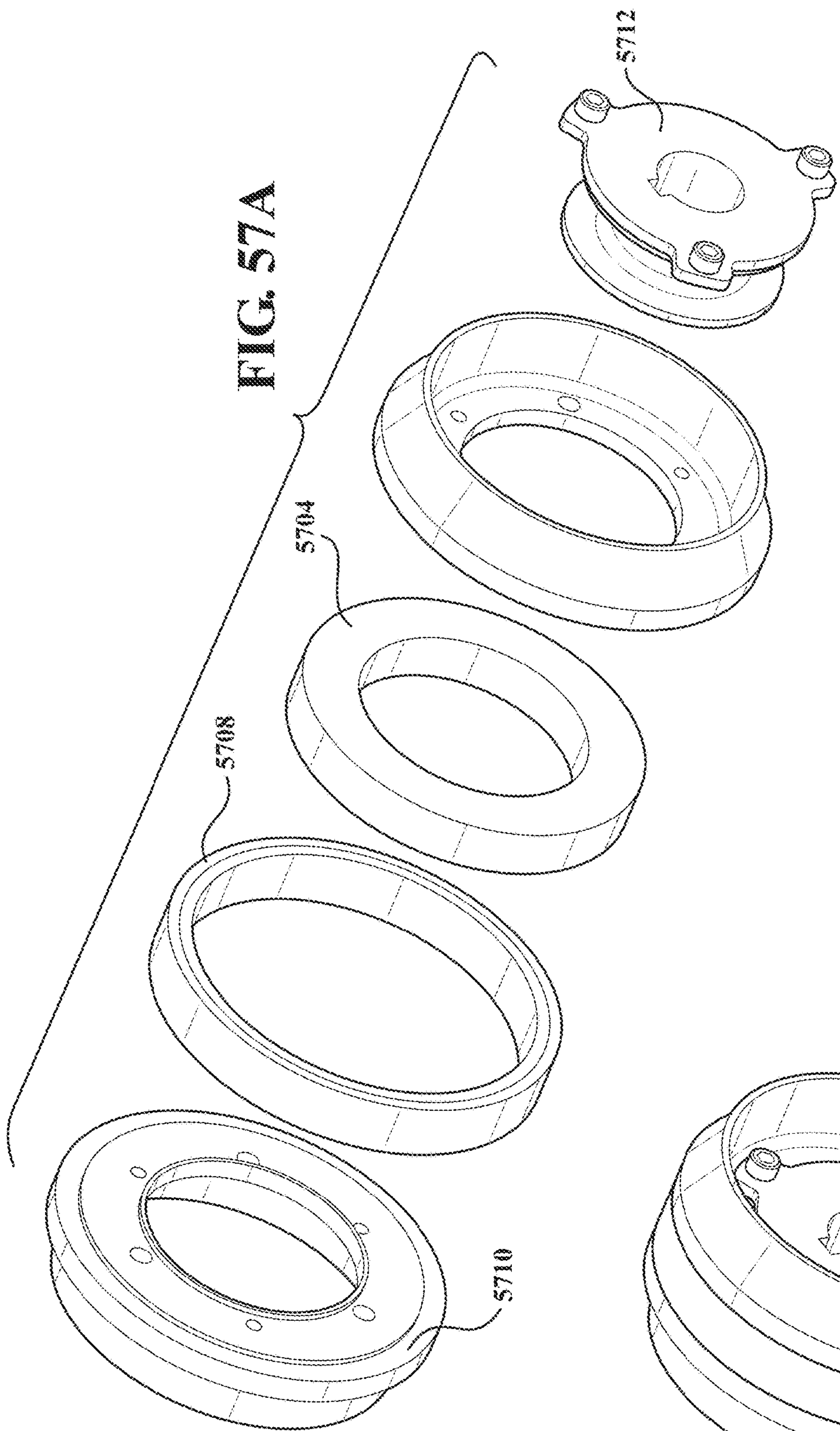
FIGS. 57A-57B depicts an exploded and an assembled view of a universal wheel.
Figure 57B:
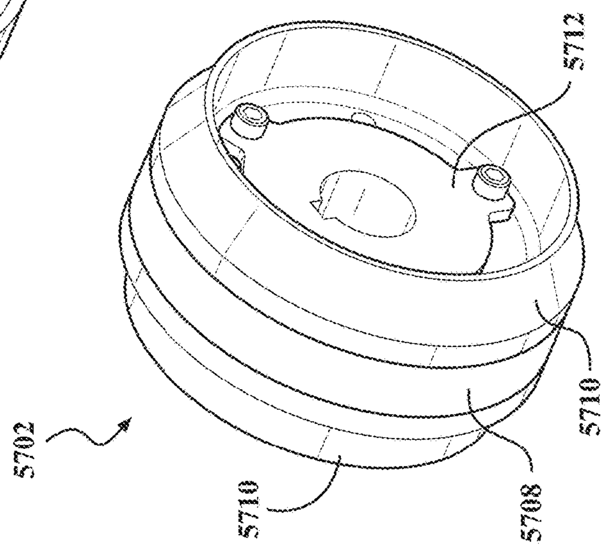

There may be a variety of wheel assembly 5510 configurations, which may be provided in alternate embodiments, swapped by changing out the wheels, and/or swapped by changing out the drive modules 4912. FIG. 57A depicts an exploded view of a universal wheel 5702 and FIG. 57B depicts an assembled universal wheel 5702. The universal wheel 5702 may include wheel plates 5710, a hub 5712 for attaching the universal wheel 5702 to a driveshaft output shaft 5618 of a drive module 4912, and a magnet 5704 covered by a tire 5708. The magnet 5704, which may be a rare earth magnet, enables the robot 4908 to hold to an industrial surface being traversed. The universal wheel 5702 has two wheel plates 5710 which angle up and inward such that the wheel is stable riding on two different pipes (e.g., on the inner side and/or outer side of each pipe), or between two pipes (e.g., at the intersection of the pipes). The universal wheel 5702 in the example includes a tire 5708 which may be made of rubber, polyurethane over molding, or similar material to protect the magnet 5704 and to avoid damage or marring of the inspection surface. The universal wheel 5702 may additionally or alternatively include covering for the entire wheel 5702, such as a stretchable 3D printed tire 5708 that can be pulled over to cover the magnet 5704 or the entire wheel 5702. The spacing between the two wheel plates 5710 and their angle may be designed to fit with a specified inter-pipe spacing.

Figure 58A:
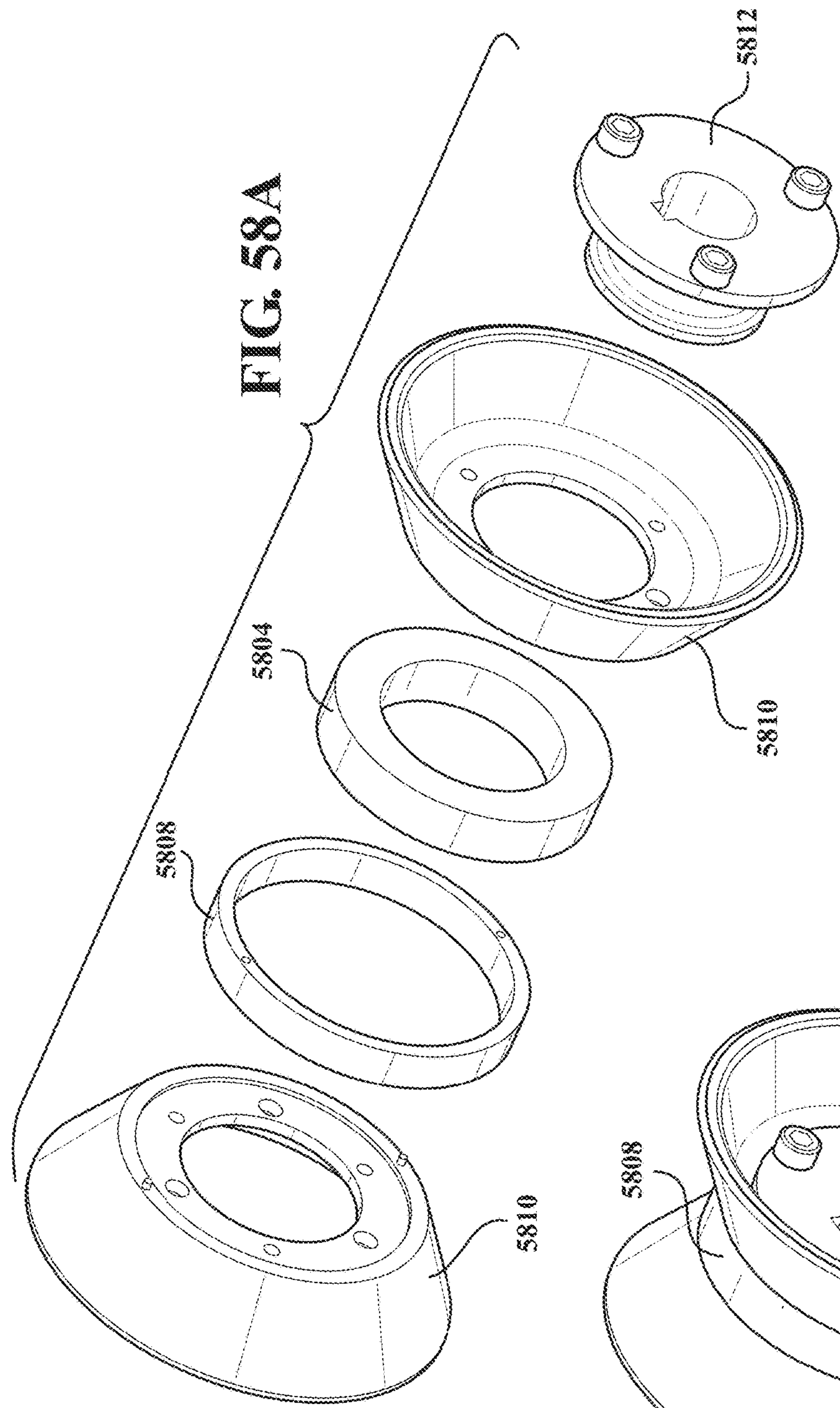
FIGS. 58A-58B depict an exploded and an assembled view of a crown riding wheel.
Figure 58B:
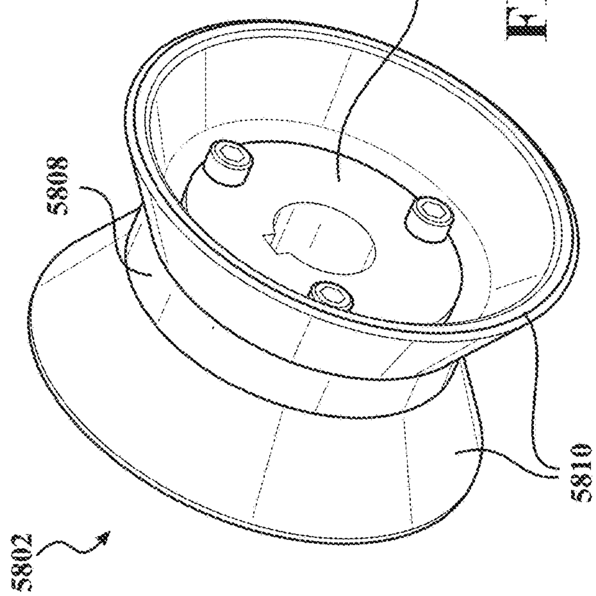

FIG. 58A depicts an exploded crown riding wheel 5802 and FIG. 58B depicts an assembled crown riding wheel 5802. The crown riding wheel 5802 may include wheel plates 5810, a hub 5812 for attaching the crown riding wheel 5802 to a drive module 4912, and a magnet 5804 covered by a magnet shield 5808 that protects the magnet from impacts or other damage. The magnet 5804 may be a rare earth magnet and enables the robot 4908 to hold to the inspection surface being traversed. The crown riding wheel 5802 has two wheel plates 5810 which angle up and outward such that the wheel is stable traversing (top riding) on a single pipe. The spacing between the two wheel plates 5810 and their angle may be designed to fit with a pipe having a specific outer dimension and/or pipes within a range of outer dimensions. In certain embodiments, the crown riding wheel 5802 may be covered at least partially with a covering to further protect the inspection surface from marring or damage.

Figure 59A:
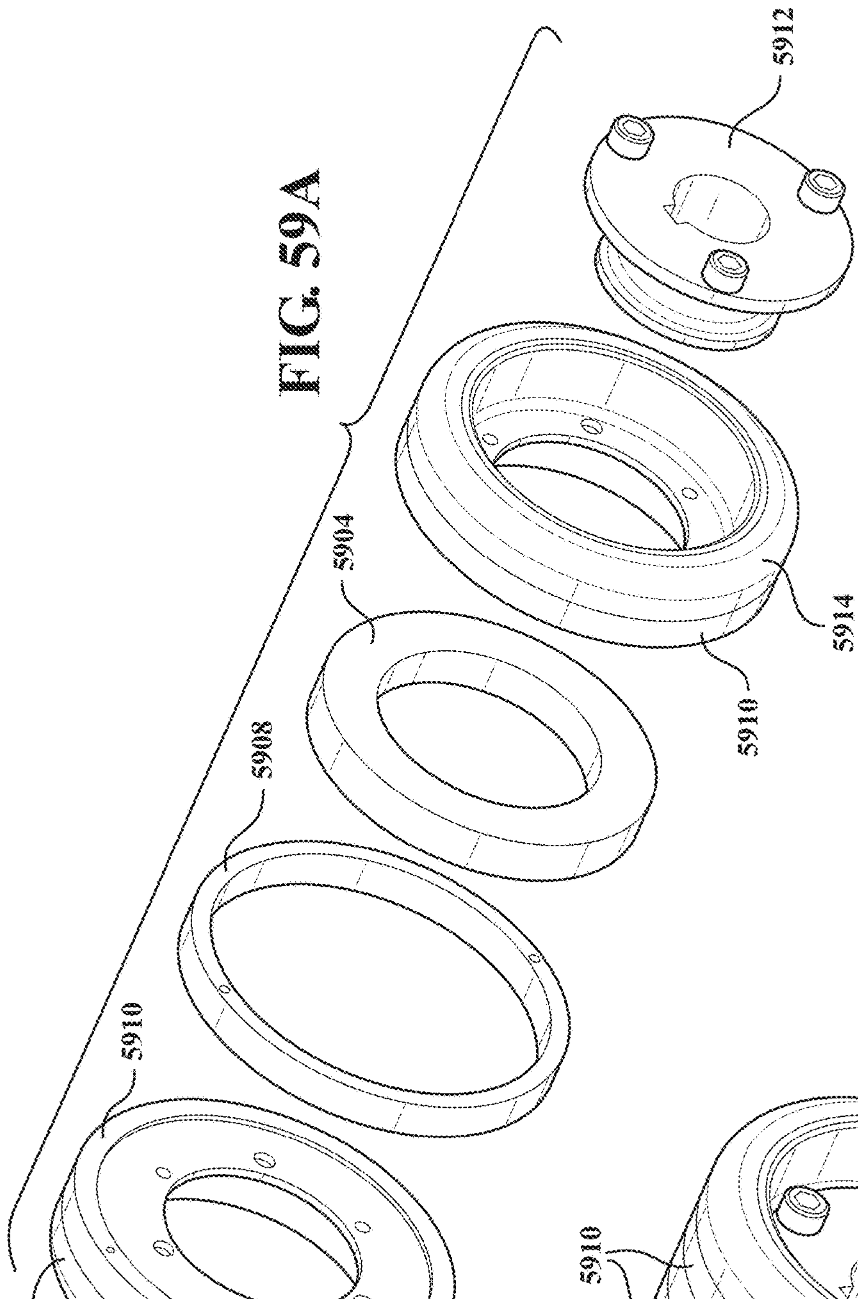
FIGS. 59A-59B depict an exploded and an assembled view of another example wheel.
Figure 59B:
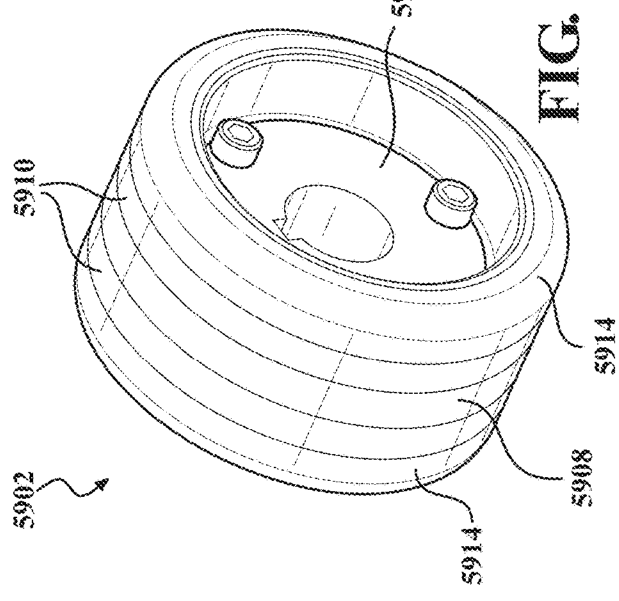

FIG. 59A depicts a tank wheel 5902 and FIG. 59B depicts an assembled tank wheel 5902 (e.g., for riding inside or outside a tank, pipe, or other flat, concave, or convex surface). The tank wheel 5902 may include wheel plates 5910, a hub 5912 for attaching the tank wheel 5902 to a drive module 4912, and a magnet 5904 covered by a magnet shield 5908. The magnet 5904 may be a rare earth magnet and enables the robot 4908 to hold to an industrial surface being traversed. The tank wheel 5902 has two wheel plates 5910, one on each side of the magnet 5904 providing an approximately level surface that rides along an approximately flat surface, and/or that engages the interior curvature of a concave surface. The wheel plates 5910 may be covered with one or more over-moldings 5914. There may be an over-molding 5914 made of polyurethane, or the like, that covers at least a portion of a wheel plate 5910. There may also be a stretchable, 3D printed tire that covers the entire tank wheel 5902. The over-moldings 5914 may provide a sacrificial outer surface and provide a non-marring surface to prevent damage to the industrial surface being traversed by the robot.

A stability module, also referred to as a wheelie bar, may provide additional stability to a robot when the robot is moving vertically up an industrial surface. The wheelie bar 6000 may be mounted at the back (relative to an upward direction of travel) of a drive module or to both ends of a drive module. If the front wheel of a drive module encounters a nonferrous portion of the industrial surface or a large obstacle is encountered, the wheelie bar 6000 limits the ability of the robot to move away from the industrial surface beyond a certain angle, thus limiting the possibility of a backward roll-over by the robot. The wheelie bar 6000 may be designed to be easily attached and removed from the drive module connection points 6011. The strength of magnets in the drive wheels may be such that each wheel is capable of supporting the weight of the robot even if the other wheels lost contact with the surface. The wheels on the stability module may be magnetic helping the stability bar engage or "snap" into place when pushed into place by the actuator.

Figure 60:
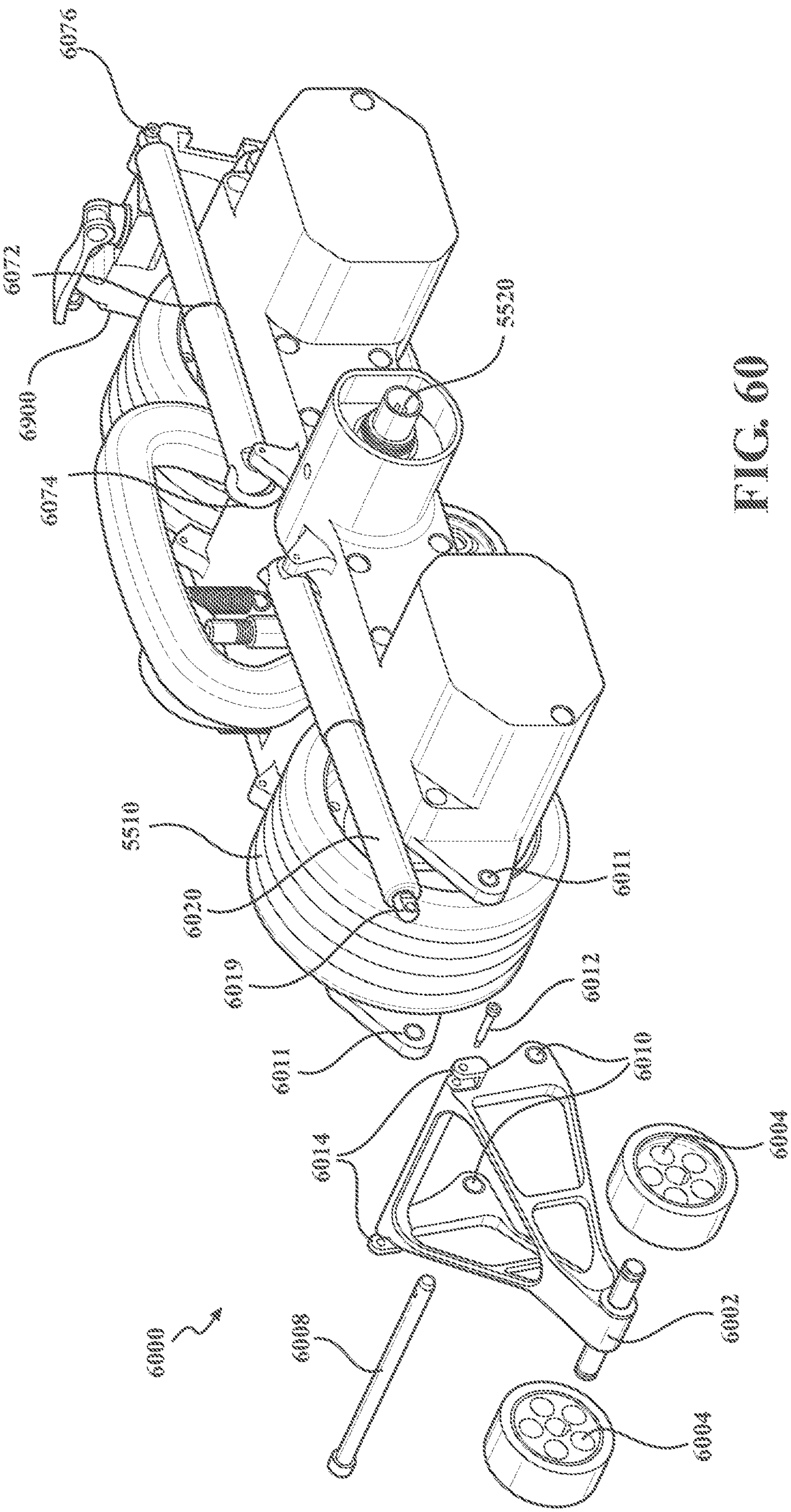
FIG. 60 depicts an exploded view of a first embodiment of a stability module and drive module.
Figure 61A:
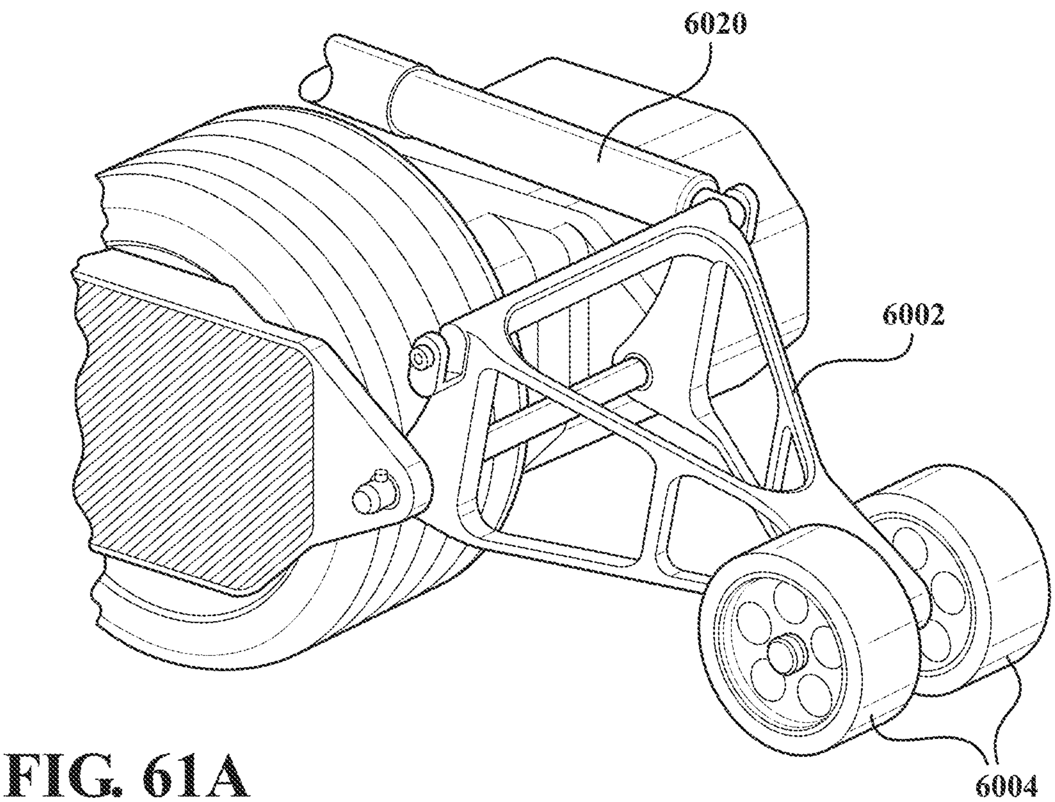
FIGS. 61A-61B depict two side views of the first embodiment of the stability module.
Figure 61B:
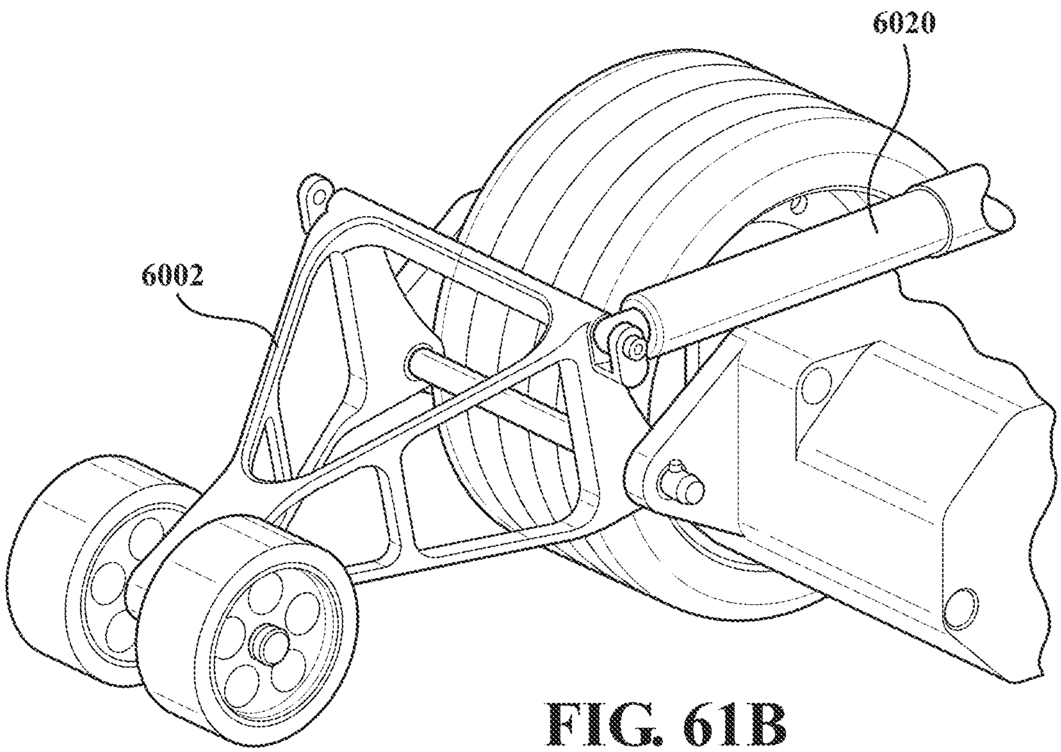
Figure 62:
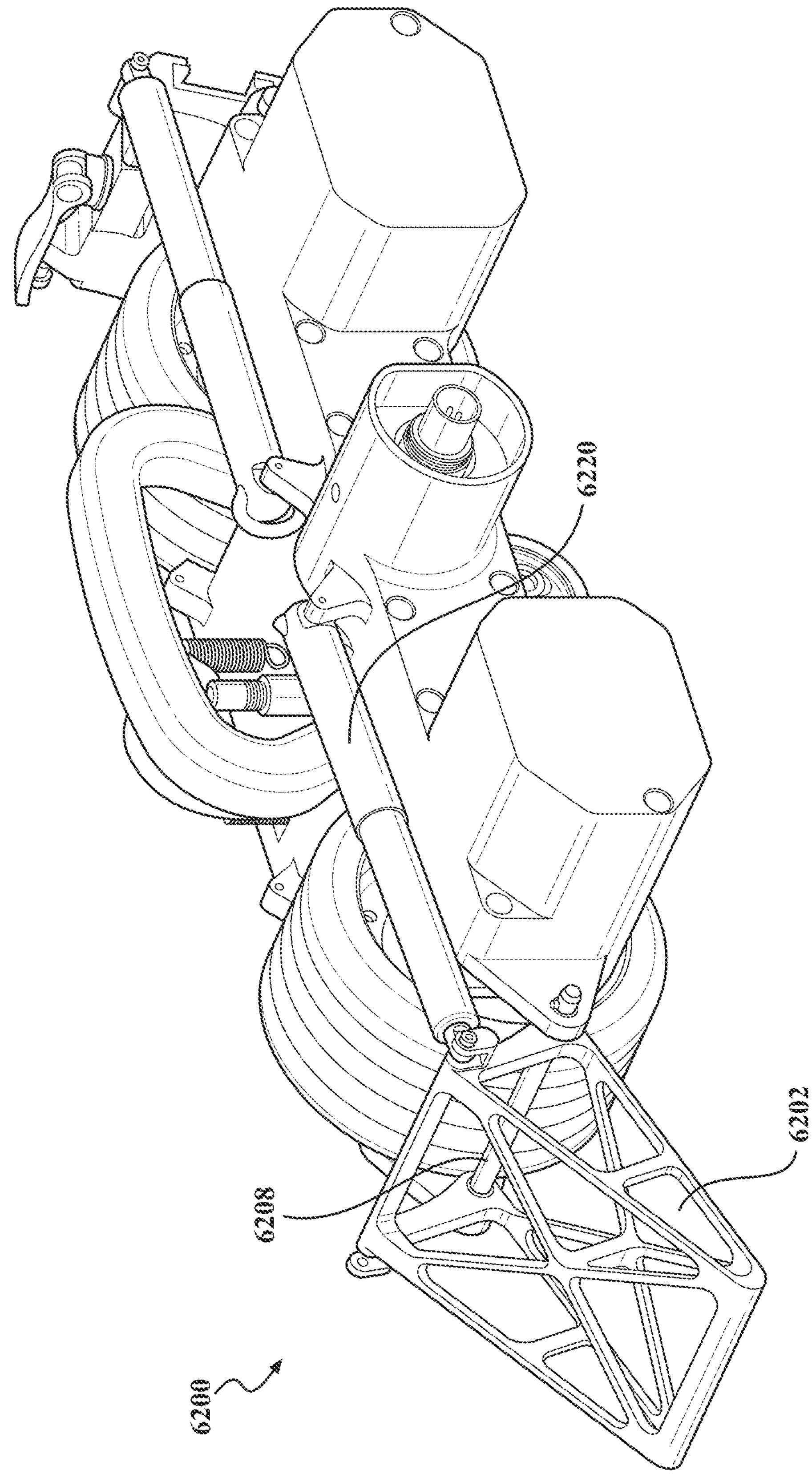
FIG. 62 depicts an alternate embodiment of a stability module and wheel assembly.

Referring to FIGS. 60-62. A stability module 6000 may attach to a drive module 4912 such that it is pulled behind or below the robot. FIG. 60 shows an exploded view of a stability module 6000 which may include a pair of wheels 6004, a stability body 6002, a connection bolt 6008 and two drive module connection points 6010, an actuator pin 6012, and two actuator connection points 6014. An actuator may couple with one of the actuator connection points 6014, and/or a given embodiment may have a pair of actuators, with one coupled to each actuator connection point 6014. There may be two drive module connection points 6010 which may be quickly aligned with corresponding stability module connection points 6011 located adjacent to each wheel module on the drive module and held together with the connection bolt 6008. The drive module may include a gas spring 6020, which may be common with the payload gas spring 6020 (e.g., providing for ease of reversibility of the drive module 4912 on either side of the inspection robot), although the gas spring 6020 for the stability module may have different characteristics and/or be a distinct actuator relative to the payload gas spring. The example stability module includes a connection pin 6012 for rapid coupling and/or decoupling of the gas spring. As shown in FIGS. 61A and 61B, the stability module may be attached, using stability module connection points, adjoining either of the wheel modules of the drive module. In certain embodiments, a stability module 6000 may be coupled to the rear position of the drive modules to assemble the inspection robot, and/or a stability module 6000 may be provided in both the front and back of the inspection robot (e.g., using separate and/or additional actuators from the payload actuators).

The strength of magnets in the drive wheels may be such that each wheel is capable of supporting the weight of the robot even if the other wheels lose contact with the surface. In certain embodiments, the wheels on the stability module may be magnetic, helping the stability module engage or "snap" into place upon receiving downward pressure from the gas spring or actuator. In certain embodiments, the stability module limits the rearward rotation of the inspection robot, for example if the front wheels of the inspection robot encounter a non-magnetic or dirty surface and lose contact. In certain embodiments, the stability module 6000 can return the front wheels to the inspection surface (e.g., by actuating and rotating the front of the inspection robot again toward the surface, which may be combined with backing the inspection robot onto a location of the inspection surface where the front wheels will again encounter a magnetic surface).

FIG. 62 depicts an alternate stability module 6200 including a stability body 6202 which does not have wheels but does have a similar connection bolt 6208 and two drive module connection points, and a similar actuator pin and two actuator connection points. Again, the stability module 6200 may have two drive module connection points 6010 which may be quickly aligned with corresponding stability module connection points 6011 located adjacent to each wheel module on the drive module and held together with the connection bolt 6208. The drive module may include a payload gas spring 6220 which may be connected to the stability module 6200 at one of two spring connection points with an actuator pin. The operations of stability module 6200 may otherwise be similar to the operations of the wheeled stability module 6000.

Figure 63:
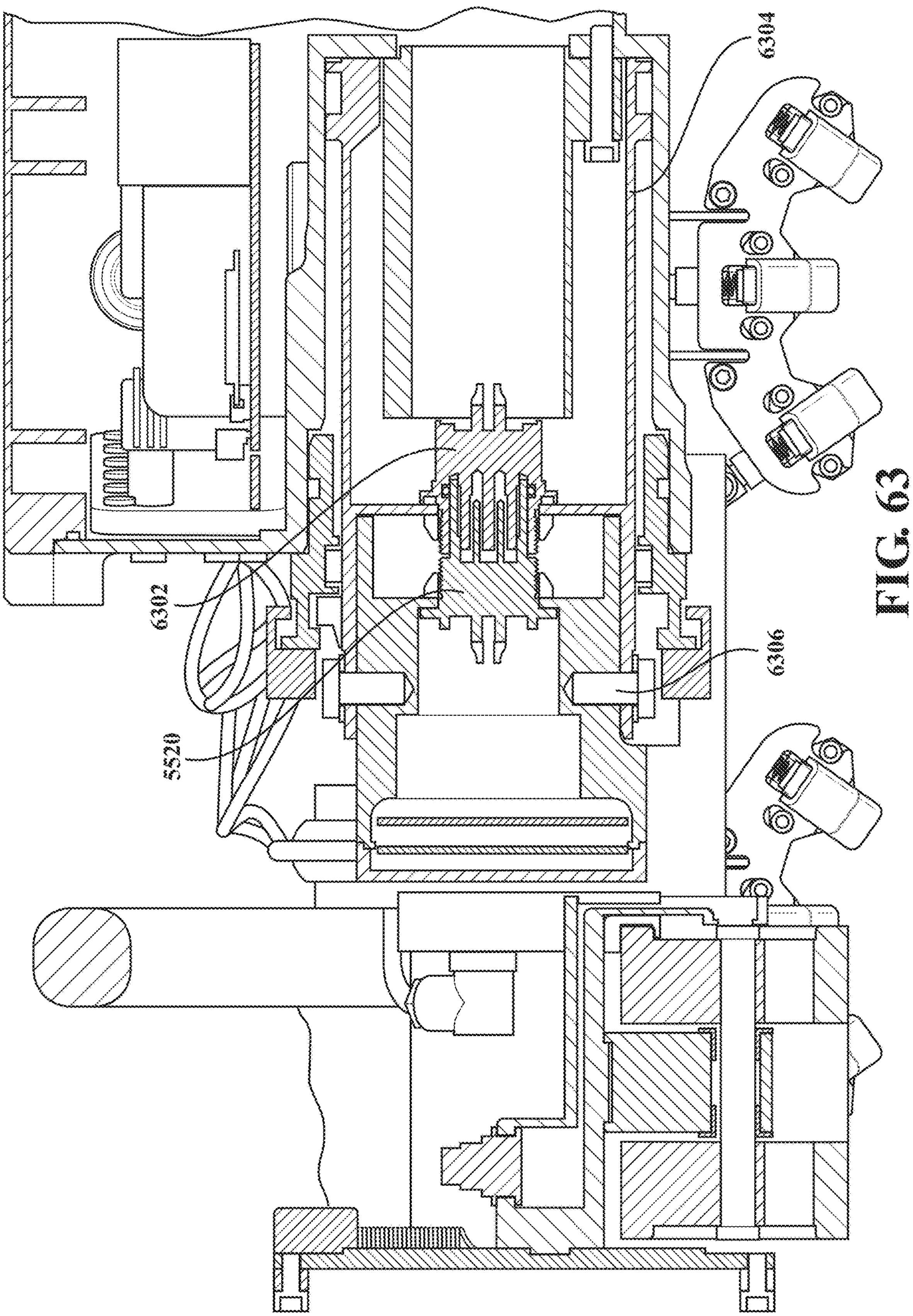
FIG. 63 depicts a cross section view of drive module coupling to a center module.
Figure 64:
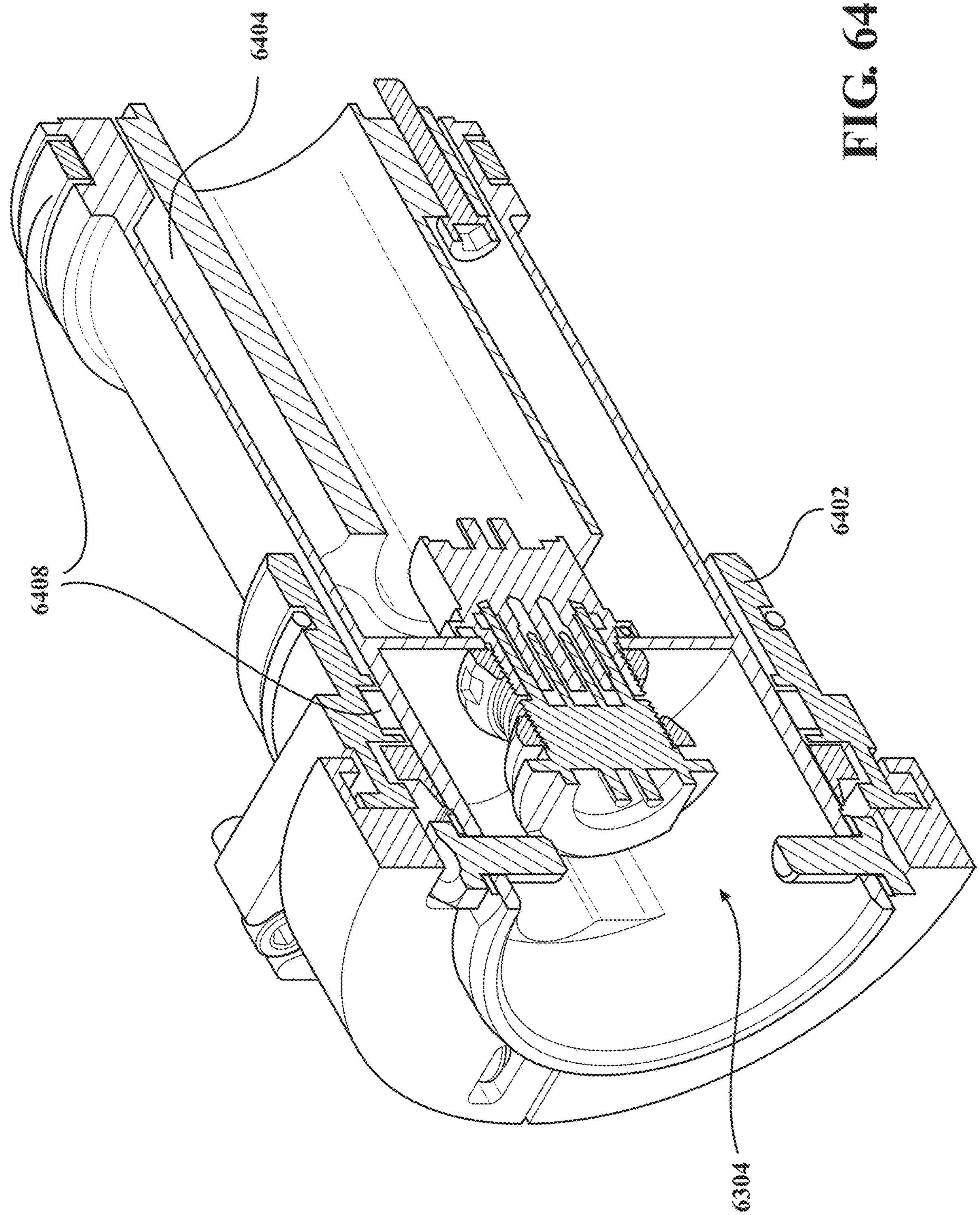
FIG. 64 depicts details of the suspension in a collapsed (close drive module) position.
Figure 65:
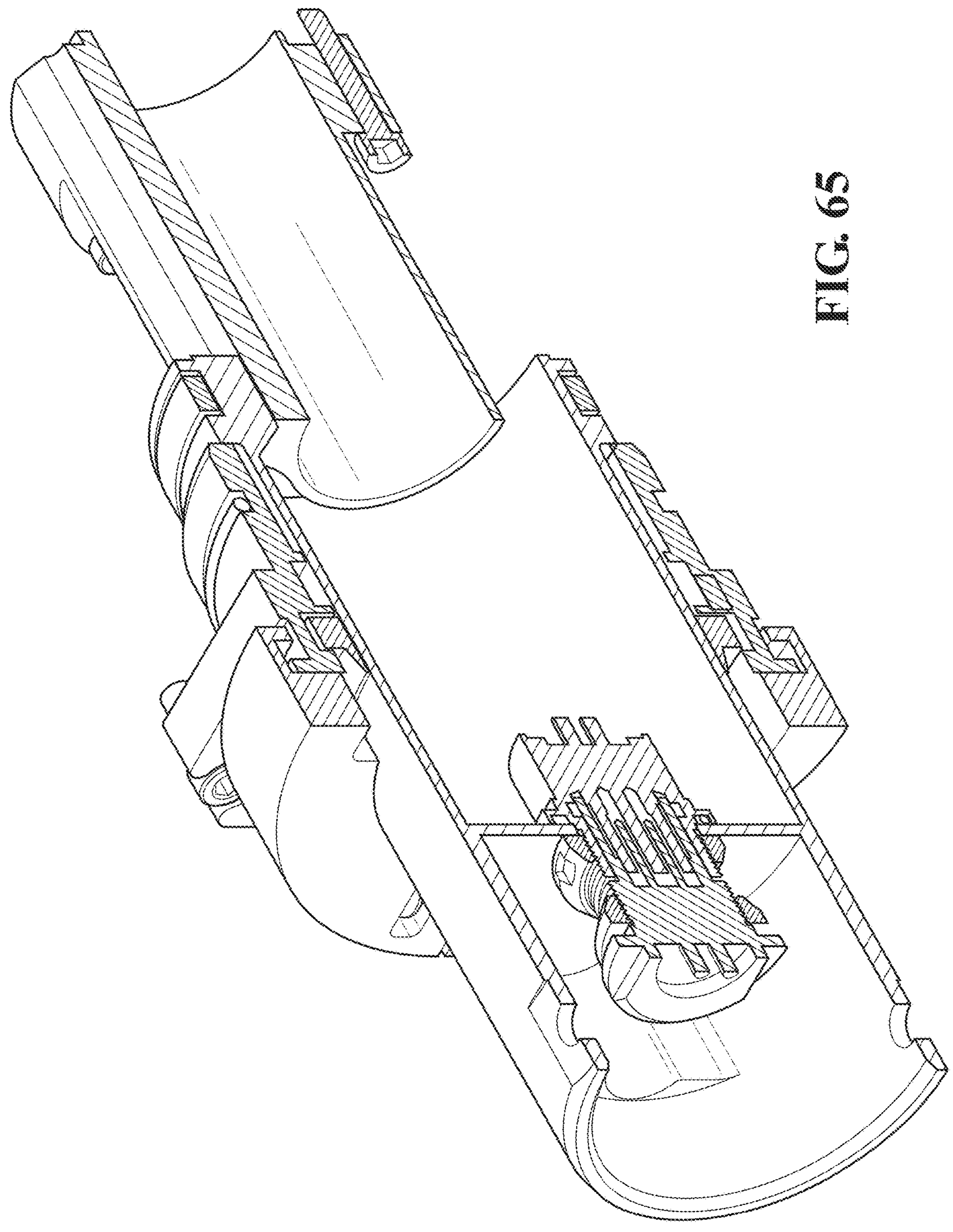
FIG. 65 depicts details of the suspension in an extended (far drive module) position.

FIGS. 63-64 depict details of the suspension between the center body and a drive module. The center module 4910 may include a piston 6304 to enable adjustments to the distance between the center module 4910 and a drive module 4912 to accommodate the topography of a given industrial surface and facilitate the stability and maneuverability of the robot. The piston may be bolted to the drive module such that the piston does not rotate relative to the drive module. Within the piston, and protected by the piston from the elements, there may be a power and communication center module connector 5520 to which a drive module connector 6302 engages to provide for the transfer of power and data between the center module and a drive module. FIGS. 64 and 65 show the suspension 6400 collapsed (FIG. 64), having the drive module close to the center module, and extended (FIG. 65), having the drive module at a further distance from the center module.

The suspension 6400 may include a translation limiter 6402 that limits the translated positions of the piston, a rotation limiter 6404 which limits how far the center module may rotate relative to the drive module, and replaceable wear rings 6408 to reduce wear on the piston 6304 and the center module 4910 as they move relative to one another. The drive module may be spring biased to a central, no rotation, position, and/or may be biased to any other selected position (e.g., rotated at a selected angle). An example drive module-center body coupling includes a passive rotation that occurs as a result of variations in the surface being traversed.

Figure 66B:
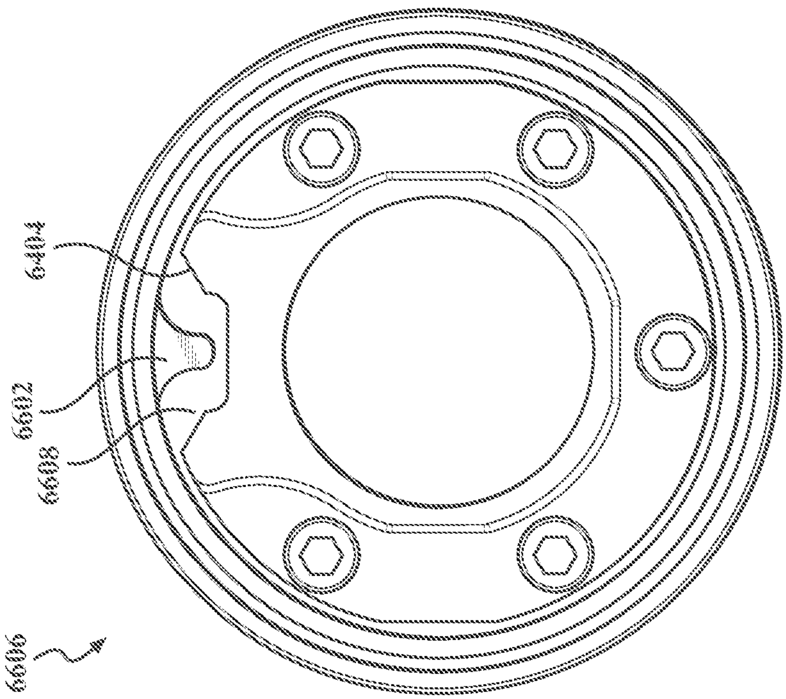
FIG. 66B depicts a rotation limiter having a broader angle limit rotation configuration.
Figure 66A:
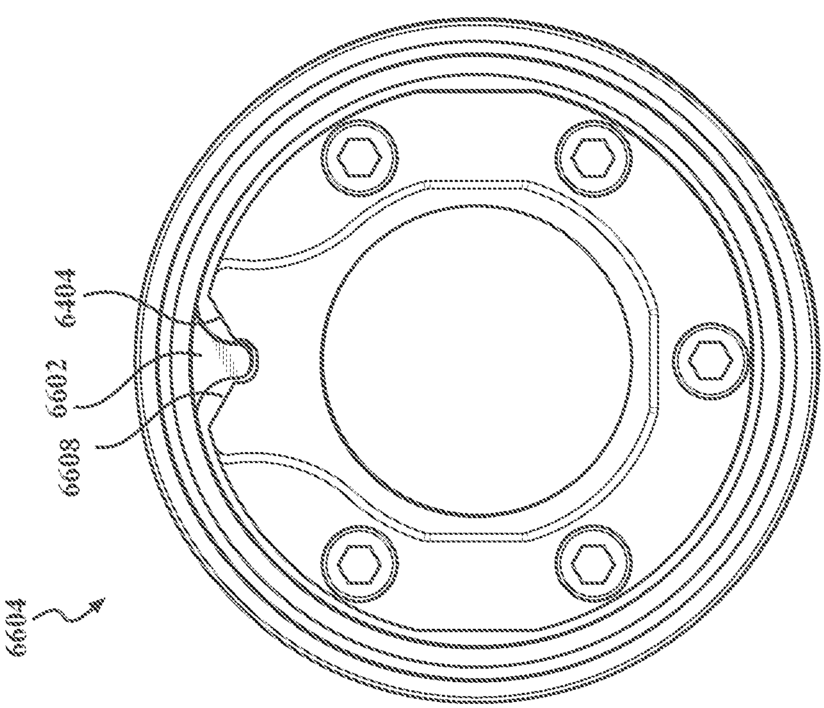
FIG. 66A depicts an example rotation limiter having a fixed or limited rotation configuration.

FIG. 66A shows a fixed rotation limiter 6604 embodiment which prevents rotation between the center module and the drive module, and/or provides for minimal rotation between the center module and the drive module. FIG. 66B shows a wider angle rotation limiter 6606 embodiment, which provides for 20 degrees of rotation between the drive module 4912 and the center body. The selected rotation limit may be any value, including values greater than 20 degrees or less than 20 degrees. Each may connect a drive module 4912 to the piston in the center module with a tongue 6602 and slot 6608. The size of the slot 6608 relative to the tongue 6602 may allow for limited rotation between a drive module and the center module. In one non-limiting example, the rotation may be limited to +/−10 degrees rotation. However, the amount of rotation allowed may be more 20 degrees, less than 20 degrees, and/or the distribution of rotation may be non-symmetrical relative to a center. For example, the limited angle rotation limiter may be designed to allow +5 degrees of rotation and −15 degrees of rotation. In embodiments, one side of the center module may be connected to a drive module having a fixed rotation limiter 6604 while the other side of the center module is connected to the limited angle rotation limiter 6606 such that one drive module may have limited to no angular rotation relative to the center module while the other drive module has limited angle rotation to accommodate unevenness or obstacles in the surface while allowing the other wheel to maintain contact even if its underlying surface is not the same. The ability of the center module to rotate relative to a drive module facilitates the transition of the robot between surfaces with different orientations, such as horizontal to vertical or along a coutant slope of a tank. The rigidity of the center module with one of the drive modules may facilitate ease of transportation and initial positioning. In other embodiments, both drive modules may be connected with a limited angle rotation limiter 6606 such that both drive modules rotate relative to the center module.

The robot may have information regarding absolute and relative position. The drive module may include both contact and non-contact encoders to provide estimates of the distance travelled. In certain embodiments, absolute position may be provided through integration of various determinations, such as the ambient pressure and/or temperature in the region of the inspection robot, communications with positional elements (e.g., triangulation and/or GPS determination with routers or other available navigation elements), coordinated evaluation of the driven wheel encoders (which may slip) with the non-slip encoder assembly 6800, and/or by any other operations described throughout the present disclosure. In certain embodiments, an absolute position may be absolute in one sense (e.g., distance traversed from a beginning location or home position) but relative in another sense (e.g., relative to that beginning location).

Figure 68:
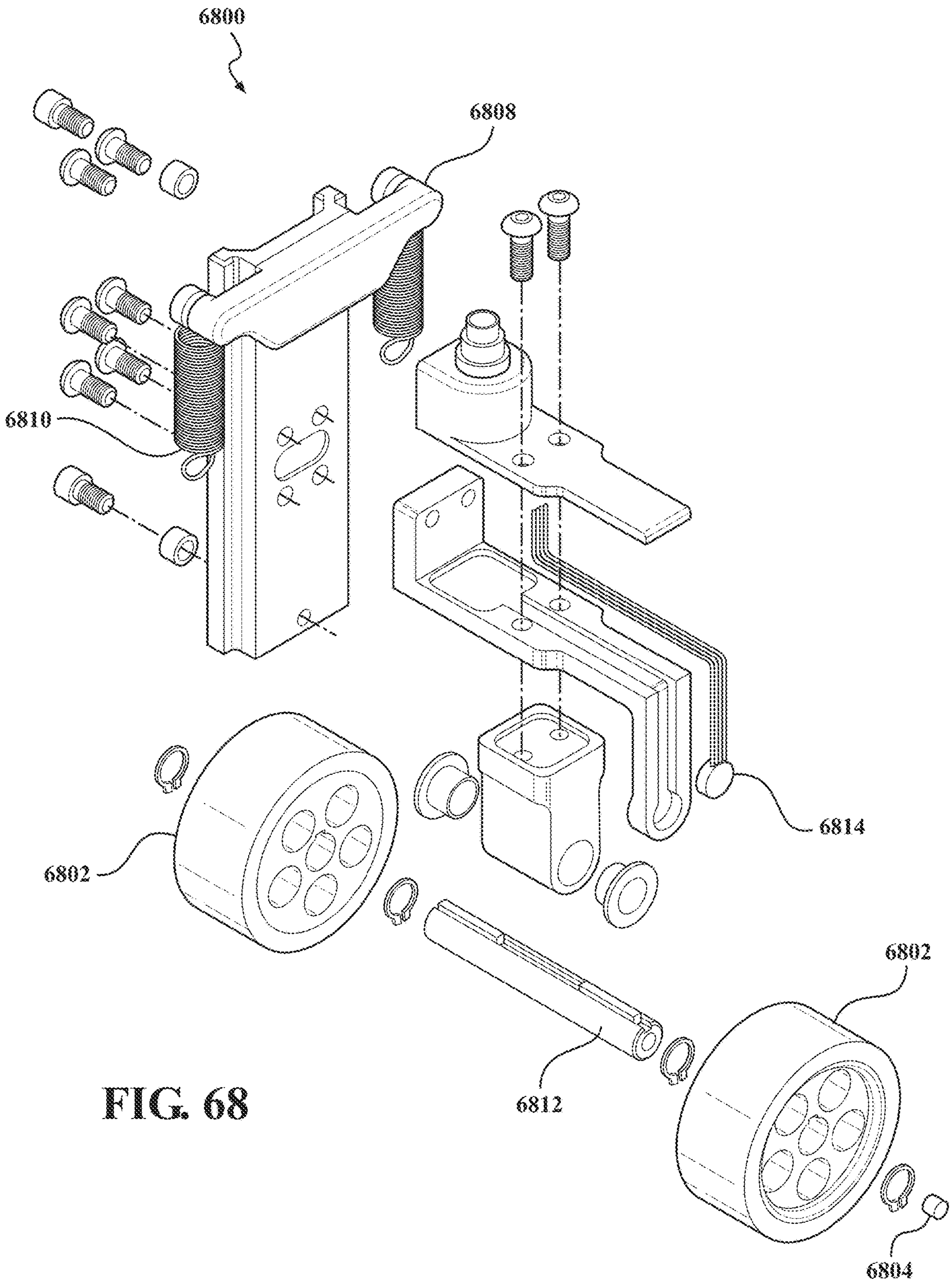
FIG. 68 depicts an exploded view of a contact encoder.

There may be a contact encoder module 6800 positioned between the two drive wheels of a drive module. As shown in FIG. 68, the encoder module 6800 may include two over molded encoder wheels 6802 having a non-slip surface to ensure continuous monitoring of the industrial surface being inspected. An encoder wheel 6802 mounted on an encoder roller shaft 6812 may include an encoder magnet 6804 which creates a changing electro-magnetic field as the encoder wheel 6802 rolls along the industrial surface. This changing magnetic field may be measured by an encoder 6814 in close proximity to the encoder magnet 6804. Without limitation to any particular theory of operation, it has been found that the encoder assembly operates successfully without EMI shielding, which may be due to the close proximity, approximately a millimeter or less, of the encoder magnet 6804 to the encoder 6814 the contact encoder, and/or due to the symmetry of the magnetic fields from the wheels in the region of the encoder. The encoder module 6800 may include a spring mount 6808 having a sliding coupler and a spring 6810 that exerts a downward pressure on the encoder wheels 6802 to ensure contact with the industrial surface as the robot negotiates obstacles and angle transitions (e.g., reference the positions of the encoder assembly shown in FIGS. 54A-54B). There may be one or two encoder wheels positioned between the drive wheels, either side by side or in a linear orientation, and in certain embodiments a sensor may be associated with only one, or with both, encoder wheels. In certain embodiments, each of the drive modules 4912 may have a separate encoder assembly associated therewith, providing for the capability to determine rotational angles (e.g., as a failure condition where linear motion is expected, and/or to enable two-dimensional traversal on a surface such as a tank or pipe interior), differential slip between drive modules 4912, and the like.

A drive module (FIG. 55) may include a hall effect sensor in each of the motors 5502 as part of non-contact encoder for measuring the rotation of each motor as it drives the associated wheel assembly 5510. There may be shielding 5508 (e.g., a conductive material such as steel) to prevent unintended EMI noise from a magnet in the wheel inducing false readings in the hall effect sensor.

Data from the encoder assembly 6800 encoder and the driven wheel encoder (e.g., the motion and/or position sensor associated with the drive motor for the magnetic wheels) provide an example basis for deriving additional information, such as whether a wheel is slipping by comparing the encoder assembly readings (which should reliably show movement only when actual movement is occurring) to those of the driven wheel encoders on the same drive module. If the encoder assembly shows limited or no motion while the driven wheel encoder(s) show motion, drive wheels slipping may be indicated. Data from the encoder assembly and the driven wheel encoders may provide a basis for deriving additional information such as whether the robot is travelling in a straight line, as indicated by similar encoder values between corresponding encoders in each of the two drive modules on either side of the robot. If the encoders on one of the drive modules indicate little or no motion while the encoders of the other drive module show motion, a turning of the inspection robot toward the side with limited movement may be indicated.

The base station may include a GPS module or other facility for recognizing the position of the base station in a plant. The encoders on the drive module provide both absolute (relative to the robot) and relative information regarding movement of the robot over time. The combination of data regarding an absolute position of the base station and the relative movement of the robot may be used to ensure complete plant inspection and the ability to correlate location with inspection map.

The central module (FIG. 51) may have a camera 5104 that may be used for navigation and obstacle detection, and/or may include both a front and rear camera 5104 (e.g., as shown in FIG. 51). A video feed from a forward facing camera (relative to the direction of travel) may be communicated to the base station to assist an operator in obstacle identification, navigation, and the like. The video feed may switch between cameras with a change in direction, and/or an operator may be able to selectively switch between the two camera feeds. Additionally or alternatively, both cameras may be utilized at the same time (e.g., provided to separate screens, and/or saved for later retrieval). The video and the sensor readings may be synchronized such that, for example: an operator (or display utility) reviewing the data would be able to have (or provide) a coordinated visual of the inspection surface in addition to the sensor measurements to assist in evaluating the data; to provide repairs, mark repair locations, and/or confirm repairs; and/or to provide cleaning operations and/or confirm cleaning operations. The video camera feeds may also be used for obstacle detection and path planning, and/or coordinated with the encoder data, other position data, and/or motor torque data for obstacle detection, path planning, and/or obstacle clearance operations.

Figure 69:
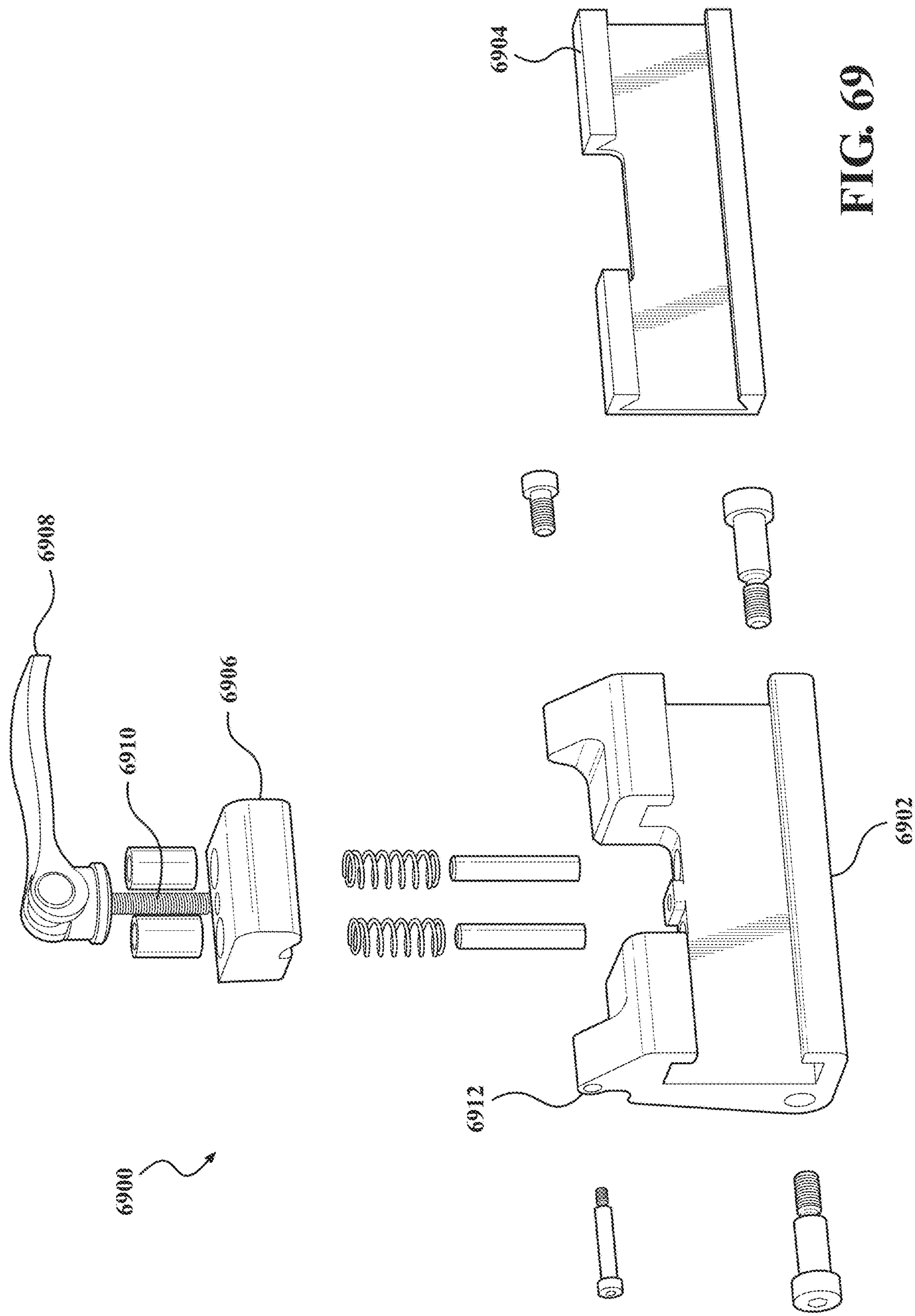
FIG. 69 depicts an exploded view of a dovetail payload rail mount assembly.
Figure 70:
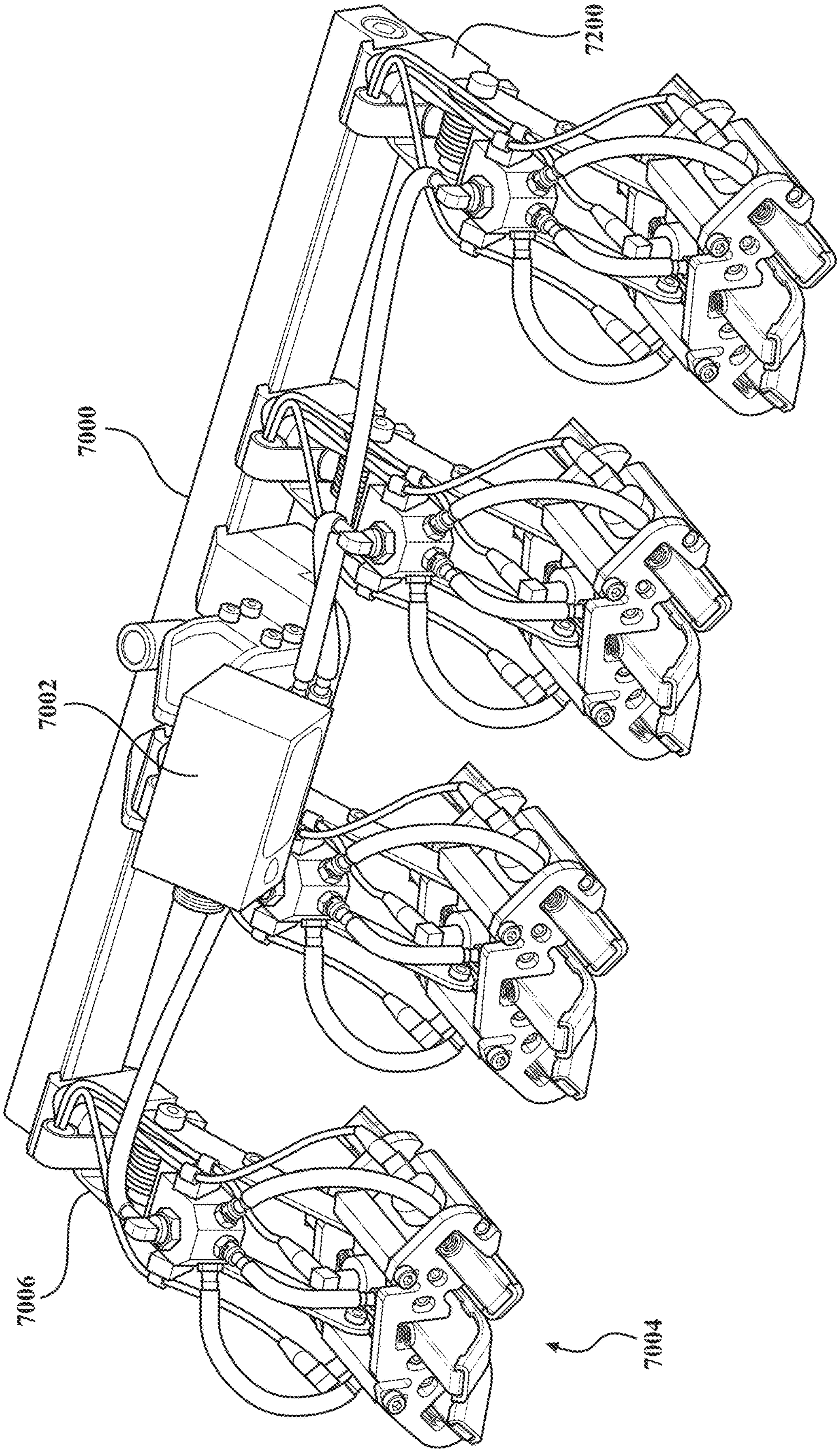
FIG. 70 depicts a payload with sensor carriages and an inspection camera.

Referring to FIG. 69, a drive module (and/or the center body) may include one or more payload mount assemblies 6900. The payload mount assembly 6900 may include a rail mounting block 6902 with a wear resistant sleeve 6904 and a rail actuator connector 6912. Once a rail of the payload is slid into position, a dovetail clamping block 6906 may be screwed down with a thumbscrew 6910 to hold the rail in place with a cam-lock clamping handle 6908. The wear resistant sleeve 6904 may be made of Polyoxymethylene (POM), a low friction, strong, high stiffness material such as Delrin, Celecon, Ramtal, Duracon, and the like. The wear resistant sleeve 6904 allows the sensor to easily slide laterally within the rail mounting block 6902. The geometry of the dovetail clamping block 6906 limits lateral movement of the rail once it is clamped in place. However, when unclamped, it is easy to slide the rail off to change the rail. In another embodiment, the rail mounting block may allow for open jawed, full rail coupling allowing the rail to be rapidly attached and detached without the need for sliding into position.

Figure 71A:
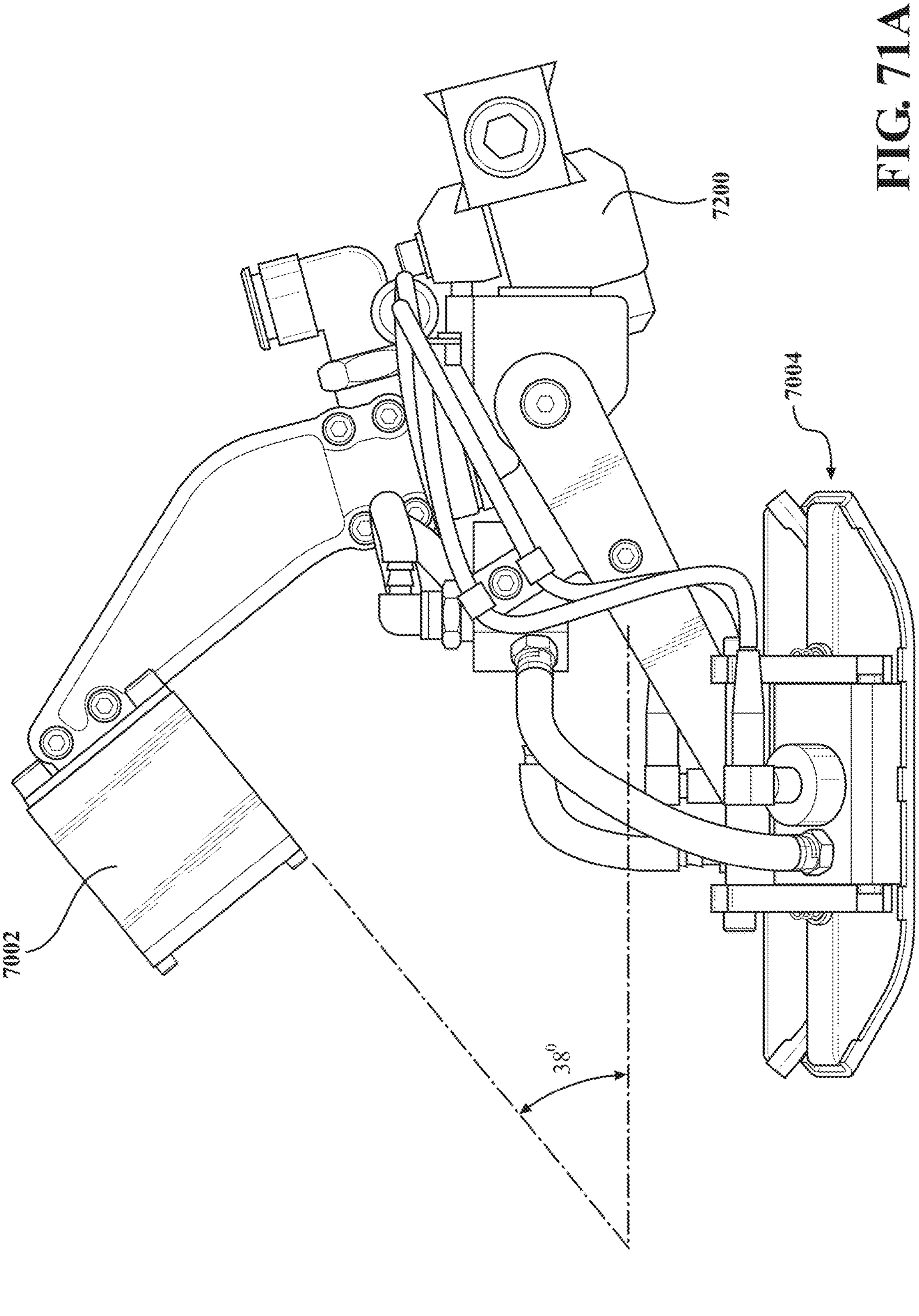
FIG. 71A-depicts an example side view of a payload and inspection camera.
Figure 71C:
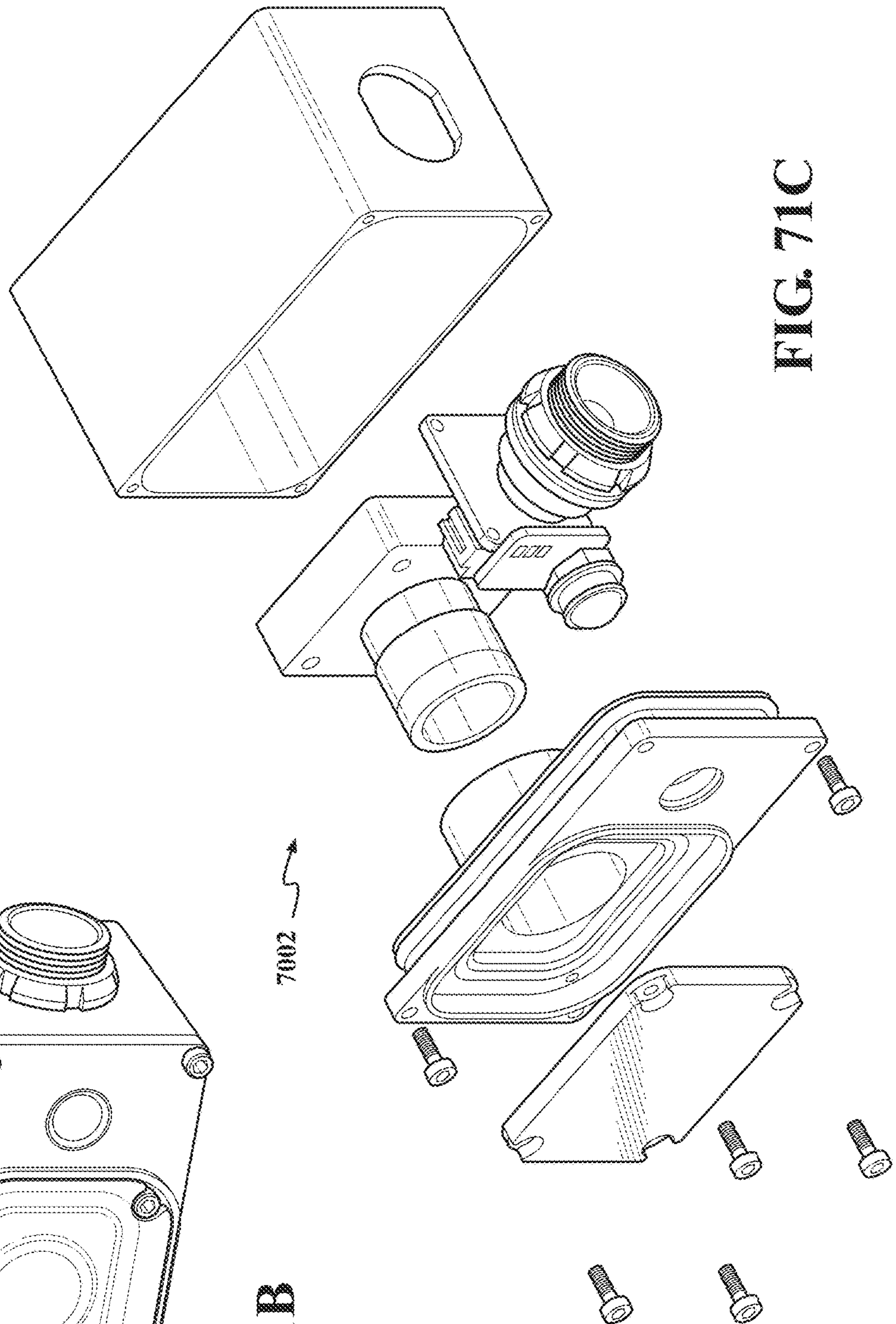
FIGS. 71B-71C depict details of an example inspection camera.
Figure 71B:
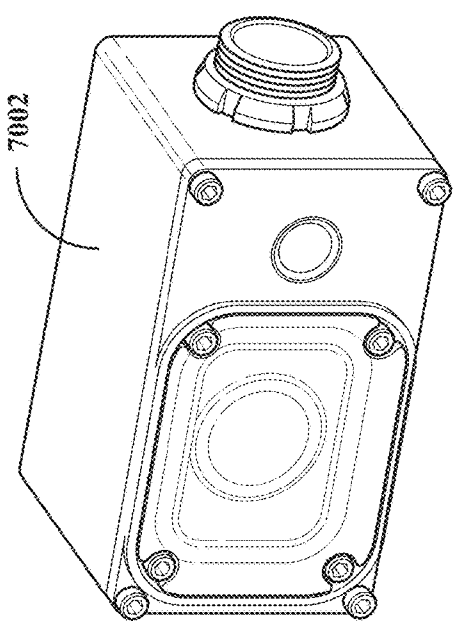

Referring to FIGS. 70 and 71A-C, an example of a rail 7000 is seen with a plurality of sensor carriages 7004 attached and an inspection camera 7002 attached. As shown in FIG. 71A, the inspection camera 7002 may be aimed downward (e.g., at 38 degrees) such that it captures an image of the inspection surface that can be coordinated with sensor measurements. The inspection video captured may be synchronized with the sensor data and/or with the video captured by the navigation cameras on the center module. The inspection camera 7002 may have a wide field of view such that the image captured spans the width of the payload and the surface measured by all of the sensor carriages 7004 on the rail 7000.

The length of the rail may be designed to according to the width of sensor coverage to be provided in a single pass of the inspection robot, the size and number of sensor carriages, the total weight limit of the inspection robot, the communication capability of the inspection robot with the base station (or other communicated device), the deliverability of couplant to the inspection robot, the physical constraints (weight, deflection, etc.) of the rail and/or the clamping block, and/or any other relevant criteria. A rail may include one or more sensor carriage clamps 7200 having joints with several degrees of freedom for movement to allow the robot to continue even if one or more sensor carriages encounter unsurmountable obstacles (e.g., the entire payload can be raised, the sensor carriage can articulate vertically and raise over the obstacle, and/or the sensor carriage can rotate and traverse around the obstacle).

The rail actuator connector 6912 may be connected to a rail (payload) actuator 5518 (FIG. 55) which is able to provide a configurable down-force on the rail 7000 and the attached sensor carriages 7004 to assure contact and/or desired engagement angle with the inspection surface. The payload actuator 5518 may facilitate engaging and disengaging the rail 7000 (and associated sensor carriages 7004) from the inspection surface to facilitate obstacle avoidance, angle transitions, engagement angle, and the like. Rail actuators 5518 may operate independently of one another. Thus, rail engagement angle may vary between drive modules on either side of the center module, between front and back rails on the same drive module, and the like.

Figure 72B:
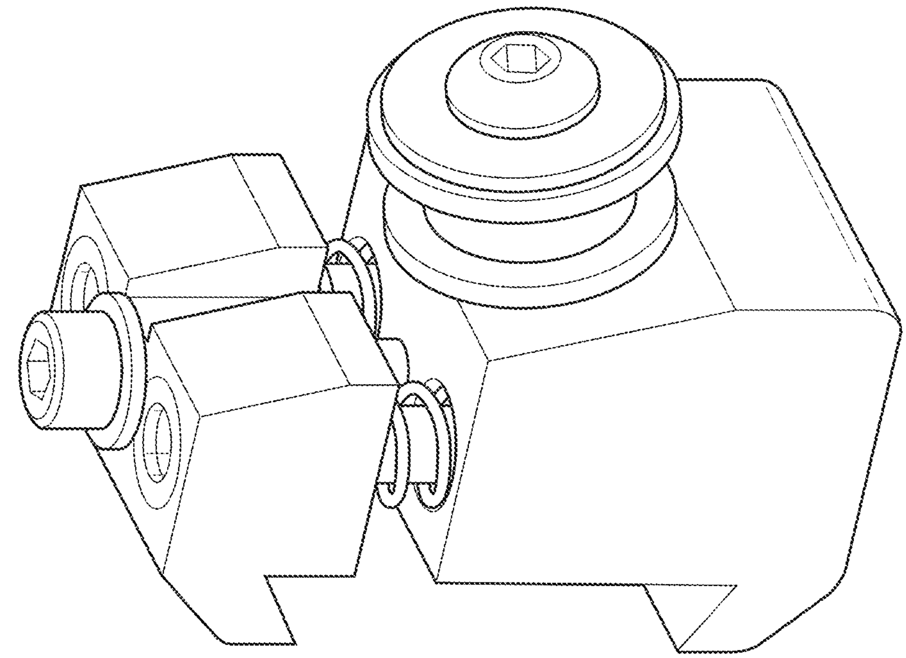
FIGS. 72A-72B depict clamped and un-clamped views of a sensor clamp.
Figure 72A:
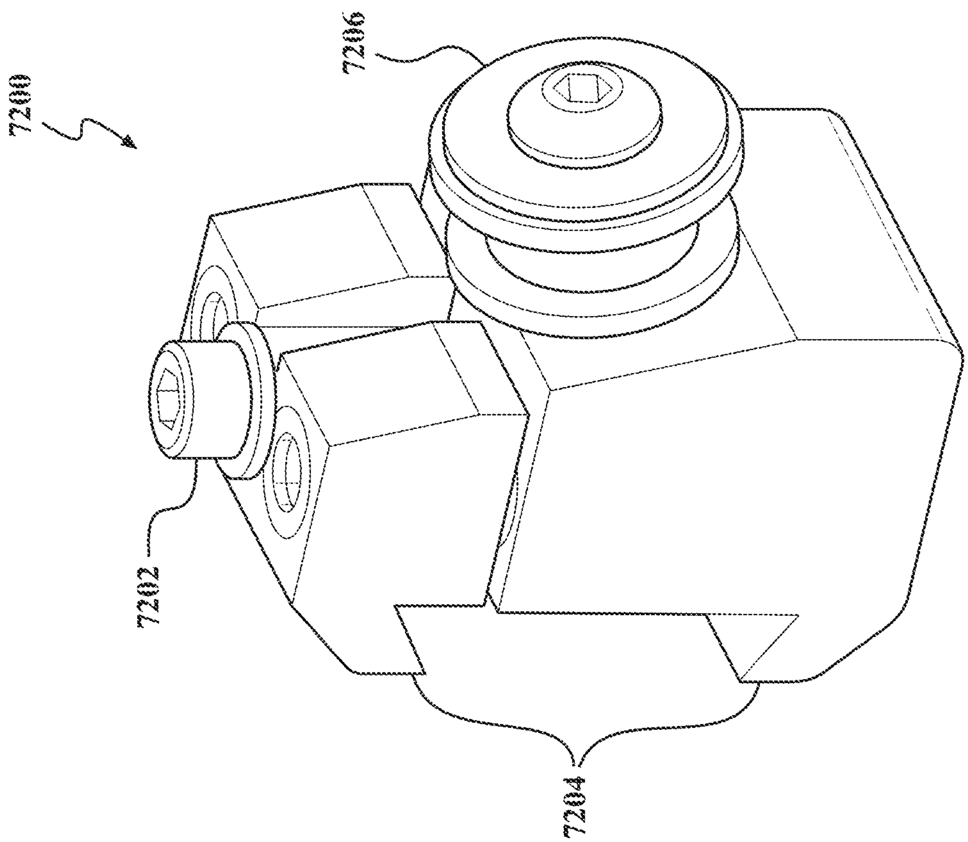
Figure 72C:
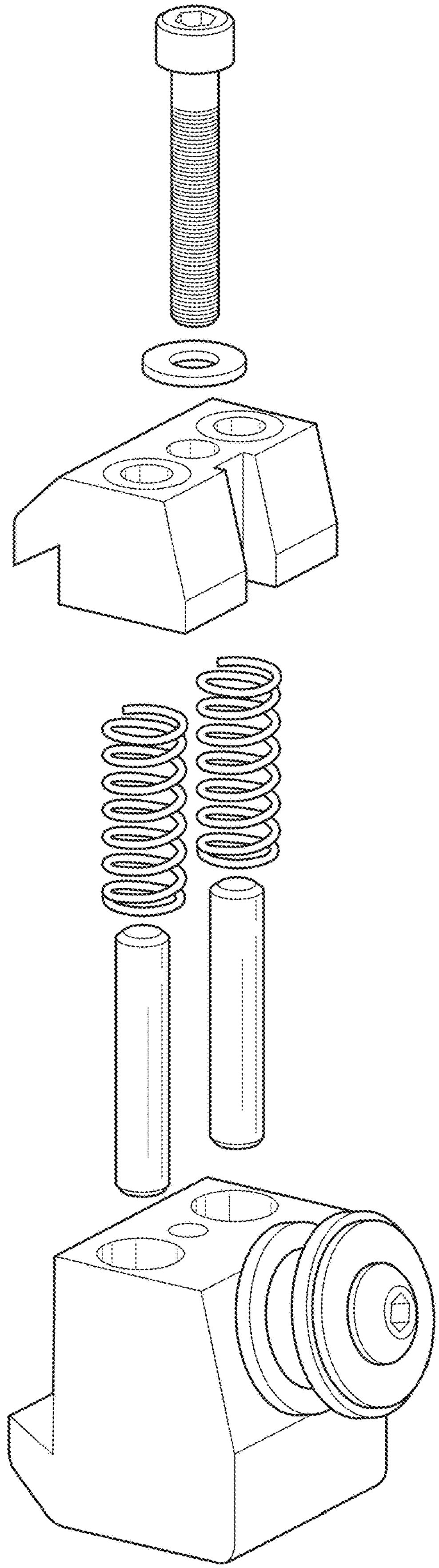
FIG. 72C depicts an exploded view of a sensor carriage clamp.

Referring to FIGS. 72A-72C, a sensor clamp 7200 may allow sensor carriages 7004 to be easily added individually to the rail (payload) 7000 without disturbing other sensor carriages 7004. A simple sensor set screw 7202 tightens the sensor clamp edges 7204 of the sensor clamp 7200 over the rail. In the example of FIGS. 72A-72C, a sled carriage mount 7206 provides a rotational degree of freedom for movement.

Figure 73:
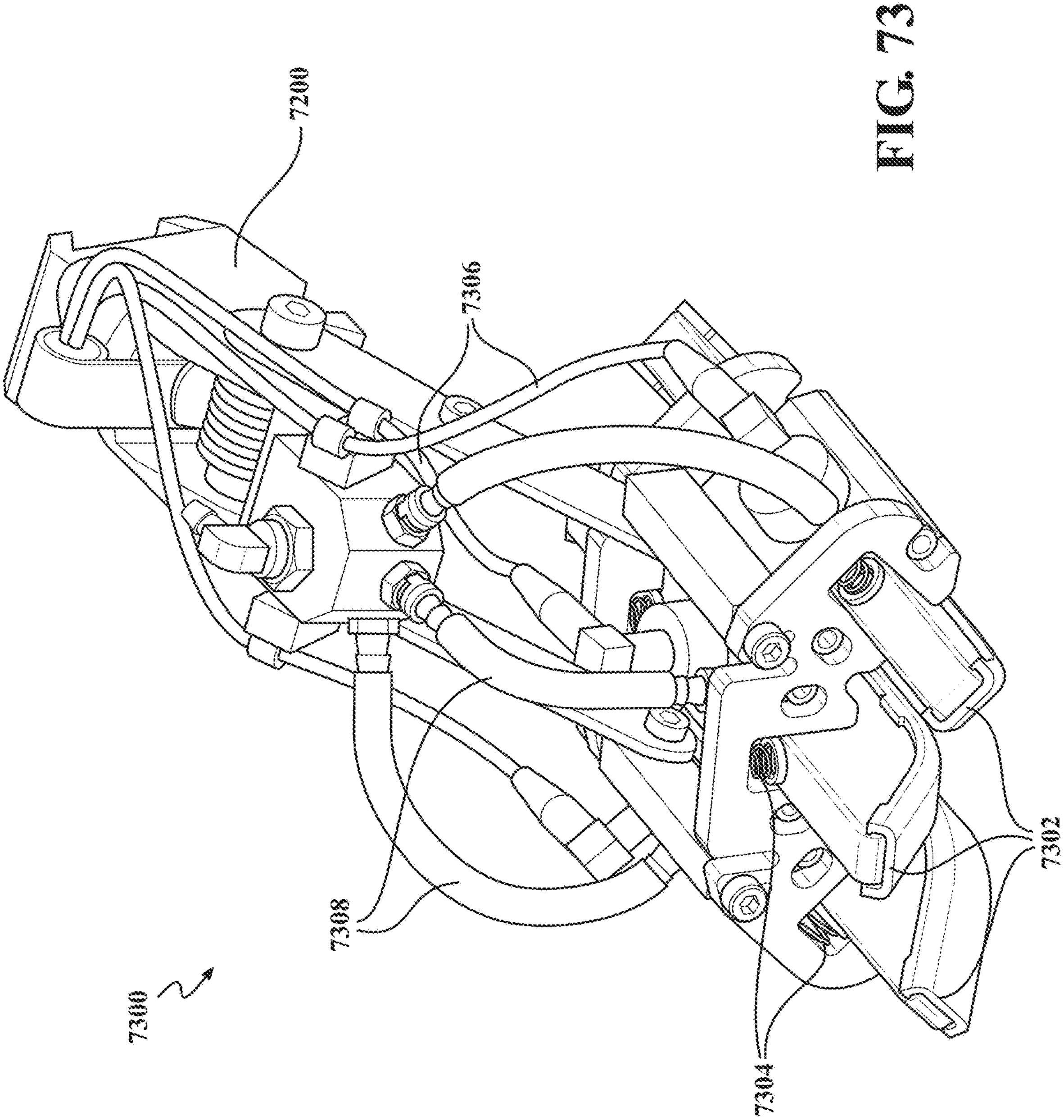
FIG. 73 depicts a sensor carriage having a multi-sensor sled assembly.

FIG. 73 depicts a multi-sensor sled carriage 7004, 7300. The embodiment of FIG. 73 depicts multiple sleds arranged on a sled carriage, but any features of a sled, sled arm, and/or payload described throughout the present disclosure may otherwise be present in addition to, or as alternatives to, one or more features of the multi-sensor sled carriage 7004, 7300. The multi-sensor sled carriage 7300 may include a multiple sled assembly, each sled 7302 having a sled spring 7304 at the front and back (relative to direction of travel) to enable the sled 7302 to tilt or move in and out to accommodate the contour of the inspection surface, traverse obstacles, and the like. The multi-sensor sled carriage 7300 may include multiple power/data connectors 7306, one running to each sensor sled 7302, to power the sensor and transfer acquired data back to the robot. Depending on the sensor type, the multi-sensor sled carriage 7300 may include multiple couplant lines 7308 providing couplant to each sensor sled 7302 requiring couplant.

Figure 74A:
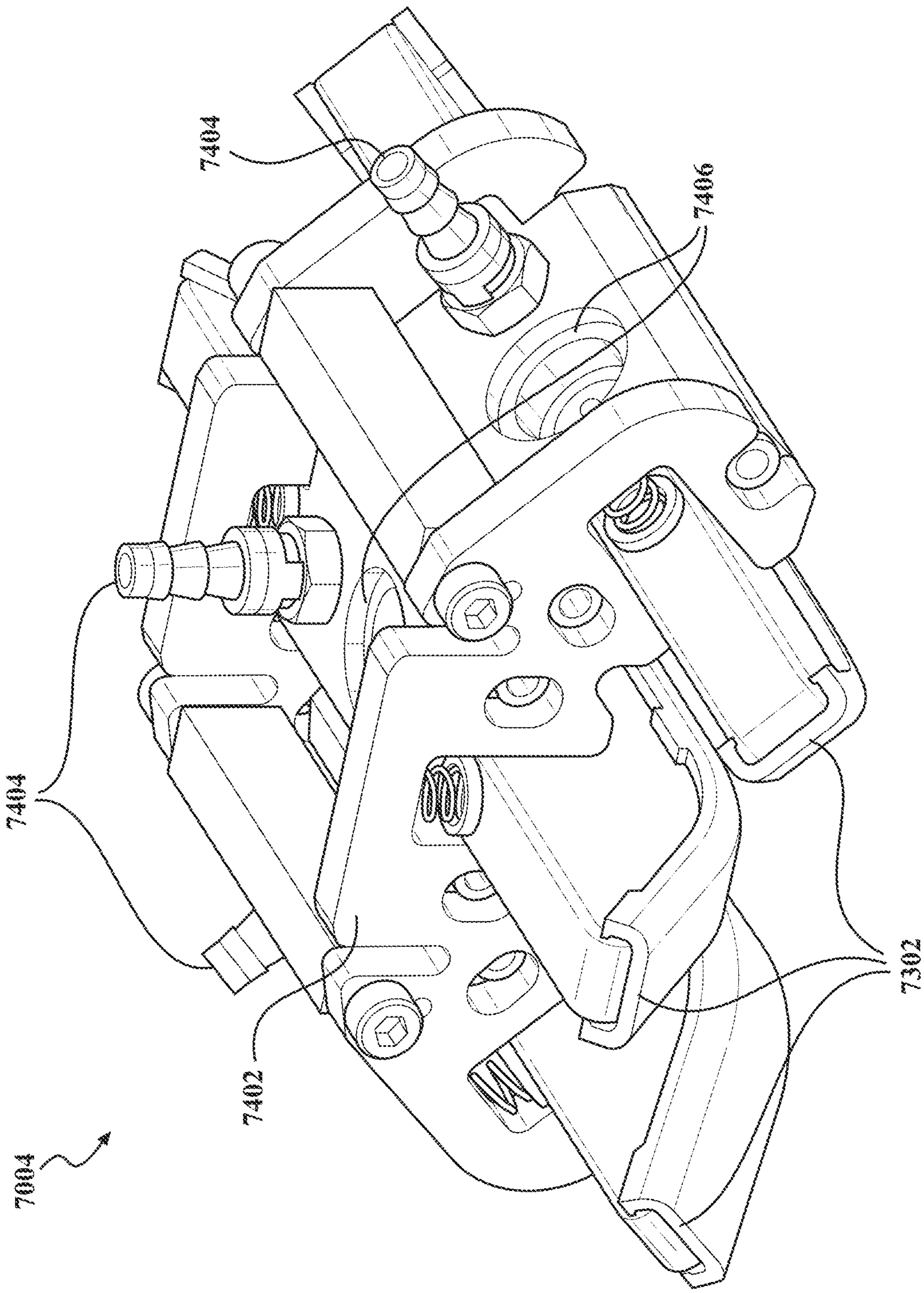
FIGS. 74A-74B depict views of two different sized multi-sensor sled assemblies.
Figure 74B:
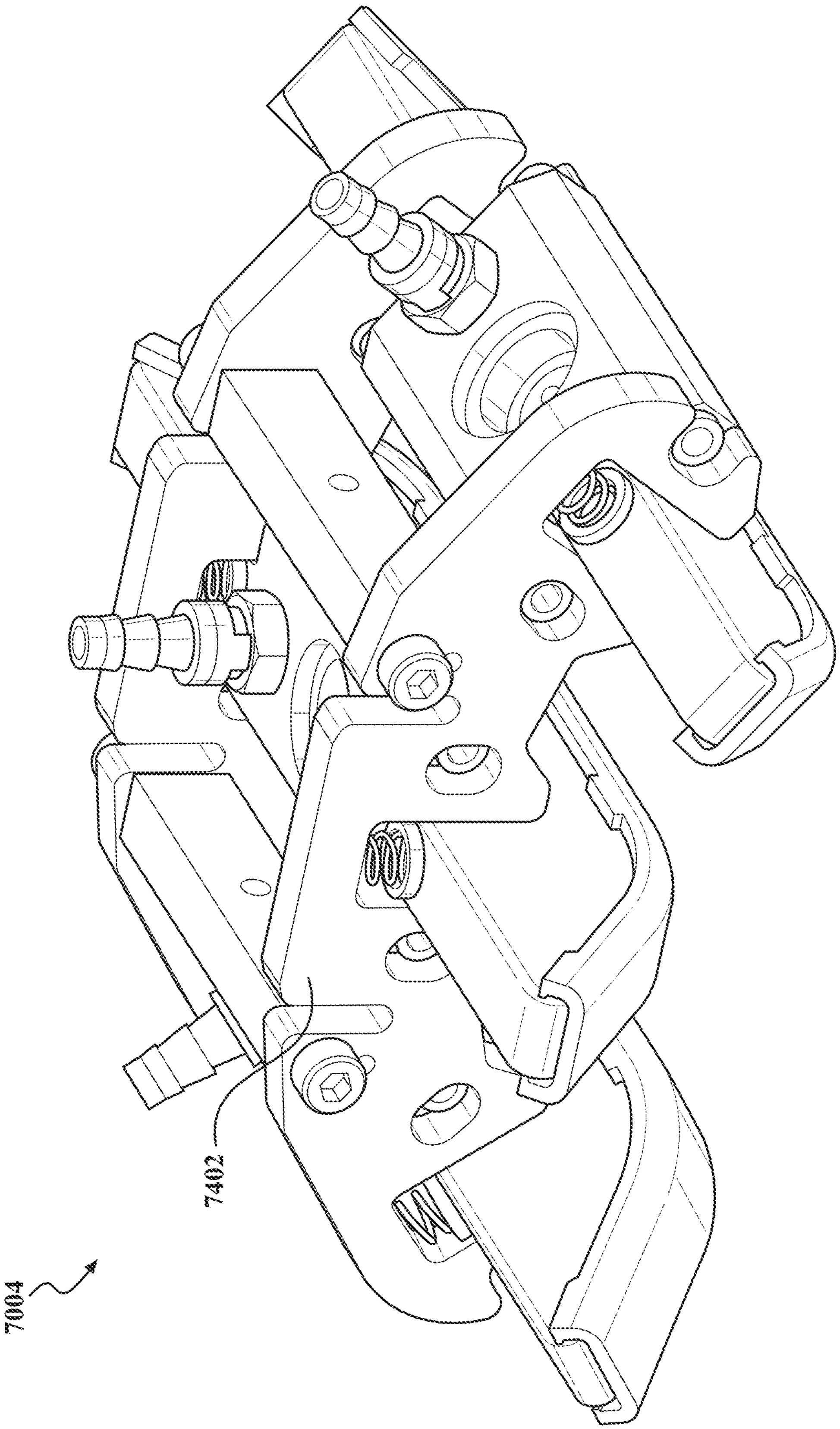
Figure 75:
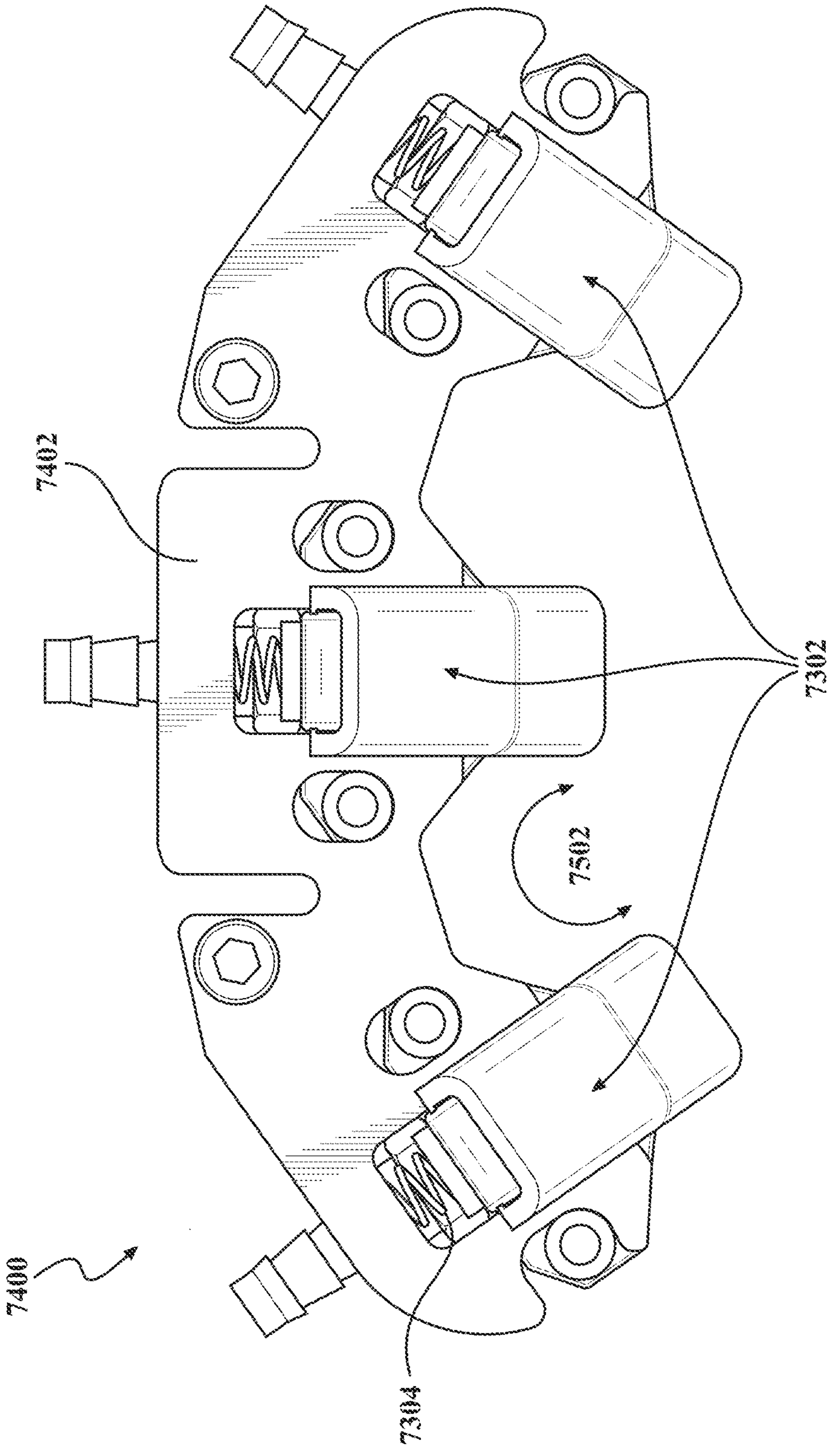
FIG. 75 depicts a front view of a multi-sensor sled assembly.
Figure 76A:
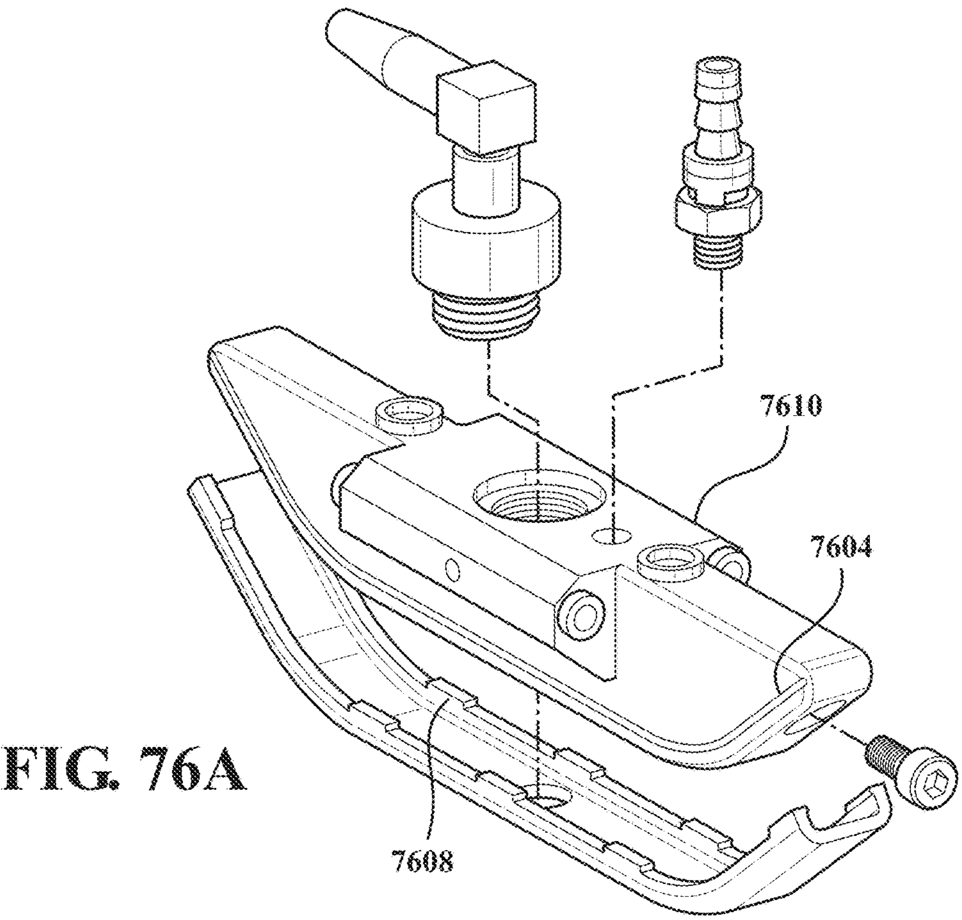
FIG. 76A depicts a perspective view looking down on an exploded view of a sensor housing.
Figure 76B:
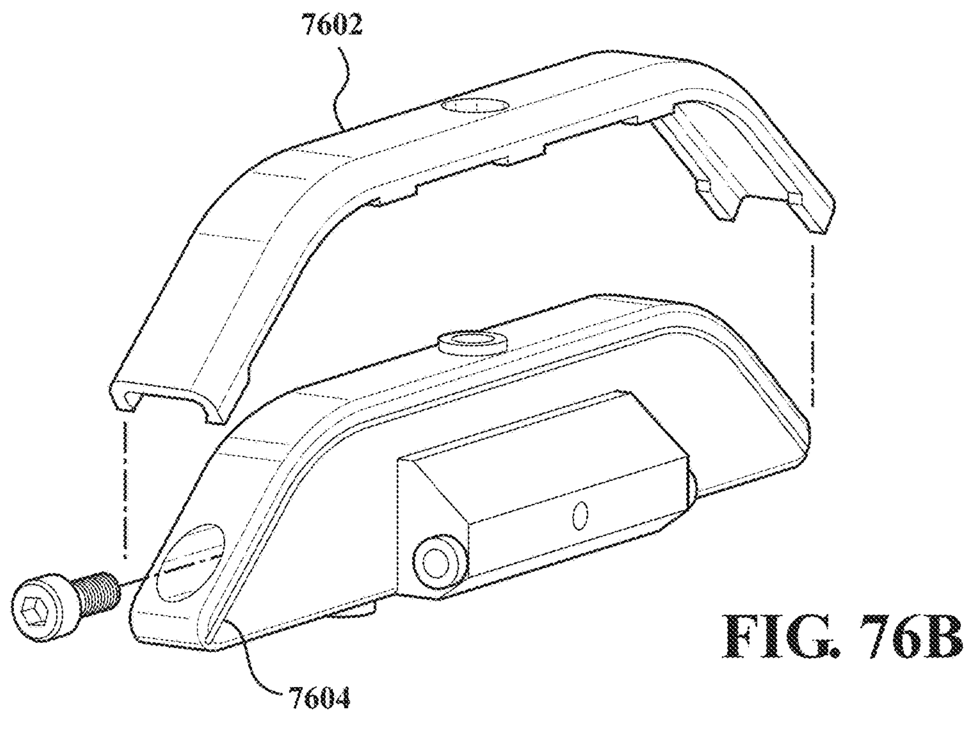
FIG. 76B depicts a perspective view looking up on an exploded view of the bottom of a sensor housing.
Figure 76C:
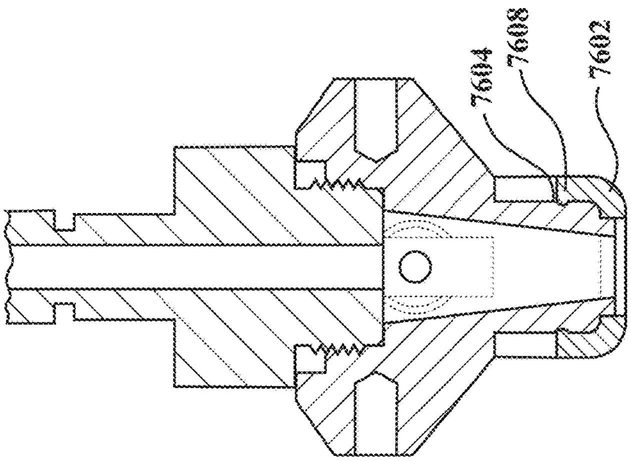
FIG. 76C depicts a front view cross-section of a sensor housing and surface contact relative to an inspection surface.
Figure 76D:
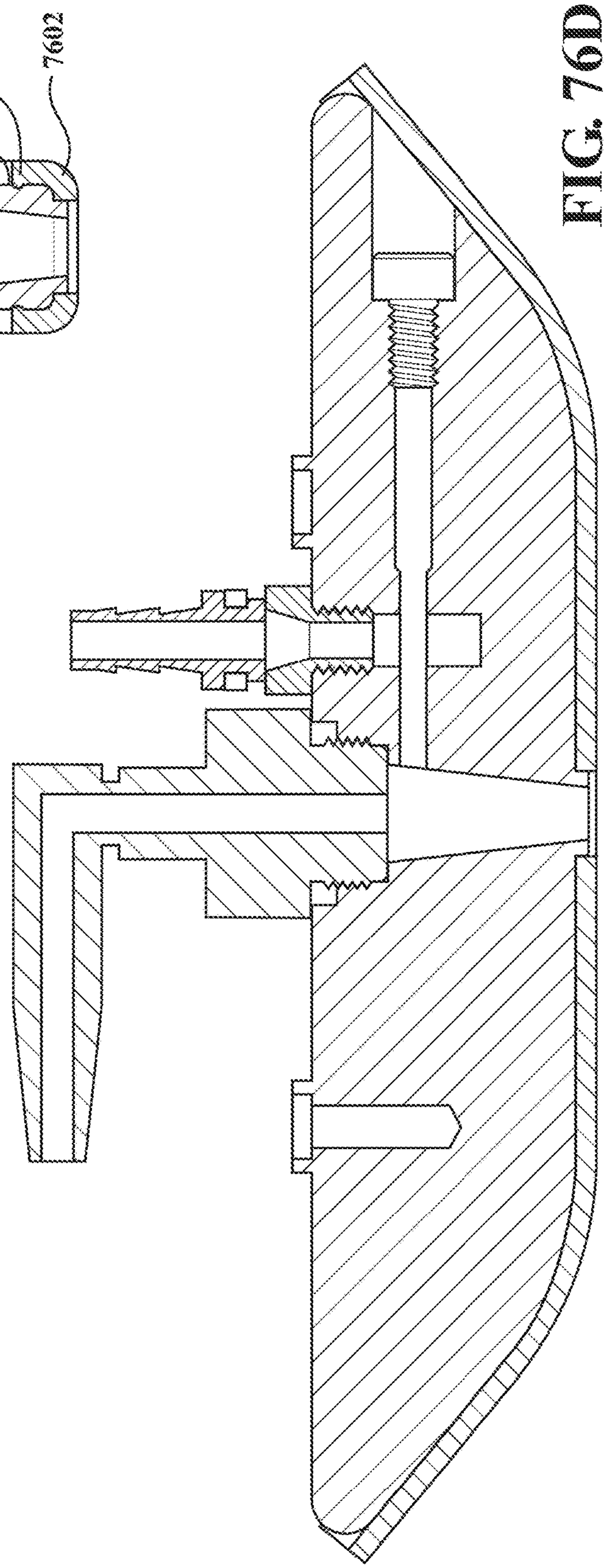
FIG. 76D depicts a side view cross-section of a sensor housing.

Referring to FIGS. 74A-74B, in a top perspective depiction, two multiple-sensor sled assemblies 7400 of different widths are shown, as indicated by the width label 7402. A multiple sled assembly may include multiple sleds 7302. Acoustic sleds may include a couplant port 7404 for receiving couplant from the robot. Each sled may have a sensor opening 7406 to accommodate a sensor and engage a power/data connector 7306. A multiple-sensor sled assembly width may be selected to accommodate the inspection surface to be traversed such as pipe outer diameter, anticipated obstacle size, desired inspection resolution, a desired number of contact points (e.g., three contact points ensuring self-alignment of the sled carriage and sleds), and the like. As shown in FIG. 75, an edge-on depiction of a multiple-sensor sled assembly, the sled spring 7304 may allow independent radial movement of each sled to self-align with the inspection surface. The rotational spacing 7502 (tracing a circumference on an arc) between sleds may be fixed or may be adjustable.

Figure 77:
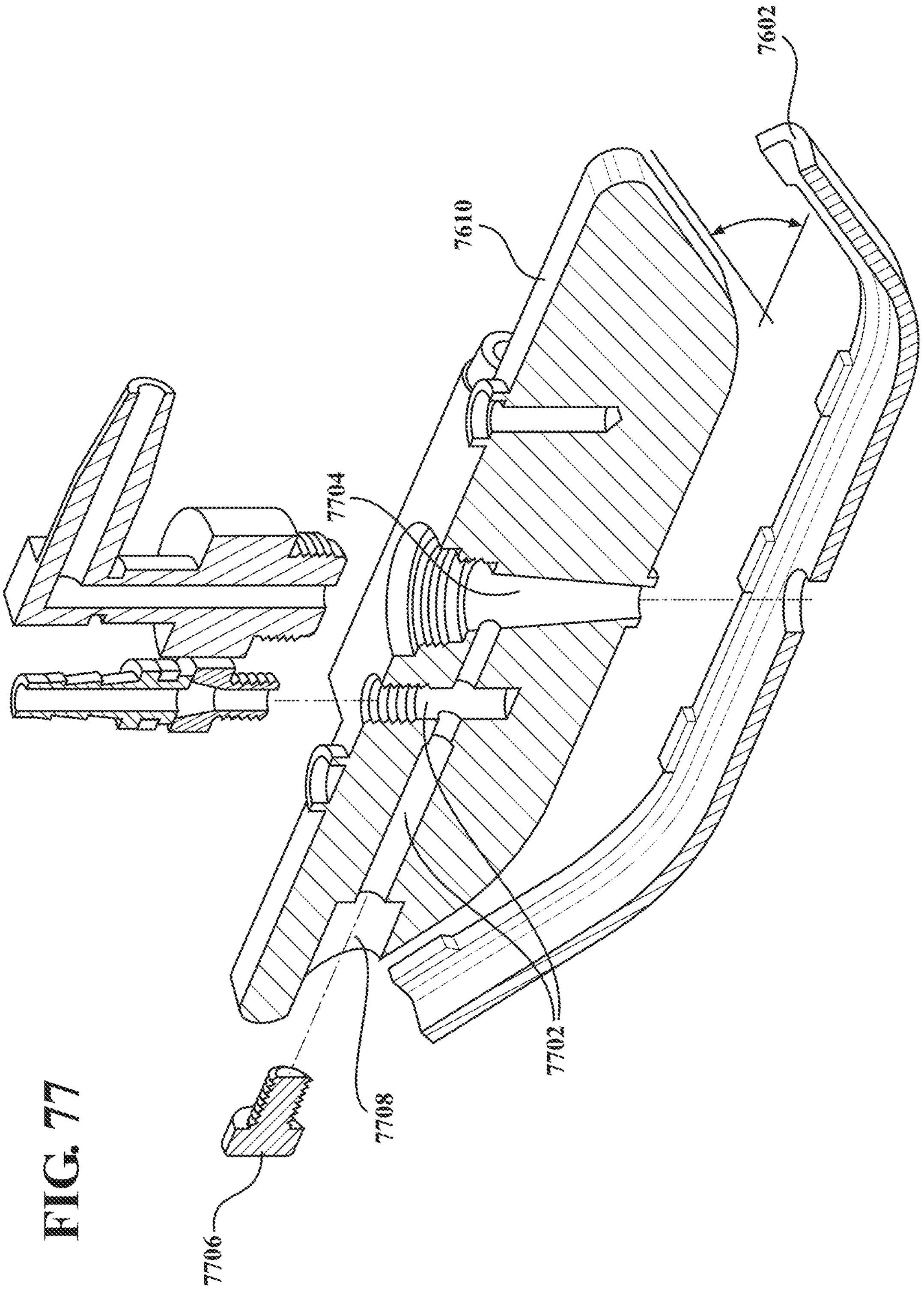
FIG. 77 depicts an exploded view of a cross-section of a sensor housing.
Figure 78:
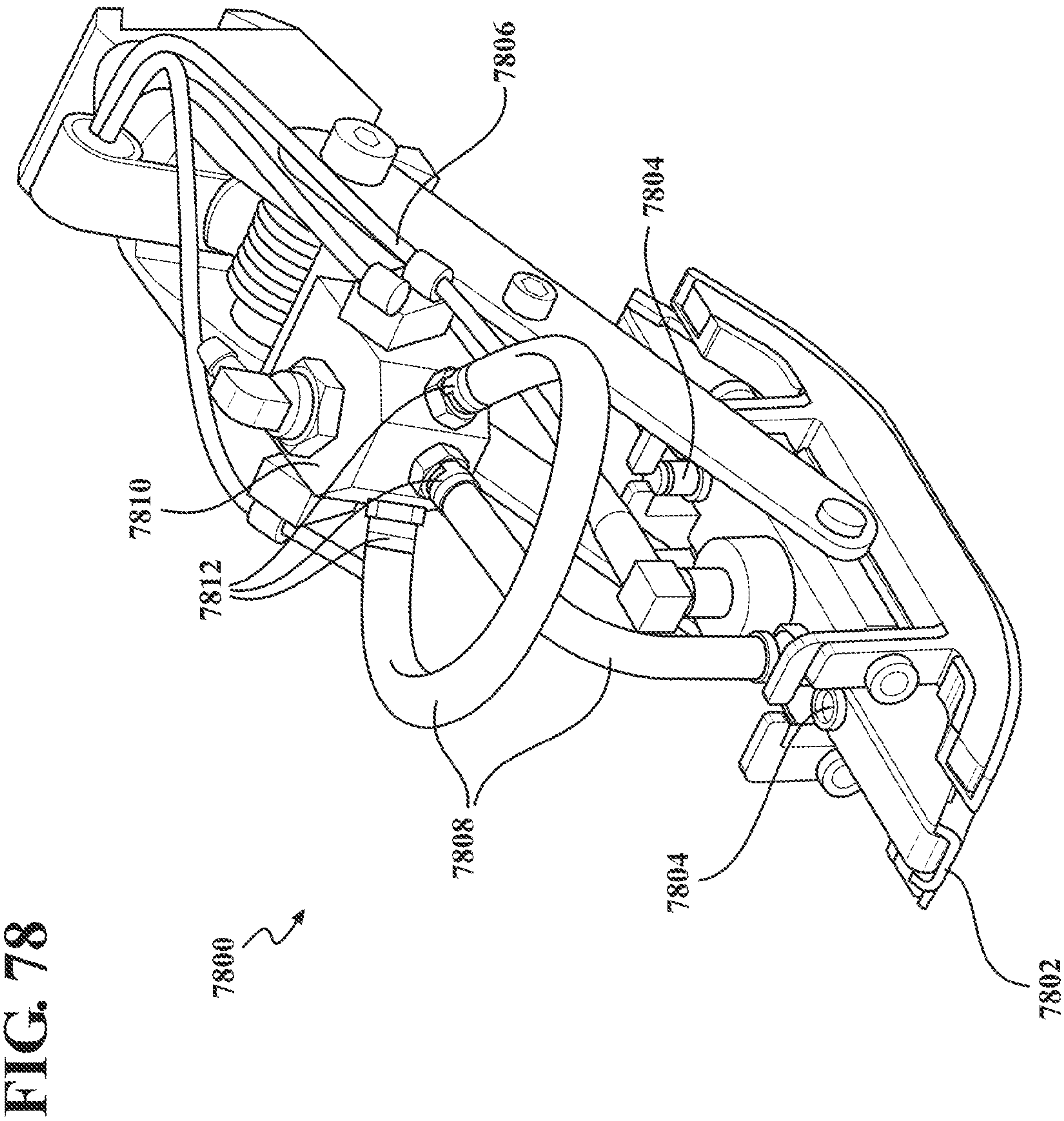
FIG. 78 depicts a sensor carriage with a universal single-sensor sled assembly.

Referring to FIGS. 76A-76D, a sled may include a sensor housing 7610 having a groove 7604. A replaceable engagement surface 7602 may include one or more hooks 7608 which interact with the groove 7604 to snap the replaceable engagement surface 7602 to the sensor housing 7610. The sensor housing 7610, a cross section of which is shown in FIG. 77, may be a single machined part which may include an integral couplant channel 7702, in some embodiments this is a water line, and an integrated cone assembly 7704 to allow couplant to flow from the couplant connector 7308 down to the inspection surface. There may be a couplant plug 7706 to prevent the couplant from flowing out of a machining hole 7708 rather than down through the integral cone assembly 7704 to the inspection surface. The front and back surface of the sled may be angled at approximately 40° to provide the ability of the sled to surmount obstacles on the navigation surface. If the angle is too shallow, the size of obstacle the sled is able to surmount is small. If the angle is too steep, the sled may be more prone to jamming into obstacles rather than surmounting the obstacles. The angle may be selected according to the size and type of obstacles that will be encountered, the available contingencies for obstacle traversal (degrees of freedom and amount of motion available, actuators available, alternate routes available, etc.), and/or the desired inspection coverage and availability to avoid obstacles.

In addition to structural integrity and machinability, the material used for the sensor housing 7610 may be selected based on acoustical characteristics (such as absorbing rather than scattering acoustic signals, harmonics, and the like), hydrophobic properties (waterproof), and the ability to act as an electrical insulator to eliminate a connection between the sensor housing and the chassis ground, and the like such that the sensor housing may be suitable for a variety of sensors including EMI sensors. A PEI plastic such as ULTEM® 1000 (unreinforced amorphous thermoplastic polyetherimide) may be used for the sensor housing 7610.

In embodiments, a sensor carriage may comprise a universal single sled sensor assembly 7800 as shown in FIGS. 78-80B. The universal single sled sensor assembly 7800 may include a single sensor housing 7802 having sled springs 7804 at the front and back (relative to direction of travel) to enable the sled 7802 to tilt or move in and out to accommodate the contour of the inspection surface, traverse obstacles and the like. The universal single sled sensor assembly 7800 may have a power/data connector 7806 to power the sensor and transfer acquired data back to the robot. The universal single sled sensor assembly 7800 may include multiple couplant lines 7808 attached to a multi-port sled couplant distributor 7810. Unused couplant ports 7812 may be connected to one another to simply reroute couplant back into a couplant system.

Figure 79:
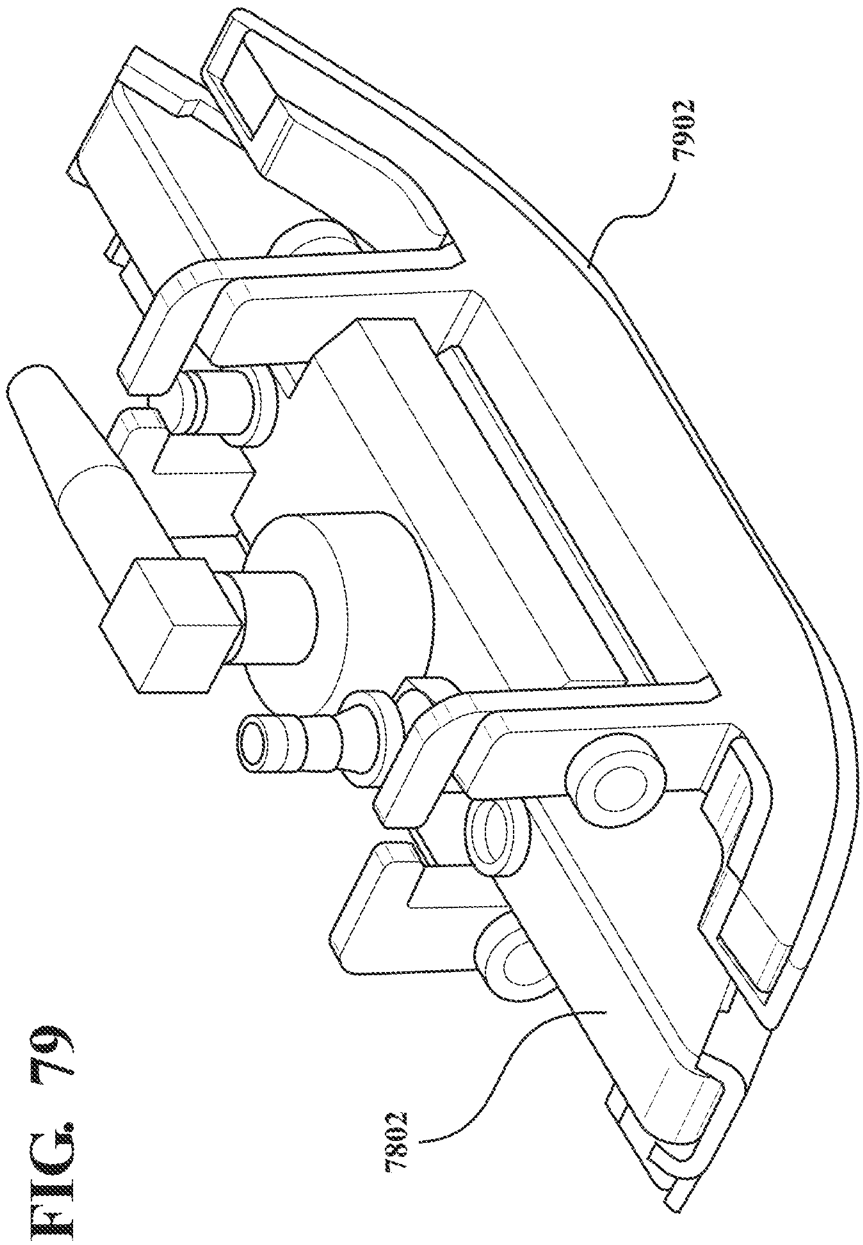
FIG. 79 depicts a universal single-sensor sled assembly that may be utilized with a single-sensor sled or a multi-sensor sled assembly.
Figure 80B:
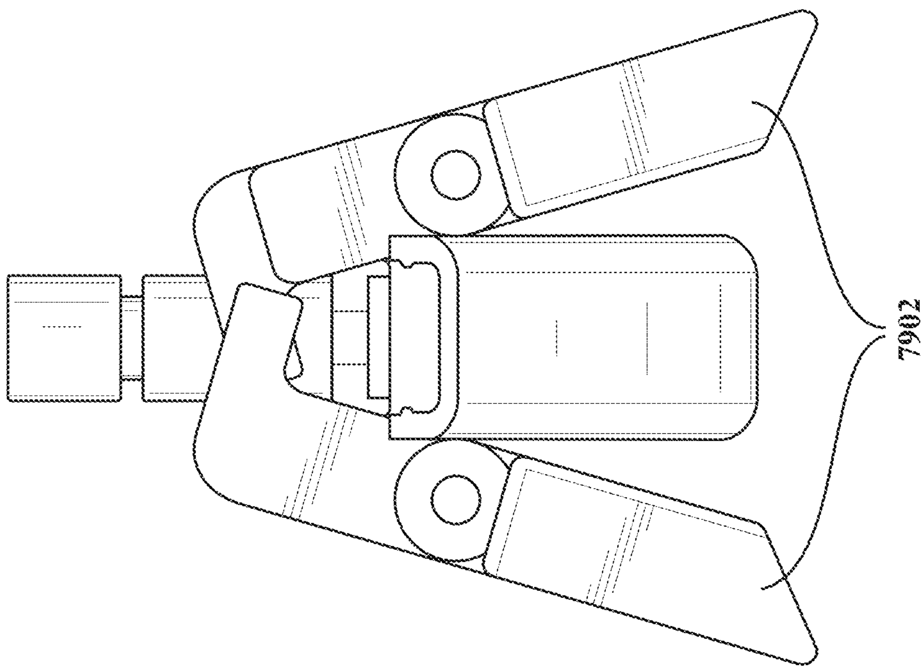
FIGS. 80A and 80B depict bottom views of a single sensor sled assembly with stability wings extended and contracted.
Figure 80A:
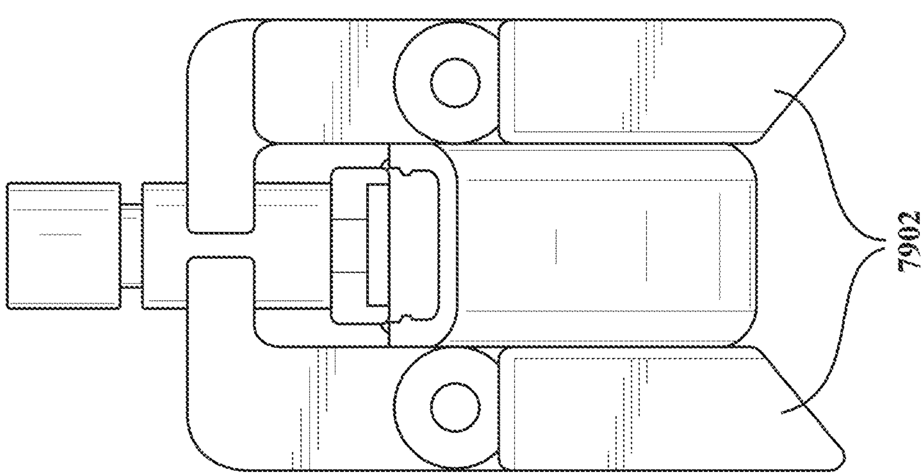

Referring to FIG. 79, a universal single-sensor assembly may include extendable stability "wings" 7902 located on either side of the sensor housing 7802 which may be expanded or contracted (See FIGS. 80A-80B) depending on the inspection surface. In an illustrative and non-limiting example, the stability "wings" may be expanded to accommodate an inspection surface such as a pipe with a larger outer dimension. The stability "wings" together with the sensor housing 7802 provide three points of contact between the single-sensor assembly 7800 and the inspection surface, thereby improving the stability of the single sensor assembly 7800. In certain embodiments, the stability wings also provide rapid access to the replaceable/wearable contact surface for rapid changes and/or repair of a sled contact surface.

In embodiments, identification of a sensor and its location on a rail and relative to the center module may be made in real-time during a pre-processing/calibration process immediately prior to an inspection run, and/or during an inspection run (e.g., by stopping the inspection robot and performing a calibration). Identification may be based on a sensor ID provided by an individual sensor, visual inspection by the operator or by image processing of video feeds from navigation and inspection cameras, and user input include including specifying the location on the robot and where it is plugged in. In certain embodiments, identification may be automated, for example by powering each sensor separately and determining which sensor is providing a signal.

Figure 81A:
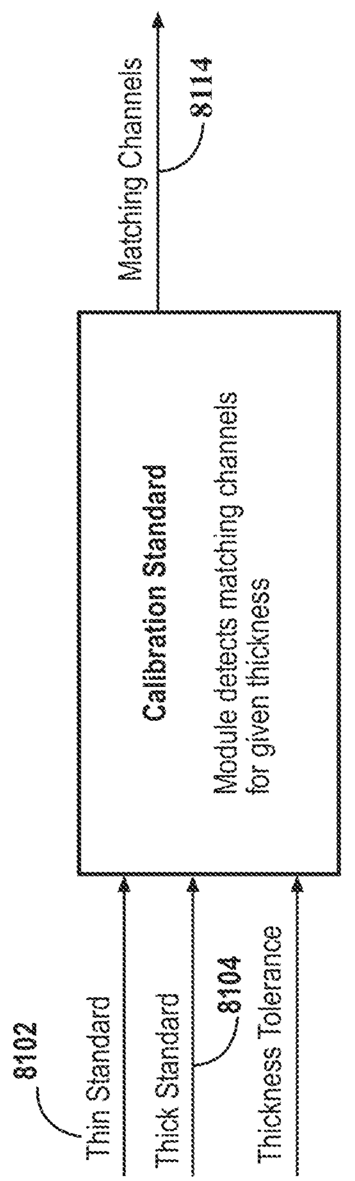
FIG. 81A depicts a calibration data flow for an ultra-sonic inspection robot.

In other embodiments, as shown in FIG. 81A, a sensor may be initially calibrated by measuring a thin standard 8102 and a thick standard 8104 (e.g., a thick and thin standard for the type of surface, pipe, etc. being measured), and matching the sensor being calibrated with the matching thick and thin channel measurements resulting in matching channels 8114 having thick and thin channels that map to a specific sensor or sensor type. In certain embodiments, sensor measurements (e.g., return times, as described elsewhere in the present disclosure) may be matched by interpolation between the thin standard 8102 and the thick standard 8104. In certain embodiments, depending upon the material response and the desired measurement accuracy, measurements may be extrapolated outside of the thin standard 8102 and the thick standard 8104. Additionally or alternatively, a single standard may be utilized in certain embodiments, with measurement comparisons to the standard to provide the measured thickness value of the inspection surface.

Figure 81B:
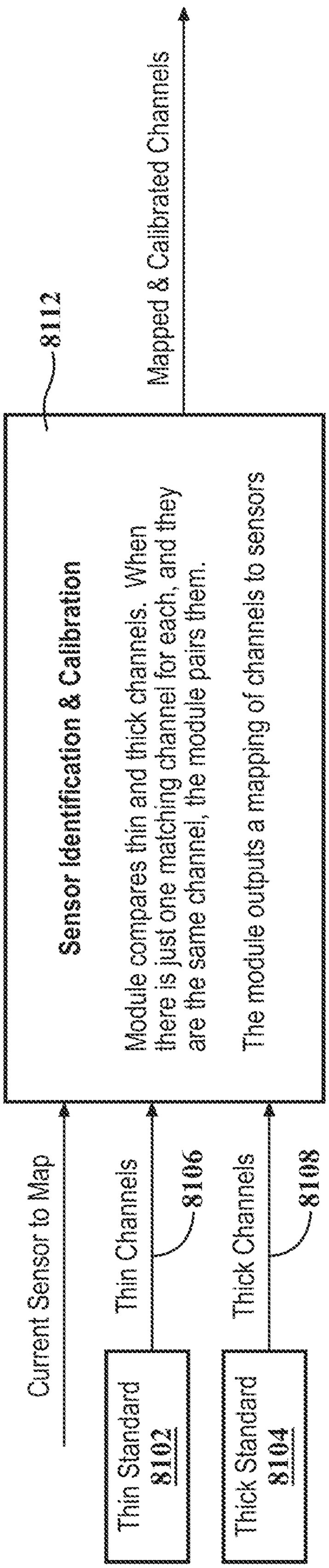
FIG. 81B depicts the flow of data for sensor identification and calibration.

As shown in FIG. 81B, a calibration block may include both a thick standard 8104 and a thin standard 8102, each standard 8102 8104 having precisely known thicknesses. Measurements may be made of each standard 8102 8104, resulting in thin channels of data 8106 and thick channels of data 8110. The sensor identification and calibration module 8112 compares the incoming thin and thick channels 8106 8108 with a plurality of matching channel data 8114, and, once matches for both the thin channel of data 8106 and the thick channel of data 8110 are found in a single matching channel, the sensor identification and calibration module 8112 pairs the sensor definition with the data coming in from that sensor. The thin and thick channel data may be compared with data expected from standards of the specified thickness and an offset calibration map may be developed that may be applied to data obtained by the given sensor during an inspection run post calibration. There may be different calibration blocks based on different inspection surface characteristics such as outer diameter of pipes to be inspected, material making up inspection surface (different materials having different acoustic properties), type of inspection surface (e.g., pipes, tank, nominal thicknesses of the target surface), and the like. Having offsets for different thickness may enable the system to interpolate a needed offset for intervening thickness values, and may improve the accuracy of the measurements. This resulting in mapping received data channels to sensors as well as calibration maps for mapping correcting offsets in the data received from the mapped sensor. Sensors may be identified according to the response of the sensor, where the match is determined from the sensor return for the known thickness value for a particular channel, then the sensor can be identified for that data channel.

Figure 82:
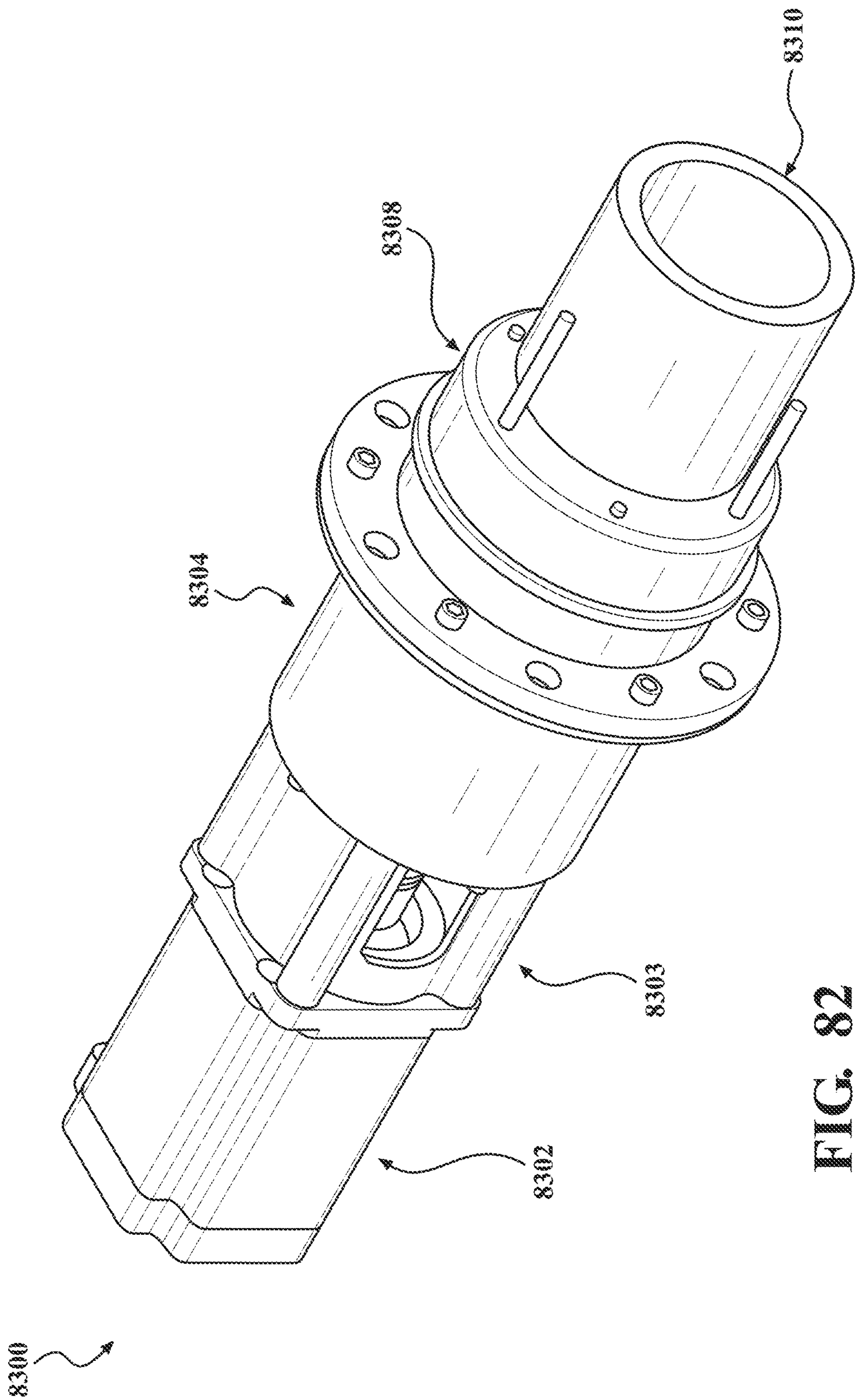
FIG. 82 depicts a wheel assembly machine.
Figure 83:
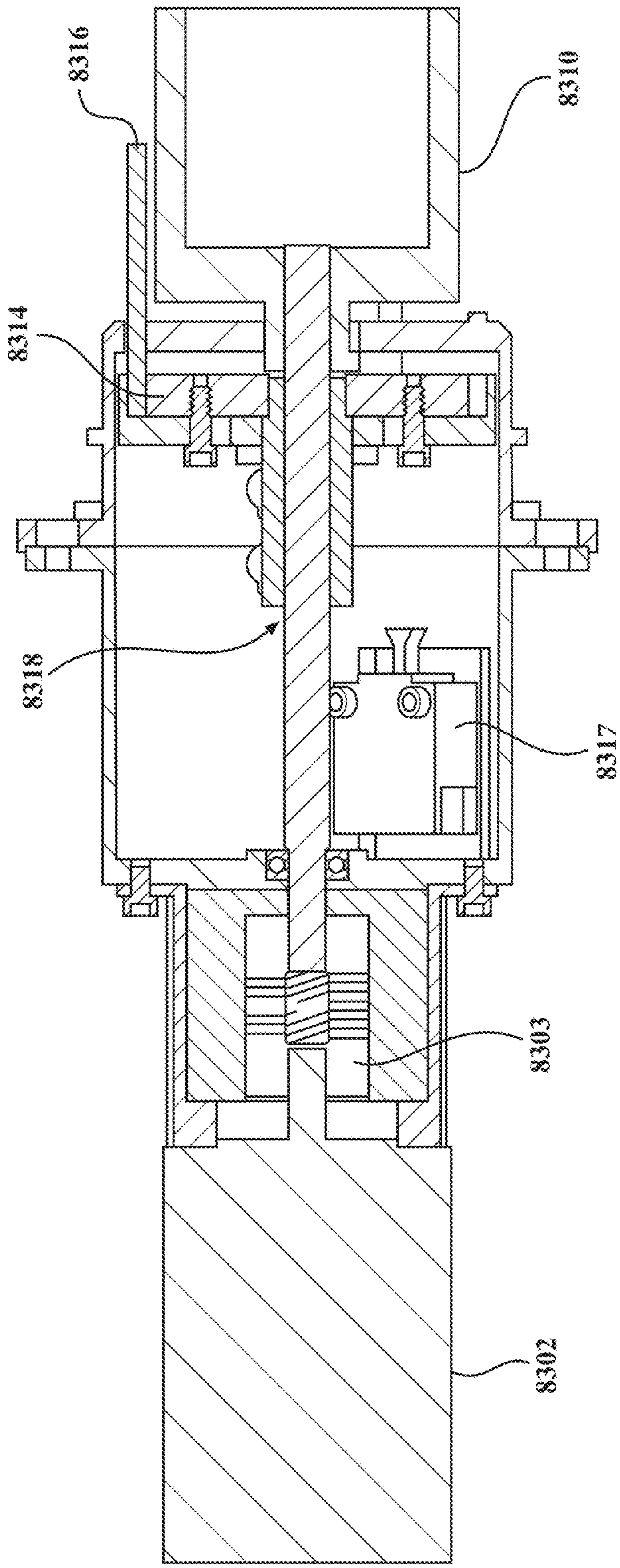
FIG. 83 depicts a cross-section of a wheel assembly machine for a magnetic wheel.

In order to safely manufacture the wheels using a high strength magnet, a wheel assembly machine ("WAM") may be used to assemble the wheel while providing increased safety for a worker assembling the wheel. FIGS. 82 and 83 depict a wheel assembly machine and a cross section of the wheel assembly machine 8300. The wheel assembly machine 8300 may include a motor assembly 8302, a shaft coupler 8303, a drum assembly 8304, a fixture assembly 8308, and an alignment shaft 8310. The fixture assembly 8308 may include an actuated flange 8314 with pins 8316, a limit switch 8317 and a ball screw and nut 8318. The motor 8302 may allow the pins 8316 to be raised and lowered, moving the magnet toward or away from the wheel plate, and further avoiding a pinch hazard between the magnet and the wheel plate.

Figure 84B:
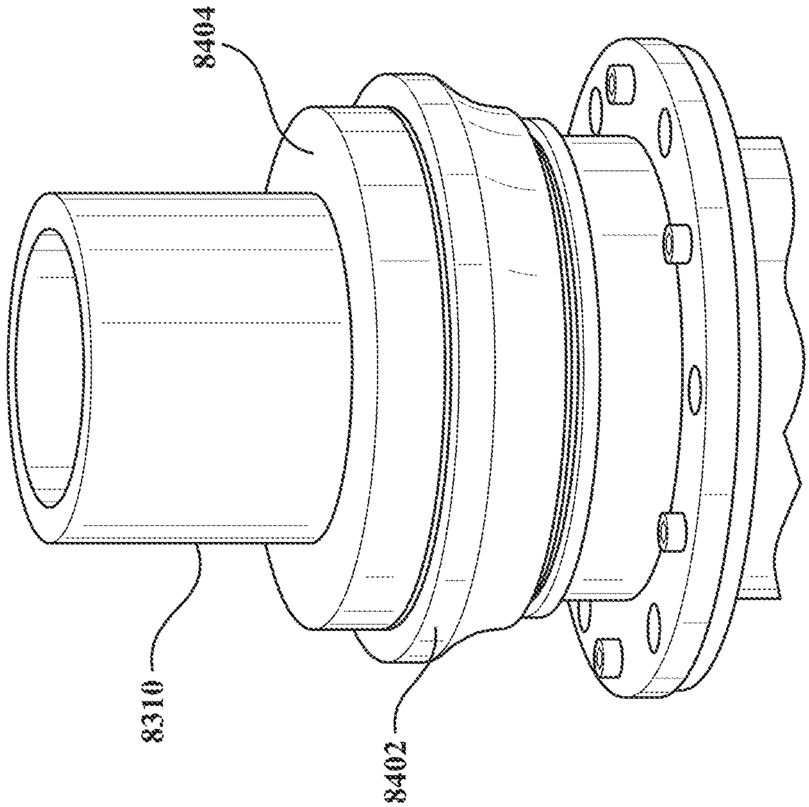
FIGS. 84A and 84B depict a wheel at different points in a process of assembly on the wheel assembly machine.
Figure 84A:
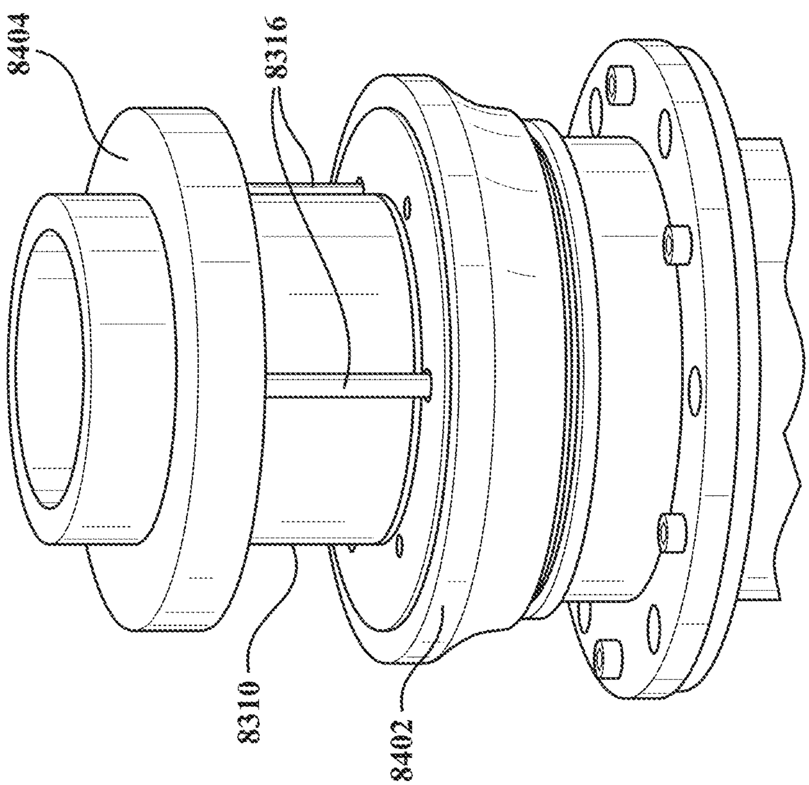

FIG. 84A depicts the pins 8316 extending through a wheel plate 8402 positioned on the alignment shaft 8310. A magnet 8404 may be placed on the alignment shaft 8310 such that it rests on the pins 8316. The pins 8316 may then be lowered (FIG. 84B) resulting in the magnet 8404 being correctly paired with one of the two wheel plates 8402. The second wheel plate may be lowered onto the alignment shaft 8310 where it can be dropped onto the already assembled wheel plate 8402 and magnet 8404. To disassemble the wheel, the pins 8316 may be extended, pushing the magnet 8404 off the lower wheel plate 8402 and the upper wheel plate 8402 off of the alignment shaft 8310.

An example procedure for detecting and/or traversing obstacles is described following. An example procedure includes evaluating at least one of: a wheel slippage determination value, a motor torque value, and a visual inspection value (e.g., through the camera, by an operator or controller detecting an obstacle directly and/or verifying motion). The example procedure further includes determining that an obstacle is present in response to the determinations. In certain embodiments, one or more determinations are utilized to determine that an obstacle may be present (e.g., a rapid and/or low-cost determination, such as the wheel slippage determination value and/or the motor torque value), and another determination is utilized to confirm the obstacle is present and/or to confirm the location of the obstacle (e.g., the visual inspection value and/or the wheel slippage determination value, which may be utilized to identify the specific obstacle and/or confirm which side of the inspection robot has the obstacle). In certain embodiments, one or more obstacle avoidance maneuvers may be performed, which may be scheduled in an order of cost, risk, and/or likelihood of success, including such operations as: raising the payload, facilitating a movement of the sensor carriage around the obstacle, reducing and/or manipulating a down force of the payload and/or of a sensor carriage, moving the inspection robot around and/or to avoid the obstacle, and/or changing the inspection run trajectory of the inspection robot.

Figure 85:
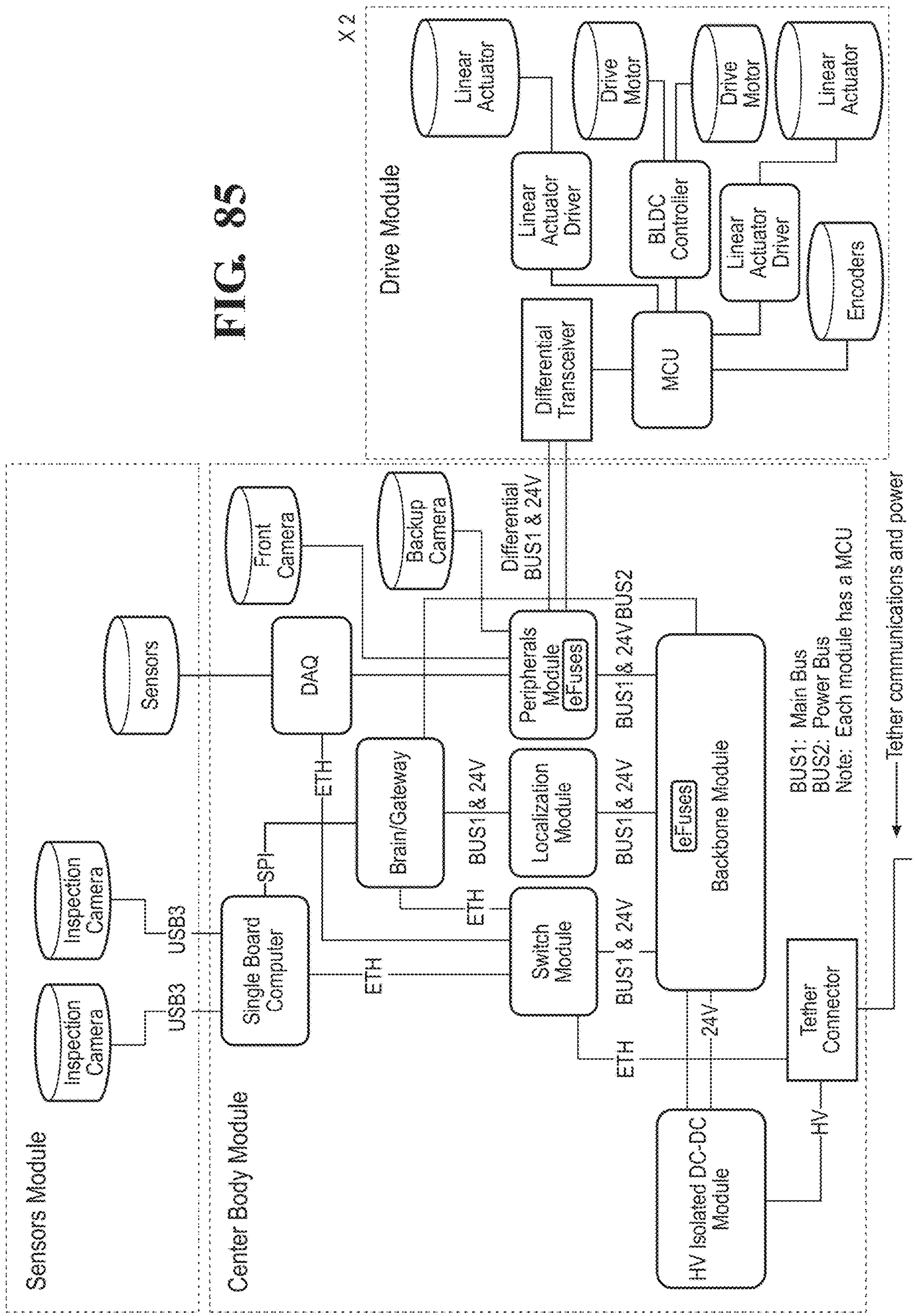
FIG. 85 depicts a schematic block diagram of a control scheme for an inspection robot.

FIG. 85 depicts a schematic block diagram of a control scheme for an inspection robot. The example control scheme includes distributed control, with a high level controller (e.g., the brain/gateway, and/or with distributed elements in the base station) providing standardized commands and communications to highly capable low-level controllers that provide hardware specific responses. Various communication and/or power paths are depicted between controllers in the example of FIG. 85, although specific communication protocols, electrical power characteristics, and the like are non-limiting examples for clarity of the present description. In the example of FIG. 85, two separate drive modules may be present in certain embodiments, each having an interface to the center body. In the example of FIG. 85, the sensor module includes the inspection cameras and sensor communications, and may be on the payload and/or associated with the payload (e.g., on the center body side and in communication with sensors of the payload).

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

Figure 86:
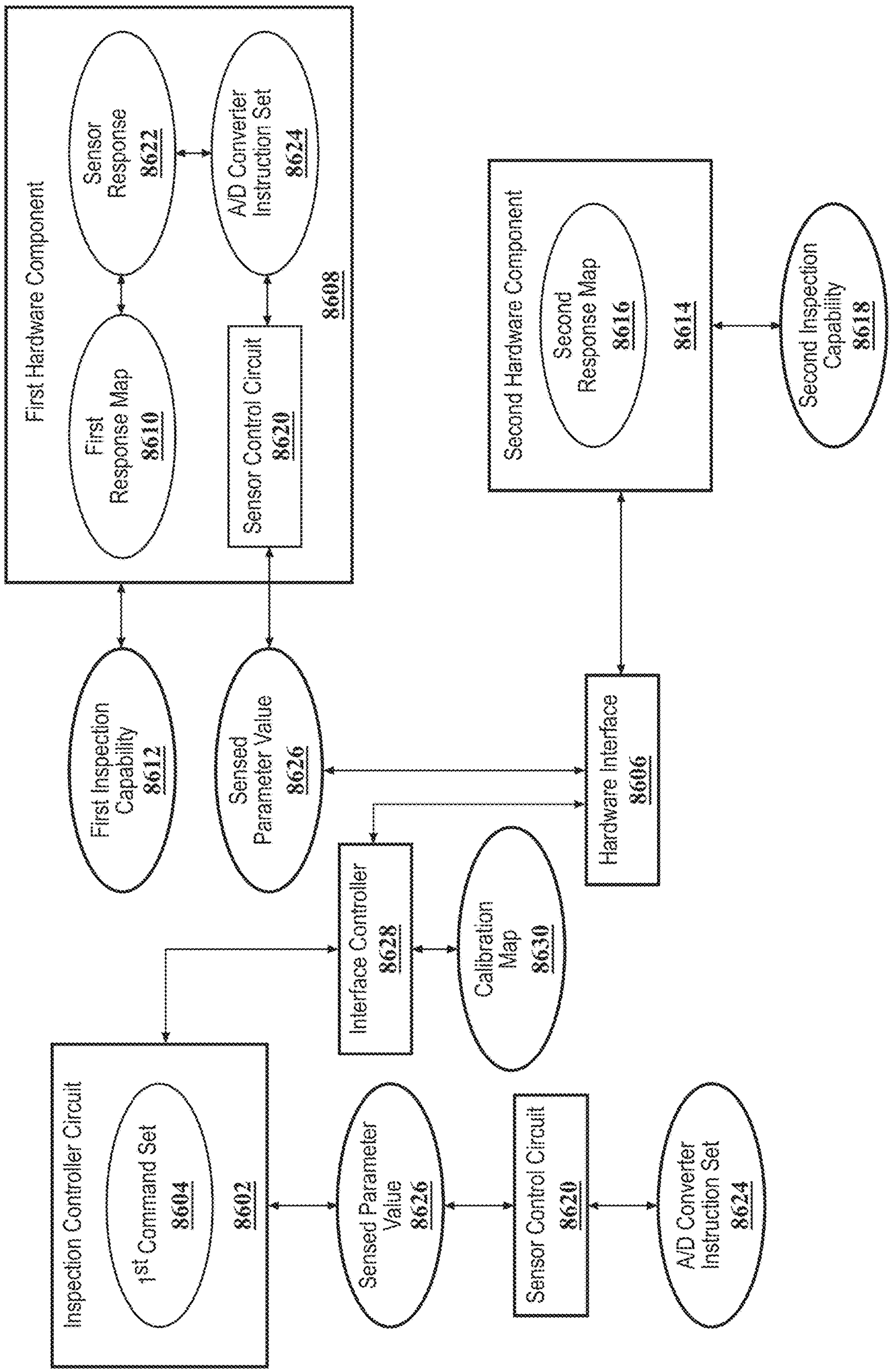
FIG. 86 is a schematic diagram of a system for distributed control of an inspection robot.

Referencing FIG. 86, an example system for operating an inspection robot having a distributed microcontroller assembly is depicted, the distributed microcontroller assembly supporting modular control operations, and allowing for rapid prototyping, testing, reconfiguration of the inspection robot, and swapping of hardware components without requiring changes to the primary inspection control functions of the inspection robot.

The example system includes an inspection controller circuit 8602 that operates an inspection robot using a first command set 8604. In certain embodiments, the first command set 8604 includes high-level inspection control commands, such as robot positioning and/or movement instructions, instructions to perform sensing operations and/or actuator operations, and may further include instructions using standardized parameters, state values, and the like that are separated from low-level instructions that might be configured for the specific characteristics of hardware components of the inspection robot. For example, an actuator may be responsive to specific voltage values, position instructions, or the like, where the example first command set includes instructions such as whether the actuator should be activated, a down force to be applied by the actuator, a position target value of an actuated component such as a payload or stability assist device, and/or a state value such as "inspecting", "stability assist stored", "stability assist deployed", "payload raised", etc.

The example system includes a hardware interface 8606 in communication with the inspection controller circuit 8704, where the hardware interface utilizes the first command set 8604. The example system further includes a first hardware component 8608 that is operatively couplable to the hardware interface 8606, and a second hardware component 8614 that is couplable to the hardware interface 8606. The hardware components 8608, 8614 may include sensors, actuators, payloads, and/or any other device that, when coupled to the inspection robot, communicates and/or is controlled by the inspection robot during inspection operations. In certain embodiments, one or more of the hardware components 8608, 8614 includes a painting device, an actuator, a camera, a welding device, a marking device, and/or a cleaning device. The example first hardware component 8608 includes a first response map 8610, which may include a description of sensor response values (e.g., voltages, frequency values, current values, or the like) provided by the hardware component 8608 and corresponding values used by the inspection robot, such as the represented sensed values (e.g., temperature, UT return time, wall thickness indicated, etc.). Another example first response map 8610 may include a description of actuation command values provided by the inspection robot corresponding to actuator responses for the values. For example, actuation command values may be an actuator position value, where the actuator responses may be voltage values, current values, or the like provided to the actuator. The example second hardware component 8614 including a second response map 8616. In certain embodiments, the first response map 8610 is distinct from the second response map 8616.

In certain embodiments, the actuation command values and/or the represented sensed values are more specific to the hardware component than parameters utilized in the first command set 8604. In certain embodiments, as described following, an interface controller 8628 and/or a low level hardware control circuit (e.g., sensor control circuit 8620) may be present and interposed between the hardware component and the inspection controller circuit 8602. Intermediate controllers or control circuits may be positioned on either side of the hardware interface 8606, and may further be positioned on the respective hardware controller.

The system includes the inspection controller circuit 8602 controlling the first hardware component 8608 or the second hardware component 8614 utilizing the first command set 8604. The system having the first hardware component 8608 coupled to the hardware interface 8606 has a first inspection capability 8612, and the system having the second hardware component 8614 coupled to the hardware interface 8606 has a second inspection capability 8618. In certain embodiments, the first inspection capability 8612 is distinct from the second inspection capability 8618, such as distinct inspection and/or sensing capabilities, and/or distinct actuation capabilities. The first hardware component 8608 and/or the second hardware component 8614 may include more than one sensor (e.g., a group of sensors having a single interface to the hardware interface 8606), more than one actuator (e.g., a drive module having a drive actuator and a payload actuator), or combinations of these (e.g., a drive module or payload having at least one sensor and at least one actuator).

An example system includes at least one of the hardware components 8608, 8614 including a sensor (depicted as the first hardware component 8608 in the example of FIG. 86), and a sensor control circuit 8620 that converts a sensor response 8622 to a sensed parameter value 8626. The example sensor control circuit 8620 is depicted as positioned on the hardware component, and as interposed between the hardware interface 8606 and the inspection controller circuit 8602, although the sensor control circuit 8620 may be positioned in only one of these locations for a given embodiment. The example sensor control circuit 8620 utilizes an A/D converter instruction set 8624 to convert the sensor response 8622. In certain embodiments, the sensor control circuit 8620 performs one or more operations such as debouncing, noise removal, filtering, saturation management, slew rate management, hysteresis operations, and/or diagnostic processing on the sensor response 8622 to determine the sensed parameter value 8626. In certain embodiments, the sensor control circuit 8620 additionally or alternatively interprets the sensor response 8622 by converting the sensor response 8622 from sensor provided units (e.g., voltage, bits, frequency values, etc.) to the sensed parameter value 8626. In certain embodiments, for example where the sensor is a smart sensor or a high capability sensor, the sensor may be configured to provide the sensed parameter value 8626 directly, and/or the sensor control circuit 8620 may be positioned on the sensor to provide the sensed parameter value 8626.

In certain embodiments, the inspection controller circuit 8602 utilizes the sensed parameter value 8626. The sensed parameter value 8626 may be communicated to the inspection controller circuit 8602 from the sensor control circuit 8620, for example where the interface controller 8628 receives the sensor response 8622, and the sensor control circuit 8620 is interposed between the hardware interface 8606 and the inspection controller circuit 8602. In certain embodiments, the sensed parameter value 8626 may be communicated to the inspection controller circuit 8602 from the interface controller 8628, for example where the interface controller 8628 receives the sensed parameter value 8626 from the sensor control circuit 8620 interposed between the hardware interface 8606 and the sensor.

An example interface controller 8628 interprets the sensor response 8622 utilizing a calibration map 8630. For example, the calibration map 8630 may include interface information between the first command set 8604 and responses and/or commands from/to the respective hardware component 8608, 8614. In certain embodiments, when a hardware component coupled to the hardware interface 8606 is changed, the interface controller updates the calibration map 8630, for example selecting an applicable calibration map 8630 from a number of available calibration maps 8630, and/or receiving an update (e.g., a new calibration, and/or updated firmware for the interface controller 8628) to provide the updated calibration map 8630. In certain embodiments, the hardware component provides an identifier, such as part number, build number, component type information, or the like, and the interface controller 8628 selects a calibration map 8630 in response to the identifier of the hardware component.

Figure 87:
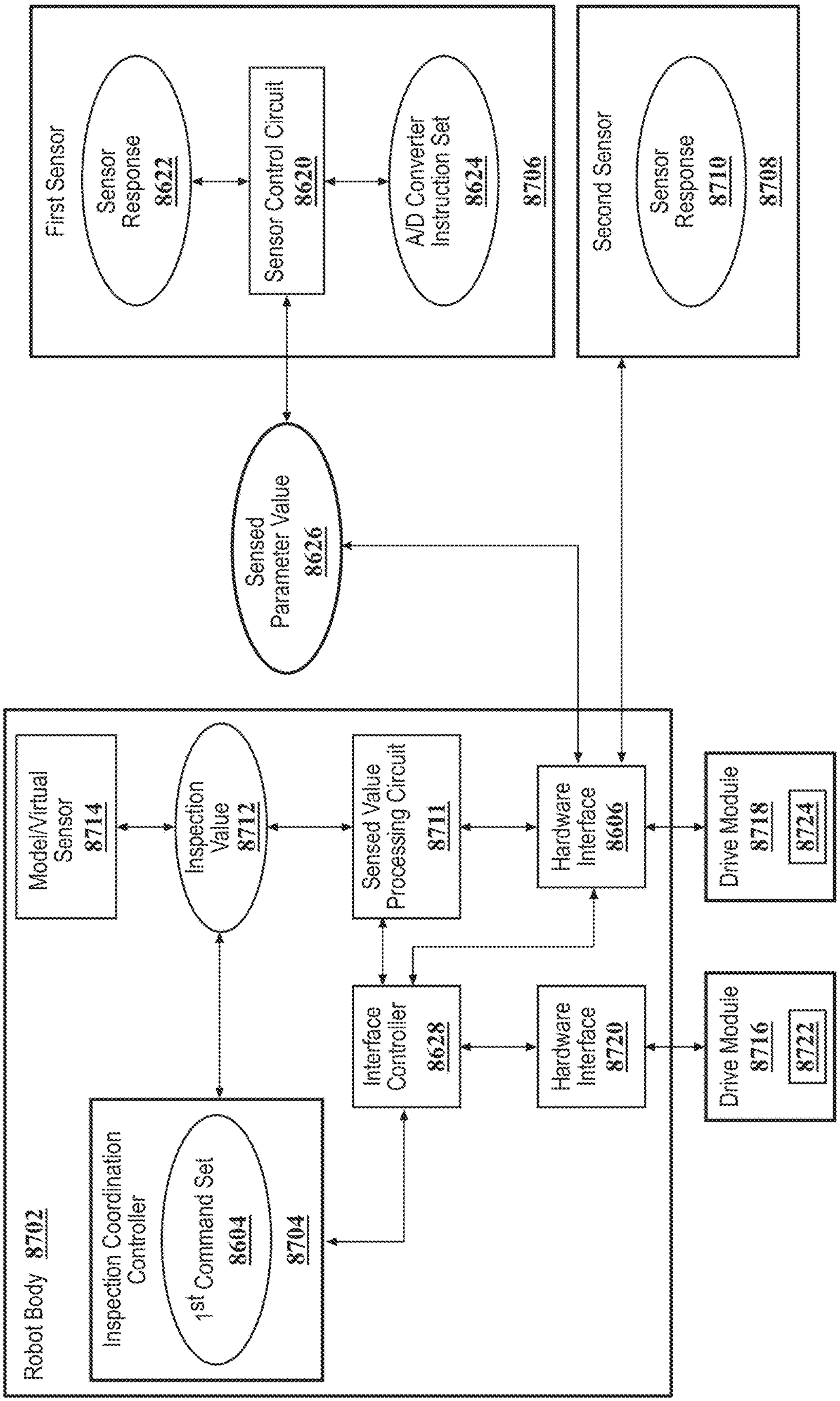
FIG. 87 is a schematic diagram of an inspection robot supporting modular component operations.

Referencing FIG. 87, an example inspection robot for performing inspection operations having a distributed microcontroller assembly is depicted, the distributed microcontroller assembly supporting modular control operations, and allowing for rapid prototyping, testing, reconfiguration of the inspection robot, and swapping of hardware components without requiring changes to the primary inspection control functions of the inspection robot. The inspection robot includes a robot body 8702 including an inspection coordination controller 8704 that controls a first inspection utilizing a first command set 8604. The inspection robot includes a hardware interface 8606 in communication with the inspection coordination controller 8704, a first sensor 8706 operatively couplable to the hardware interface 8606, where the first sensor has a first response map 8610, and a second sensor 8708 operatively couplable to the hardware interface 8606, where the second sensor 8708 has a second response map 8616. In certain embodiments, the second response map 8616 is distinct from the first response map 8610. The inspection coordination controller 8704 further controls, using the first command set 8604, the first sensor 8706 or the second sensor 8708.

In certain embodiments, the first sensor 8706 and second sensor 8708 are swappable, such as where either the first sensor 8706 or the second sensor 8708 can be coupled to the hardware interface 8606, and the inspection coordination controller 8704 can continue to control inspection operations without a change to the first command set 8604. In certain embodiments, the swappable first sensor 8706 or the second sensor 8708 indicates that a same functionality of the inspection robot is available, even where the sensor responses 8622, 8710 are distinct (e.g., the sensors have a same type, can fulfill a same function, and/or they can be utilized with other components of the inspection robot to provide a same function).

An example inspection robot includes a sensor control circuit 8620 included on the first sensor 8706 and/or the second sensor 8708 (the first sensor 8706 in the example of FIG. 87) that converts the sensor response 8622 to a sensed parameter value 8626. In certain embodiments, the sensor control circuit 8620 provides the sensed parameter value 8626 to the hardware interface 8606. In certain embodiments, the sensor control circuit 8620 converts the sensor response 8622 by performing one or more of debouncing, noise removal, filtering, saturation management, slew rate management, hysteresis operations, and/or diagnostic processing on the sensor response 8622 provided by the sensor. In certain embodiments, the sensor control circuit 8620 performs an A/D conversion on the sensor response 8622 provided by the sensor.

An example inspection robot includes an interface controller 8628 in communication with the hardware interface 8606, where the interface controller 8628 further receives one of the sensed parameter value 8626 or the sensor response 8622, 8710. In certain embodiments, the inspection robot further includes a sensed value processing circuit 8711 that converts the sensed parameter value 8626 to an inspection value 8712 (e.g., converting a sensed value to a secondary value such as a wall thickness, coating thickness, etc.). An example sensed value processing circuit 8711 provides the inspection value 8712 to the inspection coordination controller 8704, and/or to a model or virtual sensor 8714. In certain embodiments, the model or virtual sensor 8714 utilizes the inspection value 8712 to determine other values in the system.

An example inspection robot includes two drive modules 8716, 8718, each operatively coupled to a respective hardware interface 8606, 8720. The example system includes the interface controller 8628 interposed between the inspection coordination controller 8704 and each of the hardware interfaces 8606, 8720. The example inspection robot further includes each drive module 8716, 8718 having a respective drive controller 8722, 8724, where each drive controller 8722, 8724 is in communication with the respective hardware interface 8606, 8720. The example including the drive modules 8716, 8718 and the interface controller 8628 provides for separation between the first command set 8604 and the specific communication protocols, command values, and the like for the drive modules 8716, 8718. In certain embodiments, the example including the drive modules 8716, 8718 and the interface controller 8628 provides for swapability and/or reversibility of the drive modules 8716, 8718 between the hardware interfaces 8606, 8720.

Figure 88:
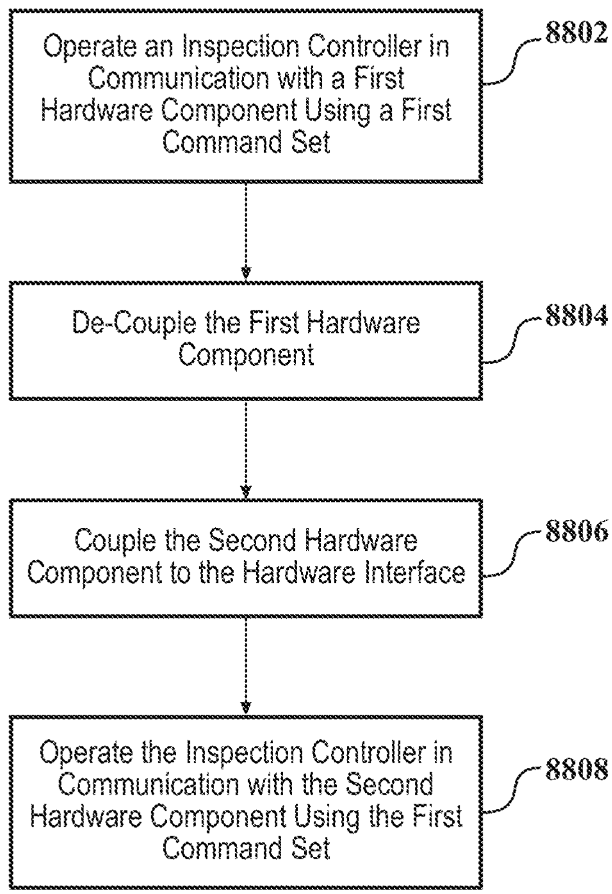
FIG. 88 is a schematic flow diagram of a procedure for operating an inspection robot.

Referencing FIG. 88, an example procedure for operating an inspection robot having a distributed microcontroller assembly is depicted. The example procedure includes an operation 8802 to operate an inspection controller in communication with a first hardware component coupled to a hardware interface utilizing a first command set, where the first hardware component includes a first response map, an operation 8804 to de-couple the first hardware component from the hardware interface, an operation 8806 to couple a second hardware component to the hardware interface, where the second hardware component includes a second response map, and an operation 8808 to operate the inspection controller in communication with the second hardware component utilizing the first command set.

An example procedure includes one of the response maps including an A/D converter instruction set, and/or where the first response map is distinct from the second response map. An example procedure includes an operation (not shown) to operate an interface controller communicatively coupled to the hardware interface, where the operating of the interface controller includes interpreting data from the first hardware component utilizing the first response map, interpreting data from the second hardware component utilizing the second response map, and communicating with the inspection controller in response to the first command set. In certain embodiments, interpreting data from the first hardware component is performed in a first hardware configuration (e.g., with the first hardware component coupled to the hardware interface), and interpreting data from the second hardware component is performed in a second hardware configuration (e.g., with the second hardware component coupled to the hardware interface).

An example procedure includes one of the response maps including an A/D converter instruction set, and/or where the first response map is distinct from the second response map. An example procedure includes an operation (not shown) to operate an interface controller communicatively coupled to the hardware interface, where the operating of the interface controller includes providing actuator command values to the first hardware component utilizing the first response map, providing actuator command values to the second hardware component utilizing the second response map, and communicating with the inspection controller in response to the first command set. In certain embodiments, providing actuator command values to the first hardware component is performed in a first hardware configuration (e.g., with the first hardware component coupled to the hardware interface), and providing actuator command values to the second hardware component is performed in a second hardware configuration (e.g., with the second hardware component coupled to the hardware interface). In certain embodiments, the procedure includes an operation to update computer readable instructions accessible to the interface controller before operating the inspection controller in communication with one of the hardware components, for example after a swap from the first hardware component to the second hardware component.

Figure 89:
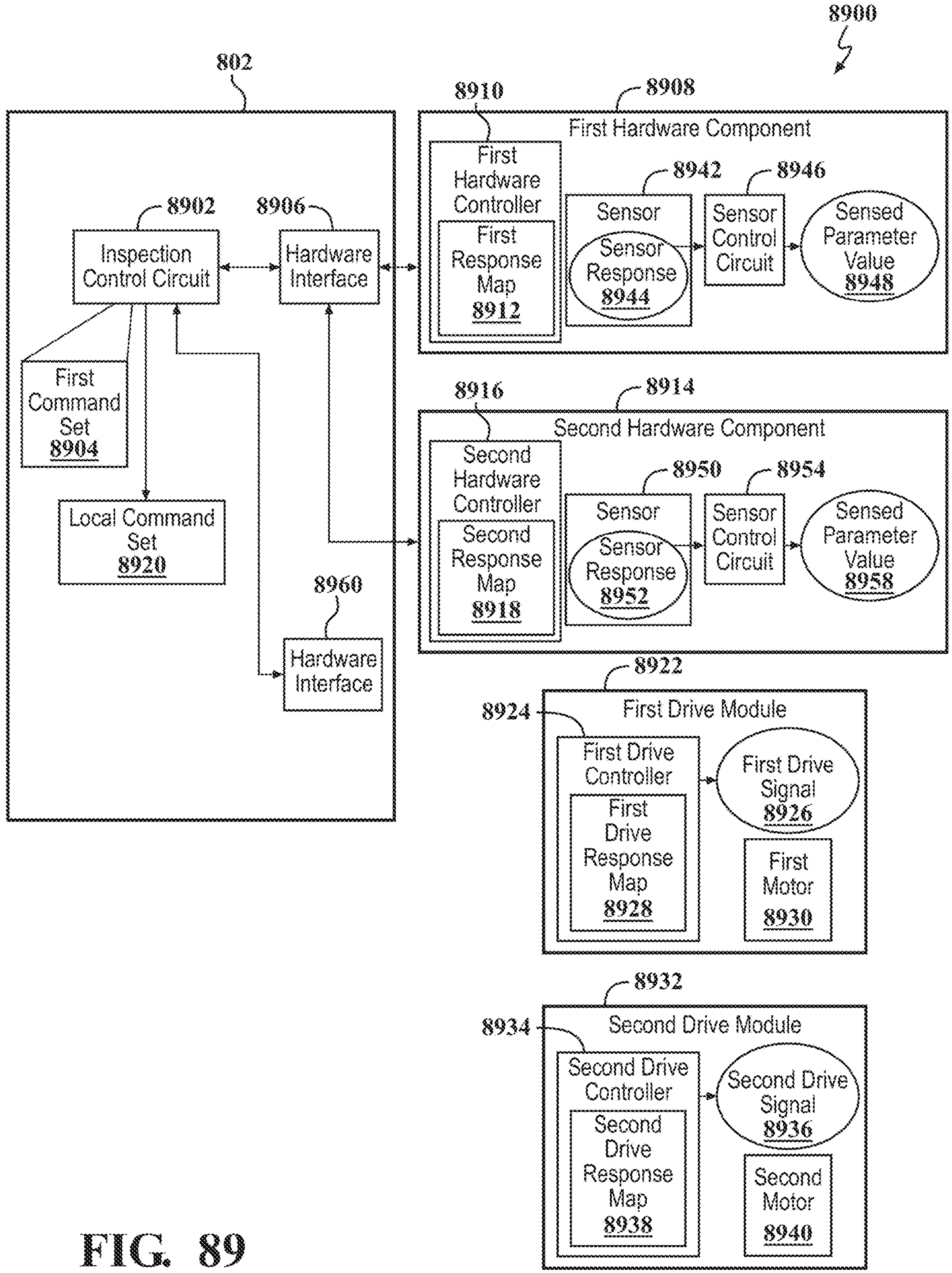
FIG. 89 is a schematic diagram of a system for distributed control of an inspection robot.

Referencing FIG. 89, an example system 8900 for distributed control of an inspection robot is depicted. The inspection robot may include any embodiment of an inspection robot as set forth throughout the present disclosure. The example system includes an inspection control circuit 8902 structured to operate the inspection robot utilizing a first command set, such as high level operation descriptions including movement commands, sensor commands (e.g., sensor on/off times, sampling rates, etc.), actuator commands (e.g., actuator activation or deactivation, actuator positions, and/or result commands such as applying a selected downforce, position for a payload, position for a sled, etc.). The example system includes a hardware interface 8906 in communication with the inspection control circuit 8902, where the hardware interface utilizes the first command set.

The example system includes a first hardware component 8908 operatively couplable to the hardware interface 8906, where the first hardware component includes and/or is in communication with a first hardware controller 8910. The first hardware controller 8910 includes a first response map 8912, for example including interface descriptions, A/D mapping, hardware responses to commands, and the like, where the first hardware controller 8910 commands the first hardware component 8908 in response to the first response map 8912 and the first command set 8904.

The example system includes a second hardware component 8914 operatively couplable to the hardware interface 8906, where the second hardware component includes and/or is in communication with a second hardware controller 8916. The second hardware controller 8916 includes a second response map 8918, and commands the second hardware component 8914 in response to the second response map 8918 and the first command set 8904.

It can be seen that the system of FIG. 89 provides for an inspection robot controller 802 operable to command inspection operations of the inspection robot, with either the first hardware component 8908 or the second hardware component 8914 coupled to the hardware interface 8906, without a change in the coupled hardware component requiring a change in the inspection robot controller 802 or the first command set 8904.

The example system 8900 further includes the first hardware controller 8910 utilizing a local command set 8920 to command the first hardware component 8908. For example, the inspection robot controller 802 may store a number of command sets thereon, wherein the first hardware controller 8910 selects one of the number of command sets as the local command set 8920 based on the type of hardware component being controlled, a function of the hardware component (e.g., sensing, a type of sensor, actuating a payload, actuating a sensor position, actuating a down force value, actuating a drive wheel, etc.) and/or the type of command present in the first command set 8904. The utilization of a local command set 8920 allows for the implementation of different hardware component types, while allowing the high level first command set 8904 to operate utilizing functional commands disassociated with the specific hardware components implementing the commands. In certain embodiments, a system 8900 may be changed to be compatible with additional hardware component types, actuator positions (e.g., a payload actuator coupled to a drive module or to a center chassis), by adding to available command sets available as local command sets 8920 without changing the inspection control circuit 8902 or the first command set 8904.

An example system 8900 includes the first response map 8912 being distinct from the second response map 8918, for example where the first hardware component 8908 is a different type of component than the second hardware component 8914, and/or has different interaction values such as response curves relative to electrical control values.

An example system 8900 includes a first drive module 8922 (which may be the first hardware component 8908, although they are depicted separately in the example of FIG. 89) having a first drive controller 8924 that determines a first drive signal 8926 in response to the first command set 8904 and a first drive module response map 8928. The first drive module 8922 may include a first motor 8930 (e.g., coupled to a drive wheel of the first drive module 8922) that is responsive to the first drive signal 8926.

An example system 8900 includes a second drive module 8932 (which may be the second hardware component 8914) having a second drive controller 8934 that determines a second drive signal 8936 in response to the first command set 8904 and a second drive module response map 8938. The second drive module 8932 may include a second motor 8940 that is responsive to the second drive signal 8936.

In certain embodiments, one of the first drive module 8922 or the second drive module 8932 may be coupled to the hardware interface 8906. Additionally or alternatively, one or both of the drive modules may be coupled to one or more additional hardware interfaces 8960, for example with a first drive module 8922 coupled to a center chassis on a first side, and a second drive module 8932 coupled to the center chassis on a second side. In certain embodiments, the drive controllers 8924, 8934 are configured to provide appropriate drive signals 8926, 8936 to the drive modules 8922, 8932 responsive to the first command set 8904, based on the response maps 8928, 8938 and/or which hardware interface 8960 the drive modules 8922, 8932 are coupled to. In certain embodiments, the first command set 8904 may include a command to move the inspection robot in a desired direction and speed, and the operation of the drive controllers 8924, 8934 allow for proper movement (direction and speed) regardless of which side the drive modules are coupled to. Accordingly, in certain embodiments, the drive modules 8922, 8932 are swappable, and/or reversible, without changes to the inspection control circuit 8902 or the first command set 8904. In certain embodiments, the first drive module response map 8928 is distinct from the second drive module response map 8938, for example where the motors are distinct, where the drive modules 8922, 8932 include different actuators (e.g., a payload actuator on one, and a stability support device actuator on the other), and/or where the drive modules 8922, 8932 are positioned on opposing sides of the center chassis (e.g., where reversibility management is performed response map 8928, 8938 rather than through interface 8960 detection). In certain embodiments, the first drive signal 8926 is distinct from the second drive signal 8936, even where an identical drive response is desired from the first drive module 8922 and the second drive module 8932. In certain embodiments, the drive signals 8926, 8936 may be a commanded parameter to the motor (e.g., 50% torque), and/or the drive signals 8926, 8936 may be a voltage value or a current value provided to the respective drive motor 8930, 8940.

An example hardware component 8908, 8914 includes a sensor 8942, 8950, where the hardware component 8908, 8914 further includes a sensor control circuit 8946, 8954 that converts a sensor response of the sensor (e.g., depicted as 8944, 8952) to a sensed parameter value 8948, 8958. In certain embodiments, the inspection control circuit 8902 utilizes the sensed parameter value 8948, 8958, for example as a representation of a parameter sensed by the respective sensor, as a base sensor value, and/or as a minimally processed sensor value.

In certain embodiments, the sensor control circuit 8946, 8954 converts the sensor response 8944, 8952 by performing one or more of debouncing, noise removal, filtering, saturation management, slew rate management (e.g., allowable sensor response change per unit time, sampling value, and/or execution cycle), hysteresis operations (e.g., filtering, limiting, and/or ignoring sensor response sign changes and/or increase/decrease changes to smooth the sensed parameter value 8948, 8958 and/or avoid cycling), and/or diagnostic processing (e.g., converting known sensor response 8944, 8952 values that may be indicating a fault, electrical failure, and/or diagnostic condition instead of a sensed value—for example utilizing reserved bits of the sensor response map) on the sensor response 8944 value.

In certain embodiments, one or more hardware controllers 8910, 8946, 8916, 8954, 8924, 8934 and/or response maps 8912, 8918, 8928, 8938 may be positioned on the inspection robot controller 802, positioned on another controller in communication with the inspection robot controller 802, and/or positioned on the respective hardware component (e.g., as a smart component, and/or as a closely coupled component controller). In certain embodiments, one or more hardware controllers 8910, 8946, 8916, 8954, 8924, 8934 are interposed between the inspection control circuit 8902 and the respective hardware component.

Figure 90:
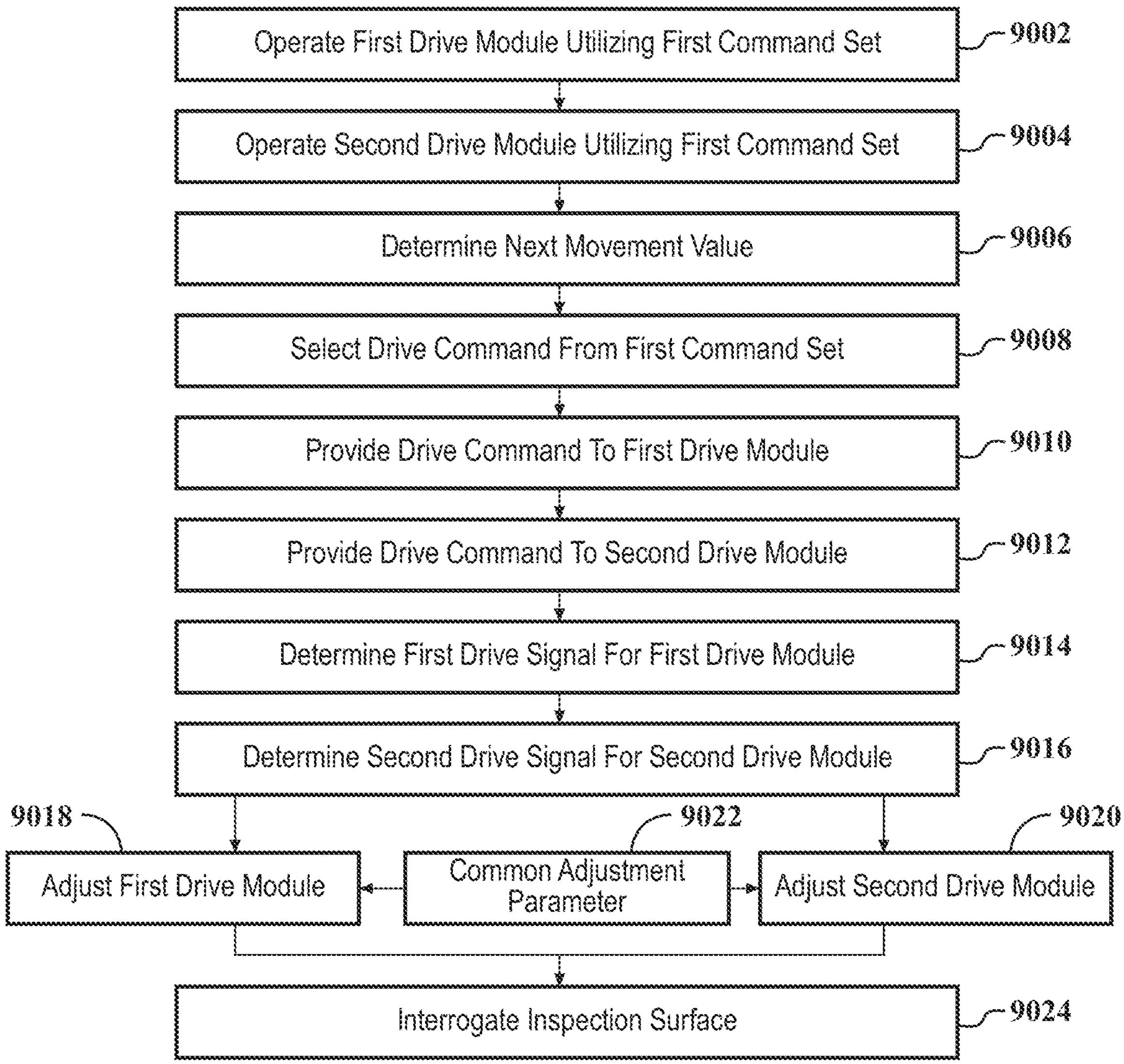
FIG. 90 is a schematic flow diagram of a procedure for operating an inspection robot having distributed control.

Referencing FIG. 90, an example procedure to operate distinct hardware devices, such as drive modules, utilizing a same first command set, and/or utilizing a swappable hardware interface, is depicted. The example procedure includes an operation 9002 to operate a first drive module with the first command set, and an operation 9004 to operate a second drive module with the first command set. The example procedure further includes an operation 9006 to determine a next movement value in response to the first command set, an operation 9008 to select a drive command from the first command set (e.g., where the first command set includes a number of additional commands in addition to drive commands), and an operations 9010, 9012 to provide drive command to each of the first drive module and the second drive module.

In certain embodiments, the example procedure further includes an operation 9014 to determine a first drive signal for the first drive module in response to a first response map for the first drive module, and an operation 9016 to determine a second drive signal for the second drive module in response to a second response map for the second drive module. The example procedure includes operations 9018, 9020 to adjust the first drive module and the second drive module (and/or the first drive signal or the second drive signal), respectively, by an adjustment amount having a common adjustment parameter. In certain embodiments, the procedure includes an operation 9022 to determine the common adjustment parameter as one of a speed parameter, a distance parameter, and/or a direction parameter. For example, the common adjustment parameter 9022 may be utilized to adjust the first drive module 9108 in a first direction and the second drive module 9016 in an opposite direction to account for the positions of the reversible drive modules with respect to a center chassis of the inspection robot. In another example, the common adjustment parameter 9022 may be utilized to prevent wheel slipping, for example where the inspection robot is turning on a surface, by commanding an inner one of the drive modules to turn slightly slower and/or traverse a smaller distance, and commanding an outer one of the drive modules to turn slightly faster or traverse a larger distance.

In certain embodiments, operations 9018, 9020 to adjust the drive modules (and/or drive module signals) are performed to achieve a target provided by the first command set, where the adjustments do not have a common adjustment parameter, and/or where the adjustments are not adjusted by a same or similar amount (e.g., where a wheel of one of the drive modules is determined to be slipping). The procedure further includes an operation 9024 to interrogate the inspection surface (e.g., perform sensing operations) in response to the first command set.

Figure 91:
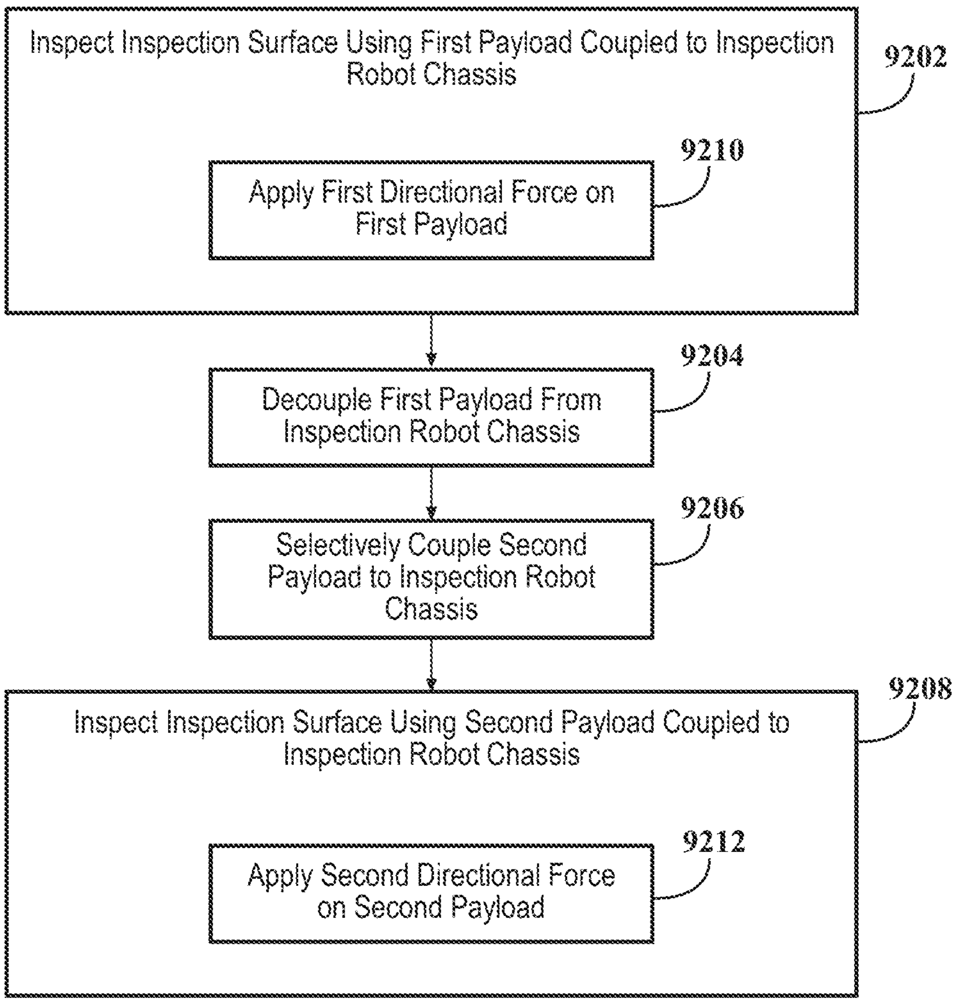
FIG. 91 is a flow chart depicting a method of inspecting an inspection surface with an inspection robot.
Figure 92:
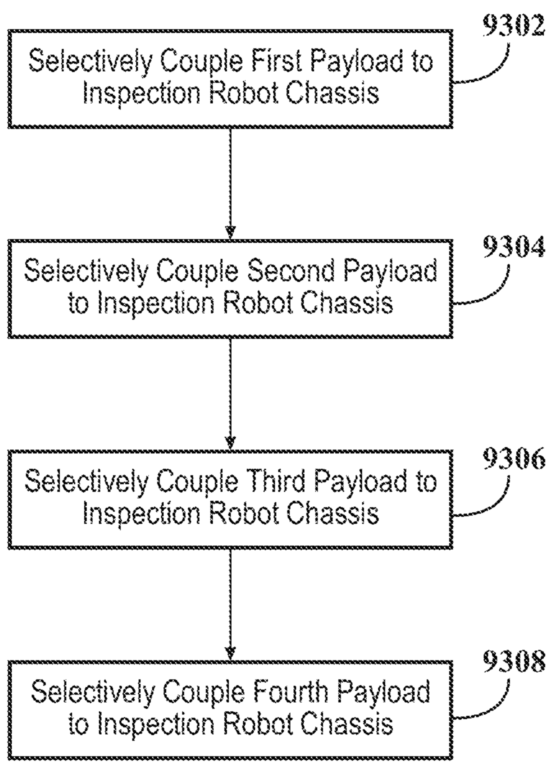
FIG. 92 is a flow chart depicting another method of inspecting an inspection surface with an inspection robot.
Figure 93:
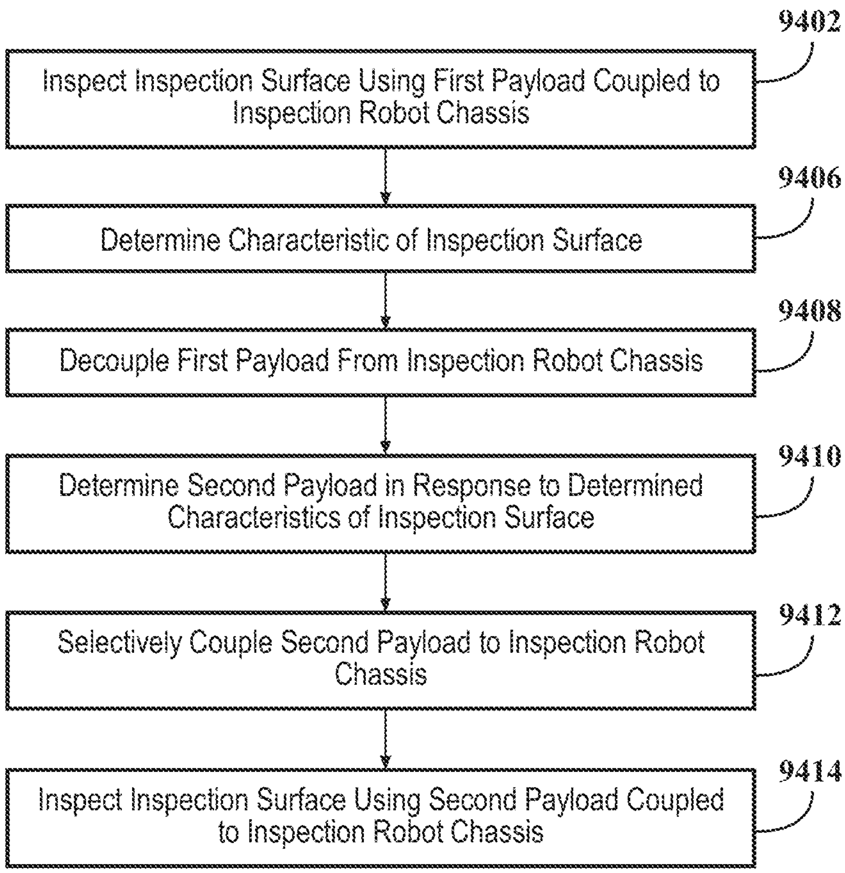
FIG. 93 is a flow chart depicting another method of inspecting an inspection surface with an inspection robot.

Referring to FIGS. 91-93, example methods for inspecting an inspection surface with an inspection robot using configurable payloads are depicted. The inspection robot includes any inspection robot having a number of sensors associated therewith and configured to inspect a selected area. Without limitation to any other aspect of the present disclosure, an inspection robot as set forth throughout the present disclosure, including any features or characteristics thereof, is contemplated for the example methods depicted in FIGS. 91-93. In certain embodiments, the inspection robot 100 (FIG. 1) may have one or more payloads 2 (FIG. 1) and may include one or more sensors 2202 (FIG. 29) on each payload 2.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

As illustrated in FIG. 91, a first method includes inspecting 9202 an inspection surface using a first payload coupled to a chassis of the inspection robot, decoupling 9204 the first payload from the inspection robot, and selectively coupling 9206 a second payload to the chassis of the inspection robot. As will be explained in greater detail below, the first payload has a first inspection characteristic and the second payload has a second inspection characteristic that is distinct from the first inspection characteristic. In embodiments, the method further includes inspecting 9208 the inspection surface using the second payload.

In embodiments, the inspection characteristic distinction may be a difference between a configuration of the one or more inspection sensors of the first payload and a configuration of the one or more inspection sensors of the second payload. The configuration difference may be a difference in a type of inspection sensor between the first and second payloads. In such embodiments, the sensors may be ultrasonic sensors, electromagnetic induction (EMI) sensors, photonic sensors, infrared sensors, ultraviolet sensors, electromagnetic radiation sensors, camera sensors, and/or optical sensors. For example, a first portion of an inspection run may use a first payload having ultrasonic sensors for an initial pass 9202 over the inspection surface. In the event an abnormality is found, the first payload may be swapped out for a second payload having optical sensors for use in a second pass 9208 over the inspection surface to acquire images of the abnormality. As will be understood, various other combinations of sensors between the first and second payloads may be used.

In embodiments, both the first payload and the second payload may each comprise two or more inspection sensors, and the difference in the configuration of the first payload and the second payload may be a difference in spacing between the inspection sensors on the first payload and the inspection sensors on the second payload. For example, a first inspection pass 9202 over the inspection surface may use a payload with a wide spacing between inspection sensors in order to save on the amount of data and/or time needed to capture the status of the inspection surface. In the event that an abnormality is found during the first pass, a second payload, having a smaller spacing between the sensors than the first payload, may be swapped in place of the first payload for a second inspection run 9208 in order to obtain higher quality data of the abnormality, but while taking a longer period of time to cover the same amount of area on the inspection surface as the first payload. As another example, the first inspection pass 9202 may cover a first portion of the inspection surface that may require a lower level of resolution, where the first payload has a wider spacing between sensors than the second payload which is used to cover a second portion of the inspection surface that requires higher resolution. In embodiments, the difference of spacing may be defined at least in part on a difference in a spacing of at least two sleds of the first payload and a spacing of at least two sleds of the second payload.

In embodiments, the difference in the configuration between the first and second payloads may be a difference between a first directional force applied 9210 on the first payload, e.g., a downward force applied by a first biasing member of the first payload to at least one inspection sensor of the first payload, and a second directional force applied 9212 on the second payload, e.g., a downward force, distinct from the first downward force, applied by a second biasing member of the second payload to at least one inspection sensor of the second payload. In embodiments, the distinction between the first and the second directional forces may be one of a magnitude, angle, and/or direction. The angle may be relative to the inspection surface. For example, in embodiments, the second payload may have a stronger downward biasing force than the first payload. In such embodiments, an operator of the inspection robot may attempt to use the first payload to inspect 9202 the inspection surface only to discover that the sensors of the first payload are having difficulty coupling to the inspection surface. The operator may then recall the inspection robot and swap out the first payload for the second payload to employ the stronger downward biasing force to couple the sensors of the second payload to the inspection surface.

In embodiments, the difference in the configuration between the first and second payloads may be a difference in a first spacing between at least two arms of the first payload and a spacing between at least two arms of the second payload.

In embodiments, the difference in the configuration between the first and second payloads may be a difference in spacing defined at least in part on a difference in a first number of inspection sensors on a sled of the first payload and a second number of inspection sensors on a sled of the second payload.

In embodiments, the distinction between the first inspection characteristic and the second inspection characteristic include at least one of a sensor interface, a sled ramp slope, a sled ramp height, a sled pivot location, an arm pivot location, a sled pivot range of motion, an arm pivot range of motion, a sled pivot orientation, an arm pivot orientation, a sled width, a sled bottom surface configuration, a couplant chamber configuration, a couplant chamber side, a couplant chamber routing, or a couplant chamber orientation.

In embodiments, the distinction between the first inspection characteristic and the second inspection characteristic is of biasing member type. For example, the first payload may have an active biasing member and the second payload may have a passive biasing member or vice versa. In such embodiments, the active biasing member may be motively coupled to an actuator, wherein a motive force of the actuator includes an electromagnetic force, a pneumatic force, or a hydraulic force. In embodiments, the passive biasing member may include a spring or a permanent magnet.

In embodiments, the distinction between the first inspection characteristic and the second inspection characteristic may be a side of the inspection robot chassis which the first payload is operative to be disposed and a side of the inspection robot chassis which the second payload is operative to be disposed. For example, the chassis may have a first payload interface on a first side and a second payload interface on a second side opposite the first side, wherein first payload may be operative to mount/couple to the first payload interface and lead the chassis and the second payload may be operative to mount/couple to the second payload interface and trail the chassis or vice versa.

Turning to FIG. 92, in embodiments, a second method includes selectively coupling 9302 a first payload to the inspection robot chassis, and selectively coupling 9304 a second payload distinct from the first payload to the inspection robot chassis. The method may further include selectively coupling 9306 a third payload distinct from the first and second payload to the inspection robot chassis. The method may further include selectively coupling 9308 a fourth payload distinct from the first, second and third payloads to the inspection robot chassis. The method may further include coupling yet additional payloads to the inspection robot chassis distinct from the first, second, third and fourth payloads.

Moving to FIG. 93, a third method includes inspecting 9402 the inspection surface using a first payload coupled to the inspection robot chassis, determining 9406 a characteristic of the inspection surface, decoupling 9408 the first payload from the inspection robot chassis, determining 9410 a second payload in response to the determined characteristic of the inspection surface, selectively coupling 9412 the second payload to the inspection surface, and inspecting 9414 the inspection surface using the second payload coupled to the inspection robot chassis.

In an embodiment, and referring to FIG. 184, a payload 18400 for an inspection robot for inspecting an inspection surface may include a payload coupler 18402 having a first portion 18404 and a second portion 18406, the first portion 18404 selectively couplable to a chassis of the inspection robot; an arm 18408 having a first end 18410 and a second end 18412, the first end 18410 coupled to the second portion 18406 of the payload coupler 18402; one or more sleds 18414 mounted to the second end 18412 of the arm 18408; and at least two inspection sensors 18416, wherein each of the at least two inspection sensors 18416 are mounted to a corresponding sled 18414 of the one or more sleds, and operationally couplable to the inspection surface; wherein the second portion 18406 of the payload coupler 18402 may be moveable in relation to the first portion 18404.

The term selectively couplable (and similar terms) as utilized herein should be understood broadly. Without limitation to any other aspect or description of the present disclosure, selectively couplable describes a selected association between objects. For example, an interface of object 1 may be so configured as to couple with an interface of object 2 but not with the interface of other objects. An example of selective coupling includes a power cord designed to couple to certain models of a particular brand of computer, while not being able to couple with other models of the same brand of computer. In certain embodiments, selectively couplable includes coupling under selected circumstances and/or operating conditions, and/or includes de-coupling under selected circumstances and/or operating conditions.

In an embodiment, the second portion 18406 of the payload coupler 18402 may be rotatable with respect to the first portion 18404. In an embodiment, the first end of the arm 18408 may be moveable in relation to the second portion 18406 of the payload coupler 18402. In an embodiment, the first end 18410 of the arm 18408 may rotate in relation to the second portion 18406 of the payload coupler 18402. In an embodiment, the first portion of the payload coupler is rotatable with respect to a first axis, and wherein the first end of the arm is rotatable in a second axis distinct from the first axis.

In an embodiment, the one or more sleds 18414 may be rotatable in relation to the second end 18412 of the arm 18408. The payload may further include at least two sleds 18414, and wherein the at least two sleds 18414 may be rotatable as a group in relation to the second end 18412 of the arm 18408—for example, by a pivot coupling 18422 to the arm 18408. The payload may further include a downward biasing force device 18418 structured to selectively apply a downward force to the at least two inspection sensors 18416 with respect to the inspection surface. In embodiments, the weight position of the device 18418 may be set at design time or run time. In some embodiments, weight positions may only include a first position or a second position, or positions in between (a few, a lot, or continuous). In embodiments, the downward biasing force device 18418 may be disposed on the second portion 18406 of the payload coupler 18402 along an axis running through 18420. The downward biasing force device 18418 may be one or more of a weight, a spring, an electromagnet, a permanent magnet, or an actuator. The downward biasing force device 18418 may include a weight moveable between a first position applying a first downward force and a second position applying a second downward force. The downward biasing force device 18418 may include a spring, and a biasing force adjustor moveable between a first position applying a first downward force and a second position applying a second downward force. In embodiments, the force of the device 18418 may be set at design time or run time. In embodiments, the force of the device 18418 may be available only at a first position/second position, or positions in between (a few, a lot, or continuous). For example, setting the force may involve compressing a spring or increasing a tension, such as in a relevant direction based on spring type. In another example, setting the force may involve changing out a spring to one having different properties, such as at design time. In embodiments, the spring may include at least one of a torsion spring, a tension spring, a compression spring, or a disc spring. The payload 18400 may further include an inspection sensor position actuator, e.g., 6072 (FIG. 60), structured to adjust a position of the at least two inspection sensors 18416 with respect to the inspection surface. The payload may further include at least two sensors 18416, wherein the payload coupler 18402 may be moveable with respect to the chassis of the inspection robot and the inspection sensor position actuator may be coupled to the chassis, wherein the inspection sensor position actuator in a first position moves the payload coupler 18402 to a corresponding first coupler position, thereby moving the at least two sensors 18416 to a corresponding first sensor position, and wherein the inspection sensor position actuator in a second position moves the payload coupler 18402 to a corresponding second coupler position, thereby moving the at least two sensors 18416 to a corresponding second sensor position. In some embodiments, the inspection sensor position actuator may be coupled to a drive module. In some embodiments, a payload position may include a down force selection (e.g., actuator moves to touch sensors down, further movement may be applying force and may not correspond to fully matching geometric movement of the payload coupler). In embodiments, the inspection sensor position actuator may be structured to rotate the payload coupler 18402 between the first coupler position and the second coupler position. The actuator may be structured to horizontally translate the payload coupler 18402 between the first coupler position and the second coupler position. The payload may further include a couplant conduit 18506 structured to fluidly communicate couplant between a chassis couplant interface 5102 (FIG. 51) and a payload couplant interface, e.g., interface 18502, and wherein each of the at least two inspection sensors 18416 may be fluidly coupled to the payload couplant interface. In an embodiment, the couplant conduit 18506 may be from the chassis to the payload such that a single payload connection supplies all related sensors.

The term fluidly communicate (and similar terms) as utilized herein should be understood broadly. Without limitation to any other aspect or description of the present disclosure, fluid communication describes a movement of a fluid, a gas or a liquid, between two points. In some examples, the movement of the fluid between the two points can be one of multiple ways the two points are connected, or may be the only way they are connected. For example, a device may supply air bubbles into a liquid in one instance, and in another instance the device may also supply electricity from a battery via the same device to electrochemically activate the liquid.

The payload may further include at least two sensor couplant channels, each of the at least two sensor couplant channels, e.g., 18608, fluidly coupled to the payload couplant interface at a first end, and fluidly coupled to a couplant chamber, e.g., 2810 (FIG. 28), for a corresponding one of the at least two inspection sensors 18416 at a second end. In an embodiment, the arm 18408 defines at least a portion of each of the at least two sensor couplant channels 18608, that is, the at least two sensor couplant channels share some of their length in the arm portion before branching out. The payload 18400 may further include a communication conduit 18504 structured to provide electrical communication between a chassis control interface 5118 (FIG. 51) and a payload control interface e.g., interface 18502, and wherein each of the at least two inspection sensors 18416 may be communicatively coupled to the payload control interface 18502. The communication conduit 18504 may include at least two sensor control channels, e.g., 18608, each of the at least two sensor control channels 18608 communicatively coupled to the payload control interface at a first end, and communicatively coupled to a corresponding one of the at least two inspection sensors 18416 at a second end. The arm 18408 may define at least a portion of each of the at least two sensor control channels. Referring to FIG. 185, the payload 18400 may further include a universal conduit 18502 structured to provide fluid communication of couplant between a chassis couplant interface 5108 (FIG. 52) and a couplant chamber 2810 (FIG. 28) corresponding to each of the at least two inspection sensors 18416; electrical communication between a chassis control interface 5118 and each of the at least two inspection sensors 18416; and electrical power between a chassis power interface, e.g., 5118 (FIG. 51), and each of the at least two inspection sensors 18416.

The term universal conduit (and similar terms) as utilized herein should be understood broadly. Without limitation to any other aspect or description of the present disclosure, a universal conduit describes a conduit capable of providing multiple other conduits or connectors, such as fluid, electricity, communications, or the like. In certain embodiments, a universal conduit includes a conduit at least capable to provide an electrical connection and a fluid connection. In certain embodiments, a universal conduit includes a conduit at least capable to provide an electrical connection and a communication connection.

In an embodiment, and referring to FIG. 185 and FIG. 186, the universal conduit 18502 may include a single channel portion 18604 defining a single channel extending between the chassis and the payload coupler 18402; and a multi-channel portion 18608 defining a plurality of channels extending between the payload coupler 18402 and each of the one or more sleds 18414. In embodiments, there may be more than one single channel to support a number of payloads, or more than one chassis interface. In embodiments, the arm 18408 may define at least a portion of the multi-channel portion 18608 of the universal conduit 18602. The first portion 18404 of the payload coupler 18402 may include a universal connection port 18502 that may include a mechanical payload connector structured to mechanically couple with a mechanical connection interface of the chassis 102 (FIG. 1) of the inspection robot 100; and at least one connector selected from the connectors consisting of a payload couplant connector 18506 structured to fluidly communicate with a couplant interface 5108 of the chassis 102 of the inspection robot 100; a payload communication connector 18504 structured to electrically communicate with an electrical communication interface 5118 of the chassis 102 of the inspection robot 100; and an electrical power connector 18508 structured to electrically communicate with an electrical power interface 5118 of the chassis 102 of the inspection robot 100.

The term mechanically couple (and similar terms) as utilized herein should be understood broadly. Without limitation to any other aspect or description of the present disclosure, mechanically coupling describes connecting objects using a mechanical interface, such as joints, fasteners, snap fit joints, hook and loop, zipper, screw, rivet, or the like.

In an embodiment, and referring to FIG. 185, a payload coupler 18402 for a payload of an inspection robot for inspecting an inspection surface may include a first portion 18404 selectively couplable to a chassis of the inspection robot; a second portion 18406 couplable to an arm 18408 of the payload 18400; and a universal connection port 18502 disposed on the first portion 18404 and comprising: a mechanical payload connector structured to mechanically couple with a mechanical connection interface of the chassis of the inspection robot. The universal connection port may further include a payload couplant connector 18506 structured to fluidly communicate with a couplant interface 5108 of the chassis 102 of the inspection robot 100. The universal connection port 18502 may further include a payload communication connector 18504 structured to electrically communicate with an electrical communication interface 5118 of the chassis 102 of the inspection robot 100. The universal connection port 18502 may further include an electrical power connector 18508 structured to electrically communicate with an electrical power interface 5118 of the chassis 102 of the inspection robot 100. In certain embodiments, the payload coupler includes a single fluid connection port for a payload, and a separate single electrical connection port. In the example, the single fluid connection port provides for couplant or other working fluid provision to all sensors or devices on the payload, and the single electrical connection port provides for all electrical power and communication connections for all sensors or devices on the payload.

In an embodiment, and referring to FIG. 187, a method of inspecting an inspection surface with an inspection robot may include determining one or more surface characteristics of the inspection surface 18702; determining at least two inspection sensors 18704 for inspecting the inspection surface in response to the determined surface characteristics, the at least two inspection sensors each mounted to a corresponding sled, the corresponding sleds coupled to an arm, the arm coupled to a second portion of a payload coupler; selectively coupling a first portion of the payload coupler to a chassis of the inspection robot 18706; and articulating the first portion of the payload coupler 18716 causing relative movement between the first portion of the payload coupler and the second portion of the payload coupler. In an embodiment, selectively coupling the first portion of the payload coupler to a chassis of the inspection robot includes mechanically coupling a mechanical payload connector of a universal connection port, disposed on the first portion, to a mechanical connection interface of the chassis of the inspection robot 18708; and fluidly coupling a payload couplant connector of the universal connection port to a couplant interface of the chassis 18710. In an embodiment, selectively coupling a second portion of the payload coupler to a chassis of the inspection robot includes mechanically coupling a mechanical payload connector of a universal connection port, disposed on the second portion, to a mechanical connection interface of the chassis of the inspection robot 18708; and electrically coupling a payload communication connector of the universal connection port to an electrical communication interface of the chassis 18712. In an embodiment, selectively coupling the first portion of the payload coupler to a chassis of the inspection robot may include mechanically coupling a mechanical payload connector of a universal connection port, disposed on the first portion, to a mechanical connection interface of the chassis of the inspection robot 18708; and electrically coupling an electrical power connector of the universal connection port to an electrical power interface of the chassis 18714.

In an embodiment, selectively coupling the first portion of the payload coupler to a chassis of the inspection robot may include mechanically coupling a mechanical payload connector of a universal connection port, disposed on the first portion, to a mechanical connection interface of the chassis of the inspection robot 18708; fluidly coupling a payload couplant connector of the universal connection port to a couplant interface of the chassis 18710; electrically coupling an payload communication connector of the universal connection port to an electrical communication interface of the chassis 18712; and electrically coupling an electrical power connector of the universal connection port to an electrical power interface of the chassis 18714. The method may further include rotating the second portion of the payload coupler in relation to the first portion. The method may further include rotating the arm in relation to the payload coupler 18718. The method may further include rotating at least one of the corresponding sleds in relation to the arm 18720. The method may further include applying a downward biasing force to the at least two inspection sensors with respect to the inspection surface via a downward biasing force device 18722. The downward biasing force device may be disposed on the chassis of the inspection robot and may apply a rotational force to the payload coupler. The method may further include horizontally translating the at least two inspection sensors with respect to the chassis of the inspection robot 18724.

Figure 94:
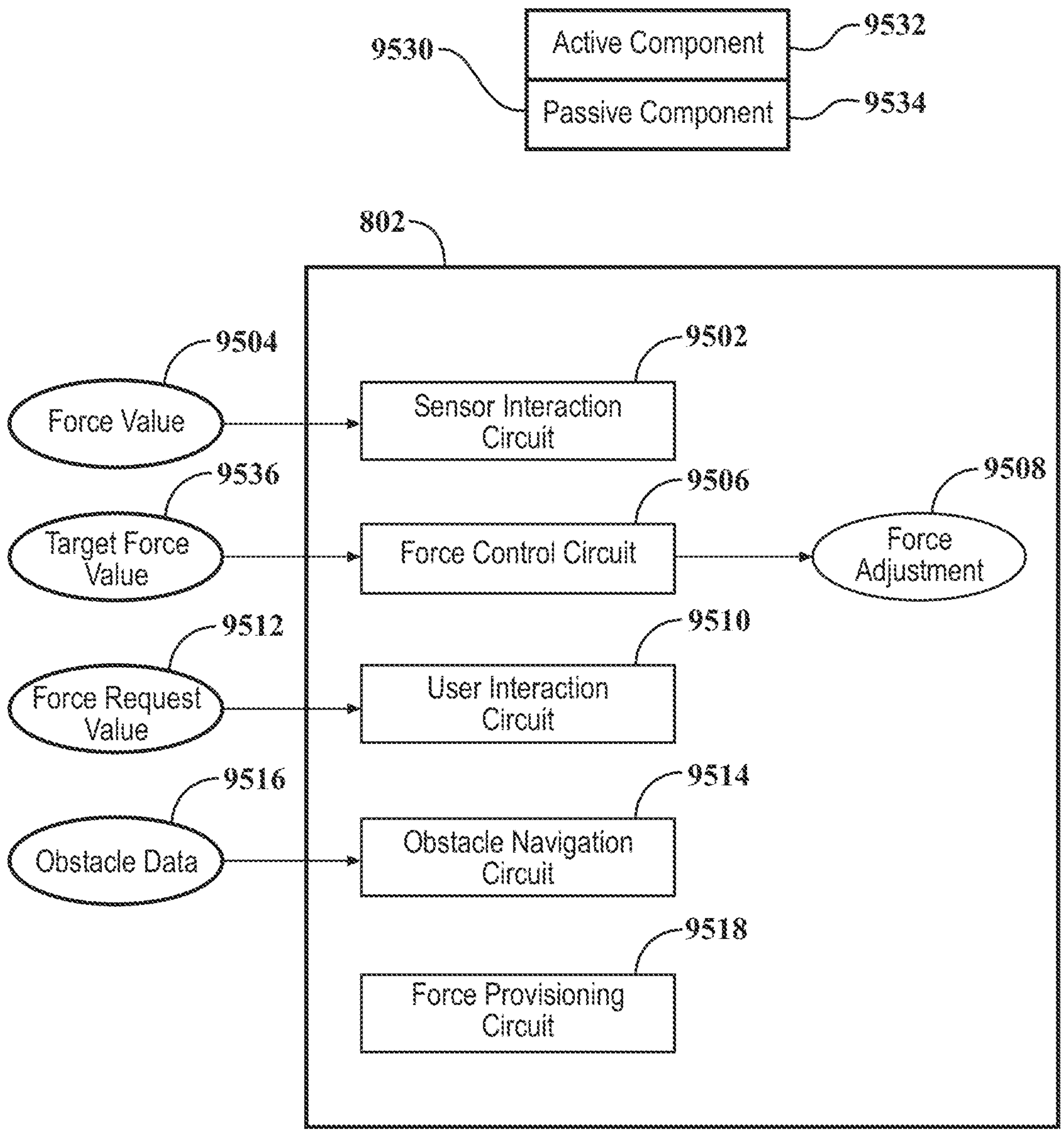
FIG. 94 depicts a controller for an inspection robot.

Turning now to FIG. 94, an example system and/or apparatus for providing dynamic adjustment of a biasing force for an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example system depicted in FIG. 94. In certain embodiments, the inspection robot 100 may have one or more payloads 2 (FIG. 1) and may include one or more sensors 2202 (FIG. 29) on each payload 2.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

The example system further includes a biasing device/ member 9530 that applies a downward force on at least one sled 1 (FIG. 1) of a payload 2 in a direction towards the inspection surface 500. The biasing device 9530 may be disposed on the inspection robot 100 and have a passive component 9534 and an active component 9532. The passive component 9534 may include a spring, e.g., spring 21 (FIG. 4), a permanent magnet, weight and/or other device that provides a relatively consistent force. The active component 9532 may include an electromagnet, a suction device, a sliding weight, an adjustable spring (e.g., coupled to an actuator that selectively increases compression, tension, or torsion of the spring), and/or other devices that provide for an adjustable/controllable force. The passive 9534 and/or active 9532 components may be mounted to a payload 2, sensors 2202 or other portions of the inspection robot 100 where the components 9532 and 9534 can provide a downward force on the sensors 2202 towards the inspection surface 500. For example, in embodiments, the passive component 9534 may be a permanent magnet that provides a constant baseline amount of force directing the sensors 2202 towards the inspection surface 500 with the active component 9532 being an electromagnet that provides an adjustable amount of force directing the sensors 2202 towards the inspection surface 500 that supplements the force provided by the passive component.

The example system further includes a controller 802 having a number of circuits configured to functionally perform operations of the controller 802. The example system includes the controller 802 having a sensor interaction circuit 9502, a force control circuit 9506 and a force provisioning circuit 9518. In embodiments, the controller 802 may further include a user interaction circuit 9510 and/or an obstacle navigation circuit 9514. The example controller 802 may additionally or alternatively include aspects of any controller, circuit, or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the controller 802 are set forth, without limitation, in the portion of the disclosure referencing FIGS. 94-96.

The example controller 802 is depicted schematically as a single device for clarity of description, but the controller 802 may be a single device, a distributed device, and/or may include portions at least partially positioned with other devices in the system (e.g., on the inspection robot 100). In certain embodiments, the controller 802 may be at least partially positioned on a computing device associated with an operator of the inspection (not shown), such as a local computer at a facility including the inspection surface 500, a laptop, and/or a mobile device. In certain embodiments, the controller 802 may alternatively or additionally be at least partially positioned on a computing device that is remote to the inspection operations, such as on a web-based computing device, a cloud computing device, a communicatively coupled device, or the like.

Figure 95:
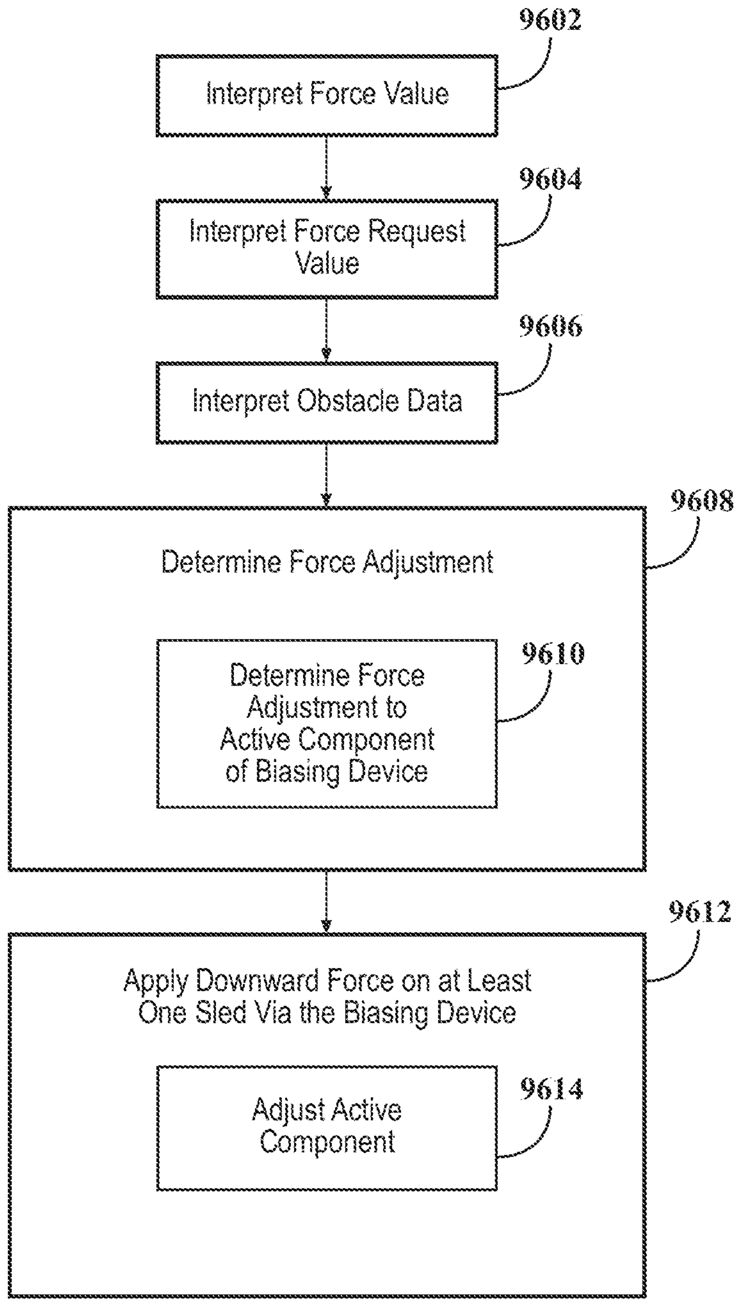
FIG. 95 depicts a method for dynamic adjustment of a biasing force for an inspection robot.

Accordingly, as illustrated in FIGS. 94 and 95, the sensor interaction circuit 9502 interprets 9602 a force value 9504 representing an amount of the downward force applied by the biasing device 9530 on a sled 1 in a direction towards the inspection surface 500. The force control circuit 9506 determines 9608 a force adjustment value 9508 in response to the force value 9504 and a target force value 9536. The force provisioning circuit 9518 provides the force adjustment value 9508 to the active component 9532, which is responsive to the force adjustment 9508. In other words, the active component 9532 is adjusted 9614 based at least in part on the determined 9608 force adjustment value 9508. In embodiments, determining 9608 the force adjustment value 9508 may include determining 9610 the force adjustment value 9608 to the active component 9532. The biasing device 9530 may then apply 9612 the downward force to the sled 1 and/or sensors 2202, which, as discussed above, may be performed by adjusting 9614 the active component 9532.

For example, in embodiments, the passive component 9534 may be configured to provide the target force value 9536 to the sled 1 and/or sensors 2202, wherein the target force value 9536 may correspond to an ideal/optimal amount of force for keeping the sensors 2202 coupled to the inspection surface 500 as the sled 1 bounces, jostles and/or otherwise moves in relation to the inspection surface 500 during an inspection run. It will also be understood that the passive component 9534 and the active component 9532 may be configured to collectively provide the target force value 9536.

Accordingly, in embodiments, the force control circuit 9502 may determine 9608 the force adjustment value 9508 so that the magnitude of the downward force applied by the biasing device 9530 is increased or decreased as conditions encountered by the inspection robot 100 while traversing the inspection surface 500 make it more or less likely that the sensors 2202 will be jostled, bounced, and/or otherwise moved away from an ideal position with respect to the inspection surface 500. In other words, as conditions become more difficult or easy for the sensors 2202 to remain coupled to the inspection surface 500, the target force value 9536 may increase or decrease and the controller 802 may increase or decrease the amount of downward force applied by the active component 9532 in an effort to make the amount of downward force applied by the biasing device 9530, i.e., the sum of the passive 9534 and active 9532 components, to be equal, or nearly equal, to the target force amount 9536. In such embodiments, the force adjustment value 9508 may be determined 9608 in response to determining that a coupling quality value is below a coupling quality threshold. As will be appreciated, dynamic adjustment of the amount of downward force provided by the biasing device 9530 improves the overall likelihood that the sensors 2202 will remain coupled to the inspection surface 500 during an inspection run.

Figure 96:
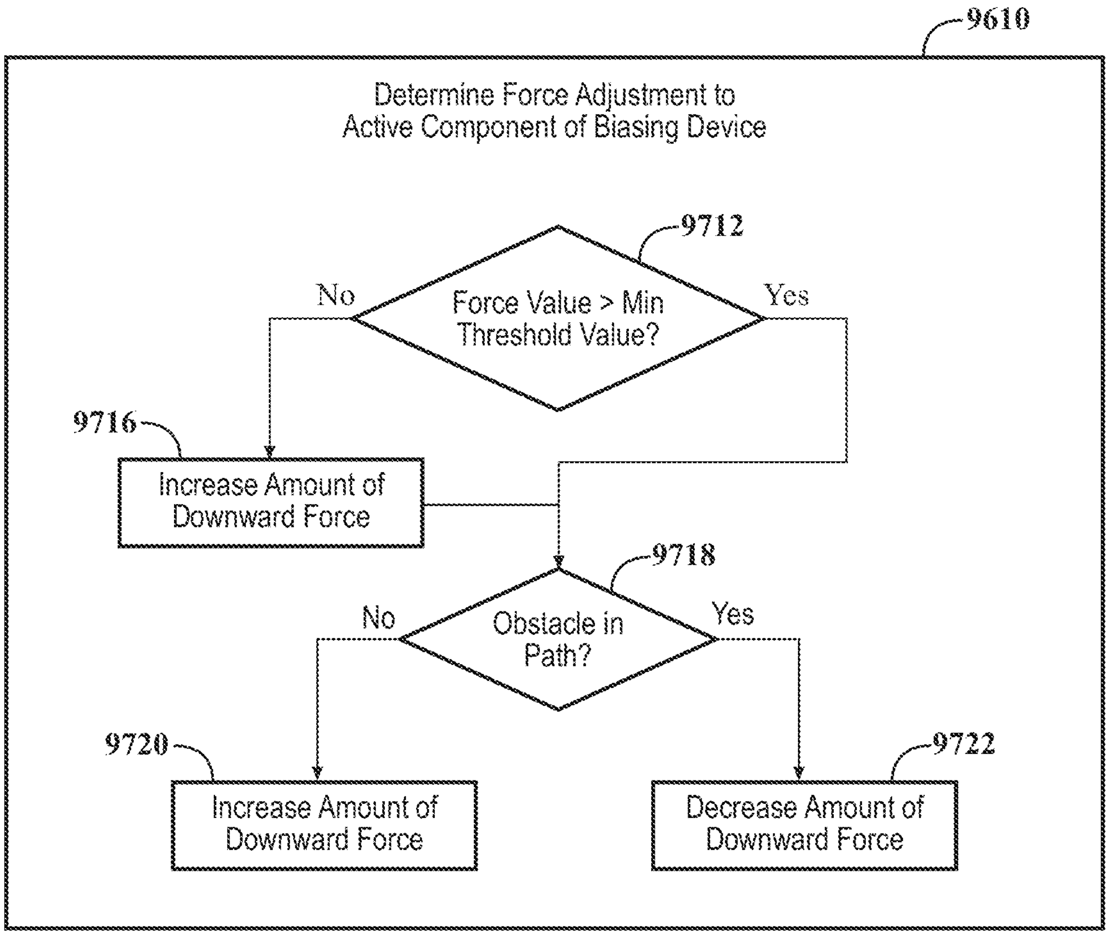
FIG. 96 a method to determine a force adjustment to a biasing force of an inspection robot.

As shown in FIGS. 95 and 96, in embodiments, the obstacle navigation circuit 9514 may interpret 9606 obstacle data 9516 from one or more obstacle sensor, which may be mounted on the inspection robot 100 or located off the inspection robot 100. Such obstacle data 9516 may include the location and/or type of structures on the surface, cracks in the surface, gaps in the inspection surface 500 and/or any other type of information (as described herein) relating to an obstacle which may need to be traversed by the inspection robot 100. In such embodiments, the force control circuit 9506 may update the force adjustment value 9508 when the obstacle navigation circuit 9514 determines 9718 from the obstacle data 9516 that an obstacle is in the path of the inspection robot 100 along the inspection surface 500 and/or when the obstacle data 9516 indicates the obstacle is no longer in the path of the inspection robot 100. For example, where the obstacle data 9516 indicates that an obstacle, e.g., a pipe head, is in the path of the inspection robot 100, the force control circuit 9506 may determine the force adjustment value 9508 to be negative to reduce 9722 the amount of force applied by the biasing device 9530 so that the sensors 2202 and/or sled 1 can more easily move over and/or away from the obstacle. As will be appreciated, in some embodiments, the direction of the fore supplied by the active component 9352 may be reversed to as to lift the sensors 2202 and/or sled 1 away from the inspection surface 500. Upon determining 9718 that the obstacle has been cleared, the force adjustment value 9508 may be made positive to increase 9720 the amount of force applied by the biasing device 9350 to improve sensor 2202 coupling with the inspection surface 500.

As further shown in FIGS. 95 and 96, in embodiments, the force control circuit 9506 may determine 9608 the force adjustment 9508 such that the amount of the downward force applied by the biasing device 9530 is above a minimum threshold value 9712. For example, in embodiments, the minimum threshold value 9712 may correspond to an amount of force for keeping the sensors 2202 and/or sled 1 from decoupling from the inspection surface 500, e.g., when the inspection surface 500 is inclined and/or vertical with respect to the Earth's gravitational field. For example, in situations where the inspection robot 100 is inspecting a vertical metal wall, the control circuit may first attempt to traverse an obstacle by reducing an amount of force applied by an electromagnet of the active component 9352 with the minimum threshold value 9712 serving as a safety feature to prevent undesirable departure of the sensors 2202, sleds 1 and/or inspection robot (as a whole) from the inspection surface 500. When the force value 9504 is below the threshold 9712, or when a determined force adjustment 9508 would result in the force value 9504 dropping below the minimum threshold 9712, the force control circuit 9506 may increase 9716 the amount of downward force supplied by the biasing device 9530 by increasing the amount of the force supplied by the active component 9532.

As yet further shown in FIG. 95, in embodiments, the user interaction circuit 9510 interprets 9604 a force request value 9512. The force adjustment value 9508 may be based, at least in part, on the force request value 9512. For example, the inspection robot 100 may encounter an obstacle and send a notification to an operator. Upon receiving the notification, the operator may determine that the obstacle may be best traversed by decreasing the amount of downward force applied by the biasing device 9530. The operator may then send a force request value 9512 to the controller 802 that calls for decreasing the downward force applied by the biasing device 9530, with the force control circuit 9506 adjusting 9614 the active component 9530 in kind. The operator may also determine that an obstacle is best traversed by increasing the amount of downward biasing force and send a force request value 9512 to the controller 802 calling for an increase in the downward biasing force applied by the biasing device 9530. For example, an operator may detect that the inspection robot 100 has encountered a portion of the inspection surface 500 that is bumpier than expected such that the sensors 2202 are uncoupling, or are about to uncouple, from the surface 500. Accordingly, the operator may increase the amount of biasing force provided by the active component 9532. As another example, the operator may detect that the inspection robot 1 needs to cross a gap and/or small step in the surface 500. In such cases, the operator may decrease the amount of biasing force applied by the active component 9532 to facilitate and easier crossing.

In embodiments, the minimum threshold value 9712 may be based, at least in part, on the force request value 9512. For example, an operator may detect that the inspection surface 500 is steeper and/or bumpier than originally expected and send a force request value 9512 to the controller 802 that sets and/or increases the minimum threshold value 9712 to reduce the risk of the sensors 2202, sled 1 and/or inspection robot 100 (as a whole) from undesirably departing the inspection surface 500.

In embodiments, the force adjustment value 9508 may be determined 9608 further in response to determining that an excess fluid loss value exceeds a threshold value. For example, the controller 802 and/or operator may detect that couplant is being lost at a rate faster than desired and, in turn, increase the amount of the downward force applied by the active component 9352 to reduce couplant loss by decreasing the space between the sensors 2202 and the inspection surface 500.

In embodiments, the active component 9532 may be adjusted to compensate for a temperature of the active component 9532, passive component 9534, inspection surface 500 and/or ambient environment. For example, in embodiments where the passive 9354 component is a permanent magnet, the amount of force supplied by the permanent magnet may decrease due to a hot inspection surface and/or hot environmental temperatures. The decrease in the force supplied by the passive component 9354 may be compensated for by increasing the amount of force supplied by the active 9352 component. Further, as temperatures changes may affect the efficiency of an electromagnet, in embodiments, the amount of the force called for by the controller 802 of the active component 9352 may need to change as the electromagnet increases and decreases in temperature in order to provide for a consistent amount of force.

Figure 97:
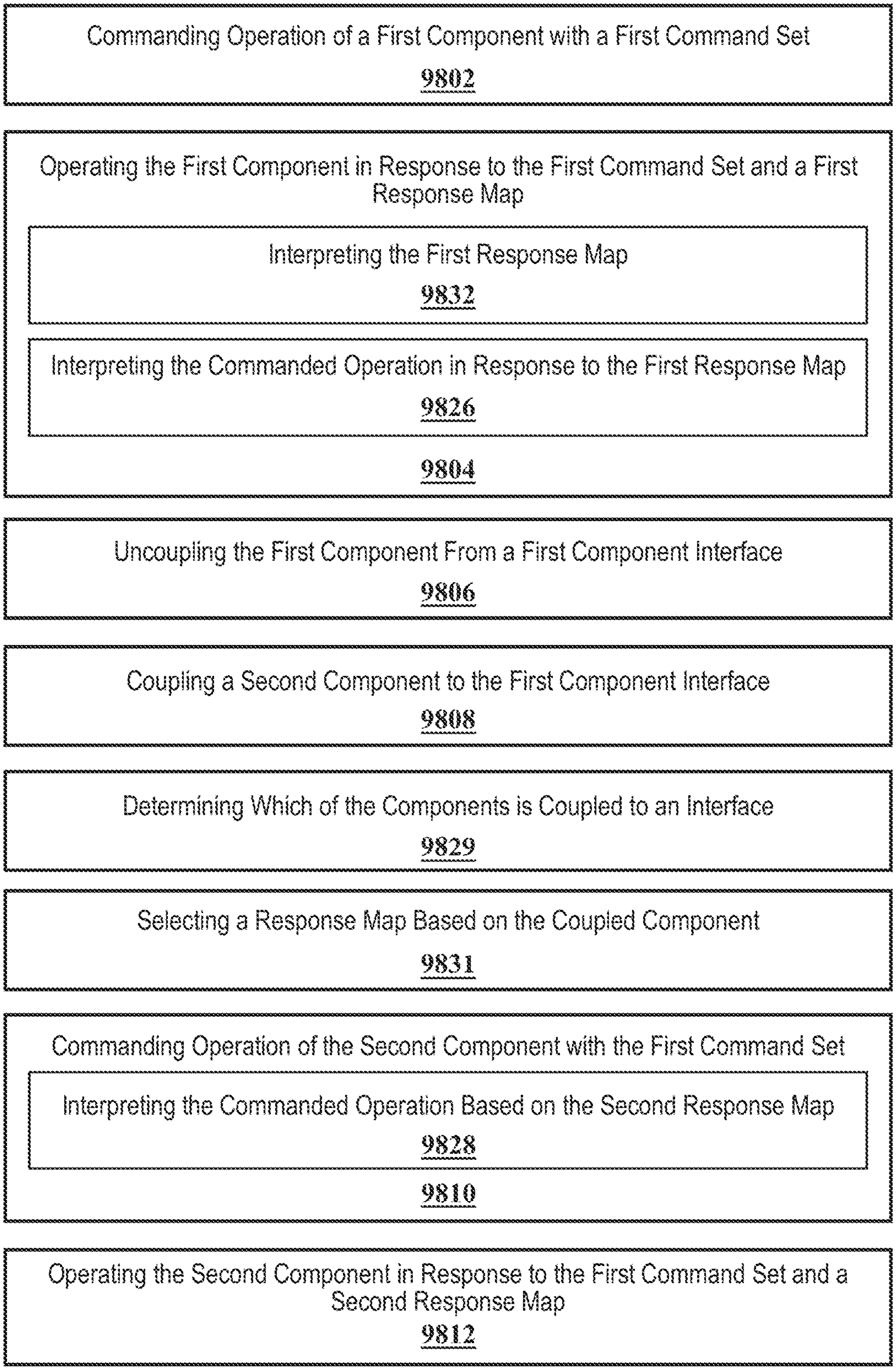
Figure 98:
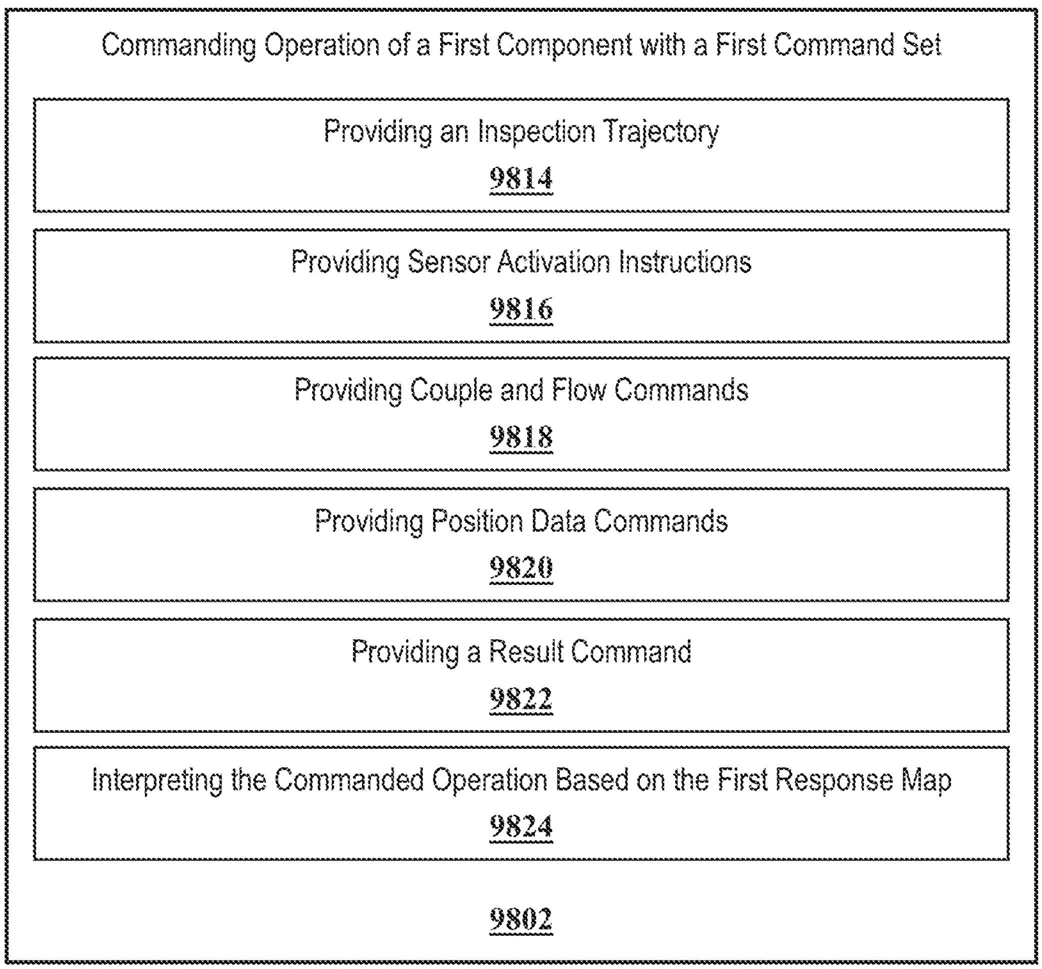

Referring to FIGS. 97-99, a method of operating an inspection robot is depicted. The method may include commanding operation of a first component of an inspection robot with a first command set (step 9802) and operating the first component in response to the first command set and a first response map (step 9804). The first component may be uncoupled from a first component interface of the inspection robot (step 9806) and a second component of the inspection robot coupled to the first component interface (9808). The method may further include commanding operation of a second component with the first command set (step 9810) and operating the second component in response to the first command set and a second response map (step 9812). Operating the first component may include interpreting the commanded operation in response to the first response map (step 9826) and operating the second component may include interpreting the commanded operation in response to the second response map (step 9828). The first response map and the second response map may be the same or distinct. In embodiments the method may further include determining which of the first component of the second component is coupled to the first component interface (step 9829) and selecting one of the first response map or the second response map based on the coupled component (step 9831). While examples of a first component with a first response map and a second component with a second response map are described, it should be understood that there may be a plurality of components, each having a component response map.

In embodiments, the first component may include a first sensor carriage with at least two sensors coupled to the first sensor carriage. The second component may include a second sensor carriage, the second carriage also having at least two sensors coupled to the second sensor carriage. The inspection configuration of the different sensor carriages may be the same or distinct from one another. In embodiments, the first component may include a first inspection payload and the second component may include a second inspection payload. The payloads may be distinct in terms of types and configurations of payloads.

As depicted in FIG. 98, commanding operation of the first component (9802) may include: providing an inspection trajectory for the inspection robot (step 9814), providing sensor activation instructions for a plurality of sensors corresponding to a first component (step 9816), providing couplant flow commands for the first component (step 9818), providing position data commands corresponding to inspection data from the first component (step 9820), or providing a result command for the first component (step 9822). Further, interpreting the first response map (step 9832) may include interpreting the first response map based on data received from the first component (step 9834), interpreting the first response map based on identifying data received from the first component (step 9836), analyzing data from the first component in response to at least the first response map and interpreting the first response map as the correct map in response to the analyzing (step 9836) and the like.

As depicted in FIG. 99, operating the first component (step 9804) may include interpreting the first response map (step 9832). Interpreting the first response map may include: interpreting the first response map based on data received from the first component (step 9826); interpreting the first response map based on identifying data received from the first component (step 9827); analyzing data from the first component in response to at least the first response map and interpreting the first response map as the correct map in response to the analyzing (step 9830); and the like. Similarly, operating the second component (or other components) may include interpreting the component response map. Interpreting the component response map may include: interpreting the component response map based on data received from the component; interpreting the component response map based on identifying data received from the component; analyzing data from the component in response to at least the component response map and interpreting the component response map as the correct map in response to the analyzing; and the like. While an example of commanding operation of a first component with a first command set and interpreting the first response map has been provided, it is understood that the example is not limited to the first component but rather map be understood to apply to a plurality of different components.

Figure 100:
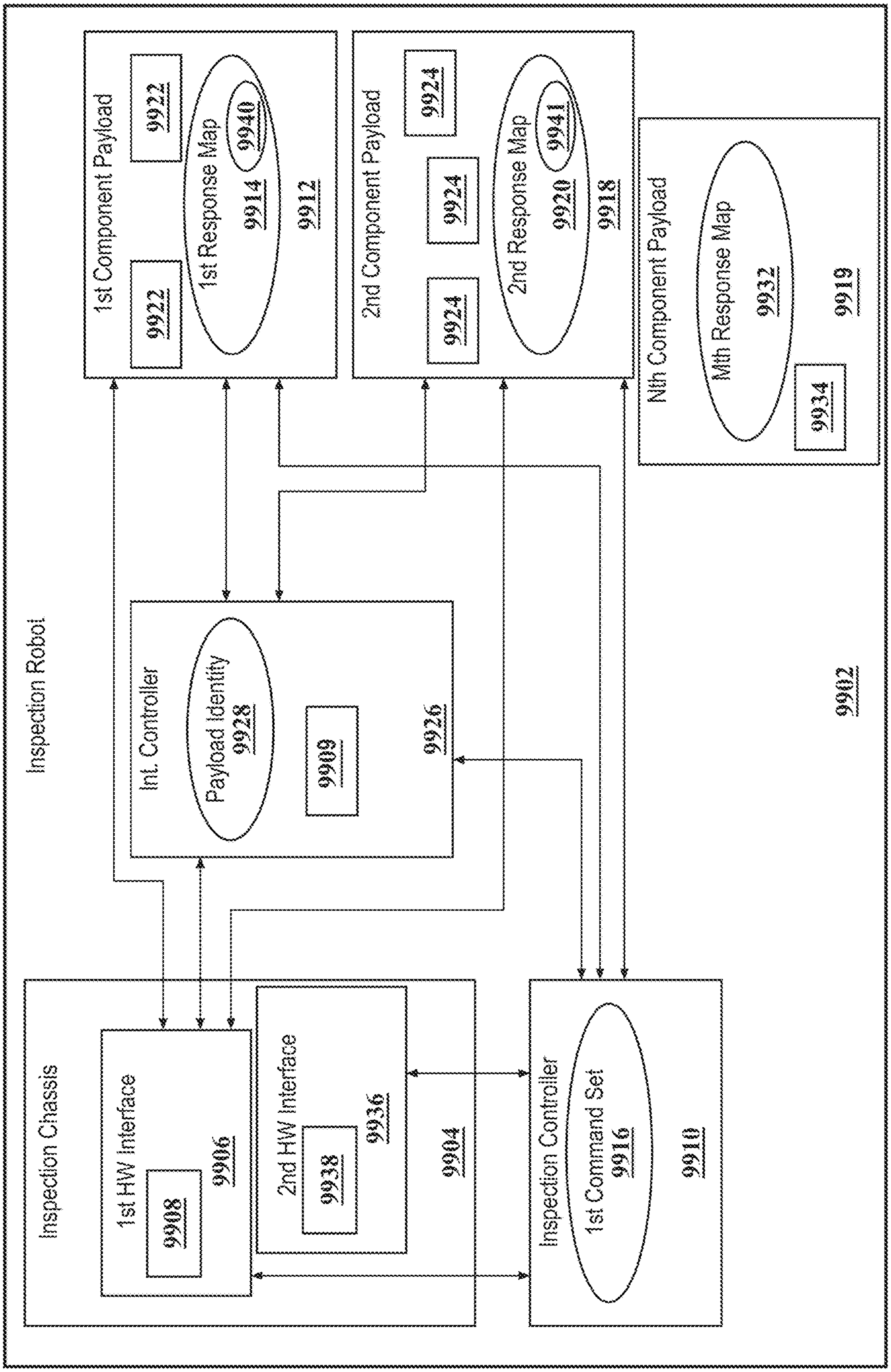
FIG. 100 depicts an inspection robot.

Referring to FIG. 100, an inspection robot 9902 is depicted. The inspection robot 9902 may include an inspection chassis 9904 having a first hardware interface 9906 with a first quick release connection 9908 and a second hardware interface 9936 with a second quick release connection 9938. The example inspection robot 9902 includes an inspection controller 9910 communicatively coupled to the first hardware interface 9906, and structured to control a component payload 9922, 9924 using a first command set 9916. The example inspection robot 9902 includes a first component payload 9912 operably couplable to the first hardware interface 9906, and having a first component 9922 with a first response map 9914, where the first component 9922 interacts with the inspection controller 9926 using the first command set 9916. The example inspection robot 9902 further includes a second component payload 9918 that includes a second component 9924 having a second response map 9920 and structured to interact with the inspection controller 9910 using the first command set 9916.

In certain further embodiments, the first component 9922 includes at least two sensors, and/or the second component 9924 includes at least two sensors. In certain further embodiments, the first response map 9914 is distinct from the second response map 9920. In certain embodiments, the first component 9922 includes a different number of sensors relative to the second component 9924. In certain embodiments, the hardware interface 9906 includes a couplant connection.

Example and non-limiting first command set parameters include one or more of: an inspection trajectory for the inspection robot, sensor activation instructions for the inspection robot, couplant flow commands for the inspection robot, position data commands corresponding to inspection data from the first component or the second component for the inspection robot, a result command for the inspection robot, and/or an inspection result command for the inspection robot.

An example inspection robot 9902 includes an intermediary controller 9926 structured to determine whether the first component payload 9912 or the second component payload 9918 is coupled to the first hardware interface 9906, and to select an appropriate one of the first response map 9914 or the second response map 9920 based on the coupled component payload. An example inspection robot 9902 further includes the intermediary controller 9926 further determining whether the first component payload 9912 or the second component payload 9918 is coupled to the first hardware interface 9906 by performing an operation such as: interrogating a coupled payload for identifying information, analyzing data received from a coupled payload with the first response map 9914 and the second response map 9920 (e.g., determining which response map provides for sensible and/or expected information based on communicated data from the respective component, and/or determining which response map results in an actuator providing the expected response), using the analyzing data received from a coupled payload and determining the coupled payload in response to the analyzing (e.g., determining the type of data, the sampling rate, the range, etc., to determine which component is coupled).

An example intermediary controller 9926 interprets a corresponding response map 9914, 9920 from the coupled payload, and adjusts communications of the first command set 9910 in response to the corresponding response map 9914, 9920 to determine an adjusted command set 9909, and commands operations of the coupled payload in response to the adjusted first command set. An example intermediary controller 9926 interprets identifying information 9940, 9941 from the coupled component to determine which component is coupled to the hardware interface 9906. An example intermediary controller 9926 interprets inspection data from the coupled payload in response to the corresponding response map.

An example inspection robot 9902 includes the inspection chassis 9904 having a second hardware interface 9936 including a second quick release connection 9938, wherein the first component payload 9912 and the second component payload 9918 are operably couplable to the second hardware interface 9936. In certain embodiments, the first component payload 9912 and the second component payload 9918 are swappable between the first hardware interface 9906 and the second hardware interface 9936. In certain embodiments, the inspection robot 9902 includes an additional number of payloads 9919, each having a corresponding response map 9932, where the inspection robot 9902 is configured to interact with coupled members of the number of payloads

9918 using the first command set 9916. In certain embodiments, the interaction controller 9926 interacts with the inspection controller 9910 and the coupled payloads 9918, determining response maps and/or adjusting the first command set 9916, thereby isolating operations, command values, and/or parameter values of the inspection controller 9910 from the coupled components 9918, and allowing for utilization of each hardware interface 9906, 9936 for any one or more of, and/or for selected subsets of, the number of components 9918.

Example and non-limiting component payloads include one or more components such as: a sensor, an actuator, a welder, a visible marking device, a coating device, and a cleaning tool. An example embodiment includes the first component payload 9922 comprises a first drive module, wherein the second component payload 9918 comprises a second drive module, where the first hardware interface 9906 comprises a first connection port on a first chassis side of the inspection robot, and wherein the second hardware interface 9936 comprises a second connection port on a second chassis side of the inspection robot.

Example and non-limiting response maps for components include one or more component descriptions such as: a raw sensor data to processed value calibration, an actuator command description, a sensor output value, an analog-to-digital description corresponding to the component, diagnostic data corresponding to the associated component, and/or fault code data corresponding to the associated component.

Figure 101:
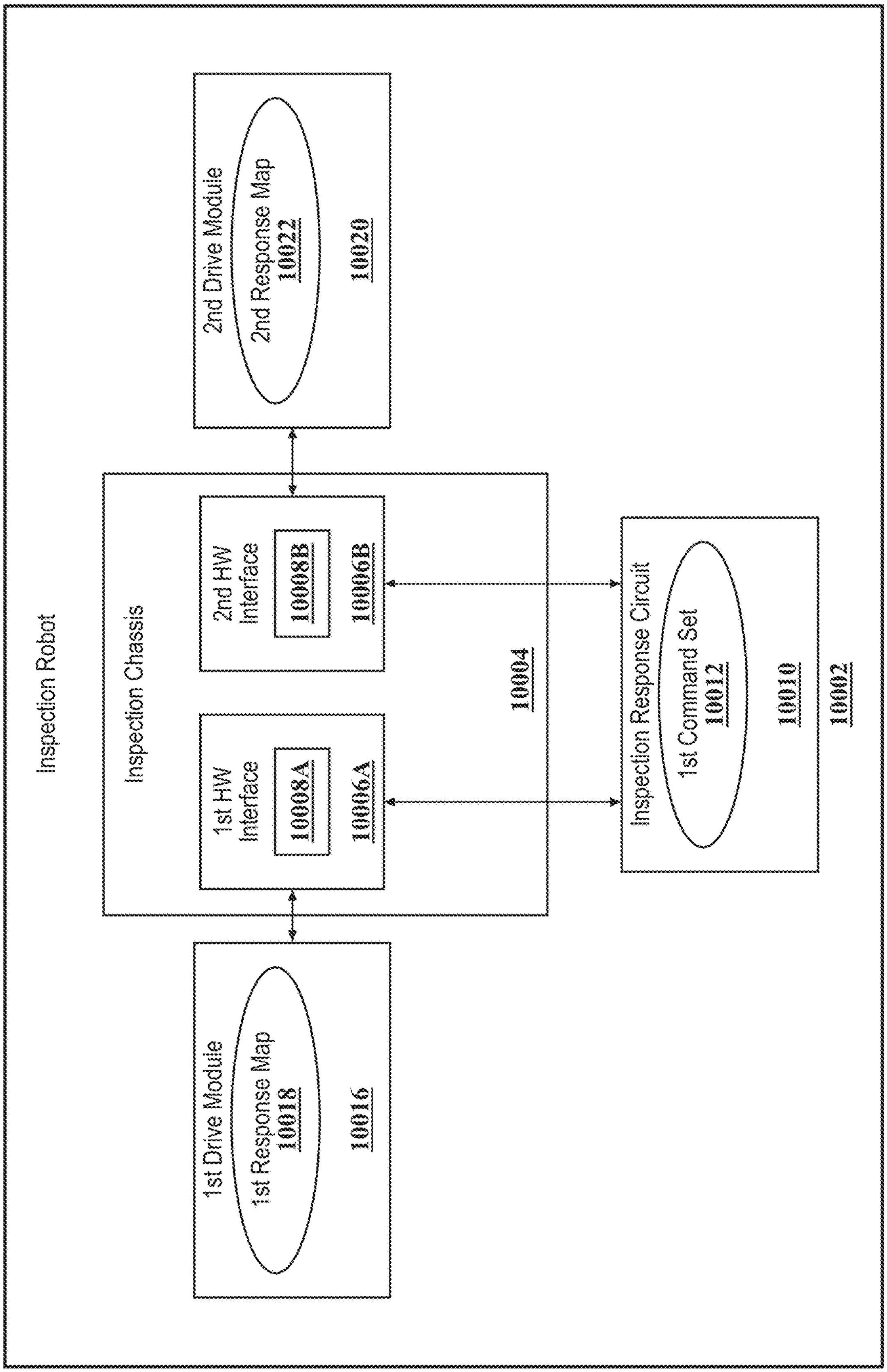
FIG. 101 depicts an inspection robot.

Referencing FIG. 101, an example inspection robot 10002 having swappable and reversible drive modules 10016, 10020 is depicted. The example inspection robot 10002 includes an inspection chassis 10004 having a first hardware interface 10006A and a second hardware interface 10006B, which may include a connecting port on the chassis housing, and/or a drive suspension couplable to a drive module and having rotation allowance/limiting features, translation allowance/limiting features, electrical connections, mechanical connections, and/or communication connections for the drive modules 10016, 10020. The example inspection robot 10002 includes an inspection response circuit 10010, depicted apart from the inspection chassis 10004 but optionally positioned in whole or part on the inspection chassis, and depicted on the inspection robot 10002 but optionally positioned in whole or part away from the inspection chassis. The example inspection response circuit 10010 receives inspection response values (e.g., determined responses for reconfiguration, adjusting an inspection operation, and/or a user request value to adjust operations), and provides a first command set 10012 in response to the adjustments. In certain embodiments, the hardware interfaces 10006A, 10006B include intermediate drive controllers 10008A, 10008B configured to provide commands responsive to the first command set 10012, and further in response to a first response map 10018 and the second response map 10022. In certain embodiments, the example of FIG. 101 allows for the drive modules 10018, 10022 to be coupled to either hardware interface and perform inspection operations and/or adjustments.

Figure 102:
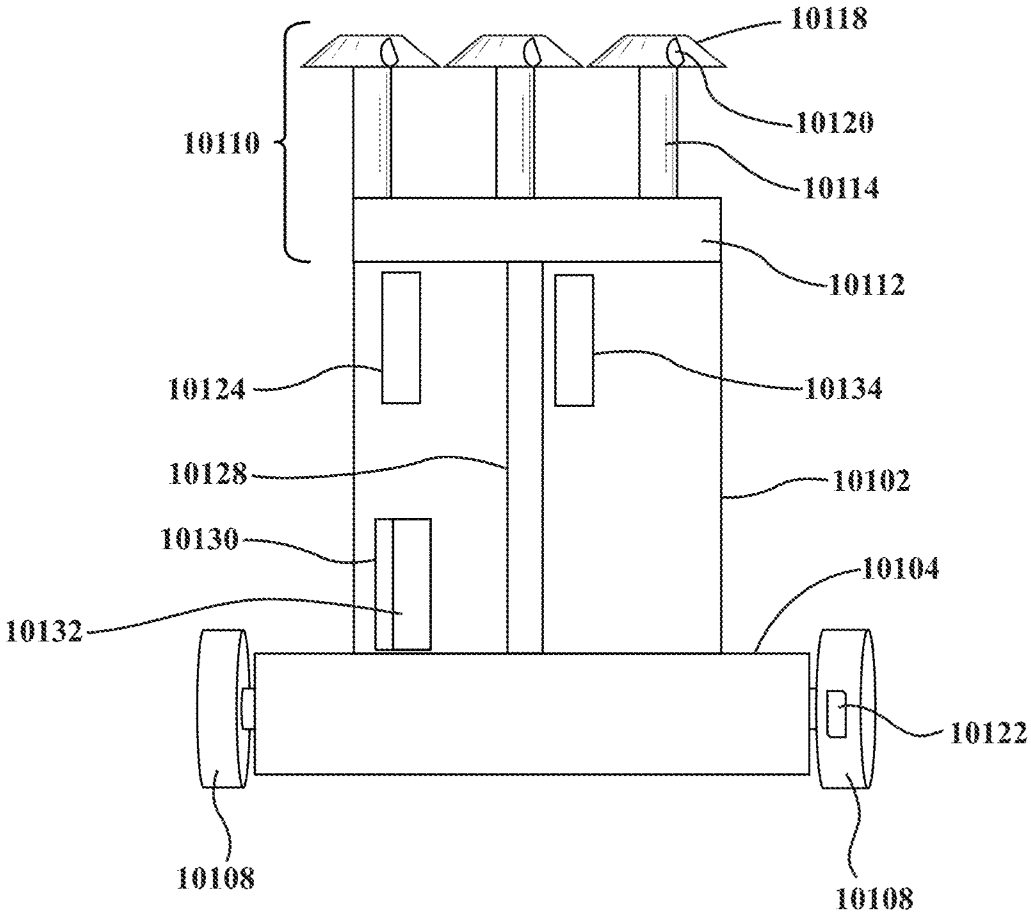
FIG. 102 is a schematic depicting an inspection robot having one or more features for operating in a hazardous environment.

Turning now to FIG. 102, an example system and/or apparatus for operating an inspection robot in a hazardous environment is depicted. The example inspection robot includes any inspection robot having a number of sensors associated therewith and configured to inspect a selected area. Without limitation to any other aspect of the present disclosure, an inspection robot as set forth throughout the present disclosure, including any features or characteristics thereof, is contemplated for the example system depicted in FIG. 102. In certain embodiments, the inspection robot may include a chassis 10102 to which one or more payloads 10110 are mounted. The payloads 10110 may have a body 10112 to which one or more arms 10114 are mounted. One or more sleds 10118, having one or more inspection sensors 10120, may be mounted to the arms 10114. One or more drive modules 10104, having one or more wheel assemblies 10108, may be mounted to the chassis 10102.

Operations of the inspection robot provide the sensors 10120 in proximity to selected locations of the inspection surface 500 (FIG. 5) and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 10120 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

In embodiments, the one or more wheel assemblies 10108 may have a heat resistant magnet 10122 and/or heat resistant magnetic arrangement. The heat resistant magnet 10122 may have a working temperature rating of at least 250° F. In embodiments, the heat resistant magnet 10122 may have a working temperature rating of at least 80° C. In embodiments, the heat resistant magnet 10122 may have a working temperature rating of at least 150° C. In embodiments, the heat resistant magnet 10122 may include a rare earth metal, e.g., neodymium, samarium, and compounds thereof, e.g., NdFeB and SmCo. Materials capable of generating a BHmax greater than forty (40) with a working temperature rating of at least 250° F. may also be included in the magnet. An example heat resistant magnetic arrangement includes a selected spacing of the magnetic hub from the inspection surface (e.g., utilizing the enclosures and/or a cover for the wheel), reducing conduction to the magnetic hub (e.g., a coating for the enclosures and/or the magnetic hub, and/or a wheel cover having a selected low conductivity material), and/or reducing radiative heating to the magnetic hub (e.g., adjusting an absorption coefficient for the hub with polishing and/or a coating, covering a line of sight between the magnetic hub and the inspection surface with a wheel cover, and/or reducing an exposed surface area of the magnetic hub with an enclosure arrangement, wheel cover, and/or coating).

As further shown in FIG. 102, in embodiments, the inspection robot may further include a cooling plate 10124 thermally coupled to an electrical component 10134 which may be disposed on the chassis 10102 and/or other portions of the inspection robot, e.g., the payloads 10110 and/or drive modules 10104. The cooling plate 10124 may be designed to transfer heat away from the electrical component 10134 and radiate it into the surrounding environment. In embodiments, the cooling plate 10124 may be disposed on a side of the chassis 10102 facing the inspection surface 500 during an inspection run. In embodiments, the cooling plate 10124 may be on a side of the chassis 10102 facing away from the inspection surface 500 during an inspection run. In embodiments, the cooling plate 10124 may be thermally coupled to a couplant manifold 5302 (FIG. 53) to transfer heat from the electrical component 10134 and radiate it into the couplant in the manifold 5302. In embodiments, the cooling plate 10124 may be thermally coupled to the couplant manifold 5302 to transfer heat from the couplant in the manifold 5302 and radiate it into the ambient environment.

In embodiments, the inspection robot may include a conduit 10128 that provides coolant to the electrical component 10134, wherein heat is transferred 10218 from the electrical component to the coolant. In embodiments, the coolant may be the couplant. In embodiments, the coolant may distinct from the couplant. In embodiments, the coolant may be water, alcohol, glycol and combinations thereof. In embodiments where the coolant is the couplant, the conduit 10128 may be fluidly connected to the couplant manifold 5302. In embodiments, wherein the coolant is the couplant, the conduit 10128 may direct the couplant to the sleds 10118 to promote acoustic coupling of at least a portion of the sensors to the inspection surface. In embodiments, a flow rate of the coolant may be adjusted 10224 in response to a heat transfer requirement of the electrical component 10134. For example, if the electrical component 10134 is increasing in temperature, the flow rate of the coolant may be increased to so that more coolant passes through the conduit 10128 thereby increasing the transfer rate of heat from the electrical component 10134 to the coolant. Conversely, if the electrical component 10134 is not at risk from malfunctioning due to excessive heat, the flow rate of the coolant may be reduced to conserve the coolant and/or energy in transporting the coolant to the inspection robot.

Figure 104:
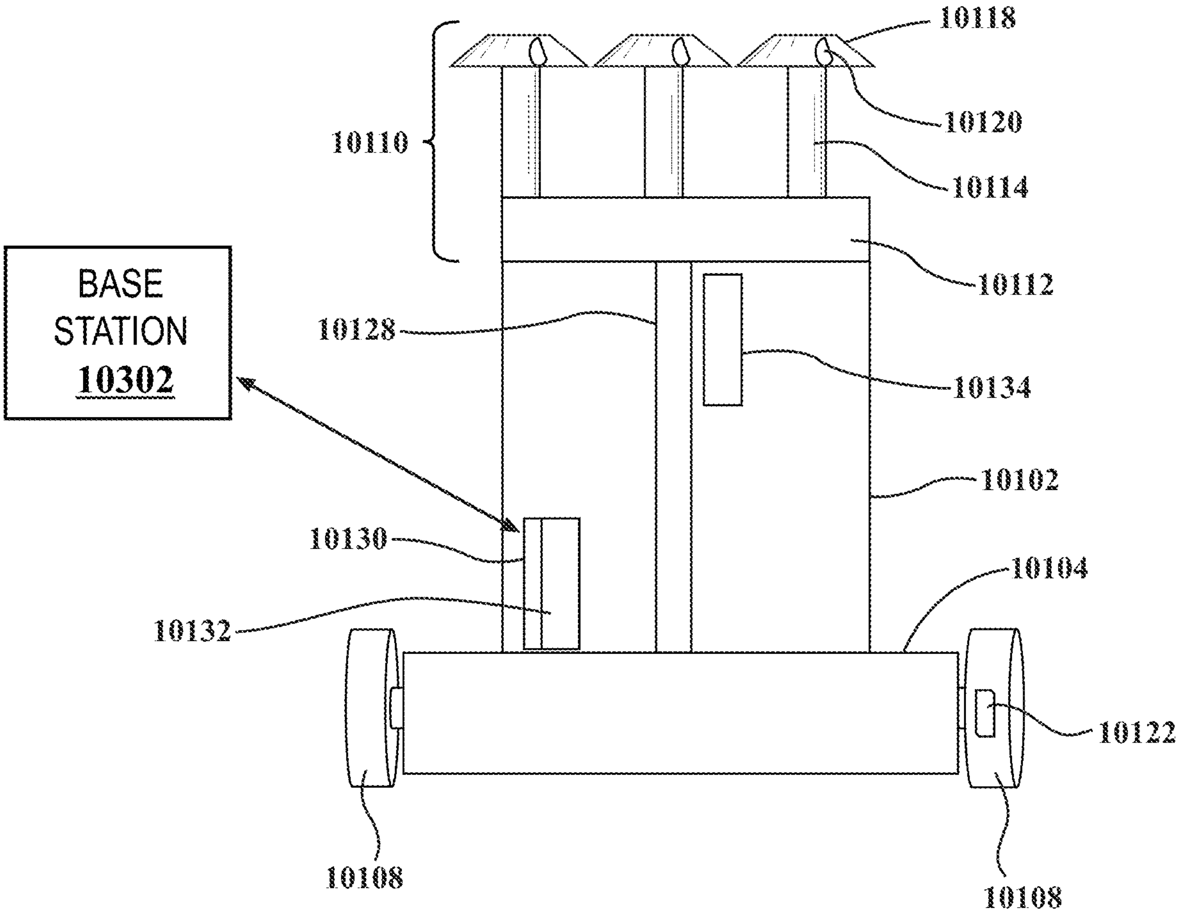
FIG. 104 is another schematic depicting an inspection robot having one or more features for operating in a hazardous environment.

In embodiments, the conduit 10128 may be fluidly connected to a tether 10130 that provides the coolant and/or other services 10228, e.g., electrical power, data communications, provision and/or recycling of coolant and/or couplant. In such embodiments, the tether 10130 may be connected to a coolant source, e.g., base station 10302 (FIG. 104), that supplies the coolant and, optionally, cools the coolant. In some embodiments, the coolant may be cycled/recycled 10222 between the inspection robot and a coolant source, e.g., the base station 10302, via the tether 10130. As will be appreciated, recycling coolant and/or couplant may reduce the costs of operating the inspection robot. In embodiments, the tether 10130 may have a heat resistant jacketing 10132, e.g., silicone rubber and/or other heat resistant materials.

In embodiments, the sleds 10118 may include polyetherimide (PEI). In such embodiments, the sleds 10118 may be additively manufactured. As will be appreciated, polyetherimide provides for the sleds 10118 to be exposed to surface temperatures of at least 250° F. without structural failures.

Figure 103:
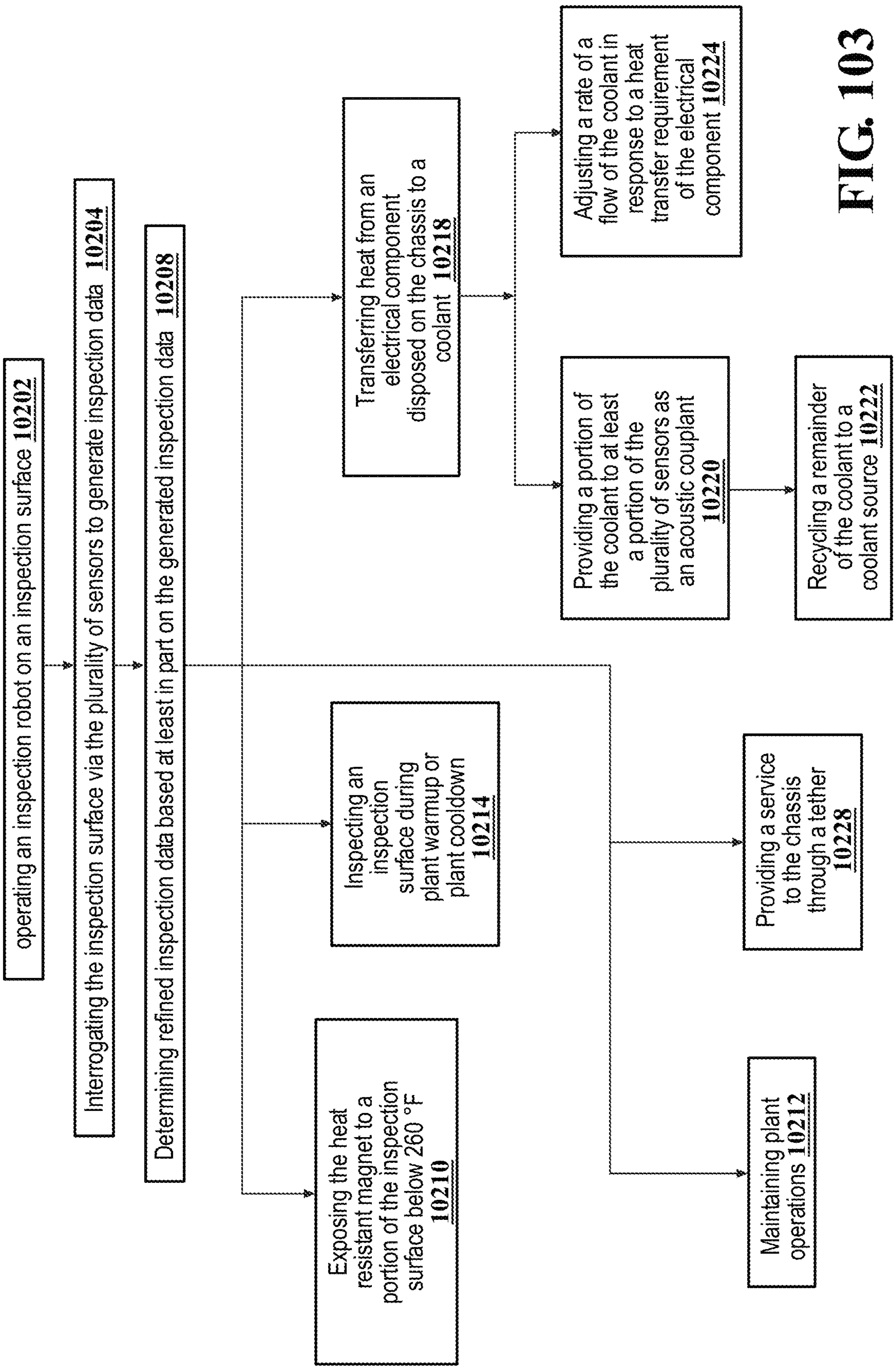
FIG. 103 depicts a method for operating an inspection robot in a hazardous environment.

Accordingly, in operation (as shown in FIG. 103), an inspection robot having one or more of the hazardous environment features disclosed herein may be operated 10202 on the inspection surface 500 so as to interrogate 10204 the inspection surface with the sensors 101020 to generate inspection data. Refined data may be determined 10208 based at least in part on the generated inspection data. The inspection surface 500, or its environment, may expose 10210, the heat resistant magnet 10122 to temperatures below 260° F. As will be appreciated, the ability of an inspection robot, in accordance with the embodiments disclosed herein, to operate in such temperatures may provide for a plant, e.g., a power plant, corresponding to the inspection surface to maintain operations 10212 during an inspection run by the inspection robot. In embodiments, the inspection run may be performed during a warmup and/or cooldown period 10214 of the plant. By providing for the ability to perform an inspection run without disrupting a plant's operations, some embodiments of the inspection robot may improve the plant overall efficiency by reducing and/or eliminating down downtime of the plant traditionally associated with performing inspections on the inspection surface.

Figure 105:
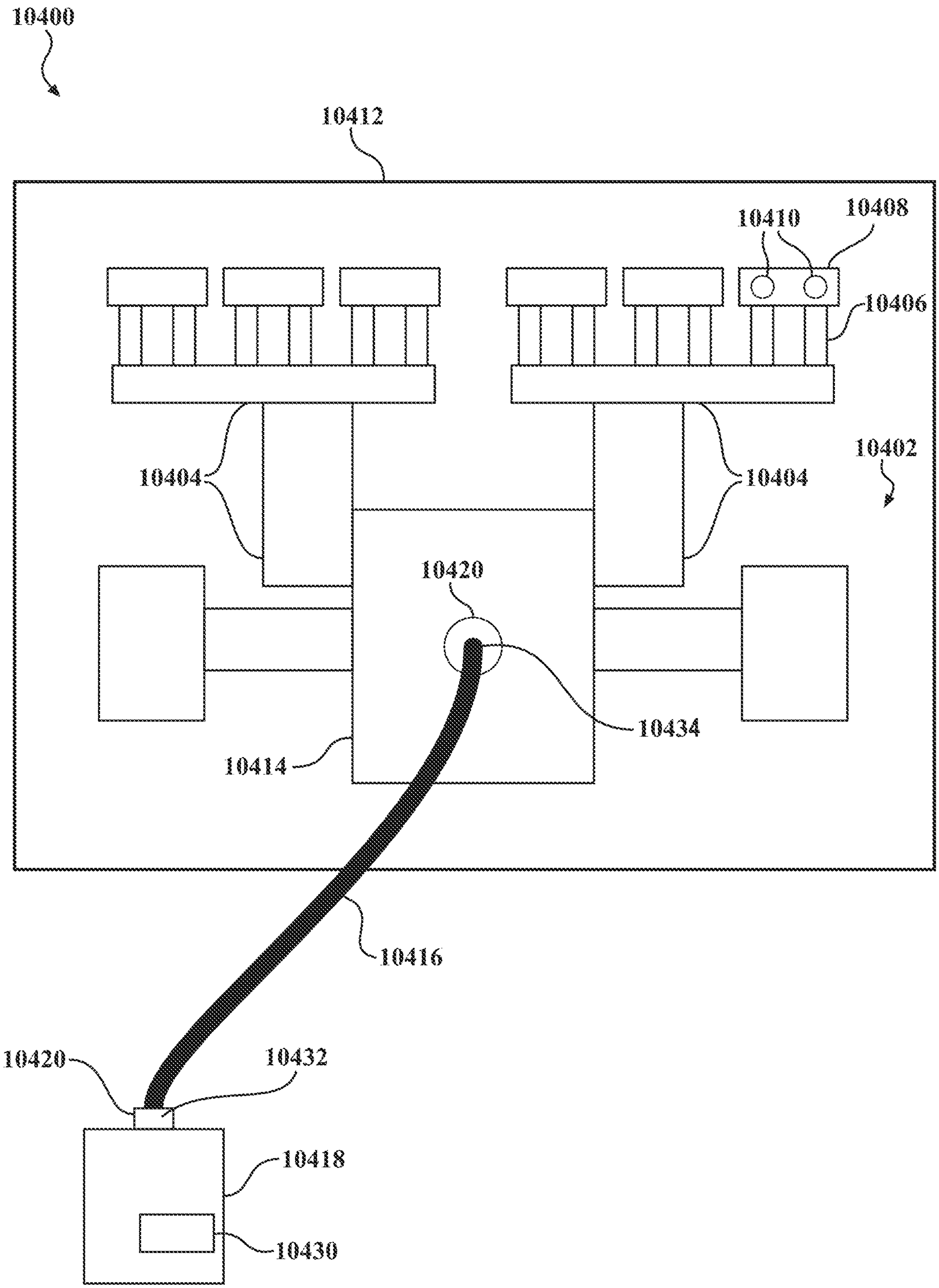
FIG. 105 depicts an embodiment of an inspection robot with a tether.
Figure 106:
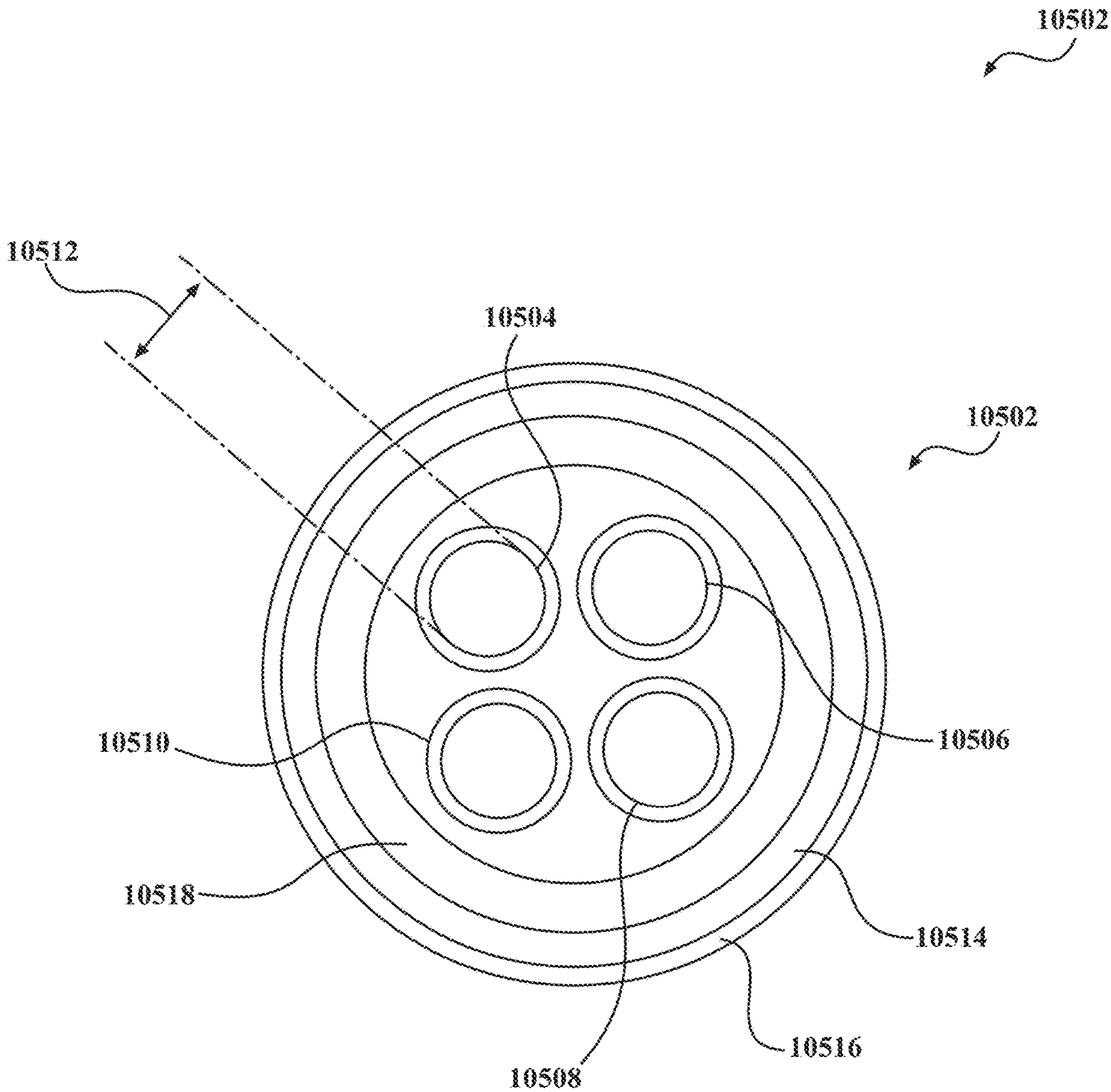
FIG. 106 depicts components of a tether.

In an embodiment, and referring to FIG. 105 and FIG. 106, a system 10400 may include an inspection robot 10402 comprising a chassis 10414, a payload 10404; at least one arm 10406, wherein each arm 10406 is pivotally mounted to a payload 10404; at least two sleds 10408, wherein each sled 10408 is mounted to the at least one arm 10406; a plurality of inspection sensors 10410, each of the inspection sensors 10410 coupled to one of the sleds 10408 such that each sensor is operationally couplable to an inspection surface 10412, wherein the at least one arm is horizontally moveable relative to a corresponding payload 10404; and a tether 10416 including an electrical power conduit 10506 operative to provide electrical power; and a working fluid conduit 10504 operative to provide a working fluid. In an embodiment, the working fluid may be a couplant and the working fluid conduit 10504 may be structured to fluidly communicate with at least one sled 10408 to provide for couplant communication via the couplant between an inspection sensor 10410 mounted to the at least one sled 10408 and the inspection surface 10412. In an embodiment, the couplant provides acoustic communication between the inspection sensor and the inspection surface. In an embodiment, the couplant does not perform work (W). In an embodiment, the working fluid conduit 10504 has an inner diameter 10512 of about one eighth of an inch. In an embodiment, the tether 10502 may have an approximate length selected from a list consisting of: 4 feet, 6 feet, 10 feet, 15 feet, 24 feet, 30 feet, 34 feet, 100 feet, 150 feet, 200 feet, or longer than 200 feet. In an embodiment, the working fluid may be at least one of: a paint; a cleaning solution; and a repair solution. In certain embodiments, the working fluid additionally or alternatively is utilized to cool electronic components of the inspection robot, for example by being passed through a cooling plate in thermal communication with the electronic components to be cooled. In certain embodiments, the working fluid is utilized as a cooling fluid in addition to performing other functions for the inspection robot (e.g., utilized as a couplant for sensors). In certain embodiments, a portion of the working fluid may be recycled to the base station and/or purged (e.g., released from the inspection robot and/or payload), allowing for a greater flow rate of the cooling fluid through the cooling plate than is required for other functions in the system such as providing sensor coupling.

It should be understood that any operational fluid of the inspection robot 10402 may be a working fluid. The tether 10416 may further include a couplant conduit 10510 operative to provide a couplant. The system 10400 may further include a base station 10418, wherein the tether 10416 couples the inspection robot 10402 to the base station 10418. In an embodiment, the base station 10418 may include a controller 10430; and a lower power output electrically coupled to each of the electrical power conduit 10506 and the controller 10430, wherein the controller 10430 may be structured to determine whether the inspection robot 10402 is connected to the tether 10416 in response to an electrical output of the lower power output. In embodiments, the electrical output may be at least 18 Volts DC. In an embodiment, the controller 10430 may be further structured to determine whether an overcurrent condition exists on the tether 10416 based on an electrical output of the lower power output. The tether 10502 may further include a communication conduit 10508 operative to provide a communication link, wherein the communication conduit 10508 comprises an optical fiber or a metal wire. Since fiber is lighter than metal for communication lines, the tether 10502 can be longer for vertical climbs because it weighs less. A body of the tether 10502 may include at least one of: a strain relief 10420; a heat resistant jacketing 10514; a wear resistant outer layer 10516; and electromagnetic shielding 10518. In embodiments, the tether 10502 may include similar wear materials. In embodiments, the sizing of the conduits 10504, 10506, 10508, 10510 may be based on power requirements, couplant flow rate, recycle flow rate, or the like.

Figure 107:
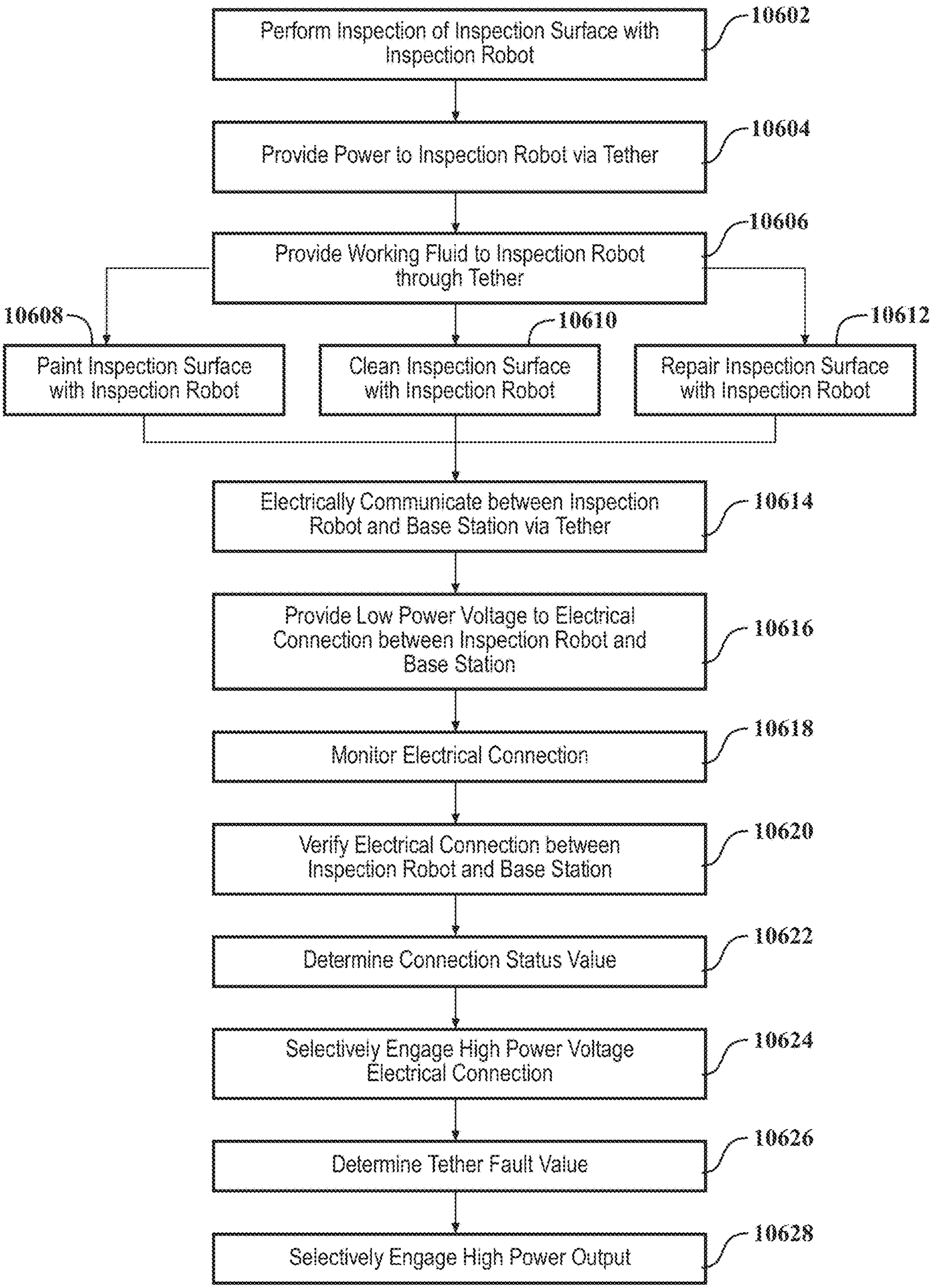
FIG. 107 depicts a method of performing an inspection of an inspection surface.

In an embodiment, and referring to FIG. 107, a method may include performing an inspection of an inspection surface 10602; providing power to an inspection robot through a shared tether 10604; and providing a working fluid to the inspection robot through the shared tether 10606. The method may further include providing the working fluid between an inspection sensor and the inspection surface wherein the working fluid is a couplant. The method may further include painting the inspection surface 10608, wherein providing the working fluid comprises providing a paint. The method may further include cleaning the inspection surface 10610, wherein providing the working fluid comprises providing a cleaning solution. The method may further include repairing the inspection surface 10612, wherein providing the working fluid comprises providing a repair solution. The method may further include electrically communicating between the inspection robot and a base station via the shared tether 10614. The method may further include providing a low power voltage to an electrical connection between the inspection robot and the base station 10616; monitoring the electrical connection 10618; verifying the electrical connection between the inspection robot and the base station 10620; and determining a connection status value for in response to the verified electrical connection 10622. The method may further include selectively engaging, in response to the connection status value, a high power voltage to the electrical connection 10624. The method may further include determining a tether fault value 10626; and selectively engaging, in response to the tether fault value, a higher power output to the shared tether 10628. In embodiments, the tether fault value may be in response to a fault condition, wherein the fault condition comprises a member selected from a list consisting of an overcurrent condition, and a short circuit. In certain embodiments, the method may further include checking for an off-nominal electrical condition, such as the appearance of a high resistance value, noise on the electrical connection, an increasing or decreasing voltage or resistance, or the like, to determine the connection status value. In certain embodiments, the electrical connection may include separate electrical conduits for the low power voltage and/or the high power voltage, and/or both power voltages may be communicated on a same electrical conduit. In certain embodiments, the method includes powering only a portion of the inspection robot, such as low voltage devices, low power devices, and/or low capacitance devices, before the electrical connection is verified. In certain embodiments, the method includes charging capacitive devices with the low power voltage before connecting the high power voltage, and may further include powering one or more high power devices before the high power voltage is connected, for example after verifying the electrical connection. The description herein utilizes a low power voltage and a high power voltage, however it will be understood that the low power voltage may include an otherwise restricted electrical power source, such as a power source having a low current capability, a power source having a resistor in-line with the connection, or the like. Accordingly, while the low power voltage has a voltage lower than the high power voltage in certain embodiments, the low power voltage may additionally or alternatively include a separate restriction or protective feature, and in certain embodiments the low power voltage may have a similar voltage, the same voltage, or a voltage that is a significant fraction (e.g., 25%, 50%, 75%, etc.) of the voltage of the high power voltage.

In an embodiment, and referring to FIG. 105 and FIG. 106, a tether 10502 for connecting an inspection robot 10402 to a base station 10418 may include an electrical power conduit 10506 comprising an electrically conductive material; a working fluid conduit 10504 defining a working fluid passage therethrough; a base station interface 10432 positioned at a first end of the tether 10416, the base station interface operable to couple the tether 10416 to a base station 10418; a robot interface 10434 positioned at a second end of the tether, the robot interface operable to couple the tether 10416 to the inspection robot 10402; a strain relief 10420; a wear resistance coating 10516; and electromagnetic shielding 10518. The tether may further include a communication conduit 10508, wherein the communication conduit 10508 may include an optical fiber or a metal wire. The electrical power conduit 10506 may further include a communications conduit 10508. In an embodiment, the working fluid conduit 10504 may have an inner diameter 10512 of about one eighth of an inch.

Figure 108:
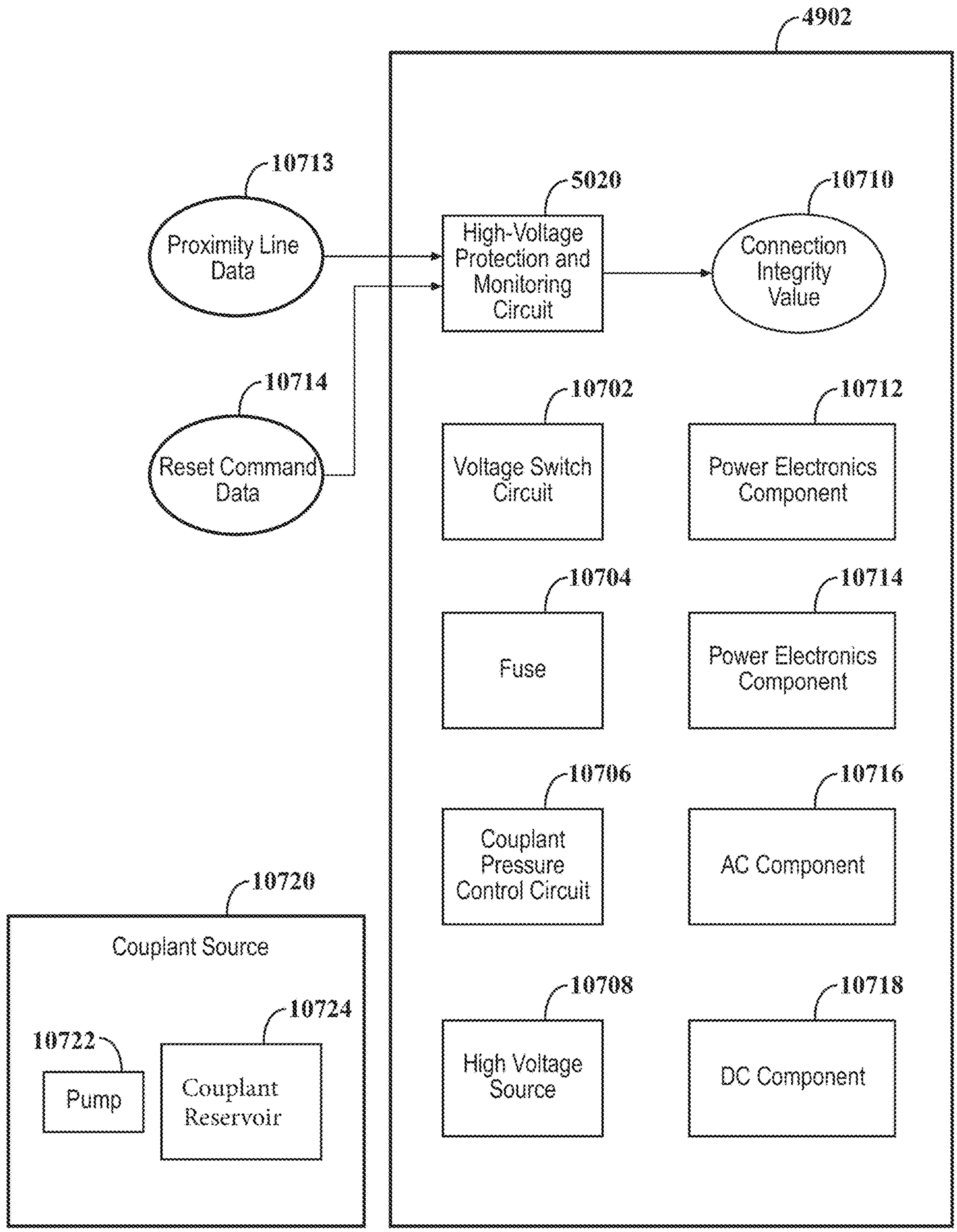
FIG. 108 depicts a controller for an inspection robot.

Turning now to FIG. 108, an example system for powering an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example system depicted in FIG. 95. In certain embodiments, the inspection robot 100 may have one or more payloads 2 (FIG. 1) and may include one or more sensors 2202 (FIG. 5) on each payload.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

The example system may include a base station 4902 (also shown in FIG. 49) and/or a tether (e.g. reference FIG. 105, element 10416). In embodiments, the system may also include the inspection robot 100.

The tether may include a high-voltage power line (e.g., a first conduit, reference FIG. 106), and/or a proximity line (e.g., a second conduit, reference FIG. 106). The high-voltage power line and the proximity line may be separate conduits within the tether, or may be a shared conduit within the tether. As explained herein, the tether may couple the inspection robot 100 to the base station 4902 for the provision of electrical power, couplant, data communications and/or other services from the base station 4902 (or other devices in communication with the base station 4902) to the inspection robot 100. As shown in FIG. 106, the tether may include multiple conduits for transporting electrical power, communications, couplant and/or other services. As will be explained in greater detail below, the proximity line provides for the testing of the connection between the base station 4902 and the inspection robot 100 over the tether via a low voltage and/or current signal.

The example base station 4902 has a number of circuits configured to functionally perform operations of the base station 4902 as described herein. For example, the base station 4902 may include a high-voltage protection and monitoring circuit 5020 (also shown in FIG. 50), a voltage switch circuit 10702, a fuse 10704, a couplant pressure control circuit 10706 and/or a high voltage source 10708. In embodiments, the base station 4902 may include one or more power electronic components 10712 and 10714. In embodiments, the base station 4902 may include an AC power/current input 10716 interface. In embodiments, the base station 4902 may further include a low-voltage direct current (DC) output. The example base station 4902 may additionally or alternatively include aspects of any other base station, controller, circuit, and/or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the base station 4902 are set forth, without limitation, in the portion of the disclosure referencing FIGS. 108 and 109.

The example base station 4902 is depicted schematically in FIG. 108 as a single device for clarity of description, but the base station 4902 may be a single device, a distributed device, and/or may include portions at least partially positioned with other devices in the system (e.g., on the inspection robot 100). In certain embodiments, the base station 4902 may be at least partially positioned on a computing device associated with an operator of the inspection robot (not shown), such as a local computer at a facility including the inspection surface 500, a laptop, and/or a mobile device. In certain embodiments, the base station may alternatively or additionally be at least partially positioned on a computing device that is remote to the inspection operations, such as on a web-based computing device, a cloud computing device, a communicatively coupled device, or the like.

Accordingly, as illustrated in FIG. 108, the high-voltage protection and monitoring circuit 5020 interrogates the proximity line and interprets proximity line data 10713 to generate a connection integrity value 10710. The proximity line data 10713 may represent a voltage and/or current value where the existence of a voltage and/or current indicates that the tether and/or connections, e.g., power, couplant, communication data, etc., likely have good integrity, e.g., no breaks. In embodiments, the connection integrity value 10710 may be a state variable, e.g., "GOOD" or "BAD". In embodiments, the connection integrity value 10710 may have a range of values, e.g., "GOOD", "LIKELY-GOOD", "LIKELY BAD", "BAD". In embodiments, the connection integrity value 10710 may be a numeric value e.g., a scale of one (1) to ten (10). While the foregoing example distinguishes the proximity line from the high-voltage power line, it will be understood that, in embodiments, the high-voltage power line and the proximity line may be the same. For example, in embodiments, a low-voltage and/or current may be carried over the high-voltage line to test the integrity of the tether before transporting high-voltage electrical power over the high-voltage line.

The voltage switch circuit 10702 connects the high-voltage power source 10708 to the high-voltage power line of the tether based at least in part on the connection integrity value 10710. In other words, in embodiments, the voltage switch circuit 10702 allows high-voltage electrical power to flow from the base station 4902 to the inspection robot 100 after the connection across the tether has been checked as being acceptable. In embodiments, the voltage switch circuit 10702 may include one or more solenoids and/or other devices suitable for completing a high-voltage connection.

The high-voltage power source 10708 is operative to provide high-voltage power and/or electrical current to the inspection robot 100. For example, in embodiments, the high-voltage power source 10708 may provide a voltage greater than or equal to 24V, 42V, and/or 60V. In embodiments, the high-voltage power source 10708 may provide a voltage in a range of 350 volts to 400 volts, 300 to 350 volts, 320-325 volts and/or any other range suitable for powering the inspection robot 100. In embodiments, the high-voltage power source 10708 may be disposed in the base station 4902. In embodiments, the high-voltage power source 10708 may be disposed apart from the base station 4902. For example, the high-voltage source 10708 may be local to the site of the inspection surface 500, e.g., a local power outlet.

In embodiments, the base station 4902 may receive an alternating current input at the AC power interface 10716. In such embodiments, the first power electronics component 10712 may provide the high voltage power source 10708 from the alternating current input, and/or the second power electronics component 10714 may provide the low-voltage direct current output 10718 from the alternating current input 10716. In embodiments, the power electronics components 10712 and 10714 may include one or more rectifiers, signal conditioners and/or other various components for converting AC power into conditioned DC voltages and/or currents. The AC power interface 10716 may receive an AC source having a voltage in the range of 100-240 VAC, e.g., 110 VAC, 115 VAC, 120 VAC, 220 and/or VAC 240 VAC.

In embodiments, the high-voltage protection and monitoring circuit 5020 may interrogate the proximity line utilizing the low-voltage direct current output 10718. For example, in embodiments, the high-voltage protection and monitoring circuit 5020 may generate the connection integrity value 10710 by connecting the low-voltage direct current output 10718 to the proximity line and comparing a measured drop in power over the proximity line with an anticipated power drop value.

The low-voltage direct current output 10718 may output a DC current below about 60V, below about 42V, at about 24V, and/or at about 12V. In embodiments, the proximity line completes a full circuit that runs the entire length of the tether where the high-voltage protection and monitoring circuit 5020 tests the voltage across the starting and the terminal ends of the proximity line. By detecting a voltage across the ends of the proximity line, the high-voltage protection and monitoring circuit 5020 can determine whether the integrity of the tether and/or the connection is good or not, and if good, set the connection integrity value 10710 accordingly.

In embodiments, a drive motor (e.g., reference FIG. 151) in a drive module 4912 (FIG. 49) of the inspection robot 100 may include a power rating that exceeds a combined gravitational force on the inspection robot and the tether. In other words, the drive motors of some embodiments require enough electrical power to transport the weight of the inspection robot 100, the tether and the couplant flowing in the robot 100 and tether, up a vertical face of an inspection surface 500. In embodiments, the inspection surface 500 may have at least one portion with vertical extent greater than or equal to 6 feet, 12 feet, 20 feet, 34 feet, 50 feet, 100 feet, and/or 200 feet.

In embodiments, the fuse 10704 may be operative to protect against current overload and/or shock to the base station 4902 and/or the inspection robot 100. For example, the fuse 10704 may be disposed in line with a high-voltage power line. In embodiments, the fuse 10704 may be a solid-state fuse controllable to open at a selected current value (e.g., determined according to the tether wire size, rating of components in the inspection robot, etc.). In the event that the electrical power on the high-voltage power line exceeds the rating of the fuse 10704 and/or a selected current value for controller the solid state fuse, the fuse 10704 will trip, thereby interrupting the flow of high-voltage electrical power on the high-voltage power line. As such, in embodiments, the high-voltage protection and monitoring circuit may reset the solid state fuse 10704 based on a reset command 10714. The reset command 10714 may be received from a remote operator over a communication channel. In embodiments, the reset command 10714 may be responsive to a physical reset procedure on the inspection robot 100, base station 4902 and/or tether. The physical reset procedure may include the pressing of a button, the flipping of a switch, replacement of the fuse 10704, provision of a reset command to a controller operable when the fuse is open, and/or any other suitable process for resetting a fuse.

In embodiments, the tether further includes a couplant line coupled to a couplant source 10720 at a first end, and to the inspection robot at a second end. The couplant source 10720 may be included in the base station 4902 or be disposed apart from the base station. In certain embodiments, the couplant source 10720 may include a couplant pump 10722 fluidly interposed between a couplant reservoir 10724 and the first end of the couplant line. In embodiments, the couplant reservoir may be a mobile tank storing couplant. In embodiments, the couplant reservoir 10724 may be located at the site of the inspection surface, e.g., a water tower. In embodiments, the couplant reservoir 10724 may be disposed in the couplant source 10720. In embodiments, the couplant pressure control circuit 1708 may be coupled to the couplant pump 10722 and regulate the flow of the couplant from the reservoir 10724 and through the tether to the inspection robot 100.

Figure 109:
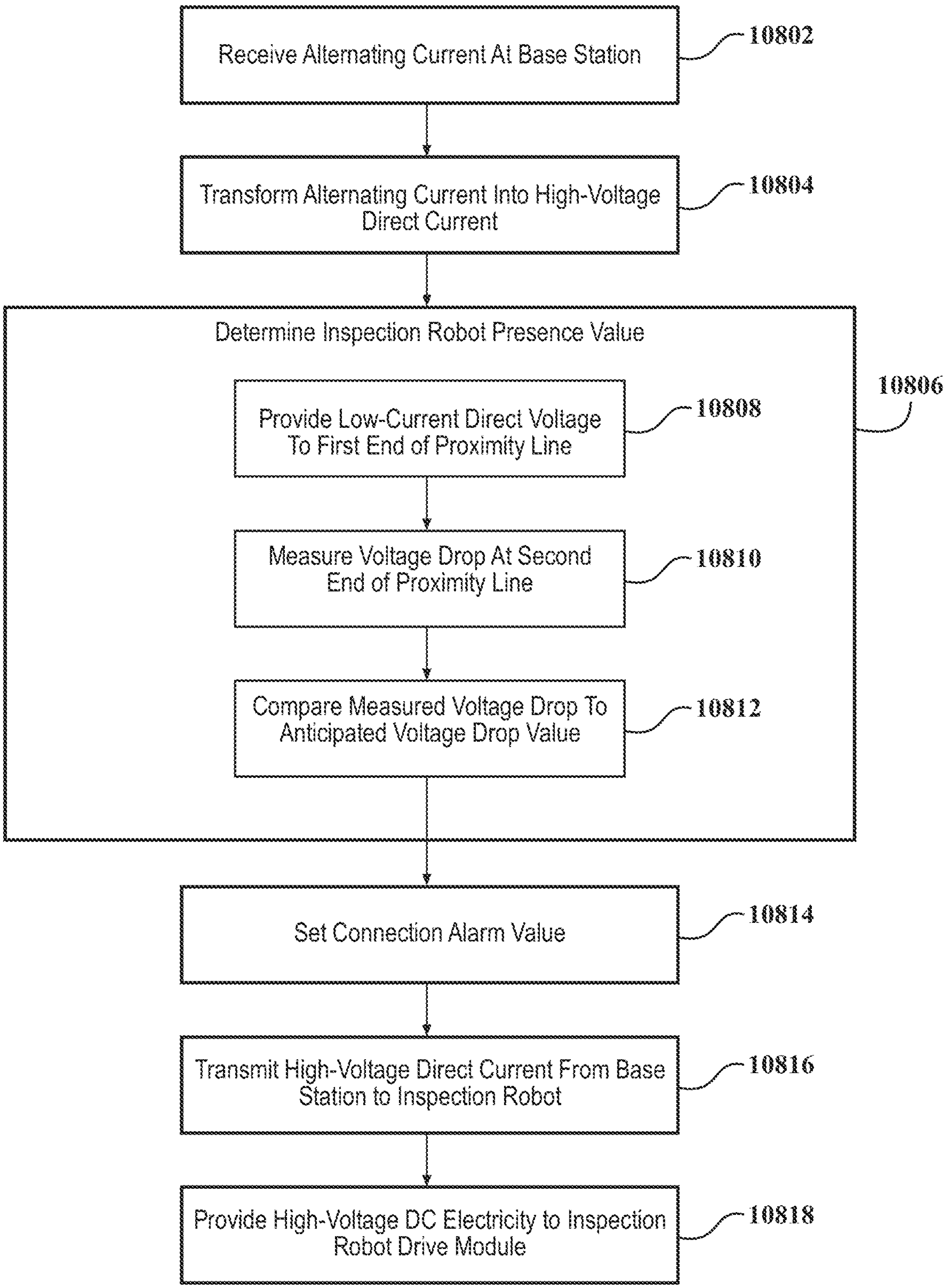
FIG. 109 depicts a method for powering an inspection robot.

Turning to FIG. 109, a method for powering an inspection robot 100 (FIG. 1) is shown. The method may include receiving 10802 AC electrical current, transforming 10804 the AC electrical current into high-voltage DC current, determining 10806 a robot presence value, and, in response to the determined presence value, transmitting 10816 the high-voltage DC current to the inspection robot. In embodiments, determining 10806 a robot presence value may include providing 10808 a low-current direct current voltage to a first end of a proximity line. In embodiments, determining 10806 a robot presence value may include measuring 10810 a voltage drop at a second end of a proximity line. In embodiments, determining 10806 a robot presence value may include comparing 10812 the measured voltage drop to an anticipated voltage drop value. In embodiments, the method may include providing 10818 the high-voltage DC electricity to a drive module 4912 of the inspection robot 100. In embodiments, the method may include setting 10818 a connection alarm value based on the robot presence value.

Figure 110:
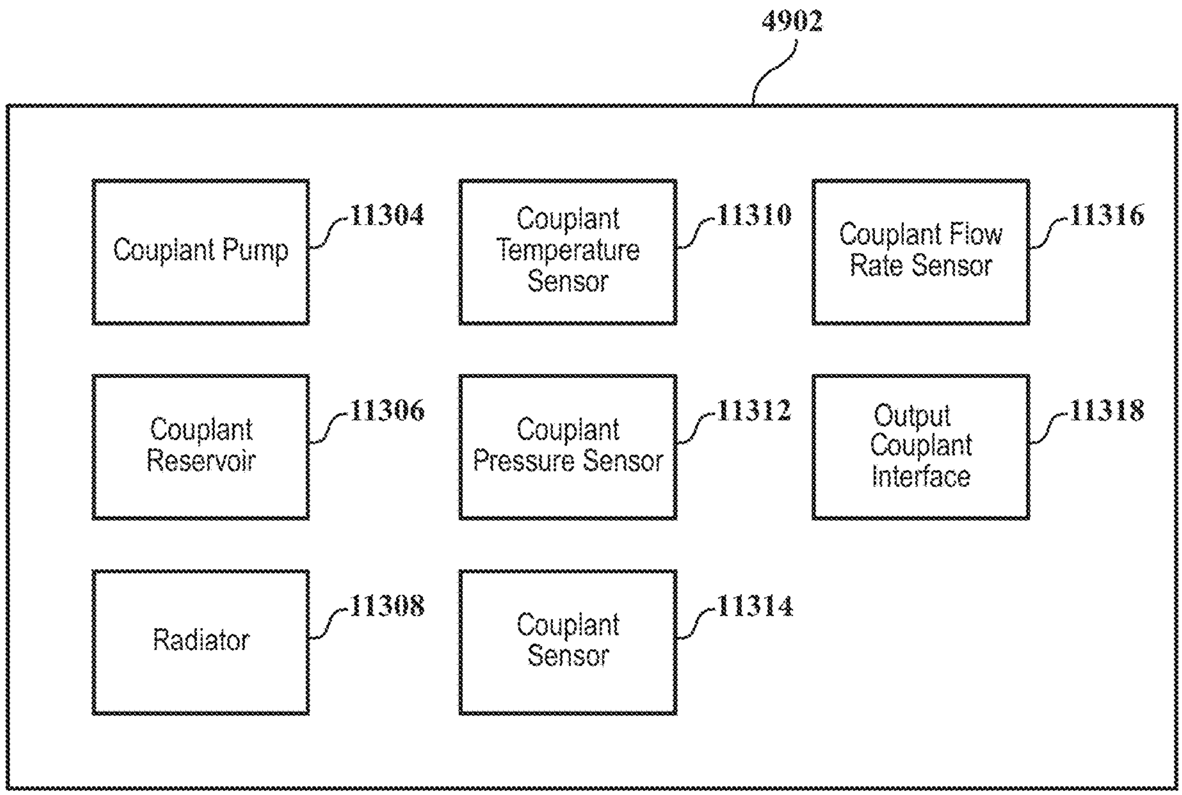
FIG. 110 is a schematic diagram of a base station for a system for managing couplant for an inspection robot.

Turning now to FIG. 110, an example base station 4902 for a system for managing couplant for an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example system depicted in FIG. 110. In certain embodiments, the inspection robot 100 may have one or more payloads 2 (FIG. 1) and may include one or more sensors 2202 (FIG. 5) on each payload.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

As shown in FIG. 110, the example system may include a base station 4902 (e.g., reference FIG. 49) and/or a tether (e.g. reference FIG. 105, element 10416). In embodiments, the system may also include the inspection robot 100 to include one or more payloads 2, one or more output couplant interfaces 11602 (FIG. 113) disposed on a chassis of the inspection robot 100, and/one or more sensors 2202.

The tether may include a high-voltage power line, and/or a proximity line. As explained herein, the tether may couple the inspection robot 100 to the base station 4902 for the provision of electrical power, couplant, data communications and/or other services from the base station 4902 (or other devices in communication with the base station 4902) to the inspection robot 100. As shown in FIG. 106, the tether may include multiple conduits for transporting electrical power, communications, couplant and/or other services.

Figure 111:
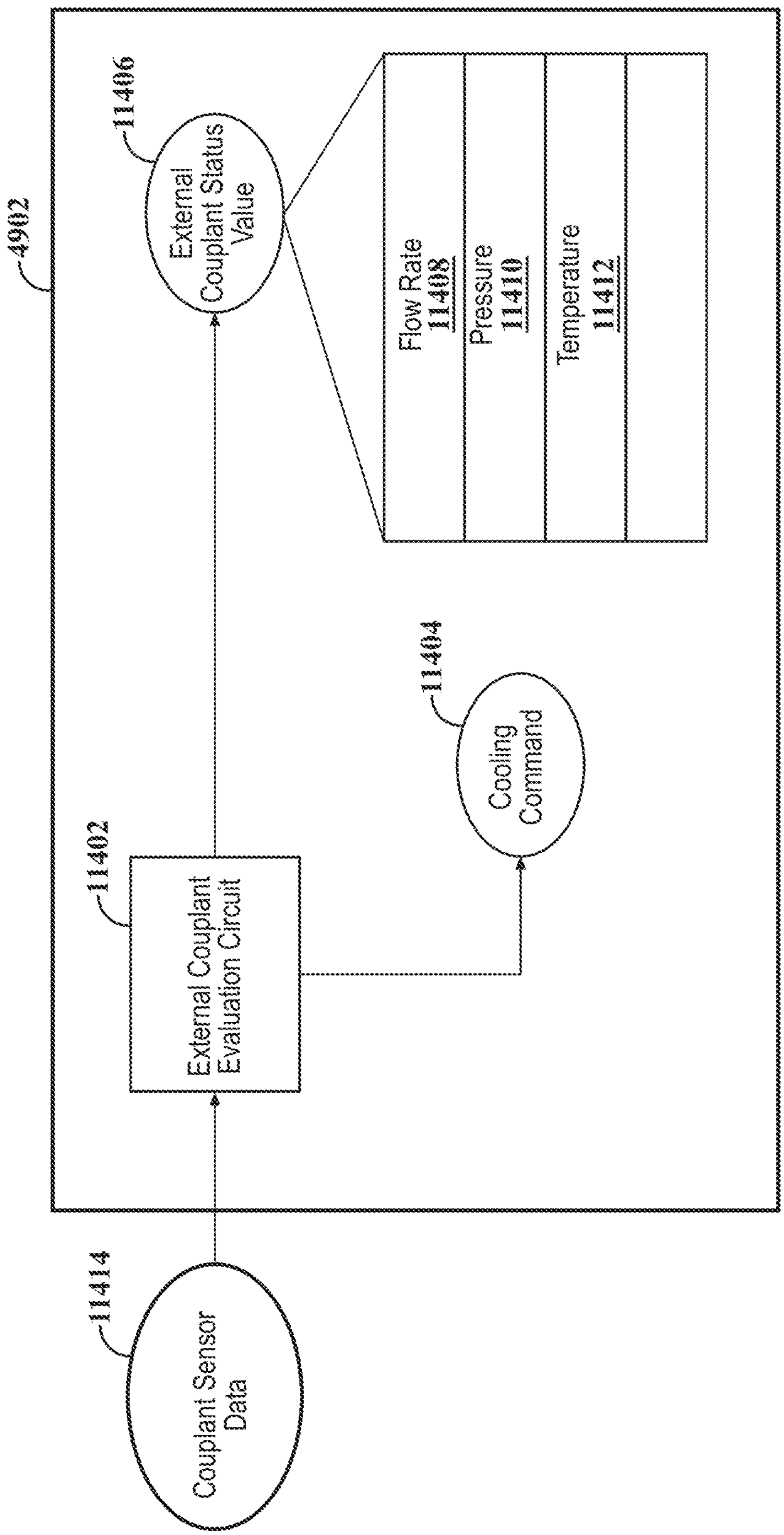
FIG. 111 is another schematic diagram of a base station for a system for managing couplant for an inspection robot.

The example base station 4902 may include a couplant pump 11304, a couplant reservoir 11306, a radiator 11308, a couplant temperature sensor 11310, a couplant pressure sensor 11312, a couplant flow rate sensor 11316, other couplant sensor 11314, and/or an external couplant interface 11318. As shown in FIG. 111, embodiments of the base station 4902 may also include a number of circuits configured to functionally perform operations of the base station 4902 as described herein. For example, the base station 4902 may include an external couplant evaluation circuit 11102 (FIG. 111). The example base station 4902 may additionally or alternatively include aspects of any other base station, controller, circuit, and/or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the base station 4902 are set forth, without limitation, in the portion of the disclosure referencing FIGS. 110-114.

The example base station 4902 is depicted schematically in FIGS. 110 and 111 as a single device for clarity of description, but the base station 4902 may be a single device, a distributed device, and/or may include portions at least partially positioned with other devices in the system (e.g., on the inspection robot 100). In certain embodiments, the base station 4902 may be at least partially positioned on a computing device associated with an operator of the inspection robot (not shown), such as a local computer at a facility including the inspection surface 500, a laptop, and/or a mobile device. In certain embodiments, the base station 4902 may alternatively or additionally be at least partially positioned on a computing device that is remote to the inspection operations, such as on a web-based computing device, a cloud computing device, a communicatively coupled device, or the like.

Accordingly, as illustrated in FIGS. 110 and 111, the external couplant interface 11318 may receive external couplant from an external source, e.g., a water spigot. The external couplant evaluation circuit 11402 may interpret couplant sensor data 11414 and determine an external couplant status value 11406 which may be representative of a characteristic of the couplant at the external couplant interface 11318. The characteristic may be a flow rate 11408, a temperature 11412, a pressure 11410 and/or any other measurable property of the couplant. The characteristic may be sensed by one or more of the temperature sensor 11310, pressure sensor 11312, flow rate sensor 11316 and/or other sensors 11314 suitable for measuring other characteristics of the external couplant.

In embodiments, the couplant pump 11304 may pump the couplant from the external couplant interface 11318 through the couplant line of the tether in response to the external couplant status value 11406. The couplant pump 11304 may be adjusted to control pressure and/or flow rate of the couplant. For example, the external couplant evaluation circuit 11402 may have a target set of couplant parameters, e.g., temperature, pressure, flow rate, etc., that the couplant evaluation circuit 11402 may attempt to condition the external couplant towards prior to transferring the external couplant to the tether for transport to the inspection robot 100.

In embodiments, the radiator 11308 may thermally couple at least a portion of the couplant prior to the tether to an ambient environment. The radiator 11308 may include one or more coils and/or plates through which the couplant flows. In embodiments, the radiator 11308 may be a counter flow radiator where a working fluid is moved in the reverse direction of the flow of the couplant and absorbs thermal energy from the couplant.

In embodiments, the external couplant evaluation circuit 11402 may determine a temperature of the external couplant and provide a cooling command 11404 in response to the temperature of the external couplant. In such embodiments, the radiator 11308 may be responsive to the cooling command 11404. For example, if the external couplant evaluation circuit 11402 determines that the temperature of external couplant is too high, the cooling command 11404 may facilitate cooling of the couplant via the radiator. As will be understood, some embodiments may include a heating element to heat the couplant in the event that the external couplant evaluation circuit 11402 determines that a temperature of the external couplant is too cold to effectively couple the sensors 2202 to the inspection surface 500.

In embodiments the inspection robot 100 may include a couplant manifold (e.g., reference FIG. 189 and/or FIG. 53) and one or more output couplant interfaces 11602. The inspection robot 100 may include one or more payloads 2 each operably couplable to the output couplant interfaces 11602 and comprising a plurality of acoustic sensors 2202 utilizing the couplant to enable contact between each of the plurality of acoustic sensors 2202 and a corresponding object being inspected, e.g., in inspection surface 500.

Figure 112:
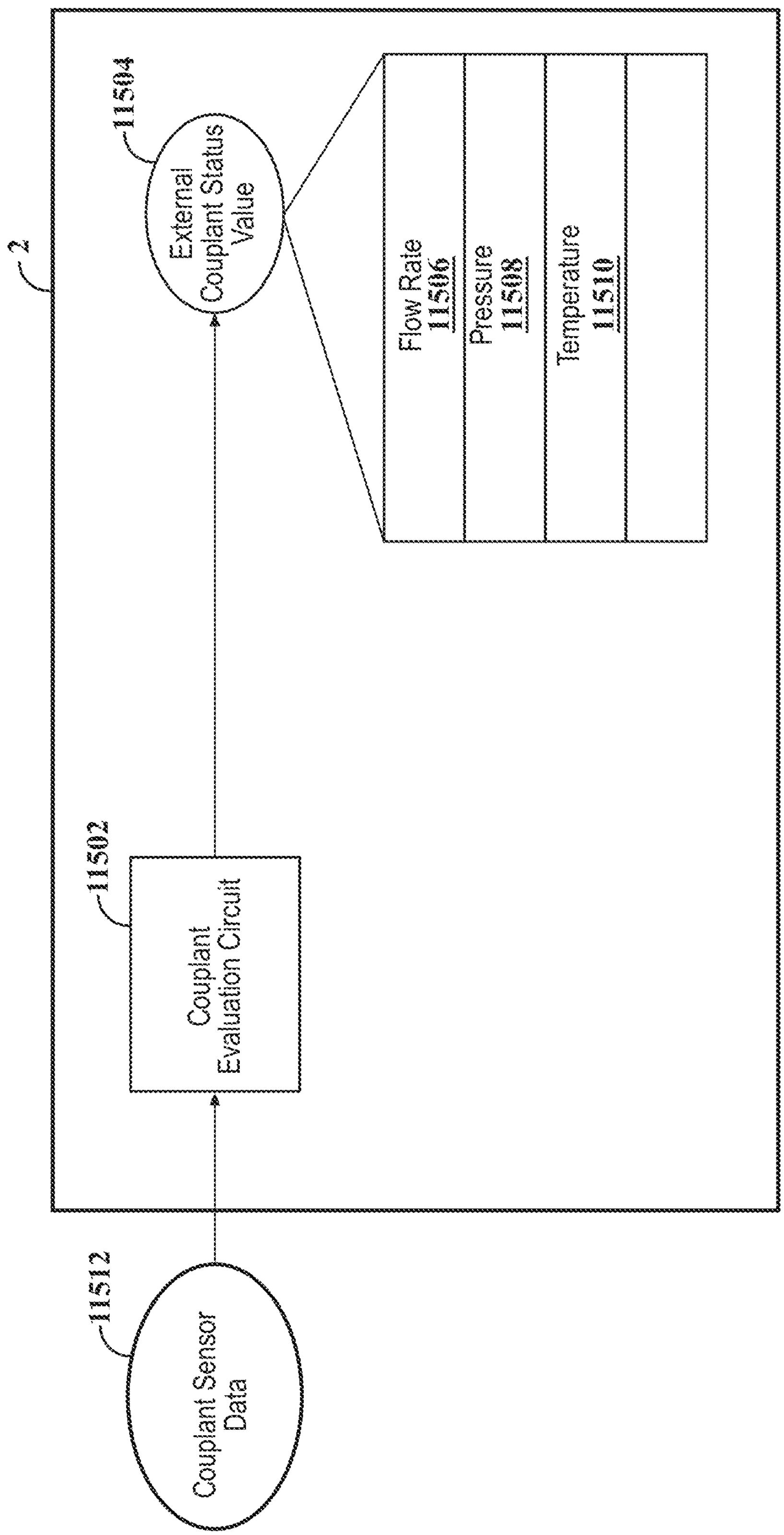
FIG. 112 is a schematic diagram of a payload for a system for managing couplant for an inspection robot.

As shown in FIG. 112, in embodiments, at least one of the inspection payloads 2 includes a couplant evaluation circuit 11502 that provides a couplant status value 11504. The couplant status value 11504 may include a characteristic of the couplant, e.g., a flow rate 11506, a pressure 11508, a temperature 11510 and/or other characteristics suitable for managing couplant within the payload 2. The couplant status value 11504 may be based at least in part on couplant sensor data 11512 interpreted by the couplant evaluation circuit 11202.

Figure 113:
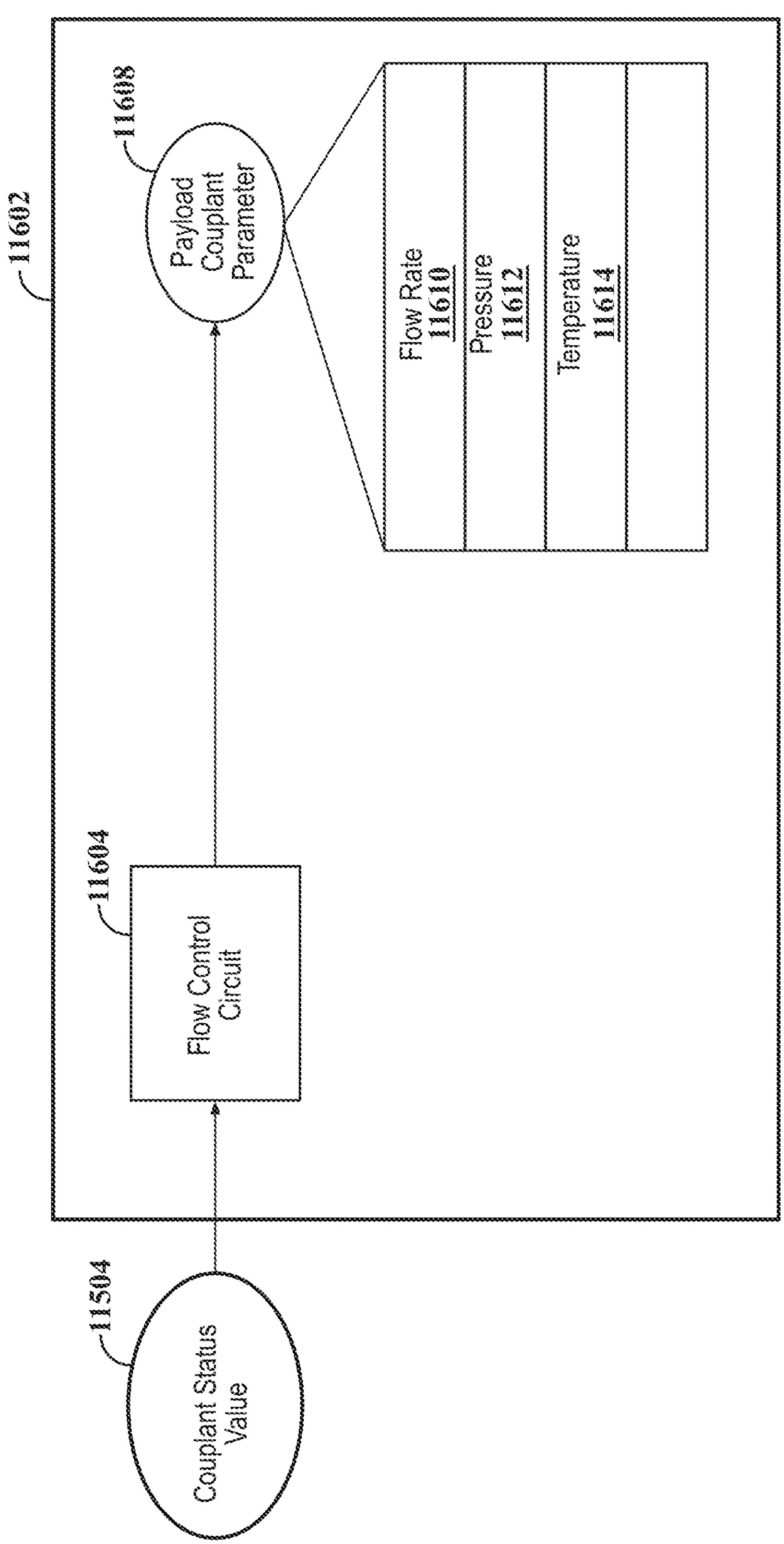

Moving to FIG. 113, each output couplant interface 11602 may include a flow control circuit 11604 structured to control a payload couplant parameter 11608 of the couplant flowing to each of the at least one inspection payloads 2. The payload couplant parameter 11608 may be determined in response to the couplant status value 11504 for a corresponding payload 2. In embodiments, the payload couplant parameter 11608 may be a characteristic of the couplant flowing to a payload 2, e.g., a pressure 11612, flow rate 11610, temperature 11614 and/or any other characteristic suitable for managing the couplant to the payloads 2.

Figure 114:
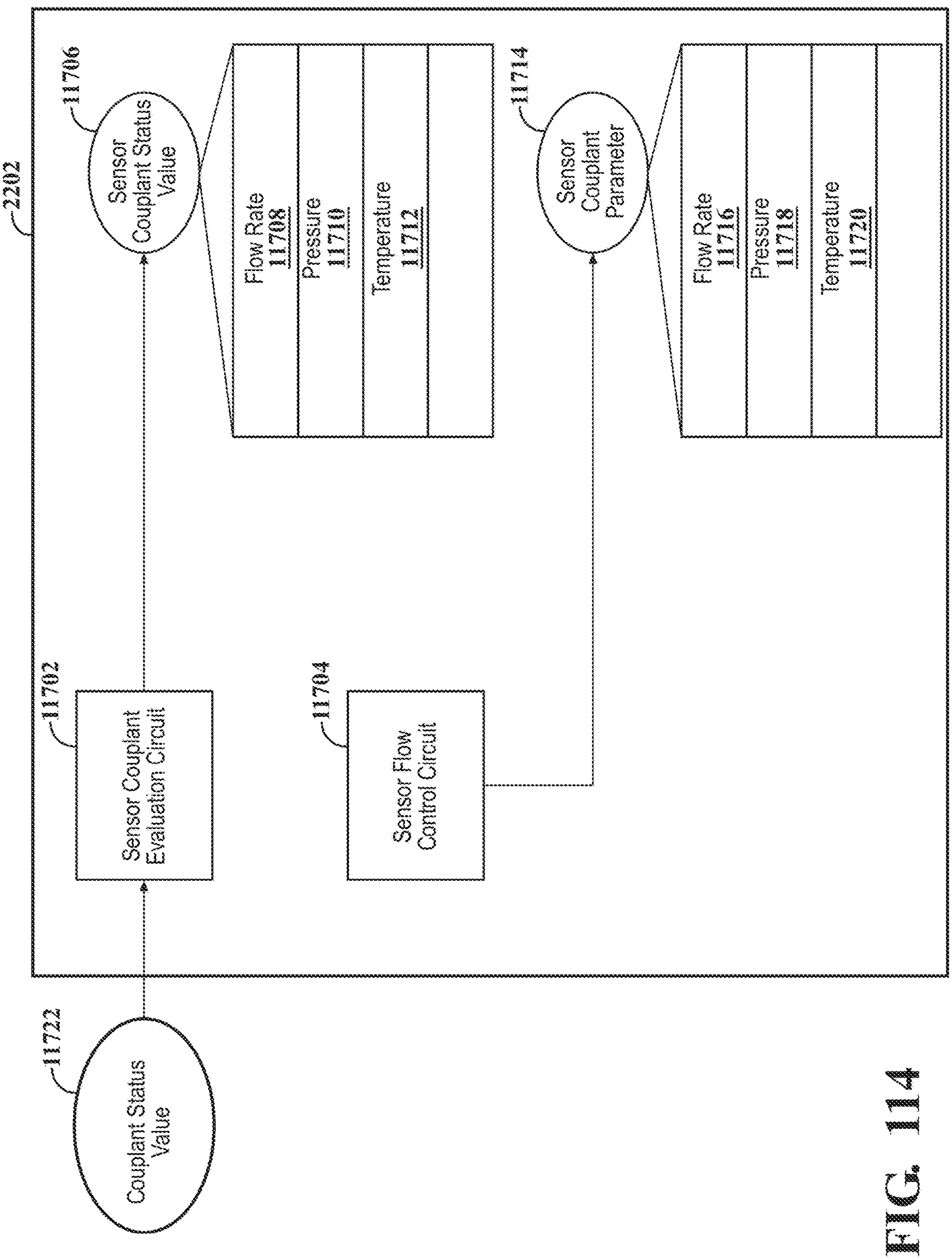

Turning to FIG. 114, in embodiments, each of the plurality of acoustic sensors 2202 may include a sensor couplant evaluation circuit 11702 that provides a sensor couplant status value 11706. In embodiments, the sensor couplant status value 11706 may include a characteristic of the couplant, e.g., flow rate 11708, pressure 11710, temperature 11712 and/or any other characteristic suitable for managing flow of the couplant. The sensor couplant status value 11706 may be based at least in part on a couplant status value 11722 interpreted by the sensor couplant evaluation circuit 11702. The couplant status value 11722 may include a characteristic of the couplant flowing to the sensor 2202 from the payload 2, e.g., pressure, flow rate, temperature and/or any other characteristic suitable for managing the couplant to the payloads 2.

In embodiments, each of the plurality of acoustic sensors 2202 may include a sensor flow control circuit 11704 operative to control a sensor couplant parameter 11714 of the couplant flowing to a corresponding one of the plurality of acoustic sensors 2202. The sensor couplant parameter 11714 may include a characteristic of the couplant, e.g., flow rate 11716, pressure 11718, temperature 11720 and/or any other characteristic suitable for managing flow of the couplant. In embodiments, the sensor flow control circuit 11704 may control the sensor couplant parameter 11714 in response to the sensor couplant status value 11706 for the corresponding acoustic sensor 2202.

Accordingly, in operation according to certain embodiments, external couplant is received from an external couplant source at the external couplant interface 11818 of the base station 4902. The base station 4902 may then condition the couplant, e.g., control temperature, pressure and/or flow rate, and pump the couplant to the chassis of the inspection robot 100 via the tether. The couplant may then be received by a reservoir and/or a manifold on the chassis of the inspection robot 100 where it may be further conditioned and distributed to the payloads 2 via the output couplant interfaces 11602. Each payload 2 may then receive and further condition the couplant before distributing the couplant to the sensors 2220. The sensors 2202, in turn, may further condition the couplant prior to introducing the couplant into the coupling chamber. As will be appreciated, conditioning the couplant at multiple points along its path from the couplant source to the coupling chamber provides for greater control over the couplant. Further, having multiple conditioning points for the couplant provides for the ability to tailor the couplant to the needs of individual payloads 2 and/or sensors 2202, which in turn, may provide for improved efficiency in the quality of acquired data by the sensors 2202. For example, a first payload 2 of the inspection robot 100 may be positioned over a portion of the inspection surface that is bumpier than another portion which a second payload 2 of the inspection robot 100 may be positioned over. Accordingly, embodiments of the system for managing couplant, as described herein, may increase the flow rate of couplant to the first payload independently of the flow rate to the second payload. As will be understood, other types of couplant characteristics may be controlled independently across the payloads 2 and/or across the sensor 2202.

Figure 115:
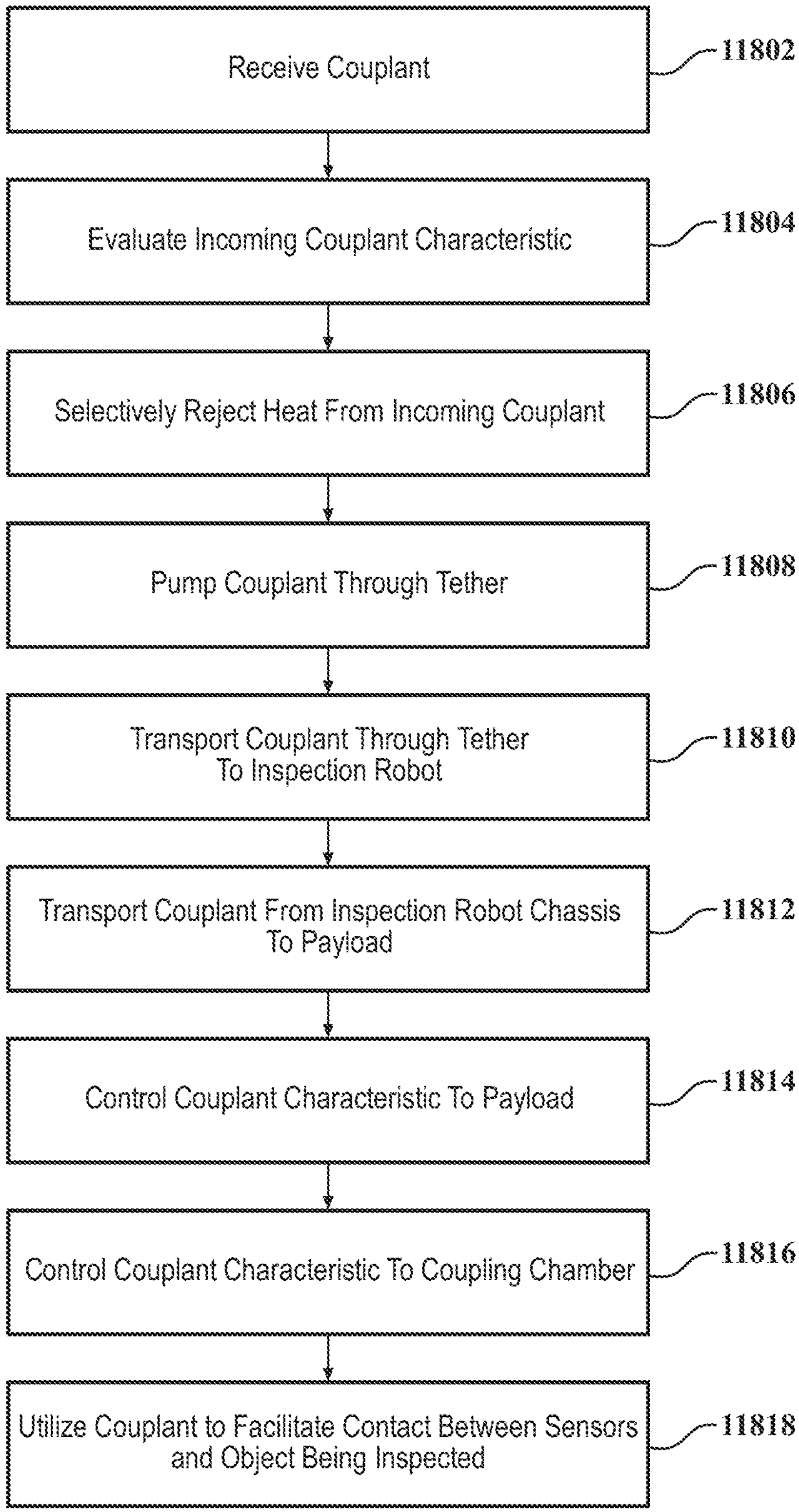

Illustrated in FIG. 115 is a method for managing couplant for an inspection robot 100. The method may include receiving couplant 11802, transporting 11810 the couplant to the inspection robot 100 and utilizing 11818 the couplant to facilitate contact between an acoustic sensor 2202 of a payload 2 and a corresponding object, e.g., inspection surface 500, being inspected by the inspection robot 100. In embodiments, the method may include evaluating 11804 an incoming couplant characteristic, e.g., a pressure, a flow rate, a temperature, and/or other characteristics suitable for managing the couplant. In embodiments, the method may further include selective rejecting heat 11806 from the received couplant before the transporting the couplant through the tether to the inspection robot 100. In embodiments, the method may include pumping 11808 the couplant through the tether and/or transporting 11810 the couplant through the tether to the inspection robot 100. The method may further include transporting 11812 the couplant from the chassis of the inspection robot 100 to one or more payload 2. In embodiments, the method may further include controlling 11814 a couplant characteristic to the payload 2. The couplant characteristic controlled to the payload 2 may be a pressure, temperature, flow rate and/or other characteristic suitable for managing the couplant. In embodiments, the method may further include controlling 11816 a couplant characteristic to a coupling chamber positioned between the acoustic sensor and the corresponding object. The couplant characteristic controller to the coupling chamber may be a pressure, temperature, flow rate and/or other characteristic suitable for managing the couplant. In embodiments, the method may further include utilizing 11818 couplant to facilitate contact between sensors and object being inspected.

Figure 116:
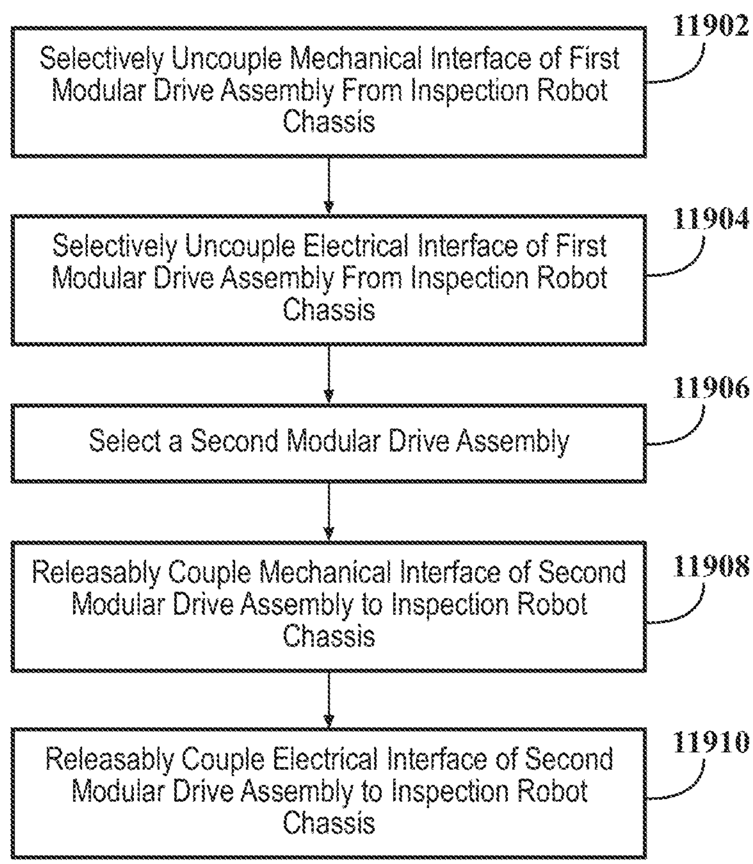

Turning now to FIG. 116, a method for coupling drive assemblies to an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example methods depicted in FIGS. 116-118. In certain embodiments, the inspection robot 100 may have one or more payloads 2 (FIG. 1) and may include one or more sensors 2202 (FIG. 5) on each payload. In embodiments, the inspection robot 100 may have one or more modular drive assemblies/modules 4918.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

Figure 120:
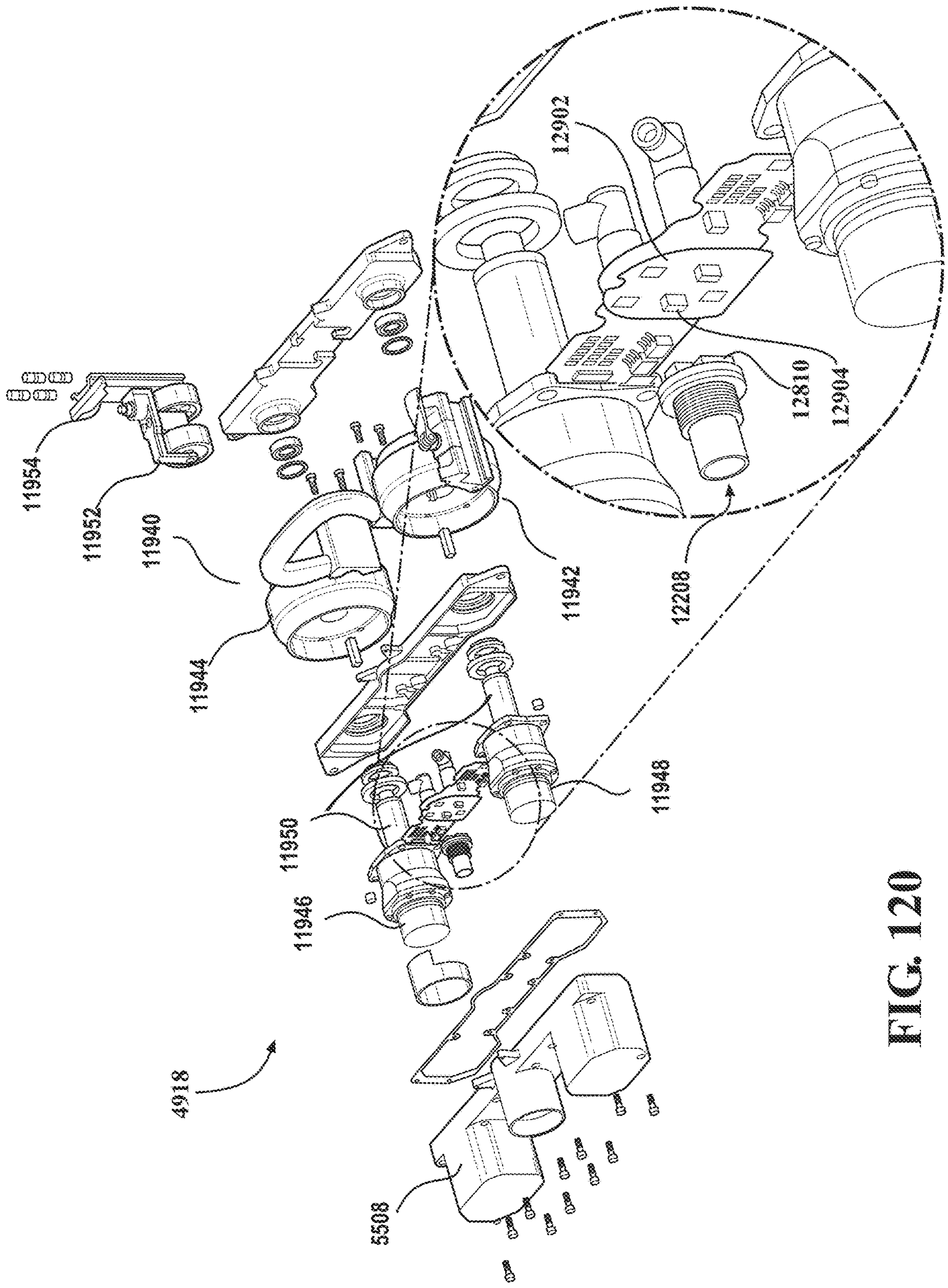

Referencing FIG. 120, a modular drive assembly 4918 may include a body 11940, at least two wheels 11942 and 11944 mounted to the body 11940, and/or a connector (e.g., reference FIG. 125). As shown in FIG. 125, the connector may include an electrical interface (e.g., 12810) and a mechanical interface (e.g., 12802, 12804). The electrical interface electrically communicates with a control module 802 of the inspection robot 100 and the mechanical interface releasably couples to the body 11940 to a chassis of the inspection robot 100. In embodiments, the drive assembly 4918 may include one or more drive motors 11946 and 11948 coupled to the wheels 11942 and 11944, e.g., via drive shafts 11950. As will be understood, in embodiments, each drive motor 11946 and 11948 are independently controllable. In other words, drive motor 11946 is controllably independently of drive motor 11948.

In embodiments, the wheels 11942 and/or 11944 may be magnetic, and the drive motors 11946 and 11948 may be shielded from electromagnetic interference arising from the wheels 11942 and/or 11944. Shielding of the drive motors 11946 and/or 11948 may be provided by shielding assemblies (e.g., shield 5508, reference FIG. 55).

In embodiments, the drive assembly 4918 may include one or more encoders, which may be a sensor (e.g., an electromagnetic based sensor such as a Hall effect sensor) positioned in proximity to the drive motor (e.g., on top of drive motor 11946 such that the shield covers the sensor when installed), and/or a passive wheel and/or contact-based encoder 11952. The encoder(s) may be operative or provide a position of the inspection robot 100 (e.g., by providing distance and/or direction information of the inspection robot, which may be accumulated for a dead reckoning position determination, and/or combined with other position information to determine the position of the inspection robot). Accordingly, in embodiments, the encoders may provide for a relative position determination (e.g., along a portion of the inspection surface, relative to a baseline position, relative to a starting position, and/or travel since a last absolute position determination, a distance and/or direction based position, and/or a dead reckoning position of the inspection robot 100. In embodiments, the encoders may provide for an absolute position determination. An absolute position may be the position of the inspection robot 100 with respect to a known reference, e.g., the center of the inspection surface 500, a position within a defined facility coordinate system, and/or a global positioning system (GPS) coordinate. The relative and/or absolute positions may provide for cartesian, polar and/or spherical coordinates. For cartesian coordinates, all three axes, x, y and z, may be provided. In certain embodiments, the position (relative and/or absolute) may be determined according to any conceptualization of coordinate system and/or axes as set forth throughout the present disclosure.

In embodiments, the modular drive assembly 4918 may include a biasing assembly 11954 coupled to the encoder 11952, wherein the biasing assembly 11954 biases the encoder 11952 towards the inspection surface 500. In embodiments, the biasing assembly 11954 may include a spring, permanent magnet, electromagnet and/or other suitable devices. The example biasing assembly 11954 ensures contact of the passive encoder wheel with the inspection surface at least through a selected range of motion, allowing for accurate travel information from the coder in response to deviations in the inspection surface, slippage of a drive wheel of the drive module, or the like. Referencing FIG. 54A, 54B, an example articulation of the biasing assembly 11954 for an example encoder is depicted.

In embodiments, the modular drive assembly 4918 may include an encoder operatively coupled to one of the drive motors 11946 and/or 11948. As will be understood, the encoder may provide for a relative and/or absolute position of the inspection robot 100 by directly measuring the number of rotations of the wheels 11942 and/or 11944 coupled to the motors 11946 and/or 11948.

In embodiments, the modular drive assembly 4918 may include a payload actuator 6072 (FIG. 60) coupled to the body of the drive module at a first end 6074, and having a payload coupling interface at a second end 6076. In embodiments, the payload actuator 6072 adjusts a down force of a payload relative to an inspection surface 500, and/or is configured to raise and/or lower the payload.

Figure 117:
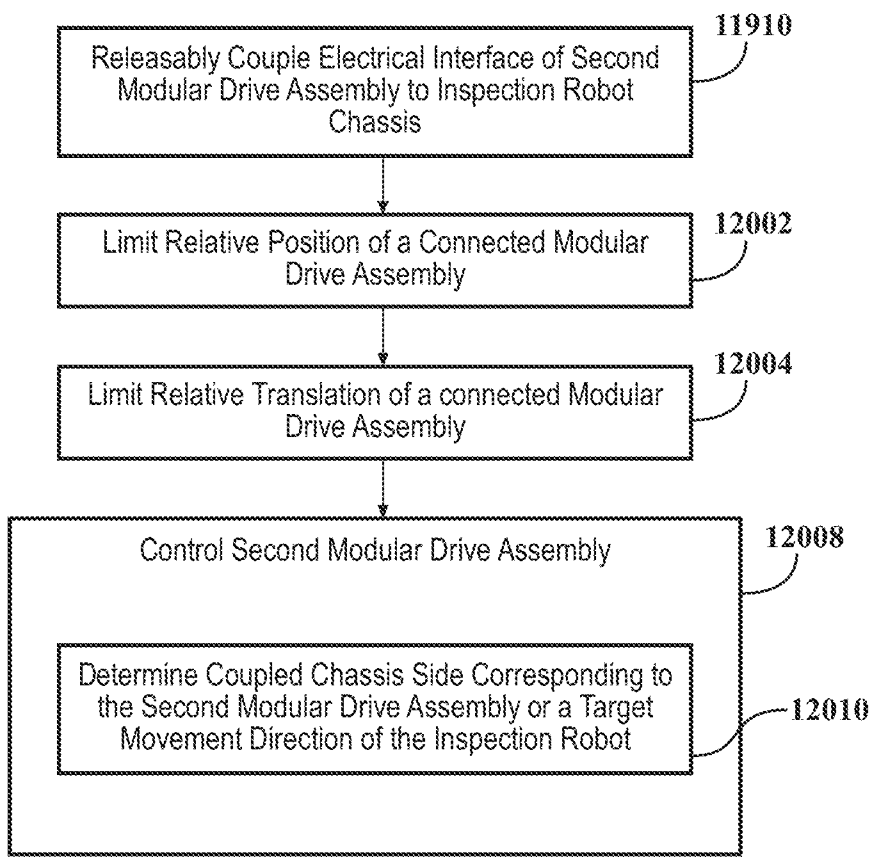

Accordingly, as shown in FIGS. 116 and 117, a first method may include selectively uncoupling a first mechanical interface 11902 and a first electrical interface 11904 of a first connector of a first modular drive assembly from a drive module interface of a chassis of the inspection robot 100. The method may further include selecting 11906 a second modular drive assembly having a second connector. In embodiments, the method may further include releasably coupling a second mechanical interface 11908 and a second electrical interface 11910 of the second connector to the drive module interface of the chassis of the inspection robot. The first and the second electrical interfaces may include electrical power and control connections for the respective modular drive assembly, and the first and second mechanical interfaces may mechanically couple the respective modular drive assembly. In embodiments, the first and the second modular drive assemblies each have at least two wheels positioned to be in contact with the inspection surface when the inspection robot is positioned on the inspection surface. In embodiments, at least one wheel of the second modular drive assembly has a different wheel configuration than at least one corresponding wheel of the first modular drive assembly. In embodiments, the first mechanical interface may include a first rotation limiter (e.g., reference FIGS. 64, 66A, and 66B), and/or wherein the second mechanical interface includes a second rotation limiter. In such embodiments, the method may further includes limiting 12002 a relative rotation/position of a connected modular drive assembly in response to the respective coupled rotation limiter.

In embodiments, the first mechanical interface includes a first translation limiter 6402 (reference FIG. 64), such as a piston stop, wherein the second mechanical interface includes a second translation limiter, e.g., a piston stop. In such embodiments, the method may further include limiting 12004 a relative translation of a connected modular drive assembly in response to the respective coupled translation limiter. In certain embodiments, only one, or neither, of the drive modules is coupled to the chassis with the ability to translate and/or rotate relative to the chassis.

In embodiments, the method my further include selectively controlling 12008 the second modular drive assembly in one of a first direction or a second direction. In embodiments, selectively controlling 12008 may include determining 12010 one of a coupled chassis side corresponding to the second modular drive assembly or a target movement direction of the inspection robot.

Figure 118:
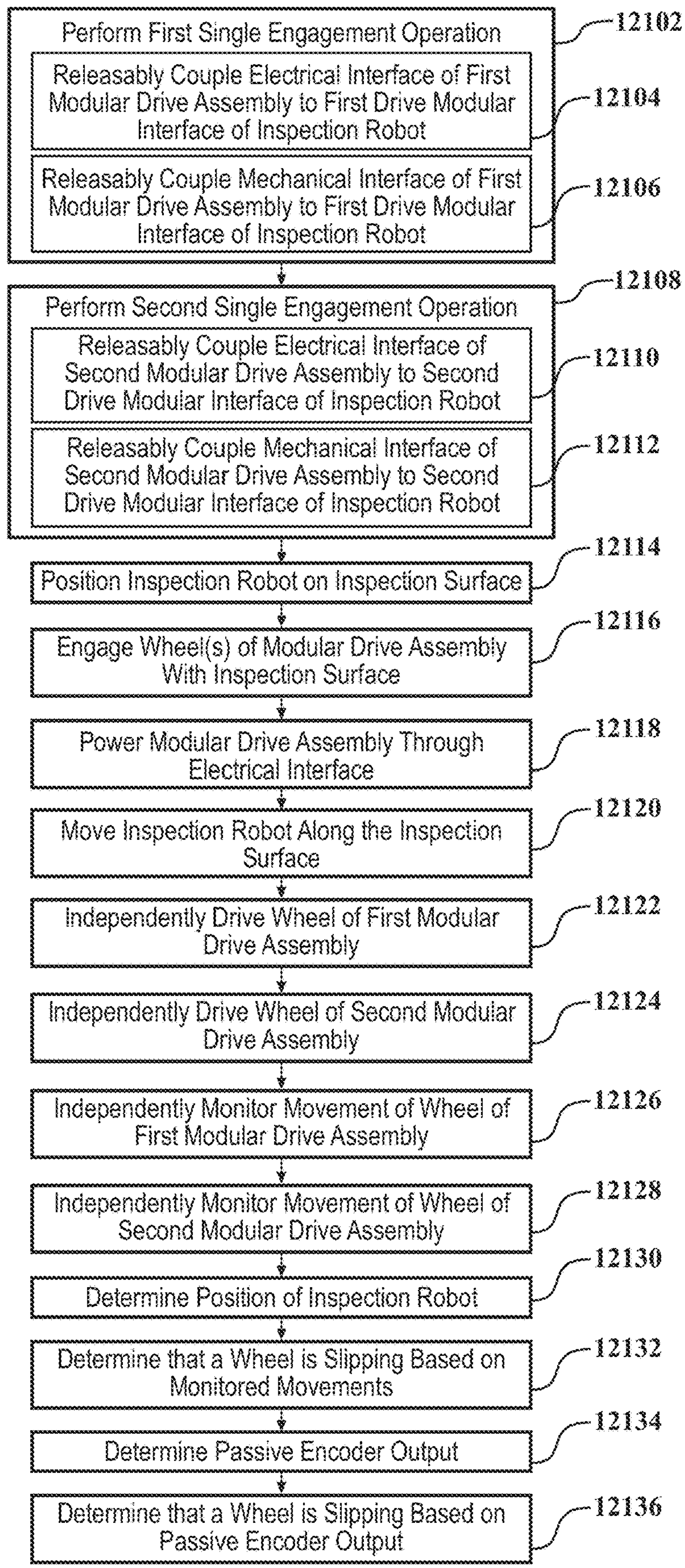

Turning to FIG. 118, another method includes releasably coupling 12102 an electrical interface and a mechanical interface of a modular drive assembly to a drive module interface of the inspection robot; positioning 12106 the inspection robot on the inspection surface, thereby engaging at least one wheel of the modular drive assembly with the inspection surface; and powering 12108 the modular drive assembly through the electrical interface, thereby controllably moving the inspection robot along the inspection surface. In embodiments, releasably coupling 12102 the electrical interface and the mechanical interface may include performing 12104 a single engagement operation. In embodiments, the method may further include limiting 12114 a relative rotation between the modular drive assembly and a chassis of the inspection robot through the mechanical interface. In embodiments, the method may further include limiting 12116 a translation movement between the modular drive assembly and a chassis of the inspection robot through the mechanical interface. In embodiment, the method may further include releasably coupling 12118 an electrical interface and a mechanical interface of a second modular drive assembly to a second drive module interface of the inspection robot. In such embodiments, the drive module interface may be positioned on a first side of a chassis of the inspection robot, and the second drive module interface may be positioned on a second side of the chassis of the inspection robot. In embodiments, controllably moving 12108 the inspection robot on the inspection surface may include independently driving 12110 the at least one wheel of the modular drive assembly and at least one wheel of the second modular drive assembly. In embodiments, the method may further include independently monitoring 12120 movement of the at least one wheel of the modular drive assembly and the at least one wheel of the second modular drive assembly. In embodiments, the method may further include determining 12122 a position of the inspection robot based at least in part on the monitored movements of the one or more wheels. In embodiments, the method may further include determining 12124 that at least one of the at least one wheel of the modular drive assembly and/or the at least one wheel of the second modular drive assembly is slipping with respect to the inspection surface based at least in part on the monitored movement of the one or more wheels. In embodiments, the method may further include determining 12126 a passive encoder output from a passive encoder associated with one of the modular drive assembly or the second modular drive assembly. In such embodiments, determining 12124 that at least one of the at least one wheel of the modular drive assembly or the at least one wheel of the second modular drive assembly is slipping with respect to the inspection surface may be based at least in part on the passive encoder output.

As will be appreciated, embodiments of the modular drive assemblies disclosed herein may provide for the ability to quickly swap out wheel configurations for the inspection robot. For example, a first modular drive assembly having wheels with a first shape corresponding to a first portion of an inspection surface (or the surface as a whole) may be switched out with another modular drive assembly having wheels with a shape corresponding to a second portion of the inspection surface (or a second inspection surface). For example, a first modular drive assembly may be used to inspect a first pipe having a first curvature and a second modular drive assembly may be used to inspect a second pipe having a second curvature.

Turning now to FIGS. 125 and 126, an example connector for connecting a drive module and an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example connector depicted in FIGS. 125 and 126. In certain embodiments, the inspection robot 100 may have one or more payloads 2 (FIG. 1) and may include one or more sensors 2202 (FIG. 5) on each payload.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

In embodiments, the connector 12800 includes a body, having a first portion 12802 and a second portion 12804 having a first end 12806 and a second end 12808. The first end 12806 operatively couples with a drive module 4918 and the second end 12808 operatively engages a chassis of the inspection robot 100. In embodiments, a first portion 12802 of the connector body may rotate with respect to the chassis while a second portion 12804 of the connector body remains stationary with respect to the chassis. The connector body portions 12802, 12804 may be made of metals, alloys, plastics and/or other suitable materials.

The connector 12800 may further include an electrical component 12810 and a mechanical component 12816. The electrical component 12810 may operatively couple an electrical power source from the chassis to an electrical power load of the drive module 4918. The electrical component 12810 may also provide electrical data communications between a controller 802 positioned on the chassis and at least one of a sensor 2202, an actuator, and/or a drive controller positioned on the drive module 4918. As can be seen in FIGS. 125 and 126, the electrical component 12810 may include two interlocking portions each having one or more pins/teeth. As will be understood, embodiments of the connector 12800 may utilize additional forms of electrical connections for completing the transfer of power and/or communicating with the drive modules 4918. For example, referring briefly to FIG. 127, in embodiments, the electrical component 12810 may mate with a daughter board 12904 Returning back to FIGS. 125 and 126, the mechanical component 12816 may be defined, at least in part by the connector body portions 12802 and/or 12804 and releasably couple the first portion of the connector body 12802 and/or the second portion of the connector body 12804 to the inspection robot chassis.

In embodiments, the first portion of the connector body 12802 may include a wall 12814 that defines, at least in part, the mechanical component 12816. The first portion of the connector body 12802 and/or the second portion of the connector body 12804 may also include an inner cavity 12812 defined, at least in part, by the wall 12814. In embodiments, the electrical component 12810 may be disposed within the cavity 12812. As further shown in FIGS. 125 and 126, in embodiments, the electrical component 12810 may be positioned coaxially within the mechanical component 12816, e.g., longitudinally centered along the same axis 12818 (FIG. 126), such that engagement of the drive module 4918 with the mechanical component 12816 simultaneously engages the electrical component 12810. As will be appreciated, disposing the electrical component 12810 within the center of the mechanical component 12816 reduces the risk that the electrical component 12810 will be damaged as the first end 12806 of the body rotates in relation to the chassis. For example, in embodiments, various electrical cables that complete the electrical and/or data communications from the electrical component 12810 to the chassis need not rotate with the second portion 12802 of the body, thereby decreasing the amount of stress on the cables and/or the likelihood that they will become severed.

In embodiments, the mechanical component 12816 may include a fixed rotation limiter 6602 and 6404 that limits rotation of the body 12802 with respect to the chassis. Without limitation to any other aspect of the present disclosure, fixed rotation limiter 6602 and 6404, as set forth throughout the present disclosure, including any features or characteristics thereof, is contemplated for the example connector depicted in FIGS. 125 and 126. In embodiments, the fixed rotation limiter may include a slot 6404 and a tongue 6602 as disclosed herein and best seen in FIGS. 66A, 66B. In embodiments, the slot 6404 may be disposed in the second portion 12804 of the body and the tongue 6602 may be disposed in the first portion 12802 of the body. In embodiments, the slot 6404 may be disposed in the first portion 12802 of the body and the tongue 6602 may be disposed in the second portion 12804 of the body.

In embodiments, a distribution of degrees of the rotation of the body 12802 with respect to the chassis is symmetrical about an inspection position, as seen in FIG. 130. In embodiments, the inspection position may include a nominal alignment of the drive module 4918 with the chassis when the inspection robot 100 is positioned on an inspection surface 500. Accordingly, in embodiments, the fixed rotation limiter 6602 and 6404 may limit the degrees of rotation to within about +20 degrees to about −20 degrees from the inspection position. In embodiments, the distribution of degrees of the rotation of the body 12802 with respect to the chassis is asymmetrical about an inspection position as best seen in FIG. 131. In embodiments, the fixed rotation limiter 6602 limits the degrees of rotation to within about +5 degrees to about −15 degrees from the center point. In embodiments, the mechanical component 12816 may include a translation limiter 6402, e.g., a piston stop defined in part by the wall 12814, that limits translation of the body 12802 with respect to the chassis.

Illustrated in FIG. 128 is a method for operating an inspection robot having a drive module. In embodiments, the method includes providing 13002 a drive command to a drive module through an electrical component of a connector. The connector may be coupled to the drive module at a first end and coupled to a chassis of the inspection robot at a second end. The method may further include providing 13010 electrical power through the electrical component of the connector to a motor of the drive module. The method may further include limiting 13012 a rotation of the drive module with respect to the chassis, and/or a limiting 13014 translation of the drive module with respect to the chassis. In embodiments, limiting 13012 the rotation of the drive module with respect to the chassis may include engaging 13016 a slot of an outer wall of the connector with a tongue of the chassis. As will be understood, in other embodiments, the tongue may be disposed on the outer wall of the connector and the slot may be disposed on the chassis. In embodiments, limiting 13012 the rotation of the drive module with respect to the chassis may include symmetrically limiting 13018 the rotation from an inspection position, the inspection position having a nominal alignment of the drive module with the chassis when the inspection robot is positioned on an inspection surface. In embodiments, limiting 13012 the rotation of the drive module with respect to the chassis may include asymmetrically limiting 13020 the rotation from an inspection position, the inspection position having a nominal alignment of the drive module with the chassis when the inspection robot is positioned on an inspection surface. In embodiments, asymmetrically limiting 13020 the rotation from the inspection position may include allowing 13022 a greater negative rotation than a positive rotation. In embodiments, asymmetrically limiting 13020 the rotation from the inspection position may include allowing 13024 a greater positive rotation than a negative rotation. In embodiments, limiting 13014 the translation of the drive module with respect to the chassis may include engaging 13026 a piston stop of an outer wall of the connector with a translation stop engagement of the chassis. In embodiments, providing a drive command to the drive module comprises determining an orientation of the drive module, and providing the drive command in response to the orientation of the drive module and a target movement direction of the inspection robot.

Turning to FIG. 130, another method for connecting a drive module to an inspection robot may include coupling 13406 a drive module to a mechanical component, the mechanical component defined, at least in part, by a body of a connector for the drive module to a chassis of the inspection robot. The method may further include coupling 13048 the drive module to an electrical component, thereby coupling a power source from the chassis to an electrical power load of the drive module, and further providing electrical communication between a controller positioned on the chassis and at least one of a sensor, an actuator, or a drive controller positioned on the drive module. The method may further include coupling at least one of a rotation limiter 13042 and/or a translation limiter 13044, the rotation limiter structured to limit rotation of the body with respect to the chassis, and the translation limiter structured to limit translation of the body with respect to the chassis. In embodiments, coupling 13046 the drive module to the mechanical component and the coupling 13048 the drive module to the electrical component may include engaging the drive module to the connector in a single operation 13040, e.g., a single step and/or process. In embodiments, coupling 13042 the rotation limiter may include engaging 13050 a slot at least partially defined by the wall with a tongue of the chassis. As will be understood, the slot may be of the chassis and the tongue may be defined in part by the wall. In embodiments, coupling 14044 the translation limiter may include engaging 13052 a piston stop at least partially defined by the wall with a translation stop engagement of the chassis.

Figure 119:
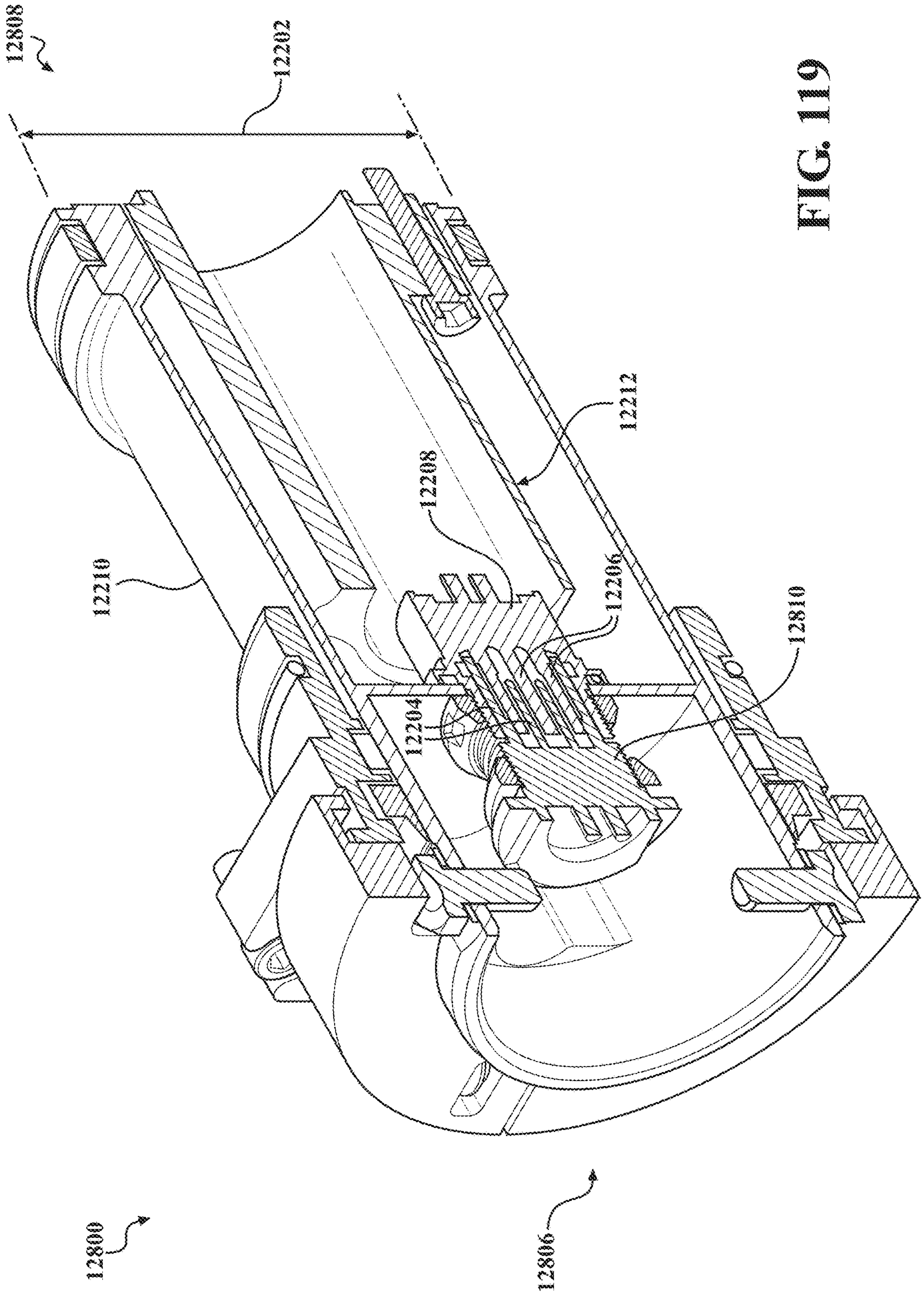

Referencing FIG. 119, an example connector 12800 for drive module to an inspection robot is depicted. The example connector 12800 includes a body having a first end 12808 and a second end 12806, where the first end 12808 is couplable to a chassis of an inspection robot, and where the second end 12806 is couplable to a drive module 4918 of the inspection robot. In certain embodiments, portions of the connector 12800 may be positioned on the chassis and/or the drive module 4918, and/or portions of the connector 12800 may be integral with the chassis and/or the drive module 4918. The example connector 12800 includes the body having a wall 12210 that defines, at least in part, a cavity. The example of FIG. 119 further includes a mechanical component 12212 defined, at least in part, by the wall 12210, that selectively and releasably couples the body to the chassis of the inspection robot at the first end 12808. In the example of FIG. 119, the body includes the wall 12210 and is a fixed outer portion of the connector 12800 coupled to the chassis, and the mechanical component 12212 is a sliding inner portion of the connector 12800. However, the portion of the connector that is sliding or fixed is non-limiting, and the body and mechanical component 12212 may be reversed in this aspect. Additionally, the portion of the connector 12800 that is coupled to the drive module or the chassis is non-limiting, and the body and the mechanical component 12212 may also be reversed in this aspect. The connector 12800 further includes an electrical component 12810 disposed in the cavity, where the electrical component 12810 couples an electrical power source from the chassis to an electrical power load (e.g., a motor, sensor, actuator, etc.) of the drive module, and further provides electrical communication between a controller positioned on the chassis, and a drive controller positioned on the drive module. In certain embodiments, the electrical component 12810 further provides electrical communication between the controller positioned on the chassis and at least one sensor positioned on the drive module. The sensor includes one or more sensors such as: a position sensor operationally coupled to the drive controller, an encoder operationally coupled to the drive controller or a driven wheel of the drive module, and/or a passive encoder operationally coupled to a wheel in contact with the inspection surface. In certain embodiments, the electrical component 12810 further provides electrical communication between the controller positioned on the chassis and an actuator positioned on the drive module, such as a payload actuator and/or a stability assist device actuator.

An example connector 12800 further includes the body having a slot defined, at least in part, by the wall 12210 that receives a tongue of the chassis and/or mechanical component 12212 (e.g., reference FIG. 129, with tongue 6602 and slot defined by first end 13110 and second end 13112). The position of the tongue and the slot may be reversed, for example with the wall 12210 defining the slot and the chassis and/or mechanical component 12212 having the tongue. The tongue and slot provide for rotation allowance between the drive module and the chassis, while also providing for rotation limiting therebetween. In certain embodiments, the tongue and slot may be utilized to enforce a fixed rotational position of the drive module and the chassis. In certain embodiments, a rotation of a first drive module on a first side of the chassis may be limited to a first value, and/or fixed rotationally, while the rotation of the second drive module on a second side of the chassis may be limited to a second value, and/or fixed rotationally.

The example connector 12800 further includes a piston stop limiter 6402 (reference FIG. 125) that allows for translation of the drive module relative to the chassis (e.g., movement closer to or further from the chassis), but limits the amount of extension and/or proximity between the drive module and the chassis. The piston stop limiter 6402 may be positioned on the wall 12210 and/or the mechanical component 12212 to limit sliding of the mechanical component 12212 relative to the body and/or the chassis, and/or to limit sliding of the wall 12210 relative to the mechanical component 12212 and/or the chassis.

The example connector 12800 further includes the electrical component 12810 having an electrical connector interface that couples with a chassis connector 12208 and/or a drive module connector. In certain embodiments, the drive module includes the electrical component 12810 coupled thereto (reference FIG. 120), and/or the electrical component 12810 couples to a control board 12902 (or drive module daughter board) of the drive module, for example at break-out board 12904. An example electrical connector interface includes at least two prongs 12204 that interlock with at least two prongs 12206 of the chassis connector 12208.

Figure 121:
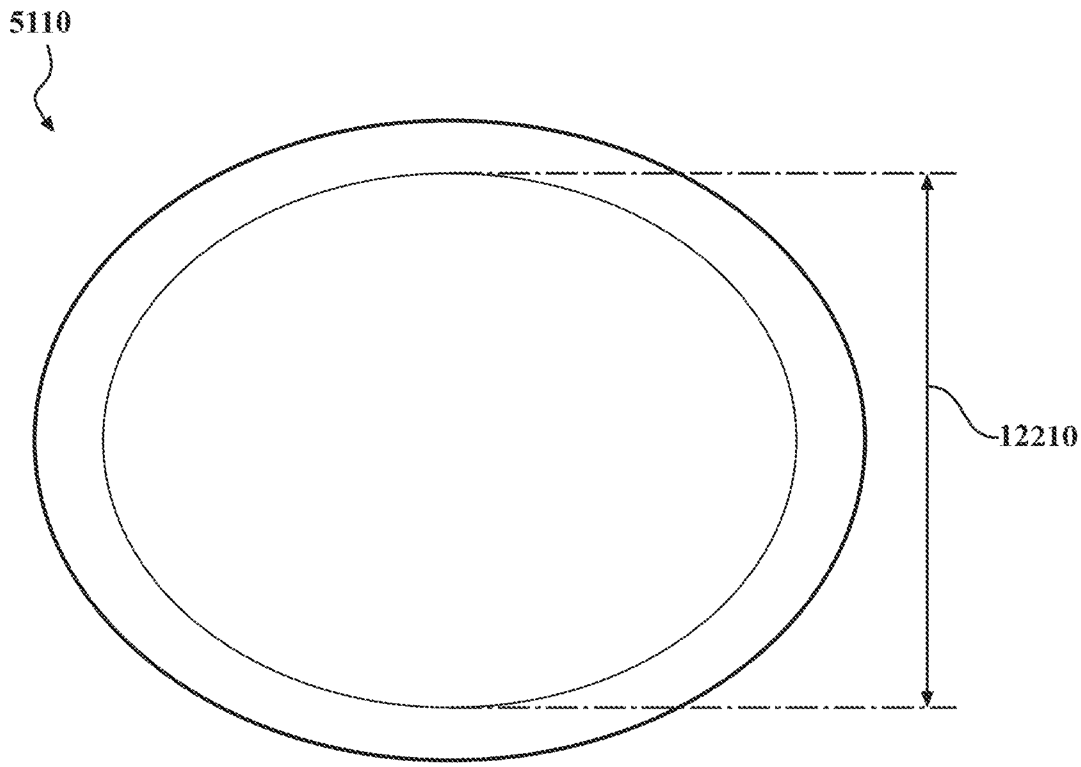

An example connector 12800 further includes the mechanical component 12212 disposed on a connecting portion of the body having a cross-sectional area that is less than a cross-section area of a connection port 5110 (reference FIG. 52) on the chassis, where the mechanical component 12212 further selectively couples and releases to the chassis inside of the connection port 5110. An example connector 12800 further includes the electrical component 12810 interlocking with the chassis connector 12208 inside the connection port 5110, and/or inside the connection port 5110 in a position of the drive module that is translated close to the chassis. Referencing FIG. 121, an example connector 12800 includes the body of the connector 12800 (e.g., the wall 12210) having a cross-sectional profile that is circular, rectangular, or triangular.

Figure 67A:
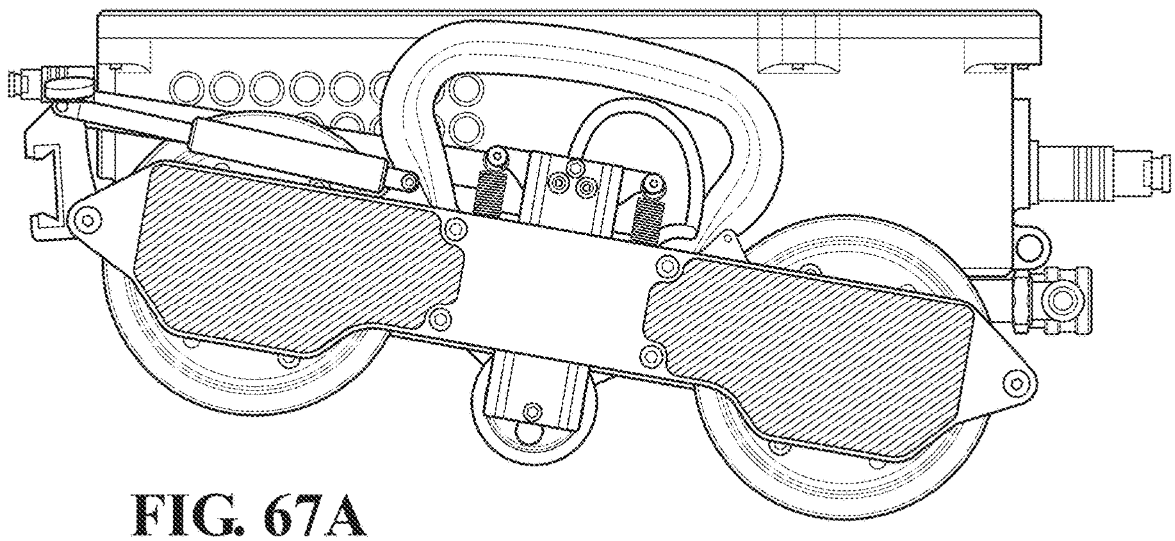
FIGS. 67A-67B depicts two side views of a drive module rotated relative to the center module.
Figure 67B:
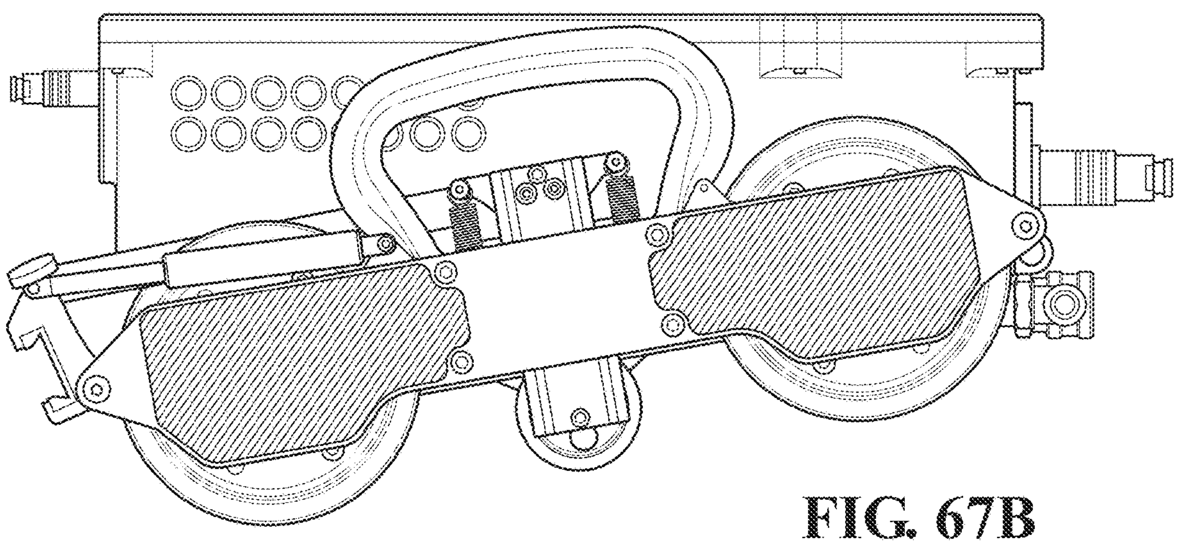
Figure 122:
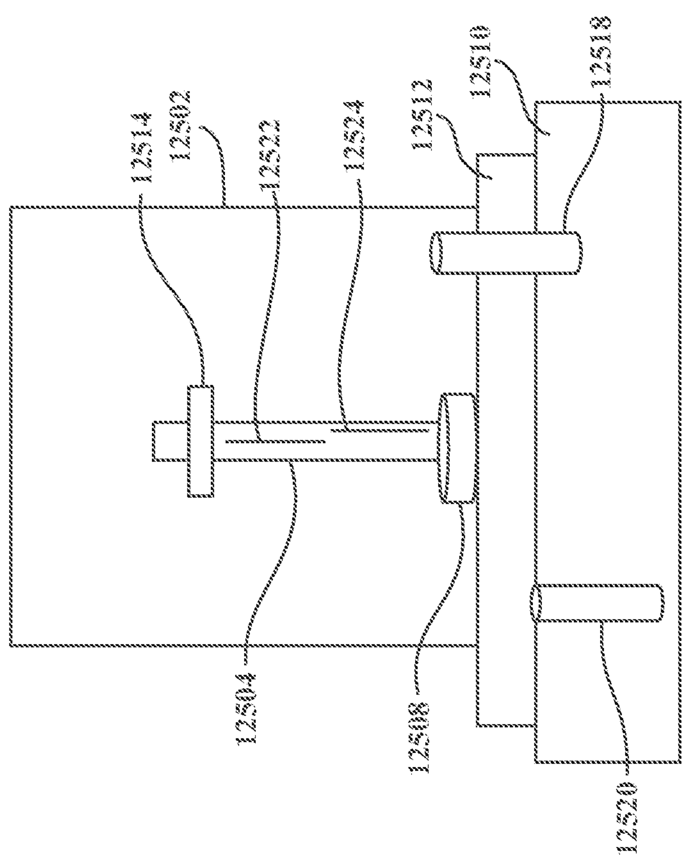

The depiction of FIGS. 122, 123 is a non-limiting schematic depiction to illustrate components present in certain embodiments. Certain embodiments may include additional drive modules coupled to the chassis, and/or coupled at different positions relative to the chassis. The position and arrangement of the drive modules to the center chassis may be according to any aspect of the present disclosure, for example including side mounted drive modules having forward and rearward wheels (e.g., reference FIG. 51, 52 having mounting ports 5110 for drive modules, such as a drive module 6000 referenced at FIG. 60). An example rotation orientation of the drive module to the chassis is depicted at FIGS. 67A, 67B).

In an embodiment, and referring to FIG. 122 which depicts an inspection robot, the inspection robot may include a center chassis 12502 including a drive piston 12504 comprising a drive module interface 12508, wherein the drive piston 12504 in a first position places the drive module interface 12508 closest to the center chassis 12502, wherein the drive piston 12504 in a second position places the drive module interface 12508 farthest from the center chassis 12502, and wherein the drive piston 12504 is translatable between the first position and the second position; a drive module 12510, selectively coupled to the drive module interface 12508, and structured to move the center chassis 12502 across an inspection surface; and a drive suspension 12512 pivotally coupling the drive piston 12504 to the drive module 12510. In embodiments, the drive piston 12504 may include a translation limiter 12514 structured to define the second position. The robot may further include a rotation limiter 12518 structured to limit a rotation of the drive module 12510 relative to center chassis 12502. In embodiments, the rotation limiter 12518 may include a slot on an axis, and wherein the drive piston 12504 may be coupled to the axis. The rotation limiter 12518 may limit a rotation of the drive module 12510 relative to the center chassis 12502 to approximately −10 degrees to +10 degrees. The rotation limiter 12518 may limit a rotation of the drive module 12510 relative to the center chassis 12502, wherein the rotation is unequally distributed relative to 0 degrees. The drive module 12510 may further include a bias spring 12520 structured to bias the drive module 12510 to a desired rotation relative to the center chassis 12502. In an embodiment, an interior of the piston 12504 may include a power connector 12522 structured to transfer power between the center chassis 12502 (aka center module) and the drive module 12510; and a communications connector 12524 structured to transfer digital data between the center chassis 12502 and the drive module 12510.

In an embodiment, and referring to FIG. 123, a system may include a robot body 12602 including a first drive piston 12604 operably couplable to a first one of a plurality of drive modules 12610, second drive piston 12608 operably couplable to a second one of the plurality of drive modules 12612 a first drive module 12610 structured to move the robot body 12602 across an inspection surface, a second drive module 12612 structured to move the robot body 12602 across the inspection surface first drive suspension 12628 coupling the first drive piston 12604 to the first drive module 12610, and a second drive suspension 12630 coupling the second drive piston 12608 to the second drive module 12612. In an example system, the first drive suspension 12628 is rotationally coupled to the first drive module. An example system includes the second drive module rotationally fixed relative to the second drive piston 12608. An example system includes the second drive suspension 12630 rotationally coupled to the second drive module. In certain embodiments, allowing one or both of the first or second drive module to translate relative to the chassis allows for the inspection robot to comply with variations in the inspection surface. In certain embodiments, allowing for both drive modules to translate may enhance the compliance capability, and/or provide for an improved ability to maintain a payload and/or inspection sensors at a target horizontal position. In certain embodiments, allowing for only one of the drive modules to translate may enhance the stability of the robot on the inspection surface, and/or make handling of the robot easier for an operator.

In certain embodiments, one or more of the drive pistons, including drive pistons configured for translation, includes a translation limiter, such as any translation limiter as set forth in the present disclosure. An example system includes the interior of each drive piston including a power connector structured to transfer power between the robot body and a corresponding drive module and a communications connector structured to transfer digital data between the robot body and the corresponding drive module (e.g., reference FIG. 119). An example system includes one or more of the drive modules including an encoder 16232 (e.g., reference FIG. 120). An example system includes payload 12634 having a plurality of sensors 12638 structured to collect data about an inspection surface, and a payload controller 12640 structured to transmit data to the robot body via the communications connector.

Referencing FIG. 124, an example procedure for operating a robot having a multi-function piston coupling a drive module to a center chassis is depicted. The example procedure includes an operation 12702 to translate a drive module to a selected distance from a robot body, an operation 12704 to allow the drive module to passively rotate relative to the center chassis (or robot body) based on the inspection surface, an operation to collect position data from an encoder of the drive module, and an operation 12712 to integrate the position data and inspection data (e.g., from sensors of a payload), thereby correlating the position data to the inspection data and creating position related inspection data.

In certain embodiments, the procedure further includes an operation 12714 to actively bias a rotation of the drive module relative to the center chassis, for example toward an inspection position, and/or toward a selected position. The example procedure further includes an operation 12718 to allow an encoder to passively rotate, and a procedure 12720 to bias the passively rotating encoder toward the inspection surface.

Referencing FIG. 129, an example rotation limiter 6606 for a drive assembly of an inspection robot is depicted. An example rotation limiter includes a slot disposed on a body structured to rotatably couple a drive module to a chassis of the inspection robot, and to engage a tongue of the chassis, and/or to engage a tongue of a connection member between the drive module and the chassis, where the connection member is rotatably fixed to the chassis. In the example of FIG. 129, the slot is defined by the first end 13110 and the second end 13112, where the ends 13110, 13112 prevent further rotation of the tongue 6602 in the respective direction. The position of the tongue and slot is non-limiting, and the tongue may be positioned on a rotating member while the slot is defined on a fixed member. Additionally or alternatively, the slot may be defined on an outer member, while the tongue is positioned on an inner member. In the example of FIG. 129, where the slot member 13102 rotates, rotation in a first direction 13114 is limited by interference of the second end 13112 with the tongue 6602, and rotation in the second direction 13116 is limited by interference of the first end 13110 with the tongue 6602. In the example of FIG. 129, where the tongue member rotates, rotation in the first direction 13114 is limited by interference of the tongue 6602 with the first end 13110, and rotation in the second direction 13116 is limited by interference of the tongue 6602 with the second end 13112. The first end 13110 may be defined by a first stopping member 13106 having a desired shape for engagement with the tongue 6602, and the second end 13112 may be defined by a second stopping member 13108 having a desired shape for engagement with the tongue 6602, such as a beveled shape. It can be seen that the selection of the stopping member 13106, 13108 positions relative to a baseline position of the tongue 6602, and further, to some extent, the size (or radial width) of the tongue, define the rotational limits enforced by the rotation limiter 6606.

An example rotation limiter 6606 includes the first end 13110 and the second end 13112 disposed at symmetrical distances from an inspection position, where the inspection position includes a nominal alignment of the drive module with the chassis when the inspection robot is positioned on an inspection surface. For example, where the chassis operates nominally in a level position on the inspection surface during inspection operations, the inspection position, and accordingly the baseline position for the tongue in the slot, is at a midway position between the first end 13110 and the second end 13112. In certain embodiments, the first end 13110 and the second end 13112 are positioned at about +/−20 degrees from the inspection position. A position that is about 20 degrees, and/or about any other degree value, as used herein, includes a position that allows 20 degrees of rotation before the tongue engages the respective end, and/or a position that is 20 degrees displaced from a center point of the tongue (e.g., allowing for a rotation of 20 degrees, less the width of the tongue that is positioned toward the respective stop from the center point of the tongue). Additionally or alternatively, a position that is about a specified number of degrees may vary from the specified number by tolerances due to the designed stopping member manufacturing, the designed tongue manufacturing, wear over time to the tongue and/or stopping member, allowances provided in the tongue and/or stopping member design to compensate for wear, uncertainties in the orientation of the inspection robot that determines the inspection position, variances in the inspection position due to configuration differences in payloads, stability assistance devices, and/or tether differences, variances in an inspection surface orientation (e.g., relative to a planned orientation which may be gravitationally vertical), variances in the installed rotational position of the tongue and/or stopping members, variances in the rotational position of the tongue and/or stopping members that occur due to service events or reconfiguration operations that remove and replace the tongue and/or the stopping members, and/or the stack-up of one or more of these tolerances. In certain embodiments, one or more of the tolerance differences described may be more prominent due to the characteristics of the system, and/or due to the importance of rotation limitation for the particular system in response to various condition affecting the rotation limiter tolerances. Additionally, the tolerance with regard to one rotating direction may be different than a tolerance with regard to the other rotating direction. Accordingly, one of skill in the art, having the benefit of the disclosure herein, and information ordinarily available when contemplating a particular system, can readily determine whether a given rotational difference is within the range of about a specified angle. Certain considerations for determining whether a given rotational difference is within the range of about a specified angle include the manufacturing materials and/or methods for fabricating rotation limiter components, installing rotation limiter components, servicing and/or changing rotation limiter components, the frequency at which rotation limiter components are expected to be serviced and/or reconfigured, the importance of rotation control in the first direction relative to the second direction, and/or the variability in payload configurations for the inspection robot. Without limitation to any of the foregoing, in certain embodiments, an angle that is within 1 degree of a stated range, within 10% of a stated range, and/or within an angular extent defined by the tongue member, is understood herein to be about equal to a specified angle.

In certain embodiments, the first end 13110 and the second end 13112 are positioned at about +/−15 degrees from the inspection position. In certain embodiments, the first end 13110 and the second end 13112 are positioned at about +/−10 degrees from the inspection position. In certain embodiments, the first end 13110 and the second end 13112 are positioned at about +/−5 degrees from the inspection position.

In certain embodiments, the first end 13110 and the second end 13112 are positioned asymmetrically with respect to the inspection position. In certain embodiments, the first end 13110 and the second end 13112 are positioned at about +5 degrees and at about −15 degrees from the inspection position. In certain embodiments, the first end 13110 and the second end 13112 are positioned asymmetrically with respect to the inspection position. In certain embodiments, the first end 13110 and the second end 13112 are positioned at about +15 degrees and at about −5 degrees from the inspection position.

Referencing FIG. 130, an example rotation limiter 6606 includes a body 13102 of the rotation limiter having the first stopping member 13106 and the second stopping member 13108 positioned thereon, where the first stopping member 13106 limits the rotation to a first angle $\varphi_1$ relative to an axis 13104 indicating an inspection position, and where the second stopping member 13108 limits the rotation to a second angle $\varphi_2$ relative to the axis 13104. In the example of FIG. 130, the stopping members 13106, 13108 define the slot on the body 13102. In certain embodiments, the body 13102 defines the tongue 6602 (e.g., reference FIG. 132), which engages a slot defined on a fixed member positioned for the slot to engage the tongue 6602 of the body. In certain embodiments, the body 13102 is fixed, and the engaging member, having the tongue 6602 in the example of FIG. 130, rotates. Referencing FIG. 131, an example rotation limiter 6606 depicts another embodiment having distinct rotation angle limits relative to the embodiment of FIG. 130.

An example rotation limiter 6606 includes a biasing member coupled to the drive module, where the biasing member rotationally biases the drive module. For example, the biasing member may biasingly couple the drive module to the housing of the chassis, urging the drive module (and/or chassis—for example when the drive module is fixed on the inspection surface) toward one of the first or second rotational directions. In certain embodiments, the biasing member(s) may urge the drive module toward a selected angle, which may be the inspection position angle, or a different angle. In certain embodiments, the biasing member may include a torsion spring rotatably coupled to the rotating member of the rotation limiter 6606, thereby urging rotation of the drive module in a specified direction.

Referring to FIG. 133, an inspection robot 13400 capable of traversing and inspecting uneven surfaces is schematically depicted. The inspection robot 13400 includes a center chassis 13410 having a least one payload 13402 pivotally mounted to the center chassis 13410. There may be additional payloads 13402, where each payload 13402 may include at least two arms 13404 operationally coupled to two inspection sensors 13408. The inspection sensors 13408 may include UT sensors, EMI sensors, and/or any other sensors including, without limitation, any sensors described throughout the present disclosure. During a given inspection run, the inspection sensors 13408 may be distinct from one another. There may be a payload actuator 13422 coupling the center chassis 13410 to a respective payload 13402.

At least two drive modules 13416 are pivotally coupled to the center chassis 13410 by a corresponding drive suspension 13412. Each drive module 13416 may be independently rotatable relative to the center chassis 13410 and each other. At least one of the drive suspensions 13412 may include a rotation limiter 13414 to enforce a maximum degree of rotation between the corresponding drive module 13416 and the center chassis 13410. In embodiments, the rotation limiters 13414 may both be fixed (e.g. no rotation allowed), or one drive module 13416 may have a fixed (no rotation) rotation limiter 13414 while the rotation limiter 13414 on another drive module 13416 allows from some rotation, the rotation limiters 13414 may allow for different degrees of rotation between corresponding drive modules. A rotation limiter 13414 may enable symmetrical rotation, or enable greater rotation in one direction compared to another. A drive module 13416 may be biased, such as with a spring, to tend to rotate in preferred direction. The depiction of FIG. 133 is a non-limiting schematic depiction to illustrate components present in certain embodiments. Certain embodiments may include additional drive modules coupled to the chassis, and/or coupled at different positions relative to the chassis. The position and arrangement of the drive modules to the center chassis may be according to any aspect of the present disclosure, for example including side mounted drive modules having forward and rearward wheels (e.g., reference FIG. 51, 52 having mounting ports 5110 for drive modules, such as a drive module 6000 referenced at FIG. 60). An example rotation orientation of the drive module to the chassis is depicted at FIGS. 67A, 67B).

A drive suspension 13412 may include a corresponding piston 13418 to vary a distance between the center chassis 13410 and the corresponding drive module 13416. In embodiments, both drive suspensions 13412 may include a corresponding piston 13418, or only one of the drive suspensions 13412 includes a corresponding piston 13418. A piston 13418 may be coupled to or integral with the drive module 13416, the center chassis 13410, or part of the mechanical connection between the two. The distance between individual drive modules 13416 and the center chassis 13410 may be different from one another. Each piston 13418 may include a translation limiter 13420 to define or enforce a maximum distance between the center chassis 13410 and the corresponding drive module 13416. The translation limiter may interact with a piston stop to define the maximum distance between the center chassis 13410 and a drive module 13416.

Each drive module 13416 includes at least two wheels 13424, wherein both wheels 13424 or only a single wheel 13424 are turnable under power (e.g., coupled to a drive motor). The engagement of the drive module 13416 to the center chassis 13410 and the wheels 13424 to the drive module 13416 ensure that driving the wheels results, except in the case of a wheel slipping, in the inspection robot moving over the inspection surface. The drive module 13416 is rotatable relative to the center chassis 13410 independently of movement of the wheels 13424. On at least one of the drive modules 13416, the two wheels 13424 are independently turnable. The wheels 13424 may be driven at different rates, both on a single drive module 13416 (e.g., where wheels of the drive module are oriented side-by-side relative to a direction of travel of the inspection robot), and/or between different drive modules 13416, for example to enable the inspection robot 13400 to change a direction of travel. In addition to the two wheels 13424, a drive module 13416 may further include a passive encoder wheel 13434. In embodiments, a drive module 13416 may include a drive actuator 13432 to couple a drive payload 13430 to the drive module 13416, and/or to couple the drive module 13416 to the payload 13402 (e.g., reference FIG. 60, actuator 6072).

The example of FIG. 133 includes a payload actuator 13422, which may be coupled to the chassis or to a drive module. An actuator 13422, 13432 may be passive, such as a spring, active, or combination of active and passive. The actuator 13422, 13432 may be a linear actuator, such as a pneumatic actuator, an electrical actuator, a hydraulic actuator, and the like. The actuator 13422, 13432 may be operable to move a corresponding payload 13402, 13430 between distinct positions (at least a first position and a second position, and/or discrete or continuous intermediate positions) relative to the center chassis 13410. The actuator 13422, 13432, in a first position, may position a corresponding payload 13402, 13430, in a first pivoted position away from an inspection surface. The first pivoted position may be a storage position for the corresponding payload 13402, 13430 or a raised position to disengage the payload 13402, 13430 from the inspection surface. The actuator 13422, 13432, when in a second position, may position a corresponding payload 13402, 13430, in a second pivoted position toward an inspection surface such that a selected down force is applied by the payload 13402, 13430 on the inspection surface. The actuator 13422, 13432 may be capable of selectively adjust a down force as the actuator 13422, 13432 approaches the second position, at which the maximum actuator down force is applied on the payload toward the inspection surface. The maximum actuator downforce is the combined down force applied by passive and active actuators. The actuator 13422, 13432 may adjust a height of a corresponding payload 13402, 13430 relative to the center chassis 13410.

Referring to FIG. 135, enabling an inspection robot to traverse an uneven, non-planar surface may include, providing drive power to a first drive module (step 13502), and providing electrical communications between the first drive module and a center chassis through a first connector coupling the first drive module to the center chassis (step 15303) where the first connector defines a first axis. In some embodiments, drive power may also be provided to a second drive module (step 13504). Electrical communications are provided between the second drive module and a center chassis through a second connector coupling the second drive module to the center chassis (step 15306), where the second connector defines a second axis. Drive power provided to the first drive module selectively rotates the first drive module around the first axis (step 13508). Drive power provided to the second drive module selectively rotates the second drive module around the second axis (step 13510). In embodiments, first and second drive modules are independently drivable. There may be limitations on the extent to which the drive modules may rotate relative to the robot body (center chassis) and the limitations may be distinct between the first and second drive modules. In embodiments, a drive module may be biased to rotate in a specific direction.

The velocities of the first and second drive modules may be determined (13512) and indication of an obstacle determined in response to a difference between the velocities of the first and second drive modules (step 13514). This may be done using an encoder coupled to each of the drive modules, which may be an active encoder (e.g., a sensor coupled to a drive wheel of the drive module) and/or a passive encoder (e.g., an unpowered wheel in contact with the surface, and including a mechanical and/or electrical sensor determining the rotation of the unpowered wheel).

At wheel of the first drive module may be driven in a direction of travel (step 13508) to move the robot across the surface. In embodiments, a payload may be lifted in response to an indication of an obstacle in the path (step 13512). In embodiments, a wheel of the second drive module may also be drive in a direction of travel (step 13510). Wheels of the first and second drive modules are independently drivable and may be driven at different speeds and directions.

Referring to FIG. 134, a system for inspection an uneven inspection surface is schematically depicted. At least one payload 13602, pivotally mounted to a center chassis 13610, is operationally coupled, via an arm 13604, to at least two inspection sensors 13608. A first drive module 13612 and a second drive module 13614 are coupled to the center chassis 13610. Each of the drive modules 13612, 13614 includes at least two wheels 13626, each wheel 13626 positioned to contact an inspection surface when the inspection robot is positioned on the inspection surface.

The coupling between the drive modules 13612, 13614 may be fixed, one drive module 13612 may be rotatably connected to the center chassis while a second drive module 13614 may be fixed relative to the center chassis 13610, or both of the drive modules 13612, 13614 may be rotatable relative to the center chassis 13610 in a plane of a direction of travel for the system (an inspection robot including the center chassis 13610). The depiction of FIG. 135 is a non-limiting schematic depiction to illustrate components present in certain embodiments. Certain embodiments may include additional drive modules coupled to the chassis, and/or coupled at different positions relative to the chassis. The position and arrangement of the drive modules to the center chassis may be according to any aspect of the present disclosure, for example including side mounted drive modules having forward and rearward wheels (e.g., reference FIG. 51, 52 having mounting ports 5110 for drive modules, such as a drive module 6000 referenced at FIG. 60). An example rotation orientation of the drive module to the chassis is depicted at FIGS. 67A, 67B). The drive modules 13612, 13614 are rotatable independently of one another. There may be a rotation limiter 13618 associated with one or both drive modules 13612, 13614 which defines a maximum rotation of the corresponding drive module 13612, 13614 relative to the center chassis 13610. In embodiments, the rotation limiters 13618 may both be fixed (e.g. no rotation allowed), or one drive module 13614 may have a fixed (zero rotation) rotation limiter 13618 while the rotation limiter 13618 on another drive module 13612 allows from some rotation, the rotation limiters 13618 may allow for different degrees of rotation between corresponding drive modules. A rotation limiter 13618 may enable symmetrical rotation, or enable greater rotation in one direction compared to another. A drive module 13612, 13614 may be biased, such as with a spring, to tend to rotate in preferred direction.

A piston 13620 may be mechanically interposed between the center chassis 13610 and one or both of the drive modules 13612, 13614. The piston 13620 is structured to vary a distance between the center chassis 13610 and the corresponding drive module 13612, 13614. A translation limiter 13622 may be associated with a piston 13620 to define a maximum distance between the center chassis 13610 and the corresponding drive module 13612, 13614. This may include a piston stop to interact with the translation limiter 13622 to define the maximum distance (e.g., see also FIGS. 63-65 for additional or alternative arrangements of a translation limiter, without limitation to any other aspect of the present disclosure).

An actuator 13624 may couple a payload 13602 to the center chassis 13610. The actuator may be passive, such as a spring, active, or combination of active and passive. The actuator 13624 may be a linear actuator, such as a pneumatic actuator, an electrical actuator, a hydraulic actuator, and the like. The actuator 13624 may be operable to move a corresponding payload 13602 between distinct positions (at least a first position and a second position) relative to the center chassis 13610. The actuator 13624, in a first position, may position a corresponding payload 13692, in a first pivoted position away from an inspection surface. The first pivoted position may be a storage position for the corresponding payload 13602 or a raised position to disengage the payload 13602 from the inspection surface. The actuator 13624, when in a second position, may position a corresponding payload 13602, in a second pivoted position toward an inspection surface such that a selected down force is applied by the payload 13602 on the inspection surface. The actuator 13624 may move to the first position, pivoted away from an inspection surface, in response to a detected feature on the inspection surface. The detected feature may be an obstacle, a potential obstacle, a detected variability in the inspection surface, a detected increase in a slope of the inspection surface, a transition from a first region of the inspection surface to a second region of the inspection surface, or the like. The feature may be detected by an operator providing input, marked on an inspection map for the upcoming region, and the like.

The system may include a stability device 13630 pivotally mounted to the center chassis 13610 and a second actuator 13621 pivotally coupling the stability device 13630 to the center chassis 13610 (e.g., see also FIGS. 61B, 62 for additional or alternative arrangements of a stability device, without limitation to any other aspect of the present disclosure). The second actuator 13632 may be operable to move the stability device 13630 between distinct positions (at least a first position and a second position) relative to the center chassis 13610. The second actuator 13632, in a first position, may position the stability device 13630, in a first pivoted position away from an inspection surface. The first pivoted position may be a storage position for the stability device 13630 or a raised position to disengage the stability device 13630 from the inspection surface. The actuator 13632, when in a second position, may position the stability device 13630, in a second pivoted position toward an inspection surface in a deployed position of the stability device 13630. The second actuator 13632 may move to the second position, deploying the stability device 13630, in response to a detected feature on the inspection surface.

Referencing FIG. 136, an example stability module assembly 13714 is depicted. The example stability module assembly is couplable to a drive module and/or a center chassis of an inspection robot, and is positioned at a rear of the inspection robot to assist in ensuring the robot does not rotate backwards away from the inspection surface (e.g., upon hitting an obstacle, debris, encountering a non-ferrous portion of the inspection surface with front drive wheels, etc.). The example includes a coupling interface 13710, 13706 of any type, depicted as axles of engaging matching holes defined in the stability module assembly 13714 and the coupled device 13720 (e.g., a drive module, chassis, etc.). The example coupling arrangement utilizes a pin 13708 to secure the connection. The example stability module assembly 13714 includes an engaging member 13704 for the inspection surface, which may include one or more wheels, and/or a drag bar. In certain embodiments, the engaging member 13704 is nominally positioned to contact the inspection surface throughout inspection operations, but may additionally or alternatively be positioned to engage the inspection surface in response to the inspection robot rotating away from the inspection surface by a selected amount. The example stability module assembly 13714 includes a biasing member 13716, for example a spring, that opposes further rotation of the inspection robot when the stability module assembly 13714 engages the inspection surface. The biasing member 13716 in the example is engaged at a pivot axle 13718 of the stability module assembly 13714, and within an enclosure 13712 or upper portion. In certain embodiments, the upper portion 13712 (or upper stability body) and lower portion 13702 (or lower stability body) are rotationally connected, where the biasing member opposes rotation of the upper portion 13712 toward the lower portion 13712.

Referencing again FIGS. 61A, 61B, and 62, examples of stability module assembly 13714 arrangements are depicted. In certain embodiments, the engaging member may be a drag bar (e.g., FIG. 62). In certain embodiments, the stability module assembly 13714 may be coupled to an actuator 6020 connection point 6019 allowing for deployment of the stability module assembly, and/or for the application of selected down force by the stability module assembly to provide an urging force to the inspection robot to return front wheels and/or a payload to the inspection surface, and/or to adjust a down force applied by a payload, sensor, and/or sled. In certain embodiments, where a wheel of the stability module assembly 13714 engages the inspection surface, an encoder may be operationally coupled to the wheel, and may provide position information to the drive module and/or a controller of the inspection robot. In certain embodiments, the stability module assembly 13714 may move between a stored position (e.g., rotated away from the inspection surface, and/or positioned above the chassis and/or a drive module of the inspection robot). Without limitation to any other aspect of the present disclosure, FIG. 60 additionally depicts an example stability module assembly in an exploded view.

Referencing FIG. 137, an example procedure includes an operation 13802 to inspect a vertical surface (and/or a partially vertical surface, including a surface that is greater than 45°, and/or a surface including one or more vertical portions). The example procedure further includes an operation 13804 to determine a stability need value, such as a determination that the robot front end may be lifting, that the robot front wheels may have encountered or be approaching a non-ferrous surface (e.g., in response to sensor data, imaging data, and/or detection of wheel slipping for a drive wheel), and/or that the robot rotating, and an operation 13810 to move a stability assist device to a second position (e.g., to a deployed position) in response to the stability need value. The example procedure further includes an operation 13814 to prevent rotation of the inspection robot beyond a threshold angle—for example deploying the stability assist device, increasing a rotation position of the stability assist device, or the like. An example procedure further includes an operation 13816 to move the stability assist device to a third position, for example to provide an active force that pushes the robot toward the inspection surface, and/or that provides additional down force for a payload, sled, and/or inspection sensor of the inspection robot.

Referencing FIG. 138, an example inspection robot includes a robot body 13906, a number of sensors 13904 positioned to interrogate an inspection surface, and a drive module 13908 having a number of wheels 13910 that engage the inspection surface. The example robot 13902 includes at least one stability module (or stability assist device) 13907, which may be coupled to the robot body 13906, to one or more drive modules 13908, and/or may be aligned with a wheel of the drive module. An example stability module 13907 includes an upper body 13914 rotationally connected to a lower body 13916, and may further include a biasing member 13918 that opposes rotation of the upper body 13914 toward the lower body 13916.

An example stability module 13907 further includes a wheel 13920, and/or an encoder (not shown) operationally coupled to the wheel. An example stability module 13907 includes a drag bar 13922, for example as an engagement device to at least selectively engage the inspection surface. An example robot 13902 an actuator 13912 coupling the drive module 13908 to the stability module 13907, where the actuator is configured to move the stability module 13907 between a first position (e.g., a stored position) and a second position (e.g., a deployed position), and/or further configured to move the stability module 13907 toward a third position (e.g., to apply active rotation force to the inspection robot and/or a payload to return to the inspection surface, and/or to apply a selected down force to the payload and/or to the front of the inspection robot). In certain embodiments, the actuator 13912 may alternatively or additionally couple the stability module 13907 to the chassis/robot body 13906.

Referencing FIG. 139, an example inspection robot body 13906 includes at least two drive modules (not shown), each positioned on a side of the inspection robot body 13906, a number of sensors 13494 positioned to interrogate the inspection surface. The example inspection robot includes a stability module positioned in front of, behind, or both, the inspection robot body 13906 (both positions are depicted in the example of FIG. 139). The stability device(s) 13907 may include any features and/or arrangements as depicted with regard to FIG. 138, and/or may further include a bumper 13926 (e.g., as an initial engagement portion of the robot to dampen impacts with obstacles or the like, and which may be spring loaded, elastomeric, or the like, and which may further be positioned at the front or the back of the robot), and/or an angle limiter 13924 (e.g., upper portion 13712 engaging lower portion 13702 to limit rotation angle, an actuator responsive to limit rotational angles, etc.).

In an embodiment, and referring now to FIG. 140, FIG. 141, FIG. 142, FIG. 143, FIG. 144, FIG. 145 (e.g. FIGS. 140-145), FIG. 146, and FIG. 147, a method of manufacturing a wheel assembly for an inspection robot may include providing a mount having a base 14002 and one or more retractable magnet support structures 14004 extending away from the base 14002; supporting a first wheel component 14010 with the base 14102; supporting a rare earth magnet 14012 with the one or more retractable magnet support structures 14004 at a first distance from the base 14104; and retracting the one or more retractable magnet support structures 14004 with respect to the base 14002 until the rare earth magnet 14012 reaches a second distance closer to the base 14002 than the first distance 14112. In embodiments, the second distance may be approximately equal to a thickness of the first wheel component 14010. The first wheel component 14010 and/or second wheel component 14014 may comprise a ferromagnetic hub 5712, as shown in FIG. 57A and FIG. 57B. In embodiments, the method of manufacturing may include mounting a magnetic wheel to a ferromagnetic hub, or vice versa. Referring to FIG. 146, the method may further include restricting lateral movement of the rare earth magnet 14106 with respect to the base 14002 via a lateral support structure 14006 that extends from the base 14002. Restricting lateral movement with respect to the base 14002 via the lateral support structure 14006 may include penetrating opening defined, at least in part, by a body of the rare earth magnet with the lateral support structure 14108. Restricting lateral movement of the rare earth magnet 14106 with respect to the base 14002 via the lateral support structure 14006 may include contacting an exterior surface of the rare earth magnet with the lateral support structure 14110. The method may further include supporting the rare earth magnet via the first wheel component when the rare earth magnet is at the second distance 14114. The method may further include extending the one or more retractable magnet support structures with respect to the base to a third distance from the base; and supporting a second wheel component with the one or more retractable magnet support structures at the third distance from the base, wherein the third distance is greater than a combined width of the rare earth magnet and a width of the first wheel component. The one or more retractable magnet support structures 14004 may penetrate the base 14002. In embodiments, the one or more retractable magnet support structures 14004 may be rods.

Continuing to refer to FIGS. 140-145, a system for manufacturing a wheel assembly for an inspection robot may include a base 14002; one or more retractable magnet support structures 14004 with distal ends 14016 extending away from the base 14002; and one or more actuators 14008 coupled to the one or more retractable magnet support structures 14004; wherein the one or more actuators 14008 retract the one or more retractable magnet support structures 14004 with respect to the base 14002 from a first position to a second position in which the distal ends 14016 are closer to the base 14002 than when the one or more retractable magnet support structures 14004 are in the first position. The system may further include a lateral support structure 14006 extending away from the base 14002, which may be centrally disposed between the one or more retractable magnet support structures 14004 with respect to the base 14002. In an embodiment, the lateral support structure 14006 may be a cylinder. In an embodiment, the one or more retractable magnet support structures 14004 may be rods.

Figure 140:
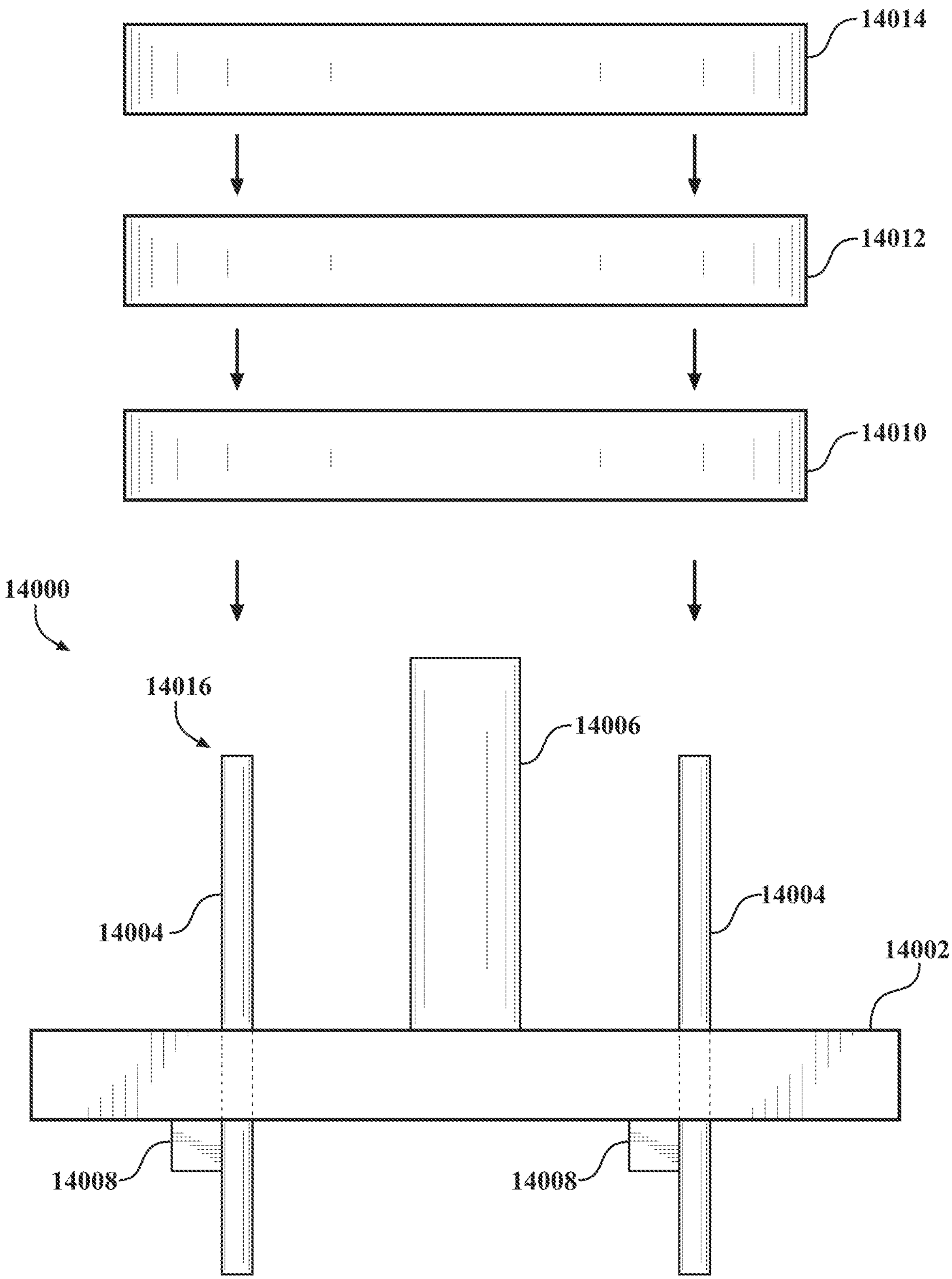
Figure 141:
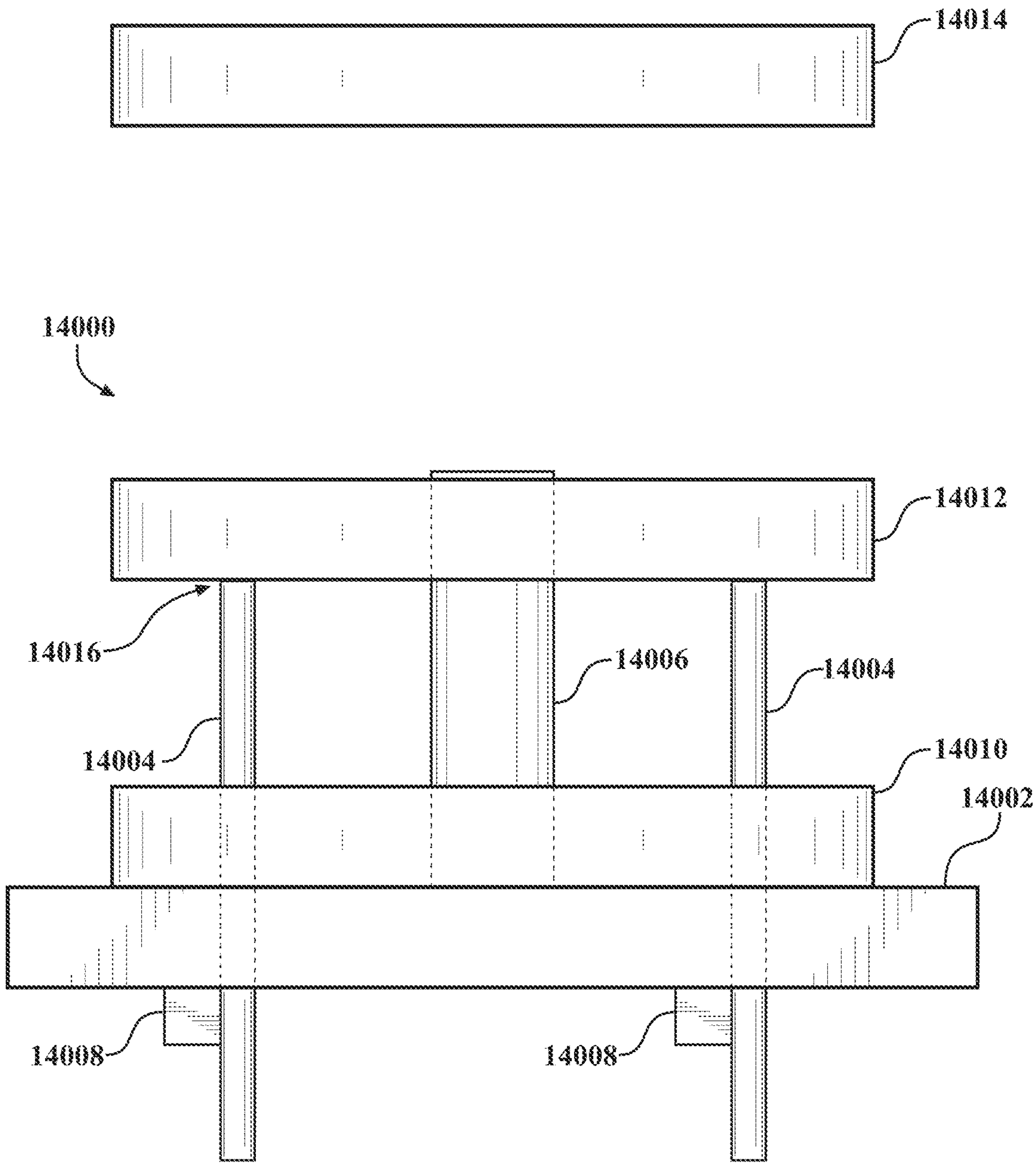
Figure 142:
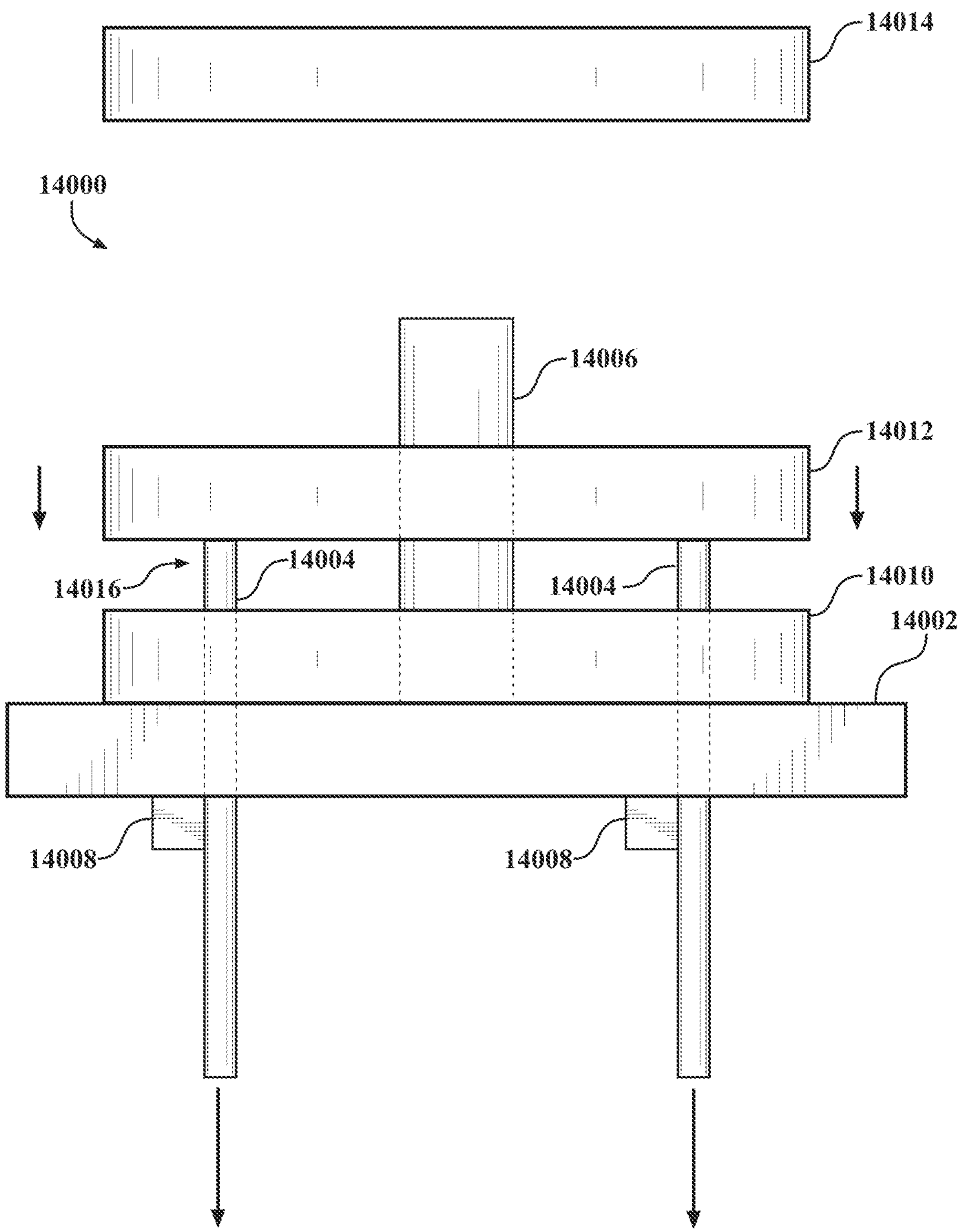
Figure 143:
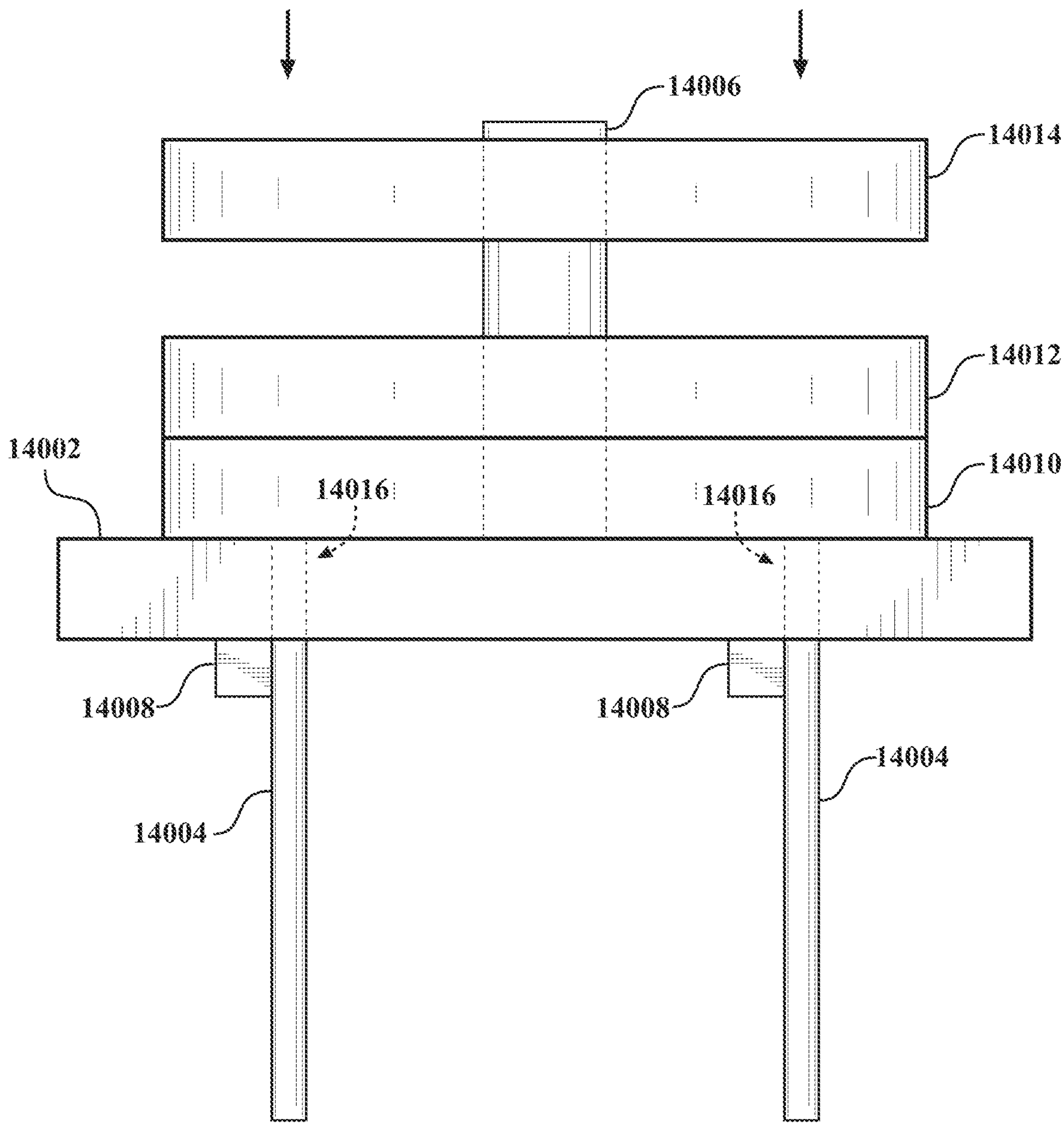
Figure 144:
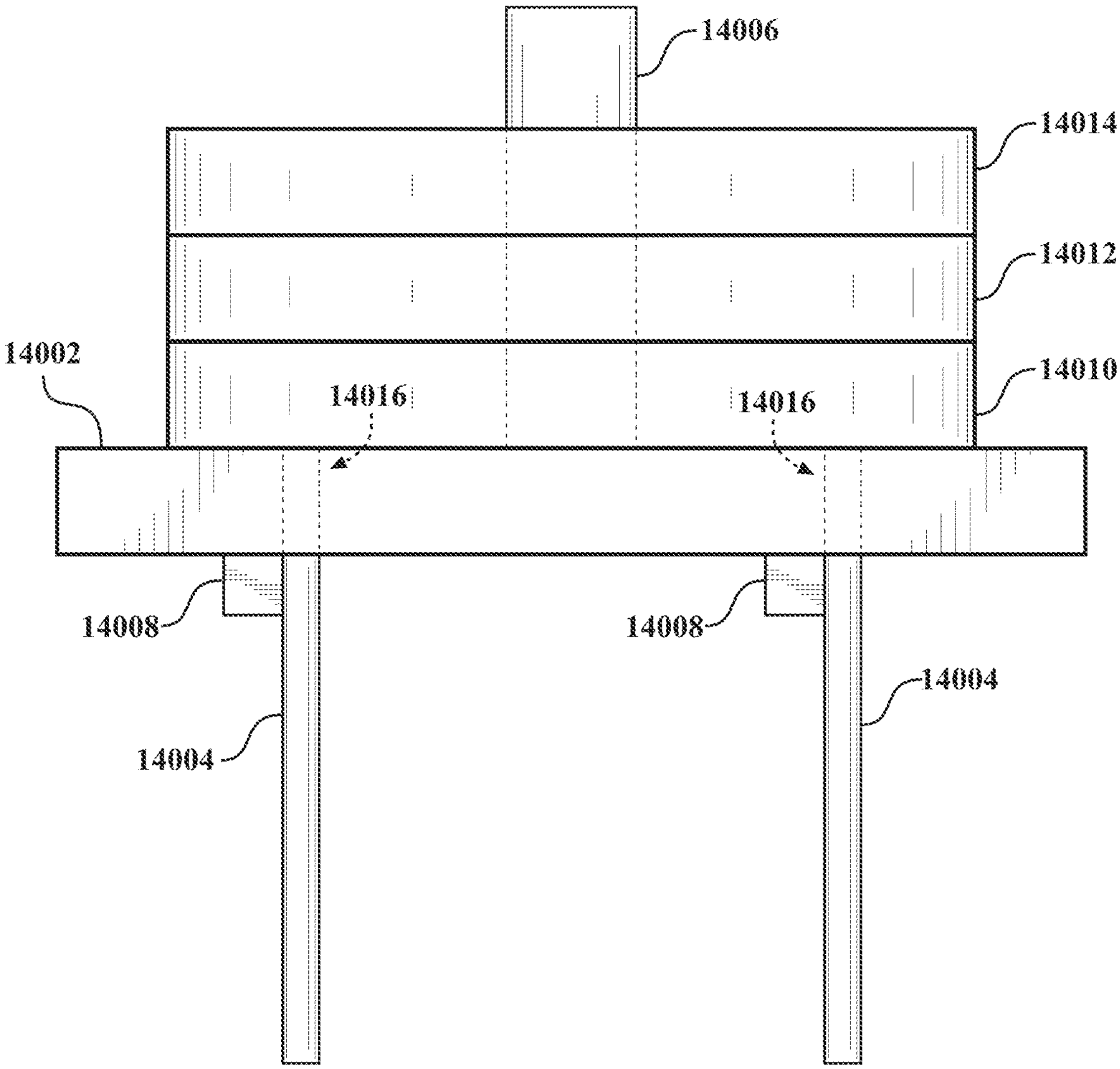
Figure 145:
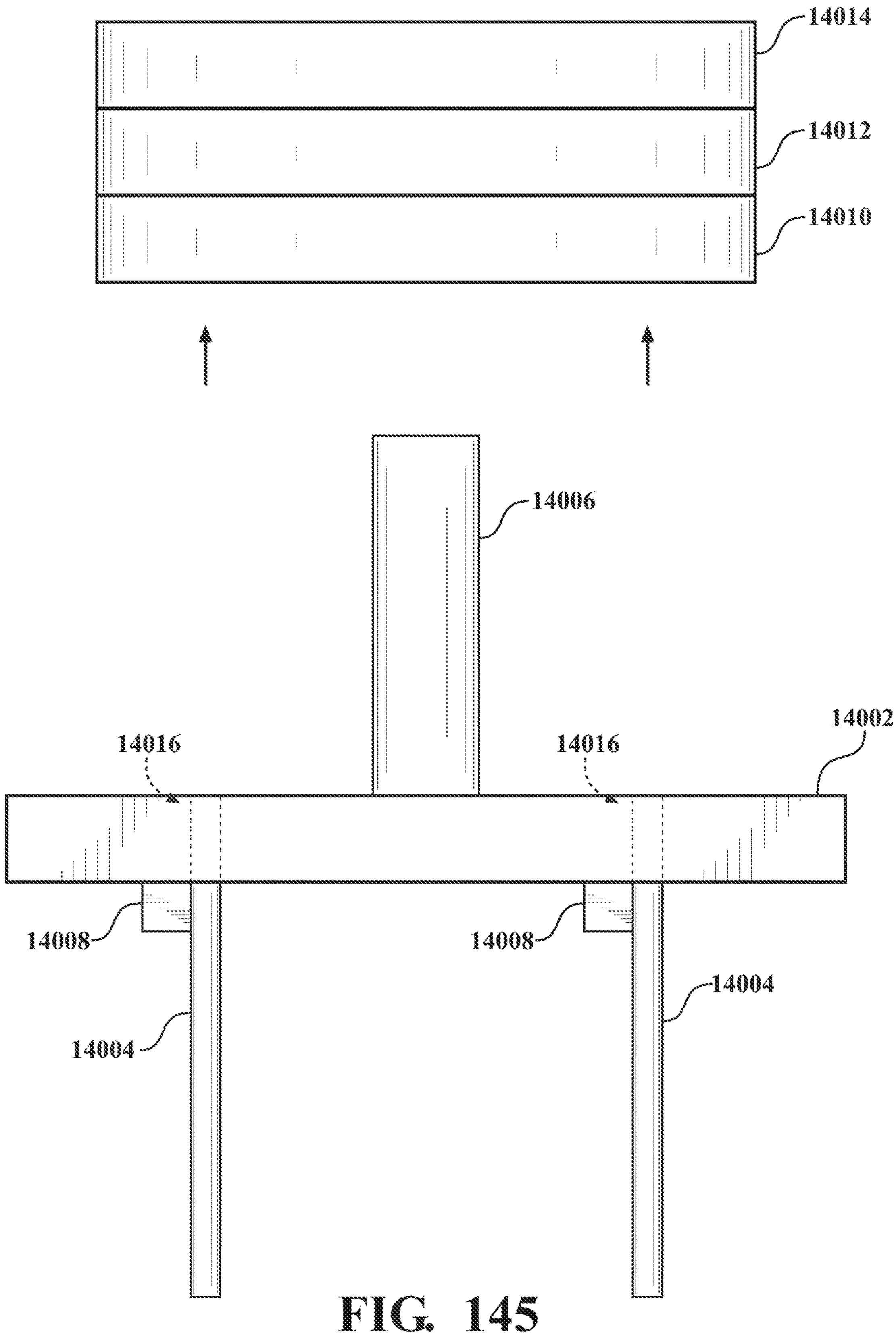

In FIG. 140, the base 14002 with magnetic support structures 14004, actuators 14008, and lateral support structures 14006 is ready to receive wheel components 14010, 14014 and magnet 14012. In FIG. 141, the first wheel component 14010 is shown in place adjacent to the base 14002 with the retractable magnetic support structures 14004 shown retracted. In FIG. 142, the retractable magnetic support structures 14004 are further retracted as the magnet 14012 is placed in contact with them. In FIG. 143, the retractable magnetic support structures 14004 are fully retracted through the base 14002 as the second wheel component 14014 is placed adjacent to the magnet 14012, with FIG. 144 showing the placement. Finally, FIG. 145 shows the assembled wheel assembly being removed from the base 14002. In an embodiment, the magnetic wheel defines a hole therethrough, wherein the lateral support structure 14006 extends through the hole. The lateral support structure 14006, which is contemplated as being any shape, may include an outer perimeter, wherein the magnetic wheel defines an inner perimeter for the hole, and wherein the outer perimeter comprises a matching shape with the inner perimeter. In an embodiment, a center of mass of the magnetic wheel may be positioned within the hole. In an embodiment, the retractable magnet support structures 14004 may be positioned outside of the outer perimeter, such as radially positioned.

In an embodiment, a method of manufacturing a wheel assembly for an inspection robot may include providing a mount having a planar base 14002, one or more retractable rods 14004, and a central cylinder 14006, the one or more retractable rods 14004 and the central cylinder 14006 extending away from the planar base 14002; placing a first wheel component 14010 onto the planar base 14002 wherein: a central opening defined, at least in part, by a body of the first wheel component 14010 is penetrated by the central cylinder 14006, one or more side openings defined, at least in part, by the body of the first wheel component 14010 are penetrated by the one or more retractable rods 14004; and placing a rare earth magnet 14012 onto the one or more retractable rods 14004 so that an opening defined, at least in part, by a body of the rare earth magnet 14012 is penetrated by the central cylinder 14006. The method includes the step 14104 of supporting the rare earth magnet 14012 with the one or more retractable rods 14004 at a first distance from the planar base. At step 14106, the method includes restricting lateral movement of the rare earth magnet with respect to the planar base via the central cylinder. At step 14112, the method includes retracting the one or more retractable rods with respect to the planar base until, at step 14114, the rare earth magnet is supported against the planar base, at least in part, by the first wheel component. The method may further include extending the one or more retractable rods with respect to the planar base to a second distance from the planar base 14204; and supporting a second wheel component with the one or more retractable rods at the second distance from the planar base, wherein the second distance is farther from the planar base that the first distance.

In an embodiment, and referring to FIG. 147, a method of disassembling a wheel assembly for an inspection robot may include providing a mount having a base and one or more extendable magnet support structures; supporting a wheel assembly with the base 14202, the wheel assembly comprising a first wheel component, a rare earth magnet, and a second wheel component; extending the one or more extendable magnet support structures 14204 to a first distance with respect to the base to support the first wheel component and create a space between the first wheel component and the rare earth magnet; and removing the first wheel component 14206 from the one or more extendable magnet support structures. The method may further include extending the one or more extendable magnet support structures to a second distance with respect to the base to support the rare earth magnet and create a space between the rare earth magnet and the second wheel component; and removing the rare earth magnet 14208 from the one or more extendable magnet support structures.

In an embodiment, and referring to FIG. 148 and FIG. 150, an inspection robot may include an inspection chassis 14302; a drive module 14304 coupled to the inspection chassis 14302, the drive module 14304 including a plurality of magnetic wheels 14306, each magnetic wheel 14306 having a contact surface below an inspection side of the inspection chassis 14302; a motor 14310; a gear box 14308 operationally interposed between the motor 14310 and at least one of the plurality of magnetic wheels 14306; and wherein the gear box 14308 comprises a flex spline cup 14314 structured to interact with a ring gear 14312 and wherein the ring gear 14312 has fewer teeth than the flex spline cup 14314. The gear box 14312 may further include a non-circular ball bearing 14318 mounted to a motor shaft 14316 of the motor 14310 and wherein the non-circular ball bearing 14318 engages with the flex spline cup 14314. The gear box may further include a thrust washer 14320 positioned axially adjacent to the flex spline cup 14314 or the ring gear 14312.

The inspection robot may further include an output drive shaft 14324, wherein the output drive shaft 14324 may be operatively coupled to the ring gear 14312 and operatively coupled to at least one of the plurality of magnetic wheels 14306. In embodiments, the output drive shaft 14324 may be operatively coupled to a second one of the plurality of magnetic wheels 14306 and wherein the at least one of the plurality of magnetic wheels 14306 and the second one of the plurality of magnetic wheels are located on axially opposing sides of the gear box. In embodiments, at least one of the ring gear 14312 or the flex spline cup 14314 includes non-ferrous material. The non-ferrous material may be polyoxymethylene, 316 stainless steel, 304 stainless steel, ceramic, nylon, copper, brass, and/or aluminum.

Certain further details of an example gear arrangement compatible with the embodiment of FIGS. 148, 150 is set forth in FIGS. 56A, 56B, and the related description.

In an embodiment, and referring to FIG. 149, a method of driving an inspection robot may include rotating a motor shaft to drive a flex spline cup having a first number of gear teeth 14402; engaging the flex spline cup with a ring gear having a second number of gear teeth 14406; driving a drive shaft coupled to the ring gear at a differential speed relative to the motor shaft 14408; and rotating a first magnetic wheel coupled to the drive shaft 14410. The method may further include interacting the flex spline cup with a non-circular ball bearing 14404. The method may further include applying a thrust load to a thrust washer 14412.

In an embodiment, and referring to FIG. 150, an inspection system may include an inspection robot 14500 including an inspection chassis 14506; a plurality of drive modules 14508 coupled to the inspection chassis 14506, each drive module 14508 including a plurality of magnetic wheels 14510, each magnetic wheel 14510 having a contact surface below a bottom side of the inspection chassis 14506; a motor 14512; a gear box 14504 operationally interposed between the motor 14512 and at least one of the plurality of magnetic wheels 14510; and a base station 14502 comprising a power supply circuit 14520 structured to provide power to the inspection robot 14500, wherein the gear box 14504 comprises a flex spline cup 14522 structured to interact with a ring gear 14524 and wherein the ring gear 14524 has fewer teeth than the flex spline cup 14522. The inspection system may further include a tether 14536 structured to transfer power from the power supply circuit 14520 to the inspection robot 14500. In embodiments, the transferred power may operate the motor 14512. The gear box 14504 may further include a non-circular ball bearing 14516 mounted to a motor shaft of the motor and wherein the non-circular ball bearing 1516 engages with the flex spline cup 14522. In embodiments, the gear box 15406 may further include a thrust washer 14518 positioned axially adjacent to the flex spline cup 14522 or the ring gear 14524. In embodiments, each drive module 14508 may further include an output drive shaft 14526, wherein the output drive shaft 14526 is operatively coupled to the ring gear 14524 and operatively coupled to at least one of the plurality of magnetic wheels 14510. The output drive shaft 14526 may be operatively coupled to a second one of the plurality of magnetic wheels 14510 and wherein the at least one of the plurality of magnetic wheels 14510 and the second one of the plurality of magnetic wheels 14510 are located on axially opposing sides of the gear box 14504.

Turning now to FIG. 151, an example modular drive assembly 4918 for an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example modular drive assembly 4918 depicted in FIG. 151. In certain embodiments, the inspection robot 100 may have one or more payloads 2 (FIG. 1) and may include one or more sensors 2202 (FIG. 29) on each payload.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

As shown in FIG. 151, the modular drive assembly 4918 may include a motor 14604 coupled to a magnetic wheel assembly 14608. In embodiments, the modular drive assembly 4918 may be mounted to the chassis 102 (FIG. 1) of the inspection robot 100. In embodiments, the magnetic wheel assembly 14608 and/or motor 14604 may be directly mounted to the chassis. One or more electromagnetic sensors 14606 may be coupled to the motor 14604. The modular drive assembly 4918 may further include a magnetic shielding assembly 14602 structured to shield the electromagnetic sensors 14604 from electromagnetic interference generated by the magnetic wheel assembly 14608.

The motor 14604 may be an electromagnetic based motor, e.g., DC and/or AC, and coupled to the magnetic wheel assembly 14608 via a drive shaft 14610. The motor 14604 may be substantially cylindrical in shape and have one or more coil windings and/or permanent magnets that cause a rotor of the motor to rotate when in the presence of an electromagnetic filed generated by passing an electrical current through the motor. While the embodiment of the modular drive assembly 4918 shown in FIG. 151 the motor 14604 disposed between the magnetic wheel assembly 14608 and the chassis 102 of the inspection robot 100, it will be understood that embodiments may have the motor 14604 disposed such that the magnetic wheel assembly 14608 is disposed between the chassis 102 and the motor 14604.

The magnetic wheel assembly 14608 may include one or more magnets operative to couple the inspection robot 100 to an inspection surface 500. Without limitation to any other aspect of the present disclosure, a magnetic wheel assembly 14608 as set forth throughout the present disclosure, including any features or characteristics thereof, is contemplated for the example modular drive assembly 4918 depicted in FIG. 151. As will be appreciated, the magnets within the magnetic wheel assembly 14608 generate a magnetic field having field lines that may penetrate the motor 14604.

The electromagnetic sensors 14606 may be operative to measure one or more characteristics of the motor, e.g., rotations per minute (RPMs) and/or other properties via interfacing with electromagnetic radiation, e.g., magnetic field lines, of the electromagnetic motor. For example, in embodiments, the electromagnetic sensors 14606 may be hall effect sensors. In embodiments, the electromagnetic sensors 14606 may be disposed next and/or near the motor 14604. In embodiments wherein the electromagnetic sensors 14606 are hall effect sensors, the plane of the conductive plane of the sensor may be oriented such that the magnetic field lines of the motor 14604 pass through the plane at right (90°) or nearly right angles.

The magnetic shielding assembly 14602 may be disposed such that it intercepts some or all of the magnetic field lines of the magnetic wheel assembly 14608 before those field lines penetrate the electromagnetic sensor 14606 and/or the motor 14606, while also allowing magnetic field lines from the motor 14604 to penetrate the electromagnetic sensor 14606. For example, FIG. 152 depicts a side profile view of the motor 14604 wherein an embodiment of the magnetic shielding assembly 14602 has an L shape with the electromagnetic sensor 14606 disposed between the magnetic shielding 14602 and the motor 14604. While FIG. 152 depicts the electromagnetic sensor 14606 disposed on a first side of the motor 14604, embodiments may have electromagnetic sensors 14606 disposed on other sides of the motor 14605 as shown in the top-down view of the motor 14606 depicted in FIG. 153. In embodiments, the magnetic shielding assembly 14602 may include steel, copper, nickel, silver, tin, and/or alloys thereof.

Accordingly, in embodiments, the electromagnetic sensor 14606 may interface with electromagnetic radiation from the motor 14604 on a first side 14730 (FIG. 153) of the electromagnetic sensor 14606, and the magnetic shielding assembly 14602 at least partially shields a second side 14732 (FIG. 153) of the electromagnetic sensor 14606. The magnetic shielding assembly 14602 may include a motor sleeve portion 14734 which, in embodiments, may at least partially defining an inductance coil of the electromagnetic motor 14604. In embodiments, the magnetic shielding assembly 14602 may include a sensor extension portion 14736 that may, in embodiments, at least partially define the second side 14732 of the electromagnetic sensor 14606. In embodiments, the first side 14730 of the electromagnetic sensor 14606 may include an inspection surface engagement side, which may, for example, be the side of the sensor facing toward the inspection surface, although intervening parts such as the motor may be present. In embodiments, the second side 14732 of the electromagnetic sensor 14606 includes an opposite side 14730 of the electromagnetic sensor 14606, which may be a side of the sensor facing away from the inspection surface. In embodiments, the second side of the electromagnetic sensor 14606 includes a side opposite an inspection surface engagement side. In embodiments, motor sleeve portion 14734 defines an opening 14738 within which at least a portion of the inductance coil is disposed.

In embodiments, the sensor extension portion 14736 includes a solid conductive material and/or the motor sleeve portion 14734 includes a wire mesh. In embodiments, the motor sleeve portion 14734 includes a perforated conductive material. In embodiments, the motor sleeve portion 14734 includes a second solid conductive material.

In embodiments, at least one of ferrous enclosure portion of the magnetic wheel assembly 14608 is magnetically interposed between the magnetic hub portion and the electromagnetic sensor. In embodiments, the magnetic shielding assembly is magnetically interposed between the magnetic hub portion and the electromagnetic sensor. In certain embodiments, magnetically interposed includes geometrically positioned between the magnetic hub portion and the electromagnetic sensor. Additionally or alternatively, magnetically interposed includes a position structured to reduce and/or intercept magnetic flux lines that would otherwise intersect the electromagnetic sensor. In certain embodiments, magnetically interposed includes positioned to intersect magnetic flux lines that would intersect the electromagnetic sensor perpendicular to the geometry of the sensor (e.g., normal to board or sensing element of the sensor) and/or that would have a perpendicular component with the geometry of the electromagnetic sensor.

Turning now to FIG. 201, a method of inspecting an inspection surface with an inspection robot is shown. The method may include operating 14880 an electromagnetic motor to drive a magnetic wheel assembly of an inspection robot. The method may further include measuring 14882 a rotational speed of the electromagnetic motor with an electromagnetic sensor operationally coupled to the electromagnetic motor. The method may further include shielding 14884 the electromagnetic sensor from electromagnetic interference generated by the magnetic wheel assembly. In embodiments, shielding 14884 may include shielding 14888 a side of the electromagnetic sensor that is opposite an inspection surface engagement side. In embodiments, the method may further include shielding 148846 at least a portion of a coil of the electromagnetic motor from the electromagnetic interference. In embodiments, shielding 148846 at least a portion of the coil includes operating 14894 the electromagnetic motor at least partially positioned within a motor sleeve of a shield member. In embodiments, shielding 14884 the electromagnetic sensor may include operating 14890 the electromagnetic sensor interfacing with the electromagnetic motor on a first side and positioned with a sensor extension portion of the shield member covering a second side. In embodiments, shielding 14884 the electromagnetic sensor may include providing 14892 the magnetic wheel assembly with a magnetic hub portion, and a ferrous enclosure portion magnetically interposed between the magnetic hub portion and the electromagnetic sensor.

Referencing FIG. 203, an example system is depicted, capable to perform rapid configuration of an inspection robot in response to planned inspection operations and/or an inspection request from a consumer of the inspection data and/or processed values and/or visualizations determined from the inspection data.

The example system includes an inspection robot 20314. The inspection robot 20314 includes any inspection robot configured according to any embodiment set forth throughout the present disclosure, including for example, an inspection robot configured to interrogate an inspection surface using a number of input sensors. In certain embodiments, the sensors may be coupled to the inspection robot body 20312 (and/or center chassis, chassis housing, or similar components of the inspection robot) using one or more payloads. Each payload may additionally include components such as arms (e.g., to fix horizontal positions of a sensor or group of sensors relative to the payload, to allow for freedom of movement pivotally, rotationally, or the like). Each arm, where present, or the payload directly, may be coupled to a sled housing one or more of the input sensors. The inspection robot 20314 may further include a tether providing for freedom of movement along an inspection surface, while having supplied power, couplant, communications, or other aspects as described herein. The inspection robot 20314 and/or components thereof may include features to allow for quick changes to sleds or sled portions (e.g., a bottom contact surface), to arms of a payload, and/or for entire payload changes (e.g., from first payload having a first sensor group to a second payload having a second sensor group, between payloads having pre-configured and distinct sensor arrangements or horizontal spacing, between payloads having pre-configured arrangements for different types or characteristics of an inspection surface, etc.). The inspection robot may include features allowing for rapid changing of payloads, for example having a single interface for communications and/or couplant compatible with multiple payloads, removable and/or switchable drive modules allowing for rapid changing of wheel configurations, encoder configurations, motor power capabilities, stabilizing device changes, and/or actuator changes (e.g., for an actuator coupled to a payload to provide for raising/lowering operations of the payload, selectable down force applied to the payload, etc.). The inspection robot may further include a distribution of controllers and/or control modules within the inspection robot body, on drive modules, and/or associated with sensors, such that hardware changes can be implemented without changes required for a high level inspection controller. The inspection robot may further include distribution of sensor processing or post-processing, for example between the inspection controller or another controller positioned on the inspection robot, a base station computing device, an operator computing device, and/or a non-local computing device (e.g., on a cloud server, a networked computing device, a base facility computing device where the base facility is associated with an operator for the inspection robot), or the like. Any one or more of the described features for the inspection robot 20314, without limitation to any other aspect of the present disclosure, may be present and/or may be available for a particular inspection robot 20314. It can be seen that the embodiments of the present disclosure provide for multiple options to configure an inspection robot 20314 for the specific considerations of a particular inspection surface and/or inspection operation of an inspection surface. The embodiments set forth in FIGS. 203-209, and other embodiments set forth in the present disclosure, provide for rapid configuration of the inspection robot, and further provide for, in certain embodiments, responsiveness to inspection requirements and/or inspection requests, improved assurance that a configuration will be capable to perform a successful inspection operation including capability to retrieve the selected data and to successfully traverse the inspection surface.

The example inspection robot 20314 includes one or more hardware components 20304, 20308, which may be sensors and/or actuators of any type as set forth throughout the present disclosure. The hardware components 20304, 20308 are depicted schematically as coupled to the center chassis 20312 of the inspection robot 20314, and may further be mounted on, or form part of a sled, arm, payload, drive module, or any other aspect as set forth herein. The example inspection robot 20314 includes hardware controller 20306, with one example hardware controller positioned on an associated component, and another example hardware controller separated from the inspection controller 20310, and interfacing with the hardware component and the inspection controller.

The example of FIG. 203 further includes a robot configuration controller 20302. In the example, the robot configuration controller 20302 is communicatively coupled to the inspection robot 20314, a user interface 20316, and/or an operator interface 20318. The example robot configuration controller 20302 is depicted separately for clarity of the present description, but may be included, in whole or part, on other components of the system, such as the operator interface 20318 (and/or an operator associated computing device) and/or on the inspection robot 20314. Communicative coupling between the robot configuration controller 20302 and other components of the system may include a web based coupling, an internet based coupling, a LAN or WAN based coupling, a mobile device coupling, or the like. In certain embodiments, one or more aspects of the robot configuration controller 20302 are implemented as a web portal, a web page, an application and/or an application with an API, a mobile application, a proprietary or dedicated application, and/or combinations of these.

In the example of FIG. 203, a user 20320 is depicted interacting with the user interface 20316. The user interface 20316 may provide display outputs to the user 20320, such as inspection data, visualizations of inspection data, refined inspection data, or the like. The user interface 20316 may communicate user inputs to the robot configuration controller 20302 or other devices in the system. User inputs may be provided as interactions with an application, touch screen inputs, mouse inputs, voice command inputs, keyboard inputs, or the like. The user interface 20316 is depicted as a single device, but multiple user interfaces 20316 may be present, including multiple user interfaces 20316 for a single user (e.g., multiple physical devices such as a laptop, smart phone, desktop, terminal, etc.) and/or multiple back end interfaces accessible to the user (e.g., a web portal, web page, mobile application, etc.). In certain embodiments, a given user interface 20316 may be accessible to more than one user 20320.

In the example of FIG. 203, an operator 20322 is depicted interacting with the operator interface 20318 and/or the inspection robot 20314. As with the user 20320 and the user interface 20316, more than one operator 20322 and operator interface 20318 may be present, and further may be present in a many-to-many relationship. As utilized herein, and without limitation to any other aspect of the present disclosure, the operator 20322 participates in or interacts with inspection operations of the inspection robot 20314, and/or accesses the inspection robot 20314 to perform certain configuration operations, such as adding, removing, or switching hardware components, hardware controllers, or the like.

An example system includes an inspection robot 20314 having an inspection controller 20310 that operates the inspection robot utilizing a first command set. The operations utilizing the first command set may include high level operations, such as commanding sensors to interrogate the inspection surface, commanding the inspection robot 20314 to traverse the surface (e.g., position progressions or routing, movement speed, sensor sampling rates and/or inspection resolution/spacing on the inspection surface, etc.), and/or determining inspection state conditions such as beginning, ending, sensing, etc.

The example system further includes a hardware component 20304, 20308 operatively couplable to the inspection controller 20310, and a hardware controller 20306 that interfaces with the inspection controller 20310 in response to the first command set, and commands the hardware component 20304, 20308 in response to the first command set. For example, the inspection controller 20310 may provide a command such as a parameter instructing a drive actuator to move, instructing a sensor to begin sensing operations, or the like, and the hardware controller 20306 determines specific commands for the hardware component 20304, 20308 to perform operations consistent with the command from the inspection controller 20310. In another example, the inspection controller 20310 may request a data parameter (e.g., a wall thickness of the inspection surface), and the hardware controller interprets the hardware component 20304, 20308 sensed values that are responsive to the requested data parameter. In certain embodiments, the hardware controller 20306 utilizes a response map for the hardware component 20304, 20308 to control the component and/or understand data from the component, which may include A/D conversions, electrical signal ranges and/or reserved values, calibration data for sensors (e.g., return time assumptions, delay line data, electrical value to sensed value conversions, electrical value to actuator response conversions, etc.). It can be seen that the example arrangement utilizing the inspection controller 20310 and the hardware controller 20306 relieves the inspection controller 20310 from relying upon low-level hardware interaction data, and allows for a change of a hardware component 20304, 20308, even at a given interface to the inspection controller 20310 (e.g., connected to a connector pin, coupled to a payload, coupled to an arm, coupled to a sled, coupled to a power supply, and/or coupled to a fluid line), without requiring a change in the inspection controller 20310. Accordingly, a designer, configuration operator, and/or inspection operator, considering operations performed by the inspection controller 20310 and/or providing algorithms to the inspection controller 20310 can implement and/or update those operations or algorithms without having to consider the specific hardware components 20304, 20308 that will be present on a particular embodiment of the system. Embodiments described herein provide for rapid development of operational capabilities, upgrades, bug fixing, component changes or upgrades, rapid prototyping, and the like by separating control functions.

The example system includes a robot configuration controller 20302 that determines an inspection description value, determines an inspection robot configuration description in response to the inspection description value, and provides at least a portion of the inspection robot configuration description to a configuration interface (not shown) of the inspection robot 20314, to the operator interface 20318, or both, and may provide a first portion (or all) of the inspection robot configuration description to the configuration interface, and a second portion (or all) of the inspection robot configuration description to the operator interface 20318. In certain embodiments, the first portion and the second portion may include some overlap, and/or the superset of the first portion and second portion may not include all aspects of the inspection robot configuration description. In certain embodiments, the second portion may include the entire inspection robot configuration description and/or a summary of portions of the inspection robot configuration description—for example to allow the operator (and/or one or more of a number of operators) to save the configuration description (e.g., to be communicated with inspection data, and/or saved with the inspection data), and/or for verification (e.g., allowing an operator to determine that a configuration of the inspection robot is properly made, even for one or more aspects that are not implemented by the verifying operator). Further details of operations of the robot configuration controller 20302 that may be present in certain embodiments are set forth in the disclosure referencing FIG. 204.

In certain embodiments, the hardware controller 20306 determines a response map for the hardware component 20304, 20308 in response to the provided portion of the inspection robot configuration description.

In certain embodiments, the robot configuration controller 20302 interprets a user inspection request value, for example from the user interface 20316, and determines the inspection description value in response to the user inspection request value. For example, one or more users 20320 may provide inspection request values, such as an inspection type value (e.g., type of data to be taken, result types to be detected such as wall thickness, coating conformity, damage types, etc.), an inspection resolution value (e.g., a distance between inspection positions on the inspection surface, a position map for inspection positions, a largest un-inspected distance allowable, etc.), an inspected condition value (e.g., pass/fail criteria, categories of information to be labeled for the inspection surface, etc.), an inspection ancillary capability value (e.g., capability to repair, mark, and/or clean the surface, capability to provide a couplant flow rate, capability to manage a given temperature, capability to perform operations given a power source description, etc.), an inspection constraint value (e.g., a maximum time for the inspection, a defined time range for the inspection, a distance between an available base station location and the inspection surface, a couplant source amount or delivery rate constraint, etc.), an inspection sensor distribution description (e.g., a horizontal distance between sensors, a maximum horizontal extent corresponding to the inspection surface, etc.), an ancillary component description (e.g., a component that should be made available on the inspection robot, a description of a supporting component such as a power connector type, a couplant connector type, a facility network description, etc.), an inspection surface vertical extent description (e.g., a height of one or more portions of the inspection surface), a couplant management component description (e.g., a composition, temperature, pressure, etc. of a couplant supply to be utilized by the inspection robot during inspection operations), and/or a base station capability description (e.g., a size and/or position available for a base station, coupling parameters for a power source and/or couplant source, relationship between a base station position and power source and/or couplant source positions, network type and/or availability, etc.).

Referencing FIG. 204, an example robot configuration controller 20302 is depicted having a number of circuits configured to functionally execute one or more operations of the robot configuration controller 20302. The example robot configuration controller 20302 includes an inspection definition circuit 20402 that interprets an inspection description value 20414, for example from a user interaction request value provided through the user interface 20316. In certain embodiments, the inspection description value 20414 may further be provided, in whole or part, through an operator interface 20318. The example robot configuration controller 20302 further includes a robot configuration circuit 20404 that determines an inspection robot configuration description 20410 in response to the inspection description value 20414. An example inspection robot configuration description 20410 may include one or more of: a sensor type description, sensor horizontal position description, a payload configuration description, an arm configuration description, a sled configuration description, nominal inspection surface values (e.g., an expected wall thickness, coating thickness, obstacle positions, etc.), constraints for the inspection robot (e.g., weight, width, and/or height), actuator types for the inspection robot, vertical distance capability for the inspection robot, etc. The example robot configuration controller 20302 further includes a configuration implementation circuit 20406 that provides at least a portion of the inspection robot configuration description 20410 to a configuration interface of the inspection robot 20314 and/or to one or more operator interfaces 20318. In certain embodiments, the configuration implementation circuit 20406 provides relevant portions of the inspection robot configuration description 20410 to the inspection robot 20314 that can be configured by the inspection robot independently of an operator (e.g., to set enable/disable values for sensors, actuators, and/or available features of the inspection robot), and/or portions of the inspection robot configuration description 20410 to otherwise be available to the inspection robot (e.g., to provide verification via an operator interface positioned on the robot such as a display, to utilize in marking data values for later processing of the inspection data, and/or utilizable by the inspection controller such as to ensure that an inspection operation appears to be consistent with a plan, and/or to determine whether off-nominal or unexpected conditions are present). In certain embodiments, the configuration implementation circuit 20406 provides relevant portions of the inspection robot configuration description 20410 to the one or more operator interfaces 20318 that are planned to be implemented and/or verified by the associated operator with each respective operator interface, that may be utilized by the operator during the inspection operations, and/or that may be entered by the operator into a base station, into an inspection report, or the like.

Example and non-limiting user inspection request values include an inspection type value, an inspection resolution value, an inspected condition value, and/or an inspection constraint value. Example and non-limiting inspection robot configuration description(s) 20410 include one or more of an inspection sensor type description (e.g., sensed values; sensor capabilities such as range, sensing resolution, sampling rates, accuracy values, precision values, temperature compatibility, etc.; and/or a sensor model number, part number, or other identifying description), an inspection sensor number description (e.g., a total number of sensors, a number of sensors per payload, a number of sensors per arm, a number of sensors per sled, etc.), an inspection sensor distribution description (e.g., horizontal distribution; vertical distribution; spacing variations; and/or combinations of these with sensor type, such as a differential lead/trailing sensor type or capability), an ancillary component description (e.g., a repair component, marking component, and/or cleaning component, including capabilities and/or constraints applicable for the ancillary component), a couplant management component description (e.g., pressure and/or pressure rise capability, reservoir capability, composition compatibility, heat rejection capability, etc.), and/or a base station capability description (e.g., computing power capability, power conversion capability, power storage and/or provision capability, network or other communication capability, etc.).

Referencing FIG. 205, an example procedure to provide for rapid configuration of an inspection robot is depicted. The example procedure includes an operation 20502 to interpret an inspection description value, an operation 20504 to determine an inspection robot configuration description in response to the inspection description value, and an operation 20506 to communicate at least a portion of the inspection description value. The example procedure includes an operation 20508 to determine whether an inspection description value portion is to be communicated to a ROBOT, and/or to an OPERATOR. Where a portion is to be communicated to an inspection robot (operation 20508, ROBOT), the procedure includes an operation 20512 to communicate the portion to a robot configuration interface 20512, such as to a hardware controller, inspection controller, and/or a configuration management controller of the inspection robot. Where a portion is to be communicated to an operator (operation 20508, OPERATOR), the procedure includes an operation 20510 to communicate the portion to an operator interface. The example procedure may include repeating operations 20506, 20508, and/or 20510, 20512 until the determined portions have been communicated to all of the planned inspection robots and/or operators.

Referencing FIG. 206, an example procedure is provided to configure an inspection robot by adjusting a hardware component (e.g., a sensor and/or an actuator) of the inspection robot. The example procedure includes an operation 20602 wherein a configuration adjustment includes adjusting a sensor and/or an actuator in response to the inspection description value. Example adjustments include changing one hardware component for another hardware component, changing a response of the sensor or actuator (e.g., changing a sensed value to electrical signal mapping, and/or an electrical signal to actuator response mapping). The example procedure includes an operation 20604 to determine whether a hardware controller should be replaced with the hardware component adjustment. For example, where a hardware controller utilizes a selected response map from a number of available response maps based on the hardware adjustment, and/or downloads or otherwise accesses an alternate response map based on the hardware adjustment, operation 20604 may be determined as NO, where the previous hardware controller is capable to manage the configuration adjustment. In another example, where the hardware controller is coupled with the sensor or actuator, and/or where the hardware controller does not have an available response map for the adjusted sensor or actuator, operation 20604 may be determined as YES, where the previous hardware controller will be changed with the hardware component. The procedure further includes an operation 20612 (from 20604 determining NO) to determine a hardware component response map (e.g., selecting a map based on an identified hardware component), an operation 20608 to operate an inspection controller to perform an inspection operation with the inspection robot, and an operation 20614 to command the hardware component (e.g., interpret sensor data, instruct sensor on/off operations, and/or command actuator operations) using the determined hardware component response map to implement commands from the inspection controller. The example procedure further includes an operation 20606 (from 20604 determining YES) to determine a hardware controller (e.g., a hardware controller compatible with, and/or configured for, the adjusted hardware component) and install the determined hardware controller as a part of the configuration adjustment for the inspection robot, the operation 20608 to operate the inspection controller to perform the inspection operation with the inspection robot, and an operation 20610 to command the hardware component using the determined hardware controller to implement commands from the inspection controller.

Referencing FIG. 207, an example procedure to determine the inspection description value based, at least in part, on a user inspection request value is depicted. The example procedure includes an operation 20702 to operate a user interface, and an operation 20704 to receive a user inspection request value form the user interface. The example procedure includes an operation 20706 to interpret the inspection description value in response to the user inspection request value. The example procedure may be utilized to perform at least a portion of an operation 20502 to interpret an inspection description value.

In an embodiment, and referring to FIG. 154, an apparatus for tracking inspection data may include an inspection chassis 15202 comprising a plurality of inspection sensors 15208 configured to interrogate an inspection surface; a first drive module 15204 coupled to the inspection chassis 15202, the first drive module 15204 comprising a first passive encoder wheel 15236 and a first non-contact sensor 15238 positioned in proximity to the first passive encoder wheel 15236, wherein the first non-contact sensor 15238 provides a first movement value 15232 corresponding to the first passive encoder wheel 15236; a second drive module 15210 coupled to the inspection chassis 15202, the second drive module 15210 comprising a second passive encoder wheel 15212 and a second non-contact sensor 15214 positioned in proximity to the second passive encoder wheel 15212, wherein the second non-contact sensor 15214 provides a second movement value 15222 corresponding to the second passive encoder wheel 15212; an inspection position circuit 15226 structured to determine a relative position 15228 of the inspection chassis 15202 in response to the first movement value 15232 and the second movement value 15222. The term relative position (and similar terms) as utilized herein should be understood broadly. Without limitation to any other aspect or description of the present disclosure, relative position includes any point defined with reference to another position, either fixed or moving. The coordinates of such a point are usually bearing, true or relative, and distance from an identified reference point. The identified reference point to determine relative position may include another component of the apparatus or an external component, a point on a map, a point in a coordinate system, or the like. The first and second movement values 15232, 15222 may be in response to a rotation of the first and second passive encoder wheels 15236, 15212 respectively. In an embodiment, the first and second non-contact sensors 15238, 15214 may be selected from a list consisting of a visual sensor, an electro-mechanical sensor, and a mechanical sensor. The apparatus may further include a processed data circuit 15216 structured to receive the relative position 15228 of the inspection chassis 15202 and inspection data 15230 from the plurality of inspection sensors 15208; and determine relative position-based inspection data 15220 in response to the relative position and the inspection data 15230. The inspection position circuit 15226 may be further structured to determine the relative position 15228 of the inspection chassis 15202 in response to a first circumference value 15224 of the first passive encoder wheel 15236 and a second circumference value 15240 of the second passive encoder wheel 15212. The first and second drive modules 15204,15210 may provide the first and second circumference values 15224, 15240 respectively to the inspection position circuit 15226. The inspection position circuit 15226 may be further structured to determine the relative position 15228 of the inspection chassis 15202 in response to a reference position 15218. In embodiments, the reference position 15218 may be selected from a list of positions consisting of: a global positioning system location, a specified latitude and longitude, a plant location reference, an inspection surface location reference, and an equipment location reference.

In an embodiment, and referring to FIG. 155, a method for determining a location of a robot, may include identifying an initial position of the robot 15302; providing a first movement value of a first encoder wheel for a first drive module 15304; providing a second movement value of a second encoder wheel for a second drive module 15308; calculating a passive position change value for the robot in response to the first and second movement values 15310; and determining a current position of the robot in response to the position change value and a previous position of the robot 15322. In embodiments, providing the first movement value comprises measuring a rotation of the first encoder wheel, wherein calculating a passive position change value is done in response to the first movement value and a circumference of the first encoder wheel, wherein calculating a passive position change value 15310 may be done in response to a distance between the first and second encoder wheels. The method may further include receiving a first driven movement value for the first drive module 15312; receiving a second driven movement value for the second drive module 15314; calculating a driven position change value for the robot in response to the first and second driven movement values 15318; determining a difference between the driven position change value and the passive position change value 15320; and setting an alarm value in response to the difference exceeding a maximum position noise value 15324.

In an embodiment, and referring to FIG. 156, a system for viewing inspection data may include an inspection robot including an inspection chassis 15404 comprising a plurality of inspection sensors 15406 configured to interrogate an inspection surface; a first drive module 15414 coupled to the inspection chassis, the first drive module 15414 comprising a first passive encoder wheel 15410 and a first non-contact sensor 15408 positioned in proximity to the first passive encoder wheel 15410, wherein the first non-contact sensor 15408 provides a first movement value 15422 corresponding to the first passive encoder wheel 15410; a second drive module 15418 coupled to the inspection chassis, the second drive module 15418 comprising a second passive encoder wheel 15416 and a second non-contact sensor 15440 positioned in proximity to the second passive encoder wheel 15416, wherein the second non-contact sensor 15440 provides a second movement value 15424 corresponding to the second passive encoder wheel 15416; an inspection position circuit 15436 structured to determine a relative position 15432 of the inspection robot 15402 in response to the first movement value 15422, the second movement value 15424, and a reference position 15434; and further structured to provide a position of the inspection robot 15402 relative to the reference position 15434 to a user display device 15441. The system may further include a processed data circuit 15430 structured to: receive the relative position 15432 of the inspection chassis 15404 and inspection data 15426 from a subset of the plurality of inspection sensors 15406; and determine relative position-based inspection data 15428 in response to the position and the inspection data. In embodiments, the user display device 15441 may be further structured to display the relative position-based inspection data 15428. The relative position-based inspection data 15428 may be displayed as an overlay of a map 15444 of the inspection surface. The inspection position circuit 15436 may be further structured to determine the relative position 15432 of the inspection robot in response to a reference position 15434. In embodiments, the reference position 15434 may be selected from a list of positions consisting of: a global positioning system location, a specified latitude and longitude, a plant location reference, an inspection surface location reference, and an equipment location reference. The inspection position circuit 15436 may be further structured to determine the relative position 15432 of the inspection chassis 15404 in response to a first circumference value 15412 of the first passive encoder wheel 15414 and a second circumference value 15420 of the second passive encoder wheel 15418.

In an embodiment, and referring to FIG. 154, an apparatus for tracking inspection data may include an inspection chassis 15202 comprising a plurality of inspection sensors 15208 configured to interrogate an inspection surface; a first drive module 15204 coupled to the inspection chassis 15202, the first drive module 15204 comprising a first passive encoder wheel 15236 and a first non-contact sensor 15238 positioned in proximity to the first passive encoder wheel 15236, wherein the first non-contact sensor 15238 provides a first movement value 15232 corresponding to the first passive encoder wheel 15236; a second drive module 15210 coupled to the inspection chassis 15202, the second drive module 15210 comprising a second passive encoder wheel 15212 and a second non-contact sensor 15214 positioned in proximity to the second passive encoder wheel 15212, wherein the second non-contact sensor 15214 provides a second movement value 15222 corresponding to the second passive encoder wheel 15212; an inspection position circuit 15226 structured to determine a relative position 15228 of the inspection chassis 15202 in response to the first movement value 15232 and the second movement value 15222. The term relative position (and similar terms) as utilized herein should be understood broadly. Without limitation to any other aspect or description of the present disclosure, relative position includes any point defined with reference to another position, either fixed or moving. The coordinates of such a point are usually bearing, true or relative, and distance from an identified reference point. The identified reference point to determine relative position may include another component of the apparatus or an external component, a point on a map, a point in a coordinate system, or the like. The first and second movement values 15232, 15222 may be in response to a rotation of the first and second passive encoder wheels 15236, 15212 respectively. In an embodiment, the first and second non-contact sensors 15238, 15214 may be selected from a list consisting of a visual sensor, an electro-mechanical sensor, and a mechanical sensor. The apparatus may further include a processed data circuit 15216 structured to receive the relative position 15228 of the inspection chassis 15202 and inspection data 15230 from the plurality of inspection sensors 15208; and determine relative position-based inspection data 15220 in response to the relative position and the inspection data 15230. The inspection position circuit 15226 may be further structured to determine the relative position 15228 of the inspection chassis 15202 in response to a first circumference value 15224 of the first passive encoder wheel 15236 and a second circumference value 15240 of the second passive encoder wheel 15212. The first and second drive modules 15204,15210 may provide the first and second circumference values 15224, 15240 respectively to the inspection position circuit 15226. The inspection position circuit 15226 may be further structured to determine the relative position 15228 of the inspection chassis 15202 in response to a reference position 15218. In embodiments, the reference position 15218 may be selected from a list of positions consisting of: a global positioning system location, a specified latitude and longitude, a plant location reference, an inspection surface location reference, and an equipment location reference.

In an embodiment, and referring to FIG. 155, a method for determining a location of a robot, may include identifying an initial position of the robot 15302; providing a first movement value of a first encoder wheel for a first drive module 15304; providing a second movement value of a second encoder wheel for a second drive module 15308; calculating a passive position change value for the robot in response to the first and second movement values 15310; and determining a current position of the robot in response to the position change value and a previous position of the robot 15322. In embodiments, providing the first movement value comprises measuring a rotation of the first encoder wheel, wherein calculating a passive position change value is done in response to the first movement value and a circumference of the first encoder wheel, wherein calculating a passive position change value 15310 may be done in response to a distance between the first and second encoder wheels. The method may further include receiving a first driven movement value for the first drive module 15312; receiving a second driven movement value for the second drive module 15314; calculating a driven position change value for the robot in response to the first and second driven movement values 15318; determining a difference between the driven position change value and the passive position change value 15320; and setting an alarm value in response to the difference exceeding a maximum position noise value 15324.

In an embodiment, and referring to FIG. 156, a system for viewing inspection data may include an inspection robot including an inspection chassis 15404 comprising a plurality of inspection sensors 15406 configured to interrogate an inspection surface; a first drive module 15414 coupled to the inspection chassis, the first drive module 15414 comprising a first passive encoder wheel 15410 and a first non-contact sensor 15408 positioned in proximity to the first passive encoder wheel 15410, wherein the first non-contact sensor 15408 provides a first movement value 15422 corresponding to the first passive encoder wheel 15410; a second drive module 15418 coupled to the inspection chassis, the second drive module 15418 comprising a second passive encoder wheel 15416 and a second non-contact sensor 15440 positioned in proximity to the second passive encoder wheel 15416, wherein the second non-contact sensor 15440 provides a second movement value 15424 corresponding to the second passive encoder wheel 15416; an inspection position circuit 15436 structured to determine a relative position 15432 of the inspection robot 15402 in response to the first movement value 15422, the second movement value 15424, and a reference position 15434; and further structured to provide a position of the inspection robot 15402 relative to the reference position 15434 to a user display device 15441. The system may further include a processed data circuit 15430 structured to: receive the relative position 15432 of the inspection chassis 15404 and inspection data 15426 from a subset of the plurality of inspection sensors 15406; and determine relative position-based inspection data 15428 in response to the position and the inspection data. In embodiments, the user display device 15441 may be further structured to display the relative position-based inspection data 15428. The relative position-based inspection data 15428 may be displayed as an overlay of a map 15444 of the inspection surface. The inspection position circuit 15436 may be further structured to determine the relative position 15432 of the inspection robot in response to a reference position 15434. In embodiments, the reference position 15434 may be selected from a list of positions consisting of: a global positioning system location, a specified latitude and longitude, a plant location reference, an inspection surface location reference, and an equipment location reference. The inspection position circuit 15436 may be further structured to determine the relative position 15432 of the inspection chassis 15404 in response to a first circumference value 15412 of the first passive encoder wheel 15414 and a second circumference value 15420 of the second passive encoder wheel 15418.

Referring now to FIG. 157, an apparatus for configuring an inspection robot for inspecting an inspection surface may include a route profile processing circuit 15510 structured to interpret route profile data 15504 for the inspection robot relative to the inspection surface. The planned route implies the way the inspection robot will traverse the surface, and is configurable. The route profile data 15504 may include the planned route, or may simply define the area to be inspected. The apparatus may also include a configuration determining circuit 15512 structured to determine one or more configurations 15518 for the inspection robot in response to the route profile data 15504. The apparatus may further include a configuration processing circuit 15514 structured to provide configuration data 15522 in response to the determined one or more configurations 15518, the configuration data 15522 defining, in part, one or more inspection characteristics for the inspection robot. For example, the configuration data 15522 may be provided to an inspection robot configuration circuit 15516. In another example, the configuration data 15522 may be provided to an operator, such as an operator on a site to help the operator ensure the right parts and capabilities are provided that satisfy the requirements and are responsive to the inspection surface. In yet another example, the configuration data 15522 may be provided to an operator that is remotely positioned, which may allow the operator to configure the robot before leaving for a site, where superior installation/adjustment infrastructure may be available. In embodiments, the apparatus may configure the inspection robot automatically without operator configuration. For example, the apparatus may automatically configure various features of the inspection robot, including one or more of sensor spacing, downforce, sensors activated, routing of robot, sensor sampling rates and/or sensor data resolution, on-surface inspected resolution as a function of surface position, or the like.

In embodiments, and referring to FIG. 158, the one or more inspection characteristics may include at least one inspection characteristic selected from the inspection characteristics consisting of: a type of inspection sensor 15602 for the inspection robot; a horizontal spacing 15610 between adjacent inspection sensors for the inspection robot; a horizontal spacing between inspection lanes for an inspection operation of the inspection robot; any spacing enforcement such as covering the lanes in separate inspection runs, front/back sensors, non-adjacent sensors, etc.; a magnitude of a downward force 15612 applied to a sled housing an inspection sensor of the inspection robot; a sled geometry 15628 for a sled housing an inspection sensor of the inspection robot; a tether configuration 15630 description for the inspection robot; a payload configuration 15632 for a payload of the inspection robot; a drive wheel configuration 15634 for the inspection robot; a type of a downward force biasing device 15614 for the inspection robot structured to apply a downward force on an inspection sensor of the inspection robot, an inspection sensor width 15604, an inspection sensor height 15608, or the like. The one or more inspection characteristics may include trajectories of any inspection characteristic. For example, the inspection characteristic may be adjustments made during an inspection run, such as Downforce A for portion A of the inspection route, Downforce B for portion B of the inspection route, etc. The tether configuration 15630 description may include conduits applicable (e.g., which ones to be included such as power, couplant, paint, cleaning solution, communication), sizing for conduits (couplant rate, power rating, length), selected outer surface (abrasion resistant, temperature rating), or the like. The payload configuration 15632 may be a sled/arm spacing, a sled configuration type (e.g., individual sled, sled triplets, new sled types), an arm configuration (articulations available, a couplant support/connection types, sensor interfaces), or the like. A drive wheel configuration 15634 may be a wheel contact shape (convex, concave, mixed); a surface material (coating, covering, material of enclosure for hub); a magnet strength and/or temperature rating, or the like.

The apparatus may further include a robot configuring circuit 15516 structured to configure the inspection robot in response to the provided configuration data 15506, wherein the robot configuring circuit 15516 is further structured to configure the inspection robot by performing at least one operation selected from the operations consisting of: configuring a horizontal spacing between inspection lanes for an inspection operation of the inspection robot; configuring at least one of an inspection route and a horizontal spacing between adjacent inspection sensors, thereby performing an inspection operation compliant with an on-surface inspected resolution target; or configuring a downward force biasing device to apply a selected down force to a sled housing an inspection sensor of the inspection robot. The on-surface inspected resolution target may include a positional map of the surface with inspected positions, and/or regions having defined inspection resolution targets. The positional map may be overlaid with inspection operations to be performed, sensor sampling rates, and/or sensor data resolutions. The configuration determining circuit 15512 may be further structured to determine a first configuration 15710 of the one or more configurations for a first portion of the inspection surface; and determine a second configuration 15712 of the one or more configurations distinct for a second portion of the inspection surface, wherein the second configuration is distinct from the first configuration. The route profile processing circuit 15510 may be further structured to interpret updated route profile data 15536, such as updated obstacle data 15538, during an inspection operation of the inspection surface by the inspection robot, the configuration determining circuit 15512 may be further structured to determine one or more updated configurations 15520 of the inspection robot in response to the updated route profile data 15536; and the configuration processing circuit 15514 may be further structured to provide updated configuration data 15540 in response to the determined updated one or more configurations 15520. The updated configuration data may include updated inspection sensor type 15616, updated inspection sensor width 15618, an updated inspection sensor height 15620, updated inspection sensor spacing 15622, updated downforce magnitude 15624, updated biasing device type 15626, updated sled geometry 15636, updated tether configuration 15638, updated payload configuration 15640, updated drive wheel configuration 15644, or the like.

The apparatus may further include a robot configuring circuit 15516 structured to re-configure the inspection robot in response to the updated one or more configurations 15520. The route profile data 15504 may include obstacle data 15508.

Referring to FIG. 159, a method for configuring an inspection robot 15708 for inspecting an inspection surface may include interpreting route profile data 15702 for the inspection robot relative to the inspection surface; determining one or more configurations 15704 for the inspection robot in response to the route profile data; and providing configuration data 15706 in response to the determined one or more configurations, the configuration data defining, at least in part, one or more inspection characteristics for the inspection robot. The one or more inspection characteristics include at least one inspection characteristic selected from the inspection characteristics consisting of a type of inspection sensor for the inspection robot; a horizontal spacing between adjacent inspection sensors for the inspection robot; a horizontal spacing between inspection lanes for an inspection operation of the inspection robot; a magnitude of a downward force applied to a sled housing an inspection sensor of the inspection robot; a sled geometry for a sled housing an inspection sensor of the inspection robot; a tether configuration description for the inspection robot; a payload configuration for a payload of the inspection robot; a drive wheel configuration for the inspection robot; and a type of a downward force biasing device for the inspection robot structured to apply a downward force to a sled housing an inspection sensor of the inspection robot. Providing the configuration data 15706 may include communicating the configuration data to a user device, wherein the user device is positioned at a distinct location from a location of the inspection surface. Communicating the configuration data to the user device may be performed before transporting the inspection robot to a location of the inspection surface. Determining one or more configurations for the inspection robot may be performed during an inspection operation of the inspection robot of the inspection surface. Determining one or more configurations may further include adjusting a configuration 15722 of the inspection robot in response to the determined one or more configurations for the inspection robot during the inspection operation of the inspection robot.

Adjusting the configuration 15722 of the inspection robot may include at least one operation selected from the operations consisting of: configuring a horizontal spacing between inspection lanes for an inspection operation of the inspection robot; configuring at least one of an inspection route and a horizontal spacing between adjacent inspection sensors, thereby performing an inspection operation compliant with an on-surface inspected resolution target; or configuring a downward force biasing device to apply a selected down force to a sled housing an inspection sensor of the inspection robot. The method may further include mounting an inspection sensor 15714 to the inspection robot in response to the provided configuration data. The method may further include mounting a drive module 15718 to the inspection robot in response to the provided configuration data. The method may further include adjusting an inspection sensor 15716 disposed on the inspection robot in response to the provided configuration data. Determining one or more configurations 15704 for the inspection robot in response to the route profile data comprises: determining a first configuration 15710 of the one or more configurations for a first portion of the inspection surface; and determining a second configuration 15712 of the one or more configurations for a second portion of the inspection surface, wherein the second configuration is distinct from the first configuration.

In an embodiment, a system may include an inspection robot comprising a payload comprising at least two inspection sensors coupled thereto; and a controller 802 comprising a route profile processing circuit 15510 structured to interpret route profile data 15504 for the inspection robot relative to an inspection surface; a configuration determining circuit 15512 structured to determine one or more configurations 15518 for the inspection robot in response to the route profile data 15504; and a configuration processing circuit 15514 structured to provide configuration data 15522 in response to the determined one or more configurations 15518, the configuration data defining, at least in part, one or more inspection characteristics for the inspection robot. The one or more inspection characteristics may include a type of inspection sensor for the inspection robot. The one or more inspection characteristics may include a horizontal spacing between adjacent inspection sensors for the inspection robot. The payload may include an adjustable sled coupling position for at least two sleds, each of the at least two sleds housing at least one of the at least two inspection sensors. The payload may include an adjustable arm coupling position for at least two arms, each of the at least two arms associated with at least one of the at least two inspection sensors. Each of the at least two arms further comprises at least one sled coupled thereto, each of the at least one sled housing at least one of the at least two inspection sensors.

The one or more inspection characteristics may include a horizontal spacing between inspection lanes for an inspection operation of the inspection robot, or any spacing enforcement, such as covering the lanes in separate inspection runs, front/back sensors, non-adjacent sensors, etc. The one or more inspection characteristics may include a magnitude of a downward force 15612 applied to a sled housing at least one of the at least two inspection sensors. The one or more inspection characteristics include a sled geometry 15628 for a sled housing at least one of the at least two inspection sensors. The one or more inspection characteristics include a tether configuration 15630 description for the inspection robot (e.g. conduits applicable (e.g., which ones to be included such as power, couplant, paint, cleaning solution, communication), sizing for conduits (couplant rate, power rating, length), selected outer surface (abrasion resistant, temperature rating), etc.), the system further including a tether structured to couple a power source and a couplant source to the inspection robot. The one or more inspection characteristics may include a payload configuration 15632 for the payload of the inspection robot. The payload configuration 15632 may include sled/arm spacing, sled configuration type (e.g., individual sled, sled triplets, new sled types), arm configuration (articulations available, couplant support/connection types, sensor interfaces), or the like. The one or more inspection characteristics may include a drive wheel configuration 15634 for the inspection robot (e.g. wheel contact shape (convex, concave, mixed); surface material (coating, covering, material of enclosure for hub); magnet strength and/or temperature rating). The one or more inspection characteristics may include a type of a downward force biasing device 15614 for the inspection robot structured to apply a downward force to a sled housing at least one of the at least two inspection sensors of the inspection robot. The system may further include a robot configuring circuit 15516 structured to configure the inspection robot in response to the provided configuration data. The robot configuring circuit 15516 may be further structured to configure the inspection robot by performing at least one operation selected from the operations consisting of: configuring a horizontal spacing between inspection lanes for an inspection operation of the inspection robot; configuring at least one of an inspection route and a horizontal spacing between adjacent inspection sensors, thereby performing an inspection operation compliant with an on-surface inspected resolution target; or configuring a downward force biasing device to apply a selected down force to a sled housing at least one of the at least two inspection sensors of the inspection robot. The on-surface inspected resolution target may include a positional map of the surface with inspected positions, and/or regions having defined inspection resolution targets which can be overlaid with inspection operations to be performed, sensor sampling rates, and/or sensor data resolutions. The configuration determining circuit 15512 may be further structured to determine a first configuration 15710 of the one or more configurations for a first portion of the inspection surface; and determine a second configuration 15712 of the one or more configurations distinct for a second portion of the inspection surface, wherein the second configuration is distinct from the first configuration. In embodiments, the route profile processing circuit 15510 may be further structured to interpret updated route profile data 15504 during an inspection operation of the inspection surface by the inspection robot; the configuration determining circuit 15512 may be further structured to determine one or more updated configurations 15520 of the inspection robot in response to the updated route profile data 15536; and the configuration processing circuit 15514 may be further structured to provide updated configuration data 15540 in response to the determined updated one or more configurations. The system may further include a robot configuring circuit 15526 structured to re-configure the inspection robot in response to the updated one or more configurations. In embodiments, the route profile data may include obstacle data 15508.

Turning now to FIG. 163, an example system and/or apparatus for traversing an obstacle with an inspection robot 100 (FIG. 1) is depicted. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example system depicted in FIG. 163. In certain embodiments, the inspection robot 100 may have one or more payloads 2 (FIG. 1) and may include one or more sensors 2202 (FIG. 29) on each payload.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

The example system includes the inspection robot 100 and one or more obstacle sensors 16440, e.g., lasers, cameras, sonars, radars, a ferrous substrate detection sensor, contact sensors, etc., coupled to the inspection robot and/or otherwise disposed to detect obstacle in the path of the inspection robot 100 as it inspects an inspection surface 500.

The system further includes a controller 802 having a number of circuits configured to functionally perform operations of the controller 802. The example controller 802 has an obstacle sensory data circuit 16402, an obstacle processing circuit 16406, an obstacle notification circuit 16410, a user interface circuit 16414, and/or an obstacle configuration circuit 16424. The example controller 802 may additionally or alternatively include aspects of any controller, circuit, or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the controller 802 are set forth, without limitation, in the portion of the disclosure referencing FIGS. 163-165.

The example controller 802 is depicted schematically as a single device for clarity of description, but the controller 802 may be a single device, a distributed device, and/or may include portions at least partially positioned with other devices in the system (e.g., on the inspection robot 100). In certain embodiments, the controller 802 may be at least partially positioned on a computing device associated with an operator of the inspection (not shown), such as a local computer at a facility including the inspection surface 500, a laptop, and/or a mobile device. In certain embodiments, the controller 802 may alternatively or additionally be at least partially positioned on a computing device that is remote to the inspection operations, such as on a web-based computing device, a cloud computing device, a communicatively coupled device, or the like.

Accordingly, as illustrated in FIGS. 163-165, the obstacle sensory data circuit 16402 interprets obstacle sensory data 16404 comprising data provided by the obstacle sensors 16440. The obstacle sensory data may include the position, type, traversal difficulty rating, imagery and/or any other type of information suitable for identifying the obstacle and determining a plan to overcome/traverse the obstacle. In embodiments, the obstacle sensory data 16404 may include imaging data from an optical camera of the inspection robot. The imaging data may be related to at least one of: the body/structure of the obstacle, a position of the obstacle, a height of the obstacle, an inspection surface surrounding the obstacle, a horizontal extent of the obstacle, a vertical extent of the obstacle, or a slope of the obstacle.

The obstacle processing circuit 16406 determines refined obstacle data 16408 in response to the obstacle sensory data 16404. Refined obstacle data 16408 may include information distilled and/or derived from the obstacle sensory data 16404 and/or any other information that the controller 802 may have access to, e.g., pre-known and/or expected conditions of the inspection surface.

The obstacle notification circuit 16410 generates and provides obstacle notification data 16412 to a user interface device (e.g., reference FIG. 218 and the related description) in response to the refined obstacle data 16408. The user interface circuit 16414 interprets a user request value 16418 from the user interface device, and determines an obstacle response command value 16416 in response to the user request value 16418. The user request value 16418 may correspond to a graphical user interface interactive event, e.g., menu selection, screen region selection, data input, etc.

The obstacle configuration circuit 16424 provides the obstacle response command value 16416 to the inspection robot 100 during the interrogating of the inspection surface 500. In embodiments, the obstacle response command value 16416 may correspond to a command to reconfigure 16420 the inspection robot and/or to adjust 16422 an inspection operation of the inspection robot. For example, in embodiments, the adjust inspection operation command 16422 may include a command that instructions the inspection robot to go around the obstacle, lift one or more payloads, change a downforce applied to one or more payloads, change a with between payloads and/or the sensors on the payloads, traverse/slide one or more payloads to the left or to the right, change a speed at which the inspection robot traverses the inspection surface, to "test travel" the obstacle, e.g., to proceed slowly and observe, to mark (in reality or virtually) the obstacle, to alter the planned inspection route/path of the inspection robot across the inspection surface, and/or to remove a portion from an inspection map corresponding to the obstacle.

In embodiments, the obstacle response command value 16416 may include a command to employ a device for mitigating the likelihood that the inspection robot will top over. Such device may include stabilizers, such as rods, mounted to and extendable away from the inspection robot. In embodiments, the obstacle response command value 16416 may include a request to an operator to confirm the existence of the obstacle. Operator confirmation of the obstacle may be received as a user request value 16418.

In embodiments, the obstacle configuration circuit 16424 determines, based at least in part on the refined obstacle data 16408, whether the inspection robot 100 has traversed an obstacle in response to execution of a command corresponding to the obstacle response command value 16416 by the inspection robot 100. The obstacle configuration circuit 16424 may determine that the obstacle has been traversed by detecting that the obstacle is no longer present in the obstacle sensory data 16404 acquired by the obstacle sensors 16440. In embodiments, the obstacle processing circuit 16406 may be able to determine the location of the obstacle from the obstacle sensory data 16404 and the obstacle configuration circuit 16424 may determine that the obstacle has been traversed by comparing the location of the obstacle to the location of the inspection robot. In embodiments, determining that an obstacle has been successfully traversed may be based at least in part on detecting a change in a flow rate of couplant used to couple the inspection sensors to the inspection surface. For example, a decrease in the couplant flow rate may indicate that the payload has moved past the obstacle.

The obstacle configuration circuit 16424 may provide an obstacle alarm data value 16426 in response to determining that the inspection robot 100 has not traversed the obstacle. As will be appreciated, in embodiments, the obstacle configuration circuit 16424 may provide the obstacle alarm data 16426 regardless of whether traversal of the obstacle was attempted by the inspection robot 100. For example, the obstacle configuration circuit 16424 may provide the obstacle alarm data value 16426 as a command responsive to the obstacle response command value 16416.

In embodiments, the obstacle processing circuit 16406 may determine the refined obstacle data 16408 as indicating the potential presence of an obstacle in response to comparing the obstacle data comprising an inspection surface depiction to a nominal inspection surface depiction. For example, the nominal inspection surface depiction may have been derived based in part on inspection data previously acquired from the inspection surface at a time the conditions of the inspection surface were known. In other words, the nominal inspection surface depiction may represent the normal and/or desired condition of the inspection surface 500. In embodiments, the presence of an obstacle may be determined based at least in part on an identified physical anomaly between obstacle sensory data 16404 and the nominal inspection surface data, e.g., a difference between acquired and expected image data, EMI readings, coating thickness, wall thickness, etc. For example, in embodiments, the obstacle processing circuit 16406 may determine the refined obstacle data 16408 as indicating the potential presence of an obstacle in response to comparing the refined obstacle data 16408, which may include an inspection surface depiction, to a predetermined obstacle inspection surface depiction. As another example, the inspection robot may identify a marker on the inspection surface and compare the location of the identified marker to an expected location of the marker, with differences between the two indicating a possible obstacle. In embodiments, the presence of an obstacle may be determined based on detecting a change in the flow rate of the couplant that couples the inspection sensors to the inspection surface. For example, an increase in the couplant flow rate may indicate that the payload has encountered an obstacle that is increasing the spacing between the inspection sensors and the inspection surface.

In embodiments, the obstacle notification circuit 16410 may provide the obstacle notification data 16412 as at least one of an operator alert communication and/or an inspection surface depiction of at least a portion of the inspection surface. The obstacle notification data 16412 may be presented to an operator in the form of a pop-up picture and/or pop-up inspection display. In embodiments, the obstacle notification data 16412 may depict a thin or non-ferrous portion of the inspection surface. In embodiments, information leading to the obstacle detection may be emphasized, e.g., circled, highlighted, etc. For example, portions of the inspection surface identified as being cracked may be circled while portions of the inspection surface covered in dust may be highlighted.

In embodiments, the obstacle processing circuit 16406 may determine the refined obstacle data 16408 as indicating the potential presence of an obstacle in response to determining a non-ferrous substrate detection of a portion of the inspection surface and/or a reduced magnetic interface detection of a portion of the inspection surface. Examples of reduced magnetic interface detection include portions of a substrate/inspection surface lacking sufficient ferrous material to support the inspection robot, lack of a coating, accumulation of debris and/or dust, and/or any other conditions that may reduce the ability of the magnetic wheel assemblies to couple the inspection robot to the inspection surface.

In embodiments, the obstacle notification circuit 16410 may provide a stop command to the inspection robot in response to the refined obstacle data 16408 indicating the potential presence of an obstacle.

In embodiments, the obstacle response command value 16416 may include a command to reconfigure an active obstacle avoidance system of the inspection robot 100. Such a command may be a command to: reconfigure a down force applied to one or more payloads coupled to the inspection robot; reposition a payload coupled to the inspection robot; lift a payload coupled to the inspection robot; lock a pivot of a sled, the sled housing and/or an inspection sensor of the inspection robot; unlock a pivot of a sled, the sled housing and/or an inspection sensor of the inspection robot; lock a pivot of an arm, the arm coupled to a payload of the inspection robot, and/or an inspection sensor coupled to the arm; unlock a pivot of an arm, the arm coupled to a payload of the inspection robot, and/or an inspection sensor coupled to the arm; rotate a chassis of the inspection robot relative to a drive module of the inspection robot; rotate a drive module of the inspection robot relative to a chassis of the inspection robot; deploy a stability assist device coupled to the inspection robot; reconfigure one or more payloads coupled to the inspection robot; and/or adjust a couplant flow rate of the inspection robot. In certain embodiments, adjusting the couplant flow rate is performed to ensure acoustic coupling between a sensor and the inspection surface, to perform a re-coupling operation between the sensor and the inspection surface, to compensate for couplant loss occurring during operations, and/or to cease or reduce couplant flow (e.g., if the sensor, an arm, and/or a payload is lifted from the surface, and/or if the sensor is not presently interrogating the surface). An example adjustment to the couplant flow includes adjusting the couplant flow in response to a reduction of the down force (e.g., planned or as a consequence of operating conditions), where the couplant flow may be increased (e.g., to preserve acoustic coupling) and/or decreased (e.g., to reduce couplant losses).

Turning now to FIG. 164, a method for traversing an obstacle with an inspection robot is shown. The method may include interpreting 16502 obstacle sensory data comprising data provided by an inspection robot, determining 16504 refined obstacle data in response to the obstacle sensory data; and generating 16506 an obstacle notification in response to the refined obstacle data. The method may further include providing 16508 the obstacle notification data to a user interface. The method may further include interpreting 16510 a user request value, determining 16512 an obstacle response command value in response to the user request value; and providing 16514 the obstacle command value to the inspection robot during an inspection run. In embodiments, the method may further include adjusting 16516 an inspection operation of the inspection robot in response to the obstacle response command value. In embodiments, adjusting 16516 the inspection operation may include stopping 16618 interrogation of the inspection surface. In embodiments, adjusting 16516 the inspection operation may include updating 16620 an inspection run plan. In embodiments, adjusting 16516 the inspection operation may include taking 16650 data in response to the obstacle. In embodiments, adjusting 16516 the inspection operation may include applying a virtual mark 16652. In embodiments, adjusting 16516 the inspection operation may include updating 16654 an obstacle map. In embodiments, adjusting 16516 the inspection operation may include acquiring 16656 an image and/or video of the obstacle. In embodiments, adjusting 16516 the inspection operation may include confirming 16658 the obstacle.

The method may further include reconfiguring 16518 an active obstacle avoidance system. In embodiments, reconfiguring 16518 the active obstacle avoidance system may include adjusting 16624 a down force applied to one or more payloads coupled to the inspection robot. In embodiments, reconfiguring 16518 the active obstacle avoidance system may include reconfiguring 16626 one or more payloads coupled to the inspection robot. Reconfiguring 16626 the one or more payloads may include adjusting a width between the payloads and/or one or more sensors on the payloads. In embodiments, reconfiguring 16518 the active obstacle avoidance system may include adjusting 16628 a couplant flow rate. In embodiments, reconfiguring 16518 the active obstacle avoidance system may include lifting 16630 one or more payloads coupled to the inspection robot. In embodiments, reconfiguring 16518 the active obstacle avoidance system may include locking 16632 and/or unlocking 16634 the pivot of a sled of a payload coupled to the inspection robot. In embodiments, reconfiguring 16518 the active obstacle avoidance system may include locking 16636 and/or unlocking 16638 the pivot of an arm that couples a sled to a body of a payload or to the inspection robot chassis. In embodiments, reconfiguring 16518 the active obstacle avoidance system may include rotating 16640 the inspection robot chassis. In embodiments, reconfiguring 16518 the active obstacle avoidance system may include rotating 16646 a drive module coupled to the inspection robot. In embodiments, reconfiguring 16518 the active obstacle avoidance system may include repositioning 16642, 16644 a payload coupled to the inspection robot.

In embodiments, the method may further include determining 16520 whether the inspection robot traversed the obstacle. In embodiments, the method may further include providing 16522 a data alarm in response to determining 16520 that the inspection robot has not traversed the obstacle.

The example of FIG. 166 is depicted on a controller 802 for clarity of the description. The controller 802 may be a single device, a distributed device, and/or combinations of these. In certain embodiments, the controller 802 may operate a web portal, a web page, a mobile application, a proprietary application, or the like. In certain embodiments, the controller 802 may be in communication with an inspection robot, a base station, a data store housing inspection data, refined inspection data, and/or other data related to inspection operations. In certain embodiments, the controller 802 is communicatively coupled to one or more user devices, such as a smart phone, laptop, desktop, tablet, terminal, and/or other computing device. A user may be any user of the inspection data, including at least an operator, a user related to the operator (e.g., a supervisor, supporting user, inspection verification user, etc.), a downstream customer of the data, or the like.

In an embodiment, an apparatus for performing an inspection on an inspection surface with an inspection robot may be embodied on the controller 802, and may include an inspection data circuit 16702 structured to interpret inspection data 16704 of the inspection surface and a robot positioning circuit 16706 structured to interpret position data 16712 of the inspection robot (e.g., a position of the inspection robot on the inspection surface correlated with inspection position data). The example controller 802 includes a user interaction circuit 16708 structured to interpret an inspection visualization request 16714 for an inspection map; a processed data circuit 16710 structured to link the inspection data 16704 with the position data 16712 to determine position-based inspection data 16716; an inspection visualization circuit 16718 structured to determine the inspection map 16720 in response to the inspection visualization request 16714 based on the position-based inspection data 16716. The example controller includes a provisioning circuit 16722 structured to provide the inspection map 16720 to a user device.

In an embodiment, the inspection map 16720 may include a layout of the inspection surface based on the position-based inspection data 16716, where the layout may be in real space (e.g., GPS position, facility position, or other description of the inspection surface coordinates relative to a real space), or virtual space (e.g., abstracted coordinates, user defined coordinates, etc.). The coordinates used to display the inspection surface may be any coordinates, such as Cartesian, cylindrical, or the like, and further may include any conceptualization of the axes of the coordinate system. In certain embodiments, the coordinate system and/or conceptualization utilized may match the inspection position data, and/or may be transformed from the inspection position data to the target display coordinates. In certain embodiments, the coordinates and/or conceptualization utilized may be selectable by the user.

In an embodiment, and referring to FIG. 167 and FIG. 168, the inspection map 16720 may include at least two features of the inspection surface and corresponding locations on the inspection surface, each of the at least two features selected from a list consisting of an obstacle 16808; a surface build up 16802; a weld line 16810; a gouge 16806; or a repaired section 16804. The example features represented on the inspection map 16720 are non-limiting, and any features that may be of interest to a user (of any type) may be provided. Additionally, the depictions of features in FIGS. 167-168 are non-limiting examples, and features may be presented with icons, color coding, hatching, alert marks (e.g., where the alert mark can be selected, highlighted for provision of a tool tip description, etc.). Additionally or alternatively, the features shown and/or the displayed representations may be adjustable by a user.

In an embodiment, the inspection data 16704 may include an inspection dimension such as, without limitation: a temperature of the inspection surface; a coating type of the inspection surface; a color of the inspection surface; a smoothness of the inspection surface; an obstacle density of the inspection surface; a radius of curvature of the inspection surface; a thickness of the inspection surface; and/or one or more features (e.g., grouped as "features", subdivided into one or more subgroups such as "repair", "damage", etc., and/or with individual feature types presented as an inspection dimension). In an embodiment, the inspection map 16720 may include a visualization property for the inspection dimension, the visualization property comprising a property such as: numeric values; shading values; transparency; a tool-tip indicator; color values; or hatching values. The utilization of a visualization property corresponding to an inspection dimension allows for improved contrast between displayed inspected aspects, and/or the ability to provide a greater number of inspection aspects within a single display. In certain embodiments, the displayed dimension(s), features, and/or representative data, as well as the corresponding visualization properties, may be selectable and/or configurable by the user.

In an embodiment, the position data may include a position marker 16812, such as an azimuthal indicator 16811 and a height indicator 16813, and wherein the inspection map 16720 includes visualization properties corresponding to position marker 16812, such as an azimuthal indicator 16811 or a height indicator 16813. The example of FIG. 167 depicts a position marker 16812 for a robot position (e.g., at a selected time, which may be depicted during an inspection operation and/or at a later time based on a time value for the inspection display). An example position marker 16812 may be provided in any coordinates and/or conceptualization. In certain embodiments, the inspection display may include coordinate lines or the like to orient the user to the position of displayed aspects, and/or may provide the position marker 16812 in response to a user input, such as selecting a location on the inspection surface, as a tooltip that appears at a user focus location (e.g., a mouse or cursor position), or the like.

In an embodiment, and referring to FIG. 173, a method for performing an inspection on an inspection surface with an inspection robot may include interpreting 16902 inspection data of the inspection surface; interpreting 16904 position data of the inspection robot during the inspecting, and linking 16908 the inspection data with the position data to determine position based inspection data; interpreting 16906 an inspection visualization request for an inspection map and, in response to the inspection visualization request, determining 16910 the inspection map based on the position-based inspection data; and providing the inspection map 16912 to a user device. In an embodiment, the inspection map 16720 may include a layout of the inspection surface, wherein the layout is in real space or virtual space. Determining 16910 the inspection map based on the position-based inspection data may include labeling 16914 each inspection dimension of the inspection data. In an embodiment, each inspection dimension may be labeled with a selected visualization property. In the method, the inspection map may be updated 16916, such as in response to a user focus value, wherein updating may include updating an inspection plan, selecting an inspection dimension to be displayed, or selecting a visualization property for an inspection dimension.

In an embodiment, a system may include an inspection robot comprising at least one payload; at least two arms, wherein each arm is pivotally mounted to a payload; at least two sleds, wherein each sled is mounted to one of the arms; a plurality of inspection sensors, each inspection sensor coupled to one of the sleds such that each sensor is operationally couplable to an inspection surface, wherein the sleds are horizontally distributed on the inspection surface at selected horizontal positions, and wherein each of the arms is horizontally moveable relative to a corresponding payload; and a controller 802 including an inspection data circuit 16702 structured to interpret inspection data 16704 of the inspection surface; a robot positioning circuit 16706 structured to interpret position data 16712 of the inspection robot; a user interaction circuit 16708 structured to interpret an inspection visualization request 16714 for an inspection map; a processed data circuit 16710 structured to link the inspection data 16704 with the position data 16712 to determine position-based inspection data 16716; an inspection visualization circuit 16718 structured to determine the inspection map 16720 in response to the inspection visualization request 16714 based on the position-based inspection data 16716; and a provisioning circuit 16722 structured to provide the inspection map 16720. In an embodiment, the inspection map 16720 may include a layout of the inspection surface based on the position-based inspection data 16716, wherein the layout is in at least one of: real space; and virtual space. The inspection visualization circuit 16718 may be further structured to identify a feature of the inspection surface and a corresponding location on the inspection surface, wherein the feature is selected from a list consisting of: an obstacle 16808; surface build up 16802; a weld line 16810; a gouge 16806; and a repaired section 16804.

In an embodiment, an apparatus for displaying an inspection map may include a user interaction circuit 16708 structured to interpret an inspection visualization request 16714 for an inspection map 16720; a processed data circuit 16710 structured to link inspection data 16704 with position data 16712 to determine position-based inspection data 16716; an inspection visualization circuit 16718 structured to determine the inspection map 16720 in response to the inspection visualization request 16714 and the position-based inspection data 16716; and a provisioning circuit 16722 structured to provide the inspection map 16720 to a user display, wherein the user interaction circuit 16708 is further structured to interpret a user focus value corresponding to the inspection map, wherein the user focus value is provided by a user input device. The apparatus may further include an inspection data circuit 16702 structured to interpret inspection data 16704 of an inspection surface; and a robot positioning circuit 16706 structured to interpret position data 16712 of an inspection robot; In an embodiment, the apparatus may further include updating 16916 the inspection map 16720 in response to the user focus value. Updating 16916 the inspection map may include updating an inspection plan, selecting an inspection dimension to be displayed, or selecting a visualization property for an inspection dimension. In some embodiments, updating the inspection map in response to a user focus value can be done without the robot changing anything. In an embodiment, the inspection map 16720 may include two features of the inspection surface and corresponding locations on the inspection surface, each of the two features selected from a list consisting of an obstacle 16808; a surface build up 16802; a weld line 16810; a gouge 16806; or a repaired section 16804. In an embodiment, the inspection data 16704 may include an inspection dimension selected from a list consisting of a temperature of the inspection surface; a coating type of the inspection surface; a color of the inspection surface; a smoothness of the inspection surface; an obstacle density of the inspection surface; a radius of curvature of the inspection surface; and a thickness of the inspection surface. In an embodiment, the inspection map 16720 may include visualization properties for each of the inspection dimensions, the visualization properties each including at least one of numeric values; shading values; transparency; a tool-tip indicator; color values; or hatching values. In embodiments, the position data 16712 may include an azimuthal indicator 16811 and a height indicator 16813, and wherein the inspection map 16720 includes visualization properties for the azimuthal indicator 16811 or the height indicator 16813. In embodiments, the user focus value may include event type data indicating that the user focus value was generated in response to at least one of a mouse position; a menu-selection; a touch screen indication; a key stroke; and a virtual gesture. In embodiments, the user focus value may include at least one of an inspection data range value; an inspection data time value; a threshold value corresponding to at least one parameter of the linked inspection data; and a virtual mark request corresponding to at least one position of the inspection map.

Referencing FIG. 169, an example inspection map 16720 including a number of frames 16822, 16824, 16826, 16828 is depicted. The frames 16822, 16824, 16826, 16828 may provide views of different inspection dimensions (e.g., separate data values, the same data values at distinct time periods, the same data values corresponding to distinct inspection operations, or the like). Additionally or alternatively, the frames 16822, 16824, 16826, 16828 may provide views of the same inspection dimensions for different positions on the inspection surface, and/or for positions on an offset inspection surface (e.g., a different inspection surface, potentially as a surface for a related component such as a cooling tower, etc.).

Referencing FIG. 170, an example inspection map 16720 includes pixelated regions 16830, or inspection units. The regions 16830 correspond to positions on the inspection surface, and the size and shape of regions 16830 may be selected according to a spatial resolution on the surface of inspection data, and/or according to a user selection. In certain embodiments, a given region 16832 may depict multiple inspection dimensions, for example using frames 16822, 16824, 16826, 16828, such that a user can determine changes in a parameter over time, view multiple parameters at the same time, or the like in one convenient view. In certain embodiments, a region 16830, and/or a frame 16822, 16824, 16826, 16828 may be selectable and/or focus-able to access additional data, etc. In certain embodiments, a larger view of the frames 16822, 16824, 16826, 16828 may be provided in response to a selection and/or focus of the region 16830.

Referencing FIG. 171, an inspection data map 16720 is depicted that may include selectable regions and/or frames. The example of FIG. 171 further includes a data representation 16834, with bar graph elements 16836 in the example. In certain embodiments, the bar graph elements 16836 may depict changes in one or more parameters over time and/or inspection sequence, comparisons to inspection data from offset inspection surfaces, and/or data corresponding to multiple parameters for a related region. In certain embodiments, the data representation 16834 may be provided in response to selection and/or focus of a region, and may further be configurable by the user. Referencing FIG. 172, an inspection data map 16720 is depicted that includes a data representation 16834 having a line graph 16838 element—for example depicting progression of a parameter over time, over inspection sequences, or the like.

In certain embodiments, any data representations herein, including at least data progressions in frames, bar graphs, line graphs, or the like may be determined based on inspection data, previous inspection data, interpolated inspection data (e.g., an estimated parameter value that may have existed at a point in time between a first inspection and a second inspection), and/or extrapolated inspection data (e.g., an estimated parameter value at a future time, for example determined from wear rate models, observed rates of change in regard to the same or an offset inspection surface, etc.).

Turning now to FIG. 174, an example controller 802 for a system and/or apparatus for providing an interactive inspection map 17004 (FIGS. 176-179) for an inspection robot 100 (FIG. 1) is depicted. The example inspection robot 100 includes any inspection robot having a number of sensors 2202 (FIG. 25) associated therewith and configured to inspect a selected area. Without limitation to any other aspect of the present disclosure, an inspection robot 100 as set forth throughout the present disclosure, including any features or characteristics thereof, is contemplated for the example system depicted in FIG. 174. In certain embodiments, the inspection robot 100 may have one or more payloads 2 (FIG. 1) and may include one or more sensors 2202 (FIG. 25) on each payload 2.

Operations of the inspection robot 100 provide the sensors 2202 in proximity to selected locations of an inspection surface 500 (FIG. 5) and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

The example system my include the inspection robot 100 and/or the controller 802. As shown in FIG. 174, the controller 802 may have a number of circuits configured to functionally perform operations of the controller 802. For example, the controller 802 may have an inspection visualization circuit 17002 and/or a user interaction circuit 17008 and/or an action request circuit 17012. The example controller 802 may additionally or alternatively include aspects of any controller, circuit, or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the controller 802 are set forth, without limitation, in the portion of the disclosure referencing FIGS. 174-180.

The example controller 802 is depicted schematically as a single device for clarity of description, but the controller 802 may be a single device, a distributed device, and/or may include portions at least partially positioned with other devices in the system (e.g., on the inspection robot 100). In certain embodiments, the controller 802 may be at least partially positioned on a computing device associated with an operator of the inspection (not shown), such as a local computer at a facility including the inspection surface 500, a laptop, and/or a mobile device. In certain embodiments, the controller 802 may alternatively or additionally be at least partially positioned on a computing device that is remote to the inspection operations, such as on a web-based computing device, a cloud computing device, a communicatively coupled device, or the like.

Accordingly, as illustrated in FIG. 174, inspection visualization circuit 17002 may provide an inspection map 17004 to a user device in response to inspection data 17006 provided by a plurality of sensors 2202 operationally coupled to the inspection robot 100 operating on the inspection surface 500. Without limitation to any other aspect of the present disclosure, an inspection robot 100 as set forth throughout the present disclosure, including any features or characteristics thereof, is contemplated for the example inspection map 17004 depicted in FIG. 174. The user interaction circuit 17008 may interpret a user focus value 17010 from the user device, the action request circuit 17012 may determine an action 17014 in response to the user focus value 17010, and the inspection visualization circuit 17002 may update the inspection map 17004 in response to the determined action 17014.

Turning to FIG. 175, in embodiments, the inspection map 17004 may include position-based inspection data 17016 such as the location of obstacles, the inspection robot 100, anomalies in the surface 500, markings of interest and/or other features. In embodiments, the inspection map 17004 may include visualization properties 17018 that correspond and/or are linked to inspection dimensions 17040. For example, the inspection dimensions may include characteristics and/or properties of the inspection surface 500 such as temperature 17042, surface coating type(s) 17044, smoothness (or bumpiness) 17048, an obstacle density 17050, a surface radius of curvature 17052, surface thickness 17054 and/or other characteristic of the surface 500. The temperature 17042 may be a surface temperature. The coating type 17044 may correspond to a layer of paint or a protective coating for the inspection surface 500. The surface color 17046 may represent the actual color of the surface, e.g., a level of green representing oxidation of a copper surface. The smoothness 17048 may represent a degree of how smooth and/or bumpy the surface 500 is, which may correspond to a level of difficulty the inspection robot 100 may have traversing a particular portion of the inspection surface 500. The obstacle density 17050 may correspond to how dense an identified obstacle may be. For example, how dense a coating of metallic dust may be over the surface 500. The surface radius curvature 17052 may correspond to how curved a particular portion of the inspection surface may be which may indicate a level of difficulty that the inspection robot 100 may have traversing particular portions of the inspection surface 500. The visualization properties 17018 may include numeric values 17020, shading values 17022, transparency values 17024, pattern values 17026, a tool-tip value 17028, a color value 17030, a hatching value 17032 and/or any other types of features for depicting a varying dimension 17040 across the surface 500. For example, in embodiments, various types of hatching 10732 may be used in the inspection map 17004 to show distinctions between surface coating types 17044 across portion of the inspection surface 500. Similarly, color values 17030 may be used in the inspection map 17004 to show a temperature gradient 17042 across the inspection surface. As will be appreciated, embodiments encompassing all possible matching/linking combinations between the inspection dimensions 17040 and the visualization properties 17018 used to depict the dimensions 17040 on the inspection map 17004 are contemplated.

In embodiments, the visualization circuit 17002 may link the positioned-based inspection data 17016 with time data 17034, that may include past inspection times/data 17036 and/or future inspection times/data 17038.

Turning to FIG. 176, in embodiments, the inspection map 17004 may include one or more frames 17102, 1704, 17106, 17108. In embodiments, each of the frames 17102, 1704, 17106, 17108 may depict a distinct inspection dimension 17040. For example, a first frame 17102 may depict a surface temperature 17042 gradient with a color 17030, a second frame 17104 may depict a coating type 17044 with patterns 17026, a third frame 17106 may depict surface thickness 17054 with numeric values, and/or a fourth frame 17108 may depict a smoothness 17048 with shading values 17022.

In embodiments, the frames 17102, 17104, 17106, 17108 may depict a change in an inspection dimension 17040 over time. For example, the four frames 17102, 1704, 17106, 17108 in FIG. 176 may show a change in a single dimension 17040, e.g., temperature 17042, over four distinct times $T_1$, $T_2$, $T_3$ and $T_4$. Accordingly, in embodiments, the user focus value 17010 may include one or more time values 17056, wherein the visualization circuit 17002 update the inspection map 17004 in response to the time values 17056. In embodiments, the one or more time values 17056 may include: a specified time value 17058, a specified time range 17060; a specified inspection event identifier 17062; a trajectory of an inspection dimension over time 17064; a specified inspection identifier 17066. A specified time value 17058 may include: a specific time and/or date, e.g., Saturday May 15, 2021 at 14:00 h (ET); and/or an amount of time referenced in relation to a known time, e.g., two (2) hours from the start of an inspection run. A specified time range 17060 may include a start and end time/date, and/or a specified amount of time from a known point, e.g., the last three (3) hours. A specified inspection event identifier 17062 may include information that identifies a particular event that may have occurred, e.g., the second time an obstacle was encountered. A specified inspection identifier 17066 may include information that identifies a particular inspection, e.g., the second inspection of site "A".

In embodiments wherein the time value 17056 is a trajectory 17064 of an inspection dimension 17040 over time, the inspection dimension over time may be representative of at least one of: a previous inspection run, a predicted inspection run, or an interpolation between two inspection runs. For example, in an embodiment, a first frame 17102 may depict a dimension 17040 at a past time $T_1$, frame 17106 may depict the dimension as predicted at a future time $T_3$, and frame 17104 may depict an interpolation of frames 17102 and 17106 to provide an estimate of the dimension 17040 at a time $T_2$ between $T_1$ and $T_3$.

A trajectory, as used herein, indicates a progression, sequence, and/or scheduled development of a related parameter over time, operating conditions, spatial positions, or the like. A trajectory may be a defined function (e.g., corresponding values of parameter A that are to be utilized for corresponding values of parameter B), an indicated direction (e.g., pursuing a target value, minimizing, maximizing, increasing, decreasing, etc.), and/or a state of an operating system (e.g., lifted, on or off, enabled or disabled, etc.). In certain embodiments, a trajectory indicates activation or actuation of a value over time, activation or actuation of a value over a prescribed group of operating conditions, activation or actuation of a value over a prescribed spatial region (e.g., a number of inspection surfaces, positions and/or regions of a specific inspection surface, and/or a number of facilities), and/or activation or actuation of a value over a number of events (e.g., scheduled by event type, event occurrence frequency, over a number of inspection operations, etc.). In certain embodiments, a trajectory indicates sensing a parameter, operating a sensor, displaying inspection data and/or visualization based on inspection data, over any of the related parameters (operating conditions, spatial regions, etc.) listed foregoing. The examples of a trajectory set forth with regard to the presently described embodiments are applicable to any embodiments of the present disclosure, and any other descriptions of a trajectory set forth elsewhere in the present disclosure are applicable to the presently described embodiments.

As illustrated in FIG. 177, in embodiments, the frames 17102, 17104, 17106 and/or 17108 may depict past and future/predicted paths of the inspection robot 100 over the inspection surface 500. For example, frame 17102 may show a past path 17110 in which no obstacle was detected. Frames 17104 and 17106 may show other past paths 17112 and 17114 in which an obstacle was detected and successfully avoided. Frame 17108 may show a proposed path 17116 based at least in part on information learned from one or more of the previous paths 17110, 17112 and/or 17114.

Referring now to FIGS. 175 and 178, in embodiments, the inspection map may include one or more display layers 10768 which, in embodiment, may be collections of features and/or visualization properties that can have their visibility in the inspection map 17004 collectively toggled by setting an activation state value via the visualization circuit 17002 in response to the user focus value 17010. In other words, a user may toggle display of individual layers via the graphical user interface displaying the inspection map 17004. As will be understood, FIG. 178 depicts layers 17118 and 17122 in dashed lines to represent that they have been made inactive, e.g., not visible, while layers 17120 and 17124 are depicted in solid lines to represent that they have been made active, e.g., visible.

The layers 17068 may have an ordering on a z-axis of the inspection map 17068. For example, layer 17118 may be depicted on top of layer 17120, which is depicted on top of layer 17122, which is depicted on top of layer 17124. Each of the layers 17068 may correspond to: an inspection dimension 17040, to include coatings 17044, part overlays 17074, remaining life 17076, scheduled maintenance 17078 and/or planned downtime 17080. Part overlays 17074 may include depicting schematics and/or actual images of components, e.g., valves, pipe heads, walls, etc., disposed on the inspection surface 500. The remaining life 17076 may include depicting an estimated remaining life expectancy for one or more portions of the inspection surface 500. For example, portions of a metal ship hull may have varying degrees of corrosion depending on the amount of exposure to salt, water and air, wherein the amount of time until any particular portion needs to be replaced can be shown as remaining life expectancy. As shown in FIG. 179, a layer 17120 may depict one or more downtime/maintenance values, e.g., spatial depictions such as zones, scheduled for maintenance 17126 and/or downtime 17128. The downtime/maintenance values 17126 and/or 1728 may include information specifying time periods and/or other information regarding the nature and/or cause for the scheduled maintenance and/or downtime.

Illustrated in FIG. 180 is a method for providing an interactive inspection map. The method may include providing 17202 an inspection map 17004 to a user device, interpreting 17204 a user focus value 17010, determining 17206 an action 17014 in response to the user focus value 17010, updating 17208 the inspection map 17004 in response to the determined action 17014, and/or providing 17210 the updated inspection map 17004. As disused above, the inspection map 17004 may include positioned based inspection data 17016 of an inspection surface 500.

In embodiments, updating 17208 the inspection map 17004 may include linking 17212 at least two inspection dimensions 17040 to at least two visualization properties 17018 of the inspection map 17004. In embodiments, updating 17208 the inspection map 17004 may include linking time data 17034, e.g., past inspection data 17036 and/or future/predicted inspection data 17038, to the position-based inspection data 17016. In embodiments, updating 17208 the inspection map 17004 may include determining 17216 one or more display frames 17102, 17104, 17106, 17108 of the inspection map 17004 over one or more periods included in the time data 17034. In embodiments, updating 17208 the inspection map 17004 may include setting 17218 an activation state value of at least one or more display layers 17102, 17104, 17106, 17108. In embodiments, the one or more display frames 17102, 17104, 17106, 17108 may include: an inspection dimension layer 17040; a coating layer 17044; a part overlay layer 17074; a scheduled maintenance layer 17078; and/or a planned downtime layer 17080.

Referencing FIG. 216, an example system 21600 for rapid validation of inspection data provided by an inspection robot is depicted. A system having the capability to perform rapid validation of inspection data provides numerous benefits over previously known systems, for example providing for earlier communication of inspection data to customers of the data, such as an owner or operator of a facility having an inspection surface. Sharing of inspection data with the consumer of the data requires that the data be validated, to manage risk, liability, and to ensure that the inspection data can be utilized for the intended purpose, which may include providing the data to regulatory agencies, for maintenance records, to fulfill contractual obligations, and/or to preserve inspection information that may be later accessed for legal, regulatory, or other critical purposes. Additionally, providing access to the inspection data may be later understood for certain purposes to put the customer on notice of the results indicated by the inspection data. Accordingly, before inspection information is shared to a customer of the data, including before information is made available for access to a customer of the data, validation of the data, for example to ensure that the inspection data collected accurately represents the condition of the inspection surface. Additionally, the availability of rapid validation of inspection data has a number of additional benefits in view of the embodiments of inspection robots and related systems, procedures, and the like, of the present disclosure. For example, rapid validation of inspection data allows for reconfiguration of the inspection robot, allowing for a corrective action to be taken during the inspection operations and achieve a successful inspection operation. The availability of highly configurable inspection robot embodiments further allows for configuring an inspection robot to address issues of the inspection operation that lead to invalid data collection.

A data validation that is rapid, as used herein, and without limitation to any other aspect of the present disclosure, includes a validation capable of being performed in a time relevant to the considered downstream utilization of the validated data. For example, a validation that can be performed during the inspection operation, and/or before the completion of the inspection operation, may be considered a rapid validation of inspection data in certain embodiments, allowing for the completion of the inspection operation configured to address issues of the inspection operation that lead invalid data collection. Certain further example rapid validation times include: a validation that can be performed before the operator leaves the location of the inspection surface (e.g., without requiring the inspection robot be returned to a service or dispatching facility for reconfiguration); a validation that can be performed during a period of time before a downstream customer (e.g., an owner or operator of a facility including the inspection surface; an operator of the inspection robot performing the inspection operations; and/or a user related to the operator of the inspection robot, such as a supporting operator, supervisor, data verifier, etc.) has a requirement to utilize the inspection data; and/or a validation that can be performed within a specified period of time (e.g., before a second inspection operation of a second inspection surface at a same facility including both the inspection surface and the second inspection surface; within a specified calendar period such as a day, three days, a week, etc.), for example to ensure that a subsequent inspection operation can be performed with a configuration responsive to issues that lead to the invalid data collection. An example rapid validation operation includes a validation that can be performed within a specified time related to interactions between an entity related to the operator of the inspection robot and an entity related to a downstream customer. For example, the specified time may be a time related to an invoicing period for the inspection operation, a warranty period for the inspection operation, a review period for the inspection operation, and or a correction period for the inspection operation. Any one or more of the specified times related to interactions between the entities may be defined by contractual terms related to the inspection operation, industry standard practices related to the inspection operation, an understanding developed between the entities related to the inspection operation, and/or the ongoing conduct of the entities for a number inspection operations related to the inspection operation, where the number of inspection operations may be inspection operations for related facilities, related inspection surfaces, and/or previous inspection operations for the inspection surface. One of skill in the art, having the benefit of the disclosure herein and information ordinarily available when contemplating a particular system and/or inspection robot, can readily determine validation operations and validation time periods that are rapid validations for the purposes of the particular system.

An example system 21600 includes an inspection robot 21602 that interprets inspection base data including data provided by an inspection robot interrogating an inspection surface with a plurality of inspection sensors. The inspection robot 21602 may include an inspection robot configured according to any of the embodiments or aspects as set forth in the present disclosure.

The example system 21600 includes a controller 21604 configured to perform rapid inspection data validation operations. The controller 21604 includes a number of circuits configured to functionally execute operations of the controller 21604. An example controller 21604 includes an inspection data circuit that interprets inspection base data comprising data provided by the inspection robot interrogating the inspection surface with a number of inspection sensors, an inspection processing circuit that determines refined inspection data in response to the inspection base data, an inspection data validation circuit that determines an inspection data validity value in response to the refined inspection data, and a user communication circuit that provides a data validity description to a user device in response to the inspection data validity value. Further details of an example controller 21604 are provided in the portion referencing FIG. 217. The example system 21600 further includes a user device 21606 that is communicatively coupled to the controller 21604. The user device 21606 is configured to provide a user interface for interacting operations of the controller 21604 with the user 21610, including providing information, alerts, and/or notifications to the user 21610, receiving user requests or inputs and communicating those to the controller 21604, and accessing a data store 21608, for example to provide access to data for the user 21610.

Referencing FIG. 217, an example controller 21604 for performing operations to rapidly validate inspection data is depicted. The example controller 21604 is compatible for use in a system 21600 such as the system of FIG. 216. The example controller 21604 includes an inspection data circuit 21902 that interprets inspection base data 21910 including data provided by an inspection robot interrogating an inspection surface with a number of inspection sensors. The example controller 21604 further includes an inspection processing circuit 21904 that determines refined inspection data 21916 in response to the inspection base data 21910. The refined inspection data 21916 includes processed data from the inspection base data 21910, such as refined UT sensor data to determine wall thickness values, coating values, or the like, EM sensor data (e.g., induction data, conductive material proximity data, or the like), and/or combined sensor data utilized in models, virtual sensors, or other post-processed values from the inspection base data 21910. The example controller 21604 includes an inspection data validation circuit 21908 that determines an inspection data validity value 21914 that provides a data validity description 21912 in response to the refined inspection data 21916. Without limitation to any other aspect of the present disclosure, the inspection data validation circuit 21908 determines the inspection data validity value 21914 in response to determining a consistency of the inspection base data 21910 (e.g., comparing a rate of change of the data versus time, sampling values, and/or position on the inspection surface), compared to expected values and/or rationalized values, and/or relative to detected conditions (e.g., a lifted payload and/or sensor, a fault condition of a component of the inspection robot, the presence of an obstacle, etc.) to determine the inspection data validity value 21914.

The example controller 21604 further includes a user communication circuit 21906 that provides a data validity description 21912 to a user device in response to the inspection data validity value 21914. In certain embodiments, the data validity description 21912 includes an indication that inspection data values are validated, potentially not valid, likely to be invalid, and/or confirmed to be invalid. In certain embodiments, the data validity description 21912 is provided as a layer, dimension, and/or data value overlaid onto a depiction of the inspection surface. In certain embodiments, the user associated with the user device is an operator, a user related to the operator of the inspection robot, such as a supporting operator, supervisor, data verifier, etc., and/or a downstream customer of the inspection data. In certain embodiments, information provided with the inspection data validity value 21914, and/or the data and/or format of the inspection data validity value 21914, is configured according to the user. For example, where the user is a downstream customer of the inspection data, the inspection data validity value 21914 may be limited to a general description of the inspection operation, such as to avoid communicating potentially invalid inspection data to the downstream customer. In another example, such as for a user associated with an operator of the inspection information that may be verifying the inspection operation and/or inspection data, the inspection data validity value 21914 may include and/or be provided with additional data, such as parameter utilized to determine that the inspection data validity value 21914 may be low, fault code status of the inspection robot, indicators of the inspection robot condition (e.g., actuator positions, inspection sensors active, power levels, couplant flow rates, etc.).

In certain embodiments, the controller 21604 includes the user communication circuit 21906 further providing the inspection data validity value 21914 as a notification or an alert, for example in response to determining the inspection data validity value 21914 is not a confirmed valid value. In certain embodiments, the notification and/or alert is provided to the user device, which may be one of several user devices, such as a computing device, a mobile device, a laptop, a desktop, or the like. In certain embodiments, the user communication circuit 21906 provides the notification or alert to the user device by sending a text message, e-mail, message for an application, publishing the notice to a web portal, web pages, monitoring application, or the like, where the communication is accessible to the user device.

An example user communication circuit 21906 provides at least a portion of the refined inspection data 21916 to the user device in response to determining the inspection data validity value 21914 is not a confirmed valid value. For example the user communication circuit 21906 may provide the refined inspection data 21916 that is associated with the potential invalidation determination, representative data values from the refined inspection data 21916 that is associated with the potential invalidation determination, and/or data preceding the refined inspection data 21916 that is associated with the potential invalidation determination. In certain embodiments, the parameters of the refined inspection data 21916 that are provided with the data validity description 21912 are configured at least partially in response to a user validity request value 21928.

An example user communication circuit 21906 further provides refinement metadata 21918 corresponding to the portion of the refined inspection data 21916 provided with the data validity description 21912. Example and non-limiting refinement metadata 21918 values include one or more of: sensor calibration values corresponding to the number of inspection sensors (e.g., calibration settings for the sensors, values used to calculate wall thickness, delay line values, etc.), a fault description for the inspection robot (e.g., faults active, faults in processing such as faults about to be set, faults recently cleared, etc.), a coupling description for the number of inspection sensors (e.g., direct or indirect indicators whether sensor coupling to the inspection surface is successful, such as actuator positions, down force descriptions, couplant pressure parameters, sled positions, etc.), a re-coupling operation record for the number of inspection sensors (e.g., re-coupling operations performed over time and/or inspection surface position preceding and/or during the potentially invalid data, for example allowing for determination of an indication of a coupling problem, statistical analysis of re-coupling events, or the like), a scoring value record for the at least a portion of the refined inspection data (e.g., determinations of refined inspection data determined from a primary mode scoring value relative to a secondary mode scoring value, progression of scores over time and/or related to inspection surface position, scores utilized for data collection, ratios of primary mode to secondary mode scores utilized for data collection, etc.), and/or operational data for the inspection robot (e.g., to allow for determination of anomalies in operational data, to confirm that operations are nominal, track trends, or the like).

An example user communication circuit 21906 provides offset refined inspection data 21920 to the user device in response to determining the inspection data validity value 21914 is not a confirmed valid value. For example, the offset refined inspection data 21920 may include data preceding the refined inspection data 21916 associated with the potentially invalid data, related data such as data taken in a similar position (e.g., a similar vertical position, dating having similar scoring or other operational parameters to the potentially invalid data, or the like). In certain embodiments, the user communication circuit 21906 further provides offset metadata 21922 corresponding to the offset refined inspection data 21920.

An example inspection data validation circuit 21908 further determines the inspection data validity value 21914 as a categorical description of the inspection data validity status, such as: a confirmed valid value, a suspect valid value, a suspect invalid value, and/or a confirmed invalid value. In certain embodiments, the categorical description may be determined according to the determinations made in response to the information utilized to determine the inspection data validity value 21914 and the confidence in that information. In certain embodiments, where the refined inspection data 21916 has indicators that the data may be invalid (e.g., a fault code, coupling information, etc.) but the data appears to be valid (e.g., consistent with adjacent data, within expected ranges, etc.), the data may be determined as a suspect valid value. In certain embodiments, wherein the refined inspection data 21916 has stronger indicator that the data may be invalid, and/or the data is marginally valid, the data may be determined as a suspect invalid value. In certain embodiments, where a determinative indicator is present that the data is not valid (e.g., a sensor has failed, a position of the sled/sensor is inconsistent with valid data, etc.) and/or indicators that the data is very likely to be invalid, the data may be determined to be confirmed invalid.

In certain embodiments, the inspection data validation circuit 21908 determines the inspection data validity value 21914 in response to a validity index description 21924, and comparing the validity index description 21924 to a number of validity threshold values (e.g., values determined to relate to validity descriptions, such as valid, invalid, and/or suspected versions of these). In certain embodiments, the validity index description 21924 may be determined by scoring a number of contributing factors to the invalidity determination, and combining the contributing factors into an index for relative comparison of invalidity determinations. An example inspection data validation circuit 21908 further determines the inspection data validity value 21914 in response to a validity event detection 21926. In certain embodiments, certain events provide a strong indication that related data is invalid, and/or provide a determinative indication that related data is invalid. For example, certain fault codes and/or failed components of the inspection robot may indicate that related data may be invalid and/or is more likely to be invalid. In certain embodiments, certain indicators such as a raised payload, a deactivated sensor, or the like, may provide a determinative indication that related data is invalid.

In certain embodiments, the user communication circuit 21906 further provides the inspection data validity value 21914 as one of a notification or an alert in response to determining the inspection data validity value is not a confirmed valid value. In certain further embodiments, the user communication circuit 21906 further configures a content of the one of the notification or the alert in response to a value of the inspection data validity value 21914, for example providing a more intrusive alert or notification in response to an inspection data validity value 21914 indicating a higher likelihood of invalid data, and/or based on the criticality of the potentially invalid data.

An example user communication circuit 21906 further interprets a user validity request value 21928 and provides one or more of a portion of the refined inspection data 21916 to the user device in response to the user validity request value 21928, a portion of the refined inspection data 21916 to the user device in response to the user validity request value 21928, offset refined inspection data 21920, and/or offset metadata 2192 corresponding to the offset refined inspection data 21920 in response to the user validity request value 21928.

Referencing FIG. 220, an example procedure for providing rapid data validation includes an operation 22002 to determine refined inspection data in response to inspection base data provided by an inspection robot interrogating an inspection surface with a plurality of inspection sensors, an operation 22004 to determine an inspection data validity value in response to the refined inspection data, and an operation 22006 to provide a data validity description to a user device in response to the inspection data validity value.

The example procedure further includes an operation 22008 to determine whether the inspection data validity value indicates that the refined inspection data is a confirmed valid value. In response to the operation 22008 determining the refined inspection data is not a confirmed valid value, the procedure includes an operation 22010 to provide an alert and/or notification to a user device. The example procedure further includes an operation 22012 to provide the refined inspection data and/or metadata corresponding to the refined inspection data, and an operation 22014 to provide offset refined data and/or offset metadata corresponding to the offset refined data.

Referencing FIG. 221, an example procedure for providing rapid data validation includes an operation 22102 to interpret a user validity request value, for example request values relating to alerts and/or notifications to be provided, and/or related to data to be provided to the user in response to a determination that potentially invalid inspection data is found. The example procedure further includes an operation 22104 to configure alerts and/or notifications in response to the user validity request value. The example procedure further includes an operation 22106 to determine an inspection data validity value based on a validity index description and/or a validity event detection. The example procedure further includes an operation 22008 to determine whether the inspection data validity value is a confirmed valid value. In response to the operation 22008 determining that the inspection data validity value is not a confirmed valid value, the procedure includes an operation 22010 to provide an alert and/or notification to the user device. The example procedure further includes an operation 22102 to interpret a user validity request value (e.g., to configure data values provided in response to detected potentially invalid data, and/or to provide alert and/or notification information), and an operation 22108 to configure provided data based on the user validity request value. The example procedure further includes an operation 22110 to provide refined inspection data, offset refined inspection data, and/or metadata for one or more of these, in response to a determination that potentially invalid inspection data is present.

Referencing FIG. 160, an example controller 16102 is depicted, where the controller 16102 is configured to perform operations for rapid response to inspection data, for example inspection data collected by an inspection robot performing an inspection operation on an inspection surface. The example controller 16102 includes a number of circuits configured to functionally execute certain operations of the controller 16102. The example controller 16102 depicts an example logical arrangement of circuits for clarity of the description, but circuits may be distributed, in whole or part, among a number of controllers, including an inspection robot controller, a base station controller, an operator computing device, a user device, a server and/or cloud computing device, and/or as an application provided at least in part on any one or more of the foregoing. In certain embodiments, the controller 16102 and/or portions of the controller 16102 are utilizable to perform certain operations associated with embodiments presented throughout the present disclosure.

A response, as used herein, and without limitation to any other aspect of the present disclosure, includes an adjustment to at least one of: an inspection configuration for the inspection robot while on the surface (e.g., a change to sensor operations; couplant operations; robot traversal commands and/or pathing; payload configurations; and/or down force configuration for a payload, sled, sensor, etc.); a change to display operations of the inspection data; a change to inspection data processing operations, including determining raw sensor data, minimal processing operations, and/or processed data values (e.g., wall thickness, coating thickness, categorical descriptions, etc.); an inspection configuration for the inspection robot performed with the inspection robot removed from the inspection surface (e.g., changed wheel configurations, changed drive module configurations; adjusted and/or swapped payloads; changes to sensor configurations (e.g., switching out sensors and/or sensor positions); changes to hardware controllers (e.g., switching a hardware controller, changing firmware and/or calibrations for a hardware controller, etc.); and/or changing a tether coupled to the inspection robot. The described responses are non-limiting examples, and any other adjustments, changes, updates, or responses set forth throughout the present disclosure are contemplated herein for potential rapid response operations. Certain responses are described as performed while the inspection robot is on the inspection surface and other responses are described as performed with the inspection robot removed from the inspection surface, although any given response may be performed in the other condition, and the availability of a given response as on-surface or off-surface may further depend upon the features and configuration of a particular inspection robot, as set forth in the multiple embodiments described throughout the present disclosure. Additionally or alternatively, certain responses may be available only during certain operating conditions while the inspection robot is on the inspection surface, for example when the inspection robot is in a location physically accessible to an operator, and/or when the inspection robot can pause physical movement and/or inspection operations such as data collection. One of skill in the art, having the benefit of the present disclosure and information ordinarily available when contemplating a particular system and/or inspection robot, can readily determine response operations available for the particular system and/or inspection robot.

A response that is rapid, as used herein, and without limitation to any other aspect of the present disclosure, includes a response capable of being performed in a time relevant to the considered downstream utilization of the response. For example, a response that can be performed during the inspection operation, and/or before the completion of the inspection operation, may be considered a rapid response in certain embodiments, allowing for the completion of the inspection operation utilizing the benefit of the rapid response. Certain further example rapid response times include: a response that can be performed at the location of the inspection surface (e.g., without requiring the inspection robot be returned to a service or dispatching facility for reconfiguration); a response that can be performed during a period of time wherein a downstream customer (e.g., an owner or operator of a facility including the inspection surface; an operator of the inspection robot performing the inspection operations; and/or a user related to the operator of the inspection robot, such as a supporting operator, supervisor, data verifier, etc.) of the inspection data is reviewing the inspection data and/or a visualization corresponding to the inspection data; and/or a response that can be performed within a specified period of time (e.g., before a second inspection operation of a second inspection surface at a same facility including both the inspection surface and the second inspection surface; within a specified calendar period such as a day, three days, a week, etc.). An example rapid response includes a response that can be performed within a specified time related to interactions between an entity related to the operator of the inspection robot and an entity related to a downstream customer. For example, the specified time may be a time related to an invoicing period for the inspection operation, a warranty period for the inspection operation, a review period for the inspection operation, and or a correction period for the inspection operation. Any one or more of the specified times related to interactions between the entities may be defined by contractual terms related to the inspection operation, industry standard practices related to the inspection operation, an understanding developed between the entities related to the inspection operation, and/or the ongoing conduct of the entities for a number inspection operations related to the inspection operation, where the number of inspection operations may be inspection operations for related facilities, related inspection surfaces, and/or previous inspection operations for the inspection surface. One of skill in the art, having the benefit of the disclosure herein and information ordinarily available when contemplating a particular system and/or inspection robot, can readily determine response operations and response time periods that are rapid responses for the purposes of the particular system.

Certain considerations for determining whether a response is a rapid response include, without limitation, one or more of:

the purpose of the inspection operation, how the downstream customer will utilize the inspection data from the inspection operation, and/or time periods related to the utilization of the inspection data;

entity interaction information such as time periods wherein inspection data can be updated, corrected, improved, and/or enhanced and still meet contractual obligations, customer expectations, and/or industry standard obligations related to the inspection data;

source information related to the response, such as whether the response addresses an additional request for the inspection operation after the initial inspection operation was performed, whether the response addresses initial requirements for the inspection operation that were available before the inspection operation was commenced, whether the response addresses unexpected aspects of the inspection surface and/or facility that were found during the inspection operations, whether the response addresses an issue that is attributable to the downstream customer and/or facility owner or operator, such as:

inspection surface has a different configuration than was indicated at the time the inspection operation was requested;

the facility owner or operator has provided inspection conditions that are different than planned conditions, such as couplant availability, couplant composition, couplant temperature, distance from an available base station location to the inspection surface, coating composition or thickness related to the inspection surface, vertical extent of the inspection surface, geometry of the inspection surface such as pipe diameters and/or tank geometry, availability of network infrastructure at the facility, availability of position determination support infrastructure at the facility, operating conditions of the inspection surface (e.g., temperature, obstacles, etc.);

additional inspected conditions are requested than were indicated at the time of the inspection operation was requested; and/or additional inspection robot capabilities such as marking, repair, and/or cleaning are requested than were indicated at the time the inspection operation was requested.

The example controller 16102 includes an inspection data circuit 16104 that interprets inspection base data 16106 (e.g., raw sensor data and/or minimally processed data inspection sensors) provided by an inspection robot 16140 interrogating an inspection surface with a number of inspection sensors 16142. The example controller 161012 further includes an inspection processing circuit 16108 that determines refined inspection data 16110 (e.g., processed inspection data, determined state values and/or categories related to the inspection surface from the inspection data, data values configured for depiction or display on a user device, and/or any other refined inspection data according to the present disclosure) in response to the inspection base data 16106, and an inspection configuration circuit 16112 that determines an inspection response value 16114 in response to the refined inspection data 16110. The example controller 16102 includes an inspection response circuit 16116 that provides an inspection command value 16118 in response to the inspection response value 16114.

Example and non-limiting inspection command values 16118 include one or more commands configured for communication to the inspection robot 16140, such that the inspection robot 16140 can change a configuration aspect (e.g., a sensor setting and/or enable value; an actuator setting or position; an inspection plan such as inspection route and/or inspection operations to be performed for selected regions of the inspection surface) in response to the inspection command value 16118. Additionally or alternatively, inspection command values 16118 may be proved to any other aspect of a system including the controller 16102, including without limitation command values to adjust inspection data displays, inspection data processing operations, inspection robot configurations communicated to an operator (and/or operator device) for adjustment of the inspection robot configuration at the location of the inspection surface, and/or inspection robot configurations communicated to a user (and/or user device) related to the operator of the inspection robot, such as a supporting operator, supervisor, data verifier of the inspection data.

In certain embodiments, the inspection configuration circuit 16112 provides the inspection command values 16118 during the interrogating of the inspection surface by the inspection robot 16140, for example to provide for configuration updates during the inspection operation. Additionally or alternatively, the inspection configuration circuit 16112 provides the inspection command values 16118 to provide for a rapid response configuration of the inspection robot, to provide for configuration updates within a time period that would be considered a rapid response for a system including the controller 16102.

In certain embodiments, the controller 16102 includes a user communication circuit 16120 that provides the refined inspection data 16110 to a user device 16124, and receives a user response command 16122, where the inspection configuration circuit 16112 further determines the inspection response value 16114 in response to the user response command 16122. For example, the user device 16124 may be a device accessible to a user such as a downstream customer of the inspection data, allowing for the user to make additional inspection requests, to change conditions that are determined from the inspection data, or the like, during the inspection operations and/or within a time period consistent with a rapid response time period. In another example, the user device 16124 may be a device accessible to a user related to the operator of the inspection robot, such as a supporting operator, supervisor, data verifier of the inspection data.

In a further example, the user observes the refined inspection data 16110, such as in a display or visualization of the inspection data, and provides the user response command 16122 in response to the refined inspection data 16110, for example requesting that additional data or data types be collected, requesting that additional conditions (e.g., anomalies, damage, condition and/or thickness of a coating, higher resolution determinations—either spatial resolution such as closer or more sparse data collection positions, or sensed data resolution such as higher or lower precision sensing values, etc.) be inspected, extending the inspection surface region to be inspected, and/or omitting inspection of regions of the inspection surface that were originally planned for inspection. In certain embodiments, the user response command 16122 allows the user to change inspection operations in response to the results of the inspection operations, for example where the inspection surface is found to be in a better or worse condition than expected, where an unexpected condition or data value is detected during the inspection, and/or where external considerations to the inspection occur (e.g., more or less time are available for the inspection, a system failure occurs related to the facility or an offset facility, or the like) and the user wants to make a change to the inspection operations in response to the external condition. In certain embodiments, the user response command 16122 allows for the user to change inspection operations in response to suspected invalid data (e.g., updating sensor calibrations, performing coupling operations to ensure acoustic coupling between a sensor and the inspection surface, and/or repeating inspection operations to ensure that the inspection data is repeatable for a region of the inspection surface), in response to a condition of the inspection surface such as an assumed value (e.g., wall thickness, coating thickness and/or composition, and/or presence of debris) that may affect processing the refined inspection data 16110, allowing for corrections or updates to sensor settings, couplant flow rates, down force provisions, speed of the inspection robot, distribution of sensors, etc. responsive to the difference in the assumed value and the inspection determined condition of the inspection surface.

An example controller 16102 further includes a publishing circuit 16128 that provides the refined inspection data 16110 to a remove server 16130, which may be a computing device communicatively coupled to the controller 16102 and one or more user devices 16124, for example to operate a web portal, web page, mobile application, proprietary application, database, API related to the refined inspection data 16110, and/or that operates as a data store for inspection base data 16106 and/or refined inspection data 16110. In the example, the user communication circuit 16120 receives the user response command 16122, and the inspection configuration circuit 16112 determines the inspection response value 16114 in response to the user response command 16122.

An example controller 16102 includes an inspection map configuration circuit that updates an inspection map 16134 in response to the inspection command value 16118. An example inspection map 16134 includes one or more of: planned inspection region(s) of the inspection surface; inspection operations to be performed for each of one or more regions of the inspection surface; and/or configurations of the inspection robot (e.g., down force, payload configurations, sensor distributions, sensor types to be utilized, and/or sled configurations such as ramp heights, slope, and/or pivot arrangements) for each of one or more regions of the inspection surface. An example controller 16102 further includes a sensor reconfiguration circuit 16138 that provides a configuration parameter 16136 to the inspection robot 16140 in response to a reconfiguration command (e.g., sensor configuration parameters responsive to the inspection map and/or updates to the inspection map). In certain embodiments, an update to the inspection map 16134 includes the reconfiguration command, and/or includes an update to a travel path of the inspection robot 16140. An example reconfiguration command includes a change to at attribute such as a sensor spacing (e.g., horizontal and/or vertical), a couplant flow (e.g., a rate of flow and/or a change to a couplant flow re-coupling operation timing, triggering conditions, and/or flow rate), and/or a force on an inspection sensor (e.g., an active or passive down force, and/or a change in operations of a biasing member and/or an actuator of a payload, arm, and/or sled associated with the inspection sensor). An example update to the travel path of the inspection robot 16140 includes an update to re-traverse a portion of the inspection surface. An example update to the travel path of the inspection robot 16140 includes an update to an x-y coverage resolution of the inspection robot 16140 (e.g., a macro resolution, such as a distance between inspected regions of a payload, a distance between horizontal inspection lanes; and/or a micro-resolution such as a distance between adjacent sensors of a payload and/or of the inspection robot).

The example utilizes x-y coverage resolution to illustrate the inspection surface as a two-dimensional surface having a generally horizontal (or perpendicular to the travel direction of the inspection robot) and vertical (or parallel to the travel direction of the inspection robot) component of the two-dimensional surface. However, it is understood that the inspection surface may have a three-dimensional component, such as a region within a tank having a surface curvature with three dimensions, a region having a number of pipes or other features with a depth dimension, or the like. In certain embodiments, the x-y coverage resolution describes the surface of the inspection surface as traversed by the inspection robot, which may be two dimensional, conceptually two dimensional with aspects have a three dimensional component, and/or three dimensional. The description of horizontal and vertical as related to the direction of travel is a non-limiting example, and the inspection surface may have a first conceptualization of the surface (e.g., x-y in a direction unrelated to the traversal direction of the inspection robot), where the inspection robot traverses the inspection surface in a second conceptualization of the surface (e.g., x-y axes oriented in a different manner than the x-y directions of the first conceptualization), where the operations of the inspection robot 16140 such as movement paths and/or sensor inspection locations performed in the second conceptualization are transformed and tracked in the first conceptualization (e.g., by the inspection map configuration circuit 16132, a controller on the inspection robot, a controller on a base station, etc.) to ensure that the desired inspection coverage from the view of the first conceptualization are achieved. Accordingly, the user response command 16122 and communications to the user device 16124 can be operated in the first conceptualization or the second conceptualization according to the preferences of the user, an administrator for the system, the operator, or the like.

While the first conceptualization and the second conceptualization are described in relation to a two-dimensional description of the inspection surface for clarity of the present description, either or both of the first conceptualization and the second conceptualization may include three-dimensional components and/or may be three-dimensional descriptions of the inspection surface. In certain embodiments, the first conceptualization and the second conceptualization may be the same and/or overlay each other (e.g., where the traversal axes of the robot define the view of the inspection surface, and/or where the axes of the inspection surface view and the traversal axes of the robot coincide).

While the first conceptualization and the second conceptualization are described in terms of the inspection robot traversal and the user device interface 16124, additional or alternative conceptualizations are possible, such as in terms of an operator view of the inspection surface, other users of the inspection surface, and/or analysis of the inspection surface (e.g., where aligning one axis with a true vertical of the inspection surface, aligning an axis with a temperature gradient of the inspection surface, or other arrangement may provide a desirable feature for the conceptualization for some purpose of the particular system).

In certain embodiments, the user may provide a desired conceptualization (e.g., orientation of x-y axes, etc.) as a user response command 16122, and/or as any other user interaction as set forth throughout the present disclosure, allowing for the user to interface with depictions of the inspection surface in any desired manner. It can be seen that the utilization of one or more conceptualizations of the inspection surface provide for simplification of certain operations of aspects of systems, procedures, and/or controllers throughout the present disclosure (e.g., user interfaces, operator interfaces, inspection robot movement controls, etc.). It can be seen that the utilization of one or more conceptualizations of the inspection surface allow for combined conceptualizations that have distinct dimensionality, such as two-dimensional for a first conceptualization (e.g., traversal commands and/or sensor distributions for an inspection robot operating on a curved surface such as a tank interior, where the curved surface includes a related three-dimensional conceptualization; and/or where a first conceptualization eliminates the need for a dimension, such as by aligning an axis perpendicular to a cylindrical inspection surface), and a either three-dimensional or a non-simple transformation to a different two-dimensional for a second conceptualization (e.g., a conceptualization having an off-perpendicular axis for a cylindrical inspection surface, where a progression of that axis along the inspection surface would be helical, leading to either a three dimensional conceptualization, or a complex transformed two dimensional conceptualization).

Referencing FIG. 161, an example procedure for rapid reconfiguration of an inspection robot is depicted. The example procedure includes an operation 16202 to interrogate an inspection surface with a number of sensors, an operation 16204 to interpret inspection base data from the sensors, and an operation 16206 to determine refined inspection data in response to the inspection base data. The example procedure further includes an operation 16208 to determine an inspection response value during the interrogating. The example operation 16208 may additionally or alternatively determine the response value during a period of time that corresponds to a rapid response time. The example procedure further includes an operation 16224 to determine an inspection command value in response to the inspection response value.

The example procedure may further include an operation 16210 to provide the refined inspection data to a user device, remove server or service, and/or to an operator device, an operation 16212 to receive a user response command from the user device, remove server or service, and/or the operator device, and an operation 16214 to determine the inspection response value further in response to the user response command.

The example procedure may further include an operation 16216 to update an inspection map in response to the inspection command value. The example procedure may further include an operation 16218 to provide a reconfiguration command, and/or an operation 16220 to update a travel path of the inspection robot, in response to the inspection command value. The example procedure may further include an operation 16220 to update an x-y coverage resolution of the inspection robot in response to the inspection command value. In certain embodiments, the operation 16220 includes providing an updated inspection map for operation 16216, and/or providing an updated travel path for operation 16220. In certain embodiments, operation 16220 includes an operation to update coverage resolution of the inspection robot in response to the inspection command value, where the updated coverage resolution corresponds to a selected conceptualization of the inspection surface.

Referencing FIG. 162, an example inspection robot 16302 is depicted, with the inspection robot 16302 operable to perform rapid response configuration and/or reconfiguration for inspection operations of an inspection surface. In certain embodiments, the example inspection robot 16302 is compatible to interact with a controller is configured to perform operations for rapid response to inspection data (e.g., reference FIG. 160 and the related description), and/or may include portions or all of such a controller. Rapid response configuration and/or reconfiguration inspection operations include, without limitation, configuration and/or reconfiguration operations performed during an inspection operation, and/or performed during a period of time that corresponds to a rapid response time. An example inspection robot 16302 may additionally or alternatively include any components, features, and/or aspects of embodiments for an inspection robot as set forth throughout the present disclosure.

The example inspection robot 16302 includes an inspection chassis 16304 having a number of inspection sensors 16306 configured to interrogate an inspection surface. In certain embodiments, the inspection chassis 16304 corresponds to an inspection robot body, a center chassis, a robot chassis, and/or other similar terminology as utilized throughout the present disclosure. In certain embodiments, the inspection chassis 16304 further includes a payload, for example a payload coupled to the inspection robot body, and having at least some of the inspection sensors 16306 coupled thereto. Any example payloads and/or inspection sensors and coupling arrangements set forth throughout the present disclosure are contemplated herein.

The example inspection robot 16302 further includes a drive module 16308 coupled to the inspection chassis 16304, for example a drive module 16308 including one or more wheels, and power, mechanical, and/or communication interfaces to the inspection chassis 16304. The example drive module 16308 is structured to drive the inspection robot over the inspection surface, for example by powering at least one wheel of the drive module 16308, thereby propelling the inspection robot 16302 relative to the inspection surface.

The example inspection robot 16302 includes a controller 16310 having a number of circuits configured to functionally execute operations of the controller 16310. The arrangement depicted in FIG. 162 is a non-limiting example for clarity of description, and the arrangement of the controller 16310 and/or circuits thereof may vary, for example with the controller 16310 and/or portions thereof positioned on the inspection chassis 16304 and/or other components of the inspection robot 16302, and/or portions of the controller 16310 positioned on a base station, operator computing device, user computing device, remote server, and/or other locations within a system including the inspection robot 16302. The example controller 16310 includes an inspection data circuit 16312 that interprets inspection base data 16314 including data provided by the inspection sensors 16306, and an inspection processing circuit 16316 that determines refined inspection data 16318 in response to the inspection base data 16314. The example controller 16310 includes an inspection configuration circuit 16320 that determines an inspection response value 16322 in response to the refined inspection data, and an inspection response circuit 16324 that provides an inspection command value 16326 in response to the inspection response value 16322. In certain embodiments, the inspection response circuit 16324 provides the inspection command value 16326 during the inspection operations of the inspection robot 16302, and/or during a period of time that corresponds to a rapid response time. In certain embodiments, the inspection response value 16322 and/or the inspection command value 16326 may be determined in whole or part on a controller (e.g., controller 16102, reference FIG. 160) and received by the inspection configuration circuit 16320 and/or inspection response circuit 16324 for utilization by the controller 16310 to perform configuration and/or reconfiguration operations. In certain embodiments, the inspection configuration circuit 16320 and/or inspection response circuit 16324 determine relevant portions of the received inspection response value 16322 and/or the inspection command value 16326 for operations of the inspection robot 16302, and provide the relevant portions of inspection response value 16322 and/or the inspection command value 16326 as response and/or command instructions for the inspection robot 16302 and/or relevant components of the inspection robot 16302.

The example controller 16310 includes an inspection map configuration circuit 16328 that updates an inspection map 16330 in response to the inspection command value 16326. An example controller 16310 further includes a payload configuration circuit 16332 that provides a reconfiguration command 16334 in response to the inspection command value 16326. In certain embodiments, the payload configuration circuit may additionally or alternatively be referenced as a payload reconfiguration circuit and/or a sensor reconfiguration circuit, as operations of the payload configuration circuit 16332 may adjust, readjust, and/or reconfigure the payload and/or inspection sensors coupled to the payload. Example and non-limiting reconfiguration commands 16334 include a sensor spacing (e.g., horizontal and/or vertical sensor spacing), a couplant flow (e.g., flow rate and/or flow response characteristics such as re-coupling flow responses), a change in an inspection sensor (e.g., activating or deactivating a sensor, data collection from the sensor, and/or determination of inspection base data and/or refined data from the sensor; a change in a scale, sensed resolution, and/or calibrations for a sensor; and/or a change in a sampling rate of the sensor), and/or a force on an inspection sensor (e.g., an active or passive down force, and/or a change in operations of a biasing member and/or an actuator of a payload, arm, and/or sled associated with the inspection sensor). An example inspection robot 16302 is structured to re-traverse a portion of the inspection surface, and/or update an x-y coverage of the inspection operation, for example in response to an update of the inspection map 16330.

An example inspection robot 16302 includes a trailing payload 16338 structured to perform an operation on the inspection surface, such as altering the inspection surface, in response to the inspection command value 16326. The trailing payload 16338 may be coupled to a rear portion of the inspection chassis 16304. An example inspection robot 16302 includes a payload operation circuit 16336 that selectively operates the trailing payload 16338 in response to the inspection command value 16326, wherein the inspection command value 16326 includes a command for an operation such as a repair of the inspection surface, painting the inspection surface, welding the inspection surface, and/or applying a visible mark to the inspection surface. An example inspection command value 16326 may additionally or alternatively include a command for an operation such as a cleaning operation for the inspection surface, application of a coating and/or material addition to the inspection surface, and/or applying a selectively visible mark to the inspection surface. An example inspection robot 16302 is further configure to send an alarm and/or a notification to a user device in response to the inspection response value 16322, for example to notify the user and/or an operator that an off-nominal condition has been detected, that a configuration change to the inspection robot 16302 has been performed, and/or that a configuration change is unavailable and/or unsuccessful in whole or part. In certain embodiments, an alert and/or a notification to the user may be performed via a communication to an external controller (e.g., controller 16102 in FIG. 160), and/or the alert and/or notification may be provided by any applicable circuit of the controller 16310.

Referencing FIG. 210, an example system for providing real-time processed inspection data to a user is depicted. The example system includes an inspection robot 100 positioned on an inspection surface 500. The example inspection robot 100 includes any inspection robot having a number of sensors associated therewith and configured to inspect a selected area. Without limitation to any other aspect of the present disclosure, an inspection robot 100 as set forth throughout the present disclosure, including any features or characteristics thereof, is contemplated for the example system depicted in FIG. 210. In certain embodiments, the inspection robot 100 may have one or more payloads, and may include one or more sensors on each payload.

The example inspection robot 100 includes a number of sensors 2202, where the operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

The example system further includes a controller 21002 having a number of circuits configured to functionally perform operations of the controller 21002. The example system includes the controller 21002 having an inspection data circuit that interprets inspection base data from the sensors 2202, an inspection processing circuit that determines refined inspection data in response to the inspection base data, and a user interface circuit that provides the refined inspection data to a user interface device 21006. The user interface circuit further communicates with the user interface device 21006, for example to interpret a user request value such as a request to change a display value, to change inspection parameters, and/or to perform marking, cleaning, and/or repair operations related to the inspection surface 500. The example controller 21002 may additionally or alternatively include aspects of any controller, circuit, or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the controller 21002 are set forth, without limitation, in the portion of the disclosure referencing FIG. 211.

The example controller 21002 is depicted schematically as a single device for clarity of description, but the controller 21002 may be a single device, a distributed device, and/or may include portions at least partially positioned with other devices in the system (e.g., on the inspection robot 100, or the user interface device 21006). In certain embodiments, the controller 21002 may be at least partially positioned on a computing device associated with an operator of the inspection (not shown), such as a local computer at a facility including the inspection surface 500, a laptop, and/or a mobile device. In certain embodiments, the controller 21002 may alternatively or additionally be at least partially positioned on a computing device that is remote to the inspection operations, such as on a web-based computing device, a cloud computing device, a communicatively coupled device, or the like.

In certain embodiments, the controller 21002 communicates to the user interface device 21006 using an intermediate structure 21004, such as a web portal, mobile application service, network connection, or the like. In certain embodiments, the intermediate structure 21004 may be varied by the controller 21002 and/or a user 21008, for example allowing the user 21008 to connect to the controller 21002 using a web portal at one time, and a mobile application at a different time. The controller 21002 may include operations such as performing an authentication operation, a login operation, or other confirmation that a user 21008 is authorized to interact with the controller 21002. In certain embodiments, the interactions of the user 21008 may be limited according to permissions related to the user 21008, the user interface device 21006, and/or any other considerations (e.g., a location of the user, an operating stage of an inspection, a limitation imposed by an operator of the inspection, etc.). In certain embodiments, and/or during certain operating conditions, the controller 21002 communicates directly with the user interface device 21006, and/or the user 21008 may interface directly with a computing device having at least a portion of the controller 21002 positioned thereon.

The example system further includes the inspection data circuit responsive to the user request value to adjust the interpreted inspection base data and/or the interrogation of the inspection surface. For example, and without limitation, the user request value may provide for a change to an inspection resolution (e.g., a horizontal distance between sensors 2202, a vertical distance at which sensor sampling is performed, selected positions of the inspection surface 500 to be interrogated, etc.), a change to sensor values (e.g., sensor resolution such as dedicated bits for digitization; sensor scaling; sensor communicated data parameters; sensor minimum or maximum values, etc.), a change to the planned location trajectory of the inspection robot (e.g., scheduling additional inspection passes, changing inspected areas, canceling planned inspection portions, adding inspection portions, etc.), and/or a change in sensor types (e.g., adding, removing, or replacing utilized sensors). In certain embodiments, the inspection data circuit responds to the user request value by performing an inspection operation that conforms with the user request value, by adjusting inspection operations to incrementally change the inspection scheme to be closer to the user request value (e.g., where the user request value cannot be met, where other constraints prevent the user request value from being met, and/or where permissions of the user 21008 allow only partial performance of the user request value). In certain embodiments, a difference between the user request value and the adjusted interpreted inspection base data and/or interrogation scheme may be determined, and/or may be communicated to the user, an operator, an administrator, another entity, and/or recorded in association with the data (e.g., as a data field, metadata, label for the data, etc.).

In certain embodiments, the inspection processing circuit is responsive to the user request value to adjust the determination of the refined inspection data. In certain embodiments, certain sensed values utilize a significant amount of post-processing to determine a data value. For example, a UT sensor may output a number of return times, which may be filtered, compared to thresholds, subjected to frequency analysis, or the like. In certain embodiments, the inspection base data includes information provided by the sensor 2202, and/or information provided by the inspection robot 100 (e.g., using processing capability on the inspection robot 100, hardware filters that act on the sensor 2202 raw data, de-bounced data, etc.). The inspection base data may be raw data—for example the actual response provided by the sensor such as an electronic value (e.g., a voltage, frequency, or current output), but the inspection base data may also be processed data (e.g., return times, temperature, pressure, etc.). As utilized herein, the refined inspection data is data that is subjected to further processing, generally to yield data that provides a result value of interest (e.g., a thickness, or a state value such as "conforming" or "failed") or that provides a utilizable input for another model or virtual sensor (e.g., a corrected temperature, corrected flow rate, etc.). Accordingly, the inspection base data includes information from the sensor, and/or processed information from the sensor, while the refined inspection data includes information from the inspection base data that has been subjected to further processing. In certain embodiments, the computing time and/or memory required to determine the refined inspection data can be very significant. In certain embodiments, determination of the refined inspection data can be improved with the availability of significant additional data, such as data from offset and/or related inspections performed in similar systems, calibration options for sensors, and/or correction options for sensors (e.g., based on ambient conditions; available power for the sensor; materials of the inspection surface, coatings, or the like; etc.). Accordingly, in previously known systems, the availability of refined inspection data was dependent upon the meeting of the inspection base data with significant computing resources (including processing, memory, and access to databases), introducing significant delays (e.g., downloading data from the inspection robot 100 after an inspection is completed) and/or costs (e.g., highly capable computing devices on the inspection robot 100 and/or carried by an inspection operator) before the refined inspection data is available for analysis. Further, previously known systems do not allow for the utilization of refined inspection data during inspection operations (e.g., making an adjustment before the inspection operation is complete) and/or utilization by a customer of the data (e.g., a user 21008) that may have a better understanding of the commercial considerations of the inspection output than an inspection operator.

Referencing FIG. 211, an example controller 21002 is depicted. The example controller 21002 is consistent with a controller usable in a system, for example the system depicted in FIG. 210, although the controller 21002 and/or aspects thereof may be usable in any system and/or with any embodiments set forth in the present disclosure.

The example controller 21002 includes an inspection data circuit 21102. The example inspection data circuit 21102 interprets inspection base data 21122, including data provided by an inspection robot 100 interrogating an inspection surface 500 with a number of inspection sensors 2202. The example controller 21002 further includes an inspection processing circuit 21104 that determines refined inspection data 21110 in response to the inspection base data 21122.

The example controller further includes a user interface circuit 21106 the provides the refined inspection data 21110 to a user interface device. In certain embodiments, the refined inspection data 21110 includes and/or is utilized to generate depictions of inspection results, including with quantified and/or qualitative values of the inspection results, such as wall thicknesses, coating thicknesses, compliant or non-compliant areas, service life descriptions (e.g., time remaining until service is required, service cost or amortization values, etc.), and/or any other values of interest determinable from the refined inspection data 21110. In certain embodiments, the refined inspection data 21110 may additionally or alternatively include data quality descriptions, such as confidence values, missing data descriptions, and/or sensing or data processing quality descriptions. In certain embodiments, the user interface circuit 21106 may be configured to adjust the displayed data, the display type, and/or provide a selection interface allowing a user to choose from among available data displays. The example user interface circuit 21106 further interprets a user request value 21124, and determines an inspection command value 21112 in response to the user request value 21124. In certain embodiments, the controller 21002 may be configured to utilize the user request value 21124 directly, where the user interface circuit 21106 accordingly passes the user request value 21124 to other aspects of the controller 21002 as the inspection command value 21112. In certain embodiments, the user interface circuit 21106 determines which aspects of the controller 21002 will be responsive to the user request value 21124, and determines one or more inspection command values 21112 to pass to the respective aspects of the controller 21002 to be responsive to the user request value 21124. For example, a user request value 21124 to inspect certain areas of the inspection surface 500, to change a planned position trajectory of the inspection robot 100, or the like, may be passed as inspection adjustments 21116 by an inspection configuration circuit 21108 to make appropriate adjustments to the inspection operations of the inspection robot 100 (e.g., utilizing command to the inspection robot 100, to an operator of the inspection robot 100, changing a planned path data structure, or the like). The example controller 21002 further includes the inspection configuration circuit 21108 that provides the inspection command value(s) 21112 to the inspection robot 100 (and/or to other aspects of the system) during the interrogating of the inspection surface 500 (e.g., while the inspection is occurring, and/or before the inspection is considered to be complete).

An example embodiment includes the inspection command value 21112 including a command to adjust in inspection operation (e.g., inspection adjustment 21116) of the inspection robot 100. Example and non-limiting inspection adjustments 21116 include adjusting an inspection location trajectory of the inspection robot (e.g., the region of the inspection surface to be inspected, the inspection pathing on the inspection surface, and/or the spatial order of inspection of the inspection surface), adjusting a calibration value of one of the inspection sensors (e.g., A/D conversion values, UT calibrations and/or assumptions utilized to process signals, and/or other parameters utilized to operate sensors, interpret data, and/or post-process data from sensors), and/or a command to enable at least one additional inspection sensor (e.g., activating an additional sensor, receiving data provided by the sensor, and/or storing data provided by the sensor). In certain embodiments, the at least one additional inspection sensor is a sensor having a different type of sensing relative to a previously operating sensor, and/or a sensor having a different capability and/or different position on the inspection robot (e.g., positioned on a different payload, different sled, and/or at a different position on a sled). An example inspection adjustment 21116 command includes a command to enable at least one additional inspection operation, where the inspection processing circuit 21104 determines the refined inspection data 21110 in response to the at least one additional inspection operation. Example and non-limiting additional inspection operations include re-inspecting at least portion of the inspection surface, performing an inspection with a sensor having distinct capabilities, sensing type, and/or calibrations relative to a previously operating sensor, inspecting additional regions of the inspection surface beyond an initially planned region, changing an inspection resolution (e.g., a spacing between sensed locations), changing a traversal speed of the inspection robot during inspection operations, or the like.

An example inspection command value 21112 includes a command to perform a repair operation 21118 of the inspection surface, such as a welding operation, applying a coating, a painting operation, a cleaning operation 21120, and/or applying an additive operation (e.g., adding substrate material, a coating material, a marking material, and/or a paint) to at least a portion of the inspection surface. An example inspection command value 21112 includes an operation to perform a marking operation 21114 on the inspection surface. Example and non-limiting marking operations include applying a visible mark, applying a selectively visible mark (e.g., a material visible under certain conditions such as in the presence of a UV light), and/or an operation to apply a virtual mark to at least a portion of the inspection surface. In certain embodiments, the marking operation 21114 additionally includes performing operations such as cleaning, repairing, and/or collecting additional data in relation to the portion of the inspection surface to be marked. In certain embodiments, a marking operation includes mitigation operations (e.g., to extend a service time, allow a facility to continue operations, and/or provide time to allow for additional inspections or subsequent service or repair to be performed), inspection operations (e.g., gathering more detailed information, confirming information, imaging information, etc. related to the marked region), and/or cleaning operations (e.g., to ensure that data collection is reliable, to ensure that a mark adheres and/or can be seen, and/or to enhance related imaging information) for the marked region of the inspection surface and/or adjacent regions.

An example inspection command value 21112 includes a command to capture a visual representation of at least a portion of the inspection surface, such as an image, a series of images, and/or video images, of the area to be marked, adjacent areas, and/or perspective views (e.g., to provide context, allow for easier location of the marked area, etc.) of related to the region of the inspection surface to be marked.

An example inspection command value 21112 includes a display threshold adjustment value, such as a threshold utilized to label, categorize, colorize, or otherwise depict aspects of the inspection data on a visual representation of at least a portion of the inspection surface. In certain embodiments, the display threshold adjustment value may be determined in response to the inspection data (e.g., to show anomalous regions based on the inspection data values, based on averages, quartiles, or other statistical determinations, etc.), in response to user request values 21124 received from a user interface provided to a user device, and/or in response to operator commands (e.g., from an operator interacting with a base station, local computing device, mobile computing device, dedicated device communicatively coupled to the inspection robot, etc.).

In certain embodiments, a user device and/or user interface device includes a computing device communicative coupled to the controller 21002. Communicative coupling may be provided through a local area network (e.g., a facility network where the facility includes the inspection surface), a wide area network, the internet, a web application, a mobile application, and/or combinations of these. Example and non-limiting user interface devices include a laptop, a desktop, or a mobile computing device such as a smart phone or tablet. In certain embodiments, the user interface device is positioned at a separate physical location from the inspection surface (e.g., at another location in a facility including the inspection surface, and/or away from the facility).

In certain embodiments, the inspection command value 21112 includes a display threshold adjustment value, where the inspection processing circuit 21104 updates the refined inspection data 21110 in response to the display threshold adjustment value (e.g., changing a sensor, sensor parameter, inspection path, etc. to provide data sufficient to support the display threshold adjustment value; adjusting post-processing of inspection data in response to the display threshold adjustment value, such as determining anomalous data, enhancing or adjusting a resolution of the refined data, and/or providing additional related data to data corresponding to the display threshold being adjusted).

In certain embodiments, the inspection based data includes raw sensor data, and/or minimally processed data. In certain embodiments, the inspection based data includes ultra-sonic (UT) sensor data, which may additionally or alternatively include sensor calibrations such as settings and assumptions utilized to determine a processed parameter (e.g., a wall thickness of the inspection surface, a presence of a crack or anomaly, and/or a thickness of a coating and/or debris). The sensor calibrations and/or other descriptive data (e.g., time stamps, location data, facility data, etc.) may be stored as metadata with the raw sensor data, and/or related to the raw sensor data such that a device accessing the raw sensor data can additionally request or retrieve the metadata. The present description references UT sensor data and related data, but sensor calibrations, related data, and/or metadata may be stored in relation to any type of raw sensor data and/or minimally processed data.

Referencing FIG. 212, an example procedure for adjusting an inspection operation in response to a user request value is depicted. The example procedure includes an operation 21202 to provide inspection traversal commands (e.g., a description of regions of an inspection surface to be inspected, a pathing description for an inspection robot, etc.), an operation 21204 to provide interrogation commands to a number of inspection sensors of the inspection robot, an operation 21206 to interpret inspection base data from the inspection sensors (e.g., raw sensor data, minimally processed sensor data, and/or sensor calibration or other metadata), an 21208 to determine refined inspection data in response to the inspection base data, an operation 21210 to operate a user interface accessible to a user interface device, and to provide the refined inspection data to the user interface. For example, the refined inspection data may include processed data values (e.g., thickness values, wear values, temperatures, coating indications, service life and/or service date values, etc.), which may be presented as tables, graphs, visual depictions of the inspection surface, or the like. In certain embodiments, refined inspection data may include raw sensor data and/or minimally processed sensor data, and/or may further include associated calibrations or other metadata, for example to allow the user to evaluate the processing and determine whether sensor data processing parameters should be updated or adjusted, perform sensitivity analysis with respect to processing calibrations and/or assumptions, etc. In certain embodiments, operation 21210 to operate the user interface includes operating a web portal, web site, mobile application, proprietary application, and/or a database accessible with an application programming interface (API), and interacting with a user device through any of the foregoing.

The example procedure further includes an operation to interpret a user request value 21212, for example a request to adjust a display (e.g., displayed data, thresholds, virtual marks, displayed region of the inspection surface, etc.) presented on the user interface, a request to adjust any aspect of the inspection operation (e.g., sensors utilized and/or calibrations for the sensors; sensor positions on one or more payloads; sampling rates; robot traversal trajectory including locations to be inspected, traversal speed, areas to be re-inspected, imaged, and/or inspected with an additional inspection operations; authorizations for additional time, cost, utilization of certain operations such as welding, repair, or utilization of certain materials; adjusting downforce parameters for the inspection robot; adjusting thresholds for any operations described throughout the present disclosure, such as thresholds to enable additional or alternative inspection operations or sensors, thresholds to display information on an inspection display, thresholds to perform operations such as repair, marking, and/or cleaning and an operation, and/or thresholds to respond to off-nominal conditions such as couplant loss events, obstacle detection events, sensor evaluation, processing, or scoring values such as primary mode scores and/or secondary mode scores). The example procedure includes an operation 21214 to adjust the inspection operation in response to the user request value. One or more of any adjustments to the inspection robot and/or inspection operations as set forth throughout the present disclosure may be implemented for operation 21214.

An example procedure includes adjusting the inspection operation by adjusting the inspection operation to achieve the implied conditions from the user request value, but adjusting the inspection operation may additionally or alternatively include one or more of: adjusting the inspection operation to comply with a portion of the user request value; considering the user request value adjustments (e.g., as part of a prioritization of one or more additional requests), where the user request value adjustments may not be implemented, implemented only in part, or implemented in whole; storing a description of adjustments of the inspection operation for implementation at a later time (e.g., later in the present inspection operation, and/or in a subsequent inspection operation); implementing one or more adjustments for which a user providing the user request value has authorization, and/or not implementing one or more adjustments for which the user providing the user request value does not have authorization; and/or preserving a capability to implement one or more adjustments for which the user providing the user request value does not have authorization and/or pending an authorization of the user (e.g., performing additional inspection operations to take additional data responsive to the user request value, but preventing access of the user to the additional data until the user is authorized to access the data, and/or until user authorization for the additional data is confirmed). In certain embodiments, the operation 21214 further includes providing an alert and/or notification to the user, user device, and/or user interface in response to a partial implementation and/or non-implementation of the adjustments. The alert and/or notification may include an indication that the adjustments were not performed, a description of which aspects of the adjustments were not performed, and indication of why no adjustments or incomplete adjustments were performed (e.g., indicating a higher priority request, system capability that is lacking, that the user requires authorization, etc.). In certain embodiments, the operation 21214 includes providing an alert and/or notification to an administrator, supervisor, super-user, and/or operator of the inspection robot, indicating that a user request value was received, and/or indicating whether the user request value was addressed in full or part. In certain embodiments, the operation 21214 further includes providing an authorization request to an administrator, supervisor, super-user, and/or operator of the inspection robot for the user in response to the user request value. The described example operations are non-limiting, and set forth to provide illustrations of certain capabilities of embodiments herein.

An example user request value includes an inspection command value, where the operation 21302 includes adjusting inspection traversal commands and/or the interrogation commands in response to the inspection command value. An example operation 21214 includes adjusting inspection traversal commands to adjust an inspection location trajectory (e.g., position trajectory) of the inspection robot, adjusting the interrogation command to adjust calibration value(s) for one or more inspection sensors, and/or adjusting the interrogation commands to enable one or more additional sensors. An example operation 21214 includes enabling at least one additional inspection operation in response to a user request value (e.g., as a repair command value), for example by providing a repair operation command. In certain embodiments, the repair command provides a welding operation command, a coating application command, a painting operation command, a cleaning operation command, and/or an additive operation command.

An example user request value includes a marking command value, and operation 21602 includes providing a marking operation command. In certain embodiments, the marking operation command includes a visible marking command, a selectively visible marking command, and/or a virtual marking command. In certain embodiments, operation 21210 to operate the user interface, and/or operation 21214 to adjust an inspection operation, include selectively providing a virtual mark to the user interface (e.g., showing virtual marks in a display layer of the user interface, showing virtual marks upon request by the user, showing virtual marks according to a mark type requested by the user, showing virtual marks in response to an authorization of the user, etc.).

An example user request value includes a visual capture command value, where operation 21214 includes providing a visual capture operation command in response to the visual capture command value (e.g., where a camera, optical sensor, or other device of the inspection robot is responsive to the visual capture operation command to capture associated visual data from the inspection surface).

Turning now to FIG. 181, an example system and/or apparatus for inspecting and/or repairing an inspection surface 500 (e.g., reference FIG. 5) with an inspection robot 100 (e.g., reference FIG. 1) is depicted. The example inspection robot 100 includes any inspection robot having a number of sensors 2202 (e.g., reference FIG. 25) associated therewith and configured to inspect a selected area. Without limitation to any other aspect of the present disclosure, an inspection robot 100 as set forth throughout the present disclosure, including any features or characteristics thereof, is contemplated for the example system depicted in FIG. 181. In certain embodiments, the inspection robot 100 may have one or more payloads 2 (e.g., reference FIG. 1) and may include one or more sensors 2202 (e.g., reference FIG. 25) on each payload 2.

Operations of the inspection robot 100 provide the sensors 2202 in proximity to selected locations of the inspection surface 500 and collect associated data, thereby interrogating the inspection surface 500. Interrogating, as utilized herein, includes any operations to collect data associated with a given sensor, to perform data collection associated with a given sensor (e.g., commanding sensors, receiving data values from the sensors, or the like), and/or to determine data in response to information provided by a sensor (e.g., determining values, based on a model, from sensor data; converting sensor data to a value based on a calibration of the sensor reading to the corresponding data; and/or combining data from one or more sensors or other information to determine a value of interest). A sensor 2202 may be any type of sensor as set forth throughout the present disclosure, but includes at least a UT sensor, an EMI sensor (e.g., magnetic induction or the like), a temperature sensor, a pressure sensor, an optical sensor (e.g., infrared, visual spectrum, and/or ultra-violet), a visual sensor (e.g., a camera, pixel grid, or the like), or combinations of these.

The example system my include the inspection robot 100 and/or a controller 802 as shown in FIG. 181. The controller 802 may have a number of circuits configured to functionally perform operations of the controller 802. For example, the controller 802 may have an inspection circuit 18102, an inspection visualization circuit 18106, a user interaction circuit 18110, an action request circuit 18114, and/or an event processing circuit 18118. In embodiments, the controller 802 may have, in place of or in addition to any of the preceding circuits, a repair circuit 18122 and/or marking circuit 18124. The example controller 802 may additionally or alternatively include aspects of any controller, circuit, or similar device as described throughout the present disclosure. Aspects of example circuits may be embodied as one or more computing devices, computer-readable instructions configured to perform one or more operations of a circuit upon execution by a processor, one or more sensors, one or more actuators, and/or communications infrastructure (e.g., routers, servers, network infrastructure, or the like). Further details of the operations of certain circuits associated with the controller 802 are set forth, without limitation, in the portion of the disclosure referencing FIGS. 181-183.

The example controller 802 is depicted schematically as a single device for clarity of description, but the controller 802 may be a single device, a distributed device, and/or may include portions at least partially positioned with other devices in the system (e.g., on the inspection robot 100). In certain embodiments, the controller 802 may be at least partially positioned on a computing device associated with an operator of the inspection (not shown), such as a local computer at a facility including the inspection surface 500, a laptop, and/or a mobile device. In certain embodiments, the controller 802 may alternatively or additionally be at least partially positioned on a computing device that is remote to the inspection operations, such as on a web-based computing device, a cloud computing device, a communicatively coupled device, or the like.

Accordingly, as illustrated in FIG. 181, the inspection circuit 18102 commands operations of the inspection robot 100 operating on the inspection surface 500 and interprets inspection data 18104 from one or more sensors 2202 operationally coupled to the inspection robot 100. The inspection data 18104 may include information representative of a status and/or characteristic of the inspection surface, e.g., a thickness, coating coverage, stress and/or any other type of property of the inspection surface. The inspection data 18104 may include still images and/or video images of the inspection surface 500 and/or of an obstacle encountered by the inspection robot 100. The inspection data 18104 may be an image of a structural deficiency, e.g., a crack, bump, recess, etc., in the inspection surface 500. In embodiments, the inspection data 18104 may include electromagnetic, ultrasonic and/or other types of information collected from the inspection surface 500 by the sensors 2202.

The inspection visualization circuit 18106 may generate an inspection map 18108 in response to the inspection data 18104. Without limitation to any other aspect of the present disclosure, an inspection map as set forth throughout the present disclosure, including any features or characteristics thereof, is contemplated for the example inspection map 18108 depicted in FIG. 181. For example, As disclosed herein, the inspection map 18108 may depict a layout of the inspection surface 500 along with one or more characteristics of the surface 500, obstacles on the surface 500 and/or other features such as markings.

The user interaction circuit 18110 may provide the inspection map 18108 to a user/operator device (e.g., reference FIG. 218 and the related description) for display to a user and/or operator of the inspection robot 100. Such a devices may include, but are not limited to, laptops, smart phones, tablets, desktop computers and/or other types of devices that provide for interactive graphical user interfaces. The user interaction circuit 18110 may interpret a user focus value 18112 from the user device. In embodiments, the user interaction circuit 18110 interprets the user focus value 18112 by interrogating a display of the user device. For example, the user focus value 18112 may include event type data 18204 corresponding to one or more user interactive events within the interactive graphical user interface presented on the user device. Such events may include, but are not limited to: mouse position 18206, menu-selections 18208, touch screen indications 18210, keys strokes 18212 and/or virtual gestures 18214. The user focus value 18112 may be generated by the user device in response to a user interactive event corresponding to a display of the inspection map 18108 within the graphical user interface on the user device. For example, in embodiments, the inspection map 18108 may depict an anomaly in a characteristic of the inspection surface 500, e.g., a portion of the surface 500 that is thinner than an expected value. The user and/or operator may then generate the user focus value 18112 by clicking on the anomaly in the inspection map 18108 as shown on the user device.

The action request circuit 18114 may determine an action 18116 for the inspection robot 100 in response to the user focus value 18112, and the event processing circuit 18118 may provide an action command value 18120 in response to the determined action 18116. The inspection circuit 18102 may also update the operations of the inspection robot 100 in response to the action command value 18120.

As illustrated in FIG. 182, the action command value 18120 may include location data 18216 identifying a location at which the action 18116 is to be performed. As such, in embodiments, the action request circuit 18114 may determine the location data 18216 based on the user focus value 18112. For example, a user may click and/or select a location within the inspection map 18108 displayed in the user interface on the user device. The coordinate information 18202 of the inspection surface 500 corresponding to the location selected by the user may then be included in the user focus value 18112. Thus, in embodiments, clicking a location in the inspection map 18108 may direct the inspection robot 100 to the corresponding location on the inspection surface 500 for the purpose of performing an action 18116 at that location. In embodiments, the location data 18216 may be in real space and/or a virtual space.

In embodiments, the action command value 18120 may corresponds to a repair procedure, and the repair circuit may, in response to the action command value 18120, may execute the repair procedure. The repair procedure may include actuating: a welding device; a drilling device; a sawing device; an ablation device; and/or a heating device. For example, a user may select an identified crack on the inspection map 18108 and then further select an option within the graphical user interface to repair the object, and further select the type of repair, e.g., weld, to perform on the crack. As will be understood, embodiments of the inspection map 18108 and/or graphical user interface may provide for the identification and repair of other types of anomalies in the inspection surface 500. In embodiments, the controller 802 may direct the inspection robot 100 to repair anomalies as they are encountered and identified by the controller 802. In other words, some embodiment of the controller 802 may automatically repair anomalies and/or obstacles on the inspection surface 500.

In embodiments, the action command value 18120 may correspond to a marking procedure and the marking circuit 18124, in response to the action command value 18120, may execute the marking procedure by actuating: a painting device; a stamping device; a drilling device; a sawing device; an ablation device; and/or a heating device. For example, the graphical user interface may provide for the user to mark areas and/or object of interest shown in the inspection map 18108, with the inspection robot 100 physically marking the actual location on the inspection surface 500 corresponding to the location of the area and/or object of interest in the inspection map 18108. For example, a user may notice an area of the inspection map 18108 depicting a thinner than expected regions of the inspection surface 500. The user may then select an option in the graphical user interface that to mark the location in the inspection map 18108 with a marker, which in turn, instructs the inspection robot 100 to make a physical mark at the actual location on the inspection surface 500 corresponding to the marked location in the inspection map 18108. In embodiments, the controller 802 may direct the inspection robot 100 to mark anomalies and/or obstacles as they are encountered and identified by the controller 802. In other words, some embodiment of the controller 802 may automatically mark anomalies and/or obstacles on the inspection surface 500.

In embodiments, the action command value 18120 may correspond to an inspection procedure and the inspection circuit, in response to the action command value 18120, may execute the inspection procedure by actuating a sensor 2202. For example, in embodiments, a user may identify a region of the inspection map 18108 that the user may wish to have re-inspected with a higher resolution sensor and/or a different type of sensor. The user may then define the boundaries of the region within the graphical user interface on the inspection map 18108, which in turn, causes the inspection robot 100 to reinspect the actual region on the inspection surface within the boundaries defined in the graphical user interface. In embodiments, the graphical user interface may further provide for a user to define multiple regions within the inspection map and assign distinct payloads to be used by the inspection robot 100 in each of the defined regions. In embodiments, the controller 802 may direct the inspection robot 100 to re-inspect anomalies as they are encountered and identified by the controller 802. In other words, some embodiment of the controller 802 may automatically re-inspect anomalies and/or obstacles on the inspection surface 500.

As will be further appreciated, in embodiments, the event processing circuit 18118 may provide the action command value 18120 during a run-time/inspection run of the inspection robot 100. As will be appreciated, providing for run-time updates reduces the amount of time to for re-checking, repairing and/or marking areas of the inspection surface 500. In other words, a user/operator of the inspection robot 100 need not wait until the inspection robot 100 has finished an inspection run before the inspection robot can address an issue/abnormality that was discovered during the inspection run.

Turning to FIG. 183, a method for inspecting and/or repairing an inspection surface 500 is shown. The method may include generating 18302 an inspection map 18108 in response to inspection data 18104 and providing 18350 the inspection map 18108 on a user display. The method may include interpreting 18304 a user focus value 18112, determining 18308 an action in response to the user focus value 18112, and/or providing 18312 an action command value 18120 in response to the determined action 18116. Interpreting 18304 a user focus value 18112 may include interrogating 18306 the user display. In embodiments, the method may further include identifying and/or determining 18310 a location value at which the determined action 18116 is to be performed. In embodiments, identifying 18310 the location value may be based in part on the user focus value 18112. In embodiments, identifying 18310 the location value may be based in part on coordinate information 18202 in the user focus value 18112 from the inspection map 18108. The location value may be in real space or virtual space. The user focus value may include event type data indicating that the user focus value 18112 was generated in response to at least one of: a mouse position; a menu-selection; a touch screen indication; a key stroke; and/or a virtual gesture.

In embodiments, the method may further include executing 18314 a repair procedure corresponding to the action command value 18120. The repair procedure may include minor and/or major repairs. Minor repairs may include items such as fixing hairline crack and/or patching small holes in the inspection surface 500 which may be completed in a few hours or less. Major repairs may include items such as fixing larger cracks and/or welding patches over holes in the inspection surface which may take more than two (2) hours. The repair procedure may include actuating one or more of a welding device 18316, a drilling device 18318, a sawing device 18320, an ablation device 18322, and/or a heating device. For example, the inspection robot 100 may weld an identified emerging crack in the surface.

In embodiments, the method may further include executing 18326 a marking procedure corresponding to the action command value 18120. The marking procedure may include actuating a painting device 18328, a stamping device 18330, a sawing device 18334, a drilling device 18332, an ablation device 18336 and/or a heating device 18338. The painting device may be a spray gun, brush, roller and/or other suitable device for painting the surface 500. The stamping device may be a press, die or other suitable device. The sawing device may be a rotating saw, laser or other suitable device. The drilling device may be a rotary drill, laser or other suitable device. The ablation device may be a plasma torch, laser or other suitable device. The heating device may be an induction heater, an infrared heater, a laser and/or other suitable device.

In embodiments, the method may include executing 18340 an inspection procedure corresponding to the action command value 18120. Executing 18340 the inspection procedure may include actuating 18342 an inspection sensor 2202.

In embodiments, providing 18312 the action command value 18120 may occur during a run-time of the inspection robot 100.

Referencing FIGS. 188-204, example alternate embodiments for sleds, arms, payloads, and sensor interfaces, including sensor mounting and/or sensor electronic coupling, are described herein. The examples of FIGS. 188-204, and/or aspects of the examples of FIGS. 188-204, may be included in embodiments of inspection robots, payloads, arms, sleds, and arrangements of these as described throughout the present disclosure. The examples of FIGS. 188-204 include features that provide for, without limitation, ease of integration, simplified coupling, and/or increased options to achieve selected horizontal positioning of sensors, selected horizontal sensor spacing, increased numbers of sensors on a payload and/or inspection robot, and/or increased numbers of sensor types available within a given geometric space for an inspection robot.

Referencing FIG. 188, a side cutaway view 18800 of an example couplant routing mechanism for a sled is depicted. The example of FIG. 188 includes a couplant channel first portion 18802 that fluidly couples a couplant interface 18804 for the sled to a couplant manifold 18806 of the sled (via the couplant channel second portion 18808 in the example), providing for a single couplant interface 18804 to provide couplant to a number of sensors coupled to the sled. The example of FIG. 188 includes a couplant seal 18810 to selectively seal the couplant channel 18802, 18808, which may be provided as an access position for a sensor (e.g., to determine an aspect of the couplant in the couplant channel 18802, 18808 such as a temperature, composition, etc.), and/or to allow for a simple fabrication of the sled. For example, the couplant channel first portion 18802 may be provided by a first drilling or machining operation, and the couplant channel second portion 18808 may be provided by a second drilling or machining operation, with the resulting opening sealed with the couplant seal 18810. In certain embodiments, for example where the couplant channel 18802, 18808 is formed by an additive manufacturing operation, the couplant channel 18802, 18808 may be formed without the opening, and the couplant seal 18810 may be omitted. The couplant manifold 18806 may be formed by the sled, and/or may be formed by the sled interfacing with a sensor mounting insert (e.g., reference FIGS. 190, 191 and the related descriptions).

Referencing FIG. 189, a partial cutaway bottom view of the example couplant routing mechanism for the sled is depicted. The example of FIG. 189 is compatible with an embodiment having a sled lower body portion as partially depicted in FIG. 189, wherein a sled mounting insert is coupled to the sled lower body portion forming the sled having sensors mounted thereon. The example of FIG. 189 includes a sled manifold portion 18902, consistent with the side view depicting the couplant manifold 18806. The sled manifold portion 18902 is fluidly coupled to the couplant channel 18808, 18802, and includes a distributing portion 18906 routing couplant to couplant chamber groups associated with sensors to be mounted on the sled. The sled further includes a sensor opening 18904, which is an opening defined by the manifold configuration. Each sensor opening 18904 may have a sensor mounted to interrogate the inspection surface through the sensor opening 18904, where the manifold configuration defining the opening interacts with the sensor to form a couplant chamber. The couplant chamber, when filled with couplant, provides acoustic coupling between the sensor and the inspection surface, and a resulting distance between the inspection surface and the associated sensor at the respective sensor opening 18904 provides the delay line corresponding to that sensor. The example of FIG. 189 depicts a 6-sensor arrangement, where up to 6 sensors may be mounted on a single sled. Additionally, the position of the sensor openings 18904 and can be provided such that each sensor opening 18904 is horizontally displaced (e.g., at a distinct vertical position of FIG. 189 as depicted, where the sled in operation traverses the inspection surface to the left or to the right), and/or has a selected horizontal displacement. Accordingly, and embodiment such as that depicted in FIG. 189 includes multiple sensors on a single sled, having selected horizontal distribution. In certain embodiments, one of the available sensors may not be mounted on the sled, and the corresponding sensor opening 18904 may be sealed, and/or may just be allowed to leak couplant during operations of the inspection robot. In certain embodiments, one or more additional sensors (e.g., a sensor that is not a UT sensor) may be mounted to the sled at one of the sensor openings 18904, and the sensor may operate in the presence of the couplant, be sealed from the manifold, and/or a portion of the manifold may be omitted. For example, an embodiment of FIG. 189 where a leg of the manifold is omitted allows for three mounted UT sensors in a first sensor group, and three mounted sensor of another type in a second sensor group. Additionally or alternatively, a sensor mounting insert (e.g., reference FIG. 191) a portion of the manifold, including a leg of the manifold and/or just a single sensor position, allowing for a group of sensors mounted on a sensor mounting insert to have the proper couplant flow configuration in a single operation of coupling the sensor mounting insert to the sled lower body portion.

Referencing FIG. 190, a perspective view of a sled lower body portion is depicted. The example of FIG. 190 depicts the manifold portions 18906 as negative portions or cutouts of the sled lower body portion to form a portion of the couplant flow channels. Referencing FIG. 191, a perspective view of a sensor mounting insert (or group housing bottom portion) is depicted. The example sensor mounting insert interfaces with the sled lower body portion, for example plugging into it, and may then be secured at matching locations where holes are provided for screw, bolt, or connection interfaces. The example sensor mounting insert includes a manifold portion 19104 as positive portion (e.g., extending from the surface) that interfaces with the sled body lower portion manifold features 18902, 18906 to fully define the couplant manifold for the sensors. The manifold portion 19104 can be configured to seal one or more sensors from the manifold, and to form channels of selected size in the manifold. The example of FIGS. 190, 191 depicts the negative manifold feature on the sled lower body portion, and the positive manifold feature on the sensor mounting insert, but these may be reversed in whole or part, and/or both the sled lower body portion and the sensor mounting insert may include matching negative manifold features for all or a portion of the defined manifold. The sensor mounting insert further includes a number of sensor mounting holes 19106 therethrough, wherein sensors may be mounted and exposed to the corresponding sled lower body holes 18904. In certain embodiments, the sensors may be mounted on the sled mounting insert, allowing for the installation of the full sensor group in a single operation of coupling the sled mounting insert to the sled lower body portion.

Referencing FIG. 192, a partial cutaway view of a sensor electronics interface and a sensor mounting insert for a sled is depicted. The example of FIG. 192 includes a sensor group housing upper portion 19208 coupled to the sensor mounting insert 19102 (or group housing lower portion), which may form a sensor group housing when coupled. The example of FIG. 192 further includes an electronic interface board 19202 for the sensors, providing an electrical interface between the group of sensors and a payload interface to the housing. The example of FIG. 192 includes a single connector interface 19210 that electronically couples all of the sensors of the sled at a single connector. The interface board 19202 may provide electrical connection, and/or may form a hardware controller or a portion of a hardware controller for an inspection robot. In certain embodiments, the interface board 19202 may include a sensor controller 19204 that determines raw sensor data, and/or partially processed sensor data, for example performing A/D operations, conversions of electrical values to sensed parameter values, and the like. In certain embodiments, the interface board 19202 may include a controller that performs minimal processing operations for sensor data, such as operations to determine a wall thickness value (e.g., in response to UT sensor data, and/or data calibrations such as expected return times, primary mode and/or secondary mode scoring, or the like). The example of FIG. 192 depicts sensors 19206 positioned within the group housing (in certain embodiments, a sensor 19206 is showing in FIG. 192, additionally or alternatively 19206 may be a sensor sleeve or housing positioned around the sensor), and a sensor controller 19204. The sensor controller 19204 is depicted away from the interface board 19202, but may be formed on the interface board 19202 and coupled to the sensor 19206 when the interface board 19202 is positioned within the group housing, and/or the sensor controller 19204 may be positioned on the sensor 19206, and engage connections to the interface board 19202 when the interface board 19202 is positioned within the group housing. The sensor controller 19204 may include an annular contact pad that engages a housing of the sensor 19206. The interface board 19202 includes connections between the sensor controllers 19204 and a connector interface 19210. The sensor controllers 19204 may be configured for the particular type of the corresponding sensor 19206. In certain embodiments, the sensor group housing lower portion 19102 may be coupled to the sensor group housing upper portion 19208, then the entire sensor group housing may be coupled to the sled lower body portion. In certain embodiments, the sensor group housing lower portion 19102 may first be coupled to the sled lower body portion, and then the sensor group housing upper portion 19208 is coupled to the sensor group housing lower portion, forming the entire sled with sensor mounted thereon.

FIG. 193 depicts a cutaway perspective view of another embodiment of a sensor electronics interface and a sensor mounting insert for a sled. The example of FIG. 193 includes a different shape for the sensor group housing upper portion 19208 and lower portion 19102, allowing the embodiment of FIG. 193 to interface with a sled body lower portion having a different geometric arrangement than the embodiment of FIGS. 188-192, but otherwise includes a similar arrangement. FIG. 194 depicts a cutaway side view depicting the sensor 19206, the sensor controller 19204, the interface board 19202, and the connector interface 19210.

Referencing FIGS. 195 and 196, a detail side cutaway view and an exploded view of a sensor integrated into a sensor mounting insert are depicted. Except for minor adjustments for sensor group housing geometry, the example of FIGS. 195-196 is compatible with the examples of FIGS. 188-194. The example of FIG. 196 includes the group housing lower portion 19102 and the group housing top 19604. The sensor integration arrangement includes a delay sleeve 19502 defining at least a portion of the delay line for the sensor, a structural tube 19510 supporting the sensor, a sensor isolation element 19508, the sensor element 19504 that is positioned within the sensor isolation element 19508 and having connection elements 19506 extending therefrom, a sensor sealing cap 19514 and sensor O-ring 19602 that provide sealing between the sensor and the sensor controller 19512, and the sensor controller 19512 (or board interface for coupling to the interface board, for example if the sensor controller is positioned on the board and/or on the inspection robot body). Referencing FIG. 195, the arrangement of FIG. 196 is depicted in an assembled cutaway side view.

Referencing FIG. 197, an example sled and sensor mounting insert is depicted in an exploded view. The example of FIG. 197 is compatible with the examples of FIGS. 188-196, except for minor adjustments for sensor group housing geometry. The example of FIG. 197 depicts a sensor group housing upper portion 19208, a sensor group housing lower portion 19102 having a sensor 19206 positioned therein, and an interface board 19202 that is coupled to the sensor controller 19204 when the sensor group housing upper and lower portions are joined. The example of FIG. 197 further includes a sled body lower portion 19706 having a selected ramp 19704, with a ramp at each end of the sled body in the arrangement of FIG. 197. The example of FIG. 197 further includes a sled bottom surface having a matching geometry to the sled body lower portion, including matching ramps 19702 and defining holes 19708 matching the hole arrangement of the sled body lower portion and the position of the sensors 19206. The sled bottom surface may be a replaceable surface, and may further include coupling tabs 19710 that snap into matching slots of the sled body lower portion (reference FIG. 202), for example to enable quick removal and/or replacement of the sled body lower portion. The sled body lower portion 19712 further defines an arm coupling hole, for example allowing pivotal coupling between the sled body lower portion and an arm or a payload.

Referencing FIG. 198, an example payload having an arm and two sleds mounted thereto is depicted. In certain embodiments, the arrangement of FIG. 198 forms a portion of a payload, for example as an arm coupled to a payload at a selected horizontal position. In certain embodiments, the arrangement of FIG. 198 forms a payload, for example coupled at a selected horizontal position to a rail or other coupling feature of an inspection robot chassis, thereby forming a payload having a number of inspection sensors mounted thereon. The example of FIG. 198 includes sleds and sensor group housings that are consistent with the embodiments of FIGS. 188-197, except for minor adjustments for sensor group housing geometry. The example of FIG. 198 includes an arm 19802 coupling the sled to a payload coupling 19810 (and/or chassis coupling 19810). The arm 19802 defines a passage therethrough, wherein a couplant connection may pass through the passage, or may progress above the arm to couple with the sensor lower body portion (e.g., reference 18804 of FIG. 188). The arrangement of FIG. 198 provides multiple degrees of freedom for movement of the sled, any one or more of which may be present in certain embodiments. For example, the pivot coupling 19812 of the arm 19802 to the sled (e.g., reference sled body lower portion 19712 at FIG. 197) allows for pivoting of the sled relative to the arm 19802, and each sled of the pair of sleds depicted may additionally or alternatively pivot separately or be coupled to pivot together (e.g., pivot coupling 19812 may be a single axle, or separate axles coupled to each sled). The arm coupling 19804 provides for pivoting of the arm 19802 relative to the inspection surface (e.g., raising or lowering), and a second arm coupling 19816 provides for rotation of the arm 19802 (and coupling joint 19814) along a second perpendicular axis relative to arm coupling 19804. Accordingly, couplings 19804, 19816 operate together to in a two-axis gimbal arrangement, allowing for rotation in one axis, and pivoting in the other axis. The selected pivoting and/or rotational degrees of freedom are selectable, and one or more of the pivoting or rotational degrees of freedom may be omitted, limited in available range of motion, and/or be associated with a biasing member that urges the movement in a selected direction and/or urges movement back toward a selected position. In the example of FIG. 198, a biasing spring 19806 urges the pivot coupling 19812 to move the arm 19802 toward the inspection surface, thereby contributing to a selected downforce on the sled. Any one or more of the biasing members may be passive (e.g., having a constant arrangement during inspection operations) and/or active (e.g., having an actuator that adjusts the arrangement, for example changing a force of the urging, changing a direction of the urging, and/or changing the selected position of the urging. The example of FIG. 198 depicts selected ramps 19704 defined by the sled, and sensor group housing 19200 elements positioned on each sled and coupling the sensors to the sled and/or the inspection surface. The example of FIG. 198 further includes a coupling line retainer 19808 that provides for routing of couplant lines and/or electrical communication away from rotating, pivoting, or moving elements, and provides for consistent positioning of the couplant lines and/or electrical communication for ease of interfacing the arrangement of FIG. 198 with a payload and/or inspection chassis upon which the arrangement is mounted. The example payload coupling 19810 includes a clamp having a moving portion and a stationary portion, and may be operable with a screw, a quick connect element (e.g., a wing nut and/or cam lever arrangement), or the like. The example payload coupling 19810 is a non-limiting arrangement, and the payload/chassis coupling may include any arrangement, including, without limitation, a clamp, a coupling pin, an R-clip (and/or a pin), a quick connect element, or combinations among these elements.

Referencing FIG. 199, an example arrangement is depicted. The example of FIG. 199 may form a payload or a portion of a payload (e.g., with the arms coupled to the corresponding payload), and/or the example of FIG. 199 may depict two payloads (e.g., with the arms coupled to a feature of the inspection robot chassis). The arrangement of FIG. 199 is consistent with the arrangement of FIG. 198, and depicts two arm assemblies in an example side-by-side arrangement. In an example embodiment wherein each sensor group housing 19200 includes six sensors mounted therein, the example of FIG. 199 illustrates how an arrangement of 24 sensors can be readily positioned on an inspection surface, with each of the sensors having a separate and configurable horizontal position on the inspection surface, allowing for rapid inspection of the inspection surface and/or high resolution (e.g., horizontal distance between adjacent sensors) inspection of the inspection surface. An example embodiment includes each arm having an independent couplant and/or electrical interface, allowing for a switch of 12 sensors at a time with a single couplant and/or electrical connection to be operated. An example embodiment includes the arms having a shared couplant interface (e.g., reference FIG. 70) allowing for a switch of 24 sensors at a time with a single couplant connection to be operated. The pivotal and rotational couplings and/or degrees of freedom available may be varied between the arms, for example to allow for greater movement in one arm versus another (e.g., to allow an arm that is more likely to impact an obstacle, such as an outer one of the arms, to have more capability to deflect away from and/or around the obstacle).

Referencing FIG. 200, an example arrangement is depicted as a top view, consistent with the arrangement of FIG. 199. It can be seen that the sensor group housings 19200 can readily be configured to provide for selected horizontal distribution of the inspection sensors. The horizontal distribution can be adjusted by replacing the arms with arms having a different sensor group housing 19200 and sensor arrangement within the sensor group housing 19200, by displacing the arms along a payload and/or along the inspection robot chassis, and/or displacing a payload (where the arms are mounted to the payload) along the inspection robot chassis.

FIG. 202 depicts a bottom view of two sled body lower portions 19706 in a pivoted position. The example of FIG. 202 is a schematic depiction of sled body lower portions, with the sled bottom surface omitted. In certain embodiments, the inspection robot may be operated with the sled lower body portions 19706 in contact with the inspection surface, and accordingly the sled bottom surface may be omitted. Additionally, the depiction of FIG. 202 with the sled bottom surface portion omitted allows for depiction of certain features of the example sled body lower portions 19706. The example of FIG. 202 includes sled body lower portions 19706 having coupling slots 20202 engageable with matching coupling tabs 19710 of the sled bottom surface. The number and position of the slots 20202 and/or tabs 19710 is a non-limiting example, and a sled body lower portion 19706 may include slots 20202 that are not utilized by a particular sled bottom surface, for example to maintain compatibility with a number of sled bottom surface components. In certain embodiments, the slots 20202 positioned on the sled body lower portions 19706 rather than on the sled bottom surface portions allow for the sleds to be operated without the sled bottom surface. In certain embodiments, the slots 20202 may be present on the sled bottom surface, and the tabs 19710 may be present on the sled body lower portions 19706, and/or the slots 20202 and tabs 19710 may be mixed between the sled bottom surface, and the tabs 19710 may be present on the sled body lower portions 19706.

In certain embodiments, an inspection robot and/or payload arrangement may be configured to engage a flat inspection surface, for example at FIG. 199. The depiction of FIG. 199 engageable to a flat inspection surface is a non-limiting example, and an arrangement otherwise consisting with FIG. 199 may be matched, utilizing sled bottom surfaces, overall sled engagement positions (e.g., see FIG. 70), or freedom of relative movement of sleds and/or arms to engage a curved surface, a concave surface, a convex surface, and/or combinations of these (e.g., a number of parallel pipes having undulations, varying pipe diameters, etc.). An inspection robot and/or payload arrangement as set forth herein may be configured to provide a number of inspection sensors distributed horizontally and operationally engaged with the inspection surface, where movement on the inspection surface by the inspection robot moves the inspection sensors along the inspection surface. In certain embodiments, the arrangement is configurable to ensure the inspection sensors remain operationally engaged with a flat inspection surface, with a concave inspection surface, and/or with a convex inspection surface. Additionally, the arrangement is configurable, for example utilizing pivotal and/or rotation arrangements of the arms and/or payloads, to maintain operational contact between the inspection sensors and an inspection surface having a variable curvature. For example, an inspection robot positioned within a large concave surface such as a pipe or a cylindrical tank, where the inspection robot moves through a vertical orientation (from the inspection robot perspective) is not either parallel to or perpendicular to a longitudinal axis of the pipe, will experience a varying concave curvature with respect to the horizontal orientation (from the inspection robot perspective), even where the pipe has a constant curvature (from the perspective of the pipe). In another example, an inspection robot traversing an inspection surface having variable curvature, such as a tank having an ellipsoid geometry, or a cylindrical tank having caps with a distinct curvature relative to the cylindrical body of the tank.

Numerous embodiments described throughout the present disclosure are well suited to successfully execute inspections of inspection surfaces having flat and/or varying curvature geometries. For example, payload arrangements described herein allow for freedom of movement of sensor sleds to maintain operational contact with the inspection surface over the entire inspection surface space. Additionally, control of the inspection robot movement with positional interaction, including tracking inspection surface positions that have been inspected, determining the position of the inspection robot using dead reckoning, encoders, and/or absolute position detection, allows for assurance that the entire inspection surface is inspected according to a plan (e.g., an inspection map 16330), and that progression across the surface can be performed without excessive repetition of movement. Additionally, the ability of the inspection robot to determine which positions have been inspected, to utilize transformed conceptualizations of the inspection surface (e.g., reference FIG. 160 and the related description), and the ability of the inspection robot to reconfigure (e.g., payload arrangements, physical sensor arrangements, down force applied, and/or to raise payloads), enable and/or disable sensors and/or data collection, allows for assurance that the entire inspection surface is inspected without excessive data collection and/or utilization of couplant. Additionally, the ability of the inspection robot to traverse between distinct surface orientations, for example by lifting the payloads and/or utilizing a stability support device, allows the inspection robot to traverse distinct surfaces, such as surfaces within a tank interior, surfaces in a pipe bend, or the like. Additionally, embodiments set forth herein allow for an inspection robot to traverse a pipe or tank interior or exterior in a helical path, allowing for an inspection having a selected inspection resolution of the inspection surface within a single pass (e.g., where representative points are inspected, and/or wherein the helical path is selected such that the horizontal width of the sensors overlaps and/or is acceptably adjacent on subsequent spirals of the helical path).

It can be seen that various embodiments herein provide for an inspection robot capable to inspect a surface such as an interior of a pipe and/or an interior of a tank. Additionally, embodiments of an inspection robot herein are operable at elevated temperatures relative to acceptable temperatures for personnel, and operable in composition environments (e.g., presence of $CO_2$, low oxygen, etc.) that are not acceptable to personnel. Additionally, in certain embodiments, entrance of an inspection robot into certain spaces may be a trivial operation, where entrance of a person into the space may require exposure to risk, and/or require extensive preparation and verification (e.g., lock-out/tag-out procedures, confined space procedures, exposure to height procedures, etc.). Accordingly, embodiments throughout the present disclosure provide for improved cost, safety, capability, and/or completion time of inspections relative to previously known systems or procedures.

What is claimed is:

1. A system, comprising:

an inspection robot comprising a plurality of payloads and an obstacle sensor, the inspection robot configured to interrogate an inspection surface with the obstacle sensor;

a plurality of arms, wherein each of the plurality of arms is pivotally mounted to one of the plurality of payloads;

a plurality of sleds, wherein each sled is mounted to one of the plurality of arms;

a plurality of inspection sensors, each of the plurality of inspection sensors coupled to one of the plurality of sleds such that each sensor is operationally couplable to the inspection surface, wherein the plurality of sleds are horizontally distributed on the inspection surface at selected horizontal positions, and wherein each of the plurality of arms is horizontally moveable relative to a corresponding payload;

a controller structured to:

interpret obstacle data comprising data provided by the obstacle sensor;

generate and provide obstacle notification data to a user interface device in response to the interpreted obstacle data;

determine an obstacle response command value in response to the interpreted obstacle data; and provide the obstacle response command value to the inspection robot during the interrogating of the inspection surface.

2. The system of claim 1, wherein the controller is further structured to:

determine whether the inspection robot has traversed an obstacle in response to execution of a command corresponding to the obstacle response command value by the inspection robot.

3. The system of claim 1, wherein the obstacle sensor comprises a camera.

4. The system of claim 3, wherein the controller is further structured to provide the obstacle notification data as an inspection surface depiction of at least a portion of the inspection surface.

5. The system of claim 1, wherein the obstacle sensor comprises a ferrous substrate detection sensor.

6. The system of claim 1, wherein the controller is further structured to determine the interpreted obstacle data as indicating a potential presence of an obstacle in response to determining a non-ferrous substrate detection of a portion of the inspection surface.

7. The system of claim 1, wherein the controller is further structured to provide a stop command to the inspection robot in response to the interpreted obstacle data indicating a potential presence of an obstacle.

8. The system of claim 1, wherein the obstacle sensor comprises a contact sensor.

9. A system, comprising:

an inspection robot comprising a plurality of payloads;

a plurality of arms, wherein each of the plurality of arms is pivotally mounted to one of the plurality of payloads;

a plurality of sleds, wherein each sled is mounted to one of the plurality of arms;

a plurality of inspection sensors, each of the inspection sensors coupled to one of the plurality of sleds such that each sensor is operationally couplable to an inspection surface, wherein the plurality of sleds are horizontally distributed on the inspection surface at selected horizontal positions, and wherein each of the arms is horizontally moveable relative to a corresponding payload; and a controller structured to:

interpret obstacle data comprising data provided by an obstacle sensor of the inspection robot; and identify one of an obstacle or a potential obstacle, and to provide obstacle notification data in response to the interpreted obstacle data.

10. The system of claim 9, further comprising:

the controller further structured to provide the obstacle notification data to a user interface device.

11. The system of claim 10, further comprising:

wherein the controller is further structured to:

determine an obstacle response command value in response to the interpreted obstacle data; and provide the obstacle response command value to the inspection robot during an interrogating of the inspection surface.

12. The system of claim 11, wherein the obstacle response command value comprises a command to reconfigure an active obstacle avoidance system of the inspection robot.

13. The system of claim 12, wherein the command to reconfigure the active obstacle avoidance system of the inspection robot comprises a command to perform at least one action selected from a list of reconfiguration actions consisting of:

reconfiguring a down force applied to one or more payloads coupled to the inspection robot;

repositioning a payload coupled to the inspection robot;

lifting a payload coupled to the inspection robot;

locking a pivot of a sled, the sled housing an inspection sensor of the inspection robot;

unlocking a pivot of a sled, the sled housing an inspection sensor of the inspection robot;

locking a pivot of an arm, the arm coupled to a payload of the inspection robot, and an inspection sensor coupled to the arm;

unlocking a pivot of an arm, the arm coupled to a payload of the inspection robot, and an inspection sensor coupled to the arm;

reconfiguring one or more payloads coupled to the inspection robot; and adjusting a couplant flow rate of the inspection robot.

14. The system of claim 12, wherein the controller is further structured to:

determine whether the inspection robot has traversed the obstacle in response to execution of the obstacle response command value by the inspection robot.

15. The system of claim 9, further comprising:

the controller further structured to:

determine an obstacle response command value in response to the obstacle notification data; and provide the obstacle response command value to the inspection robot during an inspection operation of the inspection surface, wherein the obstacle response command value comprises:

a command to adjust the inspection operation of the inspection robot.

16. The system of claim 15, wherein the command to adjust the inspection operation of the inspection robot comprises a command to perform an adjustment selected from a list of adjustments consisting of:

stopping the inspection operation;

taking data in response to the obstacle;

applying a virtual mark in response to the obstacle;

updating an obstacle map for the inspection surface;

confirming an obstacle map for the inspection surface;

acquiring an image or video related to the obstacle; and updating of an inspection run plan.

17. A method, comprising:

interpreting obstacle data comprising data provided by a system comprising a controller and an inspection robot interrogating an inspection surface with one or more obstacle sensors;

determining, by the controller, interpreted obstacle data in response to the obstacle data; and generating and providing, by the controller, obstacle notification data in response to the interpreted obstacle data, wherein the system further comprises:

the inspection robot comprising a plurality of payloads;

a plurality of arms, wherein each of the plurality of arms is pivotally mounted to one of the plurality of payloads; and a plurality of sleds, wherein each sled is mounted to one of the plurality of arms; a plurality of inspection sensors, each of the inspection sensors coupled to one of the plurality of sleds such that each sensor is operationally couplable to the inspection surface, wherein the plurality of sleds are horizontally distributed on the inspection surface at selected horizontal positions, and wherein each of the arms is horizontally moveable relative to a corresponding payload.

18. The method of claim 17, further comprising:

providing the obstacle notification data to a user interface.

19. The method of claim 18, further comprising:

determining an obstacle response command value in response to the interpreted obstacle data; and providing the obstacle response command value to the inspection robot during the interrogating of the inspection surface.

20. The method of claim 19, further comprising:

adjusting an inspection operation of the inspection robot in response to the obstacle response command value.

21. The method of claim 20, wherein adjusting the inspection operation of the inspection robot comprises at least one procedure selected from a list of procedures consisting of:

stopping the interrogating of the inspection surface; and updating of an inspection run plan.

22. The method of claim 19, further comprising:

reconfiguring an active obstacle avoidance system of the inspection robot in response to the obstacle response command value.

23. The method of claim 22, wherein reconfiguring the active obstacle avoidance system of the inspection robot comprises at least one procedure selected from a list of procedures consisting of:

reconfiguring a down force applied to one or more payloads coupled to the inspection robot;

reconfiguring a width of one or more of the plurality of payloads coupled to the inspection robot; and reconfiguring a couplant flow rate of the inspection robot.

24. The method of claim 19, further comprising:

determining whether the inspection robot traversed an obstacle in response to execution of the obstacle response command value by the inspection robot.

25. A system, comprising:

an inspection robot comprising an obstacle sensor, the inspection robot configured to interrogate an inspection surface with the obstacle sensor;

an obstacle sensory data circuit structured to interpret obstacle sensory data comprising data provided by the obstacle sensor;

an obstacle processing circuit structured to determine refined obstacle data in response to the obstacle sensory data;

an obstacle notification circuit structured to generate and provide obstacle notification data to a user interface device in response to the refined obstacle data;

a user interface circuit structured to interpret a user request value from the user interface device, and to determine an obstacle response command value in response to the user request value; and an obstacle configuration circuit structured to provide the obstacle response command value to the inspection robot during the interrogating of the inspection surface, wherein the inspection robot further comprises:

an inspection chassis;

at least two drive modules; and a connector comprising:

a body having a first end for coupling with a corresponding one of the at least two drive modules and a second end for pivotally engaging the inspection chassis;

an electrical interface structured to couple an electrical power source from the inspection chassis to an electrical power load of the corresponding drive module, and further structured to provide electrical communication between a controller positioned on the inspection chassis and at least one of a sensor, an actuator, or a drive controller positioned on the corresponding drive module; and a mechanical component defined, at least in part, by the body and structured to selectively and releasably couple the body to the inspection chassis.

26. The system of claim 25, wherein the obstacle processing circuit is further structured to determine the refined obstacle data as indicating a potential presence of the obstacle in response to comparing the obstacle sensory data comprising an inspection surface depiction to a nominal inspection surface depiction.

27. The system of claim 26, wherein the obstacle processing circuit is further structured to determine the refined obstacle data as indicating the potential presence of the obstacle in response to comparing the obstacle sensory data comprising the inspection surface depiction to a predetermined obstacle inspection surface depiction.

28. The system of claim 25, wherein the obstacle configuration circuit is further structured to:

determine, based at least in part on the refined obstacle data, whether the inspection robot has traversed the obstacle in response to execution of the obstacle response command value by the inspection robot; and provide an obstacle alarm data value in response to determining that the inspection robot has not traversed the obstacle, the system further comprising a user interface circuit structured to provide the obstacle alarm data value to the user interface device.

29. The system of claim 25, wherein the user interface circuit is further structured to provide an obstacle alarm data value to a user interface in response to the refined obstacle data and the obstacle notification data.

30. The system of claim 29, wherein the obstacle alarm data value comprises imaging data from an optical camera of the inspection robot, wherein the imaging data is related to at least one of: the obstacle, a position of the obstacle, a height of the obstacle, the inspection surface surrounding the obstacle, a horizontal extent of the obstacle, a vertical extent of the obstacle, or a slope of the obstacle.

31. The system of claim 25, wherein each of the corresponding drive modules is independently rotatable.

* * * * *

UNITED STATES PATENT AND TRADEMARK OFFICE
CERTIFICATE OF CORRECTION

PATENT NO. : 11,518,031 B2
APPLICATION NO. : 16/869700
DATED : December 6, 2022
INVENTOR(S) : Edward A. Bryner et al.

It is certified that error appears in the above-identified patent and that said Letters Patent is hereby corrected as shown below:

In the Drawings

In Figure 35, delete "3208" and insert --3506-- therefor

In Figure 201, delete "148888" and insert --14888-- therefor

In Figure 201, delete "148846" and insert --14886-- therefor

In Figure 221, delete "148888" and insert --14888-- therefor

In Figure 221, delete "148846" and insert --14886-- therefor

In the Specification

In Column 10, Line 12, delete "3" and insert --200-- therefor

In Column 14, Line 61, delete "9" and insert --17-- therefor

In Column 24, Line 8, delete "300" and insert --3-- therefor

In Column 48, Line 62, delete "3602" and insert --3610-- therefor

In Column 53, Line 4, delete "4018" and insert --4011-- therefor

In Column 96, Line 7, delete "6011" and insert --6010-- therefor

In Column 110, Line 20, delete "8704," and insert --8602,-- therefor

In Column 117, Line 3, delete "9108" and insert --9018-- therefor

Signed and Sealed this
Twenty-sixth Day of September, 2023

Katherine Kelly Vidal

Katherine Kelly Vidal
*Director of the United States Patent and Trademark Office*

In Column 117, Line 4, delete “9016” and insert --9020-- therefor

In Column 122, Line 20, delete “18502” and insert --18602-- therefor

In Column 122, Line 41, delete “18502” and insert --18602-- therefor

In Column 126, Line 7, delete “9608” and insert --9508-- therefor

In Column 126, Line 23, delete “9502” and insert --9506-- therefor

In Column 127, Line 4, delete “9352” and insert --9532-- therefor

In Column 127, Line 9, delete “9350” and insert --9530-- therefor

In Column 127, Line 24, delete “9352” and insert --9532-- therefor

In Column 127, Line 47, delete “9530” and insert --9532-- therefor

In Column 127, Line 59, delete “1” and insert --100-- therefor

In Column 128, Line 12, delete “9352” and insert --9532-- therefor

In Column 128, Line 19, delete “9354” and insert --9534-- therefor

In Column 128, Line 23, delete “9354” and insert --9534-- therefor

In Column 128, Line 25, delete “9352” and insert --9532-- therefor

In Column 128, Line 28, delete “9352” and insert --9532-- therefor

In Column 129, Line 62 delete “9926” and insert --9910-- therefor

In Column 130, Line 45, delete “9910” and insert --9916-- therefor

In Column 133, Line 56, delete “101020” and insert --10120-- therefor

In Column 139, Line 54, delete “1708” and insert --10706-- therefor

In Column 140, Line 8, delete “10818” and insert --10814-- therefor

In Column 141, Line 1, delete “11102” and insert --11402-- therefor

In Column 142, Line 29, delete “11202” and insert --11502-- therefor

In Column 143, Line 3, delete “11818” and insert --11318-- therefor

In Column 143, Line 13, delete “2220” and insert --2202-- therefor

In Column 148, Line 49, delete “12802” and insert --12804-- therefor

In Column 150, Line 30, delete “12808” and insert --12806-- therefor

In Column 150, Line 30, delete “12806,” and insert --12808,-- therefor

In Column 150, Line 30, delete “12808” and insert --12806-- therefor

In Column 150, Line 32, delete “12806” and insert --12808-- therefor

In Column 150, Line 42, delete “12808.” and insert --12806.-- therefor

In Column 159, Line 17, delete “13692,” and insert --13602,-- therefor

In Column 159, Line 38, delete “13621” and insert --13632-- therefor

In Column 160, Line 23, delete “13712.” and insert --13702.-- therefor

In Column 163, Line 34, delete “14204;” and insert --14002;-- therefor

In Column 164, Line 3, delete “14312” and insert --14308-- therefor

In Column 164, Line 59, delete “1516” and insert --14516-- therefor

In Column 164, Line 60, delete “15406” and insert --14504-- therefor

In Column 165, Line 49, delete “14604” and insert --14606-- therefor

In Column 166, Line 25, delete “14606,” and insert --14604,-- therefor

In Column 166, Line 35, delete “14605” and insert --14604-- therefor

In Column 166, Line 35, delete “14606” and insert --14604-- therefor

In Column 167, Line 36, delete “148846” and insert --14886-- therefor

In Column 167, Line 39, delete “148846” and insert --14886-- therefor

In Column 176, Line 5, delete “15414” and insert --15410-- therefor

In Column 176, Line 7, delete “15418.” and insert --15416.-- therefor

In Column 178, Line 5, delete “15414” and insert --15410-- therefor

In Column 178, Line 7, delete "15418." and insert --15416.-- therefor

In Column 182, Line 25, delete "15526" and insert --15516-- therefor

In Column 200, Line 47, delete "2192" and insert --21922-- therefor

In Column 203, Line 61, delete "161012" and insert --16102-- therefor

In Column 217, Line 12, delete "21214" and insert --22010-- therefor

In Column 217, Line 22, delete "21214" and insert --22010-- therefor